US012711113B1

(12) United States Patent
Amorin et al.

(10) Patent No.: US 12,711,113 B1
(45) Date of Patent: Aug. 18, 2026

(54) SYSTEM AND METHOD FOR CREATING RELATIONAL AND NON-RELATIONAL DATABASES FROM STRUCTURED AND UNSTRUCTURED DATA SOURCES

(71) Applicant: blueFlash Software LLC, Barrington, IL (US)

(72) Inventors: Antonio Cesar Amorin, Barrington, IL (US); Georgiann Amorin, Barrington, IL (US)

(73) Assignee: blueFlash Software LLC, Barrington, IL (US)

( * ) Notice: Subject to any disclaimer, the term of this patent is extended or adjusted under 35 U.S.C. 154(b) by 27 days.

(21) Appl. No.: 17/661,664

(22) Filed: May 2, 2022

Related U.S. Application Data

(60) Provisional application No. 63/363,970, filed on May 2, 2022, provisional application No. 63/182,449, filed on Apr. 30, 2021.

(51) Int. Cl.

| | |
|---|---|
| ***G06F 16/215*** | (2019.01) |
| ***G06F 16/28*** | (2019.01) |
| ***G06Q 10/10*** | (2023.01) |

(52) U.S. Cl.
CPC .......... *G06F 16/215* (2019.01); *G06F 16/285* (2019.01); *G06Q 10/103* (2013.01)

(58) Field of Classification Search
CPC .... G06F 16/215; G06F 16/285; G06Q 10/103
See application file for complete search history.

(56) References Cited

U.S. PATENT DOCUMENTS

| | | | | |
|---|---|---|---|---|
| 8,209,271 | B1 | 6/2012 | Lin et al. | |
| 10,659,523 | B1 * | 5/2020 | Joseph | H04L 67/10 |
| 2004/0044659 | A1 | 3/2004 | Judd et al. | |
| 2007/0011134 | A1 | 1/2007 | Langseth et al. | |
| 2014/0372346 | A1 | 12/2014 | Phillipps et al. | |
| 2017/0046445 | A1 | 2/2017 | Cormier et al. | |
| 2018/0075115 | A1 * | 3/2018 | Murray | G06F 16/248 |
| 2018/0081763 | A1 * | 3/2018 | Christie | G06F 16/215 |
| 2020/0327467 | A1 * | 10/2020 | Davies | G06Q 10/06313 |

(Continued)

OTHER PUBLICATIONS

Office Action issued in U.S. Appl. No. 18/142,578 (Mar. 31, 2024).

(Continued)

*Primary Examiner* — Apu M Mofiz
*Assistant Examiner* — Oscar Wehovz
(74) *Attorney, Agent, or Firm* — Barnes & Thornburg LLP

(57) ABSTRACT

A system and methodology for real-time workflow management in a computer network, including receiving a request to create a project plan, creating the project plan and a work schedule based on the received request, assigning one or more resources in accordance with the project plan and work schedule, monitoring progress of each task in real-time in the project plan and each resource associated with the task, and sending a validated value to a communication device to be rendered in a graphic user interface by the communication device. The computing device can include a machine learning platform and the computing device can be configured to analyze, by the machine learning platform, digital data and classify the data into data types, assess data quality based on the classified data, and certify the assessment of the data quality.

20 Claims, 249 Drawing Sheets

(56) References Cited

U.S. PATENT DOCUMENTS

| | | | | |
|---|---|---|---|---|
| 2021/0112101 | A1* | 4/2021 | Crabtree | H04L 63/1425 |
| 2021/0133509 | A1 | 5/2021 | Wall | |
| 2022/0076207 | A1* | 3/2022 | Culver | G06F 30/13 |
| 2022/0284398 | A1* | 9/2022 | Shukla | H04L 67/34 |
| 2022/0335362 | A1* | 10/2022 | Nikain | G06Q 10/063114 |

OTHER PUBLICATIONS

Search Report & Written Opinion issued in PCT/US2023/20755 (Jul. 25, 2023).

* cited by examiner

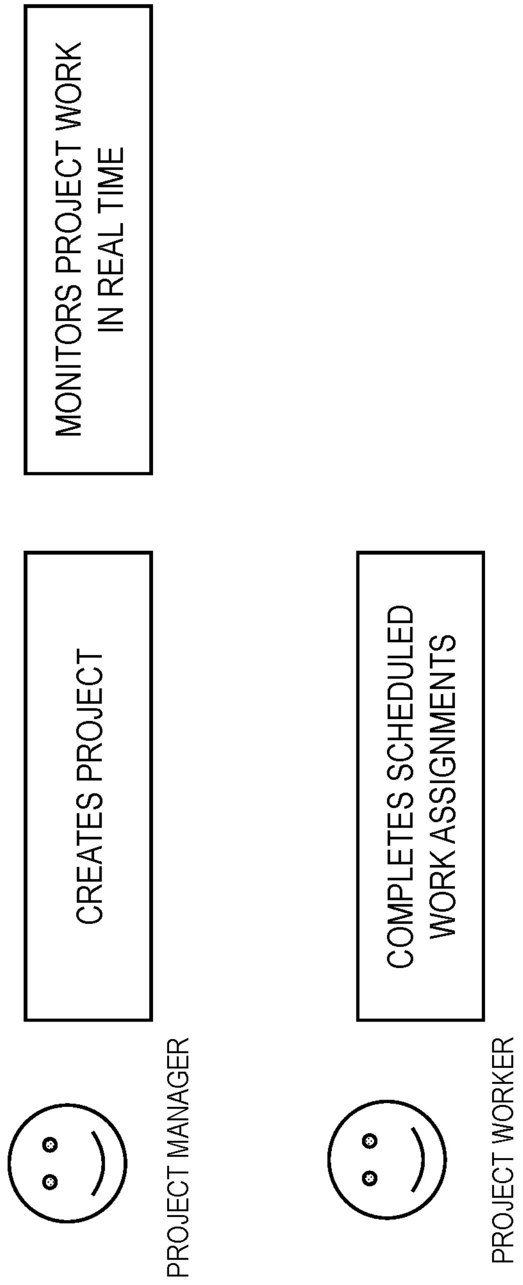
FIG. 3.1

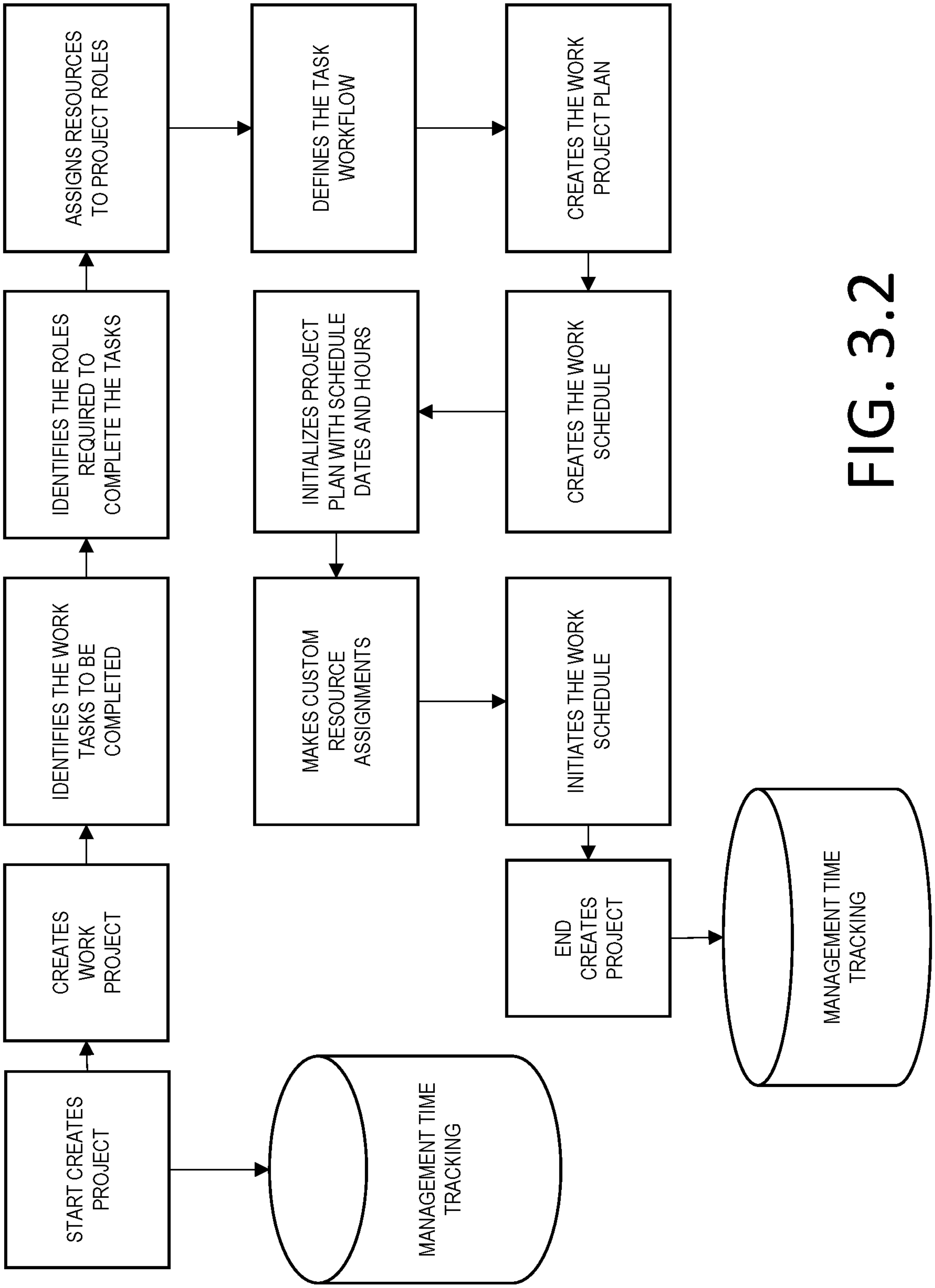
FIG. 3.2

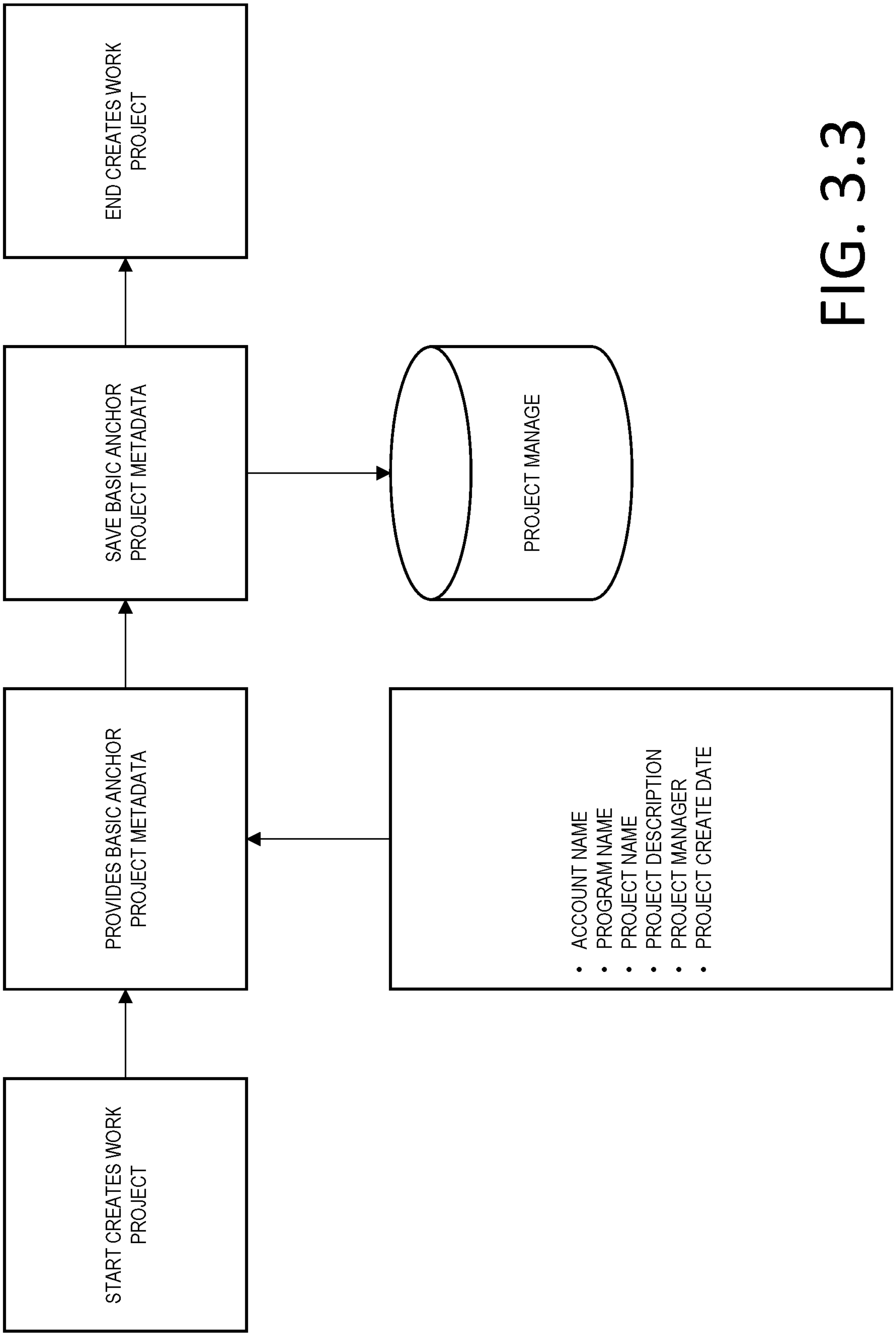
FIG. 3.3

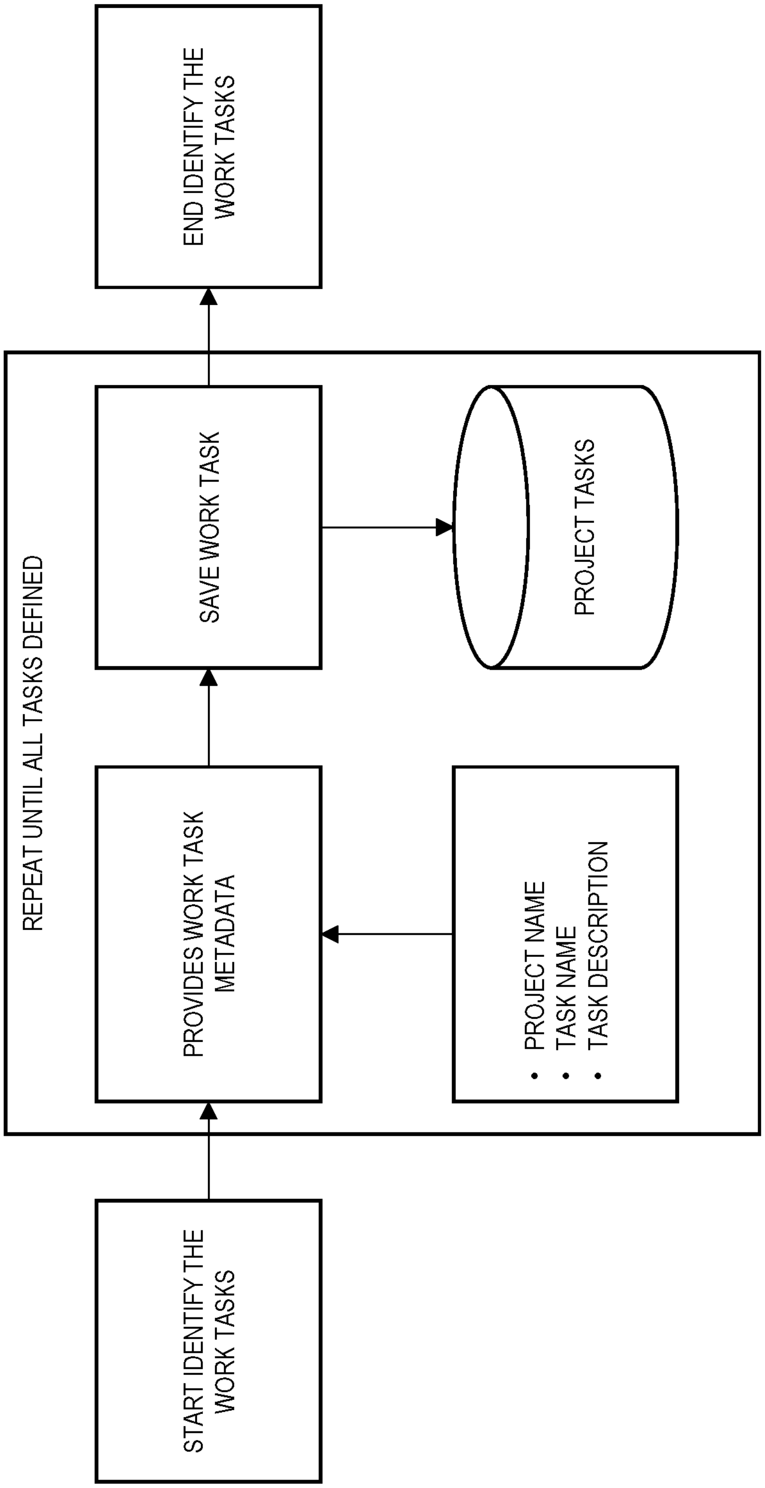
FIG. 3.4

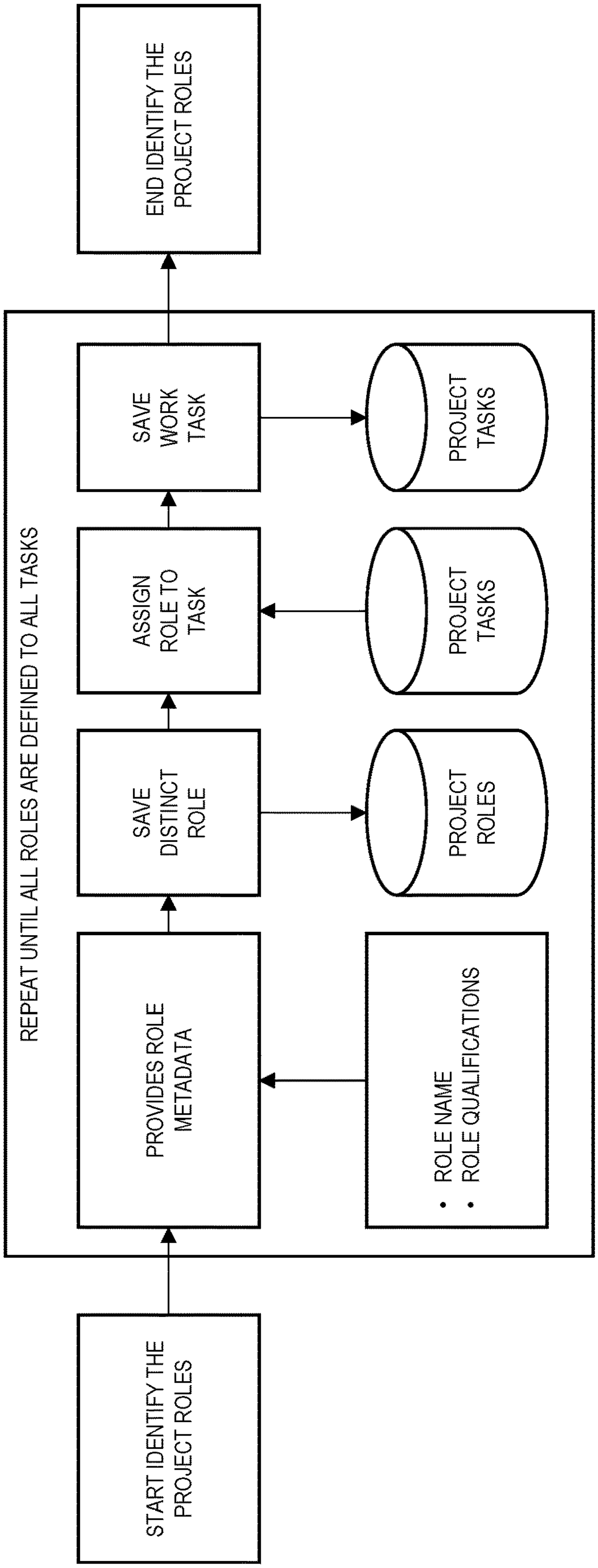
FIG. 3.5

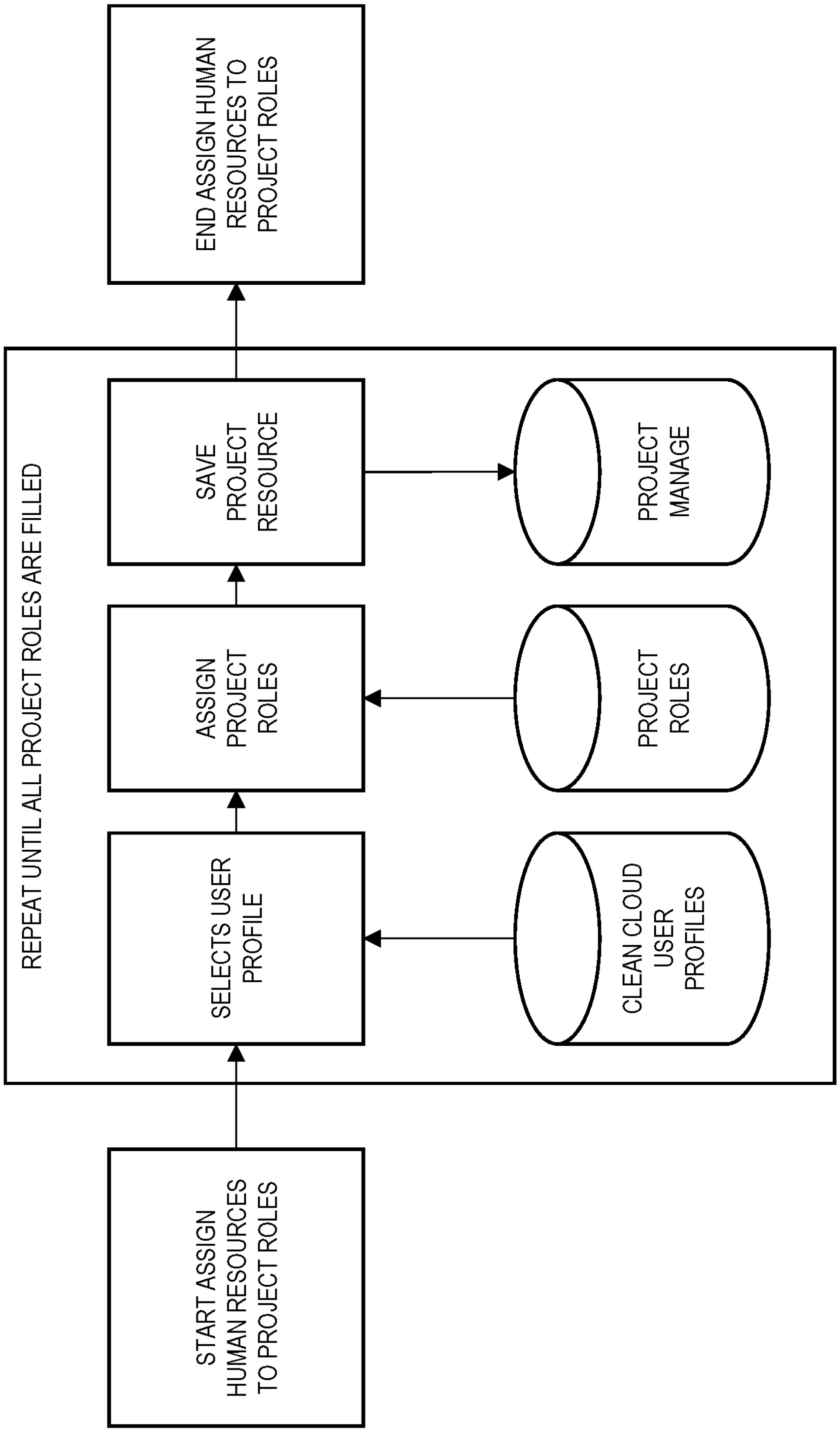
FIG. 3.6

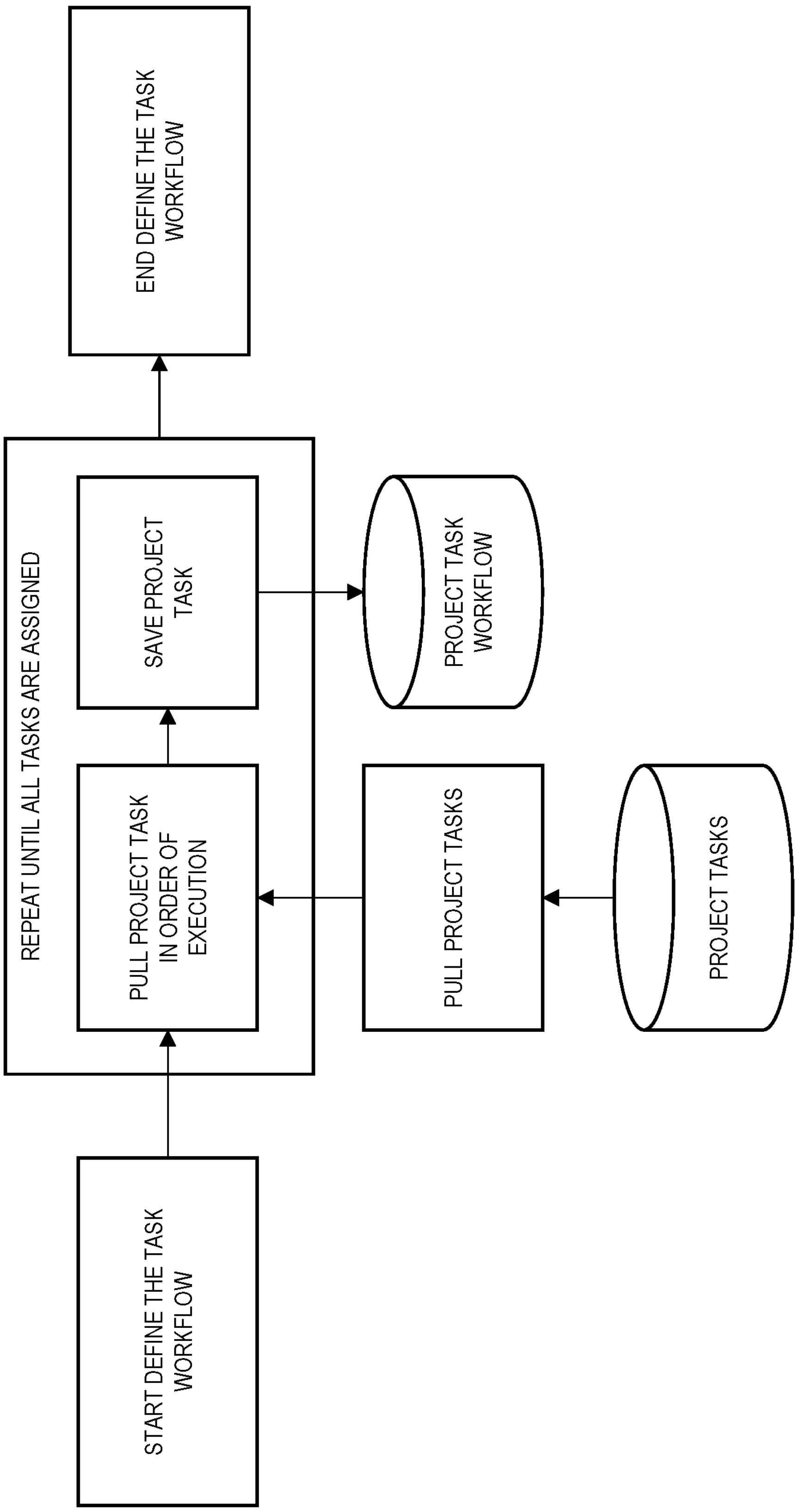
FIG. 3.7

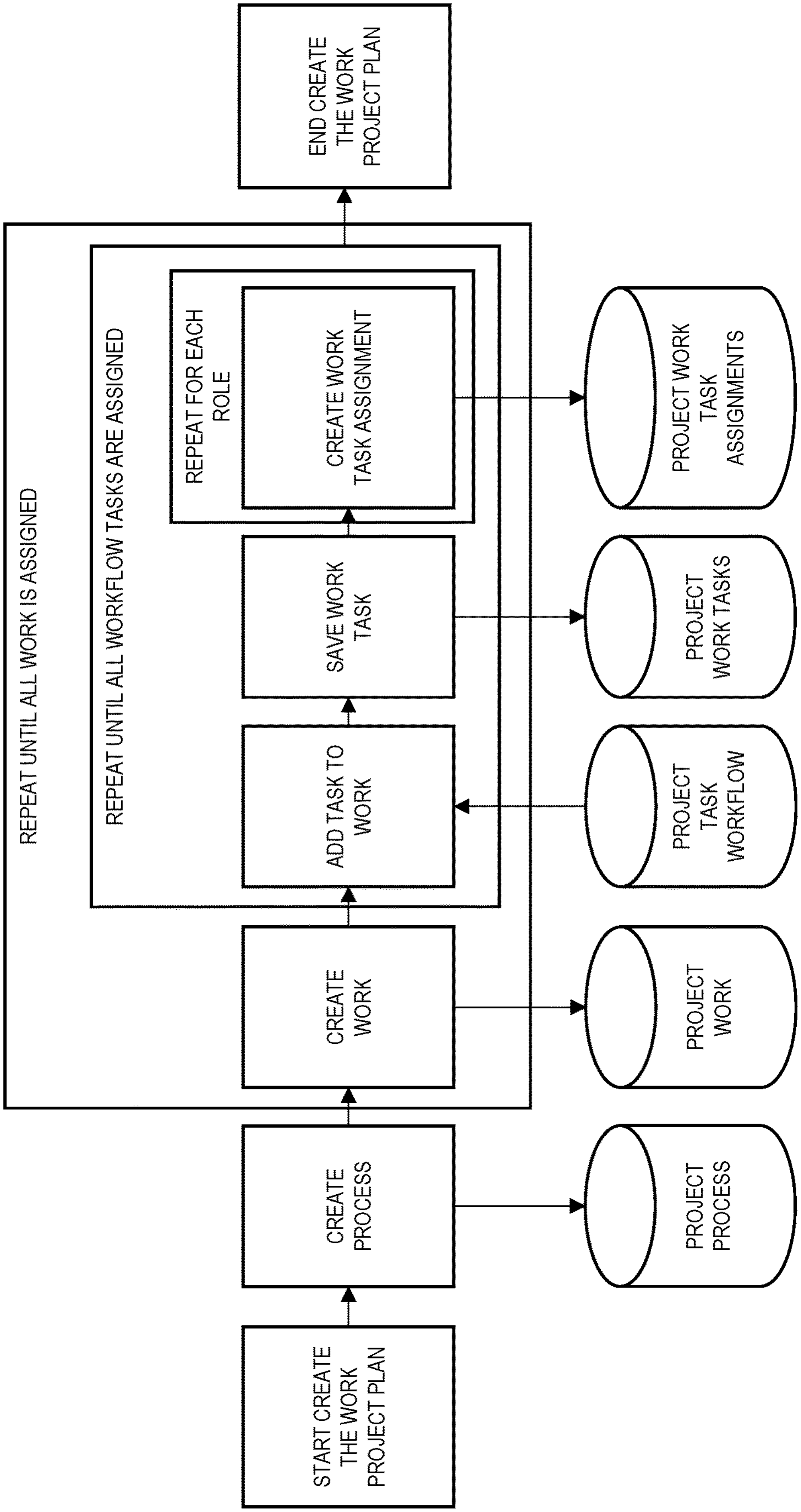
FIG. 3.8

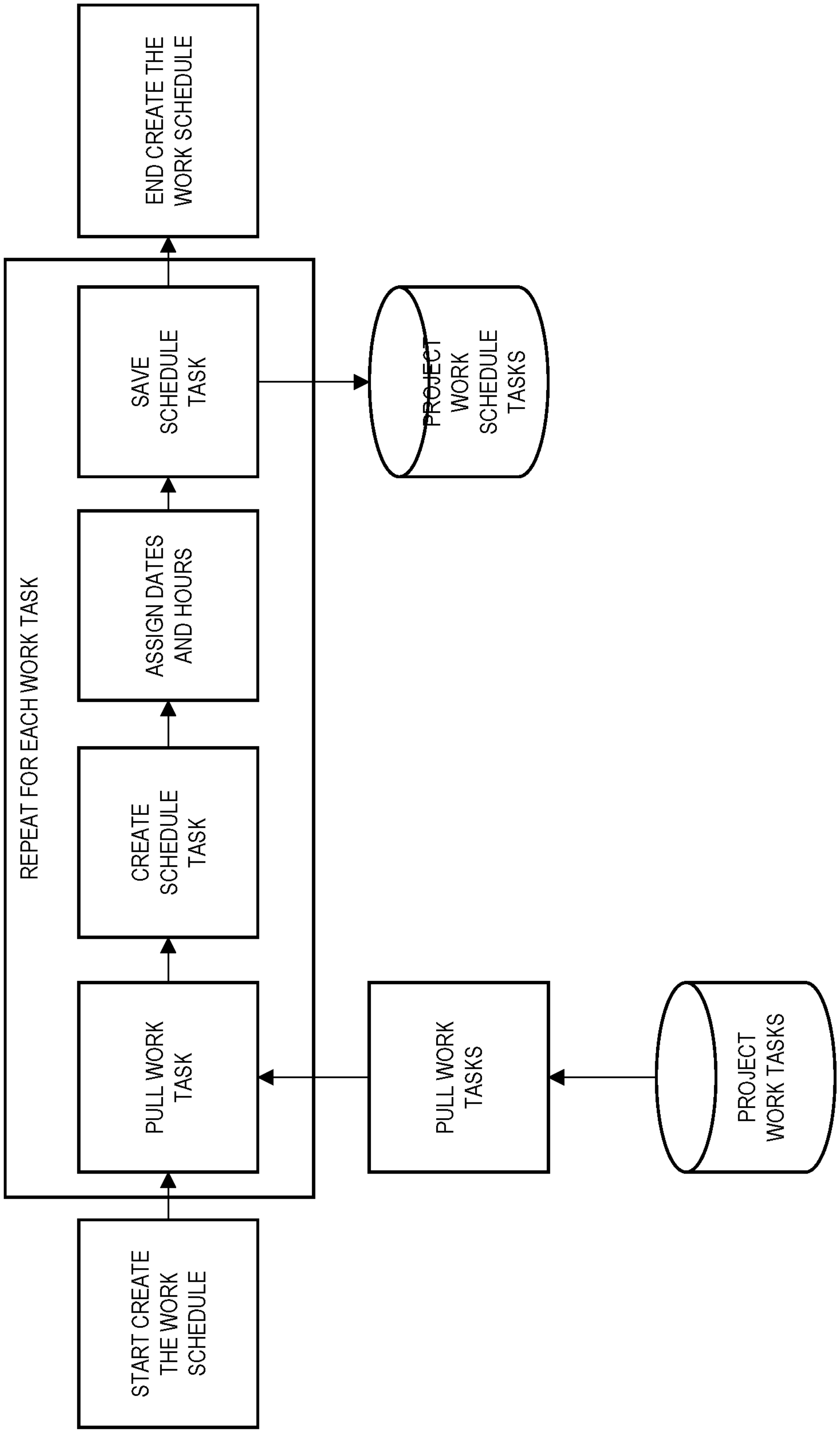
FIG. 3.9

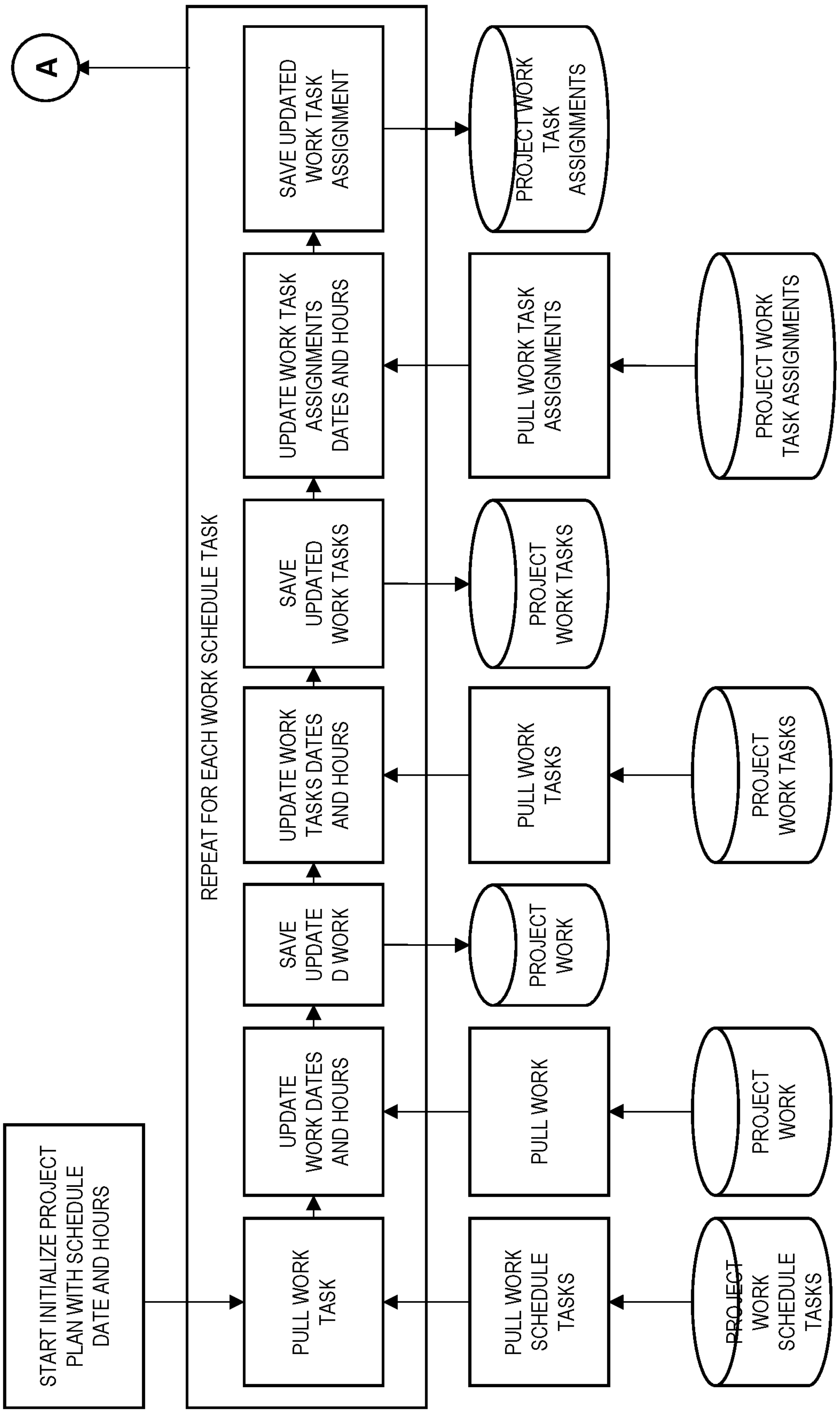
FIG. 3.10A

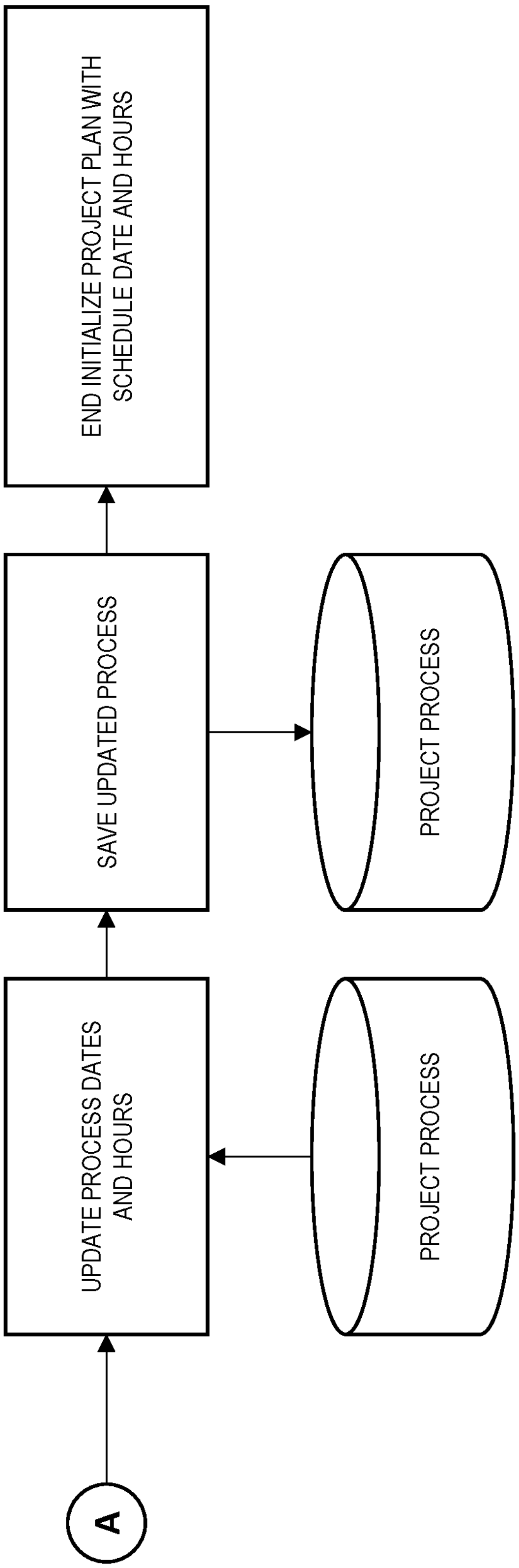
FIG. 3.10B

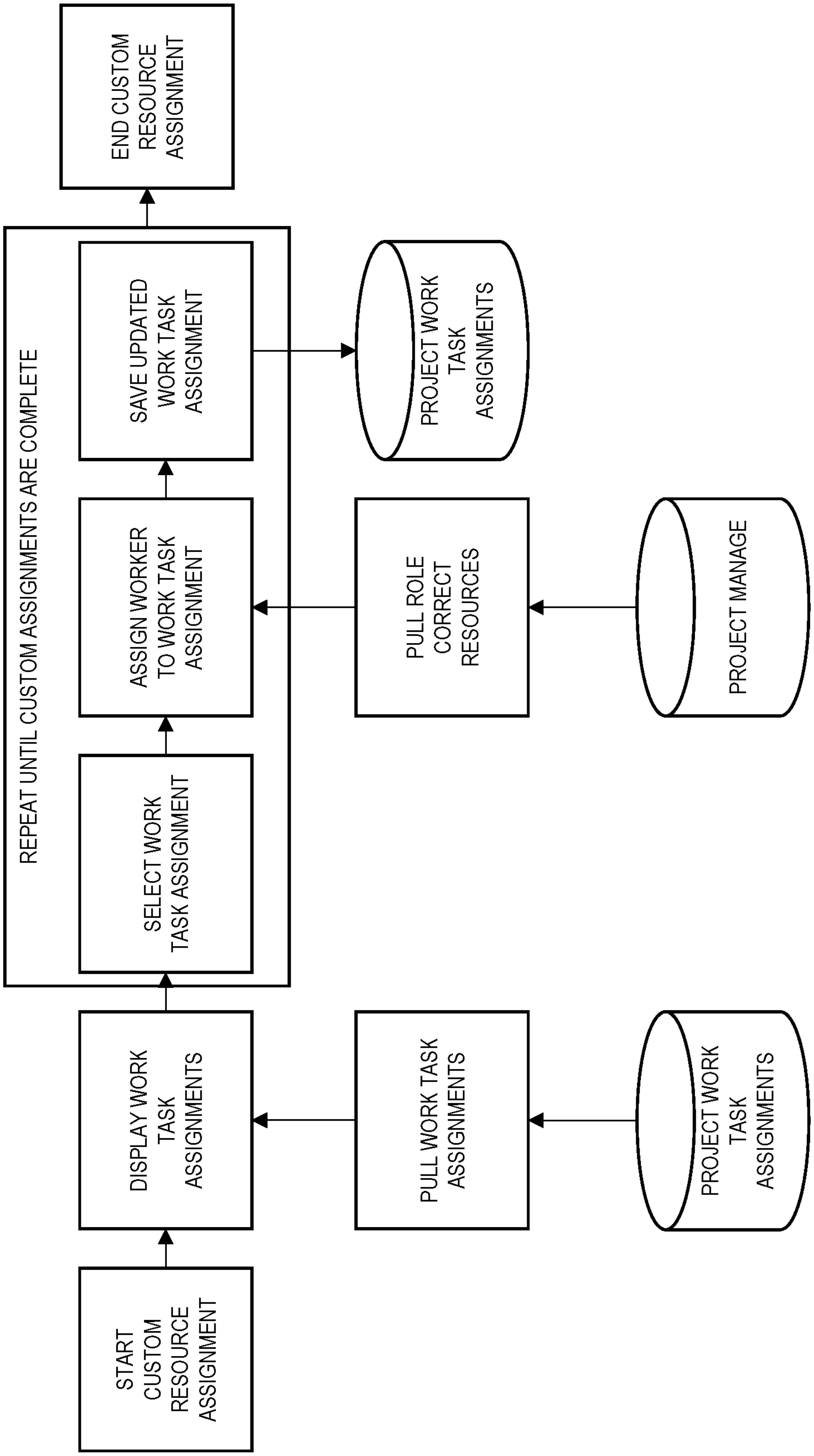
FIG. 3.11

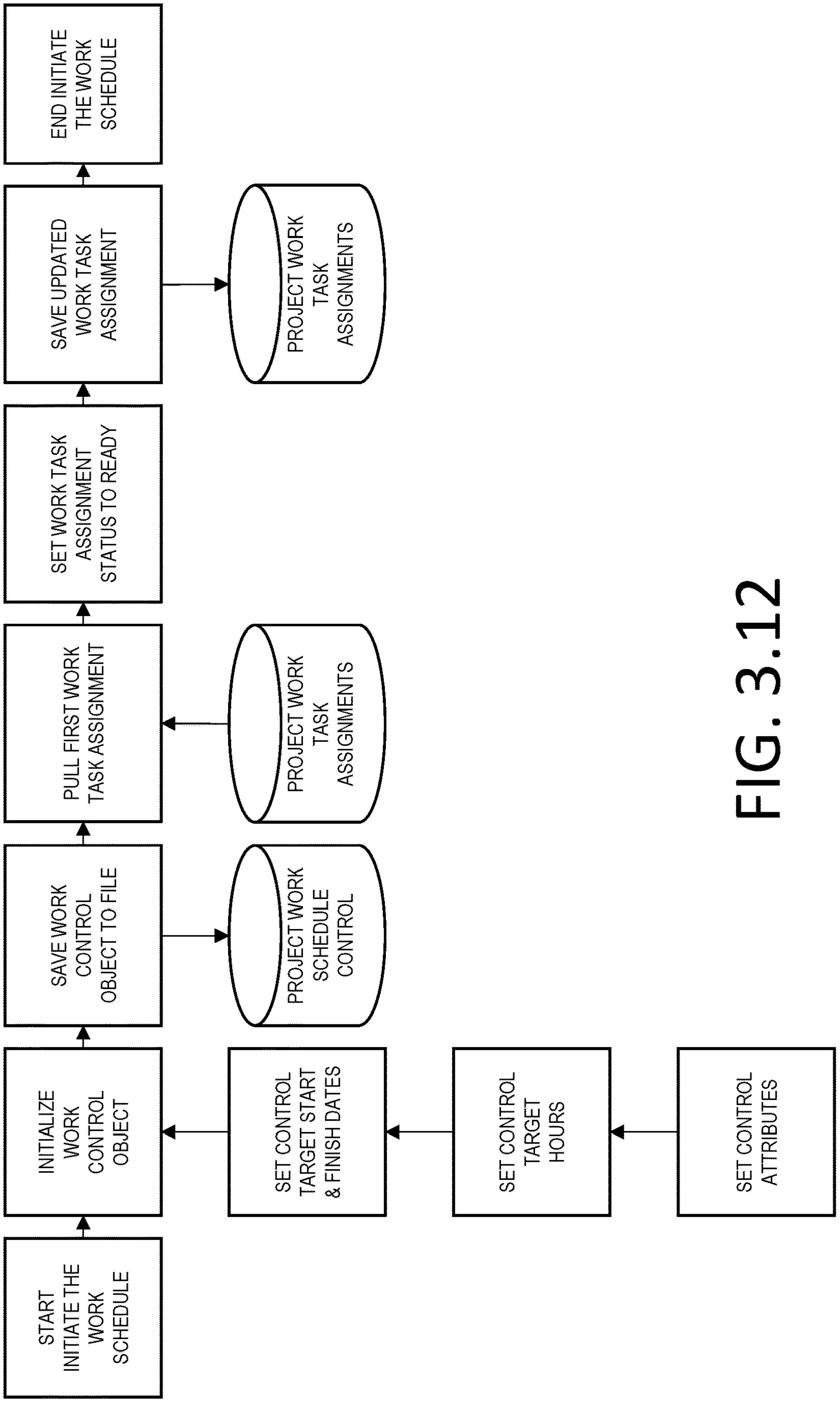
FIG. 3.12

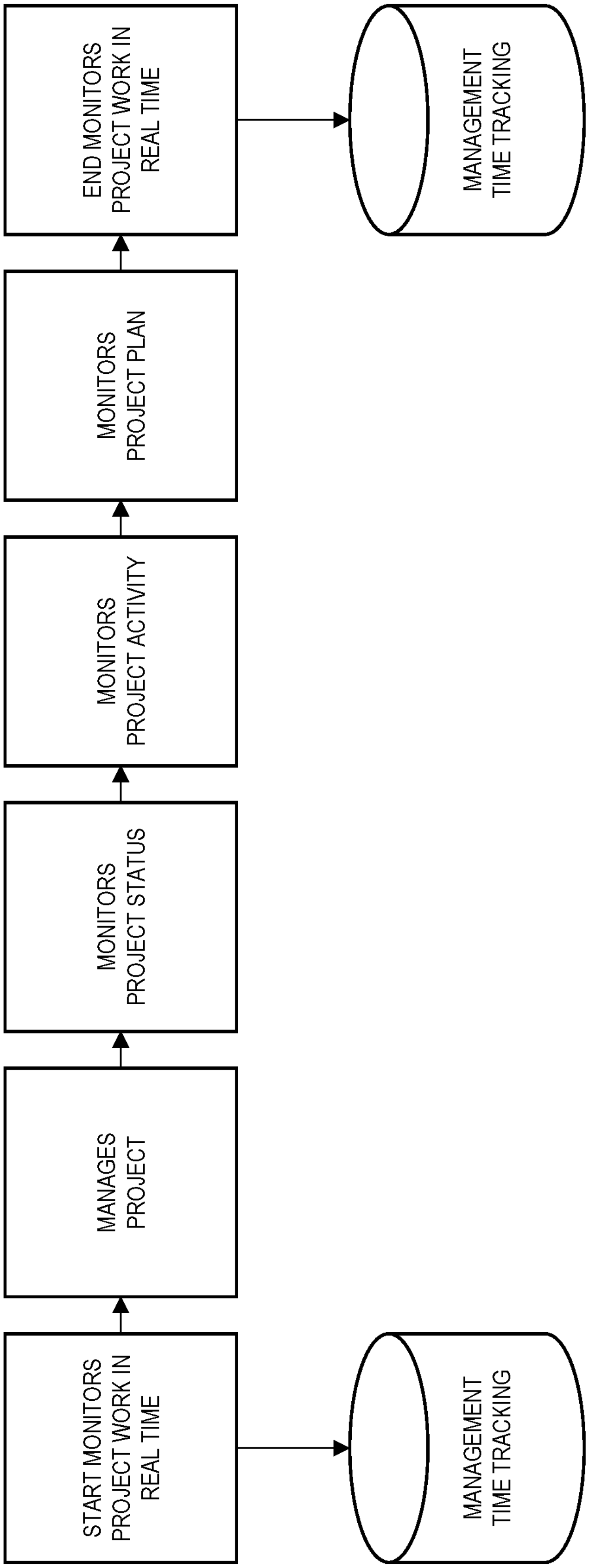
FIG. 3.13

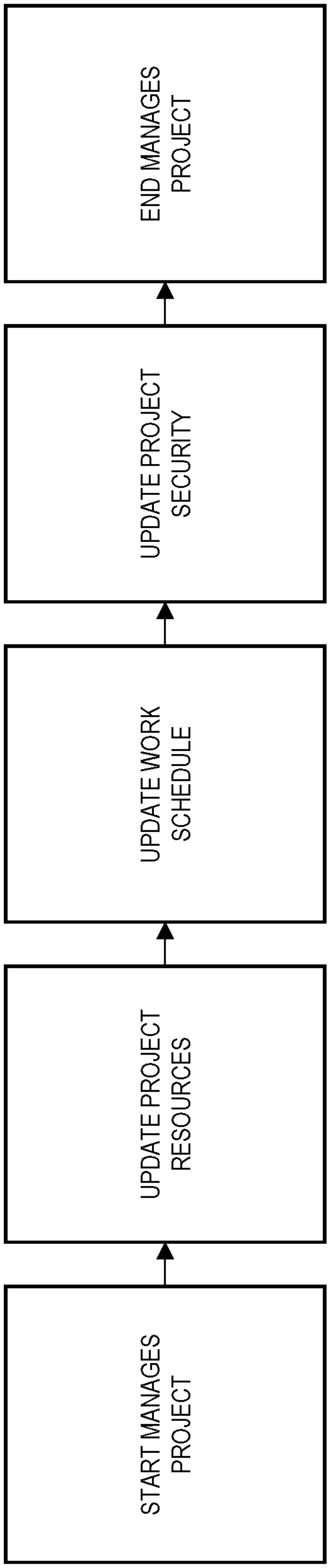
FIG. 3.14

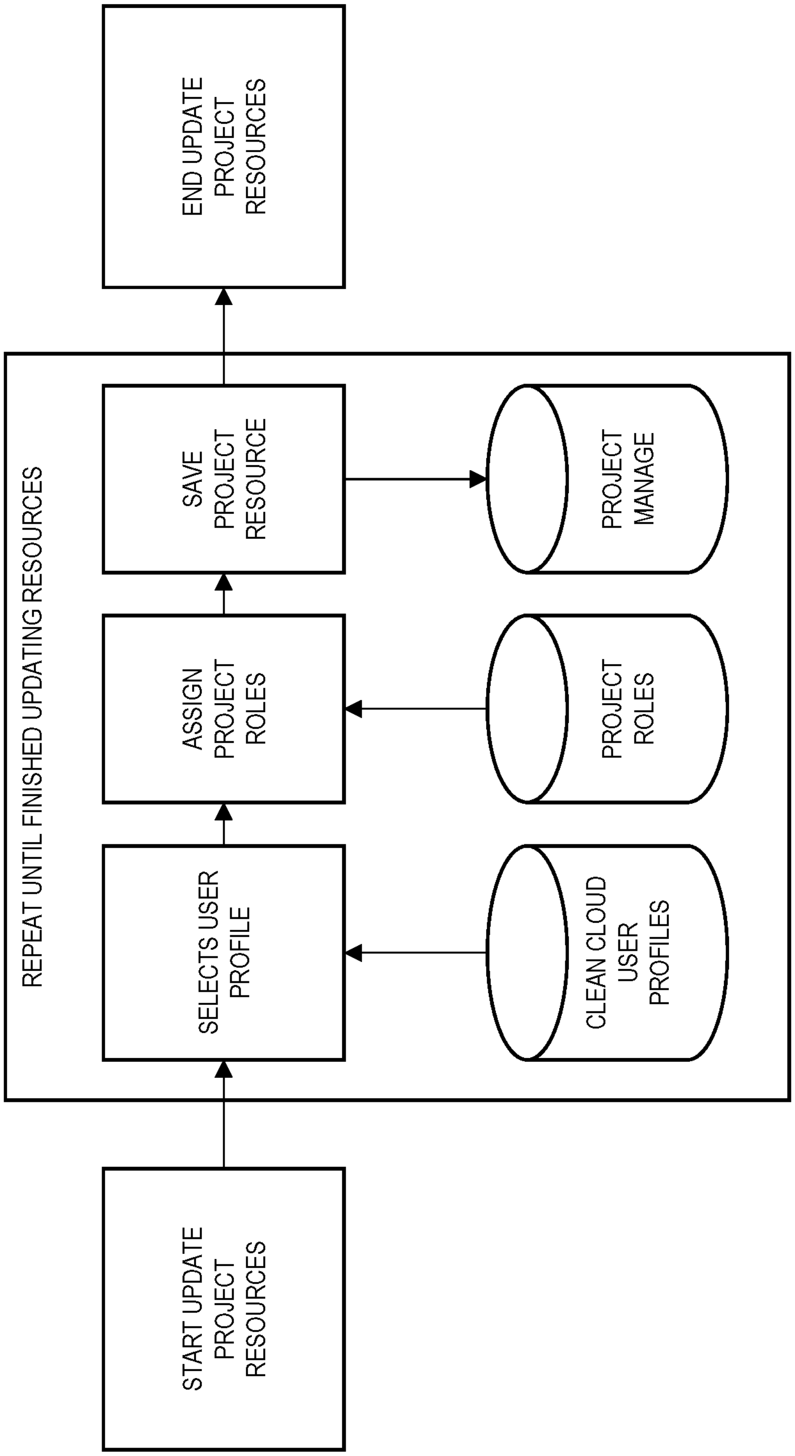
FIG. 3.15

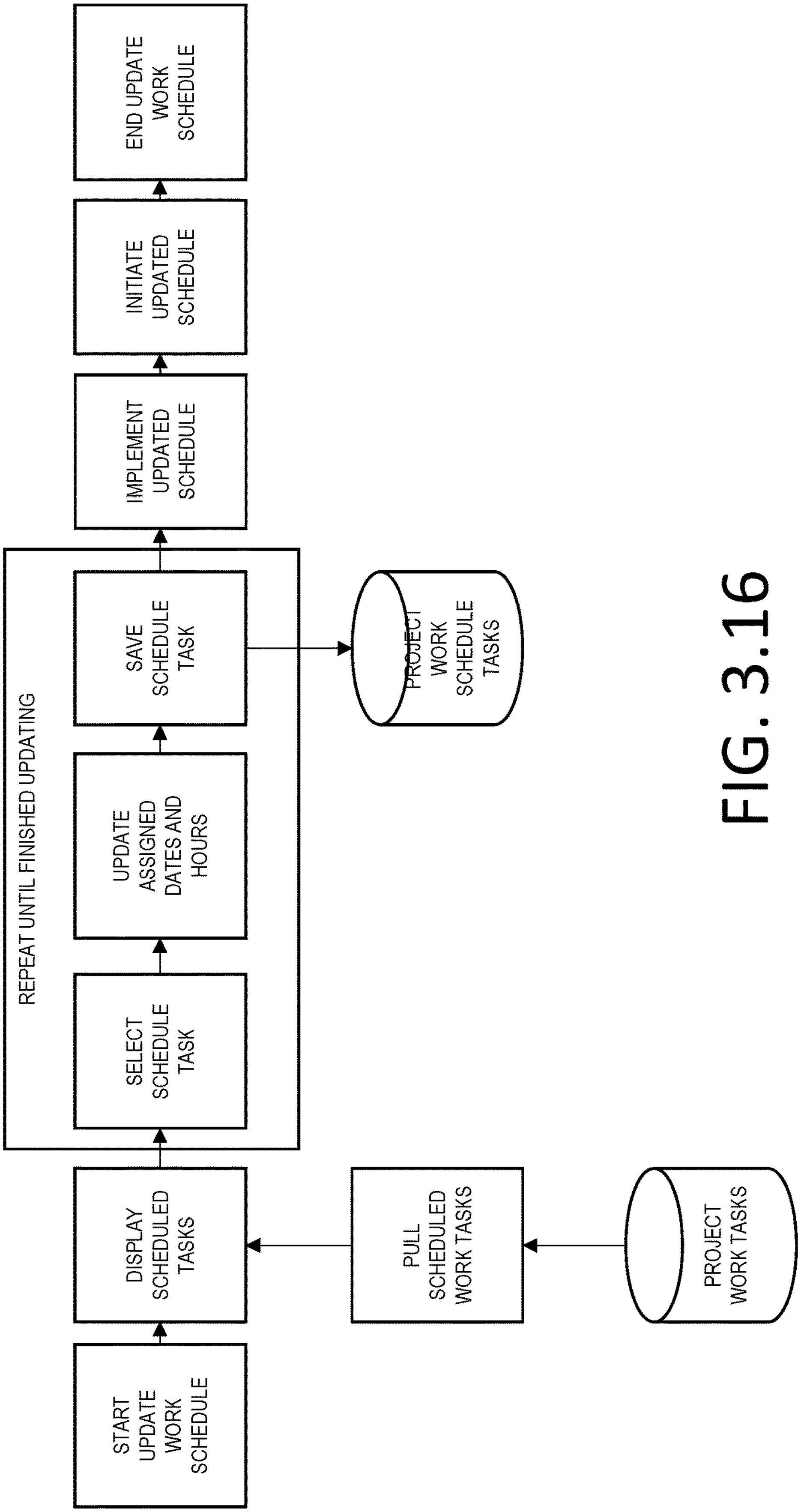
FIG. 3.16

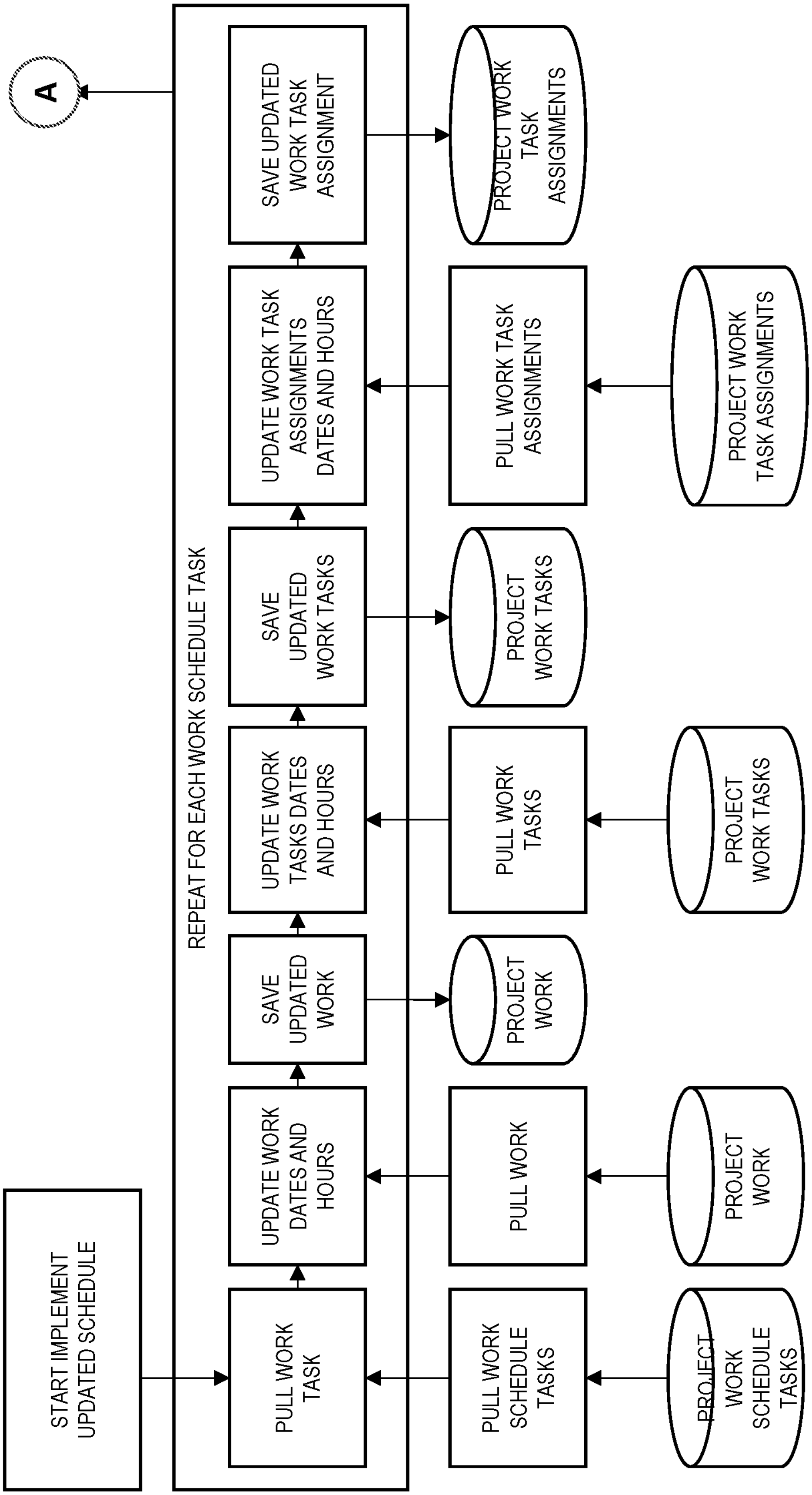
FIG. 3.17A

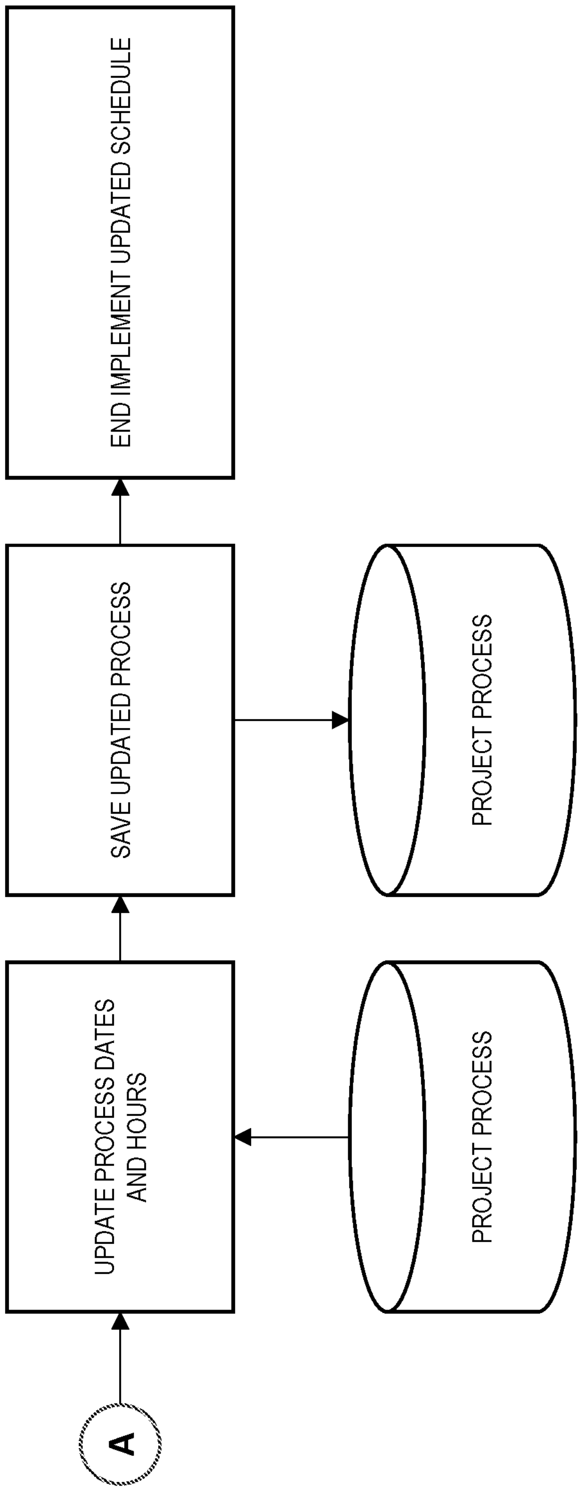
FIG. 3.17B

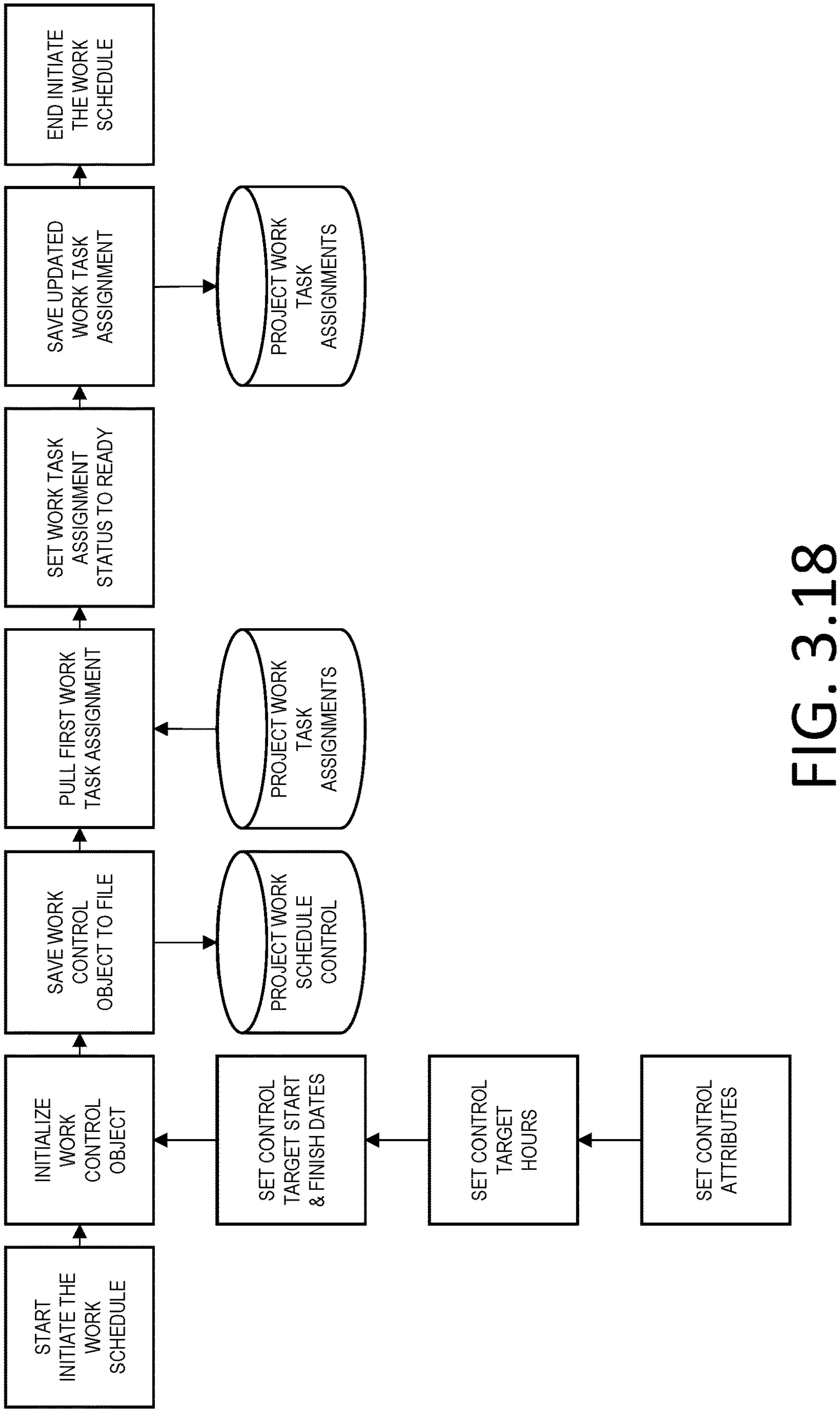
FIG. 3.18

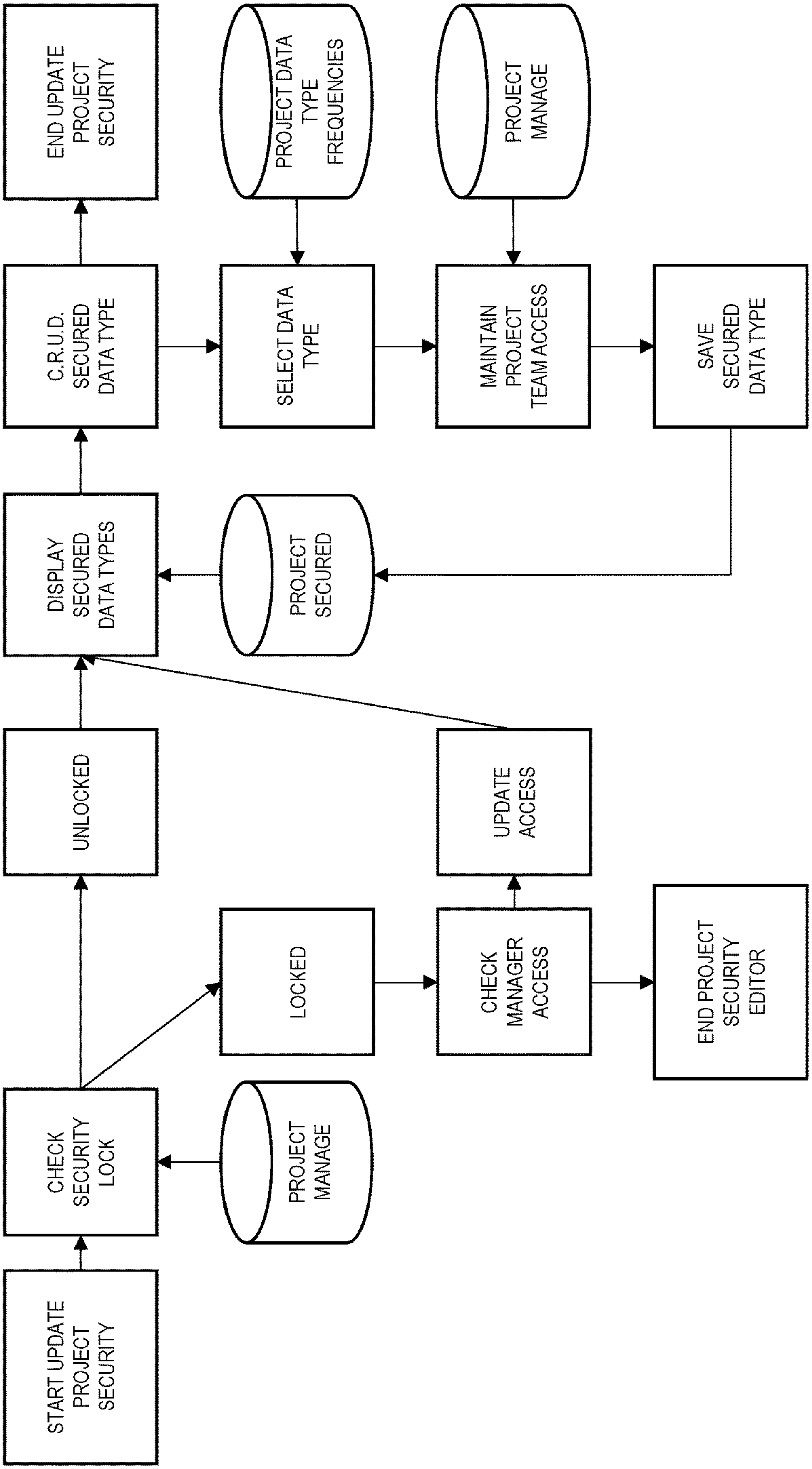

FIG. 3.19

START UPDATE PROJECT SECURITY

CHECK SECURITY LOCK

PROJECT MANAGE

UNLOCKED

LOCKED

CHECK MANAGER ACCESS

UPDATE ACCESS

END PROJECT SECURITY EDITOR

DISPLAY SECURED DATA TYPES

PROJECT SECURED

C.R.U.D. SECURED DATA TYPE

SELECT DATA TYPE

MAINTAIN PROJECT TEAM ACCESS

SAVE SECURED DATA TYPE

END UPDATE PROJECT SECURITY

PROJECT DATA TYPE FREQUENCIES

PROJECT MANAGE

FIG. 3.19

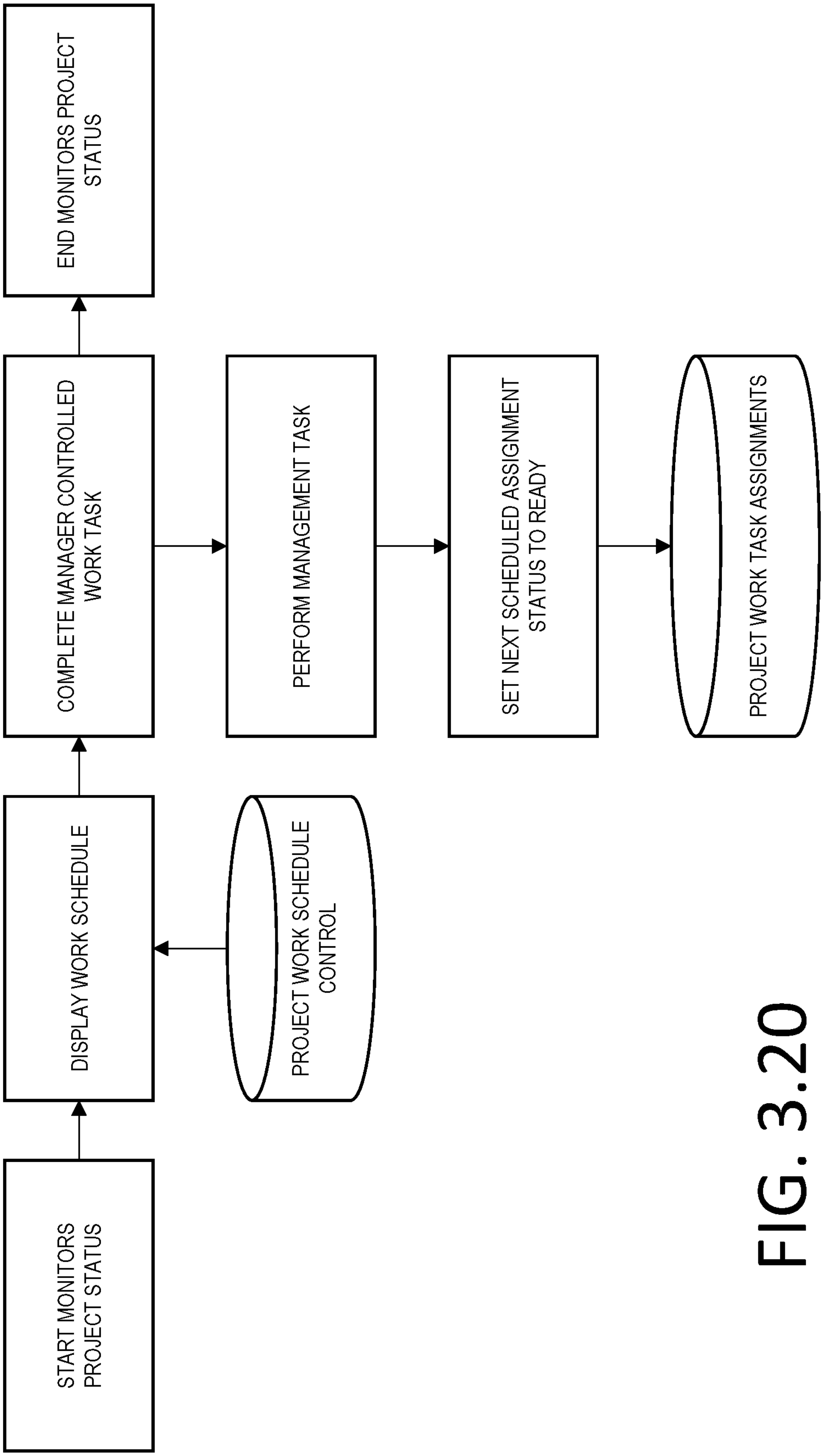
FIG. 3.20

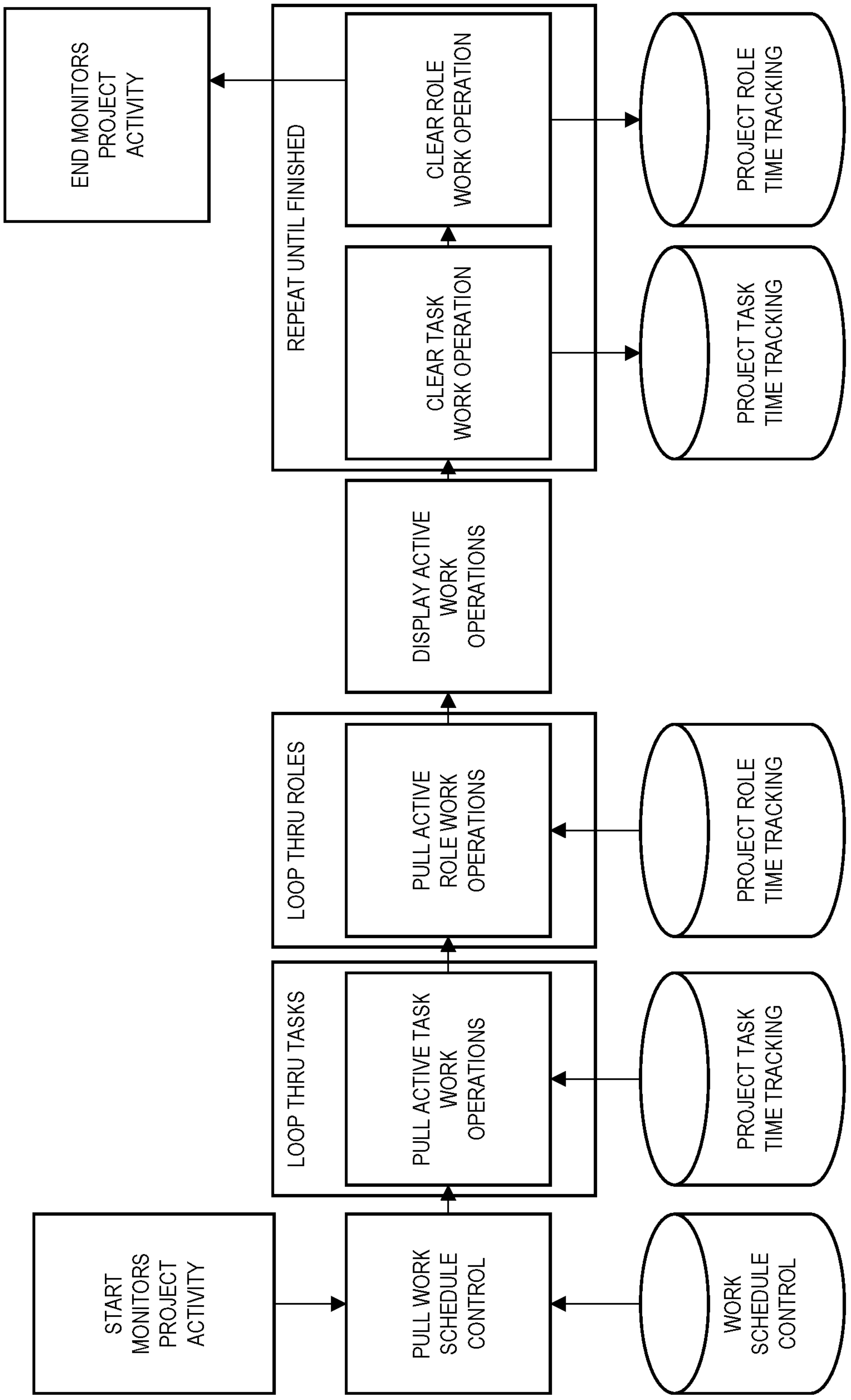
FIG. 3.21

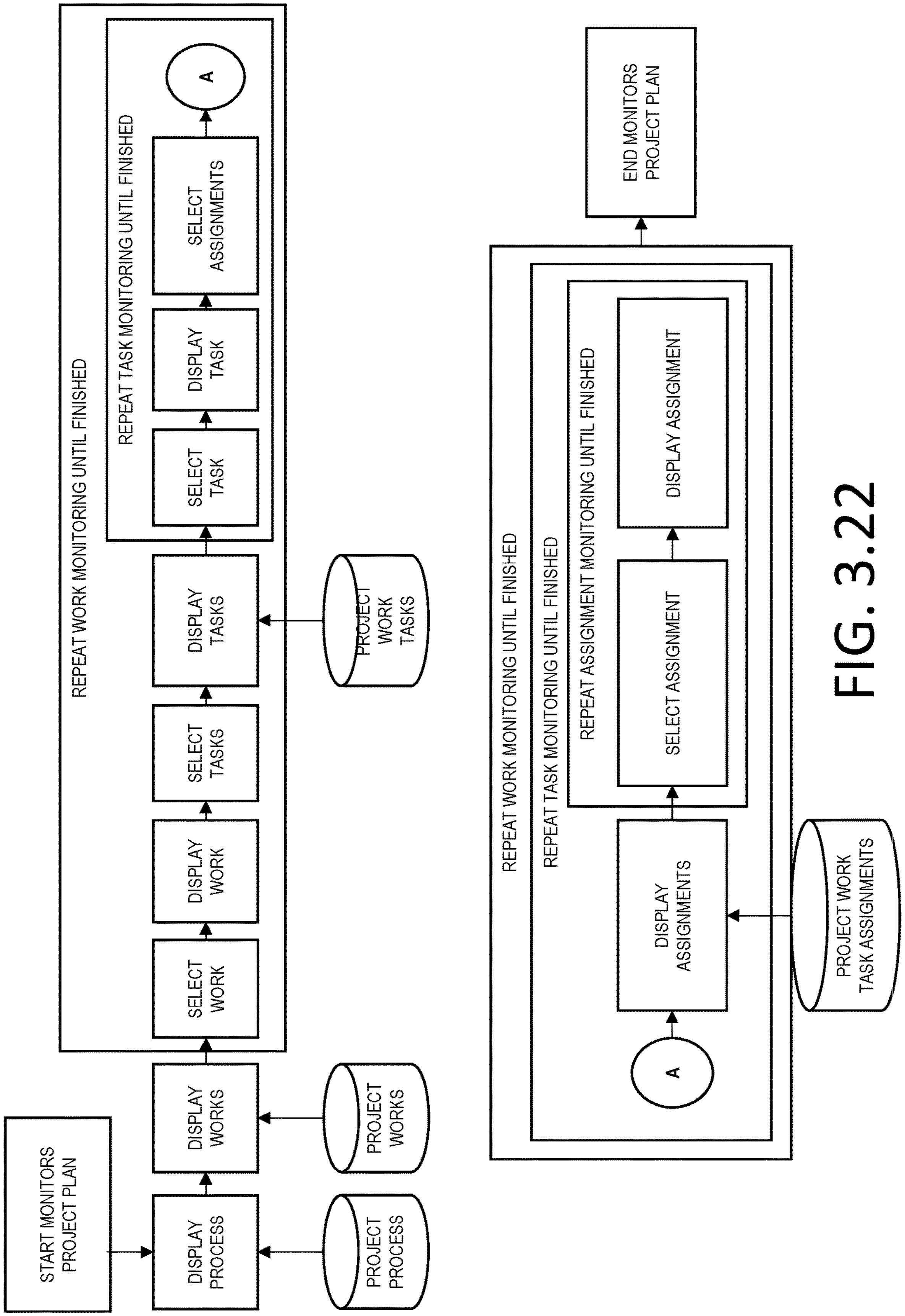
FIG. 3.22

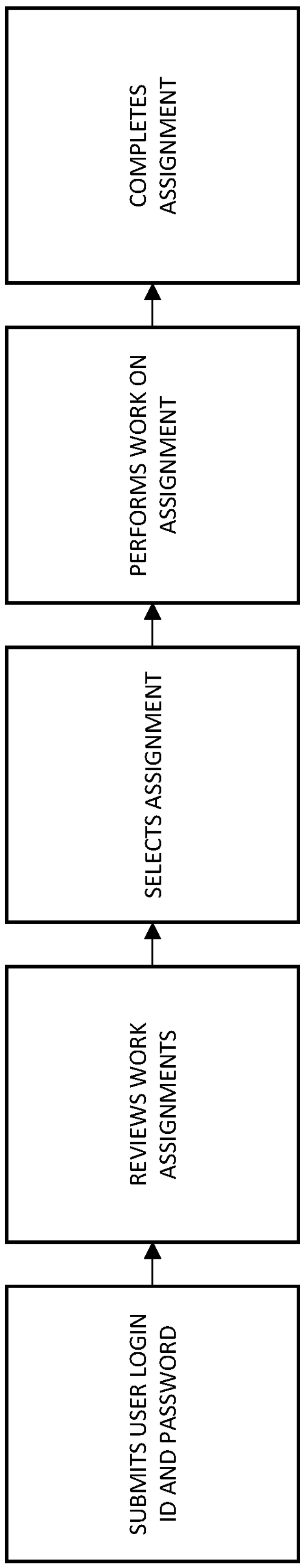
FIG. 3.23

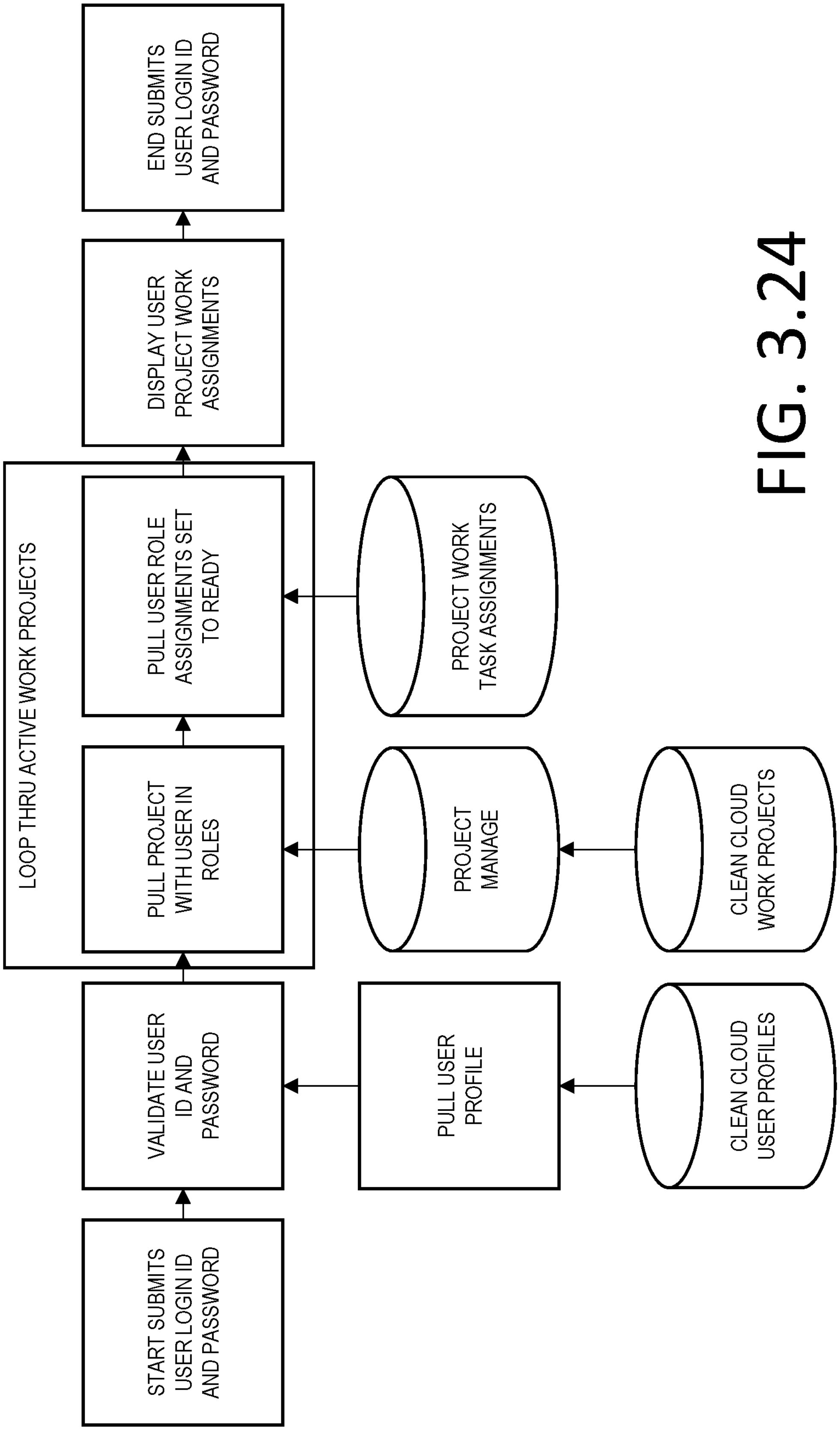
FIG. 3.24

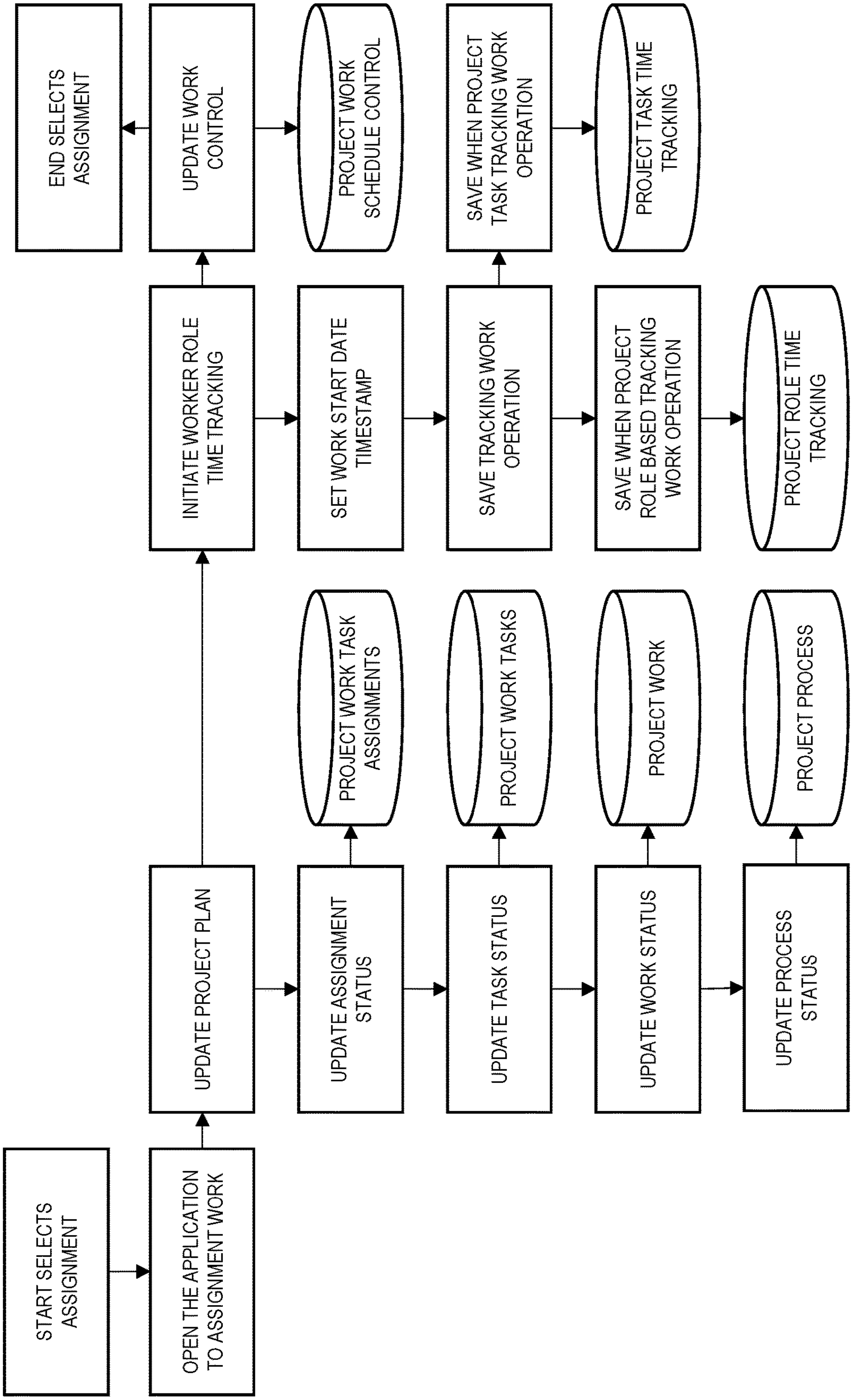
FIG. 3.25

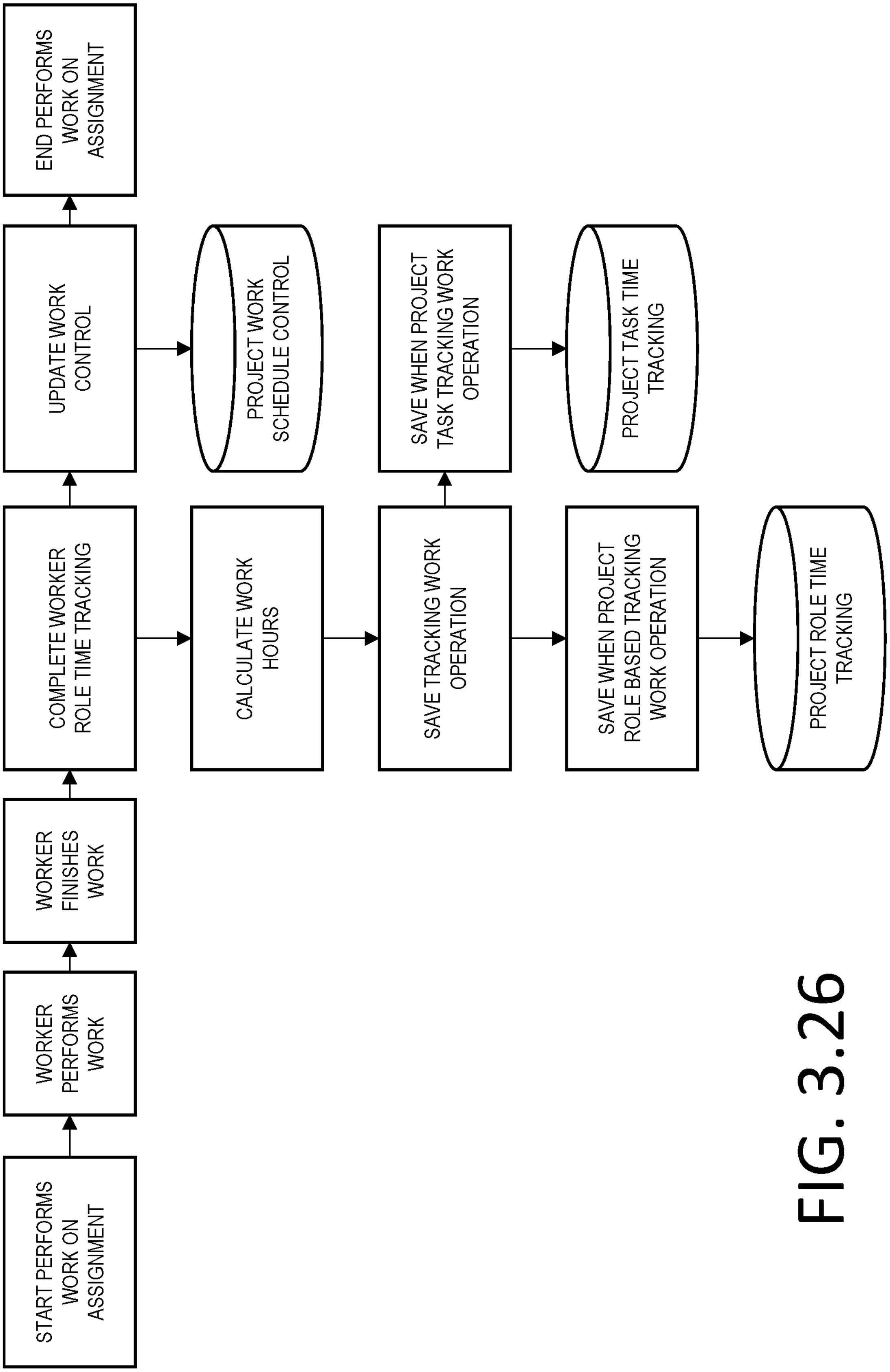
FIG. 3.26

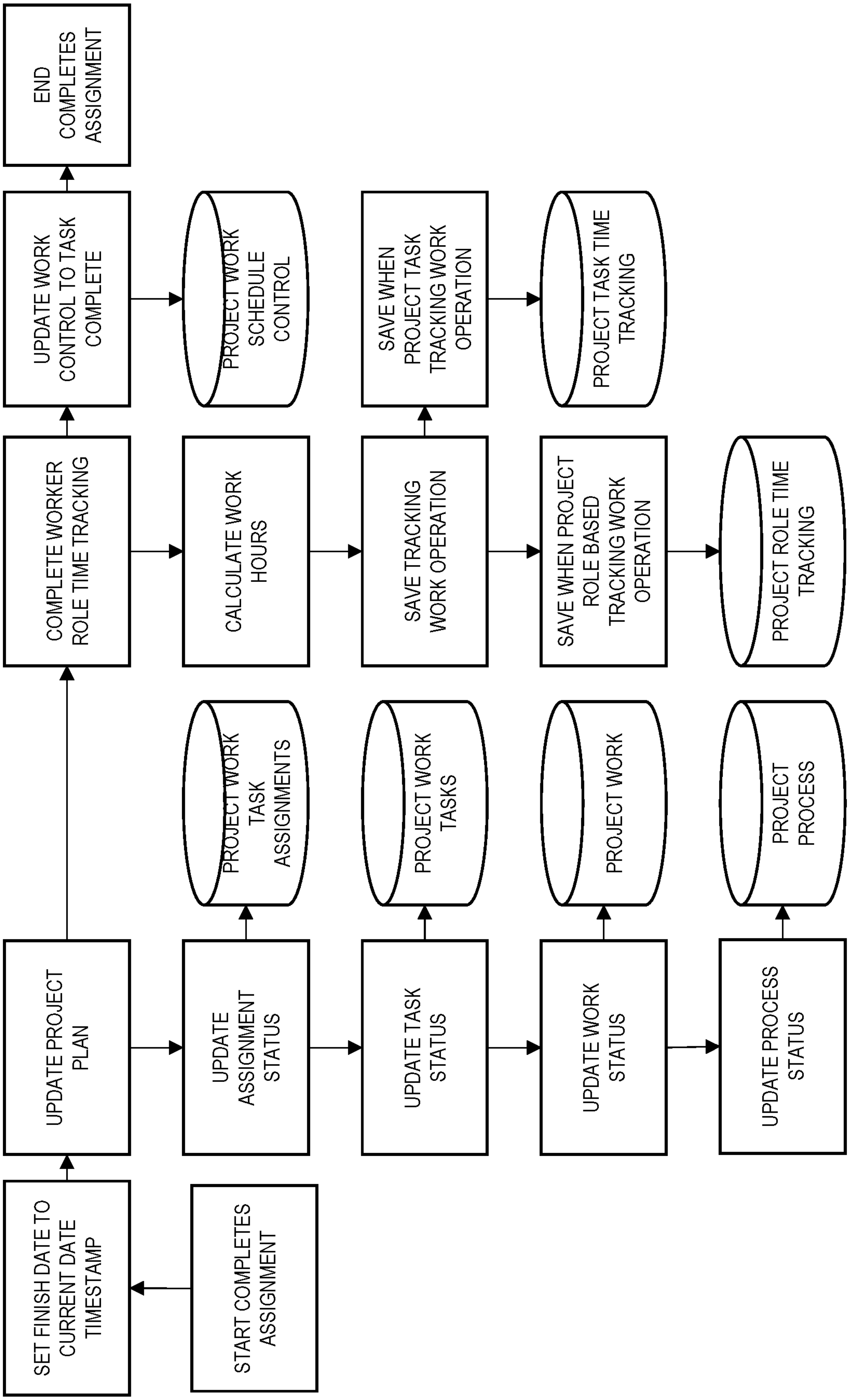
FIG. 3.27

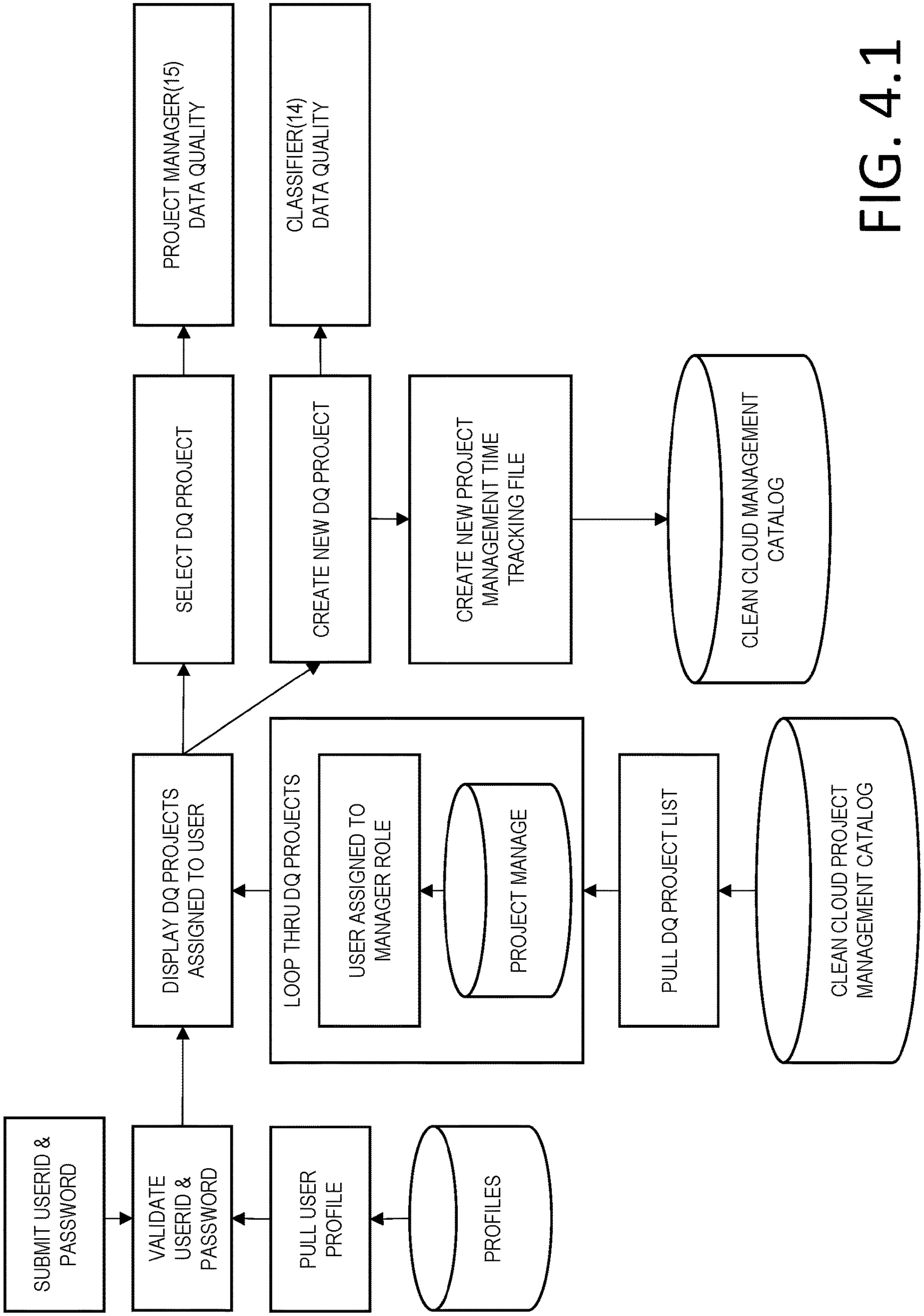
FIG. 4.1

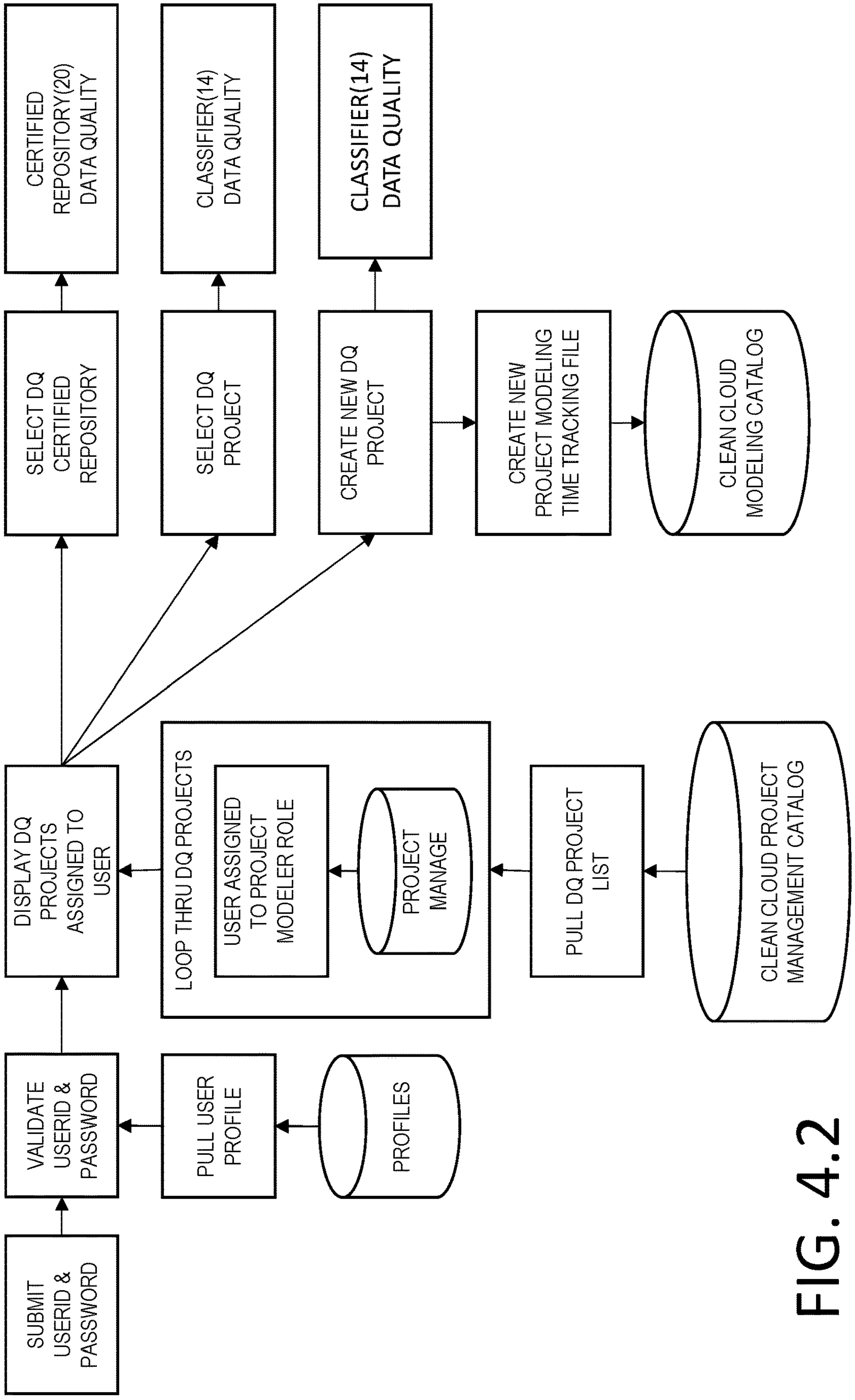
FIG. 4.2

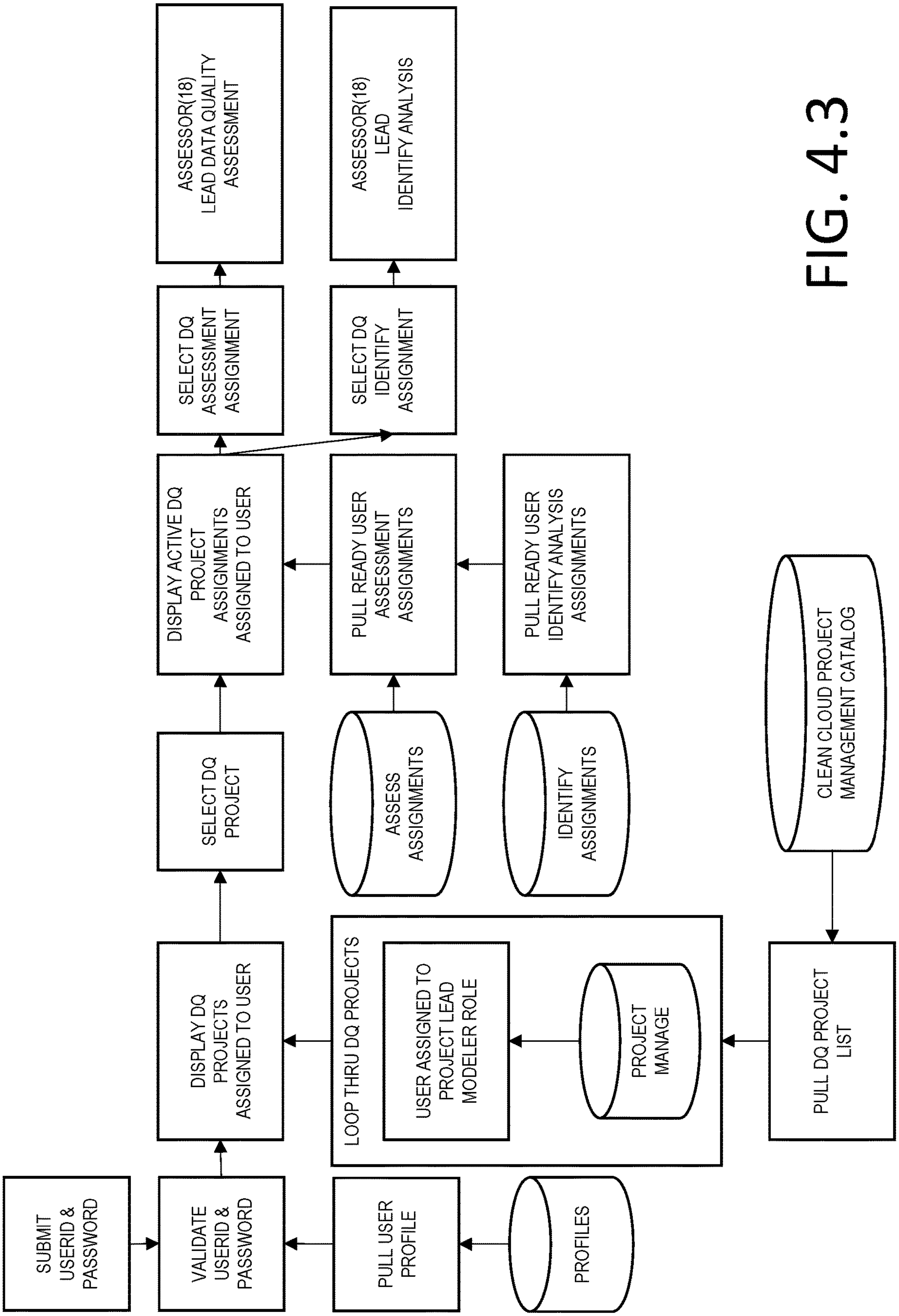
FIG. 4.3

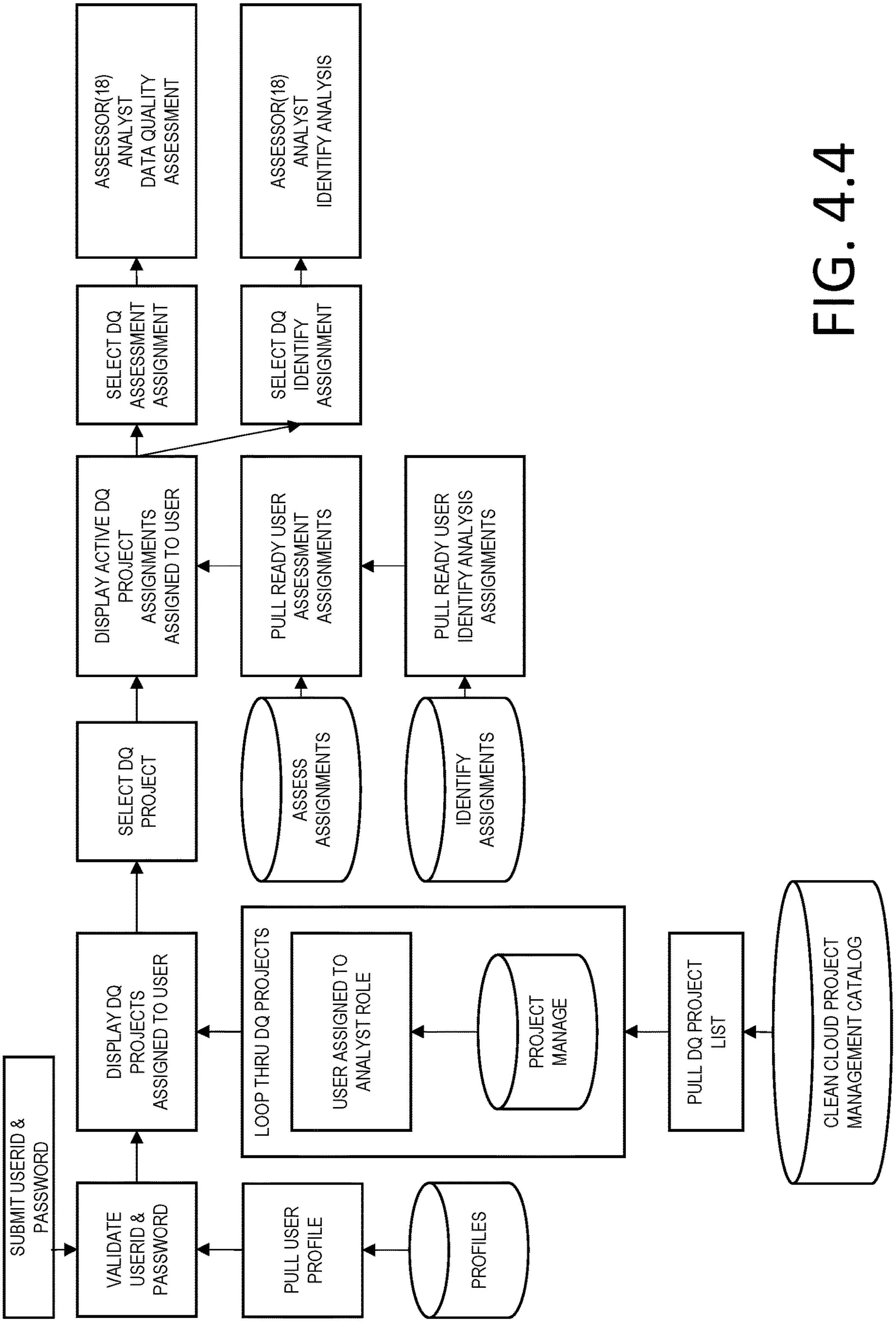
FIG. 4.4

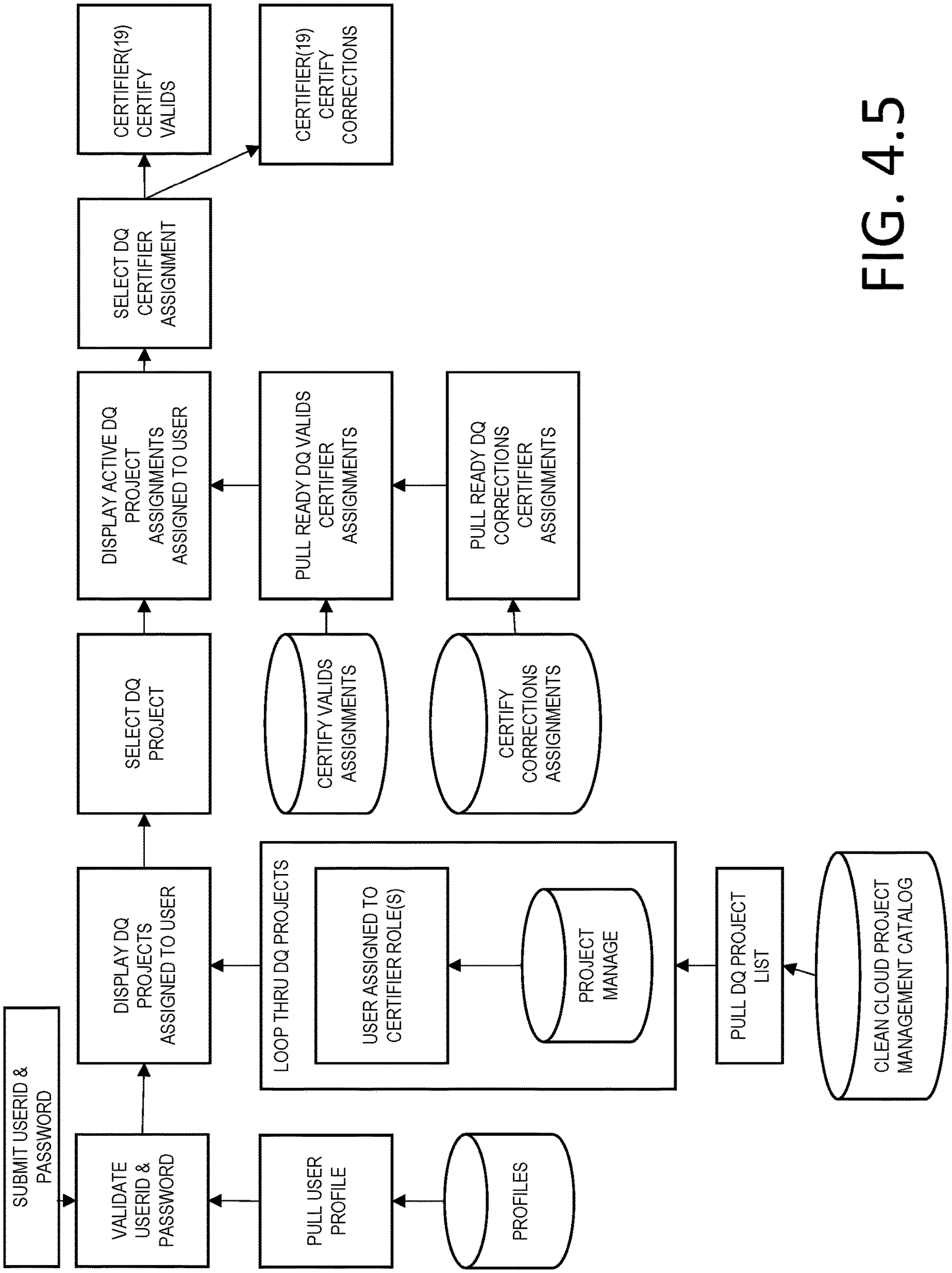
FIG. 4.5

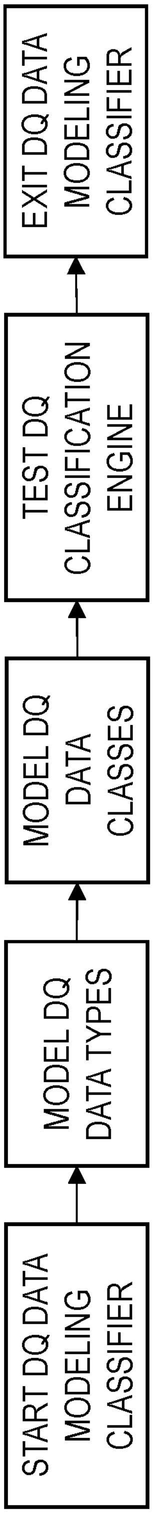
FIG. 5.1
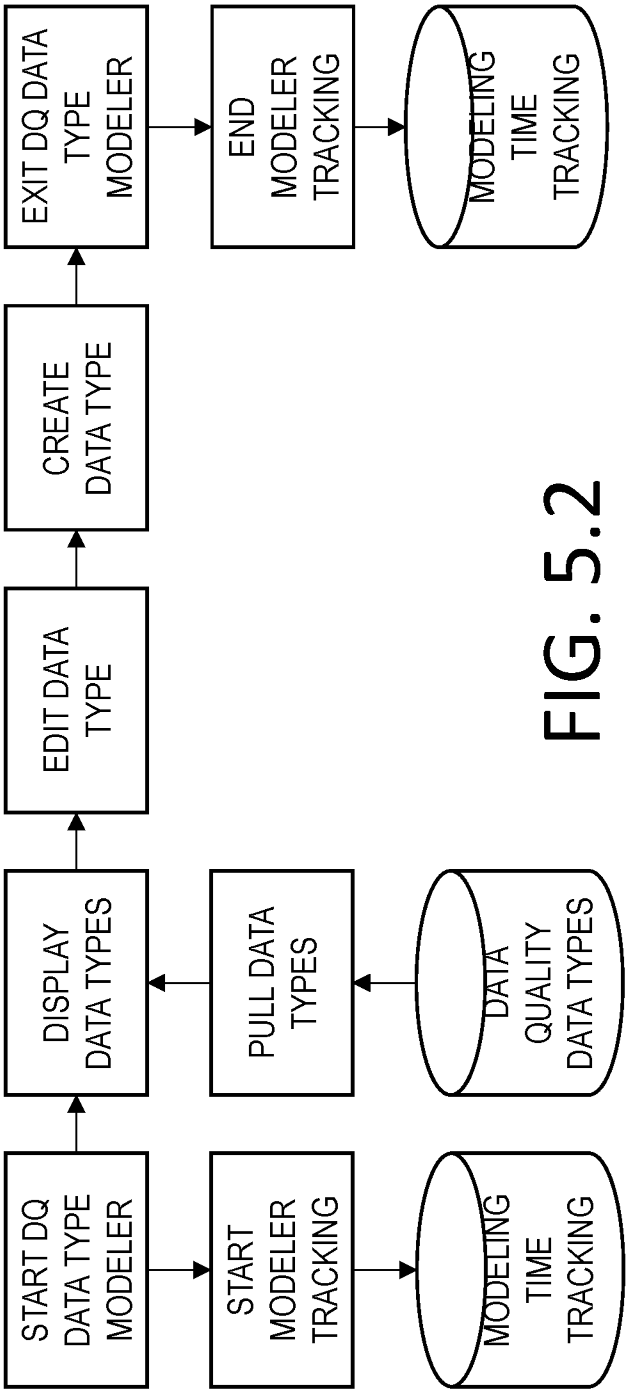
FIG. 5.2

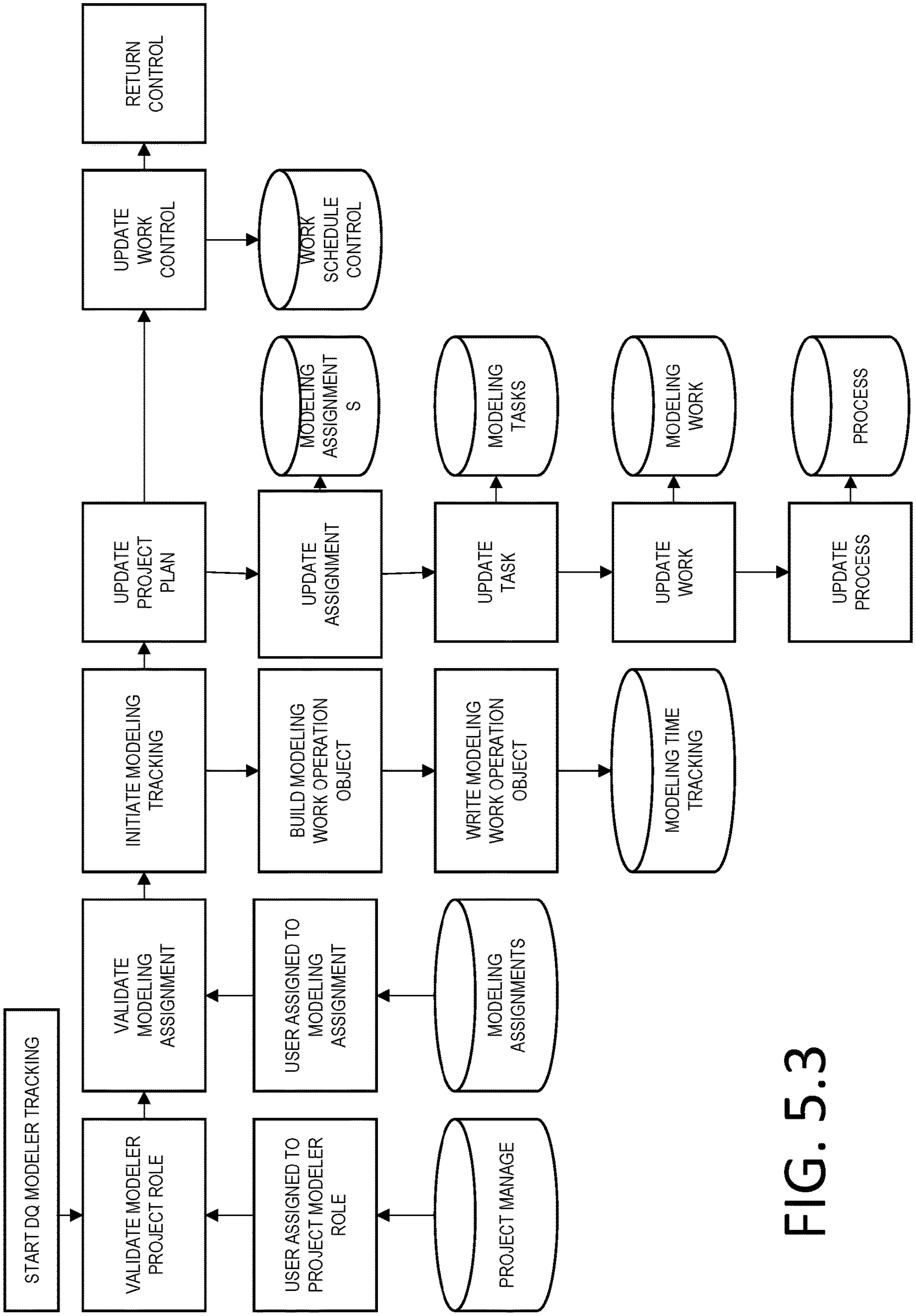
FIG. 5.3

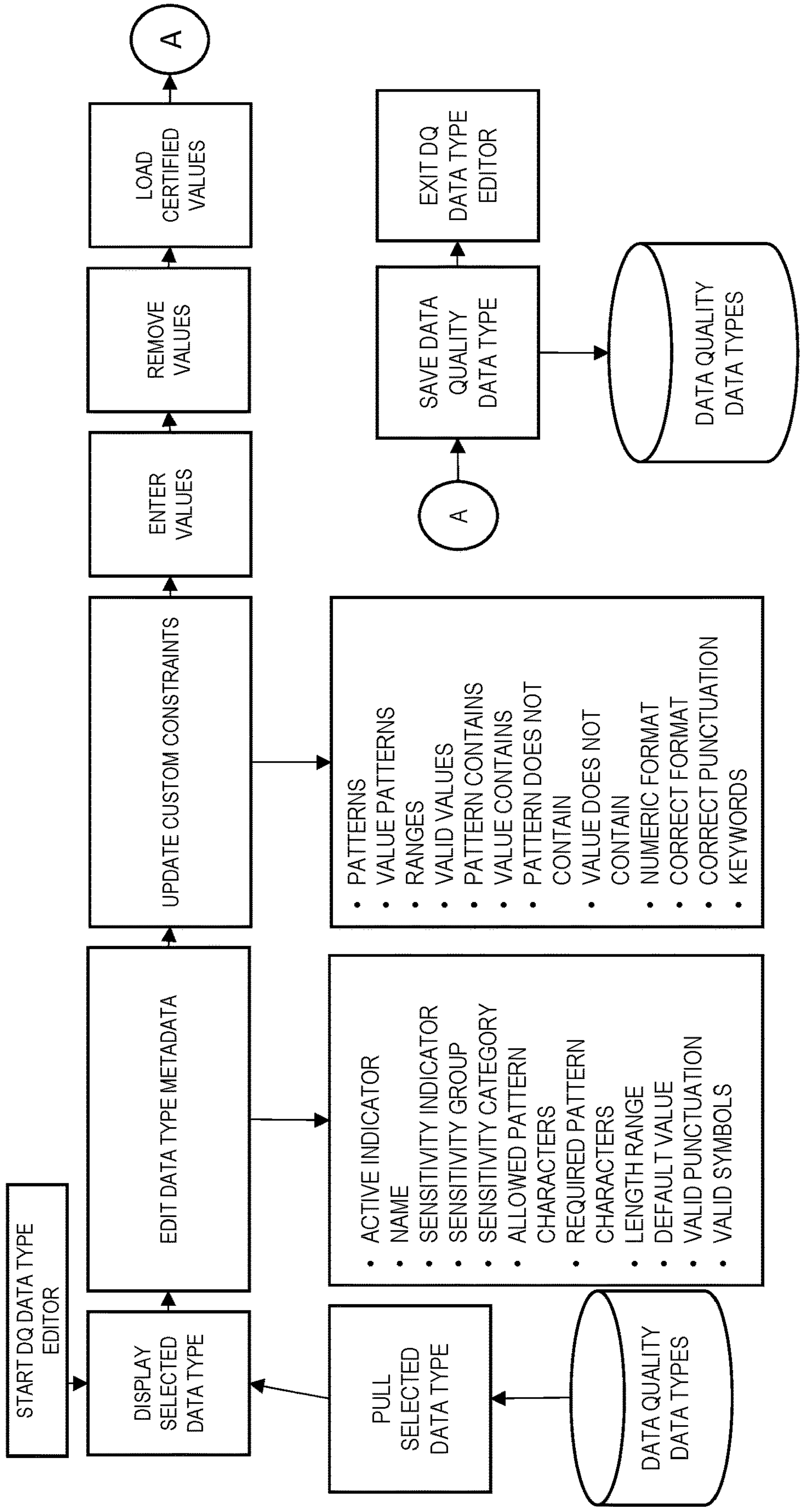
FIG. 5.4

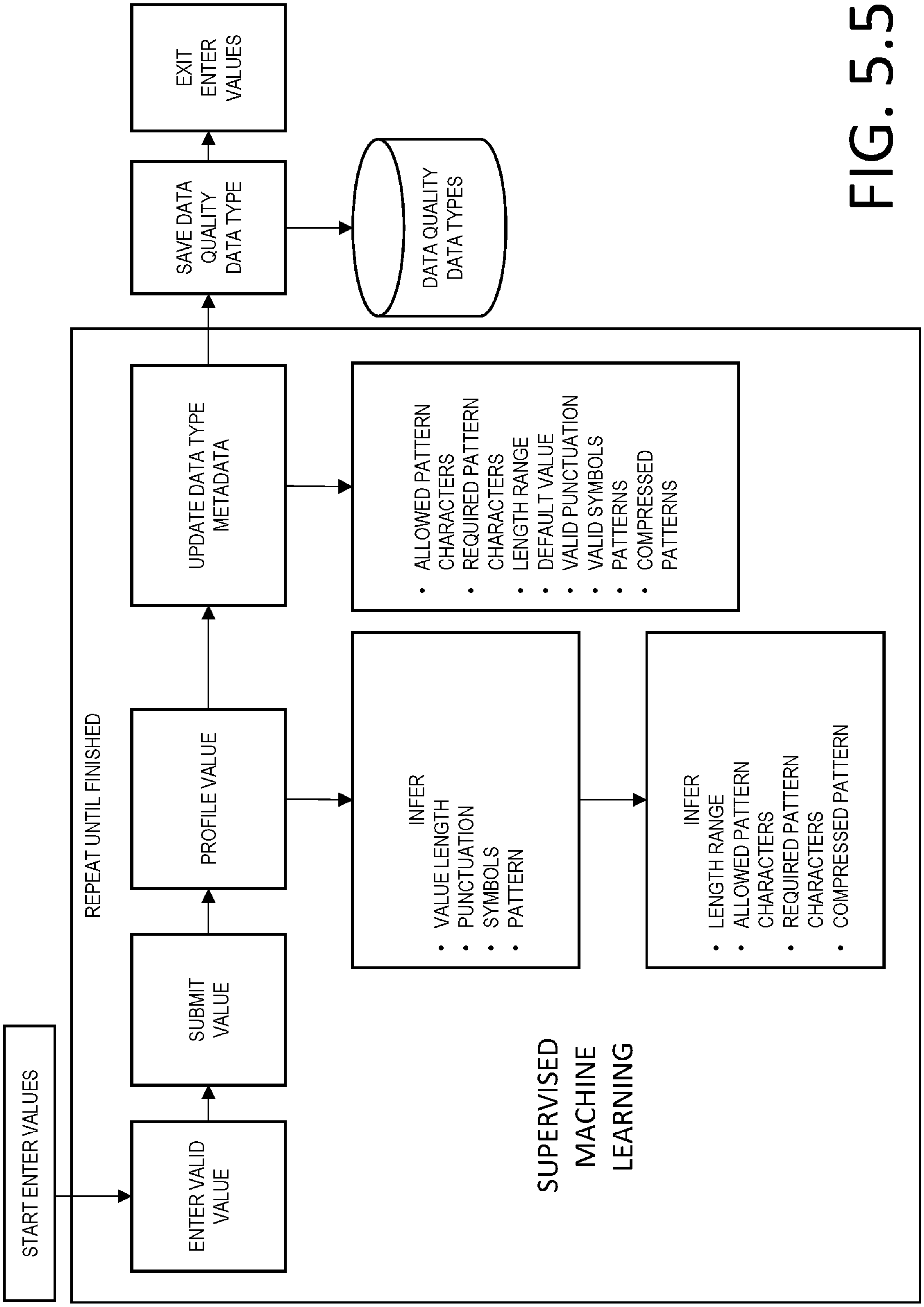
FIG. 5.5

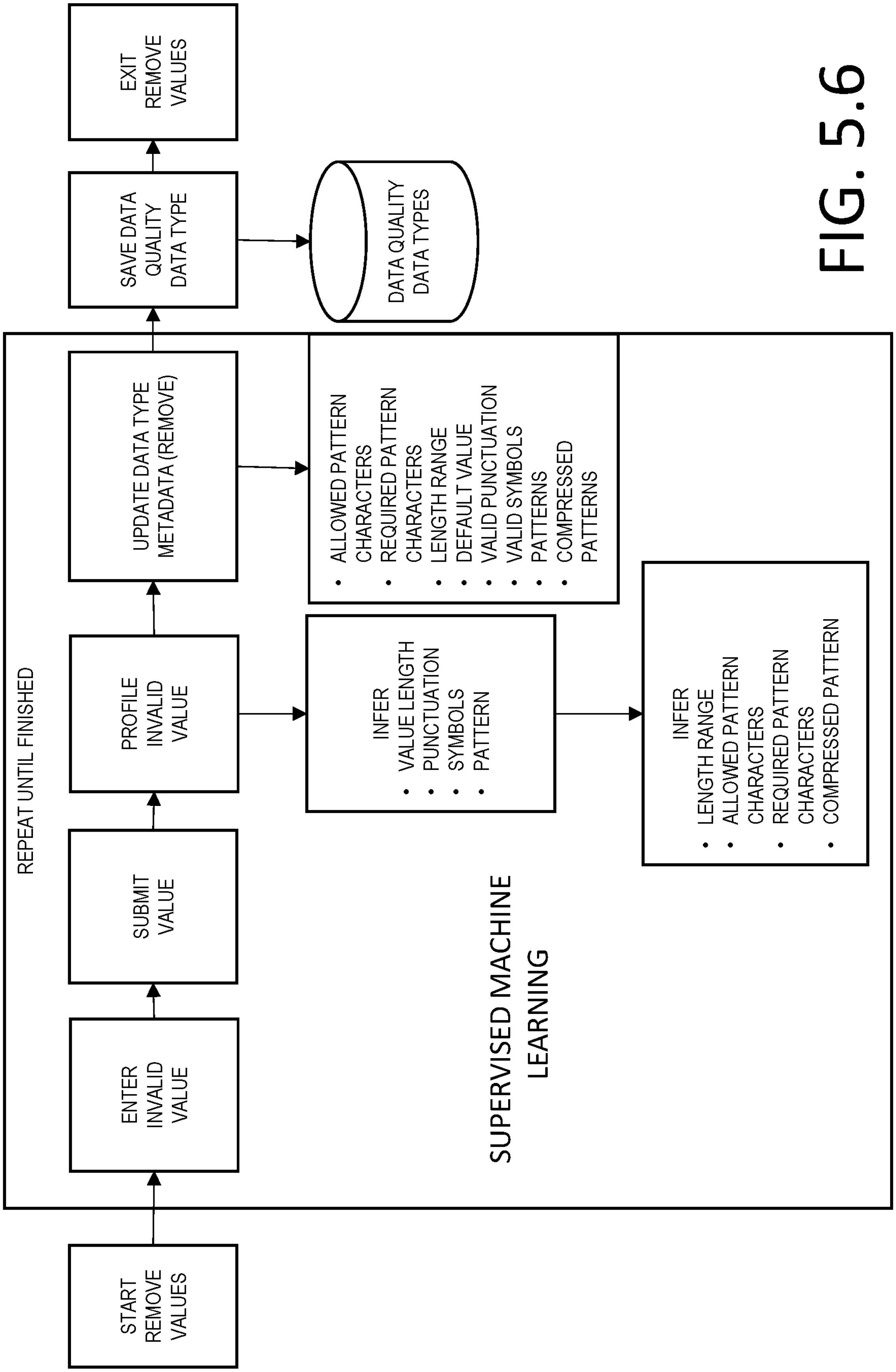
FIG. 5.6

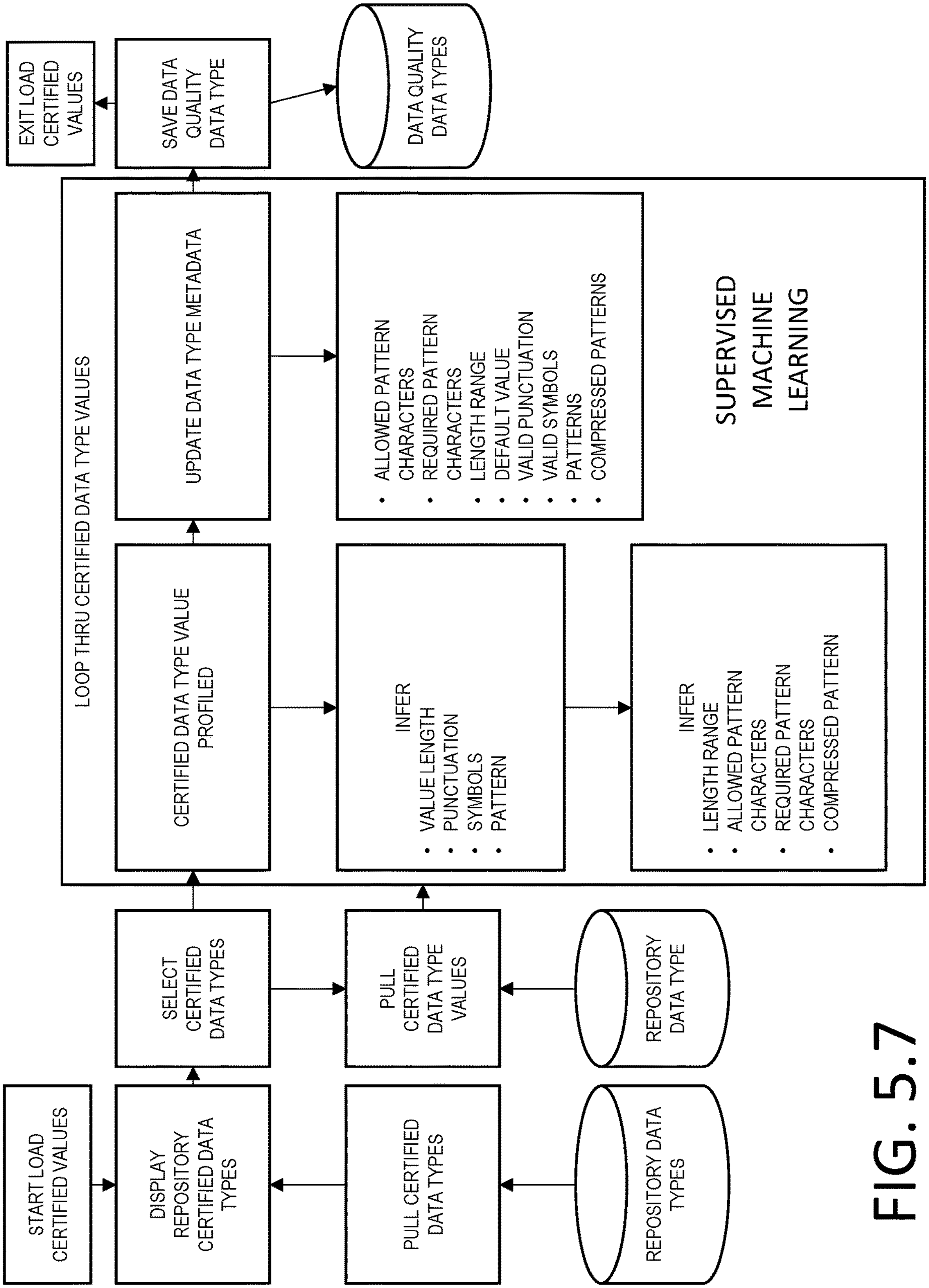
FIG. 5.7

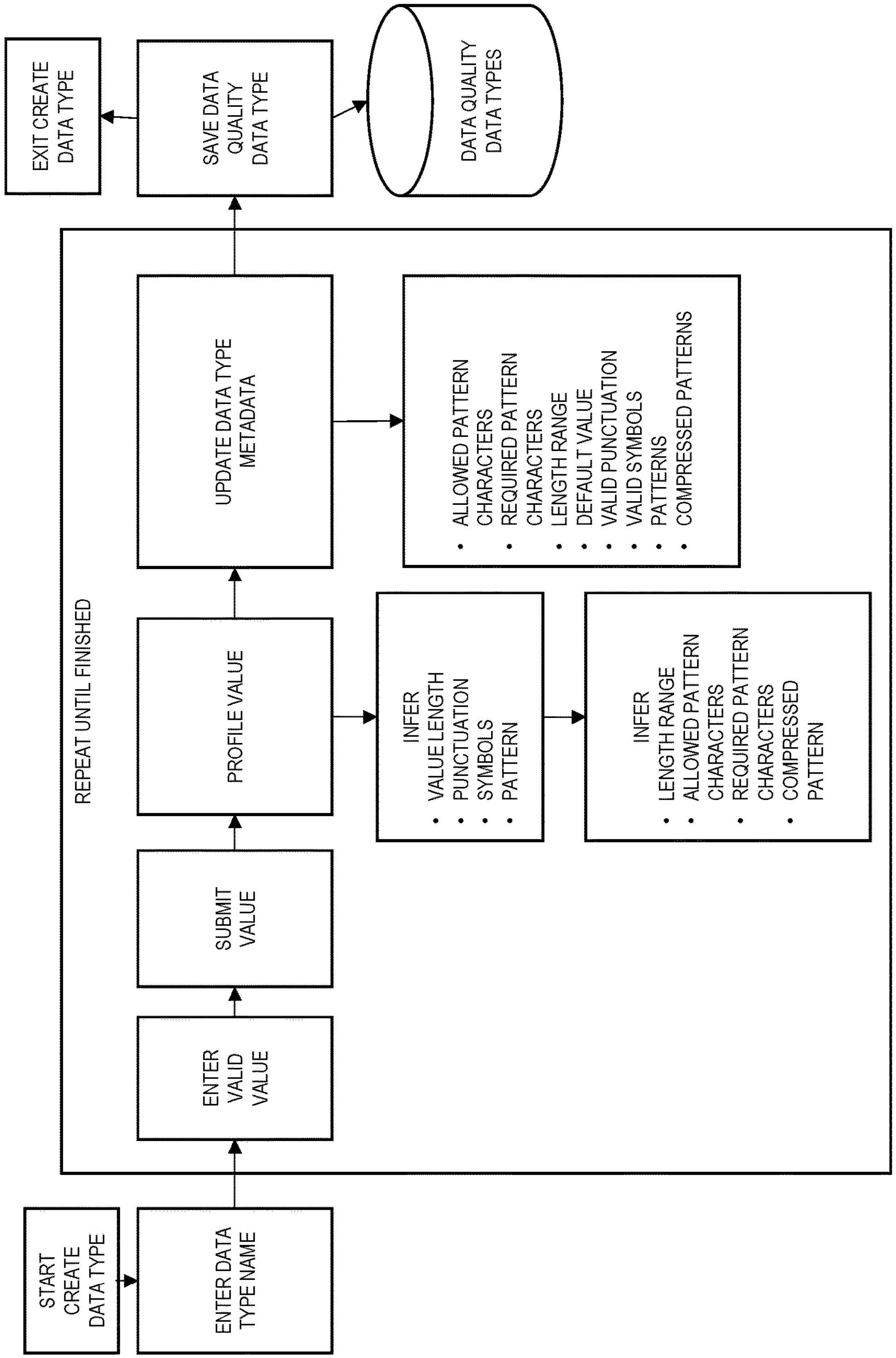
FIG. 5.8

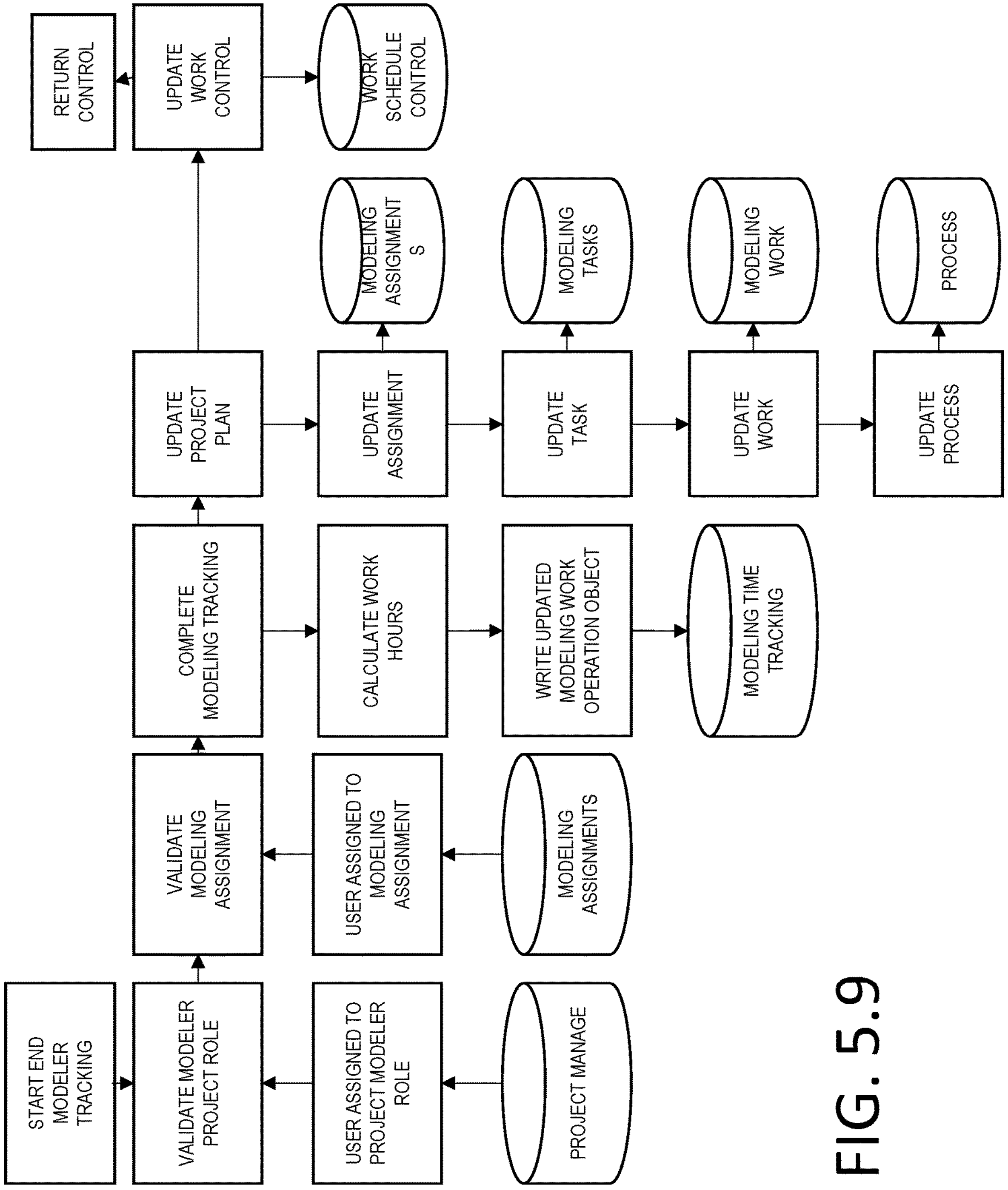
FIG. 5.9

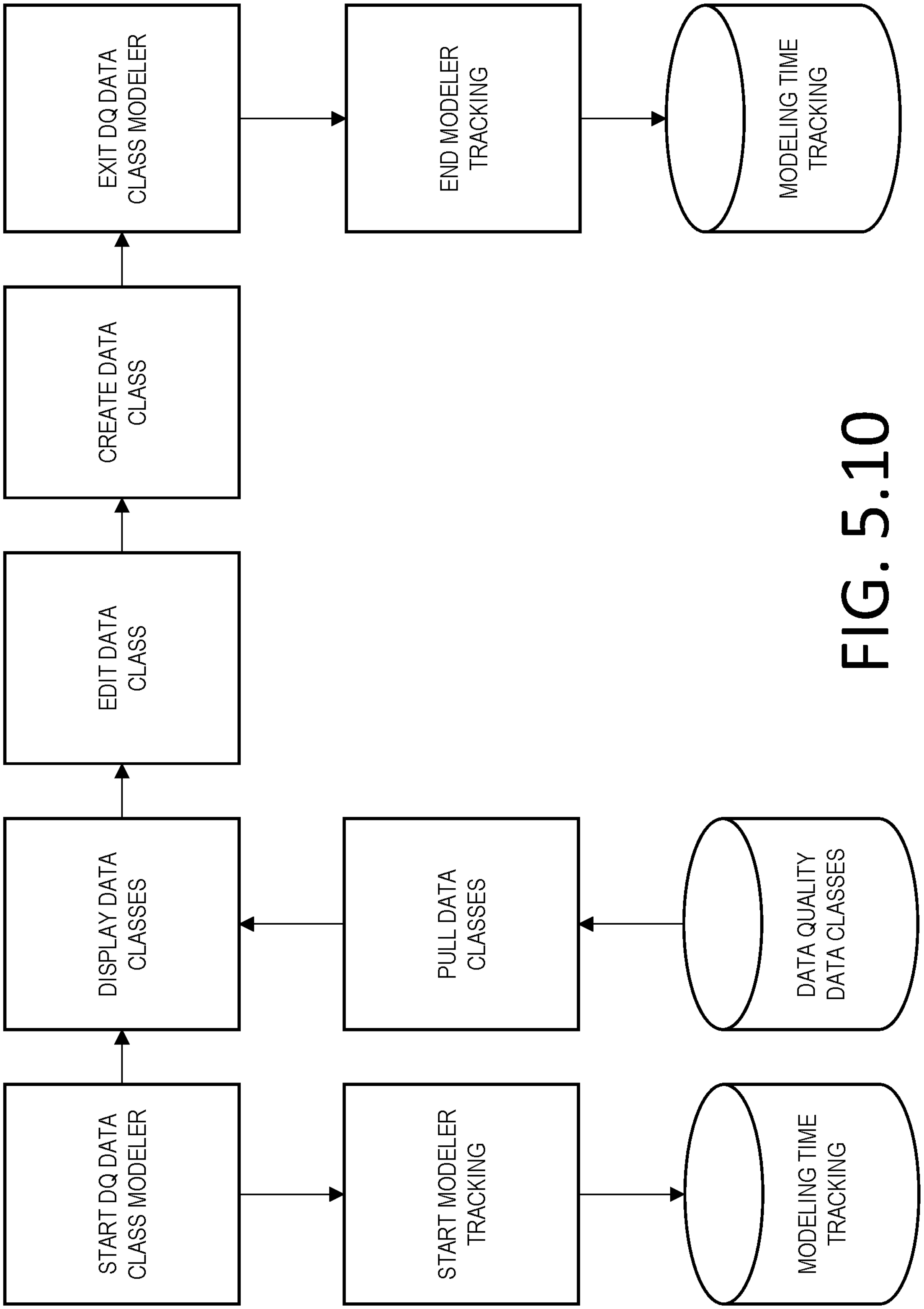
FIG. 5.10

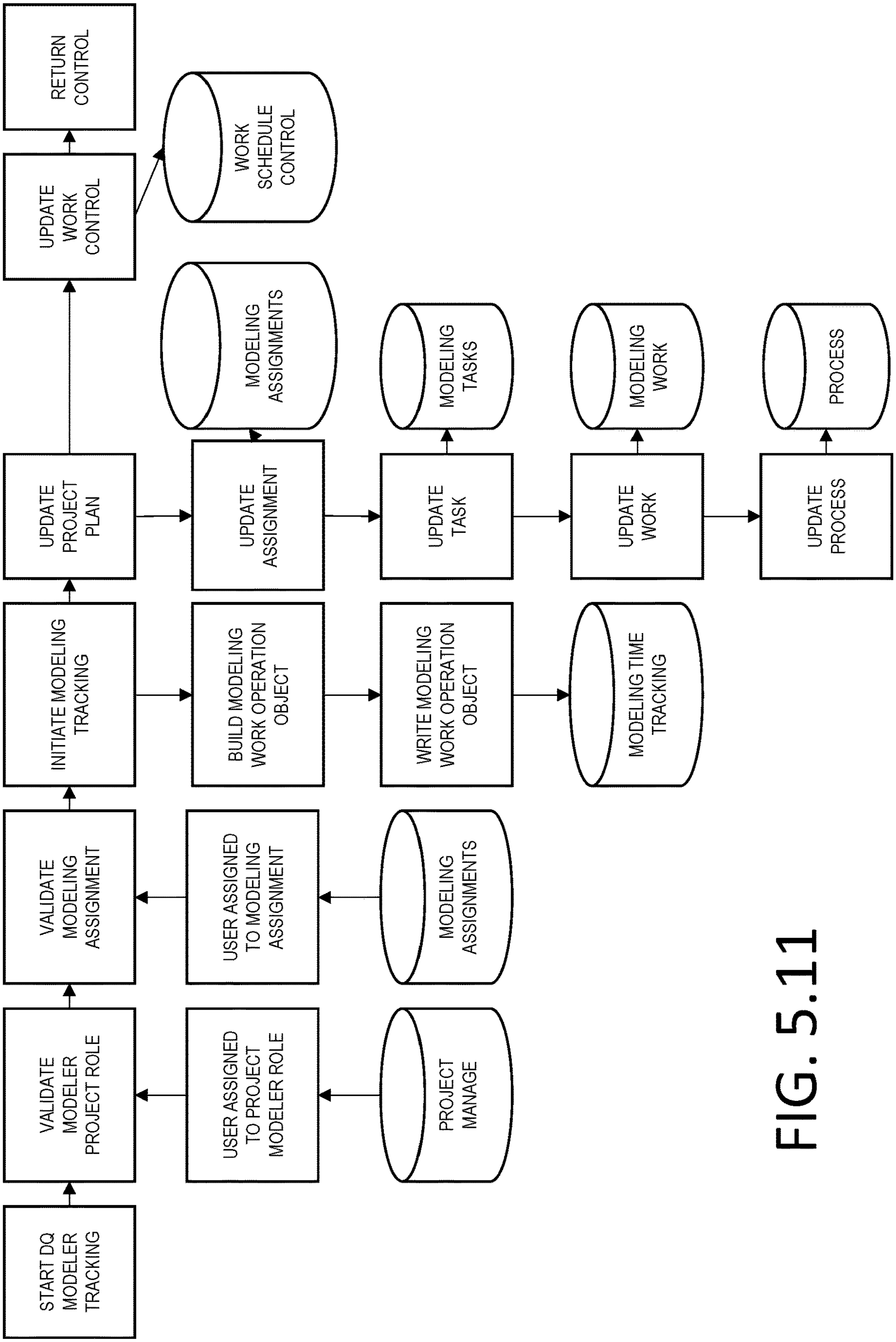
FIG. 5.11

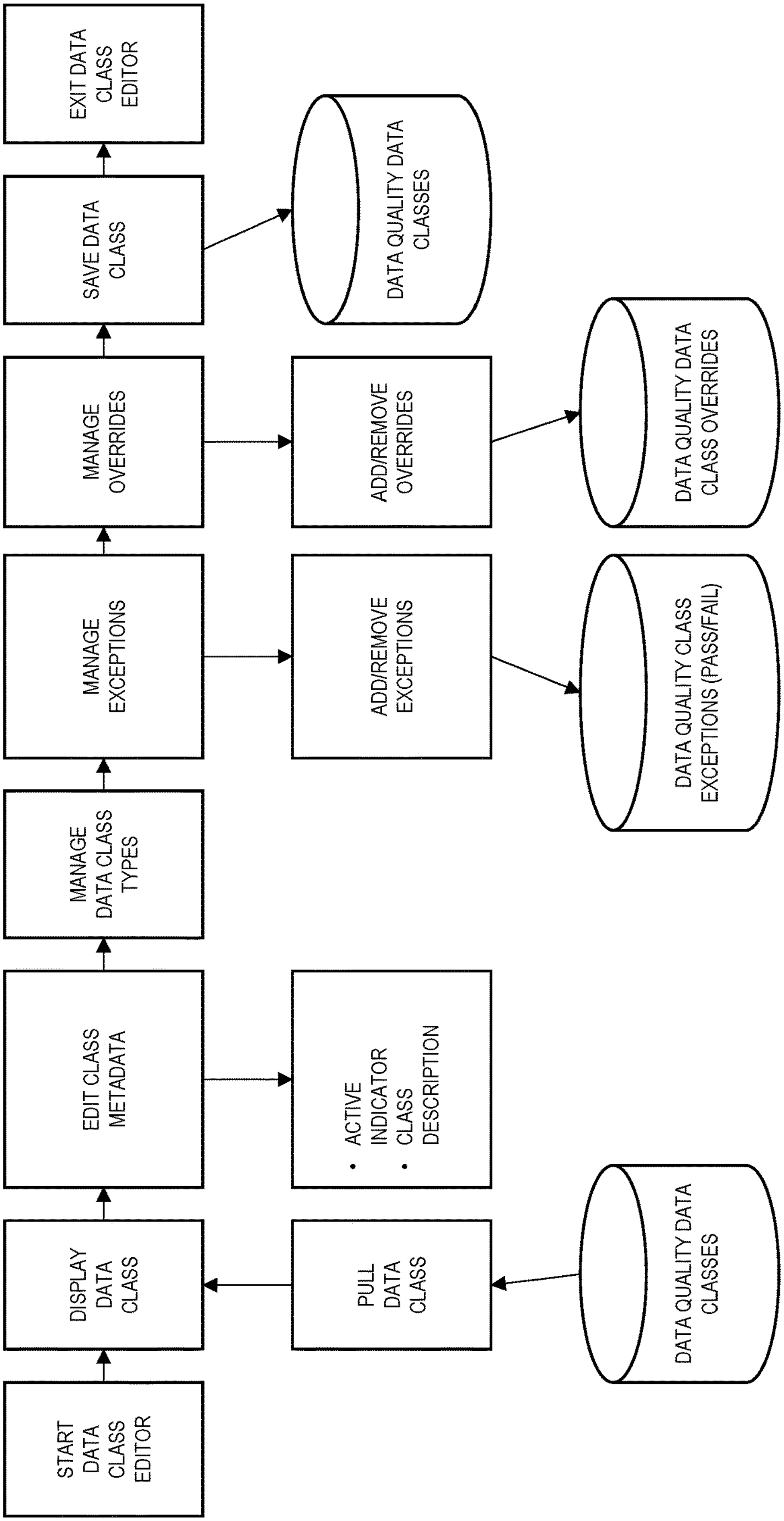
FIG. 5.12

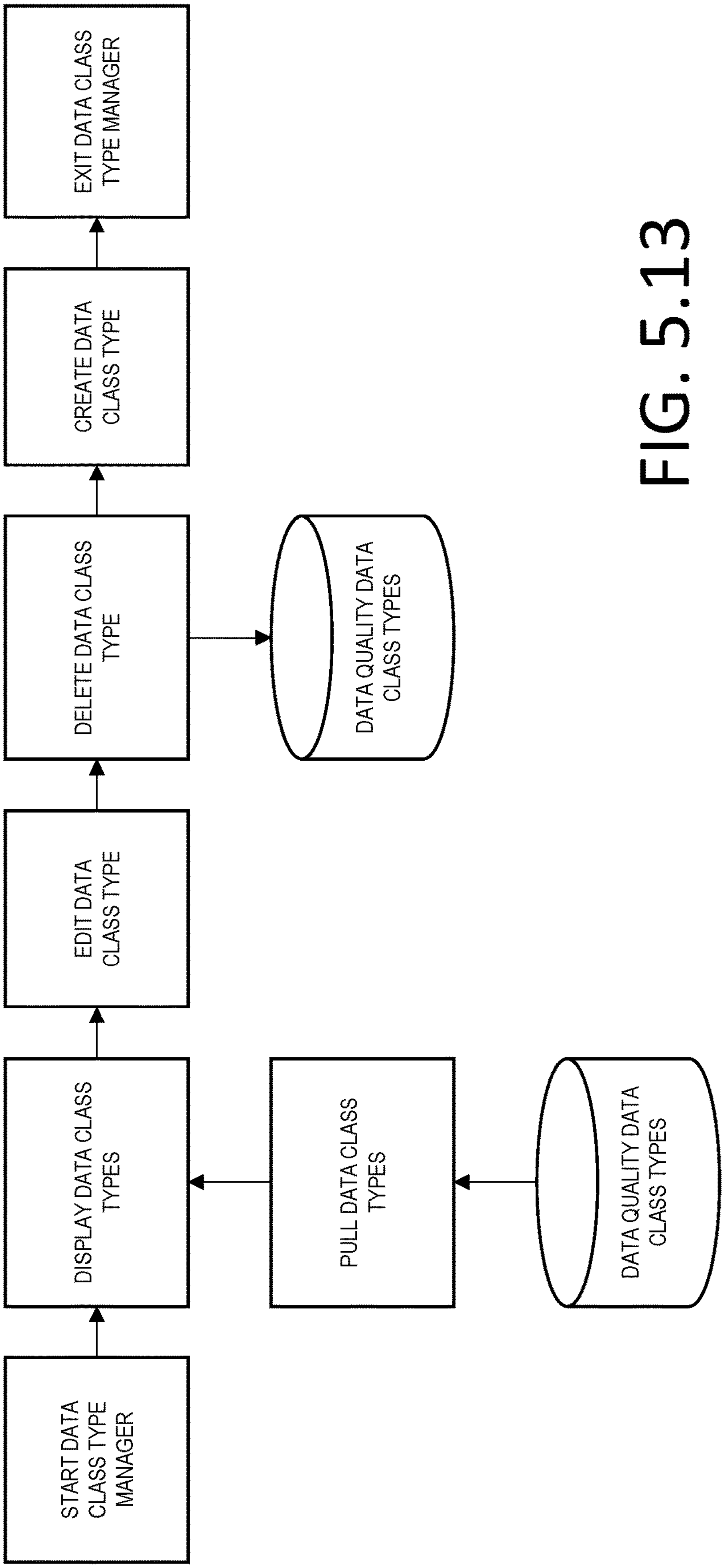
FIG. 5.13

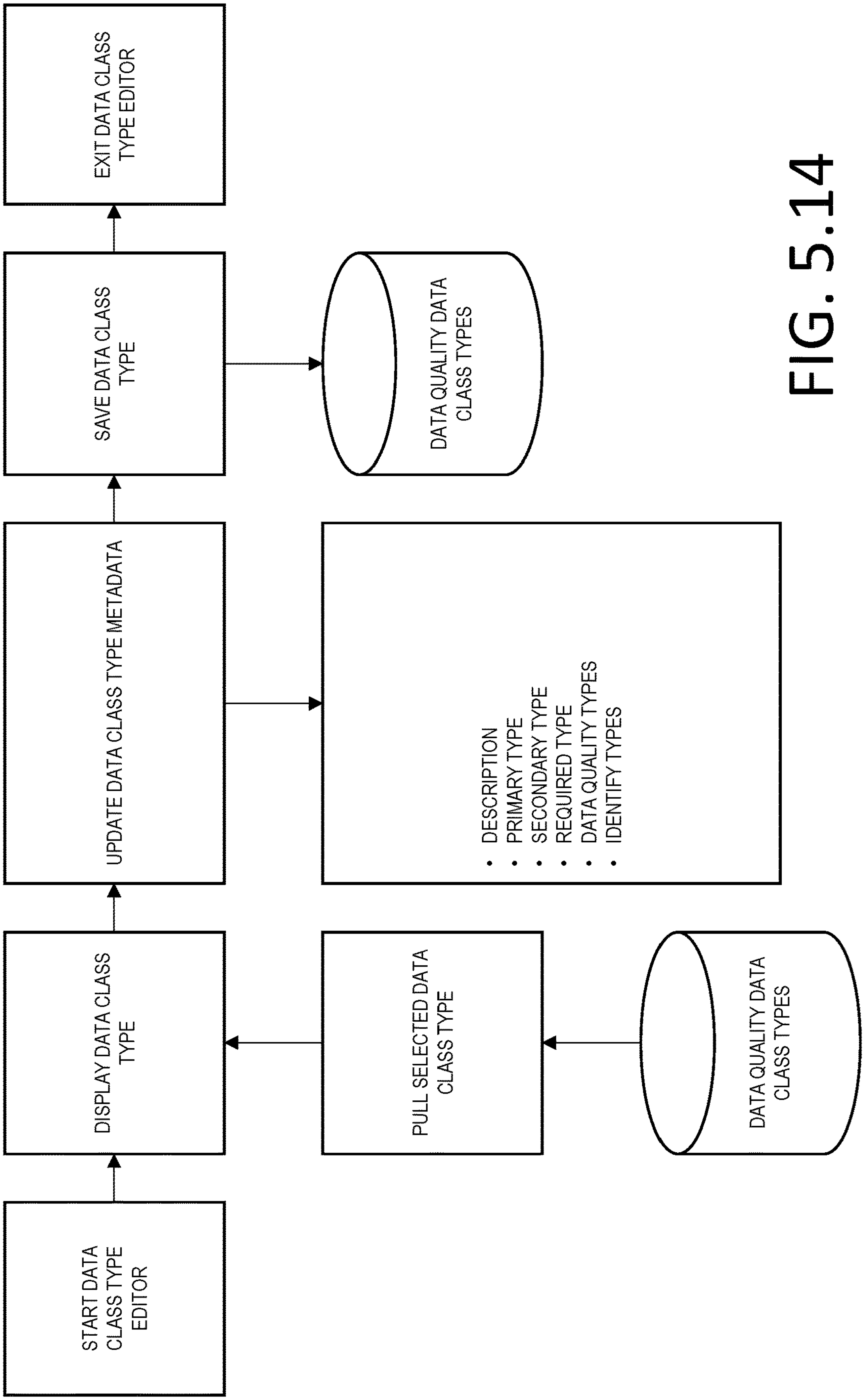
FIG. 5.14

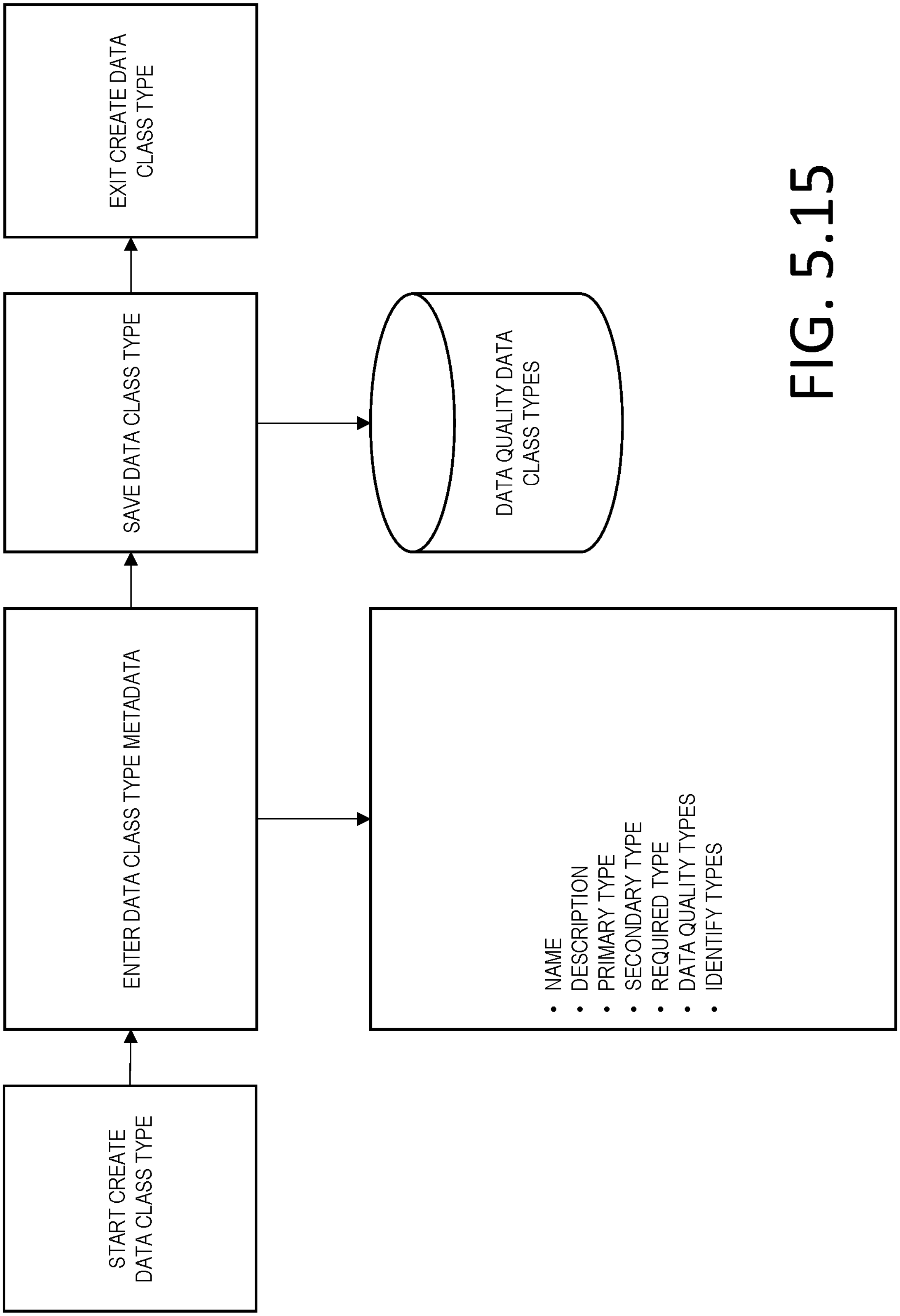
FIG. 5.15

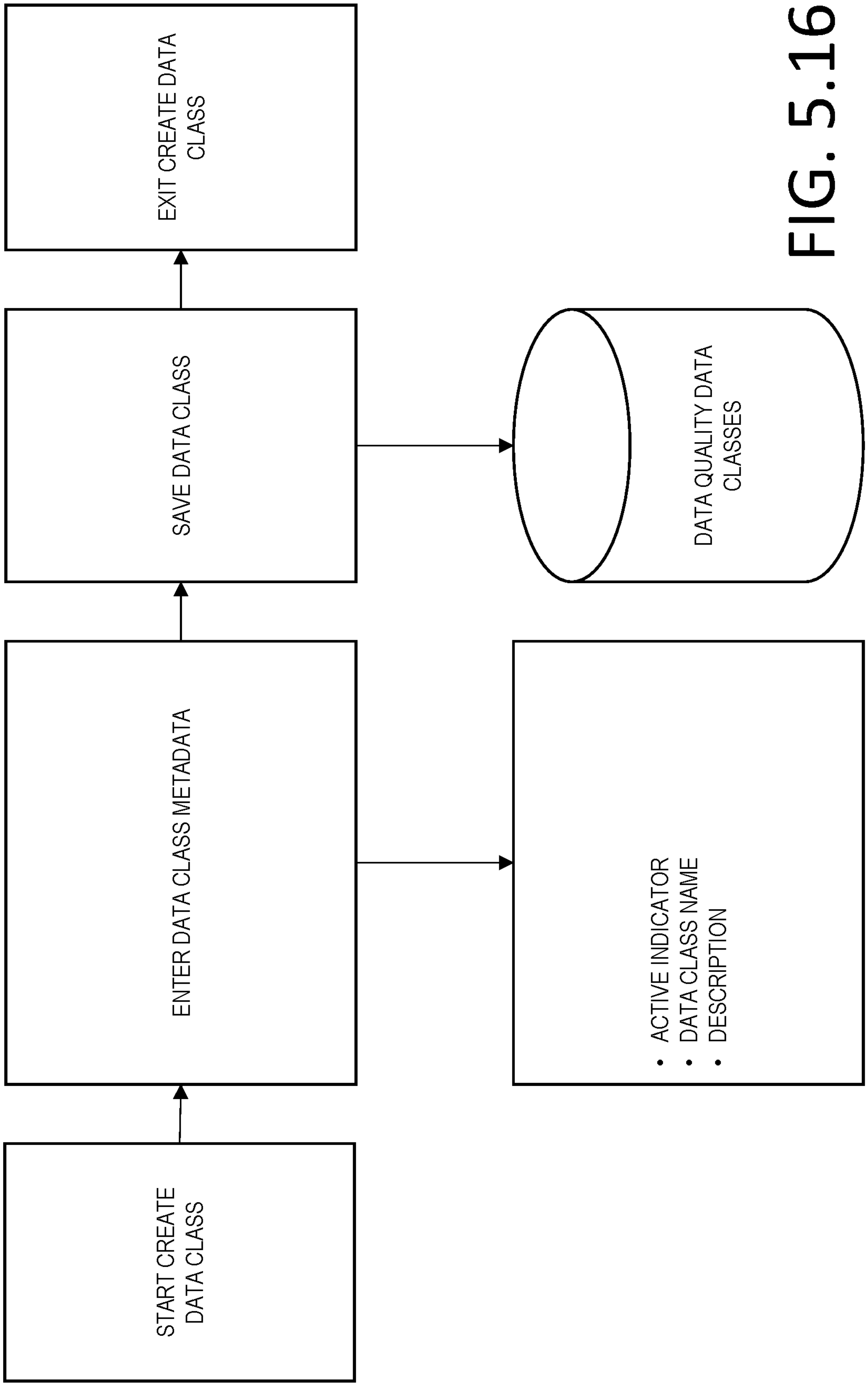
FIG. 5.16

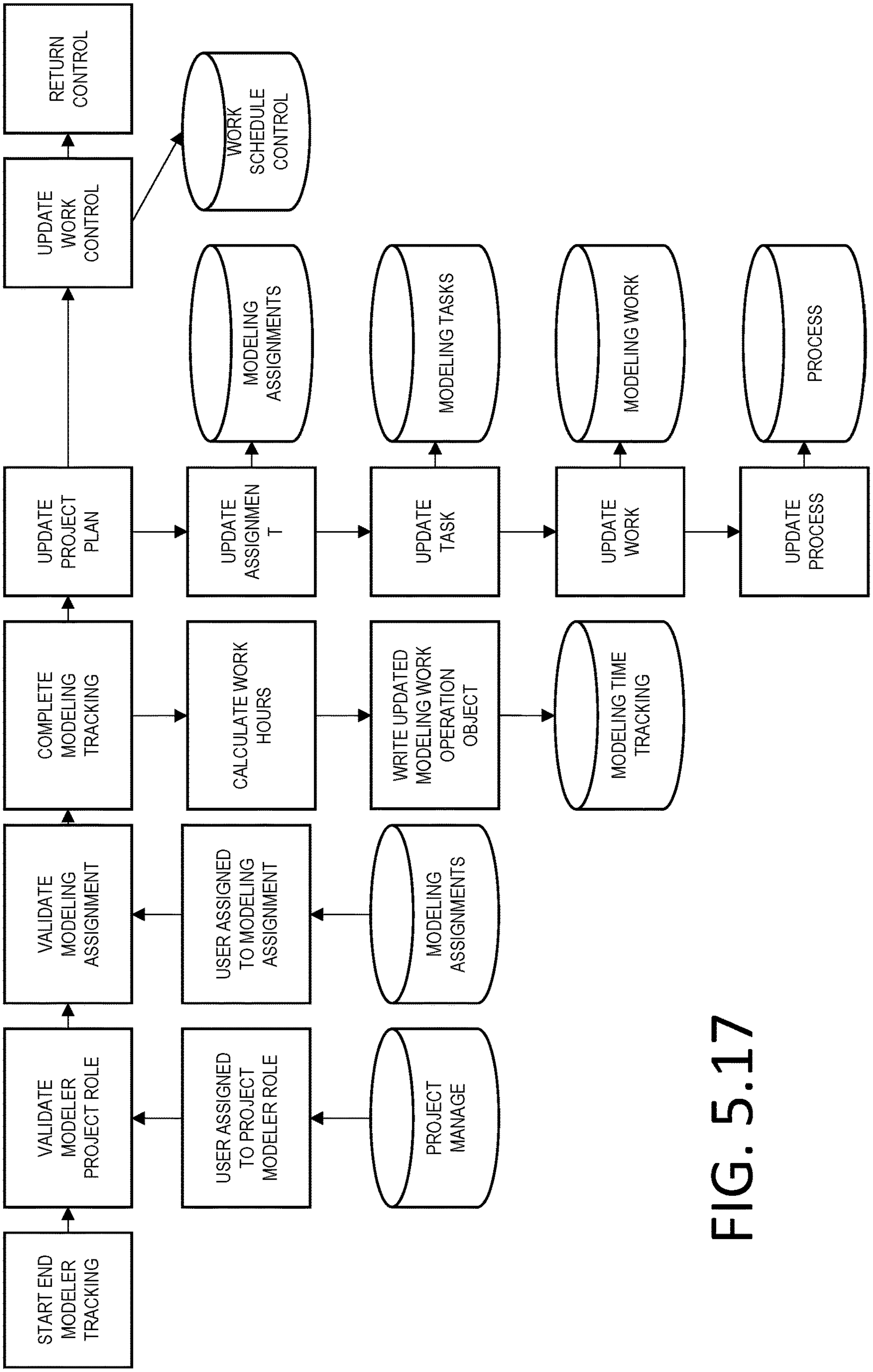
FIG. 5.17

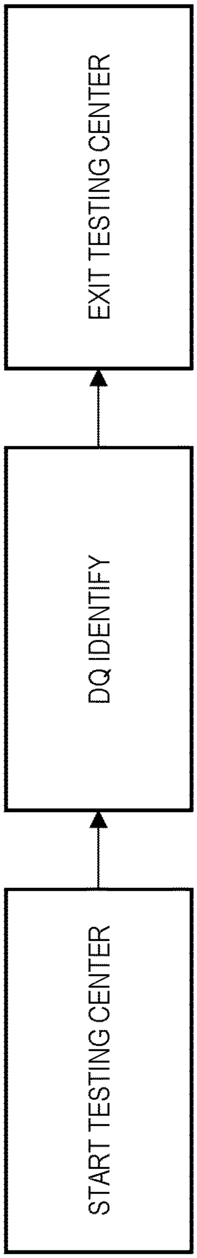
FIG. 5.18
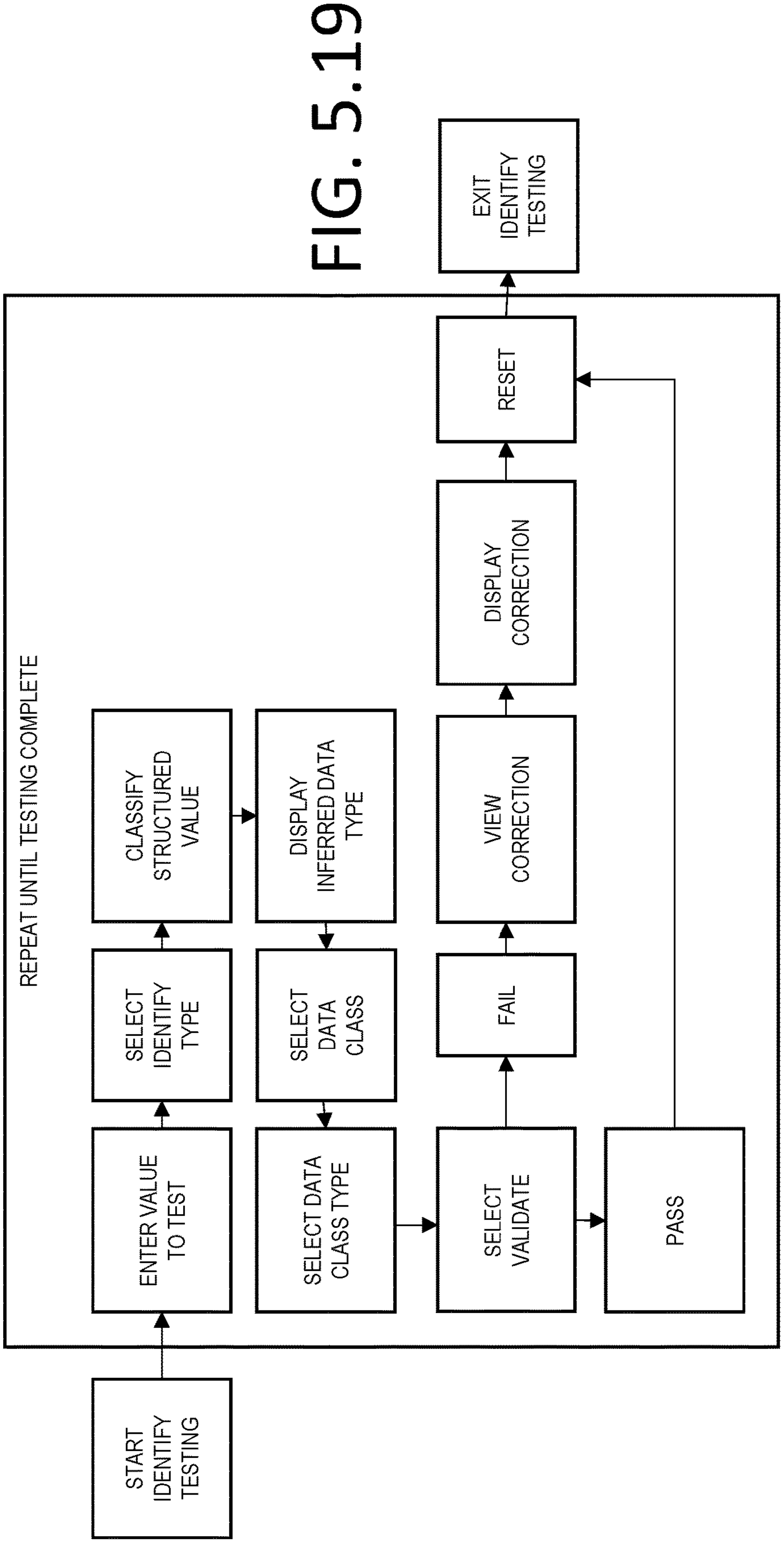
FIG. 5.19

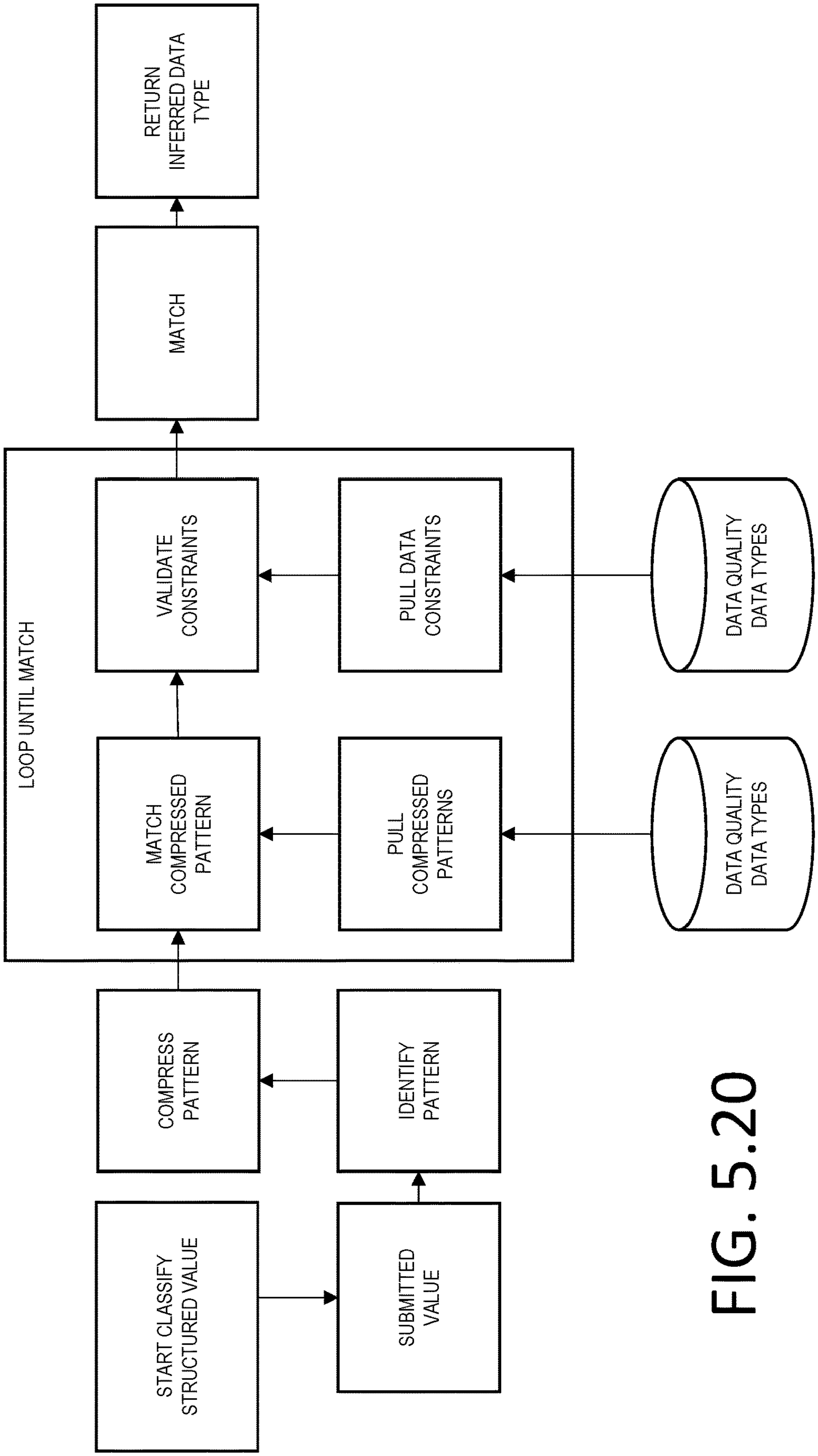
FIG. 5.20

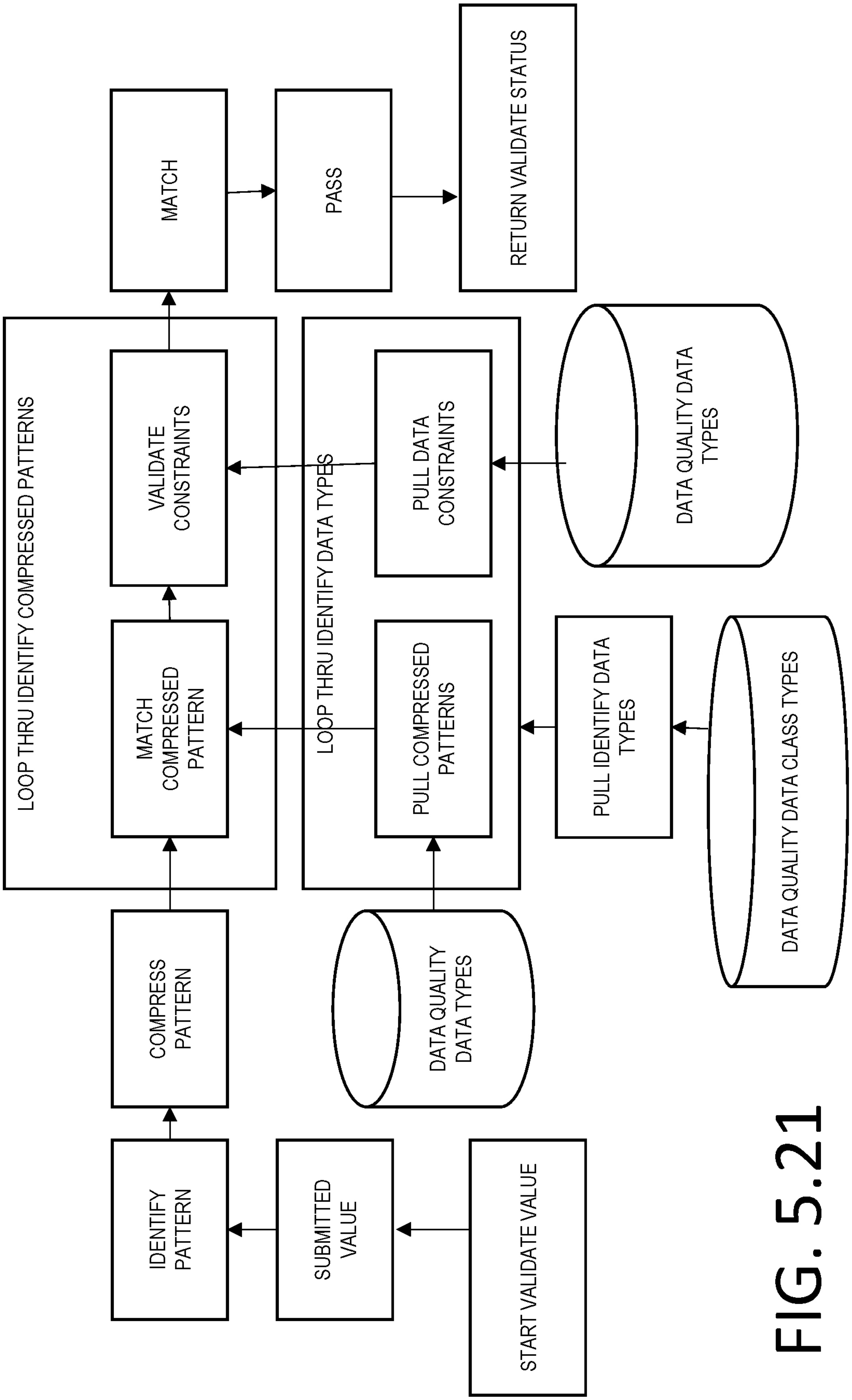
FIG. 5.21

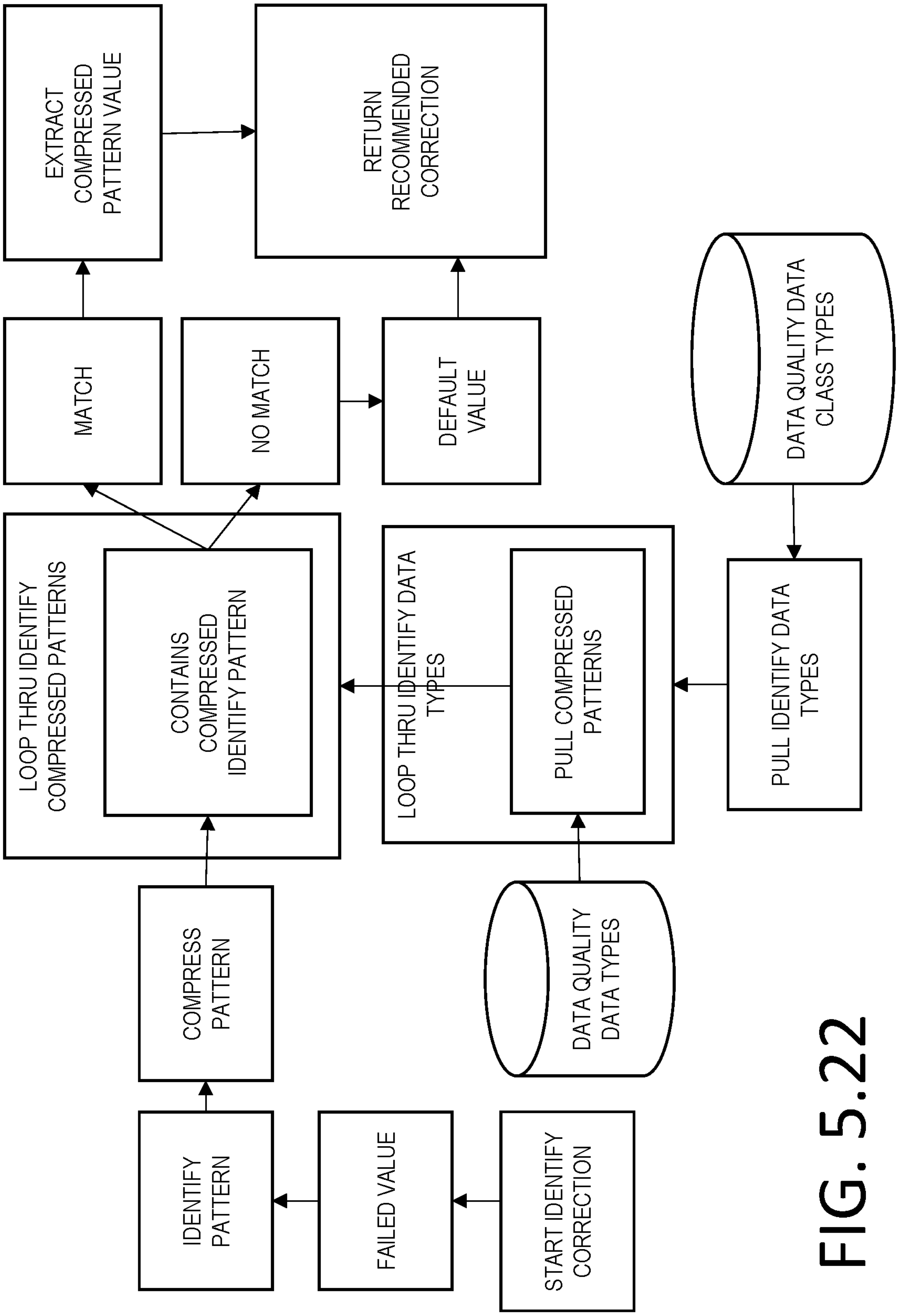
FIG. 5.22

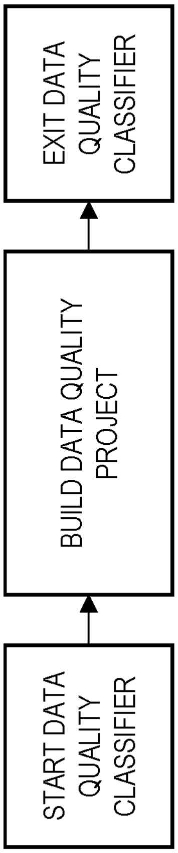
FIG. 5.23
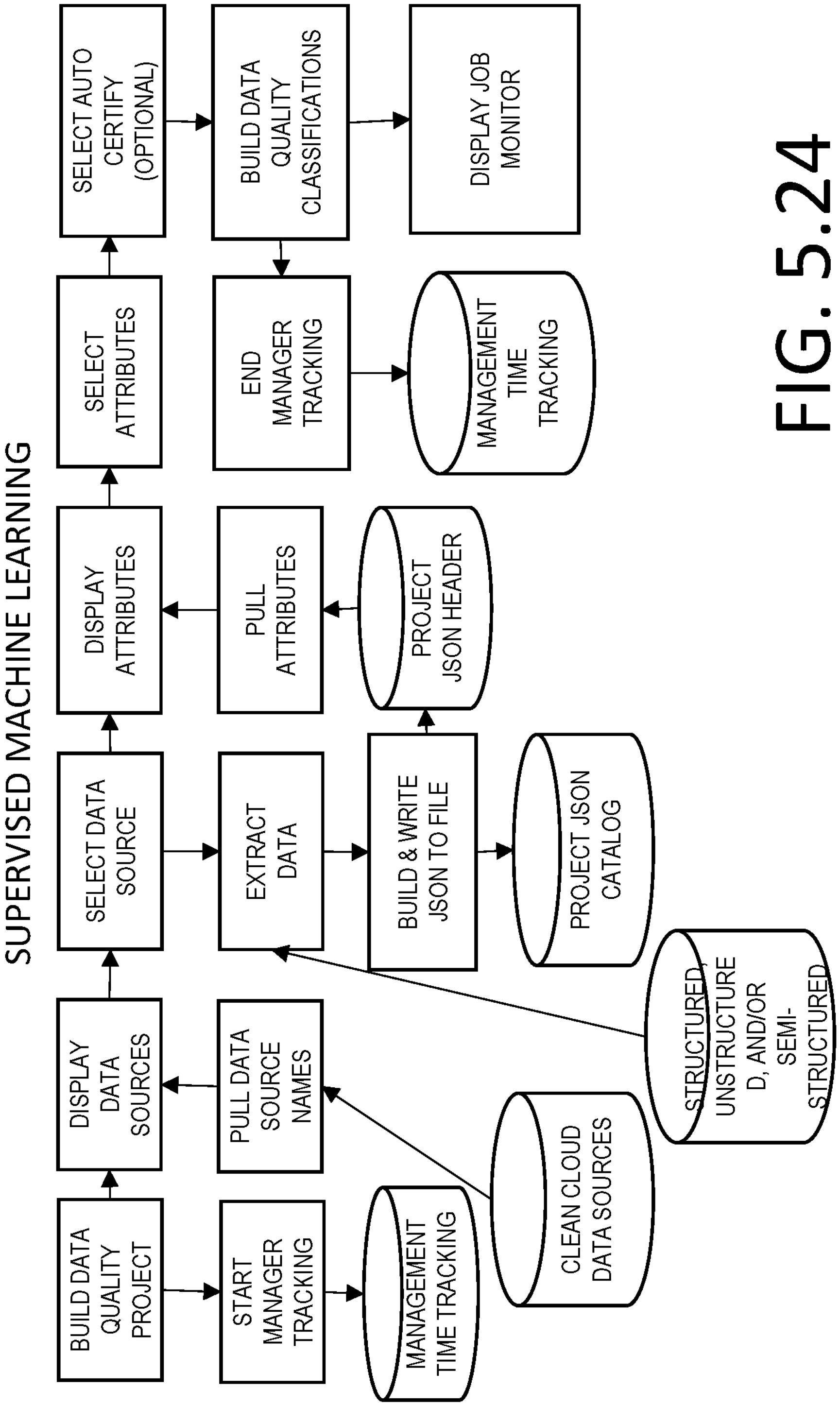
FIG. 5.24

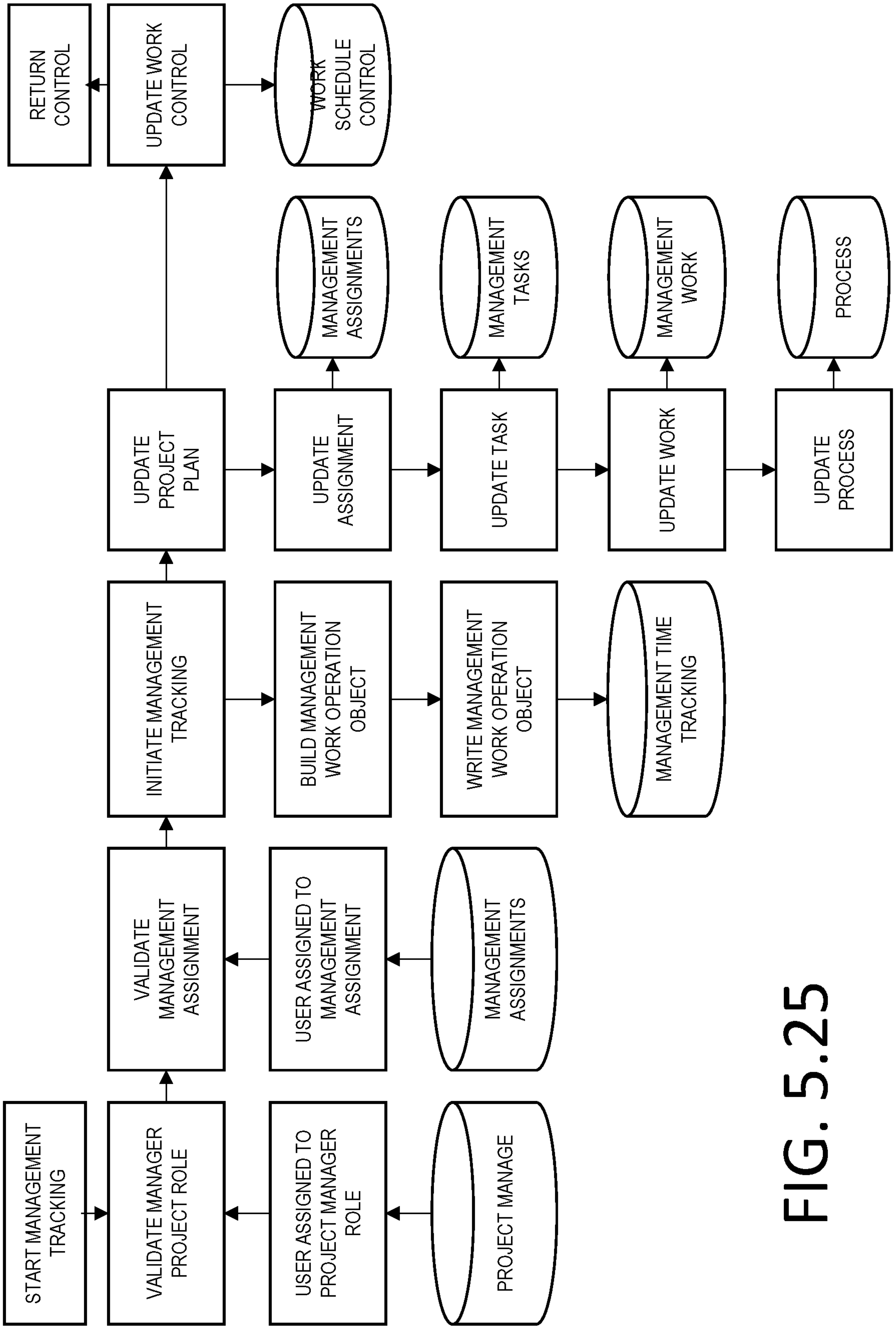
FIG. 5.25

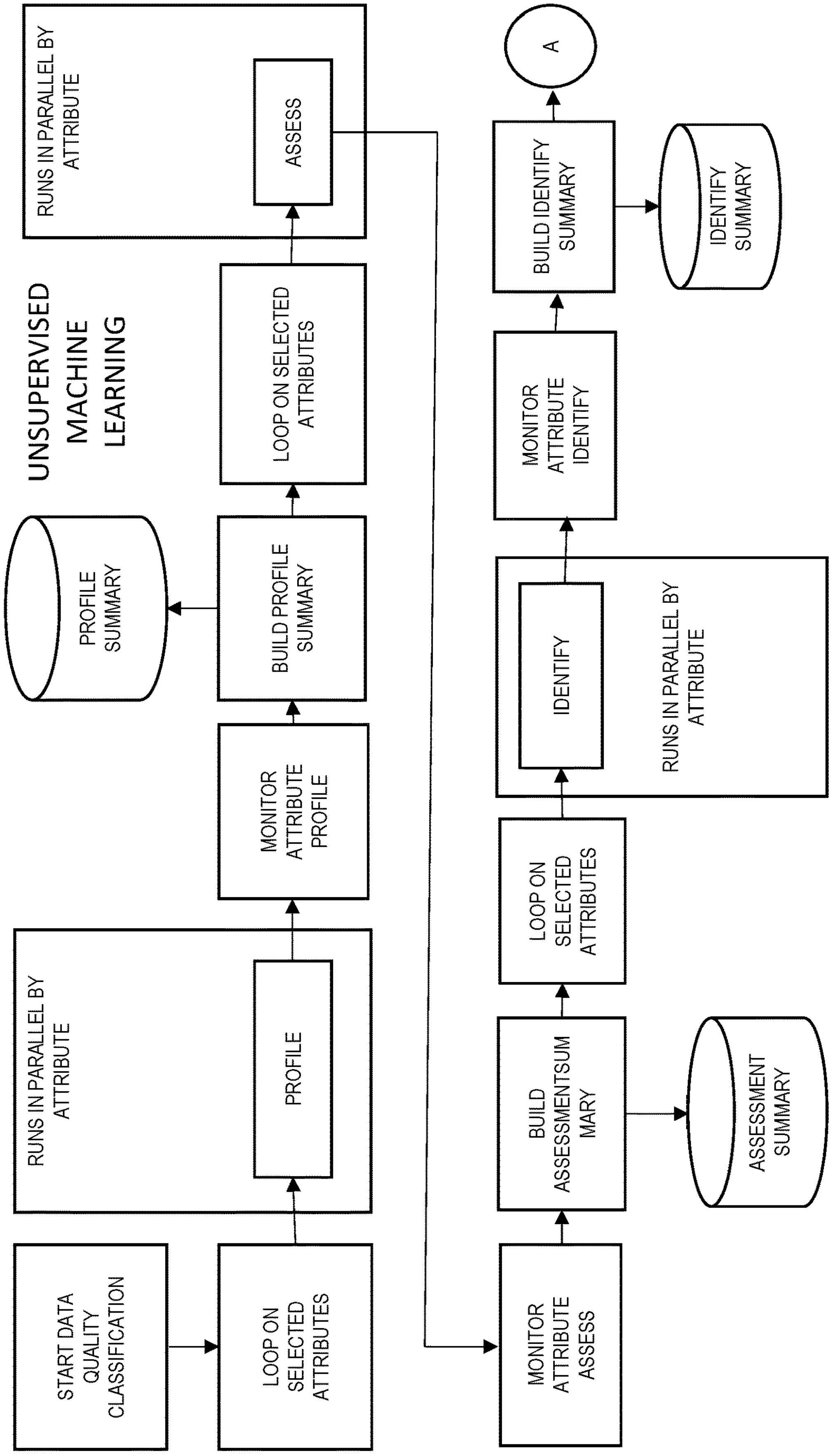
FIG. 5.26A

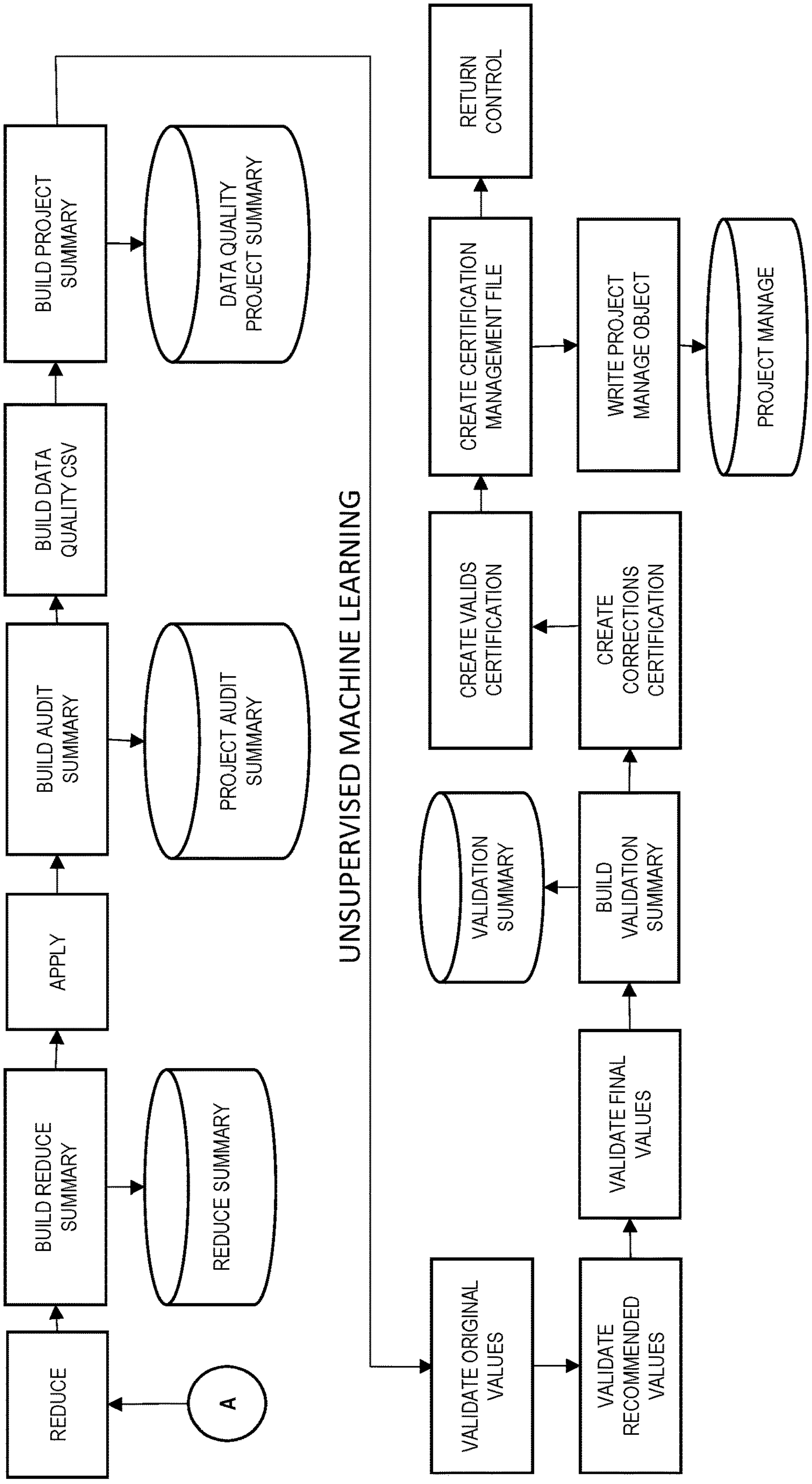
FIG. 5.26B

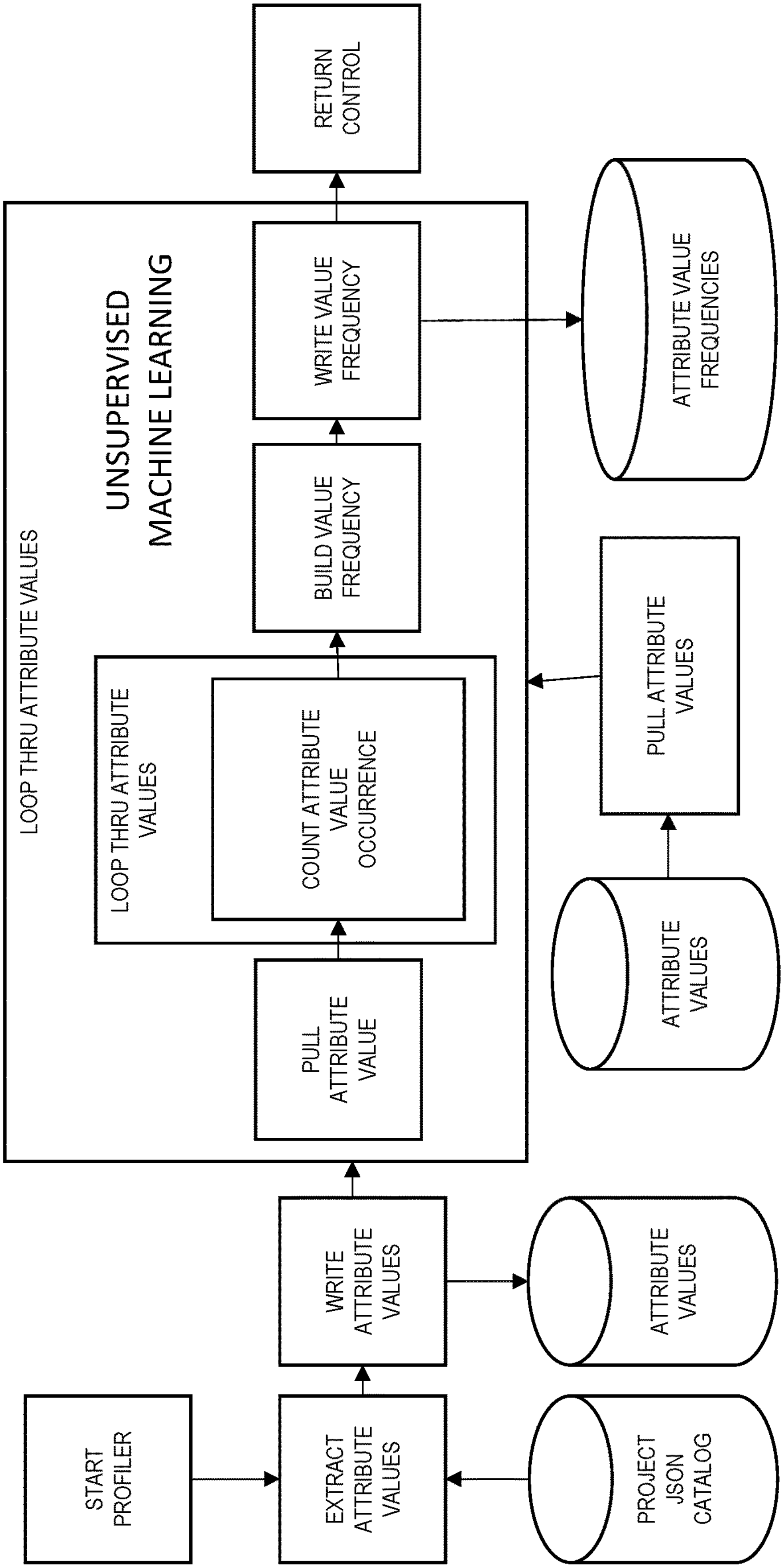
FIG. 5.27

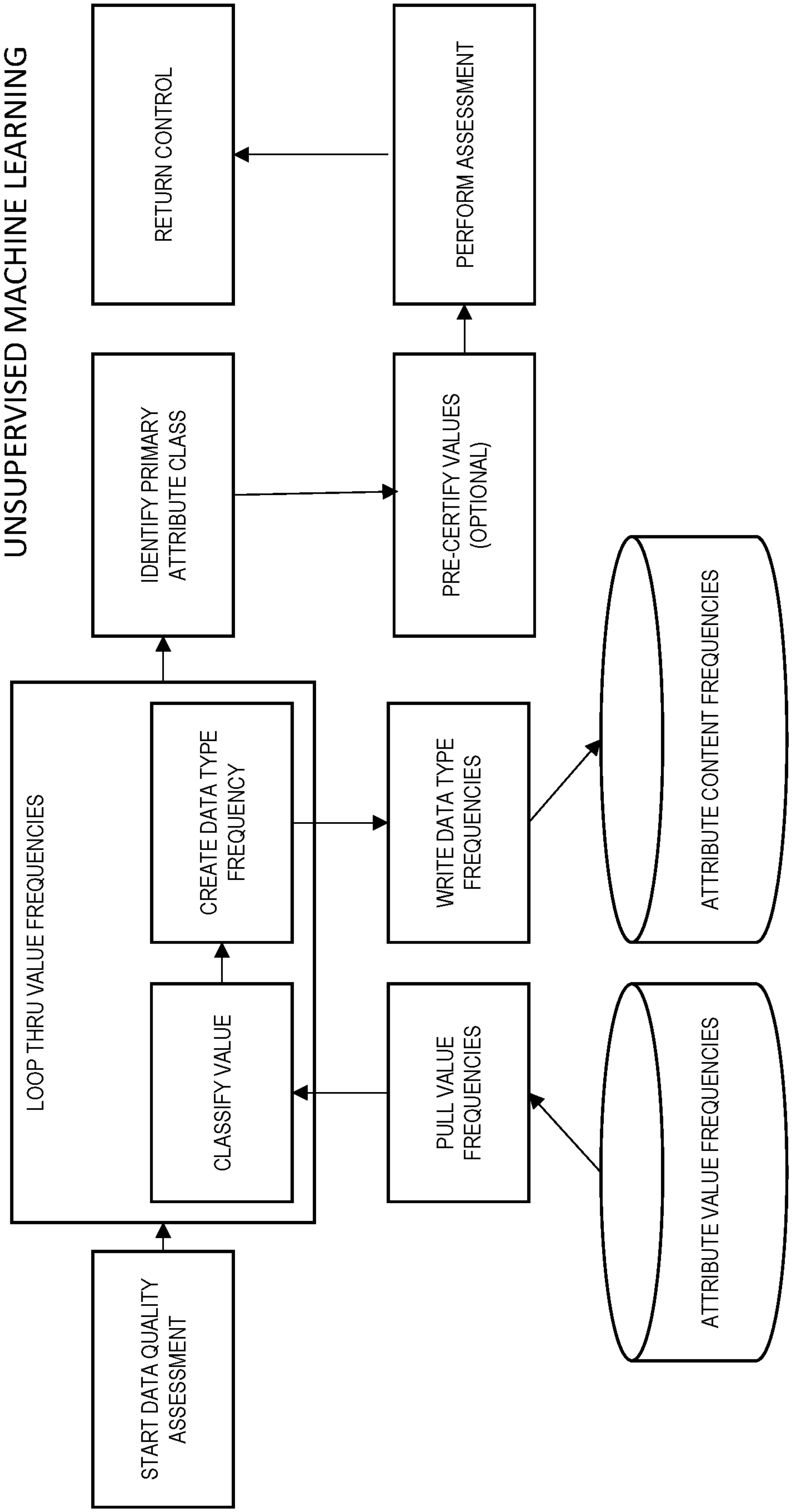
FIG. 5.28

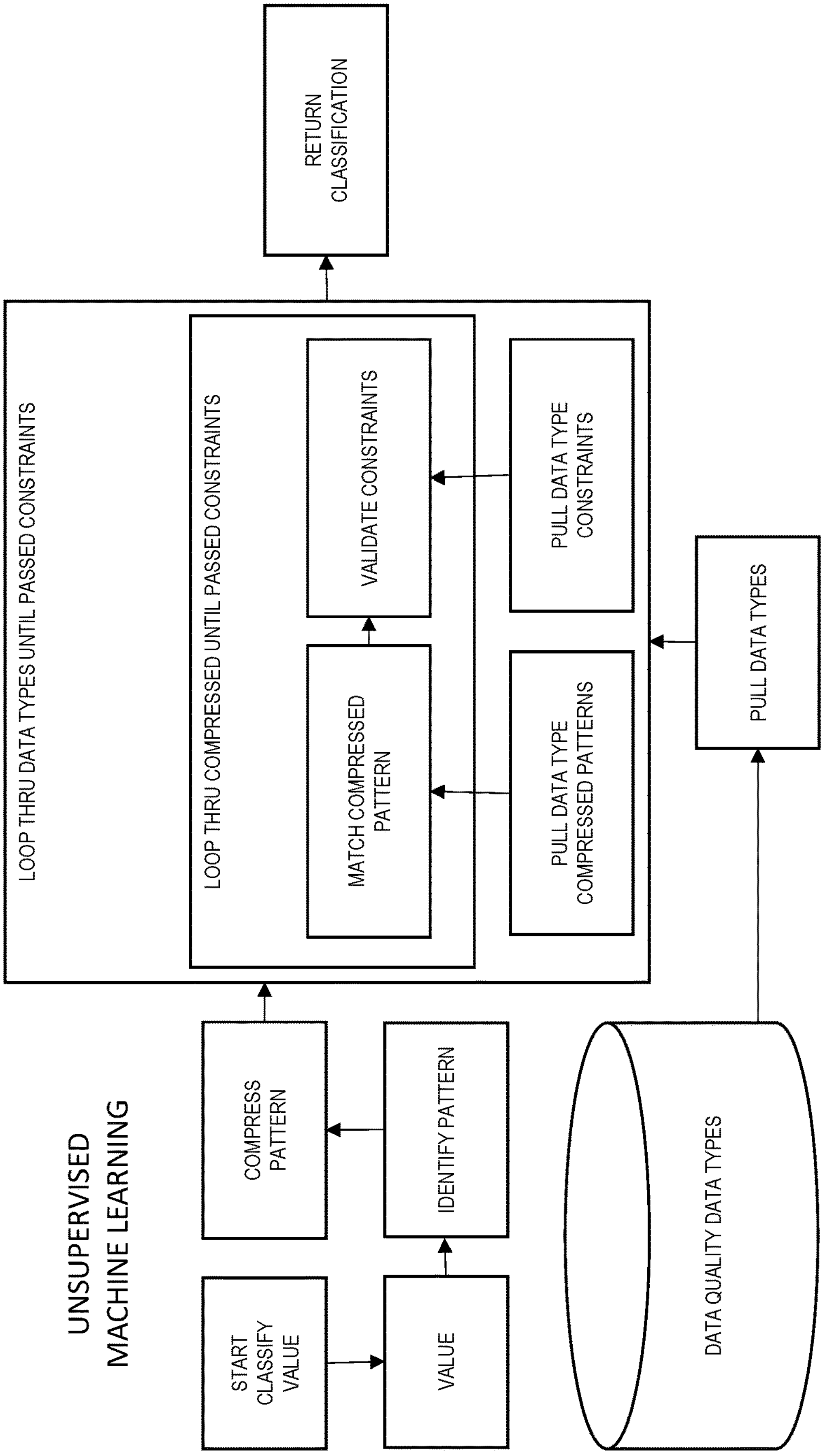
FIG. 5.29

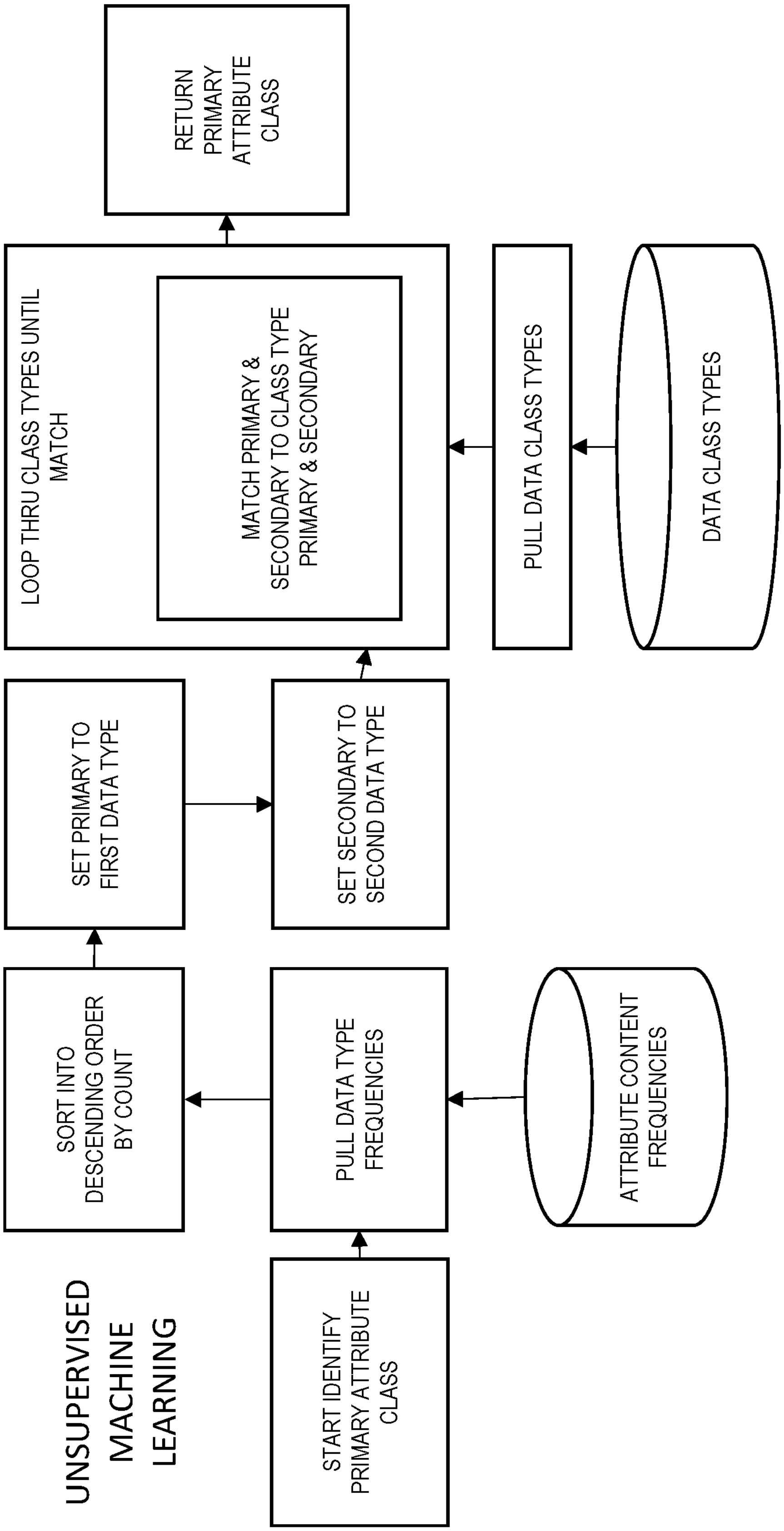
FIG. 5.30

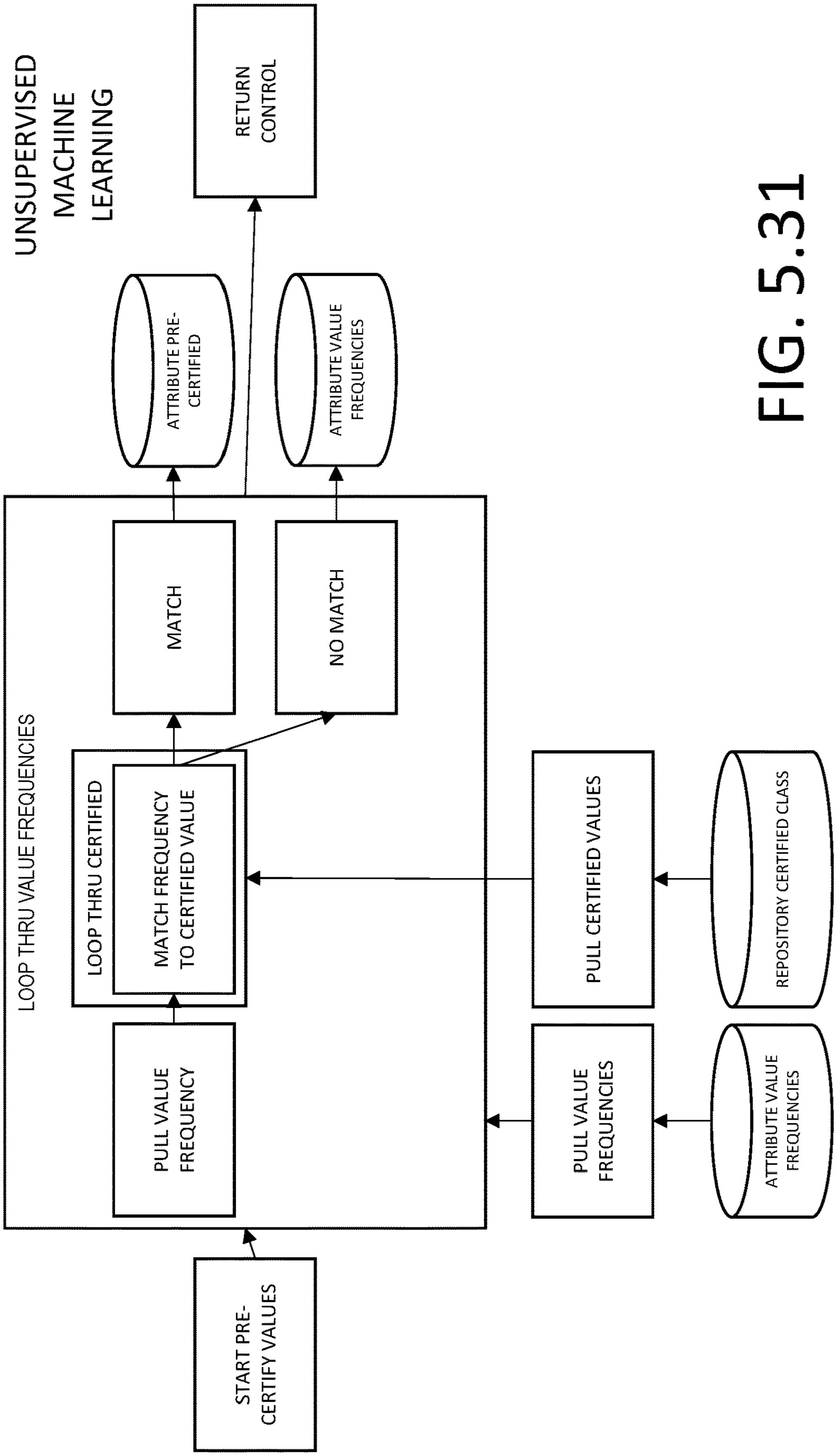
FIG. 5.31

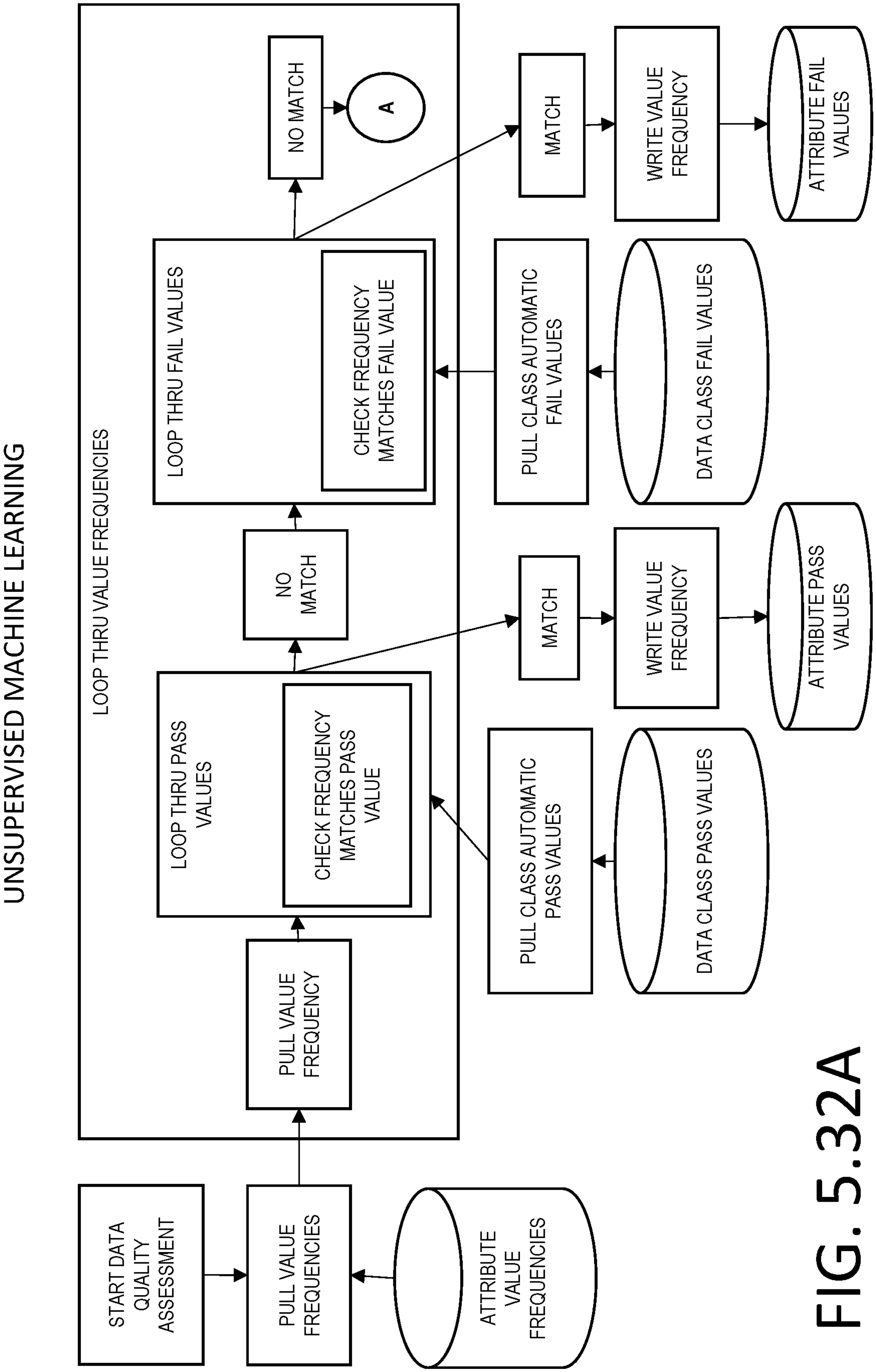
FIG. 5.32A

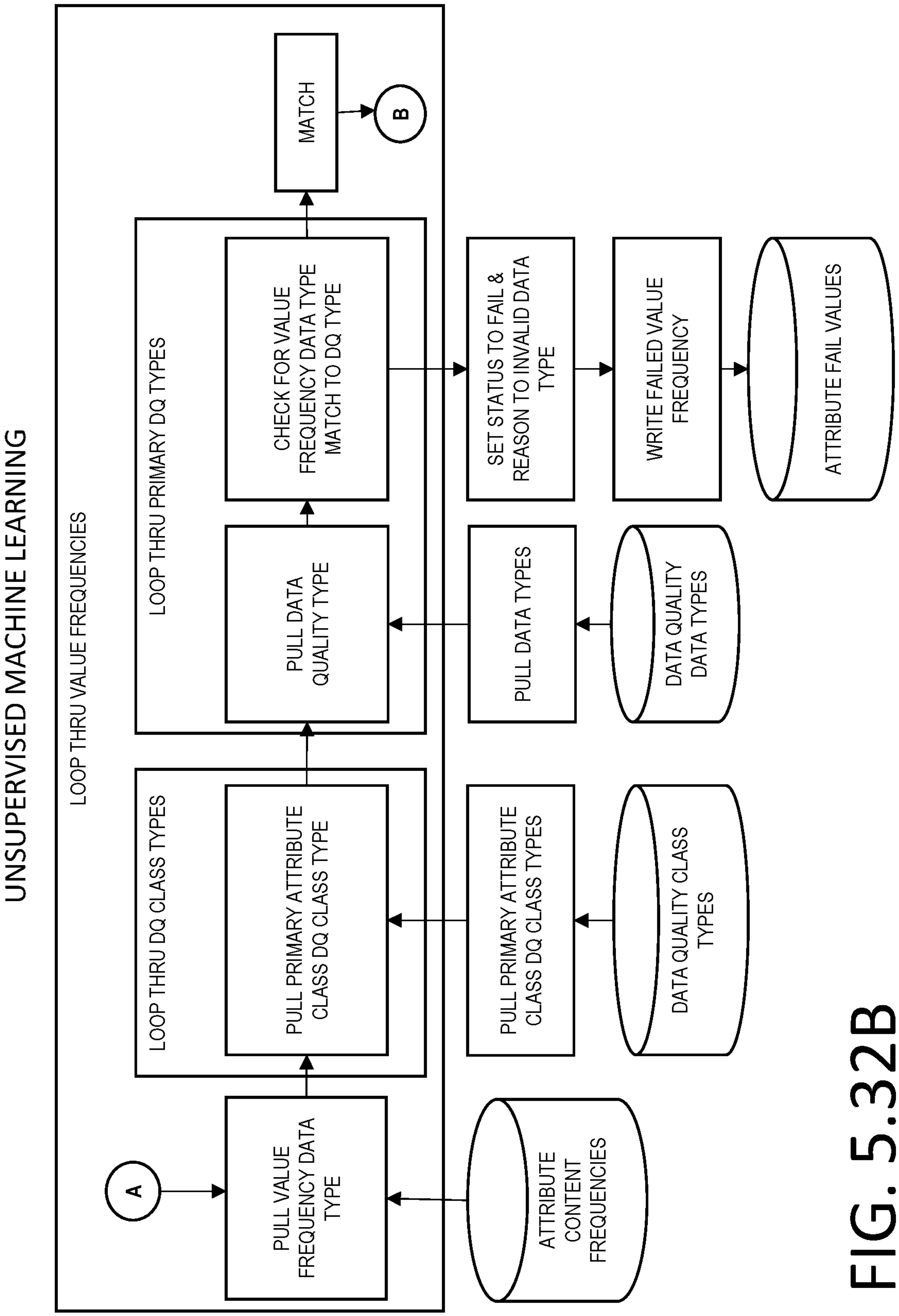
FIG. 5.32B

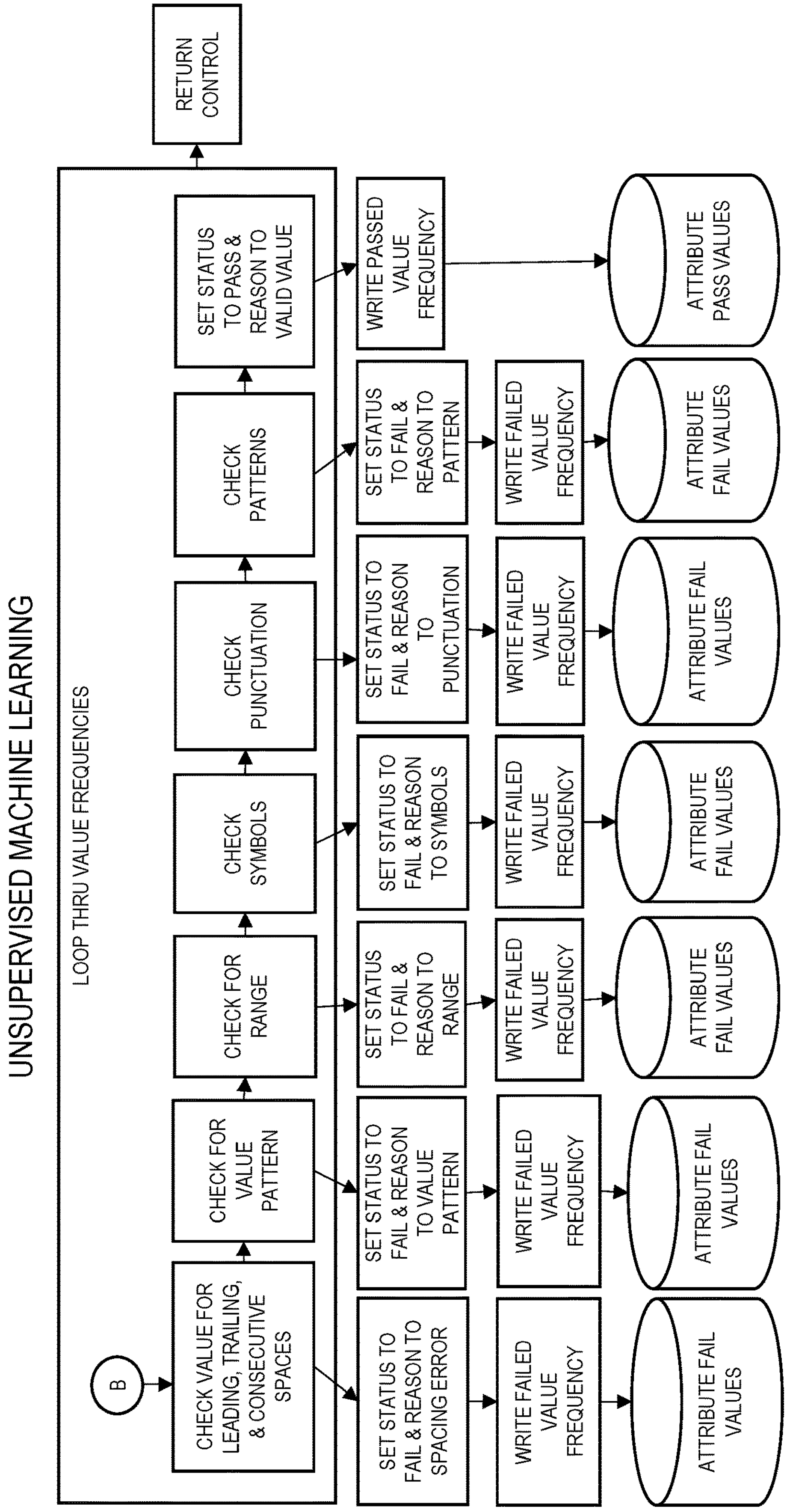
FIG. 5.32C

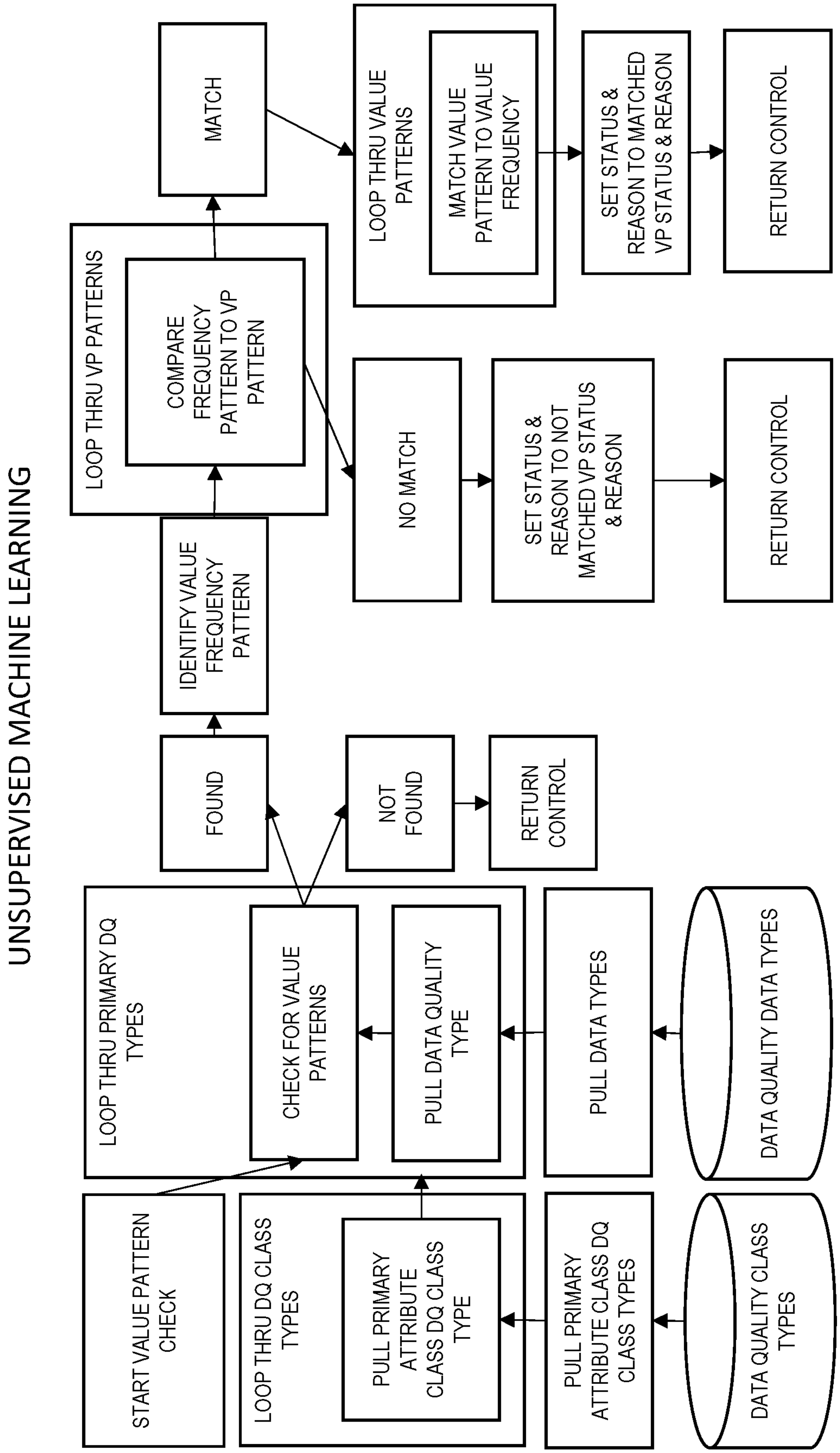
FIG. 5.33

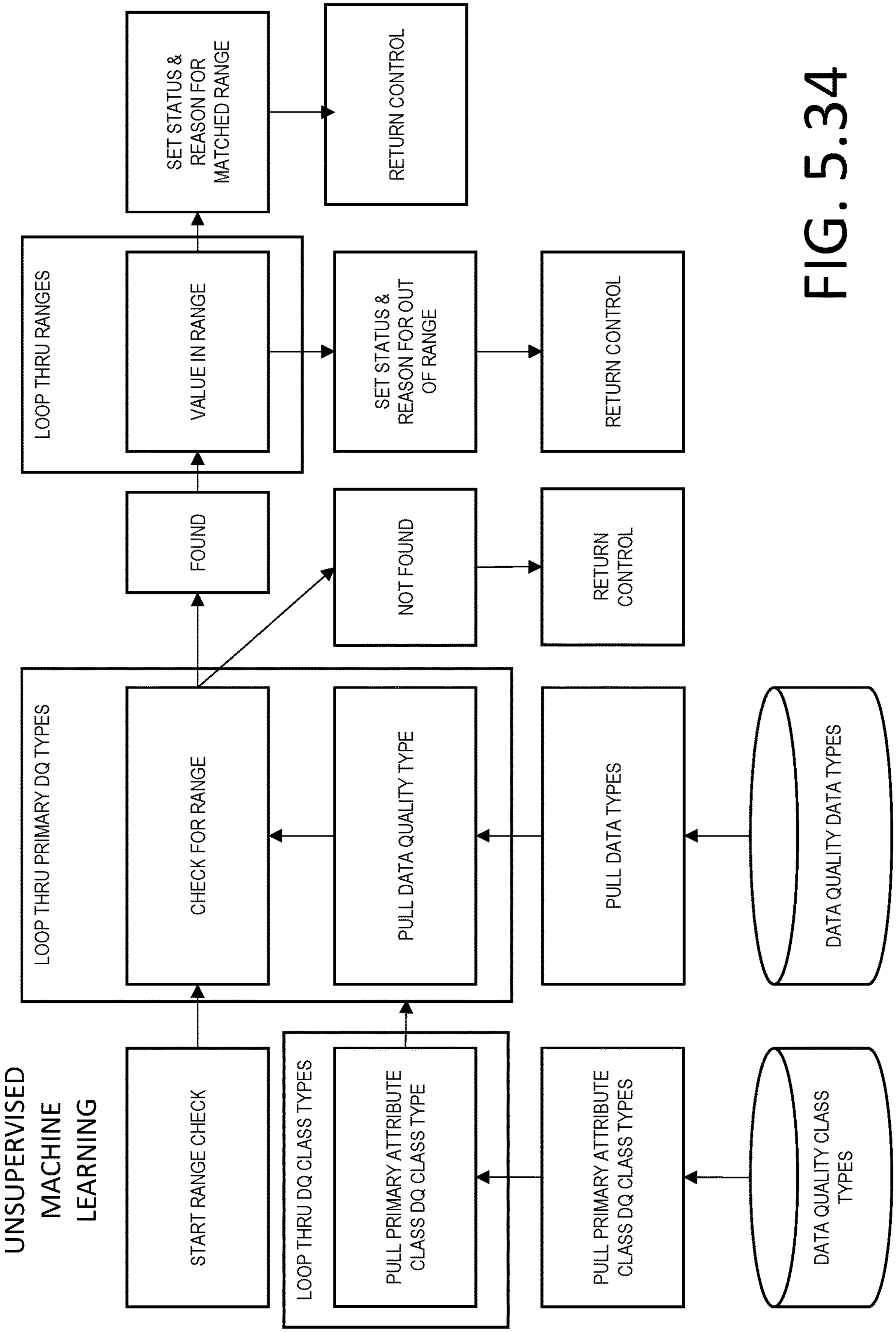
FIG. 5.34

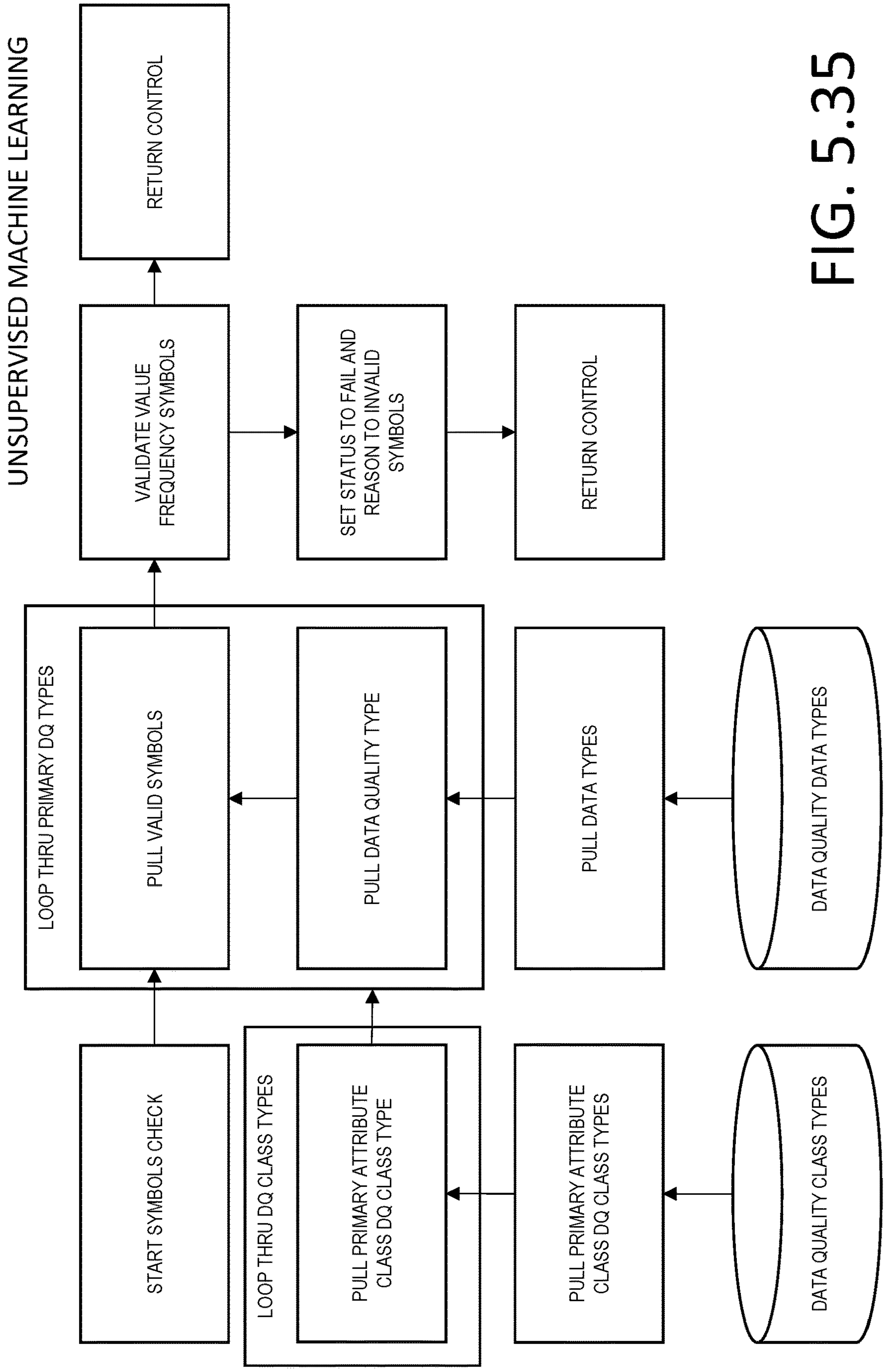
FIG. 5.35

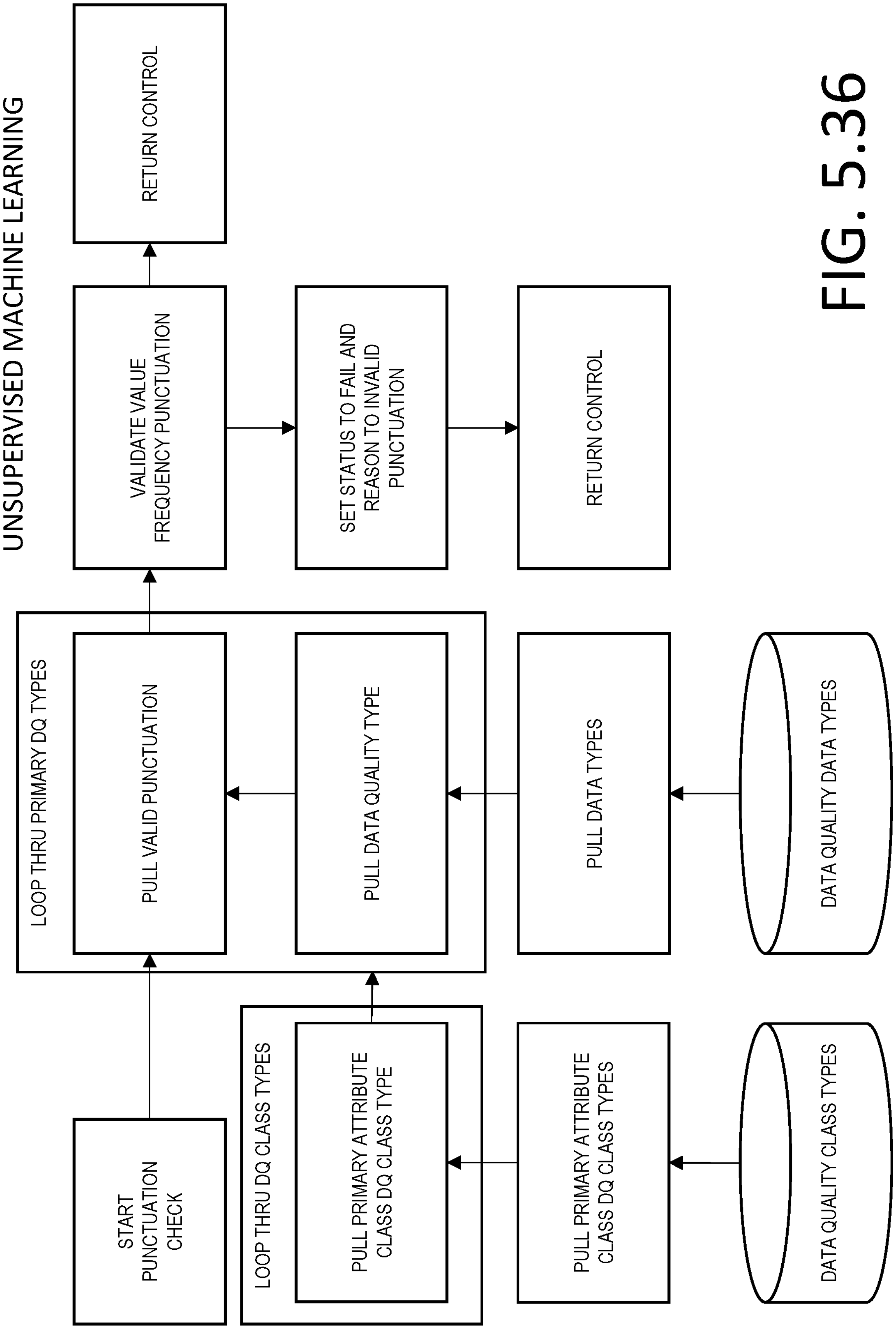
FIG. 5.36

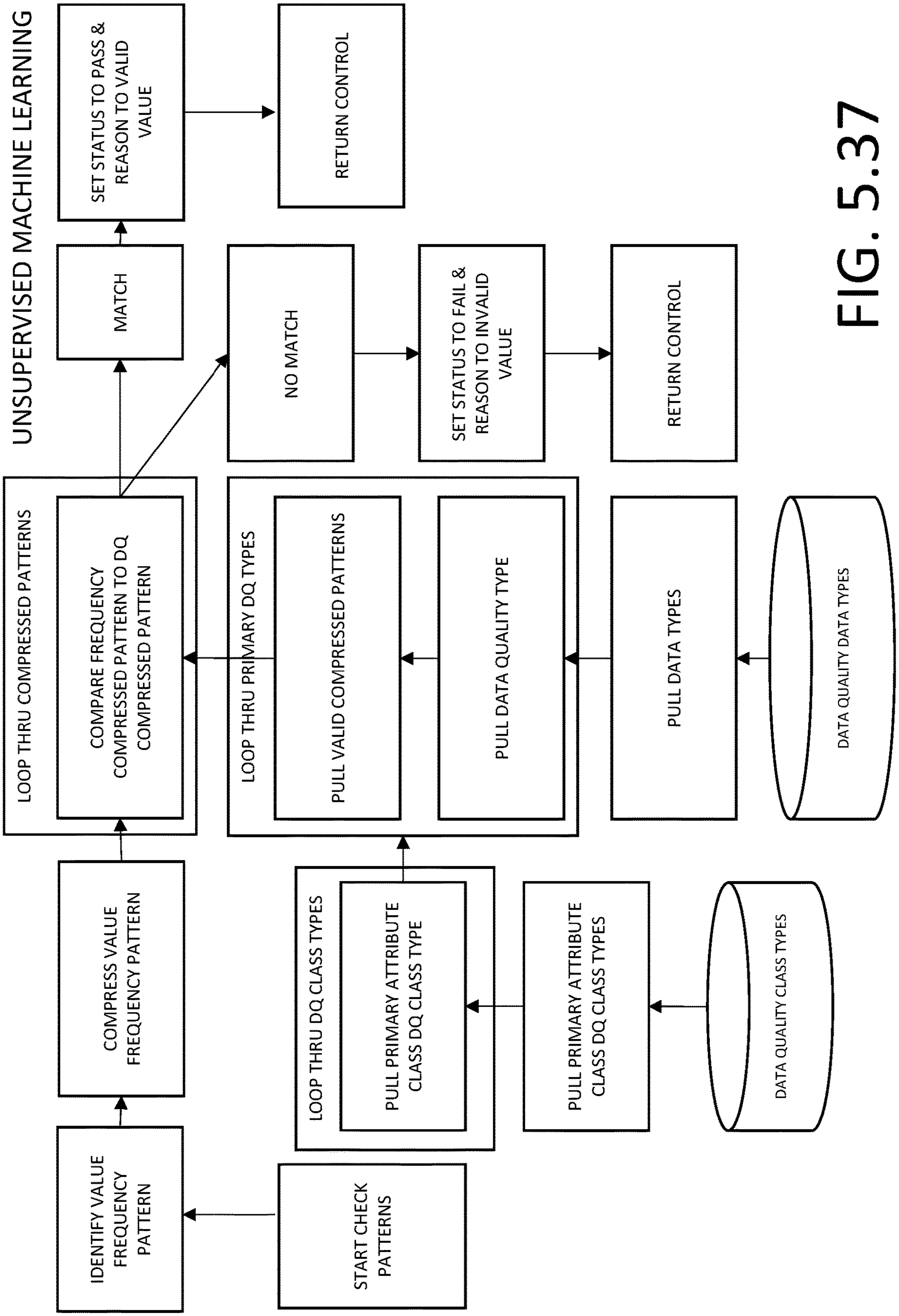
FIG. 5.37

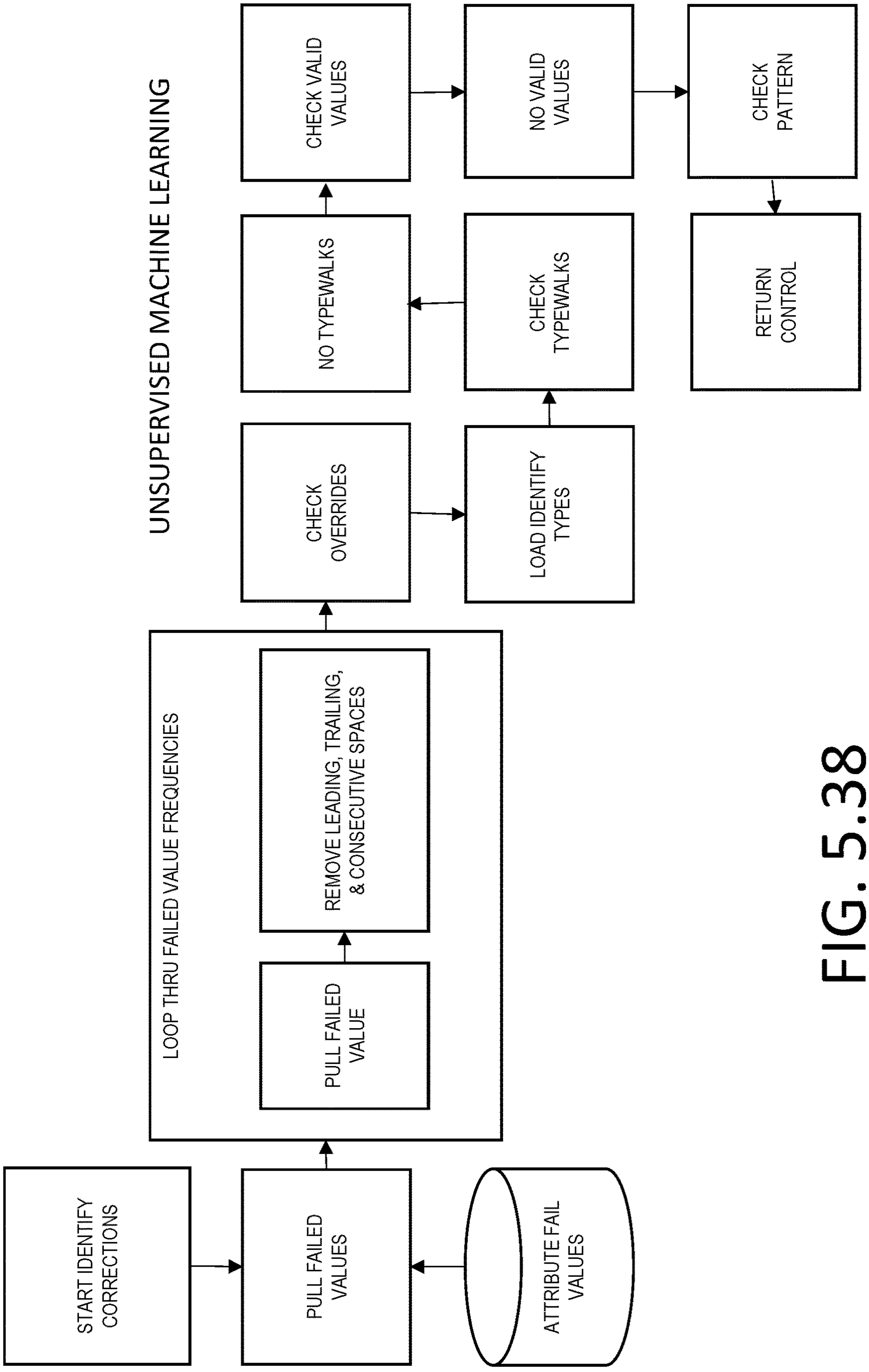
FIG. 5.38

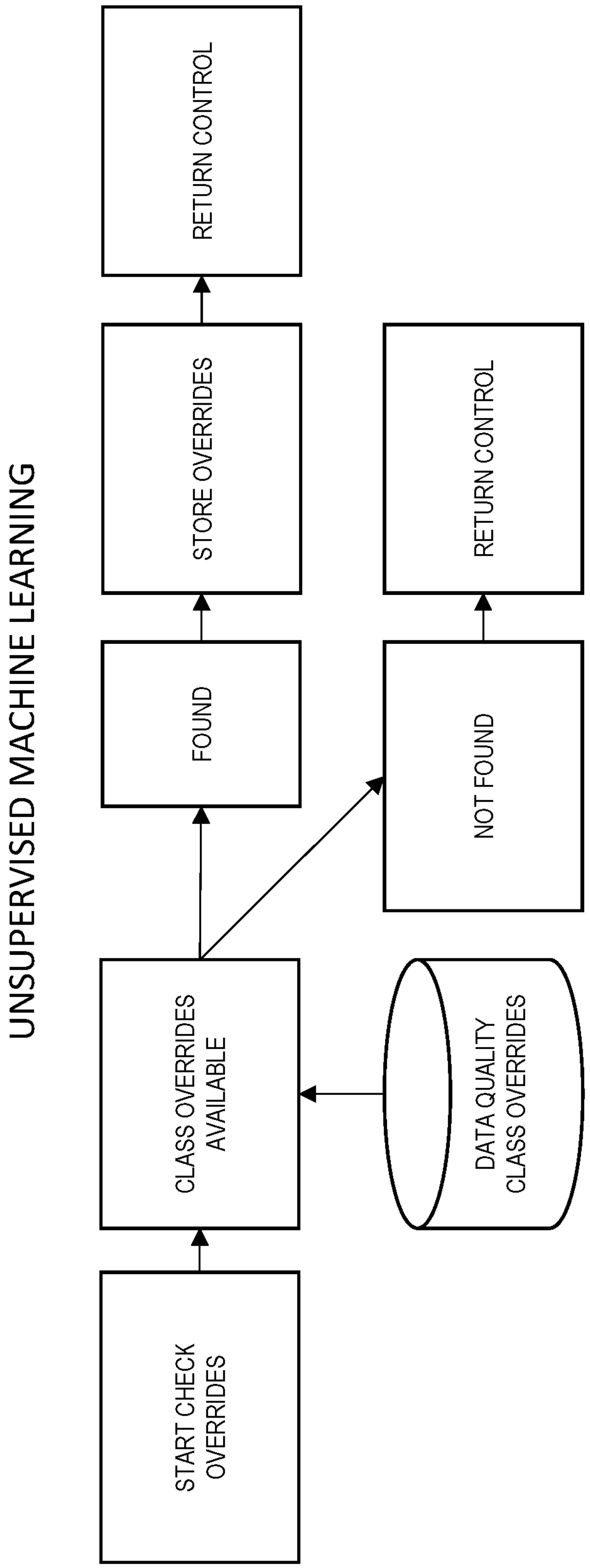
FIG. 5.39

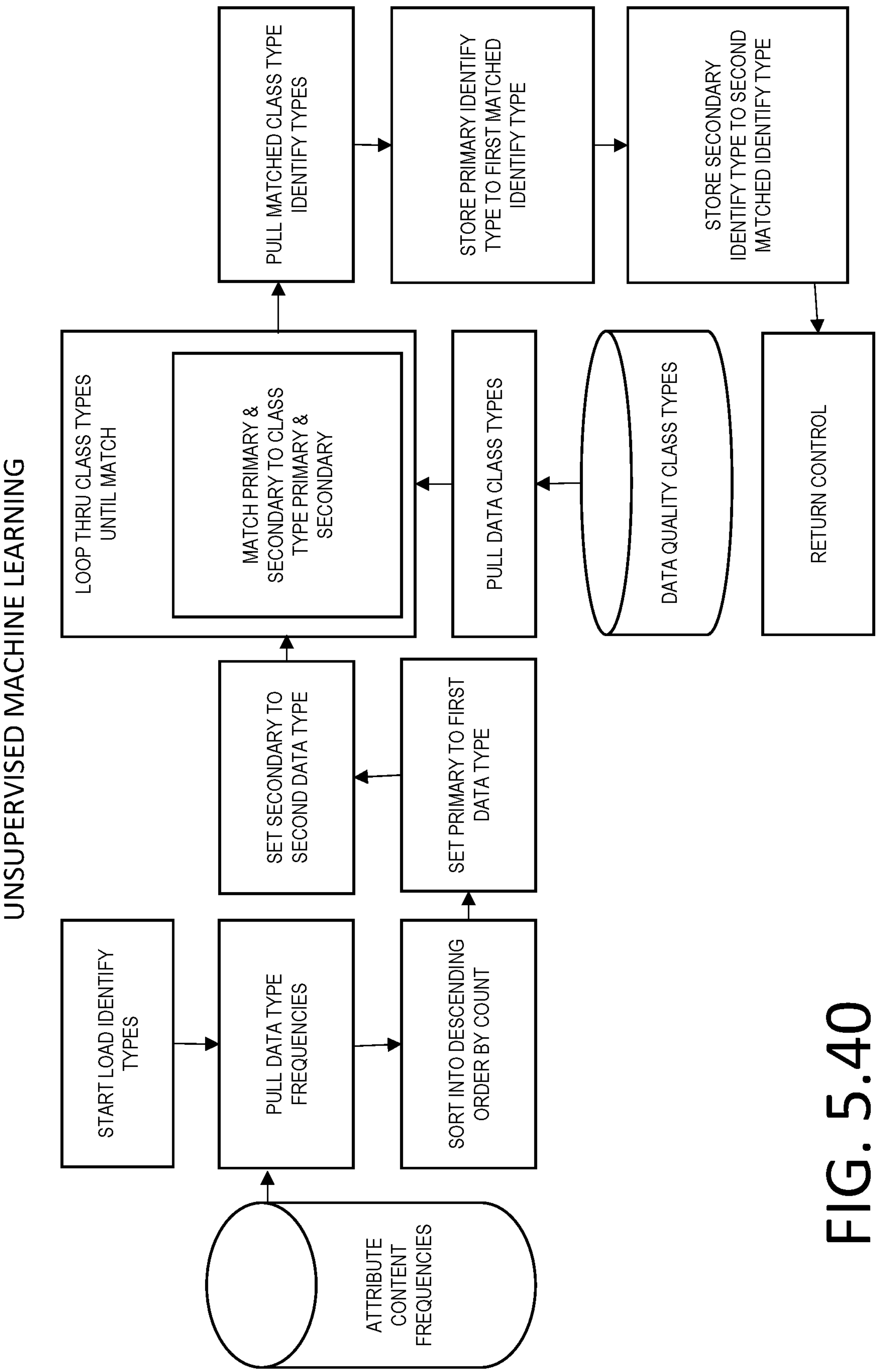

FIG. 5.40

UNSUPERVISED MACHINE LEARNING

START LOAD IDENTIFY TYPES

ATTRIBUTE CONTENT FREQUENCIES

PULL DATA TYPE FREQUENCIES

SORT INTO DESCENDING ORDER BY COUNT

SET PRIMARY TO FIRST DATA TYPE

SET SECONDARY TO SECOND DATA TYPE

LOOP THRU CLASS TYPES UNTIL MATCH

MATCH PRIMARY & SECONDARY TO CLASS TYPE PRIMARY & SECONDARY

DATA QUALITY CLASS TYPES

PULL DATA CLASS TYPES

PULL MATCHED CLASS TYPE IDENTIFY TYPES

STORE PRIMARY IDENTIFY TYPE TO FIRST MATCHED IDENTIFY TYPE

STORE SECONDARY IDENTIFY TYPE TO SECOND MATCHED IDENTIFY TYPE

RETURN CONTROL

FIG. 5.40

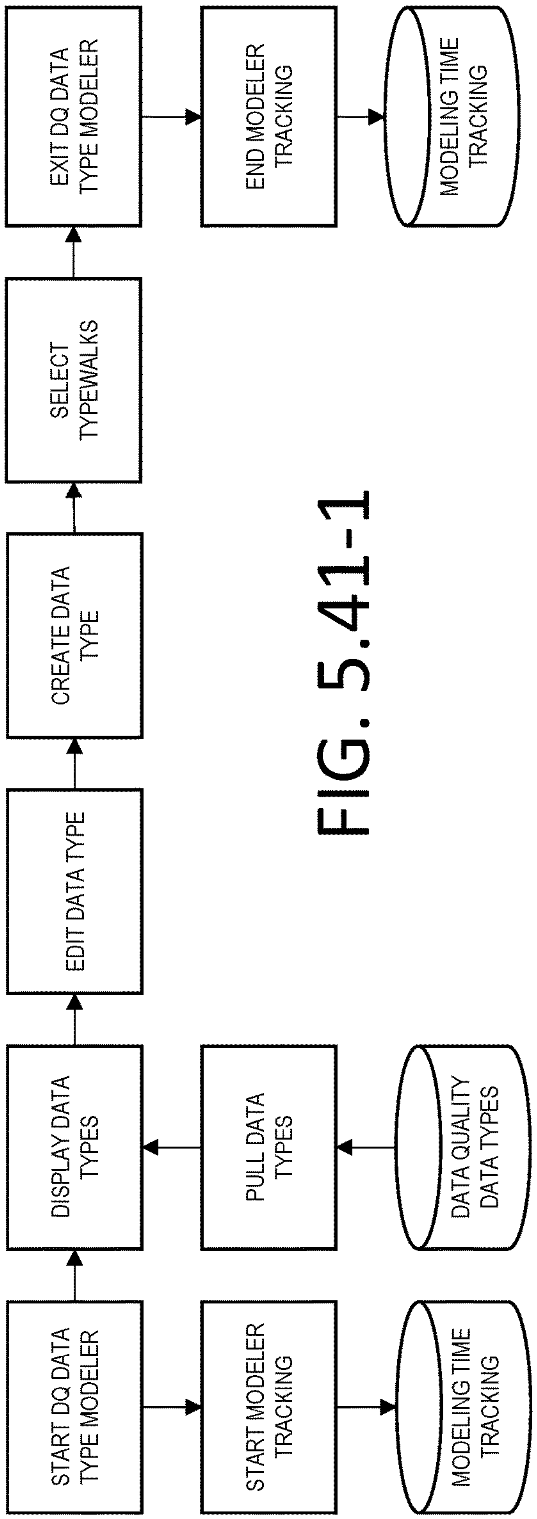
FIG. 5.41-1
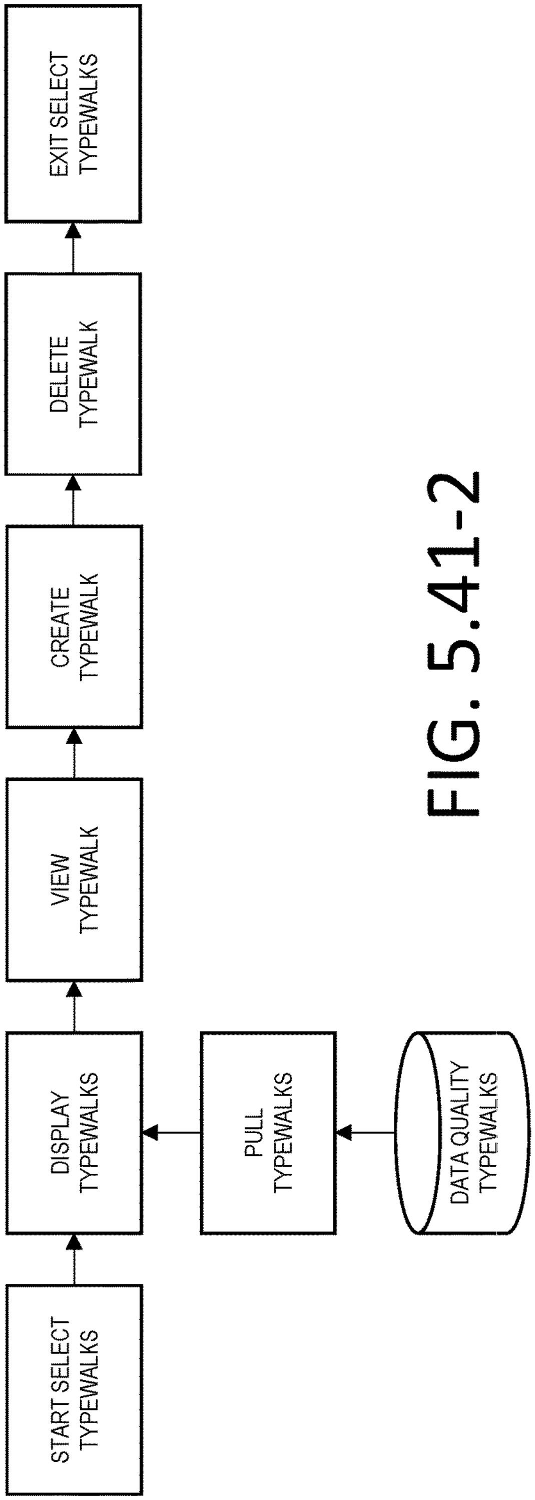
FIG. 5.41-2

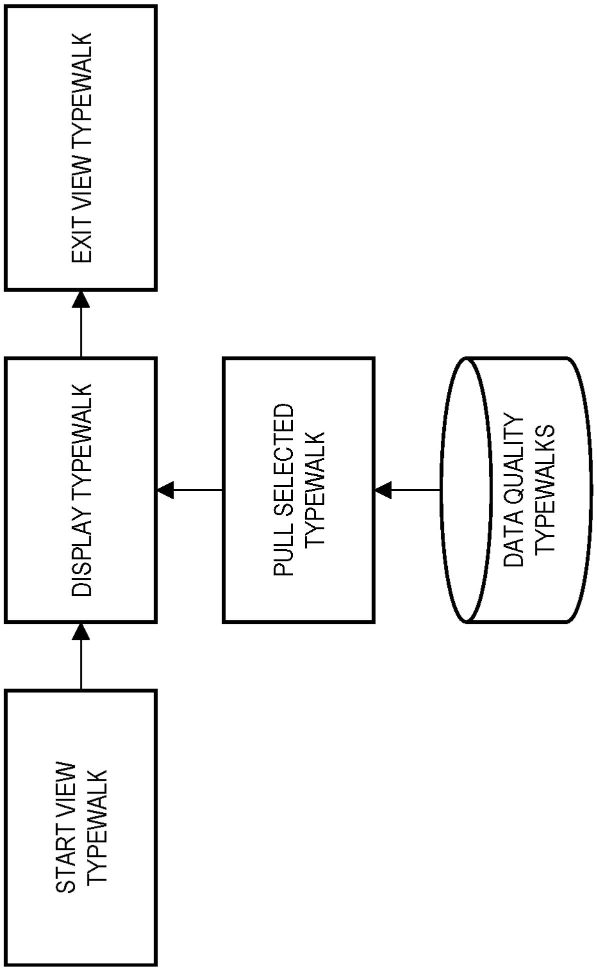
FIG. 5.41-3

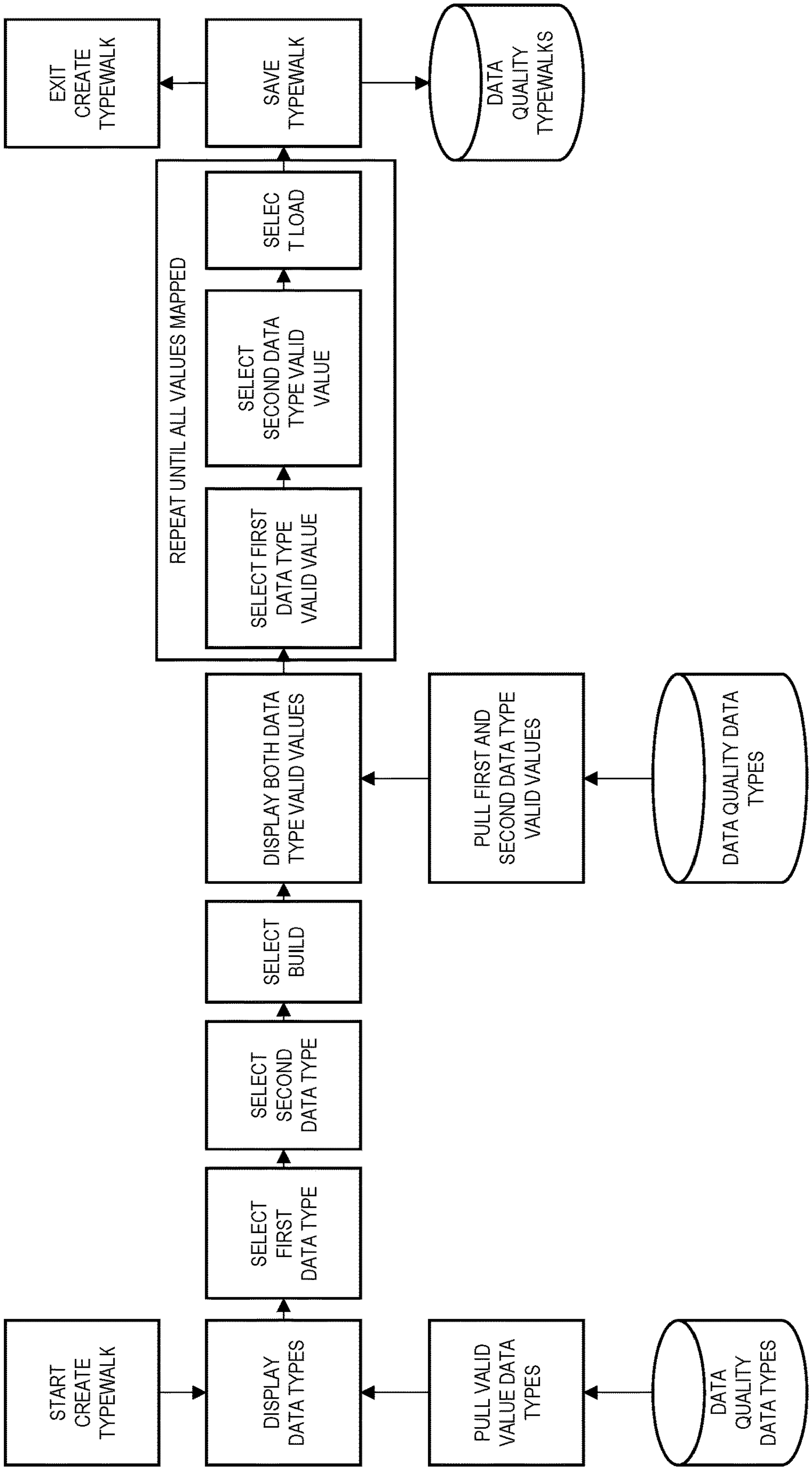
FIG. 5.41-4

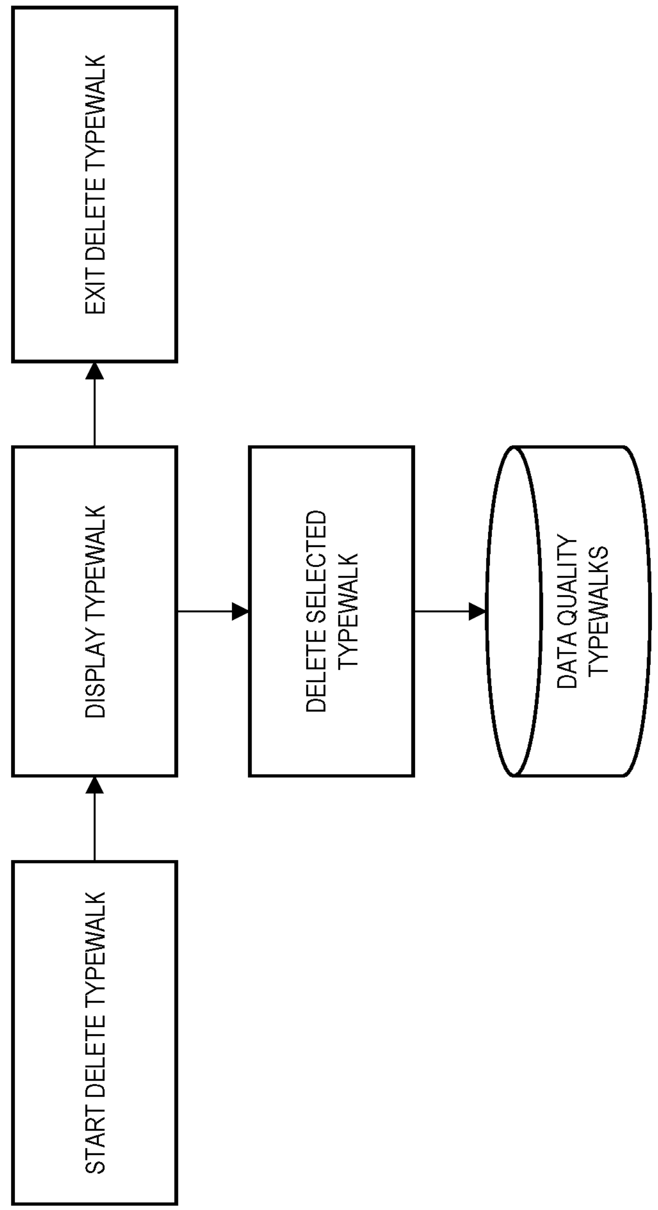
FIG. 5.41-5

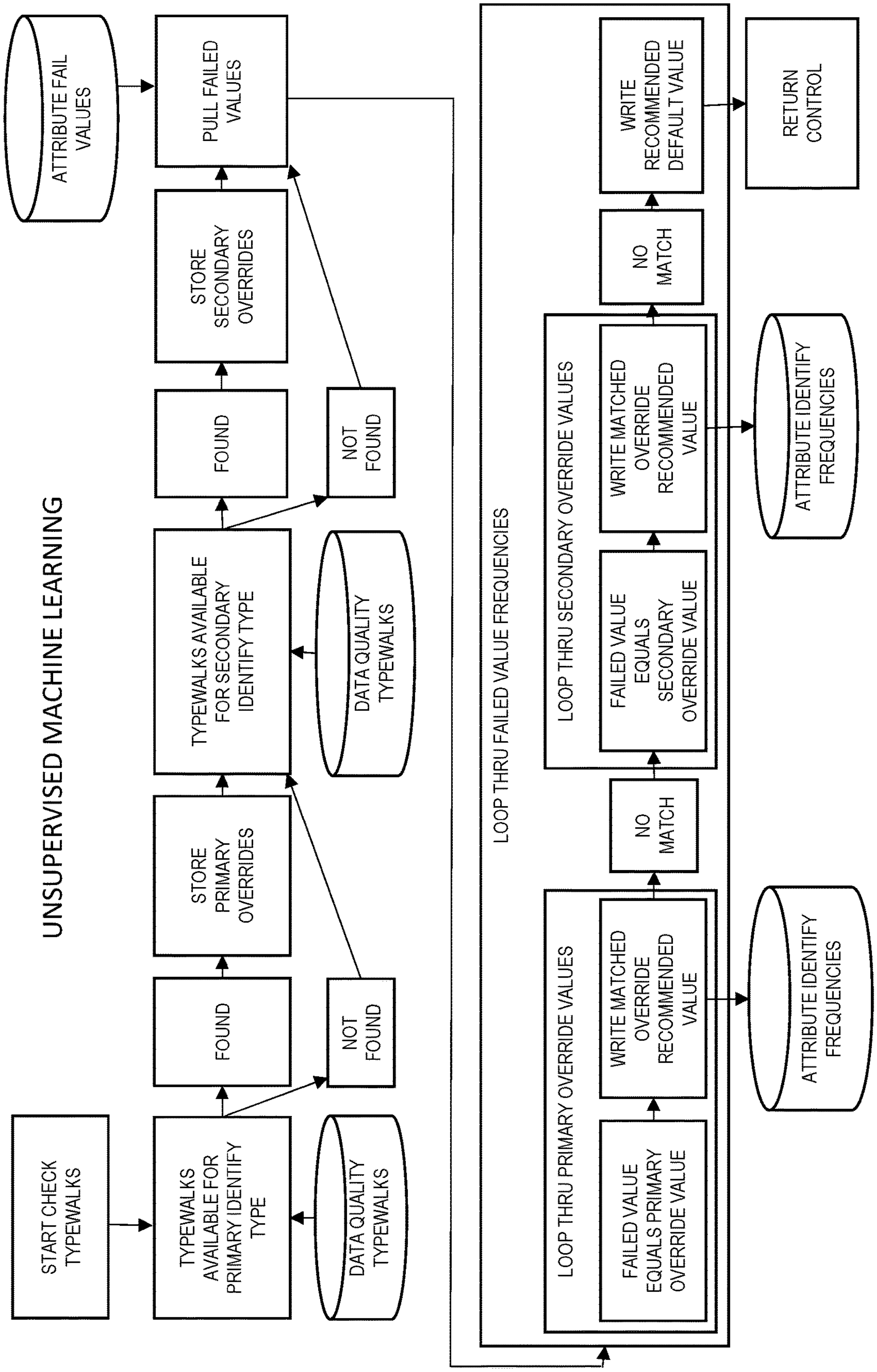
FIG. 5.41-6

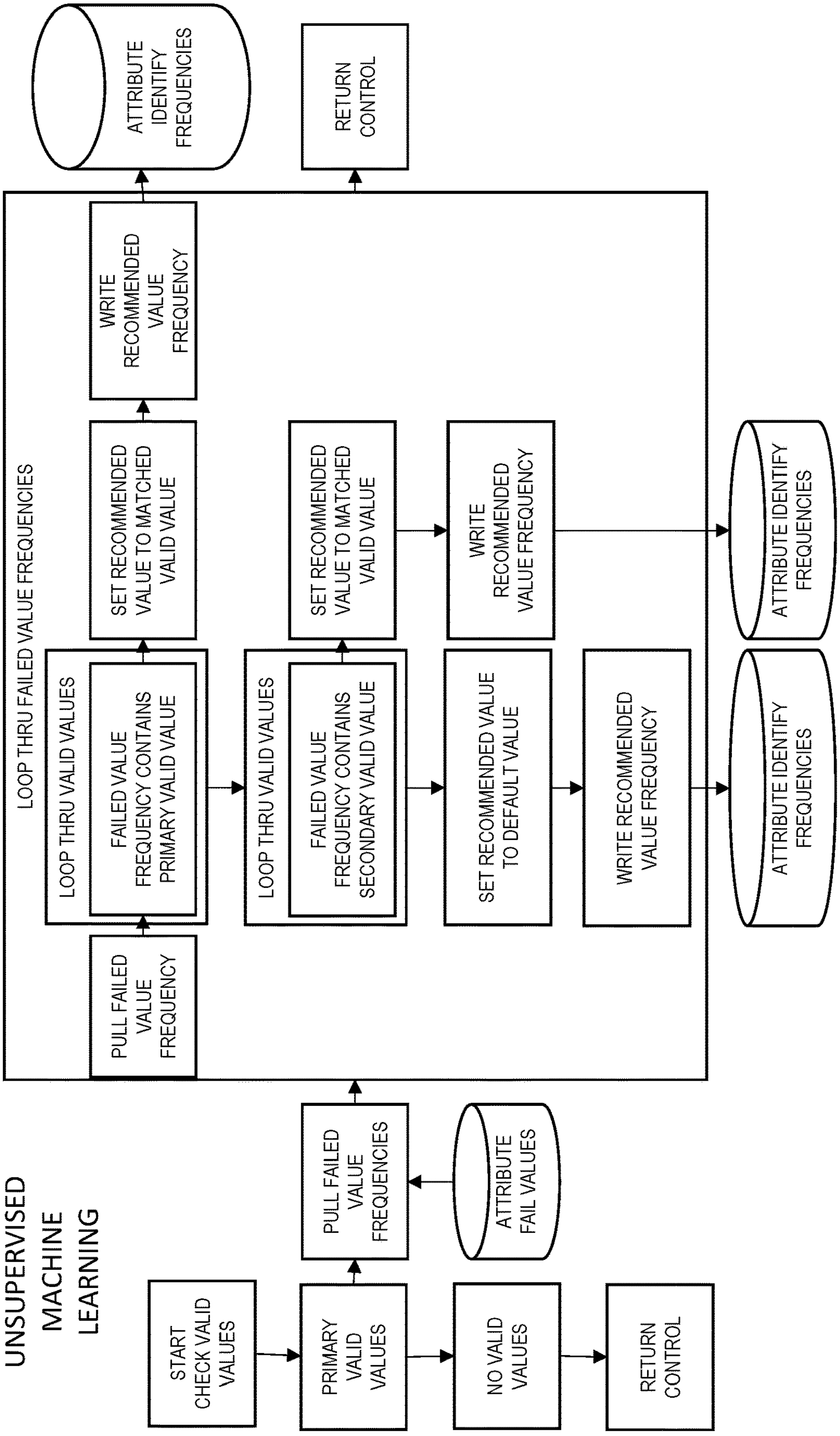
FIG. 5.42

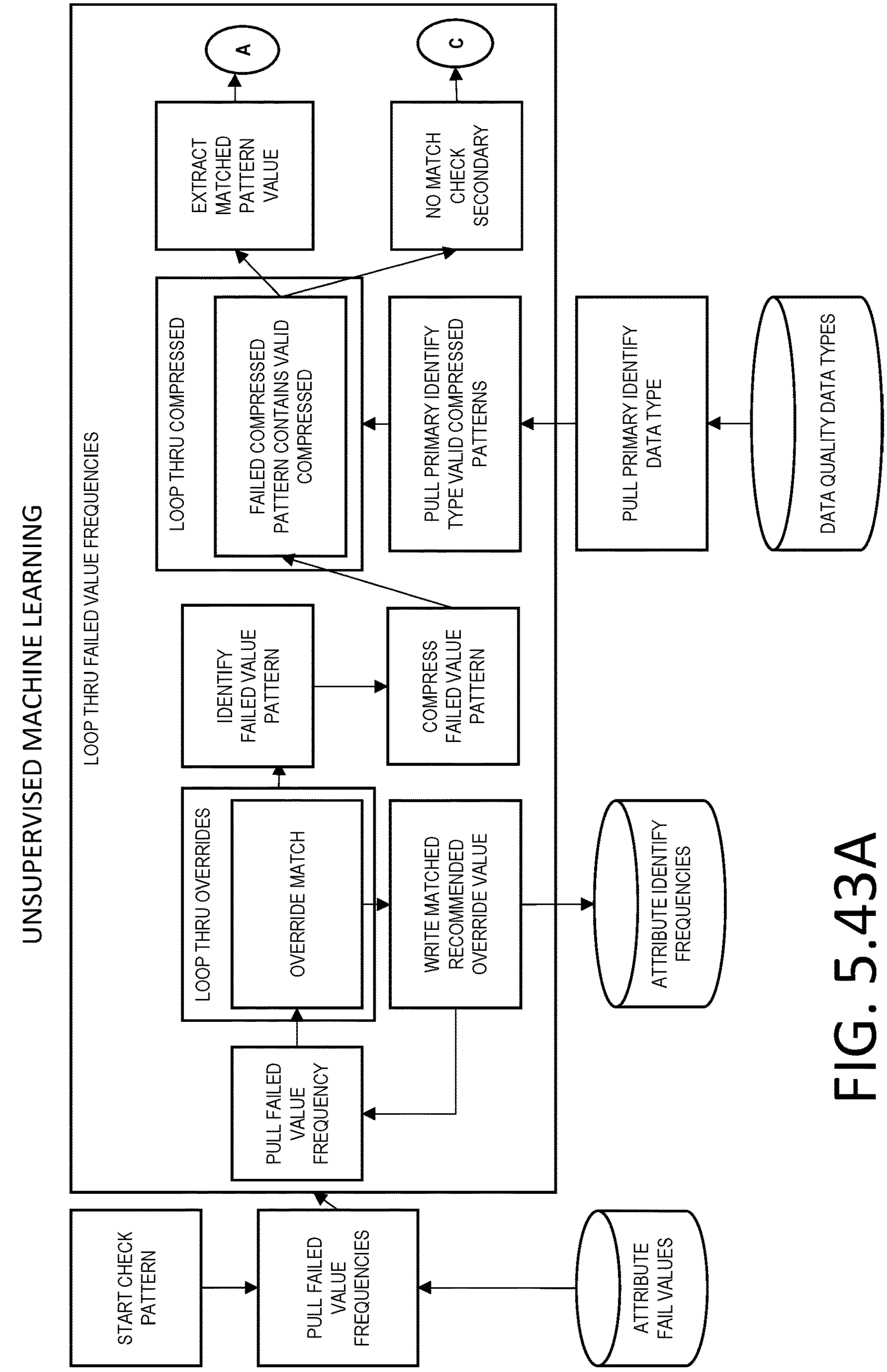
FIG. 5.43A

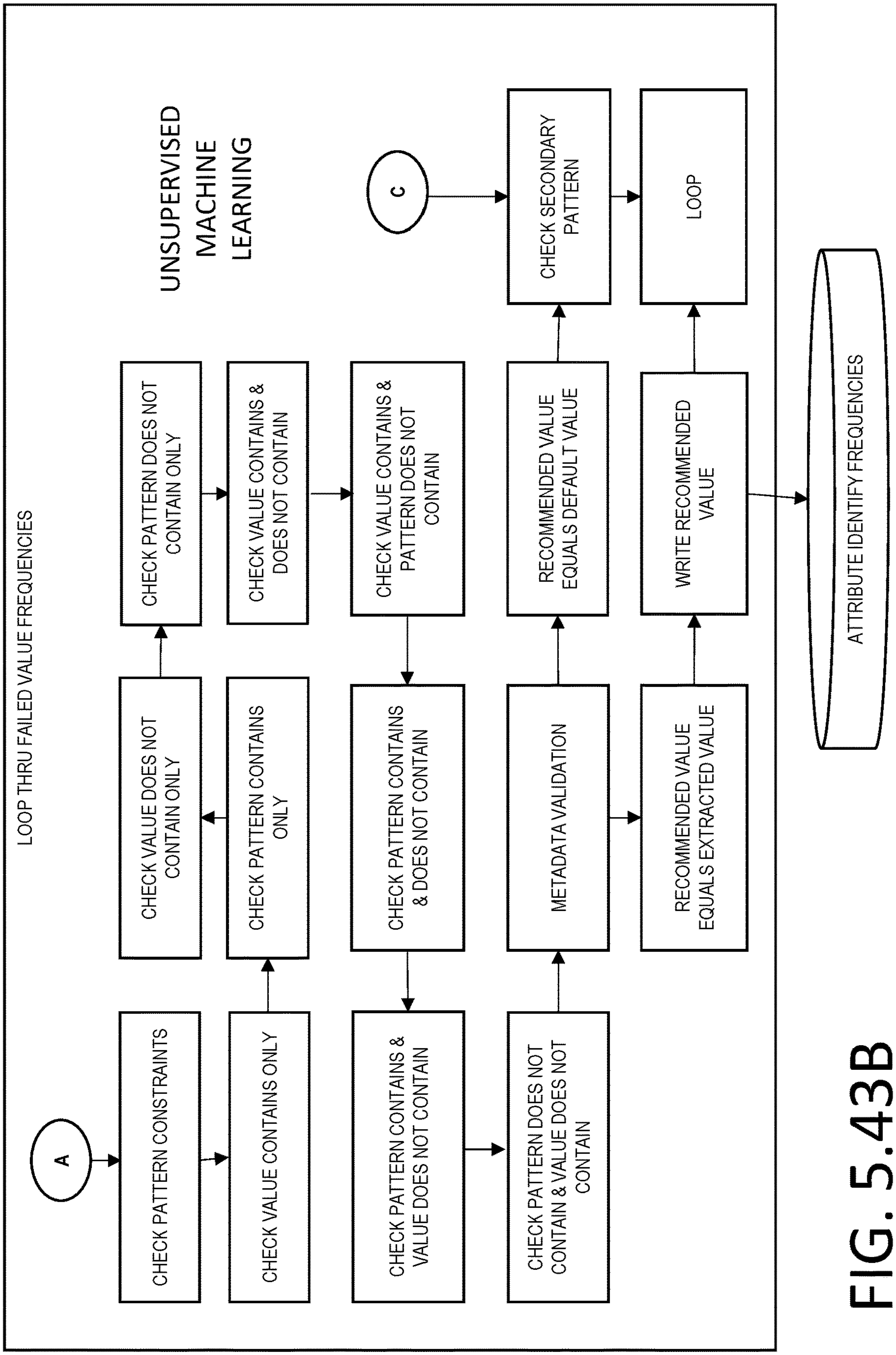
FIG. 5.43B

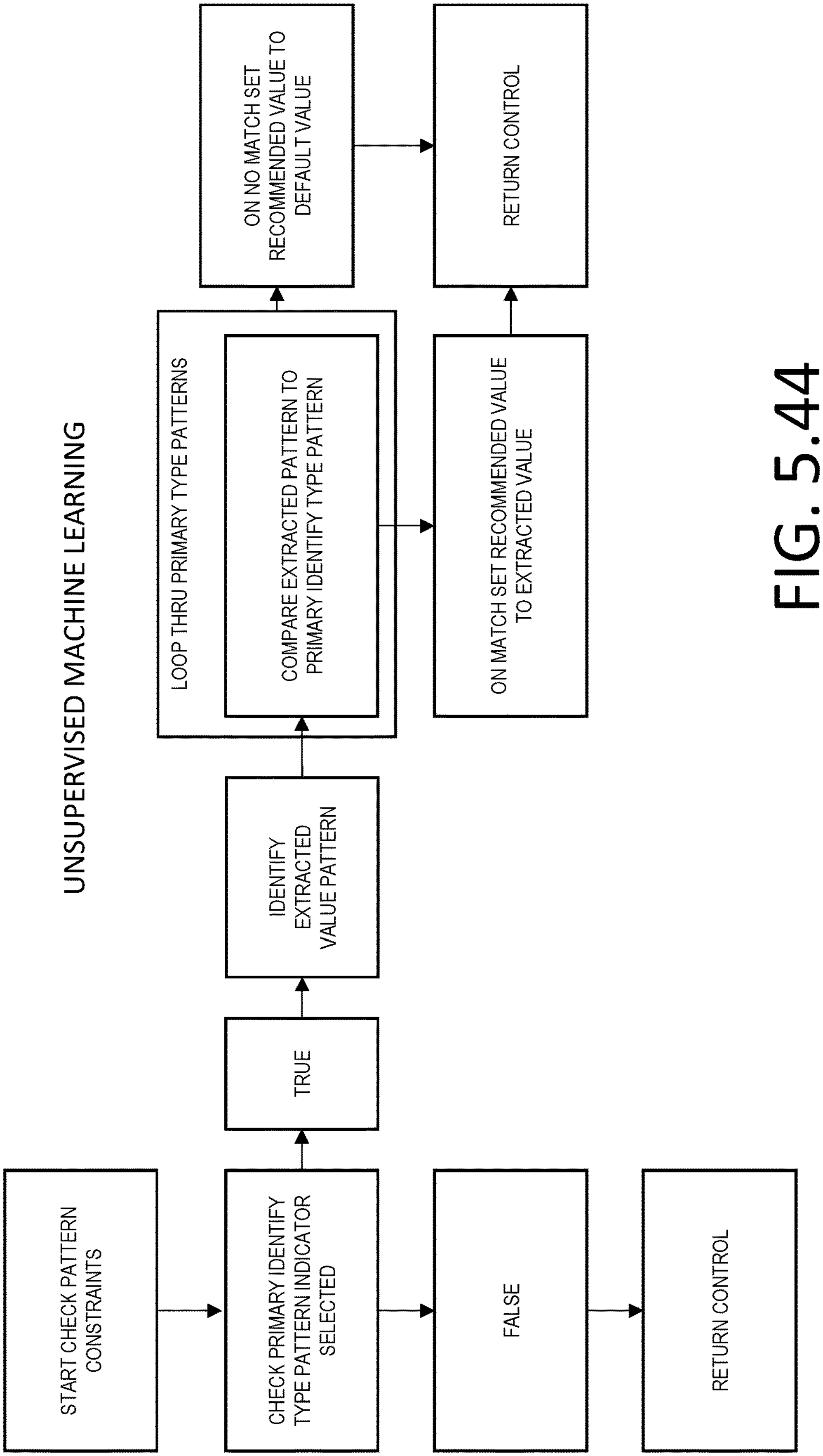

FIG. 5.44

UNSUPERVISED MACHINE LEARNING

START CHECK PATTERN CONSTRAINTS

CHECK PRIMARY IDENTIFY TYPE PATTERN INDICATOR SELECTED

FALSE

RETURN CONTROL

TRUE

IDENTIFY EXTRACTED VALUE PATTERN

LOOP THRU PRIMARY TYPE PATTERNS

COMPARE EXTRACTED PATTERN TO PRIMARY IDENTIFY TYPE PATTERN

ON MATCH SET RECOMMENDED VALUE TO EXTRACTED VALUE

RETURN CONTROL

ON NO MATCH SET RECOMMENDED VALUE TO DEFAULT VALUE

RETURN CONTROL

FIG. 5.44

UNSUPERVISED MACHINE LEARNING

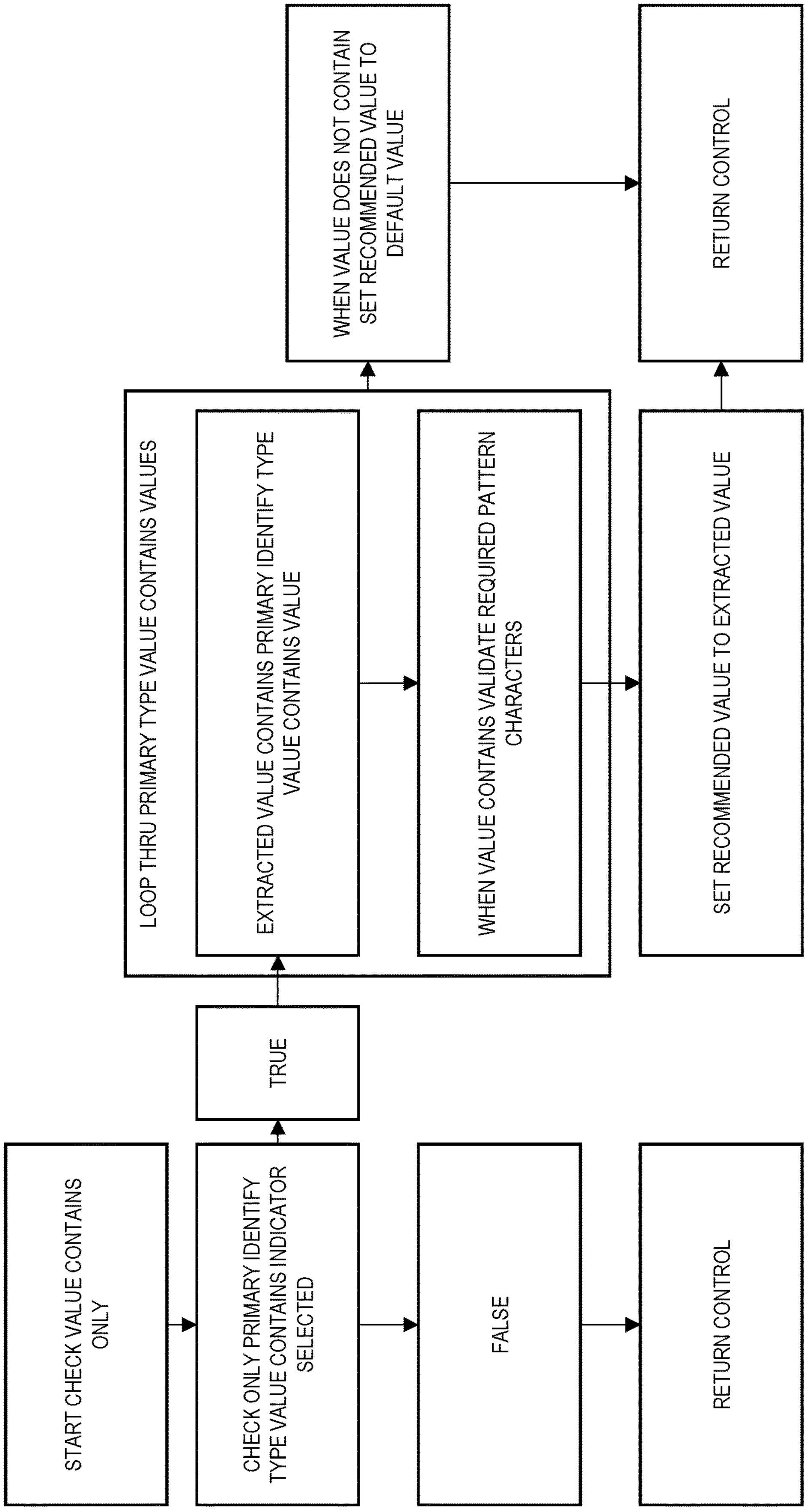

FIG. 5.45

START CHECK VALUE CONTAINS ONLY

CHECK ONLY PRIMARY IDENTIFY TYPE VALUE CONTAINS INDICATOR SELECTED

TRUE

FALSE

RETURN CONTROL

LOOP THRU PRIMARY TYPE VALUE CONTAINS VALUES

EXTRACTED VALUE CONTAINS PRIMARY IDENTIFY TYPE VALUE CONTAINS VALUE

WHEN VALUE CONTAINS VALIDATE REQUIRED PATTERN CHARACTERS

SET RECOMMENDED VALUE TO EXTRACTED VALUE

WHEN VALUE DOES NOT CONTAIN SET RECOMMENDED VALUE TO DEFAULT VALUE

RETURN CONTROL

FIG. 5.45

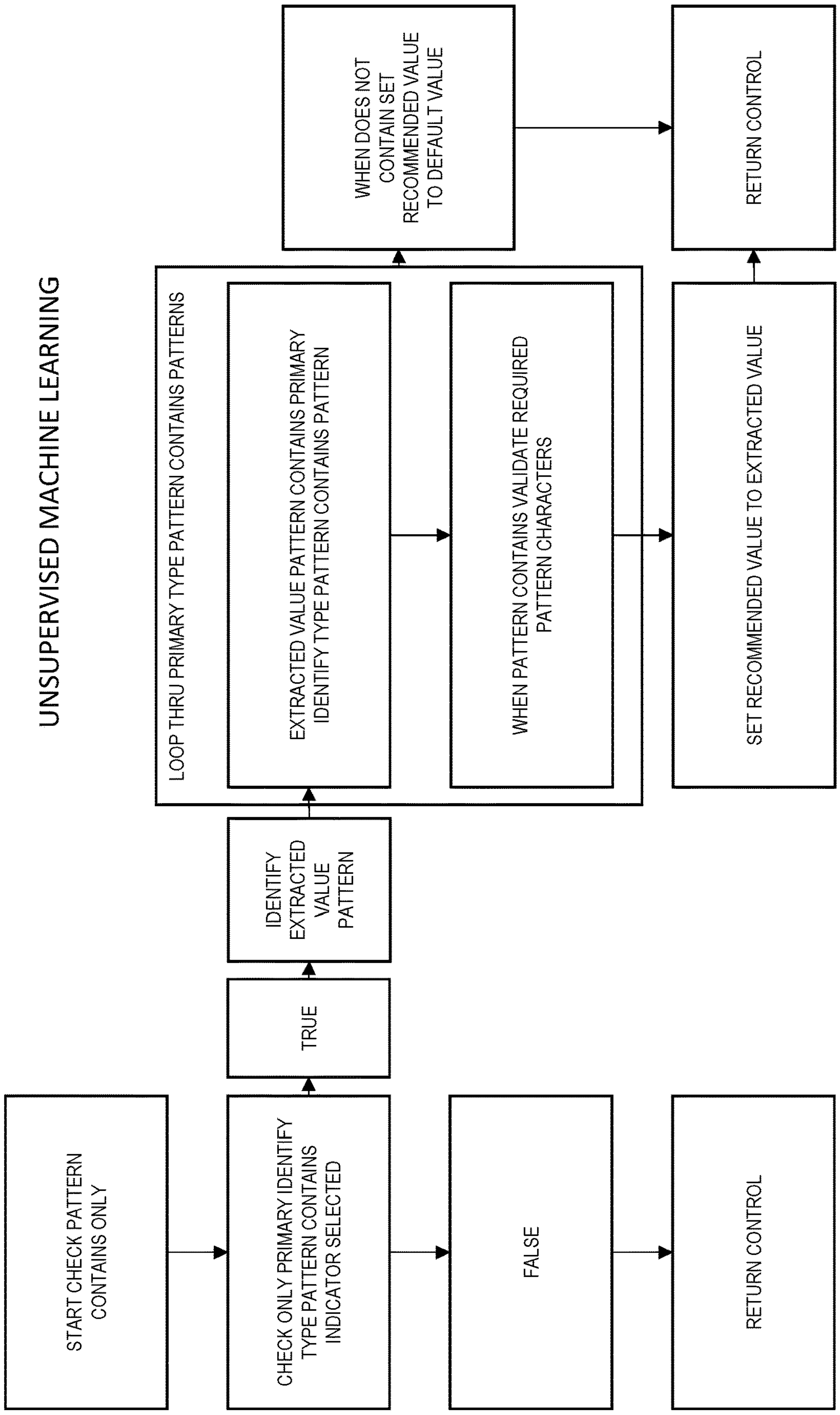

FIG. 5.46

UNSUPERVISED MACHINE LEARNING

START CHECK PATTERN CONTAINS ONLY

CHECK ONLY PRIMARY IDENTIFY TYPE PATTERN CONTAINS INDICATOR SELECTED

TRUE

IDENTIFY EXTRACTED VALUE PATTERN

LOOP THRU PRIMARY TYPE PATTERN CONTAINS PATTERNS

EXTRACTED VALUE PATTERN CONTAINS PRIMARY IDENTIFY TYPE PATTERN CONTAINS PATTERN

WHEN PATTERN CONTAINS VALIDATE REQUIRED PATTERN CHARACTERS

WHEN DOES NOT CONTAIN SET RECOMMENDED VALUE TO DEFAULT VALUE

FALSE

RETURN CONTROL

SET RECOMMENDED VALUE TO EXTRACTED VALUE

RETURN CONTROL

FIG. 5.46

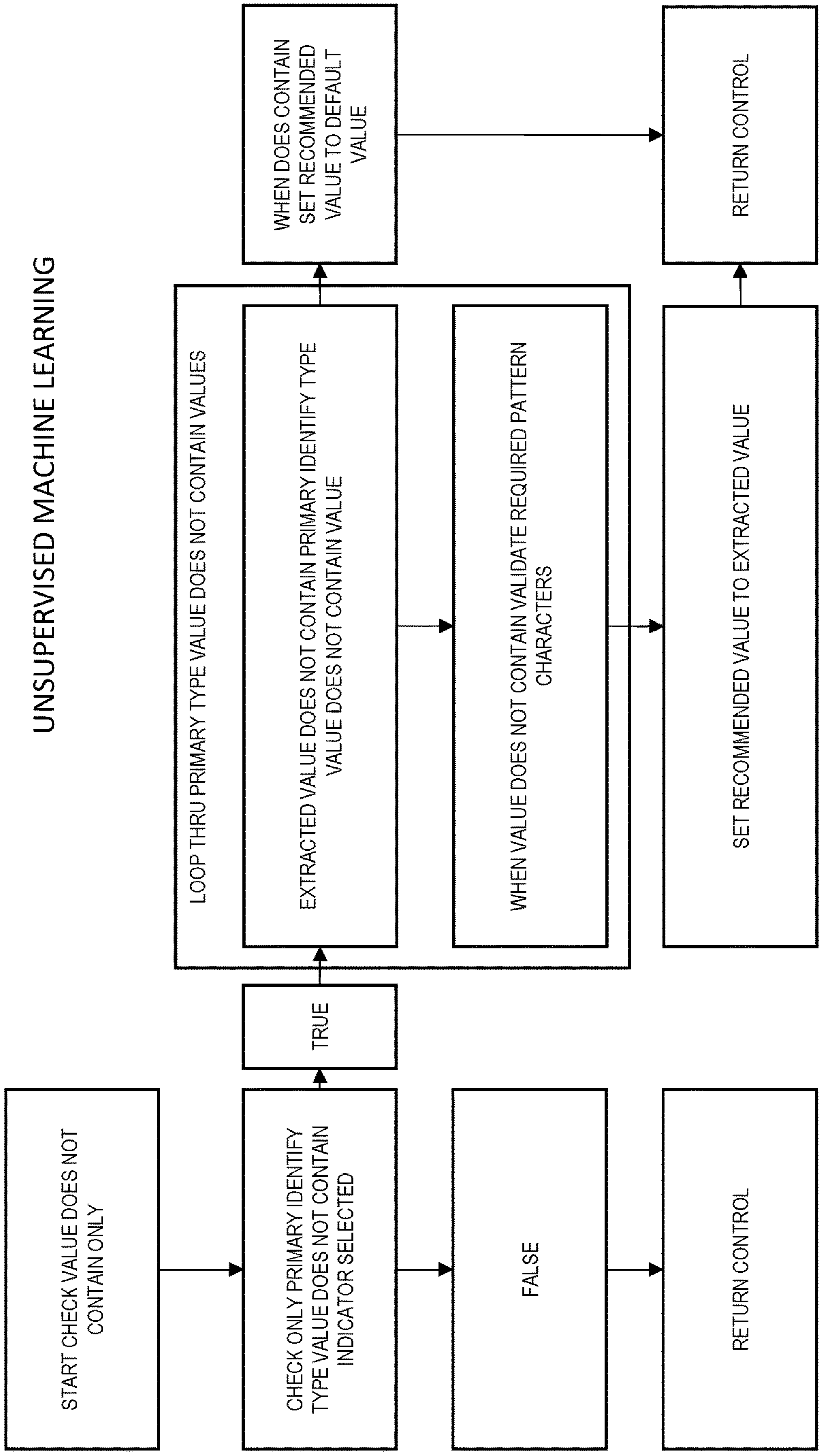
FIG. 5.47

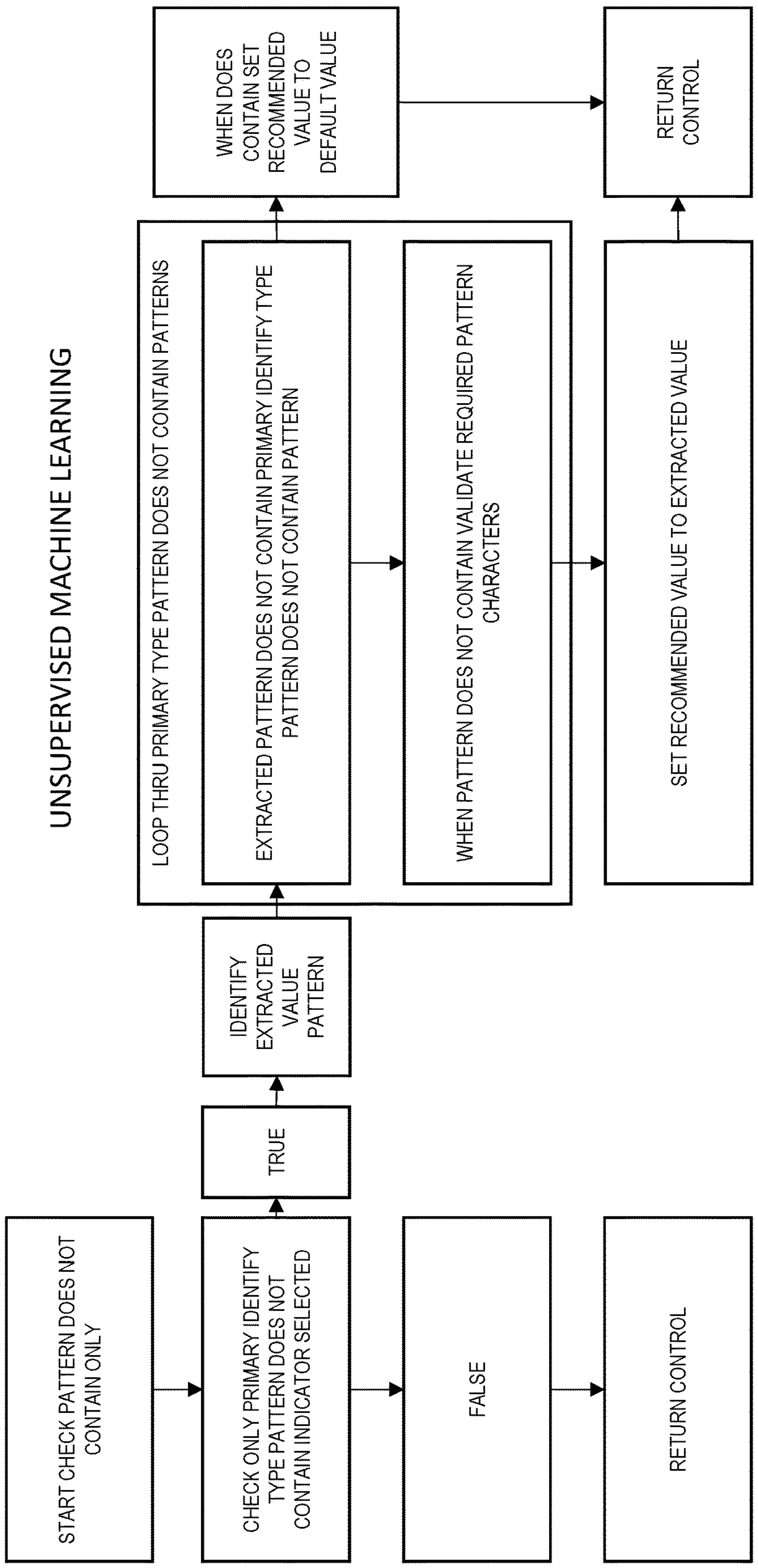

FIG. 5.48

UNSUPERVISED MACHINE LEARNING

START CHECK PATTERN DOES NOT CONTAIN ONLY

CHECK ONLY PRIMARY IDENTIFY TYPE PATTERN DOES NOT CONTAIN INDICATOR SELECTED

TRUE

IDENTIFY EXTRACTED VALUE PATTERN

LOOP THRU PRIMARY TYPE PATTERN DOES NOT CONTAIN PATTERNS

EXTRACTED PATTERN DOES NOT CONTAIN PRIMARY IDENTIFY TYPE PATTERN DOES NOT CONTAIN PATTERN

WHEN PATTERN DOES NOT CONTAIN VALIDATE REQUIRED PATTERN CHARACTERS

WHEN DOES CONTAIN SET RECOMMENDED VALUE TO DEFAULT VALUE

SET RECOMMENDED VALUE TO EXTRACTED VALUE

RETURN CONTROL

FALSE

RETURN CONTROL

FIG. 5.48

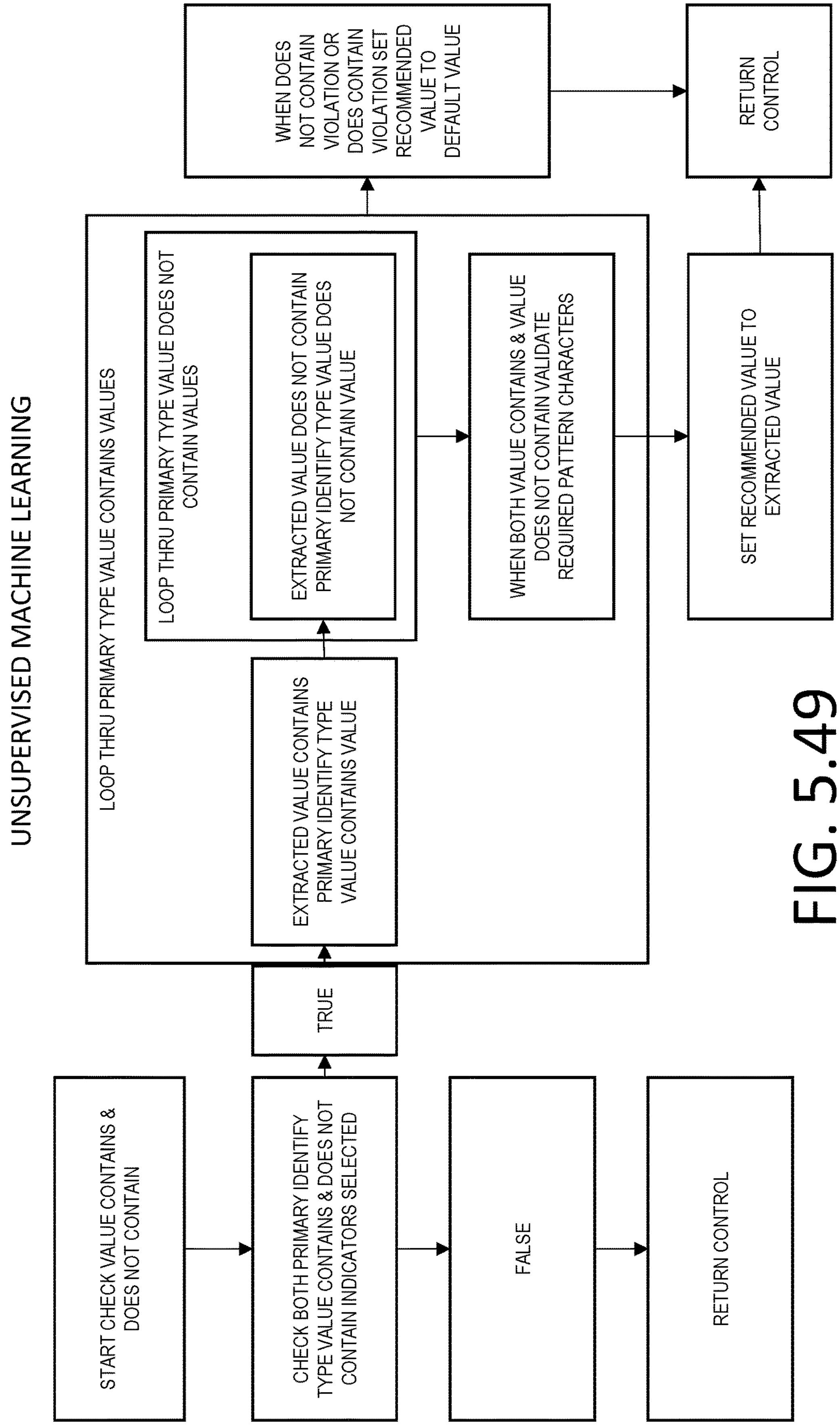

FIG. 5.49

UNSUPERVISED MACHINE LEARNING

START CHECK VALUE CONTAINS & DOES NOT CONTAIN

CHECK BOTH PRIMARY IDENTIFY TYPE VALUE CONTAINS & DOES NOT CONTAIN INDICATORS SELECTED

TRUE

LOOP THRU PRIMARY TYPE VALUE CONTAINS VALUES

EXTRACTED VALUE CONTAINS PRIMARY IDENTIFY TYPE VALUE CONTAINS VALUE

LOOP THRU PRIMARY TYPE VALUE DOES NOT CONTAIN VALUES

EXTRACTED VALUE DOES NOT CONTAIN PRIMARY IDENTIFY TYPE VALUE DOES NOT CONTAIN VALUE

WHEN BOTH VALUE CONTAINS & VALUE DOES NOT CONTAIN VALIDATE REQUIRED PATTERN CHARACTERS

SET RECOMMENDED VALUE TO EXTRACTED VALUE

WHEN DOES NOT CONTAIN VIOLATION OR DOES CONTAIN VIOLATION SET RECOMMENDED VALUE TO DEFAULT VALUE

RETURN CONTROL

FALSE

RETURN CONTROL

FIG. 5.49

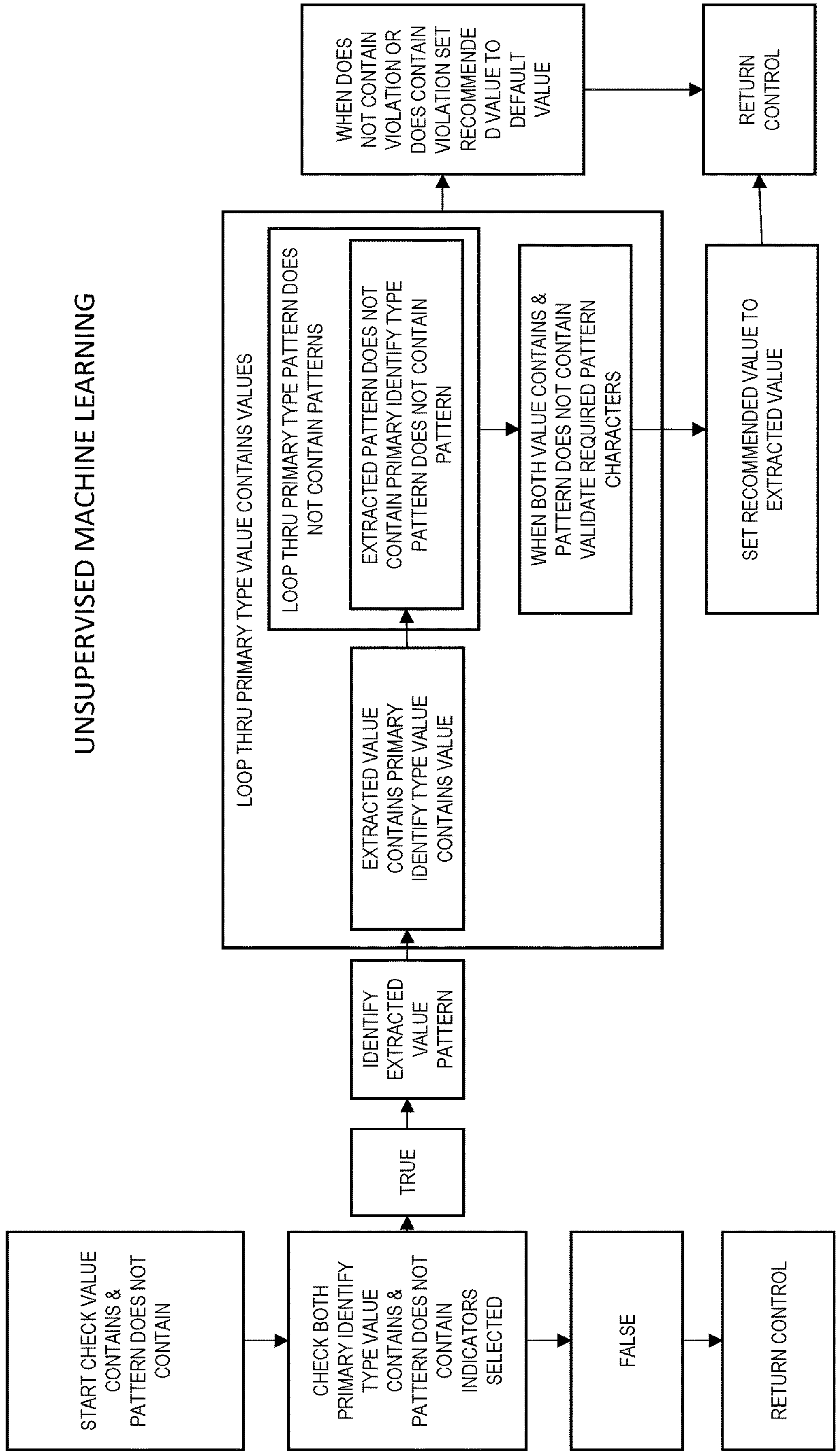
FIG. 5.50

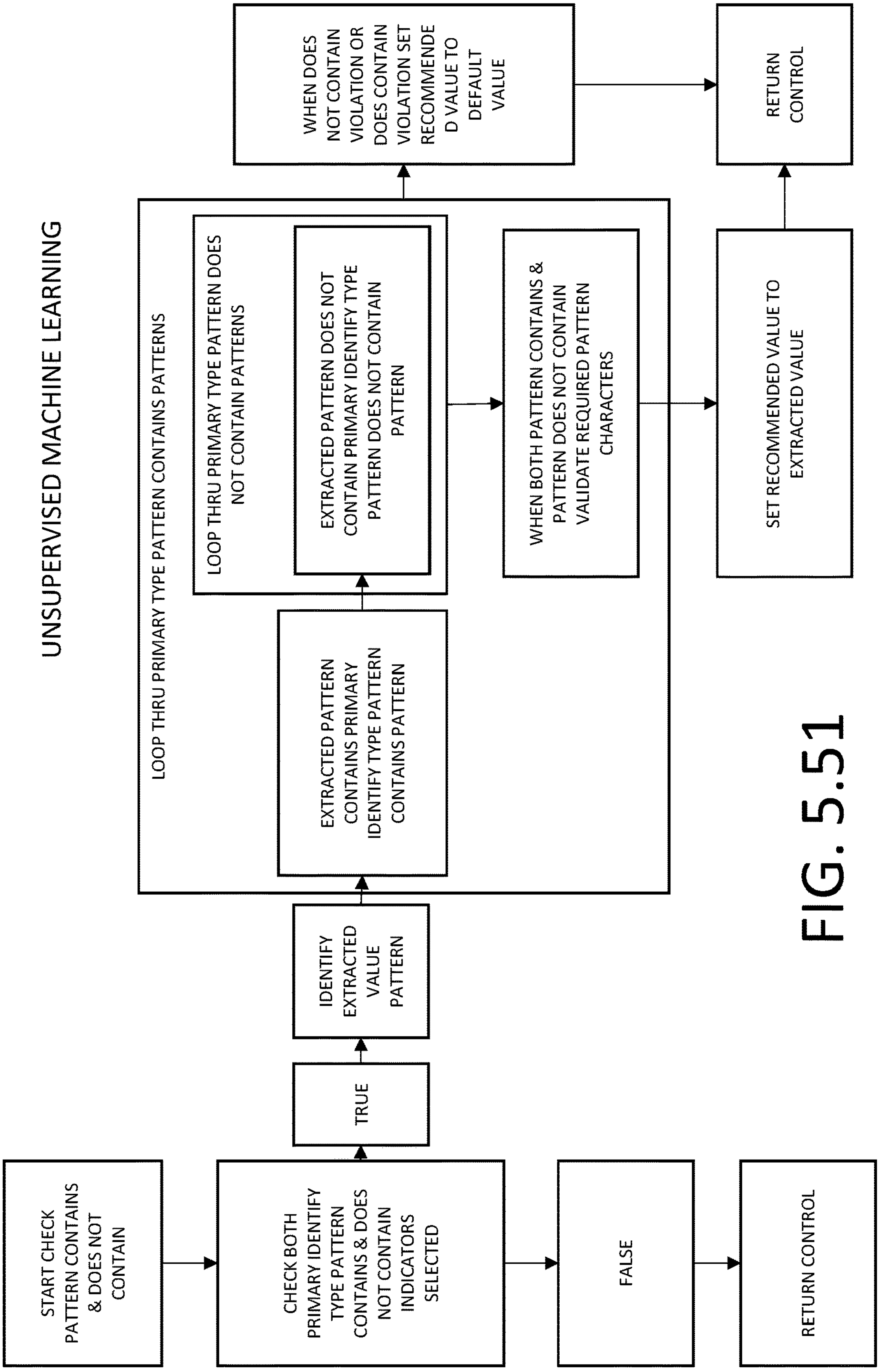

FIG. 5.51

UNSUPERVISED MACHINE LEARNING

START CHECK PATTERN CONTAINS & DOES NOT CONTAIN

CHECK BOTH PRIMARY IDENTIFY TYPE PATTERN CONTAINS & DOES NOT CONTAIN INDICATORS SELECTED

TRUE

IDENTIFY EXTRACTED VALUE PATTERN

LOOP THRU PRIMARY TYPE PATTERN CONTAINS PATTERNS

EXTRACTED PATTERN CONTAINS PRIMARY IDENTIFY TYPE PATTERN CONTAINS PATTERN

LOOP THRU PRIMARY TYPE PATTERN DOES NOT CONTAIN PATTERNS

EXTRACTED PATTERN DOES NOT CONTAIN PRIMARY IDENTIFY TYPE PATTERN DOES NOT CONTAIN PATTERN

WHEN BOTH PATTERN CONTAINS & PATTERN DOES NOT CONTAIN VALIDATE REQUIRED PATTERN CHARACTERS

WHEN DOES NOT CONTAIN VIOLATION OR DOES CONTAIN VIOLATION SET RECOMMENDE D VALUE TO DEFAULT VALUE

SET RECOMMENDED VALUE TO EXTRACTED VALUE

RETURN CONTROL

FALSE

RETURN CONTROL

FIG. 5.51

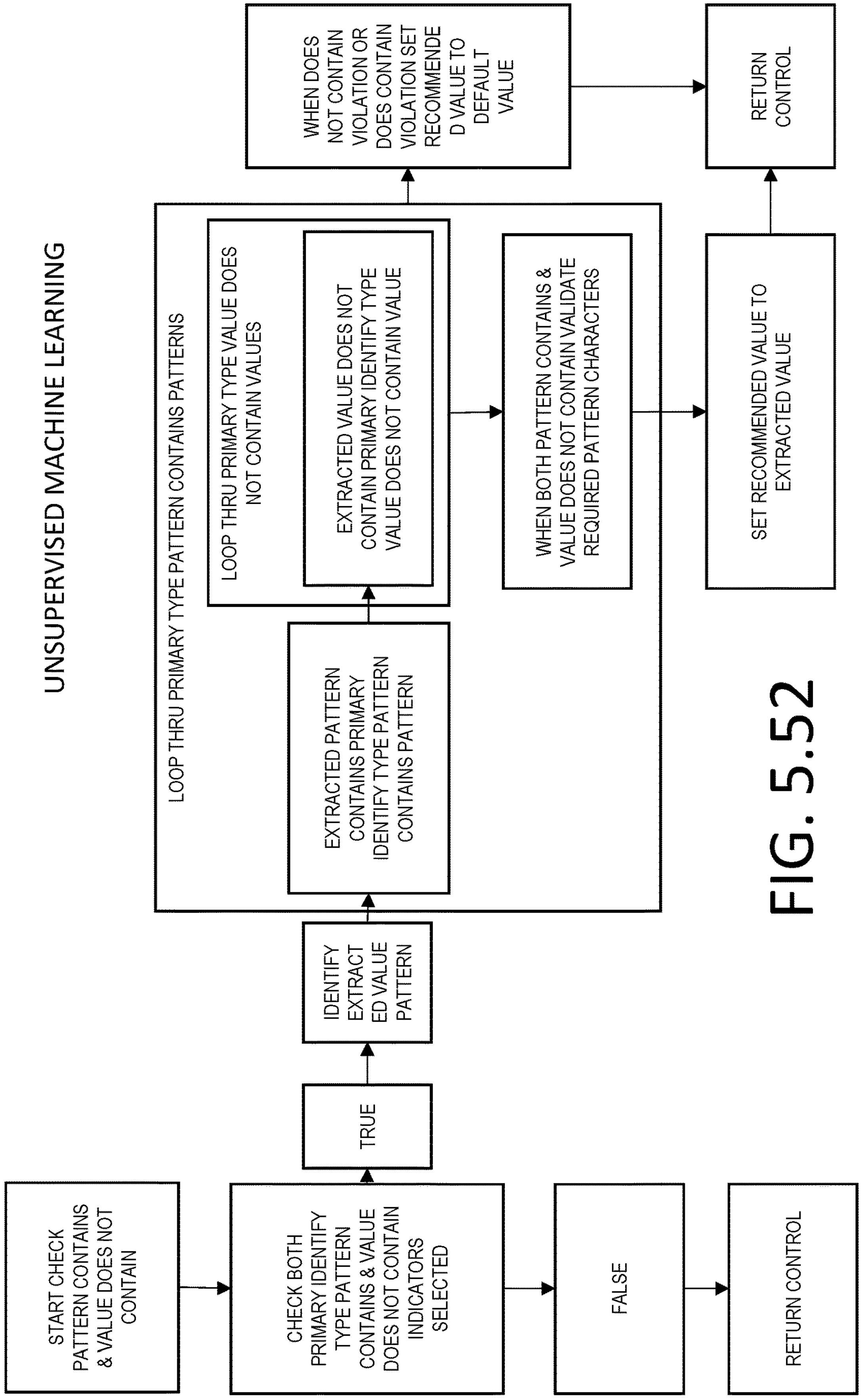
FIG. 5.52

UNSUPERVISED MACHINE LEARNING
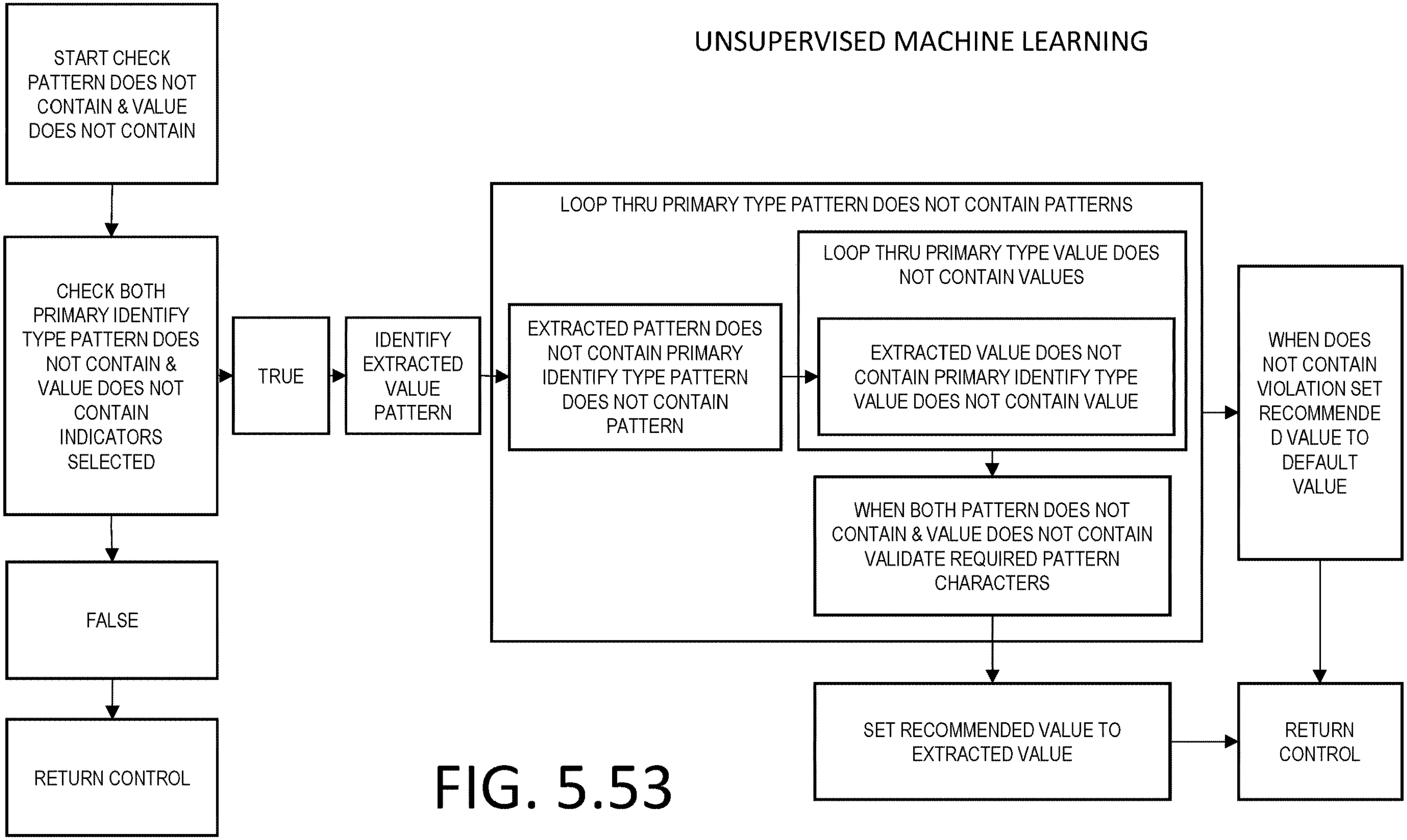
FIG. 5.53

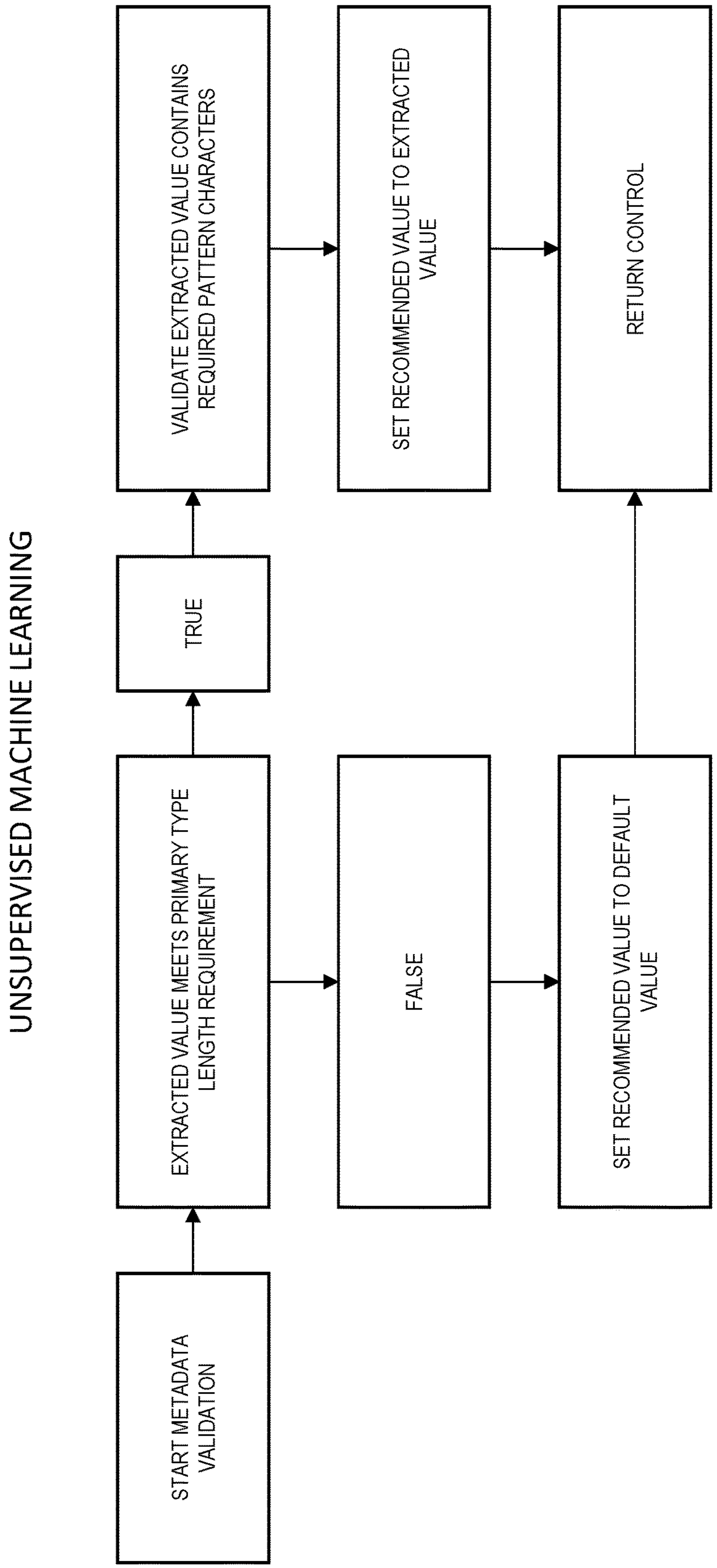
FIG. 5.54

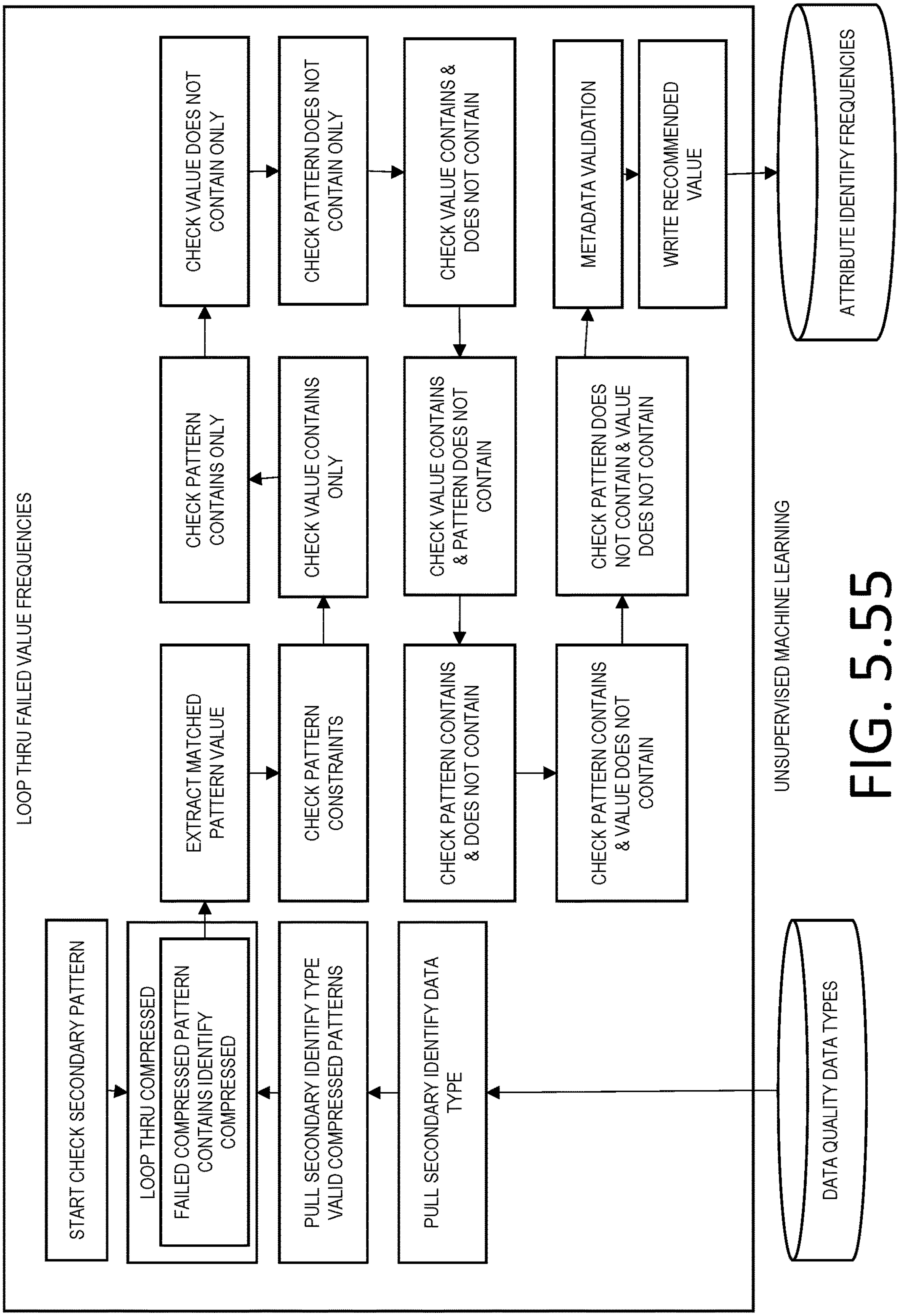
FIG. 5.55

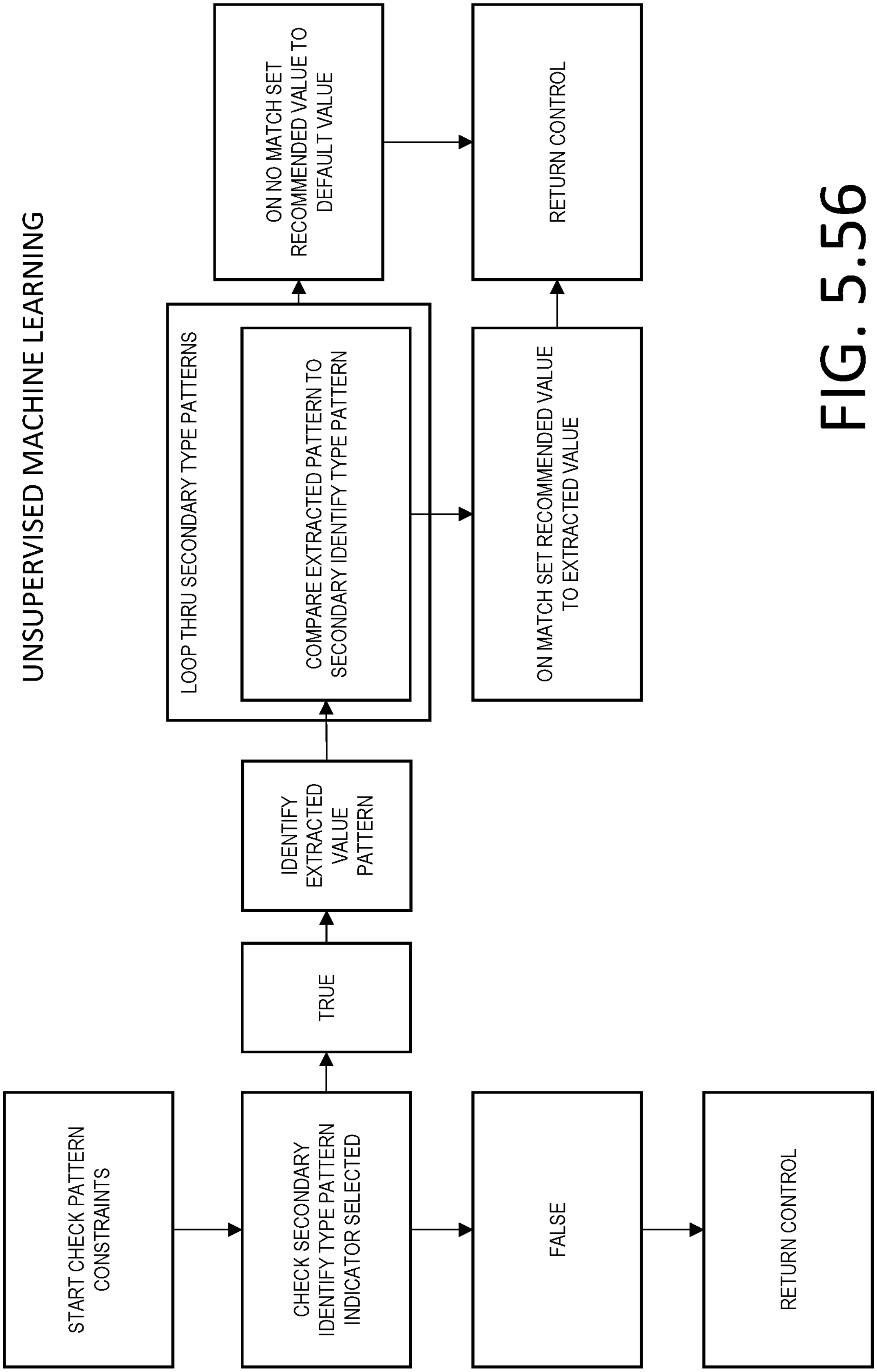
FIG. 5.56

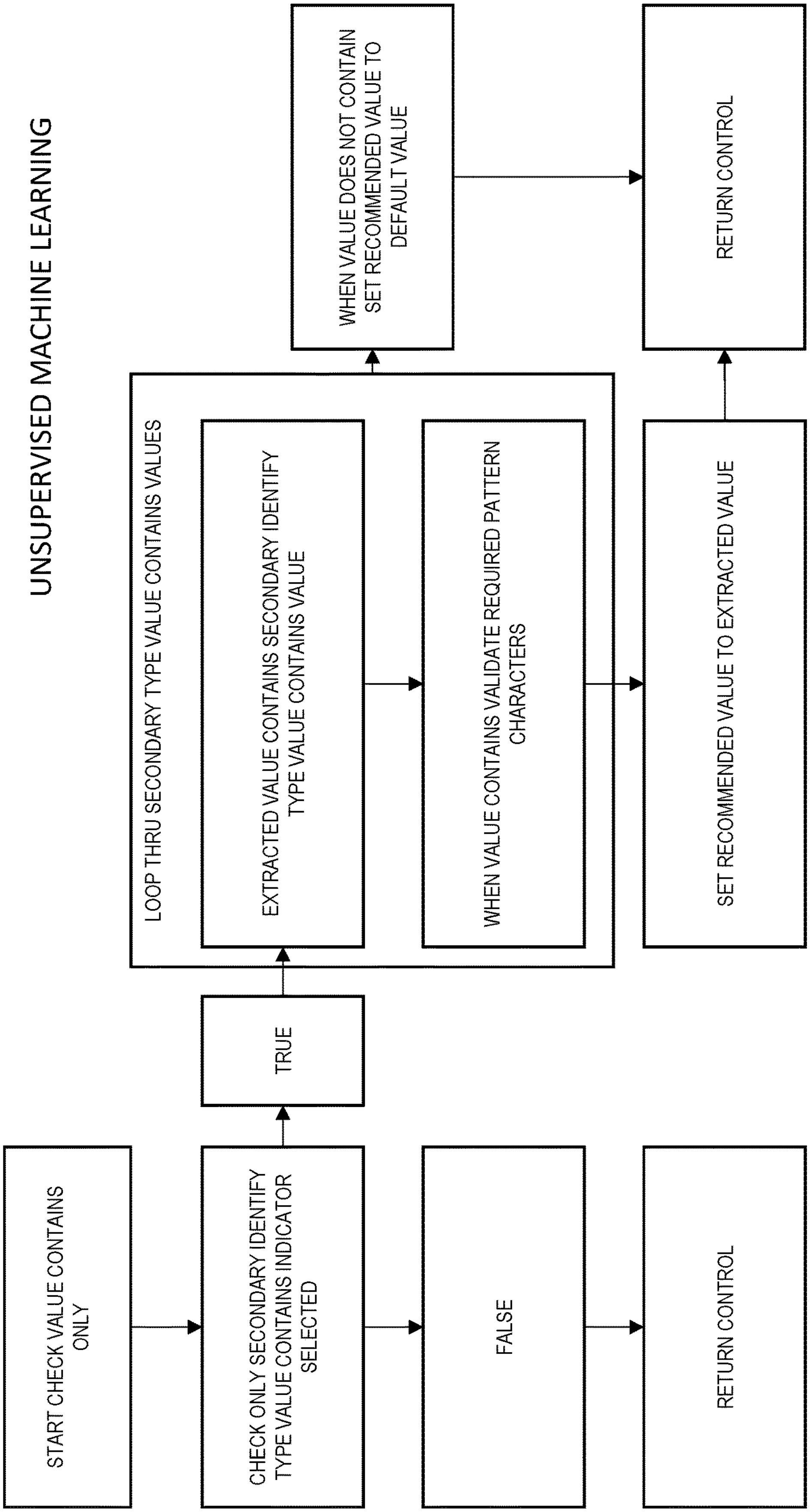

FIG. 5.57

UNSUPERVISED MACHINE LEARNING

START CHECK VALUE CONTAINS ONLY

CHECK ONLY SECONDARY IDENTIFY TYPE VALUE CONTAINS INDICATOR SELECTED

TRUE

LOOP THRU SECONDARY TYPE VALUE CONTAINS VALUES

EXTRACTED VALUE CONTAINS SECONDARY IDENTIFY TYPE VALUE CONTAINS VALUE

WHEN VALUE CONTAINS VALIDATE REQUIRED PATTERN CHARACTERS

WHEN VALUE DOES NOT CONTAIN SET RECOMMENDED VALUE TO DEFAULT VALUE

FALSE

RETURN CONTROL

SET RECOMMENDED VALUE TO EXTRACTED VALUE

RETURN CONTROL

FIG. 5.57

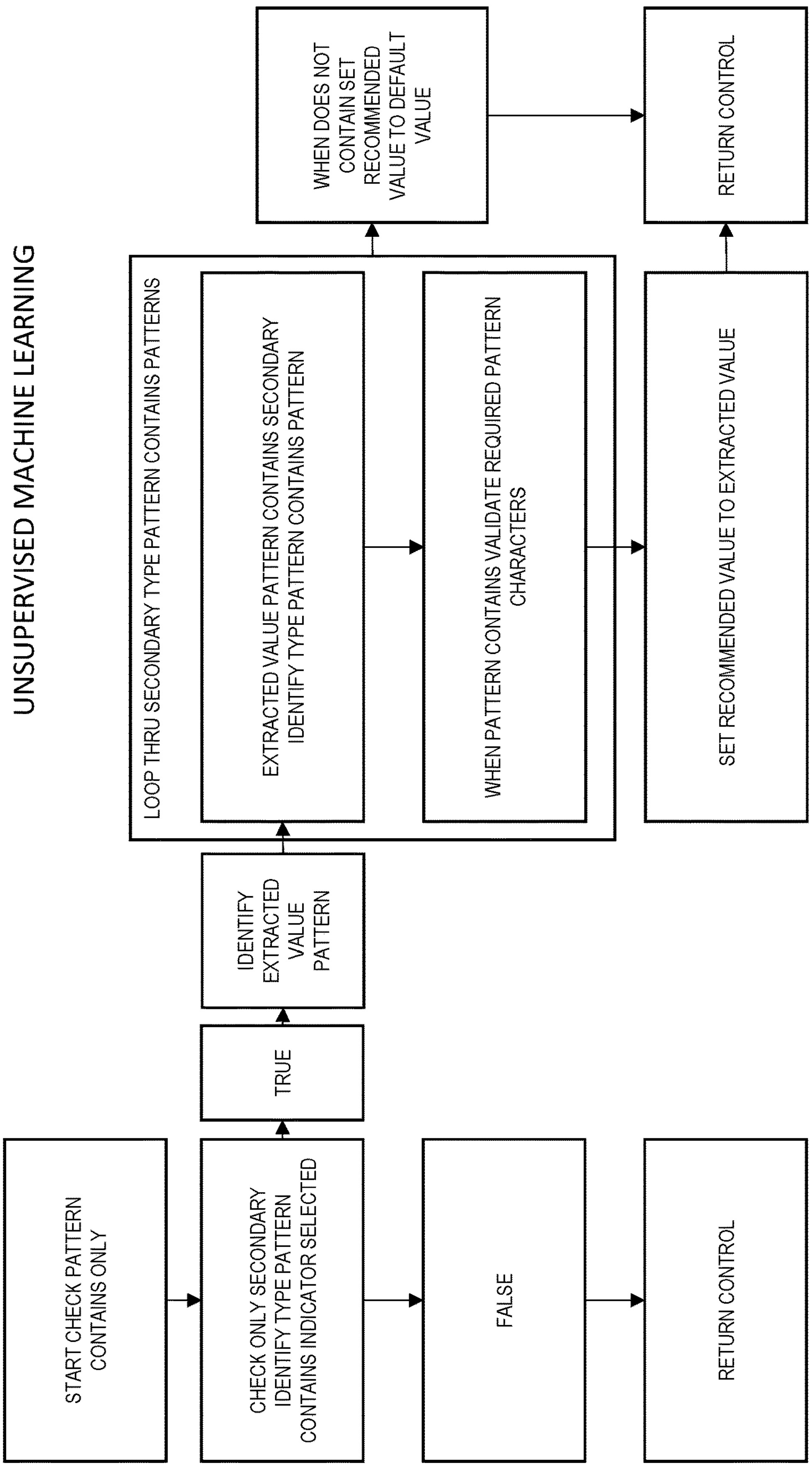
FIG. 5.58

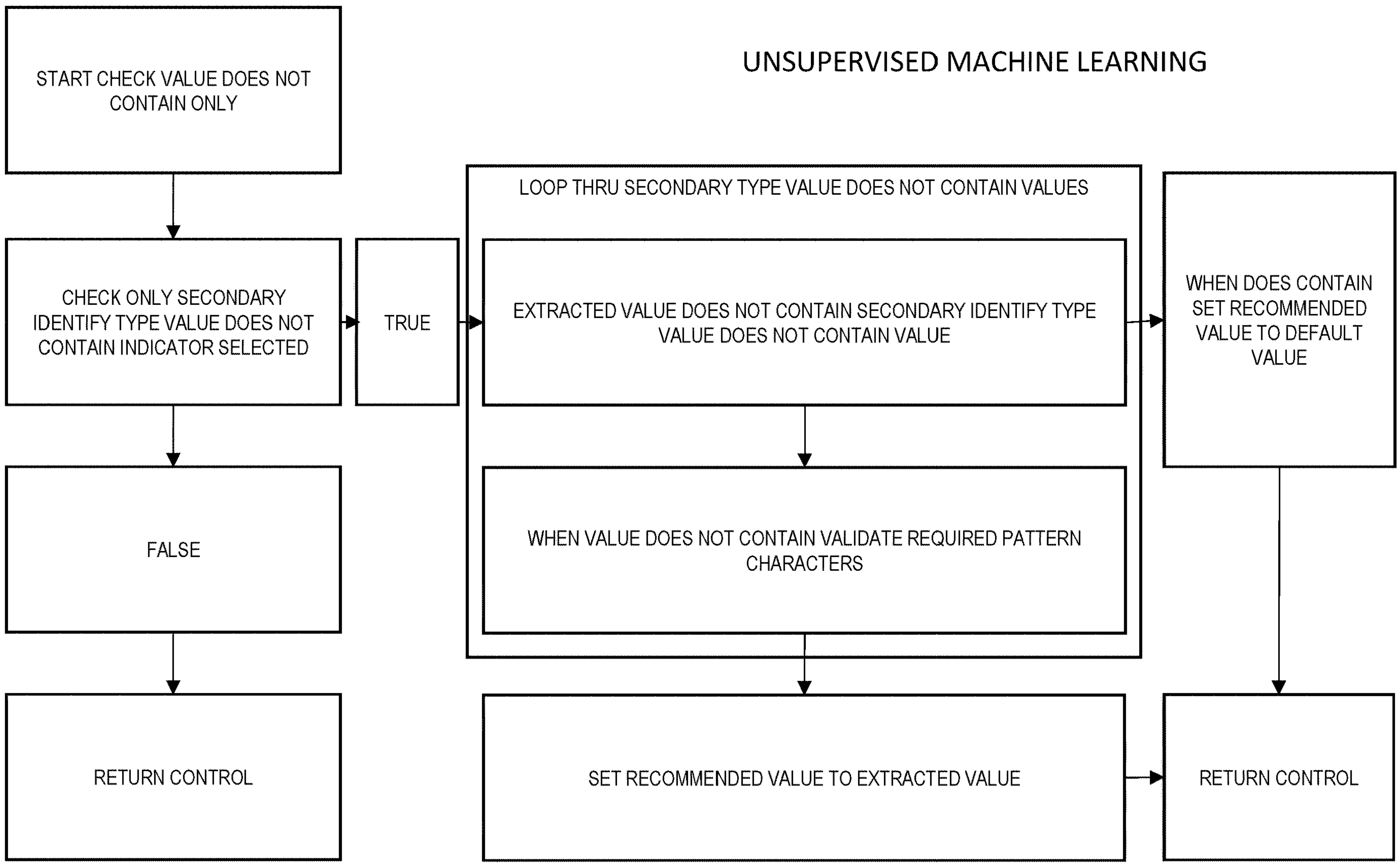
FIG. 5.59

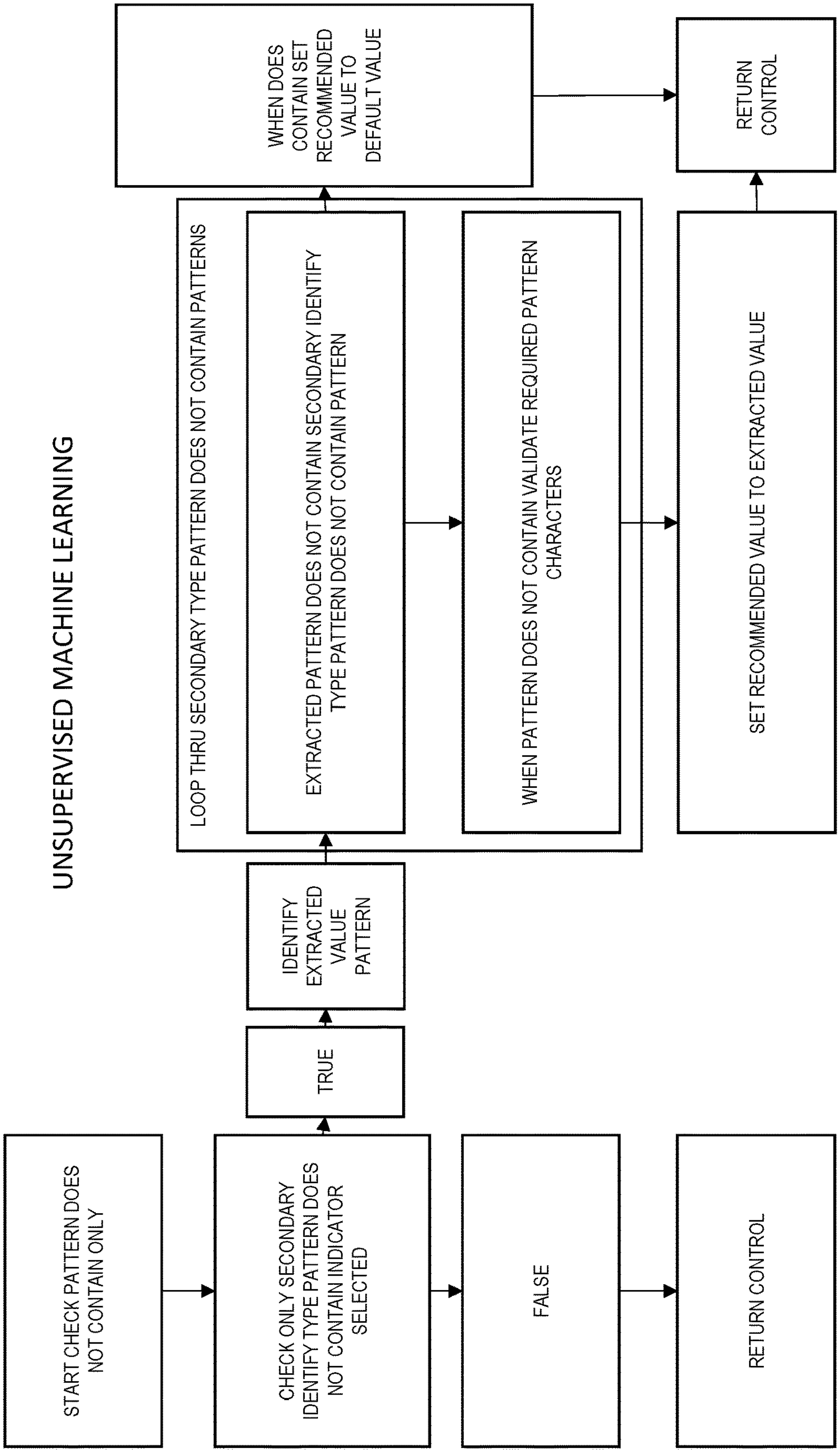

FIG. 5.60

UNSUPERVISED MACHINE LEARNING

START CHECK PATTERN DOES NOT CONTAIN ONLY

CHECK ONLY SECONDARY IDENTIFY TYPE PATTERN DOES NOT CONTAIN INDICATOR SELECTED

TRUE

IDENTIFY EXTRACTED VALUE PATTERN

LOOP THRU SECONDARY TYPE PATTERN DOES NOT CONTAIN PATTERNS

EXTRACTED PATTERN DOES NOT CONTAIN SECONDARY IDENTIFY TYPE PATTERN DOES NOT CONTAIN PATTERN

WHEN PATTERN DOES NOT CONTAIN VALIDATE REQUIRED PATTERN CHARACTERS

WHEN DOES CONTAIN SET RECOMMENDED VALUE TO DEFAULT VALUE

RETURN CONTROL

SET RECOMMENDED VALUE TO EXTRACTED VALUE

FALSE

RETURN CONTROL

FIG. 5.60

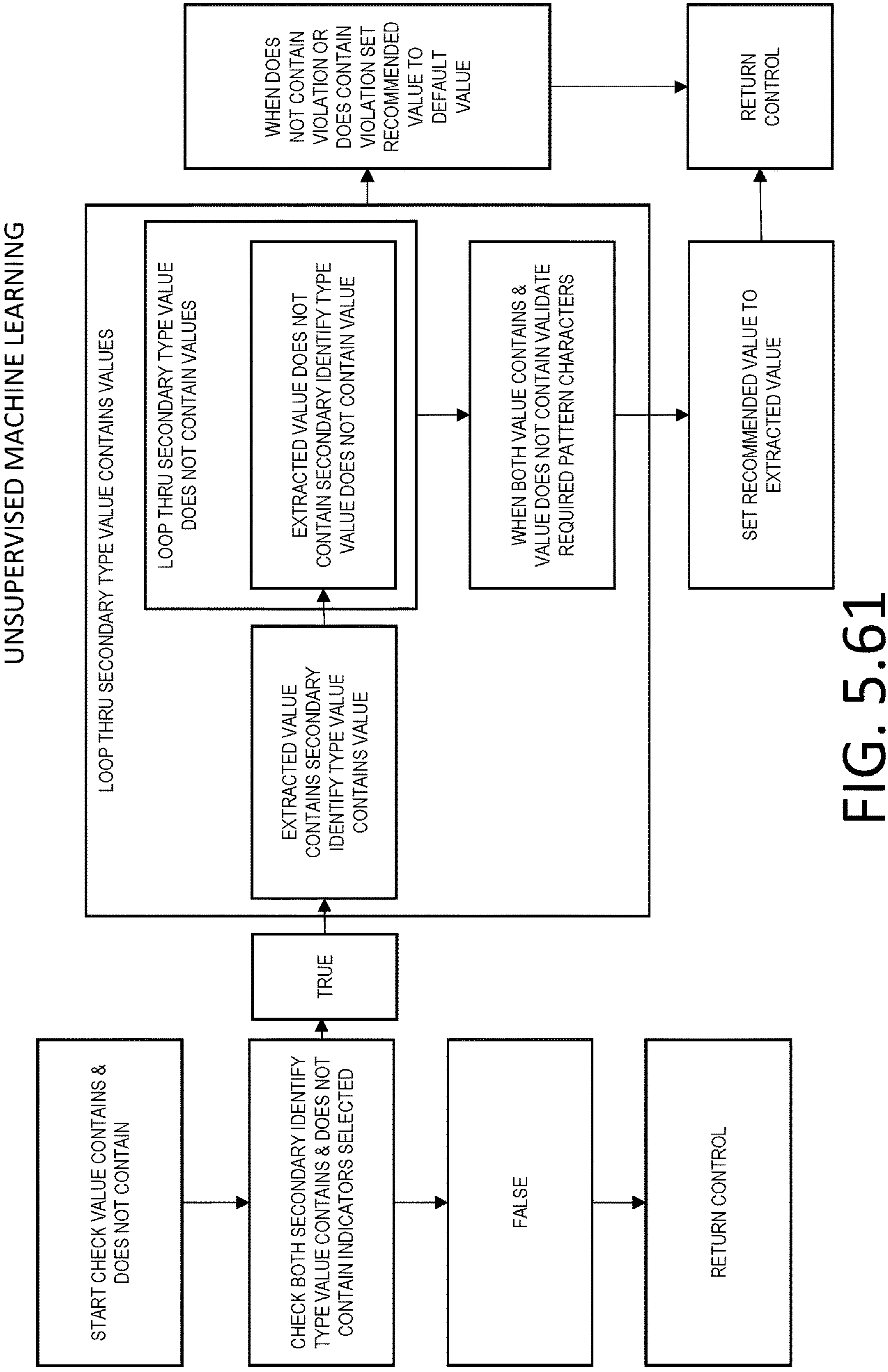

FIG. 5.61

UNSUPERVISED MACHINE LEARNING

START CHECK VALUE CONTAINS & DOES NOT CONTAIN

CHECK BOTH SECONDARY IDENTIFY TYPE VALUE CONTAINS & DOES NOT CONTAIN INDICATORS SELECTED

TRUE

FALSE

RETURN CONTROL

LOOP THRU SECONDARY TYPE VALUE CONTAINS VALUES

EXTRACTED VALUE CONTAINS SECONDARY IDENTIFY TYPE VALUE CONTAINS VALUE

LOOP THRU SECONDARY TYPE VALUE DOES NOT CONTAIN VALUES

EXTRACTED VALUE DOES NOT CONTAIN SECONDARY IDENTIFY TYPE VALUE DOES NOT CONTAIN VALUE

WHEN BOTH VALUE CONTAINS & VALUE DOES NOT CONTAIN VALIDATE REQUIRED PATTERN CHARACTERS

WHEN DOES NOT CONTAIN VIOLATION OR DOES CONTAIN VIOLATION SET RECOMMENDED VALUE TO DEFAULT VALUE

SET RECOMMENDED VALUE TO EXTRACTED VALUE

RETURN CONTROL

FIG. 5.61

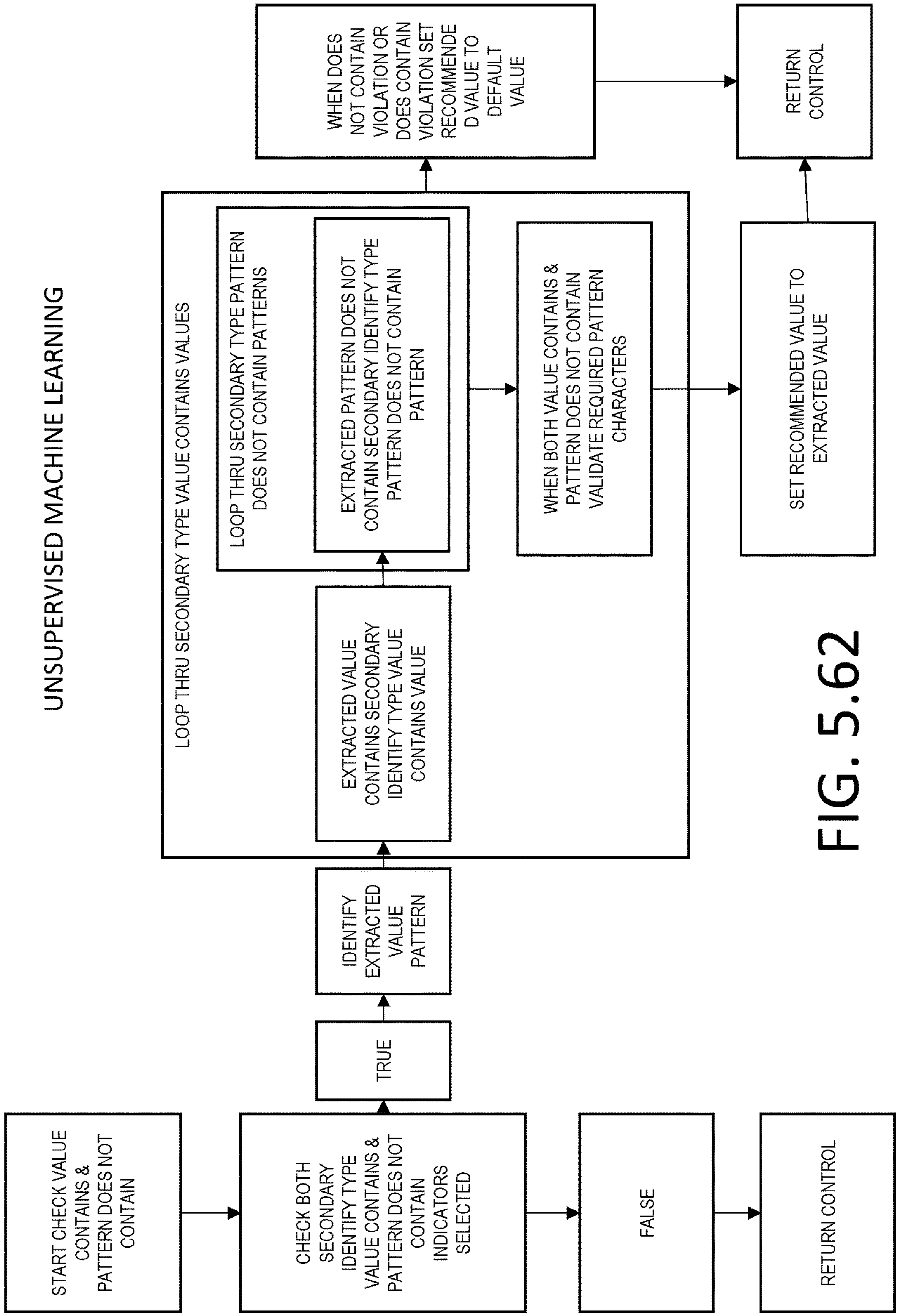
FIG. 5.62

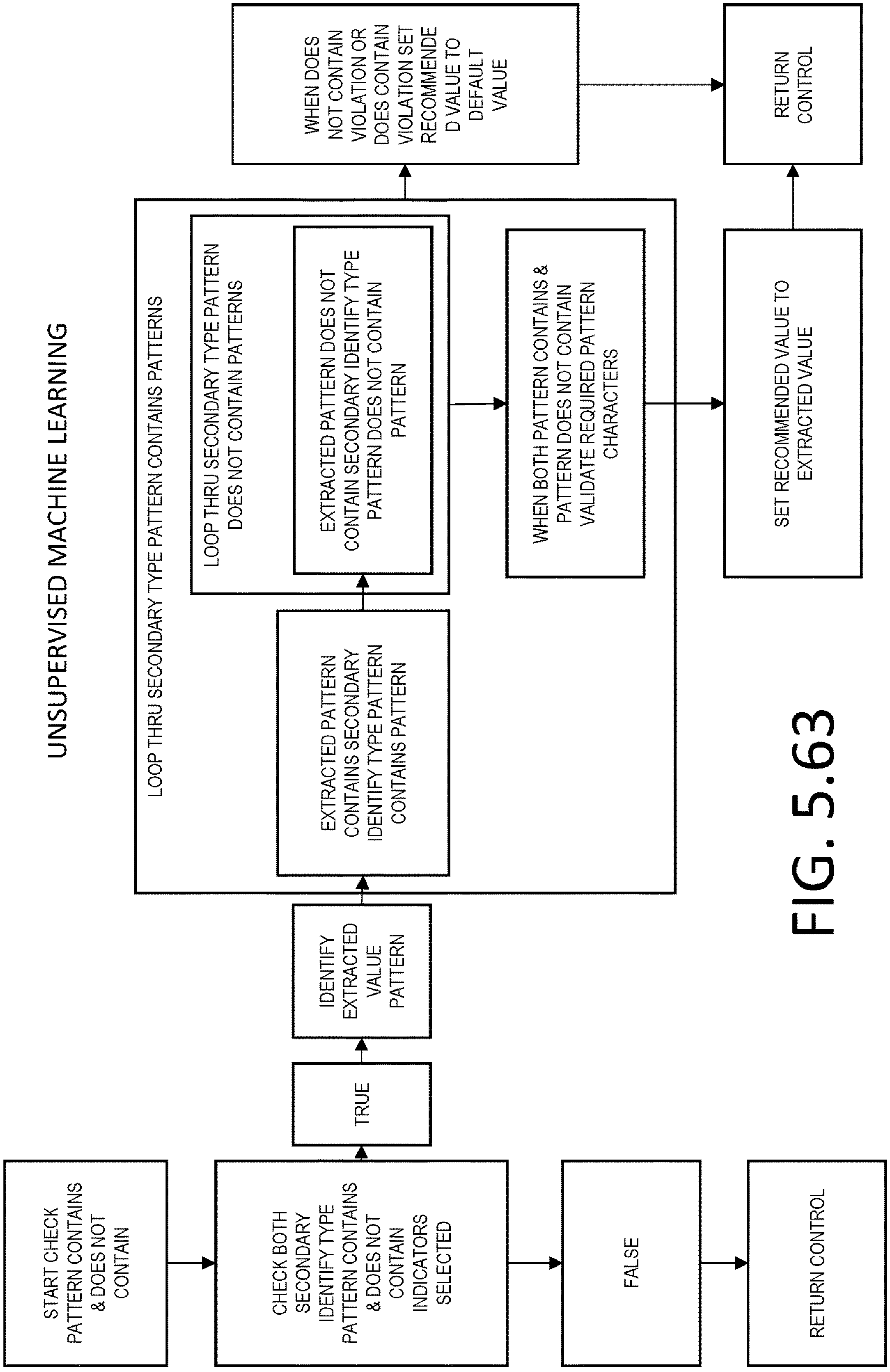

FIG. 5.63

UNSUPERVISED MACHINE LEARNING

START CHECK PATTERN CONTAINS & DOES NOT CONTAIN

CHECK BOTH SECONDARY IDENTIFY TYPE PATTERN CONTAINS & DOES NOT CONTAIN INDICATORS SELECTED

FALSE

RETURN CONTROL

TRUE

IDENTIFY EXTRACTED VALUE PATTERN

LOOP THRU SECONDARY TYPE PATTERN CONTAINS PATTERNS

EXTRACTED PATTERN CONTAINS SECONDARY IDENTIFY TYPE PATTERN CONTAINS PATTERN

LOOP THRU SECONDARY TYPE PATTERN DOES NOT CONTAIN PATTERNS

EXTRACTED PATTERN DOES NOT CONTAIN SECONDARY IDENTIFY TYPE PATTERN DOES NOT CONTAIN PATTERN

WHEN BOTH PATTERN CONTAINS & PATTERN DOES NOT CONTAIN VALIDATE REQUIRED PATTERN CHARACTERS

SET RECOMMENDED VALUE TO EXTRACTED VALUE

WHEN DOES NOT CONTAIN VIOLATION OR DOES CONTAIN VIOLATION SET RECOMMENDE D VALUE TO DEFAULT VALUE

RETURN CONTROL

FIG. 5.63

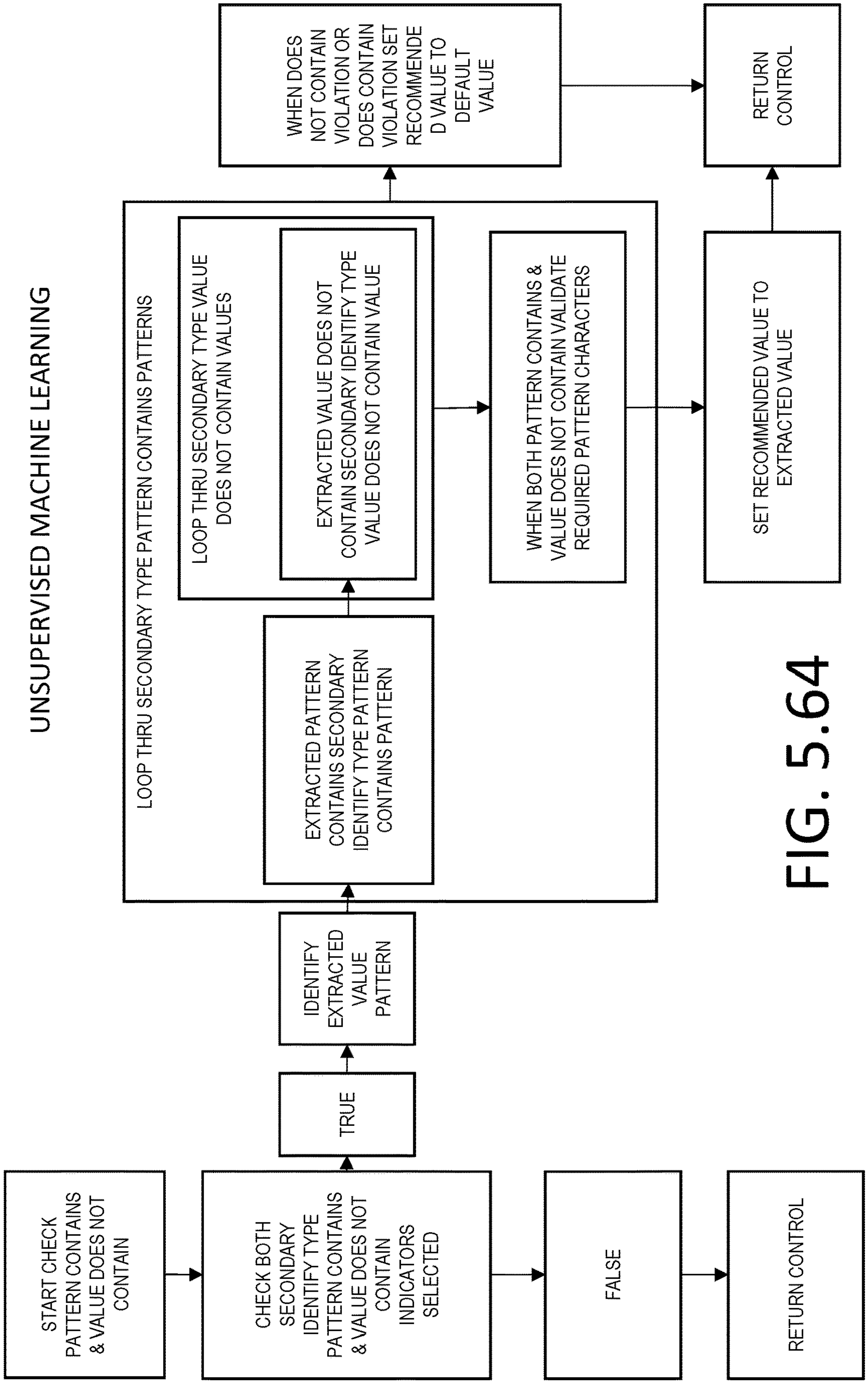

FIG. 5.64

UNSUPERVISED MACHINE LEARNING

START CHECK PATTERN CONTAINS & VALUE DOES NOT CONTAIN

CHECK BOTH SECONDARY IDENTIFY TYPE PATTERN CONTAINS & VALUE DOES NOT CONTAIN INDICATORS SELECTED

TRUE

IDENTIFY EXTRACTED VALUE PATTERN

LOOP THRU SECONDARY TYPE PATTERN CONTAINS PATTERNS

EXTRACTED PATTERN CONTAINS SECONDARY IDENTIFY TYPE PATTERN CONTAINS PATTERN

LOOP THRU SECONDARY TYPE VALUE DOES NOT CONTAIN VALUES

EXTRACTED VALUE DOES NOT CONTAIN SECONDARY IDENTIFY TYPE VALUE DOES NOT CONTAIN VALUE

WHEN BOTH PATTERN CONTAINS & VALUE DOES NOT CONTAIN VALIDATE REQUIRED PATTERN CHARACTERS

SET RECOMMENDED VALUE TO EXTRACTED VALUE

WHEN DOES NOT CONTAIN VIOLATION OR DOES CONTAIN VIOLATION SET RECOMMENDE D VALUE TO DEFAULT VALUE

RETURN CONTROL

FALSE

RETURN CONTROL

FIG. 5.64

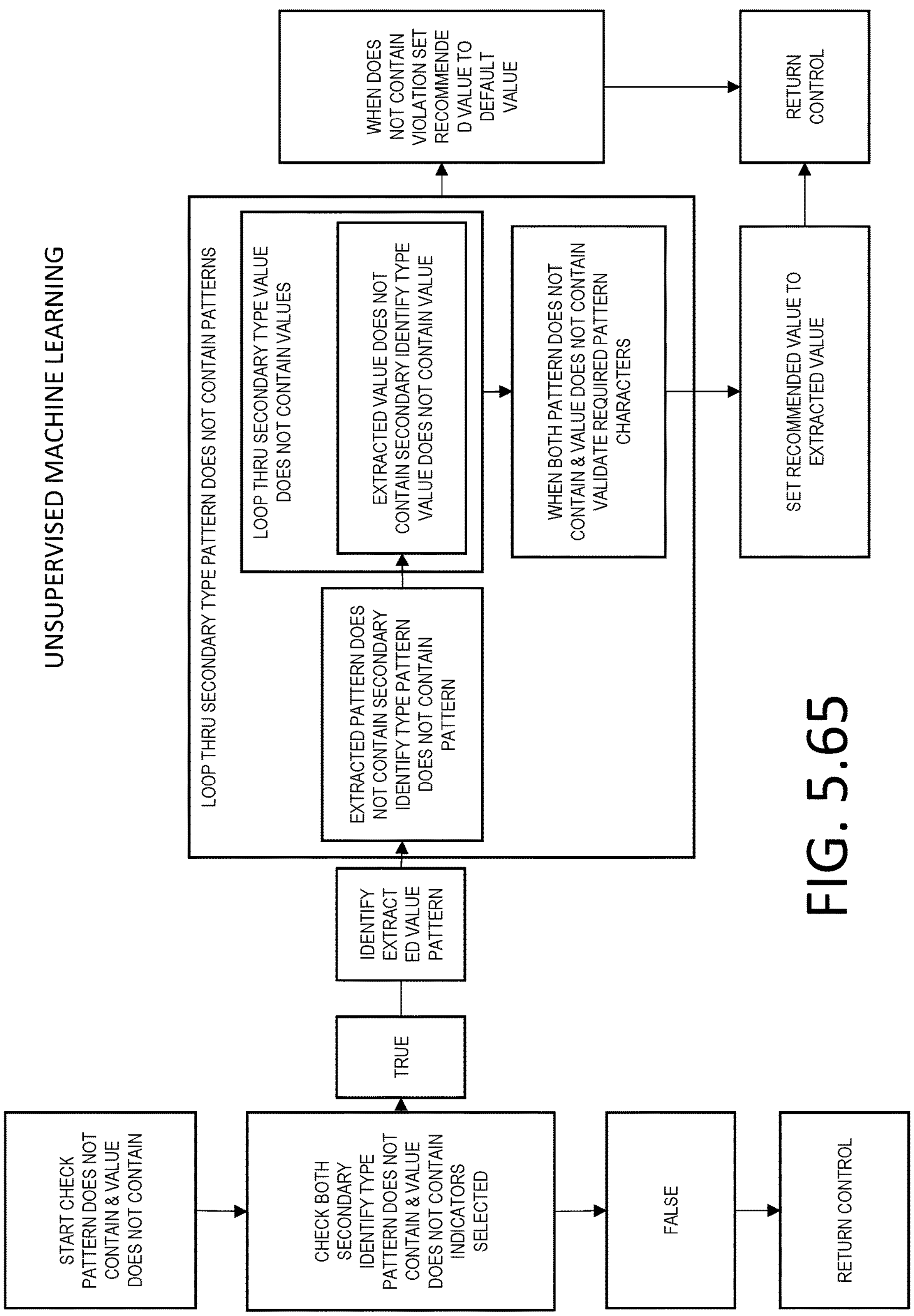

START CHECK PATTERN DOES NOT CONTAIN & VALUE DOES NOT CONTAIN

CHECK BOTH SECONDARY IDENTIFY TYPE PATTERN DOES NOT CONTAIN & VALUE DOES NOT CONTAIN INDICATORS SELECTED

TRUE

IDENTIFY EXTRACTED VALUE PATTERN

LOOP THRU SECONDARY TYPE PATTERN DOES NOT CONTAIN PATTERNS

EXTRACTED PATTERN DOES NOT CONTAIN SECONDARY IDENTIFY TYPE PATTERN DOES NOT CONTAIN PATTERN

LOOP THRU SECONDARY TYPE VALUE DOES NOT CONTAIN VALUES

EXTRACTED VALUE DOES NOT CONTAIN SECONDARY IDENTIFY TYPE VALUE DOES NOT CONTAIN VALUE

WHEN BOTH PATTERN DOES NOT CONTAIN & VALUE DOES NOT CONTAIN VALIDATE REQUIRED PATTERN CHARACTERS

WHEN DOES NOT CONTAIN VIOLATION SET RECOMMENDED VALUE TO DEFAULT VALUE

SET RECOMMENDED VALUE TO EXTRACTED VALUE

RETURN CONTROL

FALSE

RETURN CONTROL

FIG. 5.65

UNSUPERVISED MACHINE LEARNING
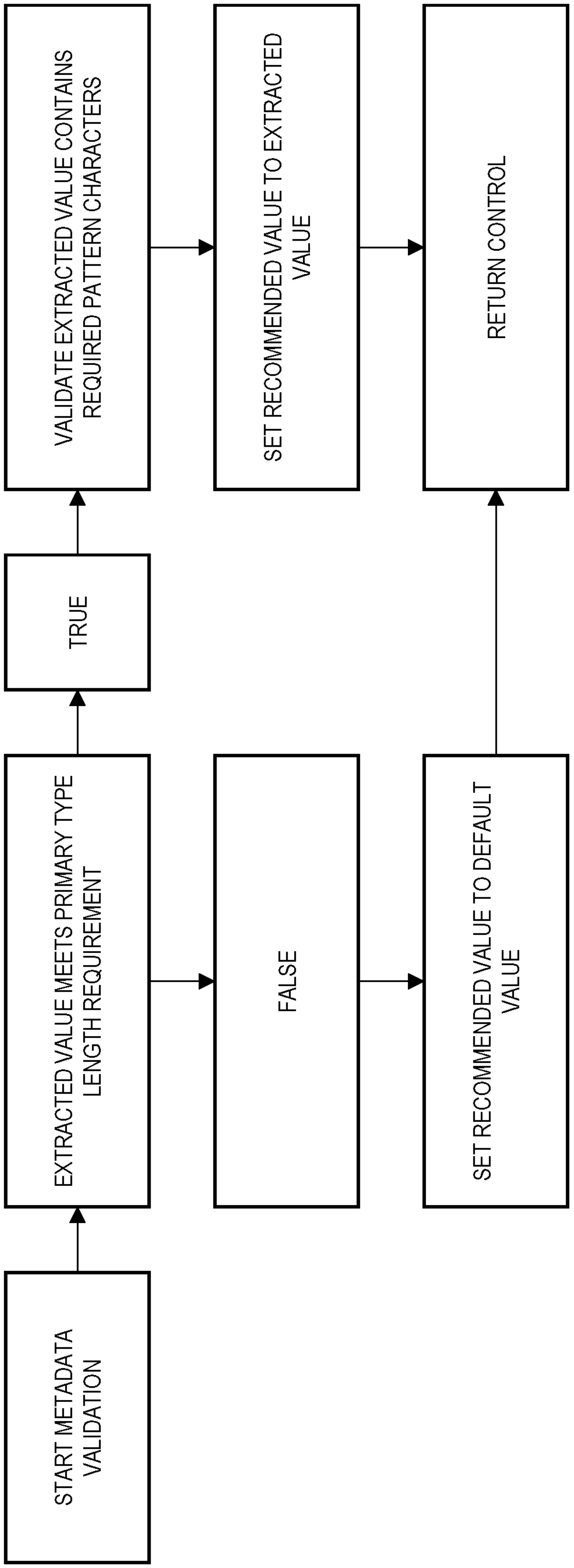
FIG. 5.66

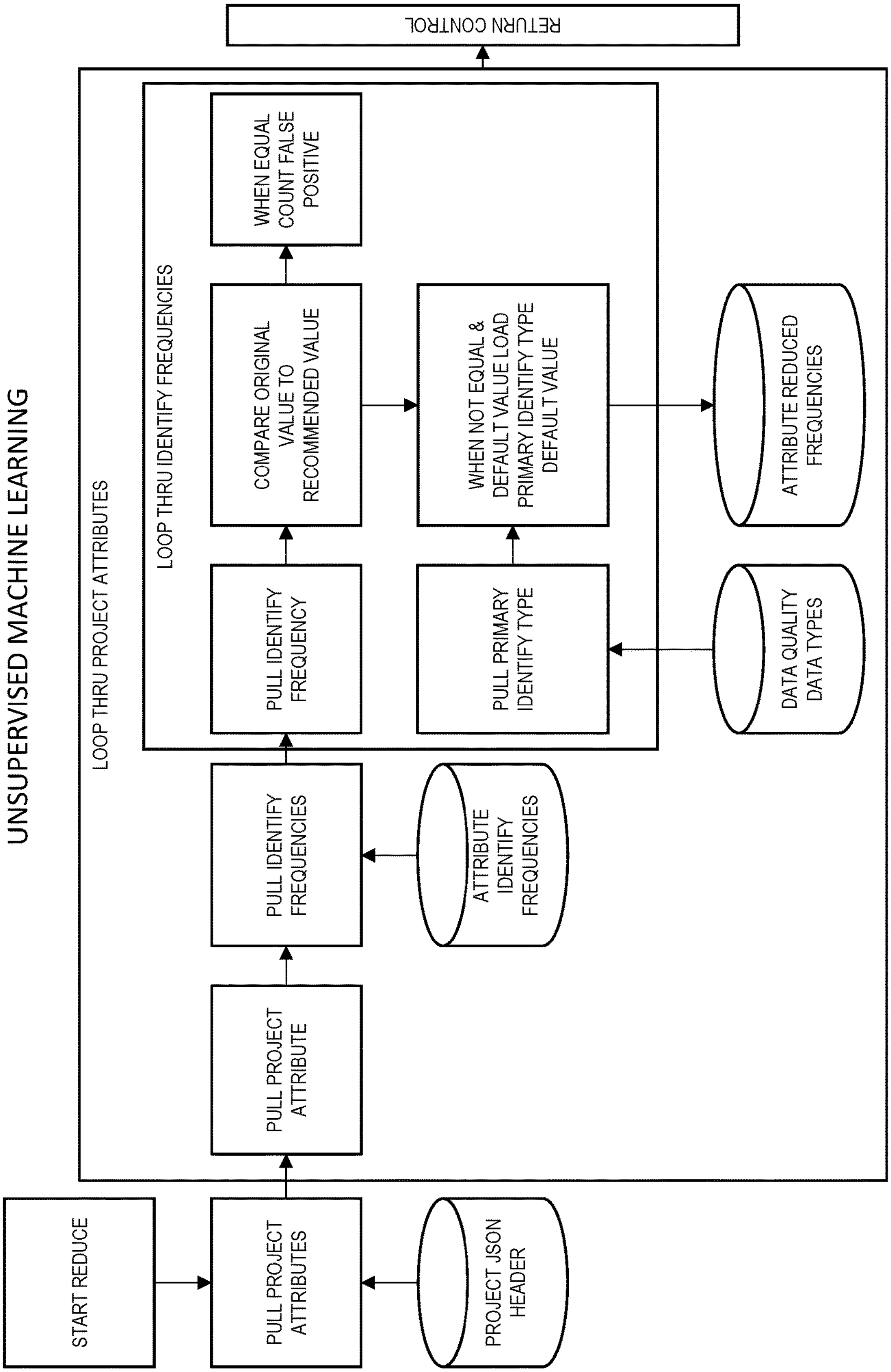
FIG. 5.67

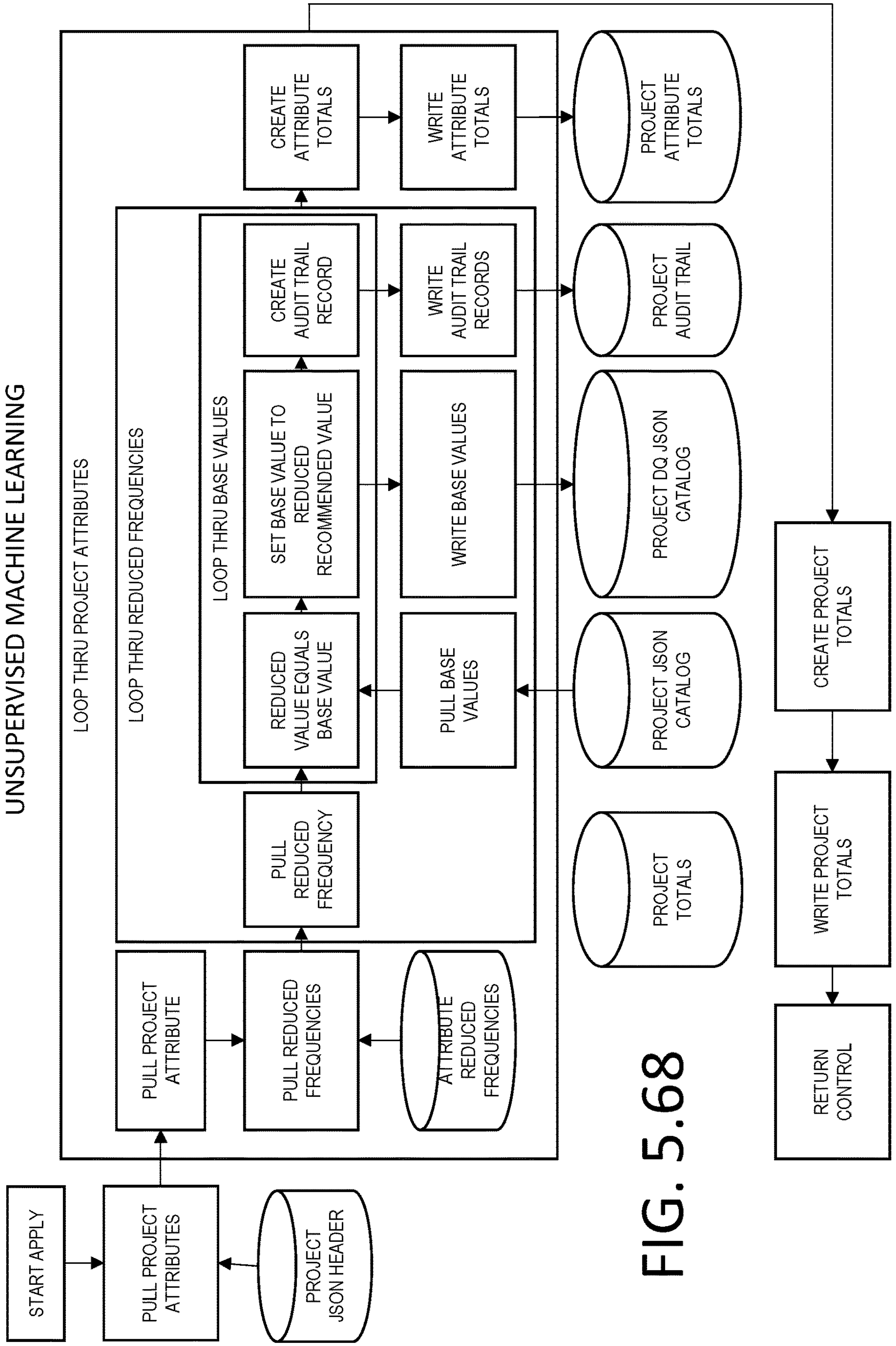
FIG. 5.68

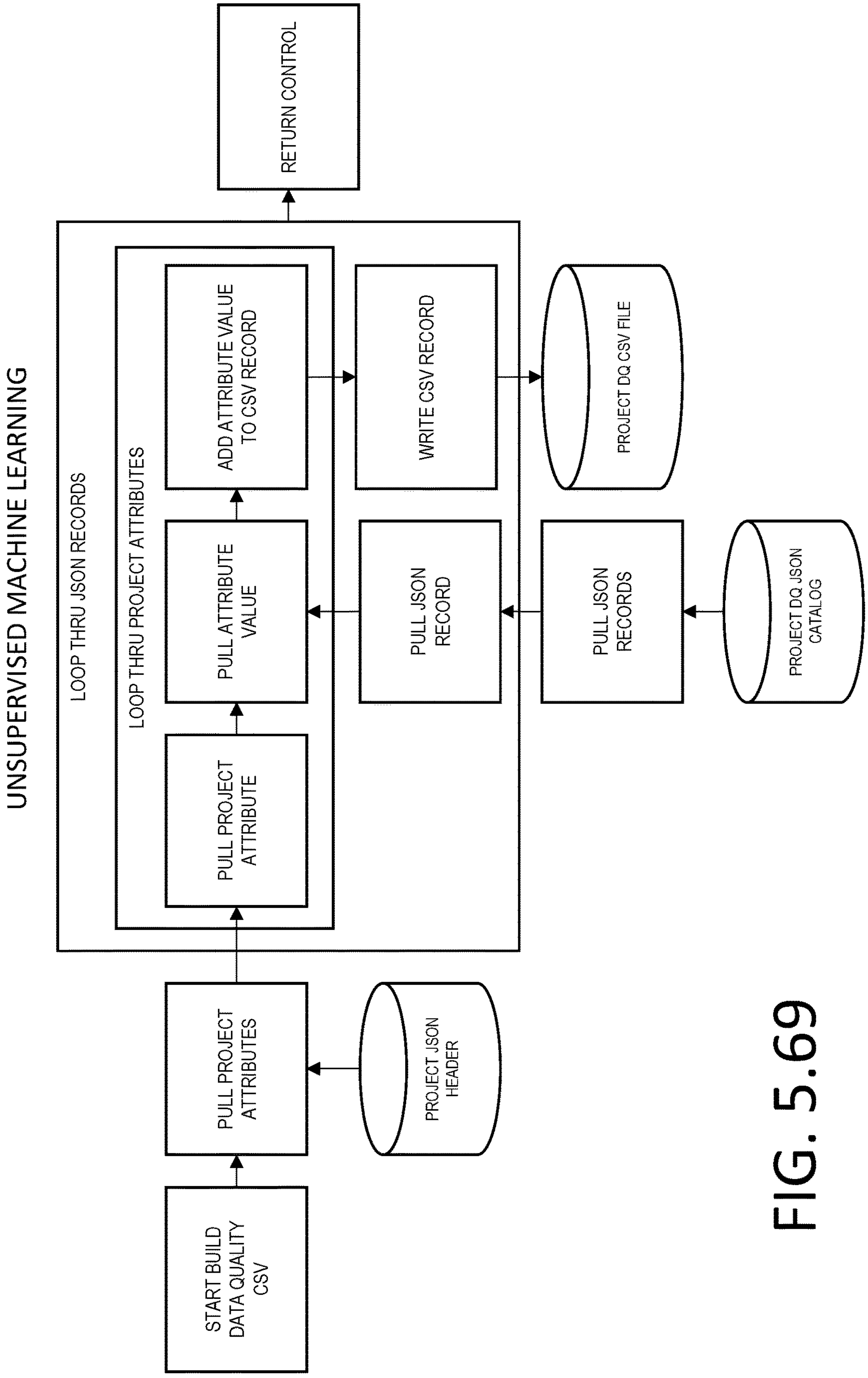
FIG. 5.69

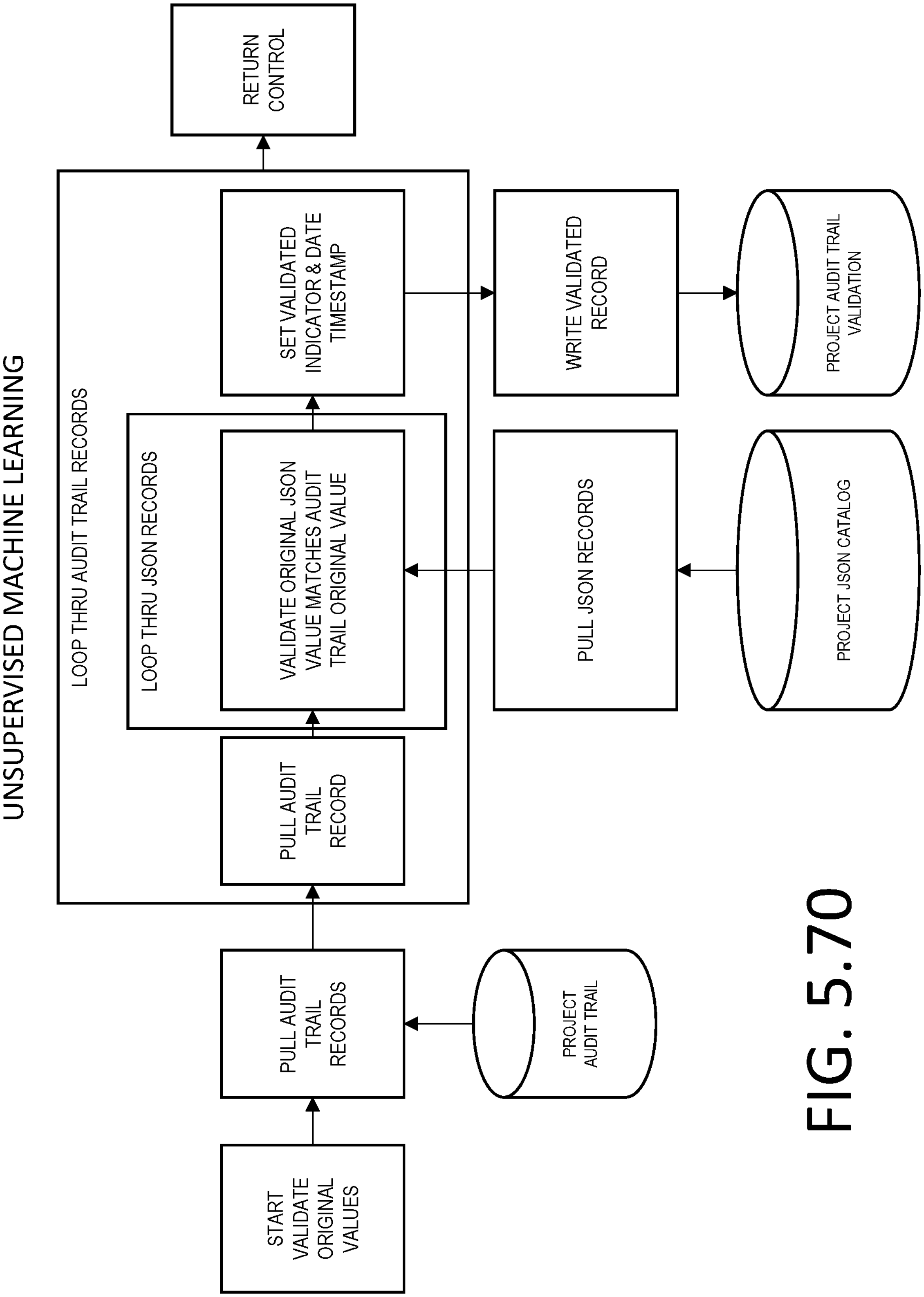
FIG. 5.70

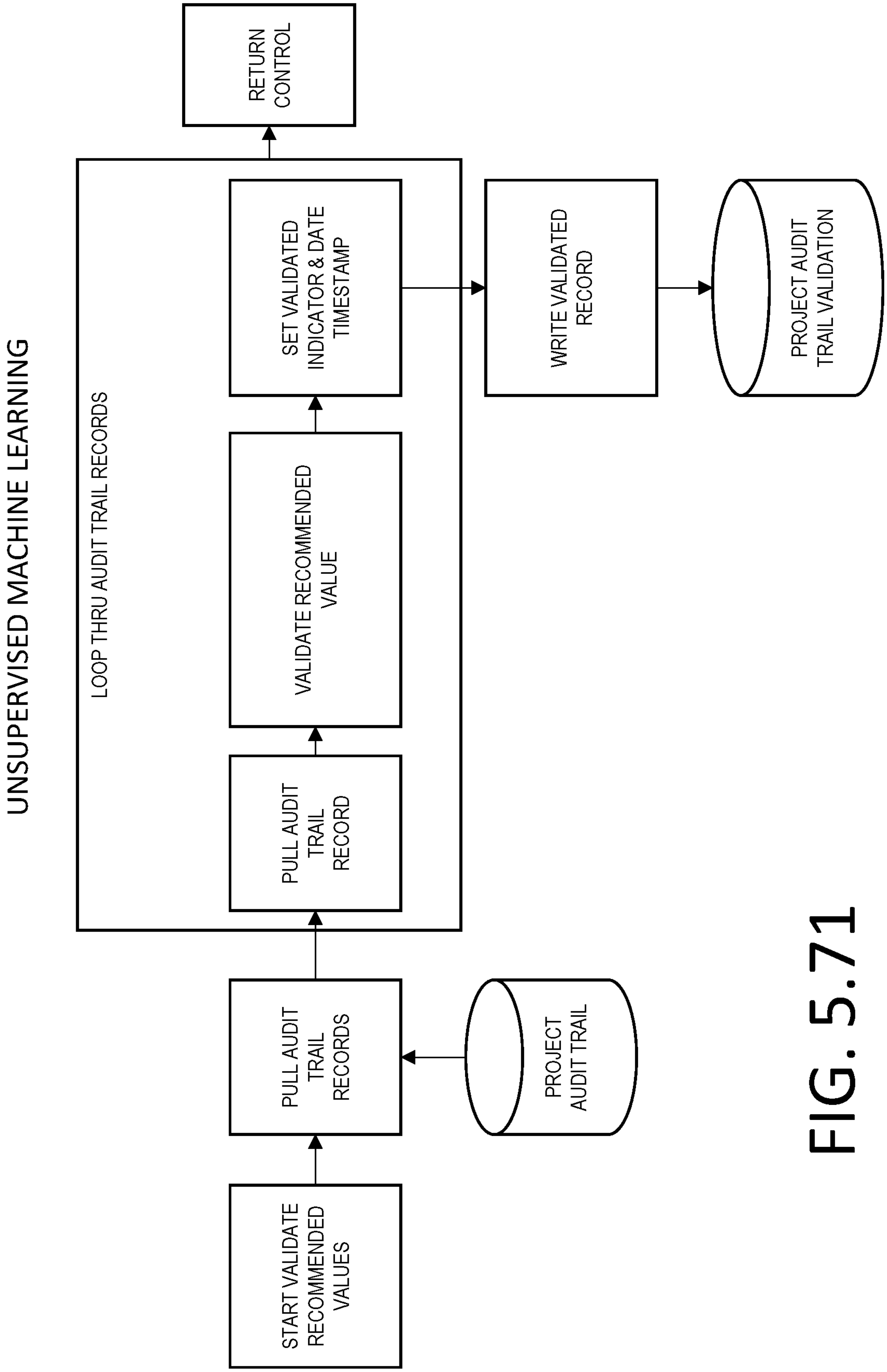
FIG. 5.71

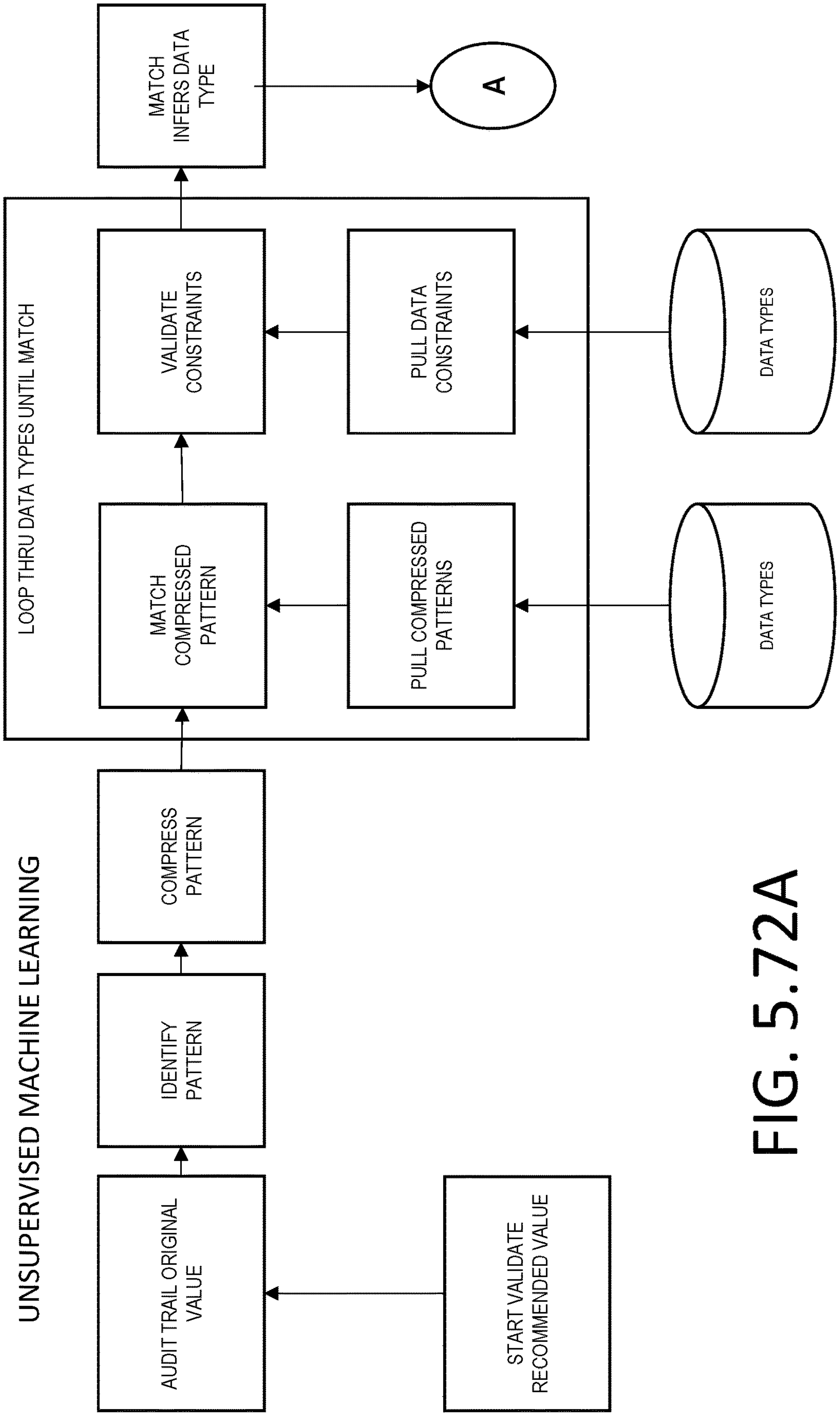
FIG. 5.72A

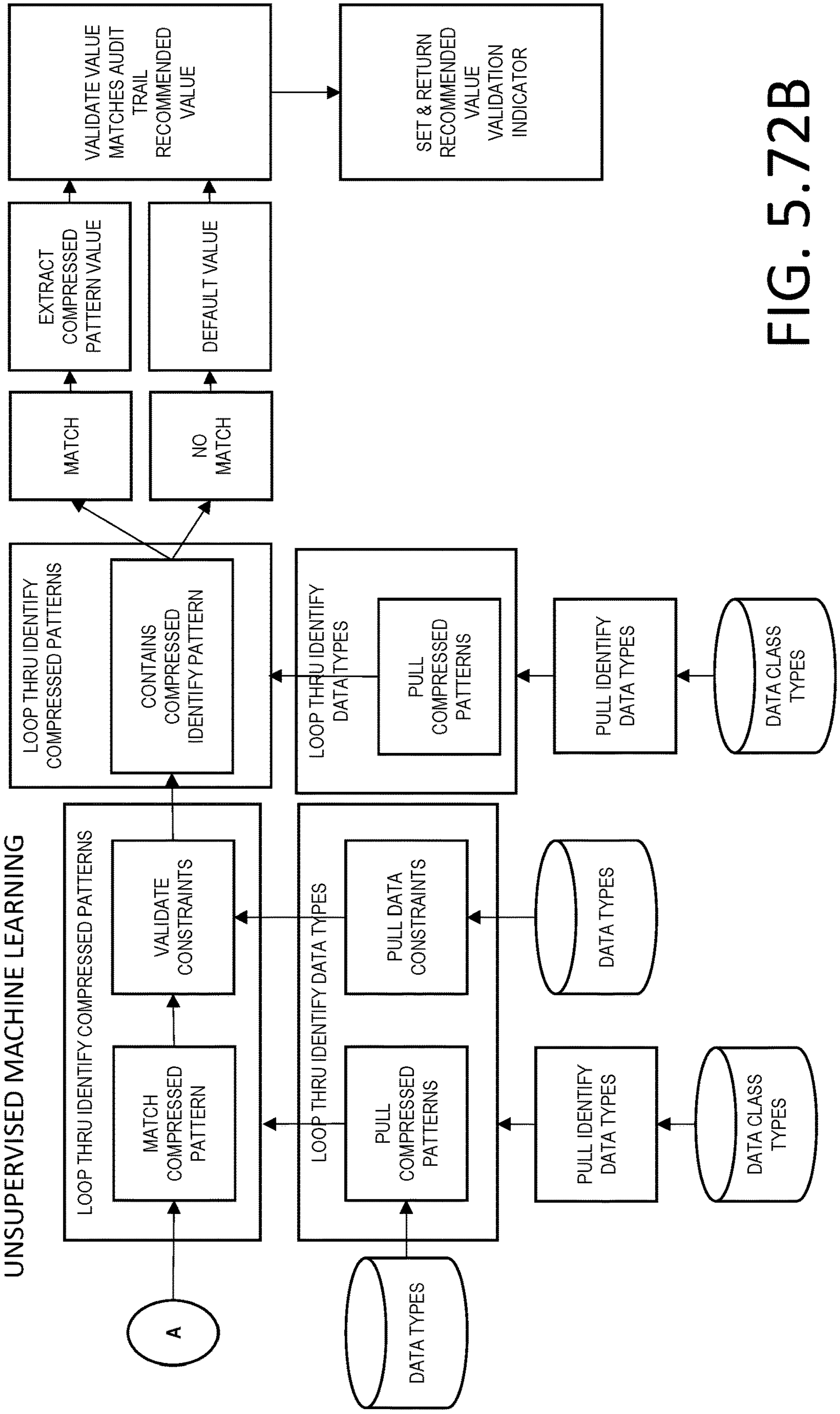
FIG. 5.72B

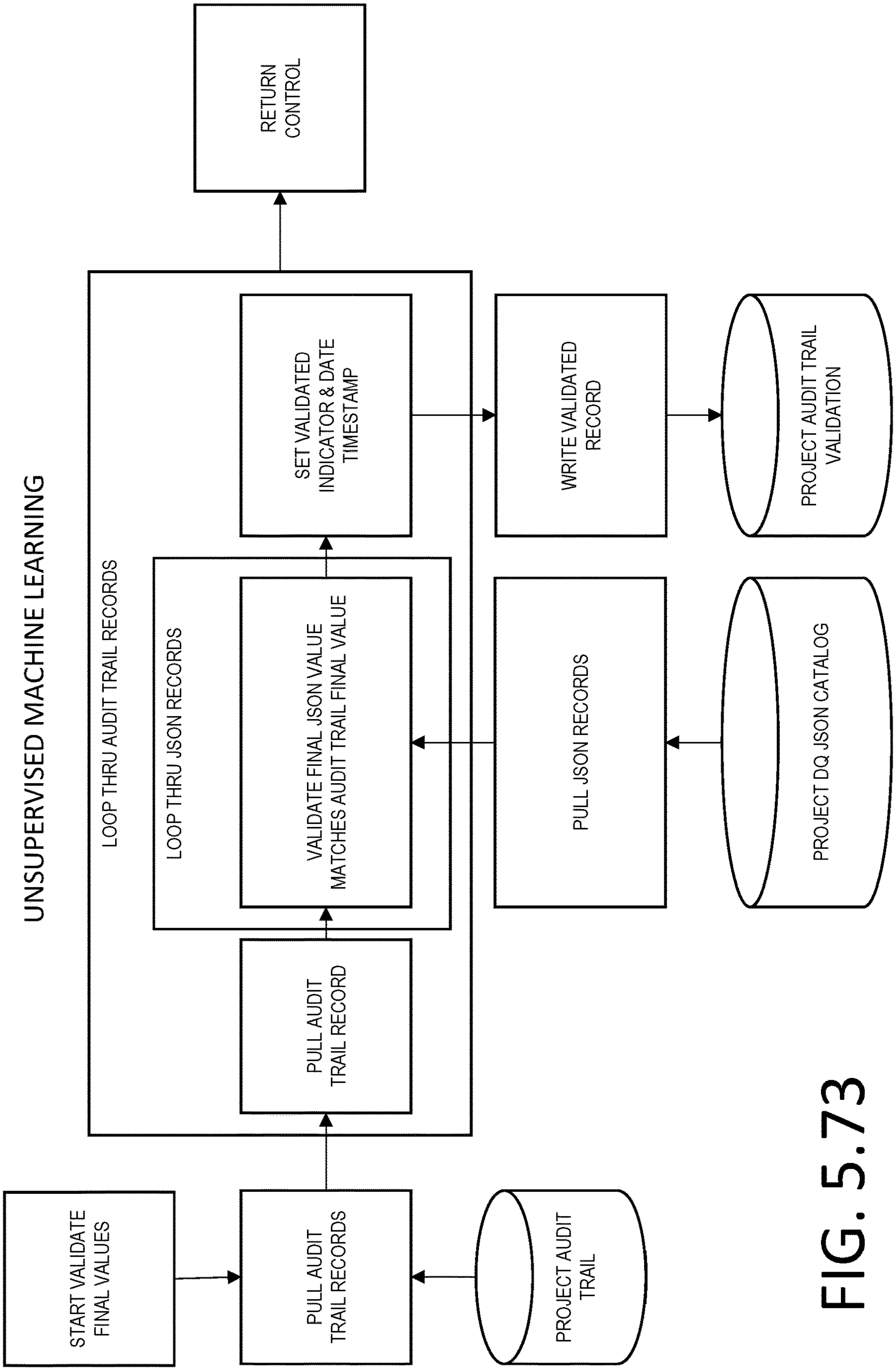
FIG. 5.73

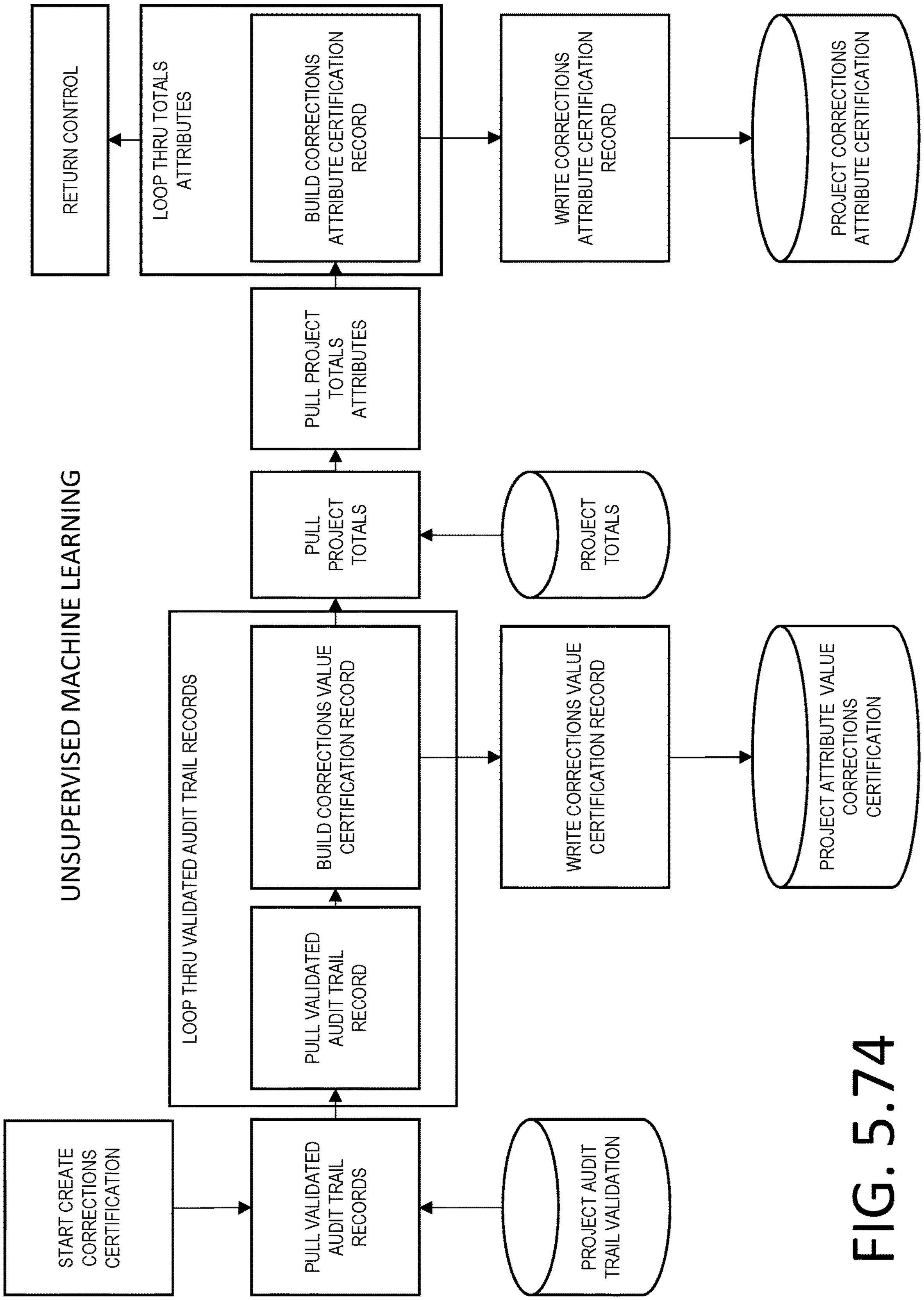
FIG. 5.74

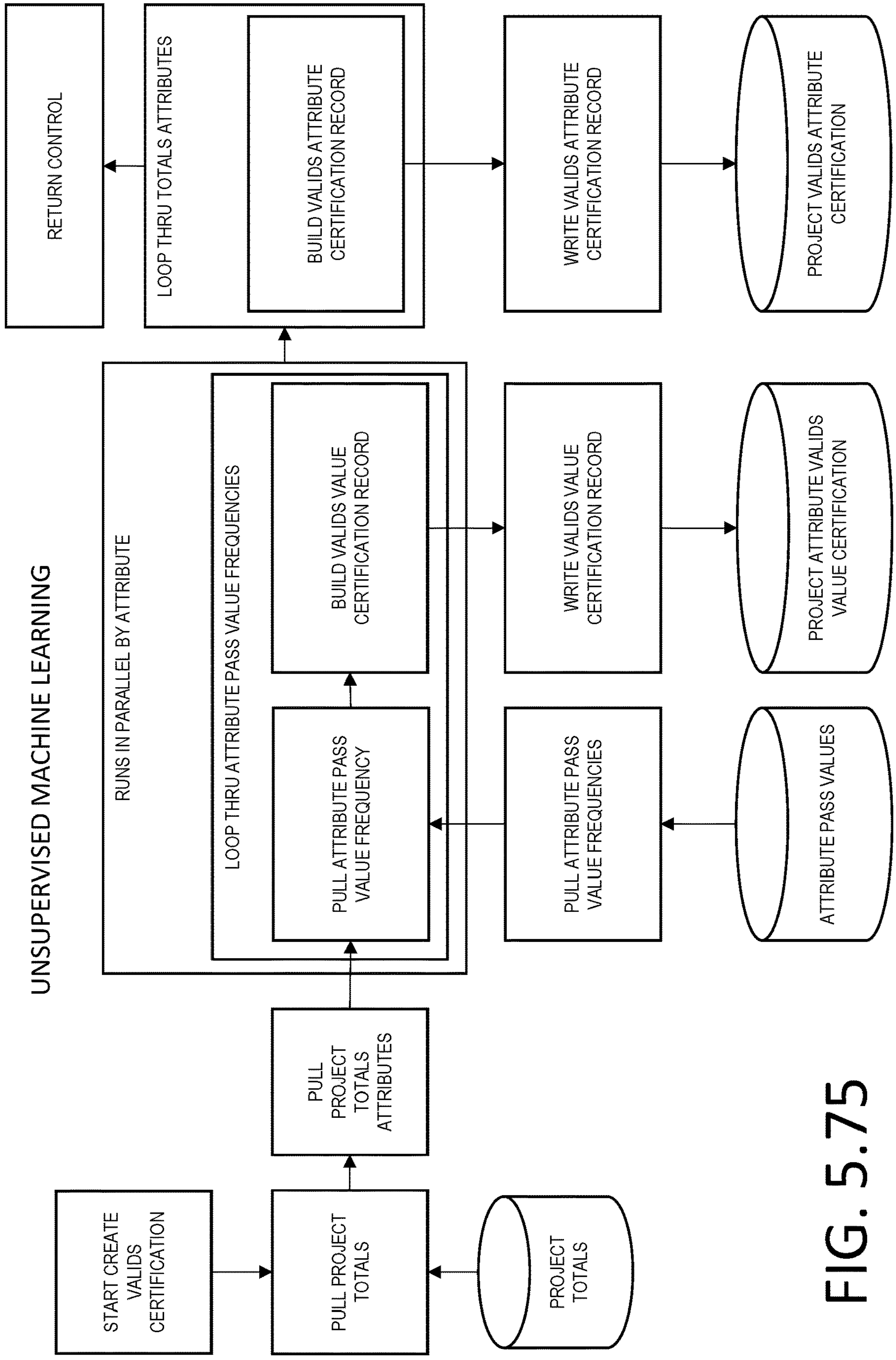

FIG. 5.75

UNSUPERVISED MACHINE LEARNING

START CREATE VALIDS CERTIFICATION

PULL PROJECT TOTALS

PROJECT TOTALS

PULL PROJECT TOTALS ATTRIBUTES

RUNS IN PARALLEL BY ATTRIBUTE

LOOP THRU ATTRIBUTE PASS VALUE FREQUENCIES

PULL ATTRIBUTE PASS VALUE FREQUENCY

BUILD VALIDS VALUE CERTIFICATION RECORD

PULL ATTRIBUTE PASS VALUE FREQUENCIES

ATTRIBUTE PASS VALUES

WRITE VALIDS VALUE CERTIFICATION RECORD

PROJECT ATTRIBUTE VALIDS VALUE CERTIFICATION

LOOP THRU TOTALS ATTRIBUTES

BUILD VALIDS ATTRIBUTE CERTIFICATION RECORD

WRITE VALIDS ATTRIBUTE CERTIFICATION RECORD

PROJECT VALIDS ATTRIBUTE CERTIFICATION

RETURN CONTROL

FIG. 5.75

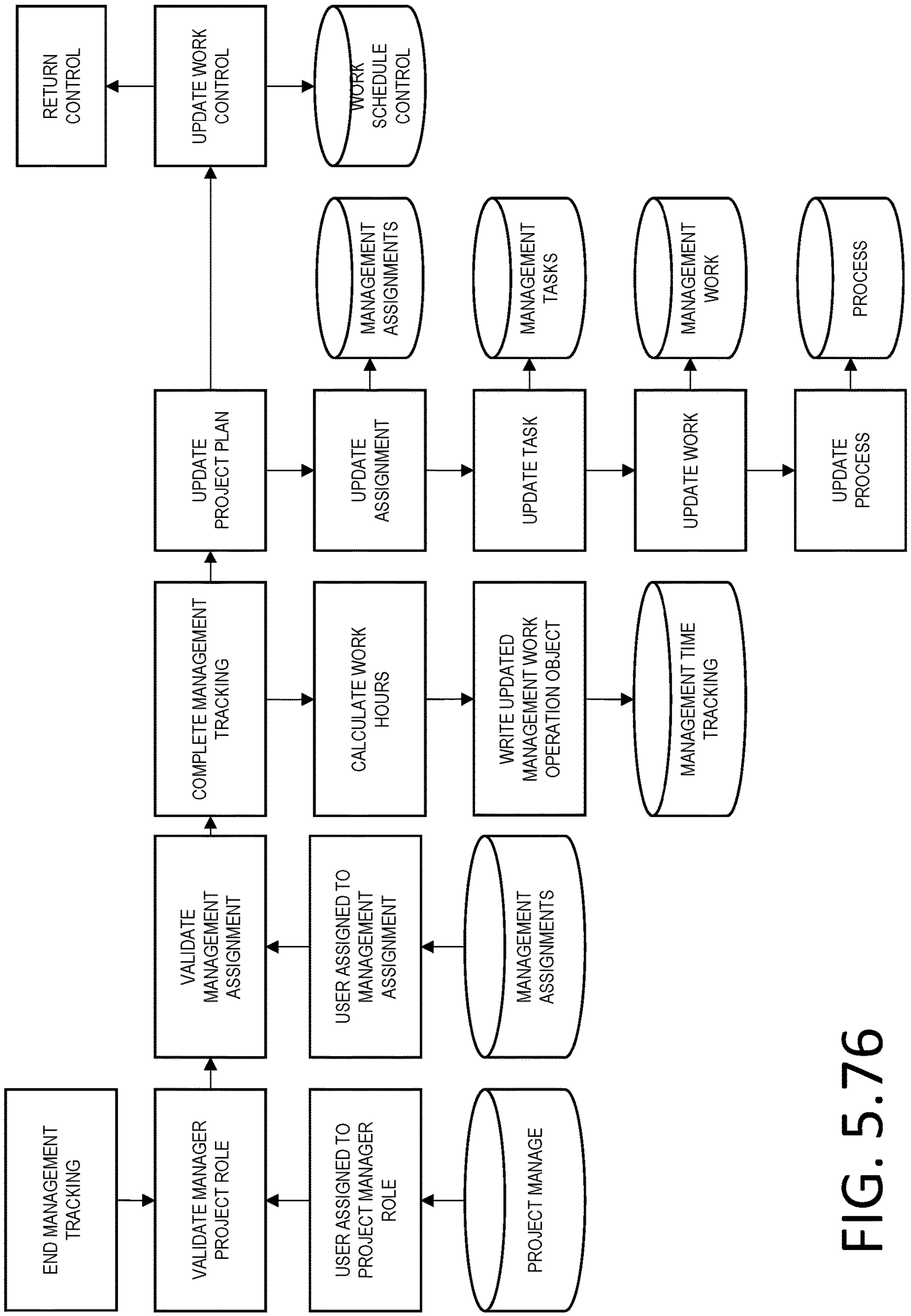
FIG. 5.76

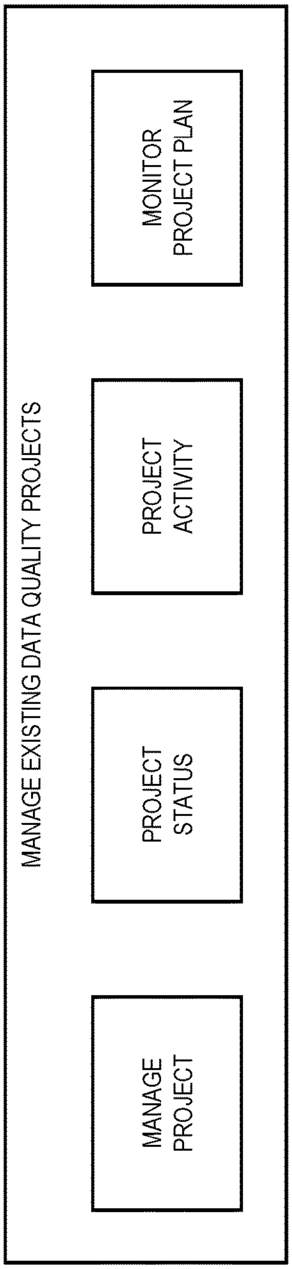
FIG. 6.1
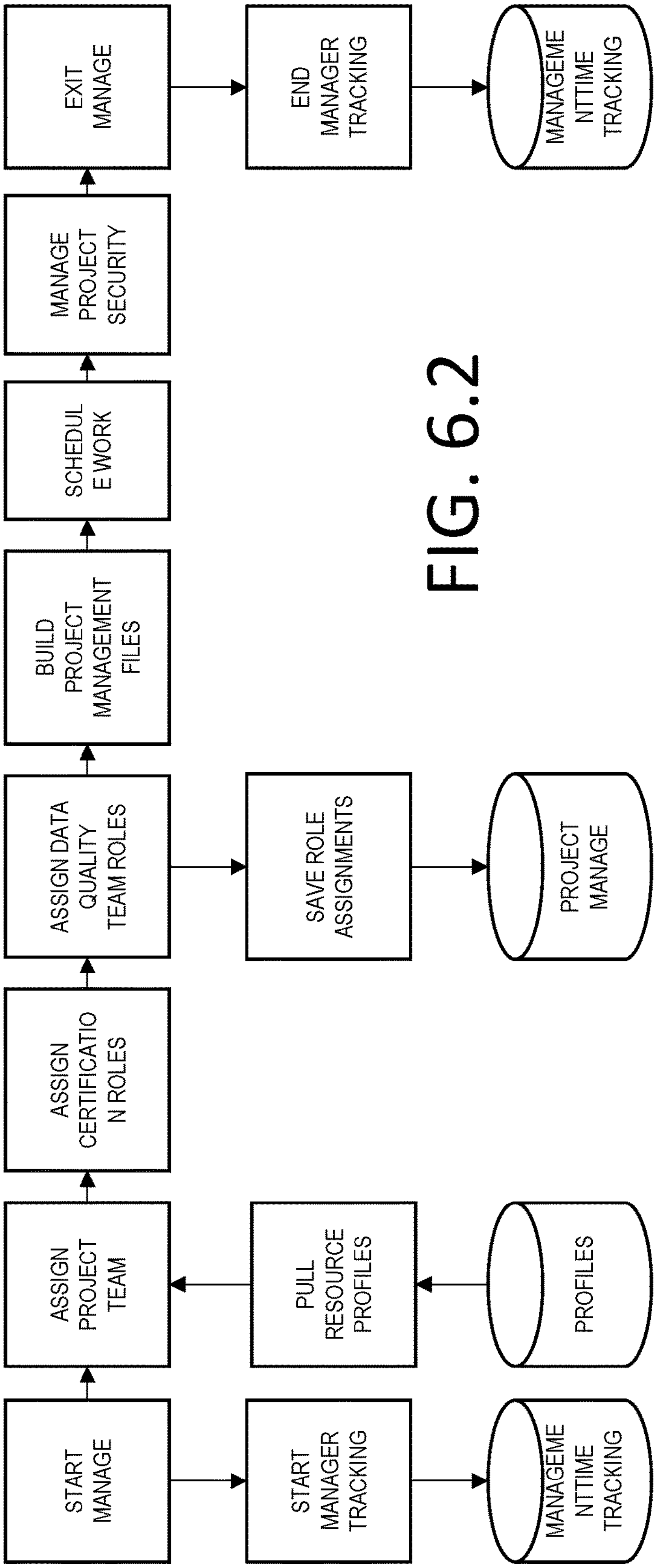
FIG. 6.2

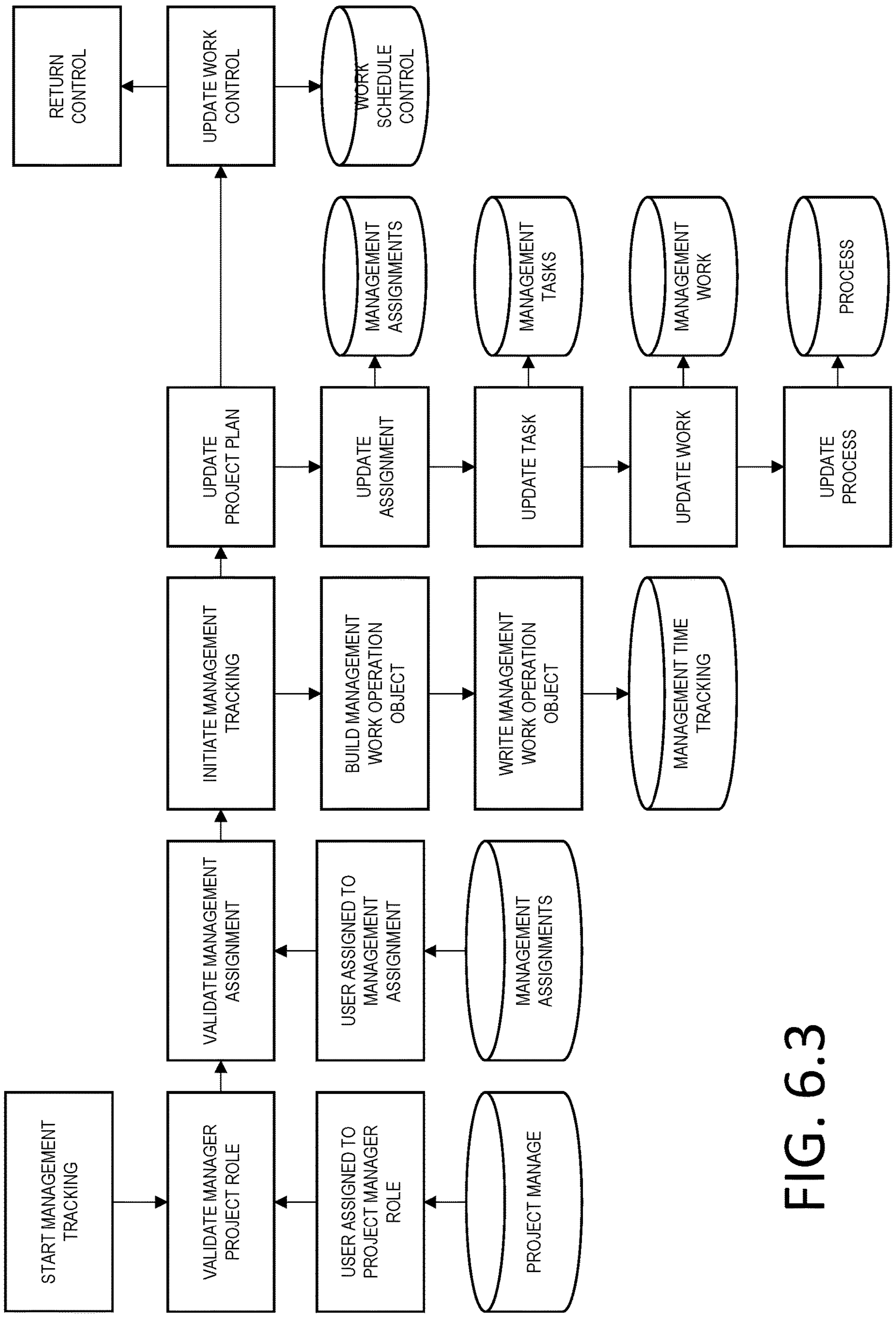
FIG. 6.3

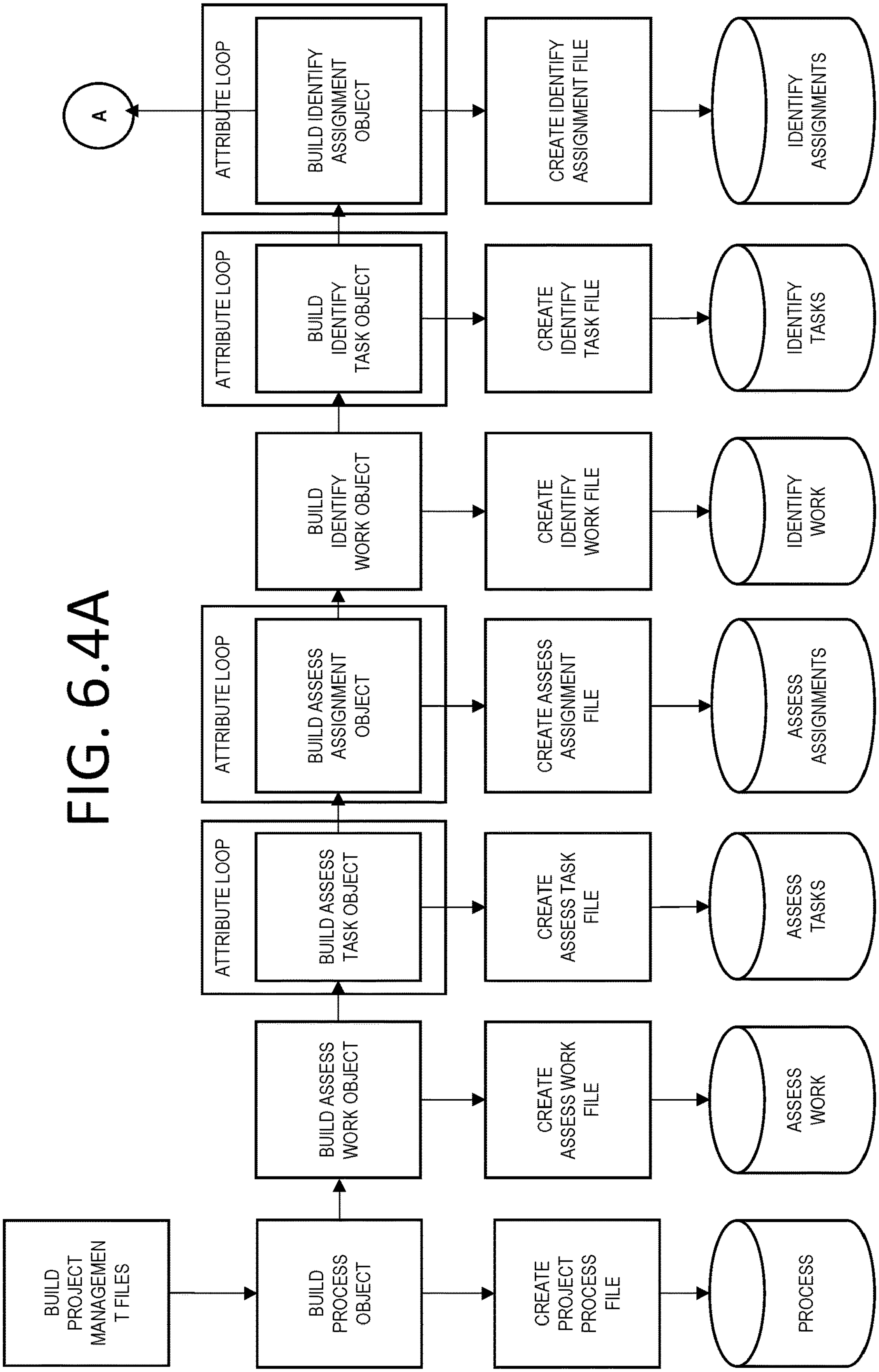

BUILD PROJECT MANAGEMEN T FILES

BUILD PROCESS OBJECT

CREATE PROJECT PROCESS FILE

PROCESS

BUILD ASSESS WORK OBJECT

CREATE ASSESS WORK FILE

ASSESS WORK

ATTRIBUTE LOOP

BUILD ASSESS TASK OBJECT

CREATE ASSESS TASK FILE

ASSESS TASKS

ATTRIBUTE LOOP

BUILD ASSESS ASSIGNMENT OBJECT

CREATE ASSESS ASSIGNMENT FILE

ASSESS ASSIGNMENTS

BUILD IDENTIFY WORK OBJECT

CREATE IDENTIFY WORK FILE

IDENTIFY WORK

ATTRIBUTE LOOP

BUILD IDENTIFY TASK OBJECT

CREATE IDENTIFY TASK FILE

IDENTIFY TASKS

ATTRIBUTE LOOP

BUILD IDENTIFY ASSIGNMENT OBJECT

CREATE IDENTIFY ASSIGNMENT FILE

IDENTIFY ASSIGNMENTS

A

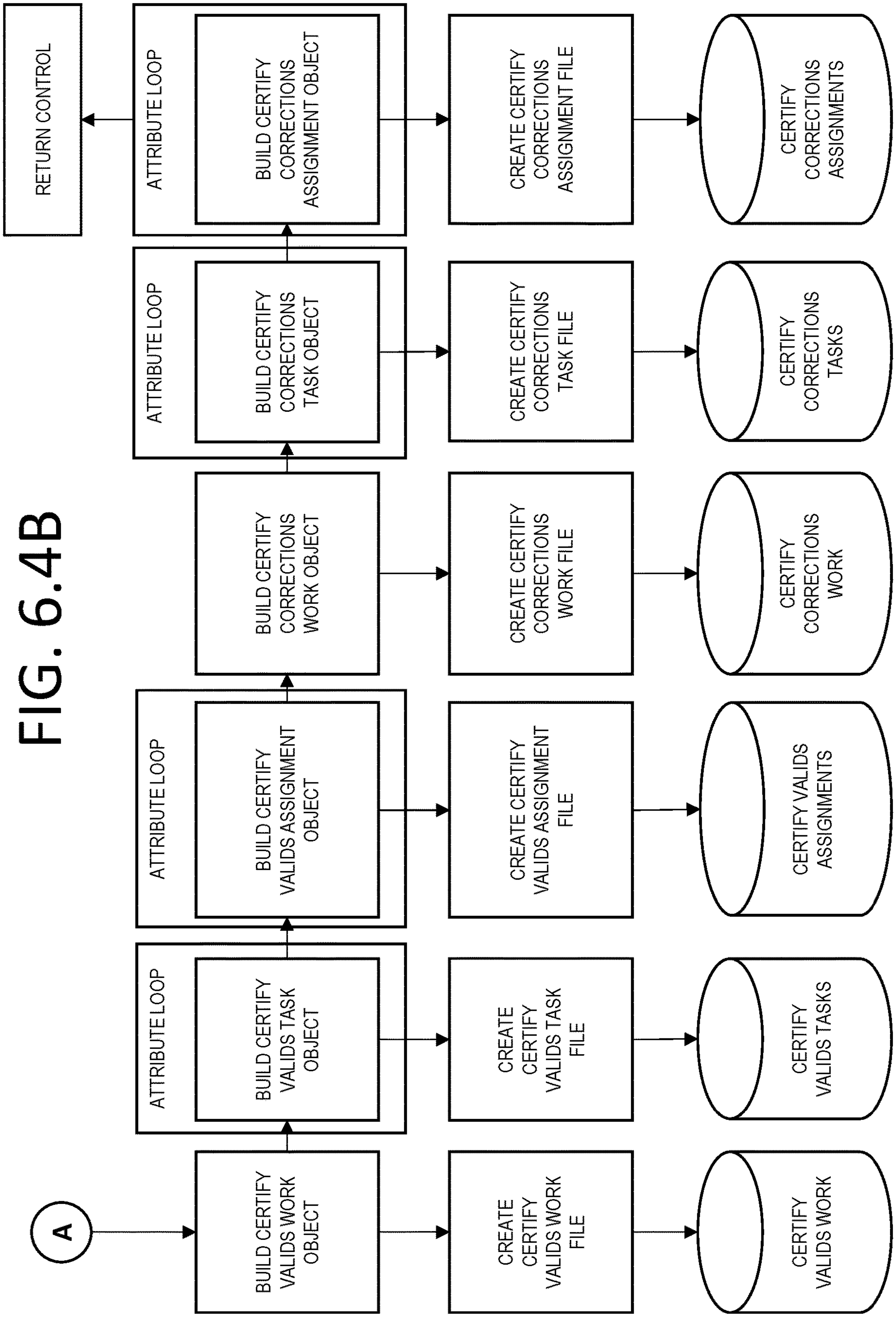

FIG. 6.4B

A
BUILD CERTIFY VALIDS WORK OBJECT
CREATE CERTIFY VALIDS WORK FILE
CERTIFY VALIDS WORK
ATTRIBUTE LOOP
BUILD CERTIFY VALIDS TASK OBJECT
CREATE CERTIFY VALIDS TASK FILE
CERTIFY VALIDS TASKS
ATTRIBUTE LOOP
BUILD CERTIFY VALIDS ASSIGNMENT OBJECT
CREATE CERTIFY VALIDS ASSIGNMENT FILE
CERTIFY VALIDS ASSIGNMENTS
BUILD CERTIFY CORRECTIONS WORK OBJECT
CREATE CERTIFY CORRECTIONS WORK FILE
CERTIFY CORRECTIONS WORK
ATTRIBUTE LOOP
BUILD CERTIFY CORRECTIONS TASK OBJECT
CREATE CERTIFY CORRECTIONS TASK FILE
CERTIFY CORRECTIONS TASKS
ATTRIBUTE LOOP
BUILD CERTIFY CORRECTIONS ASSIGNMENT OBJECT
CREATE CERTIFY CORRECTIONS ASSIGNMENT FILE
CERTIFY CORRECTIONS ASSIGNMENTS
RETURN CONTROL

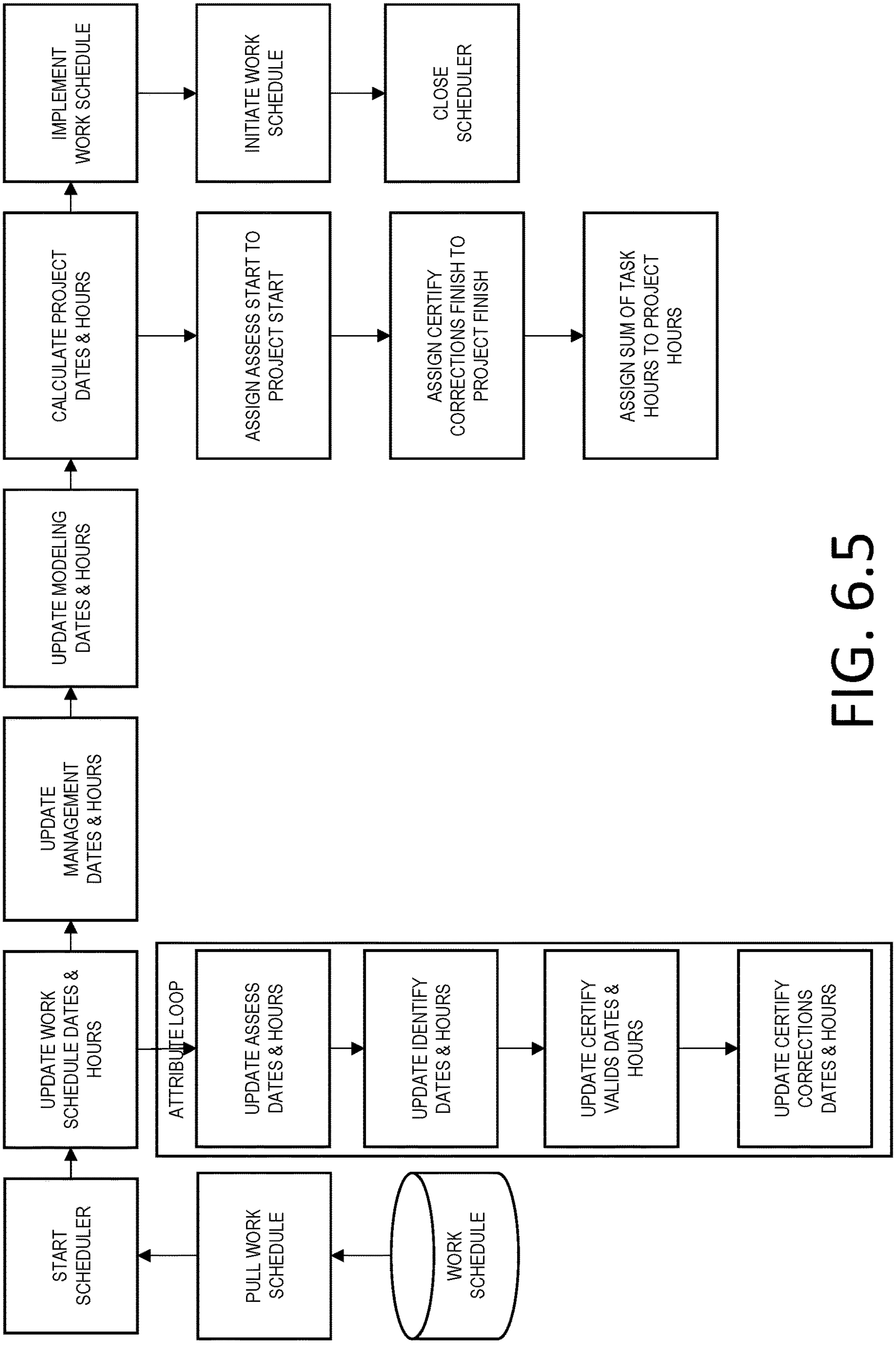
FIG. 6.5

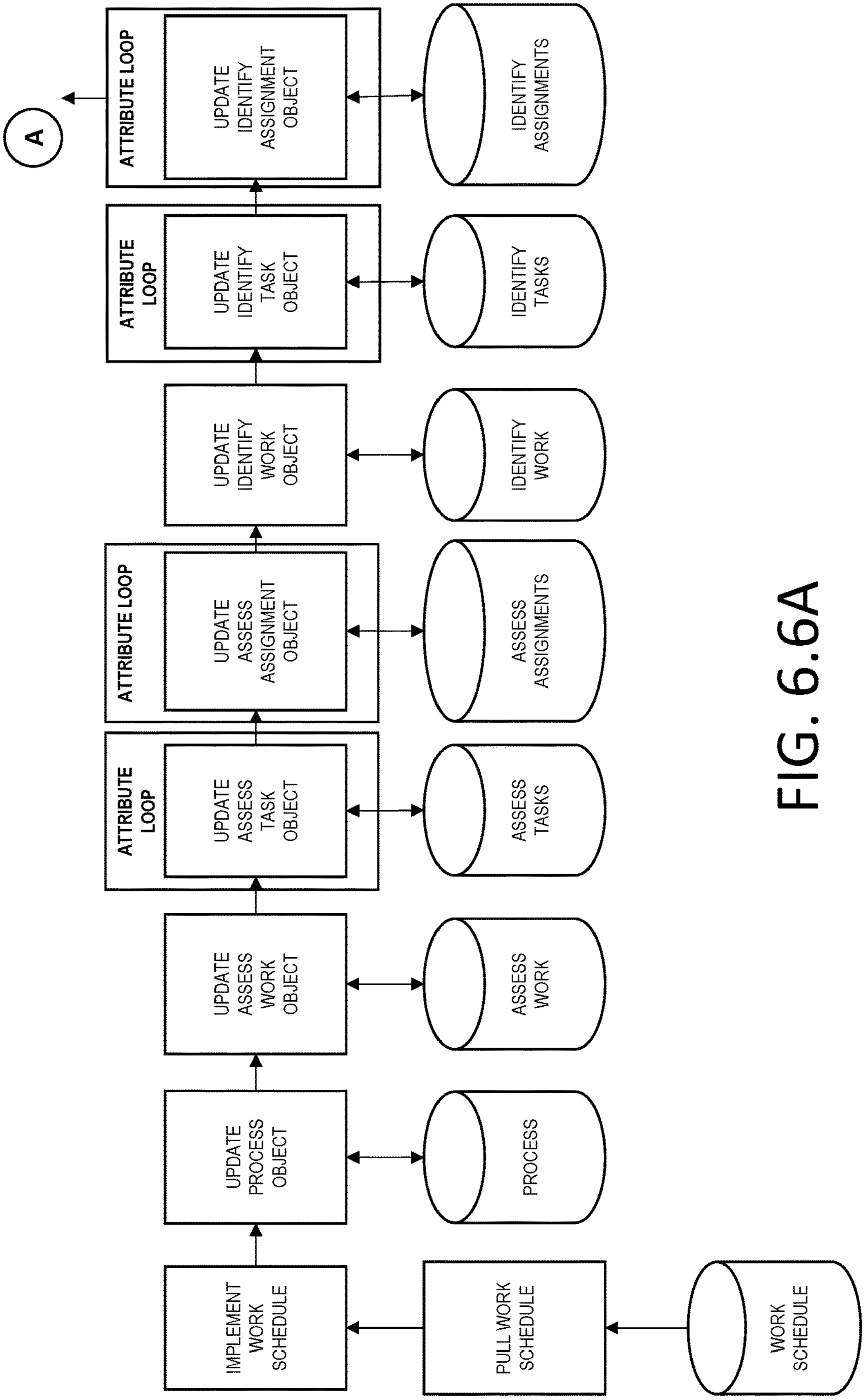
FIG. 6.6A

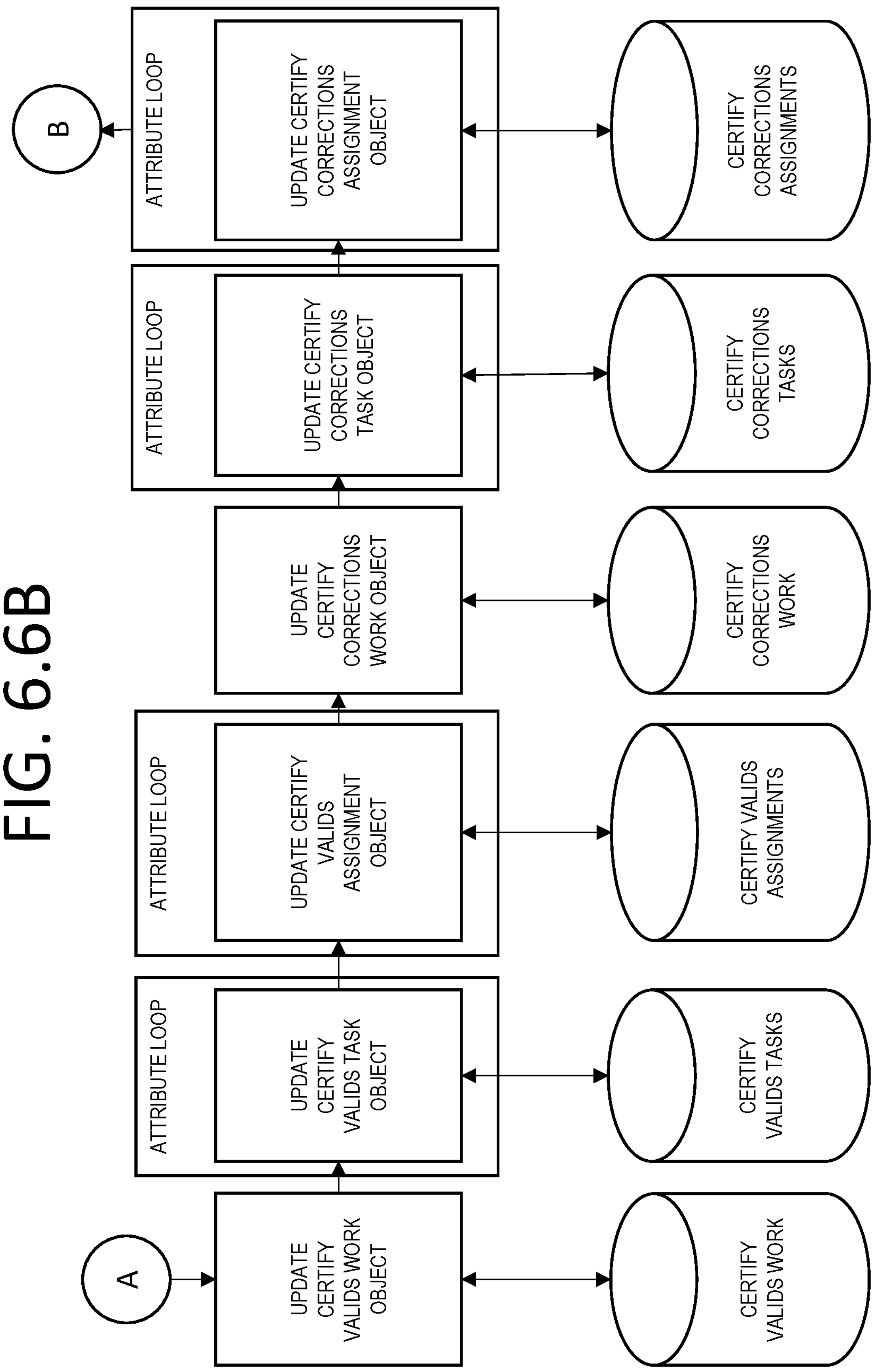
FIG. 6.6B
A
UPDATE CERTIFY VALIDS WORK OBJECT
ATTRIBUTE LOOP
UPDATE CERTIFY VALIDS TASK OBJECT
ATTRIBUTE LOOP
UPDATE CERTIFY VALIDS ASSIGNMENT OBJECT
UPDATE CERTIFY CORRECTIONS WORK OBJECT
ATTRIBUTE LOOP
UPDATE CERTIFY CORRECTIONS TASK OBJECT
ATTRIBUTE LOOP
UPDATE CERTIFY CORRECTIONS ASSIGNMENT OBJECT
B
CERTIFY VALIDS WORK
CERTIFY VALIDS TASKS
CERTIFY VALIDS ASSIGNMENTS
CERTIFY CORRECTIONS WORK
CERTIFY CORRECTIONS TASKS
CERTIFY CORRECTIONS ASSIGNMENTS

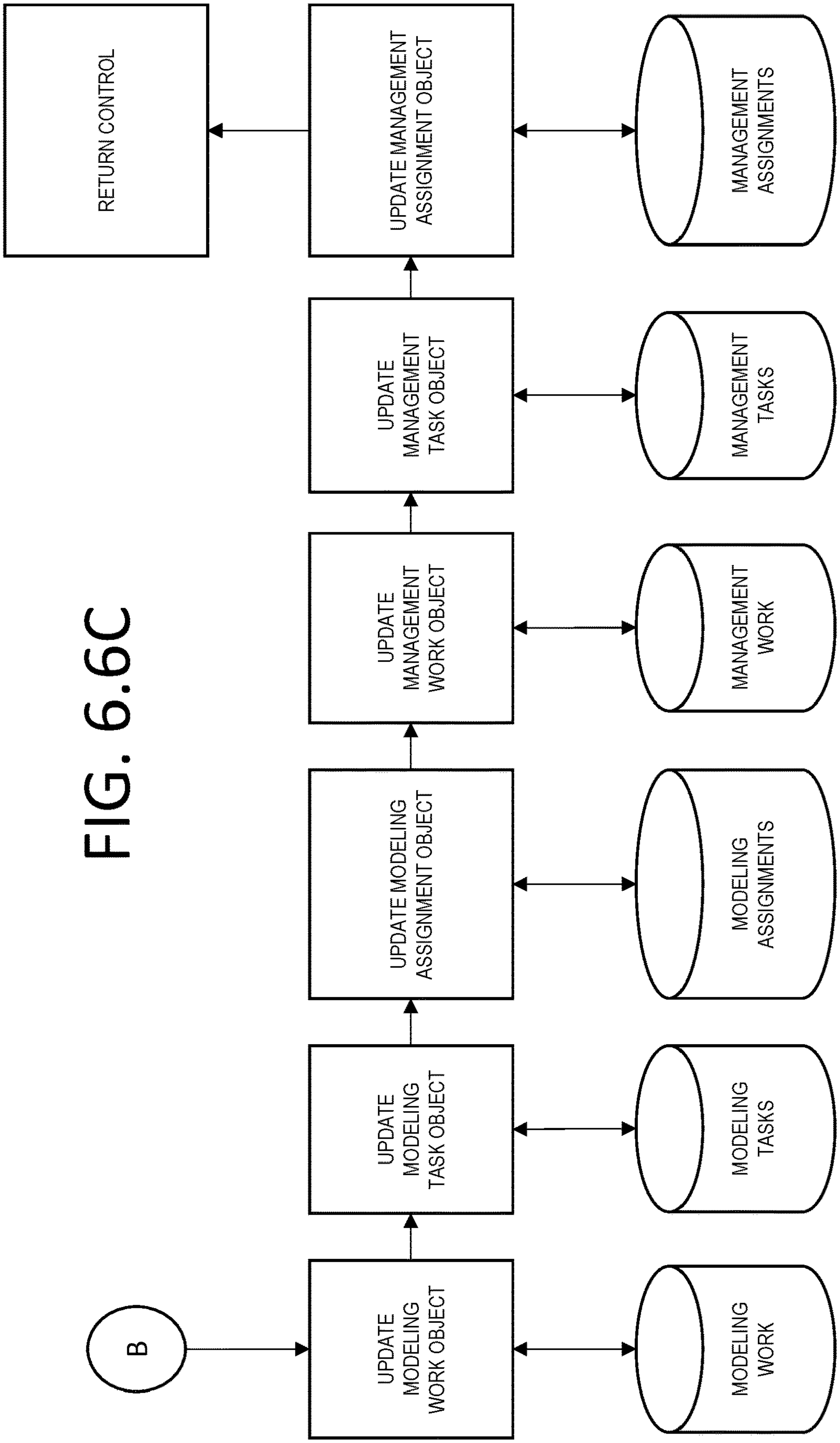
FIG. 6.6C

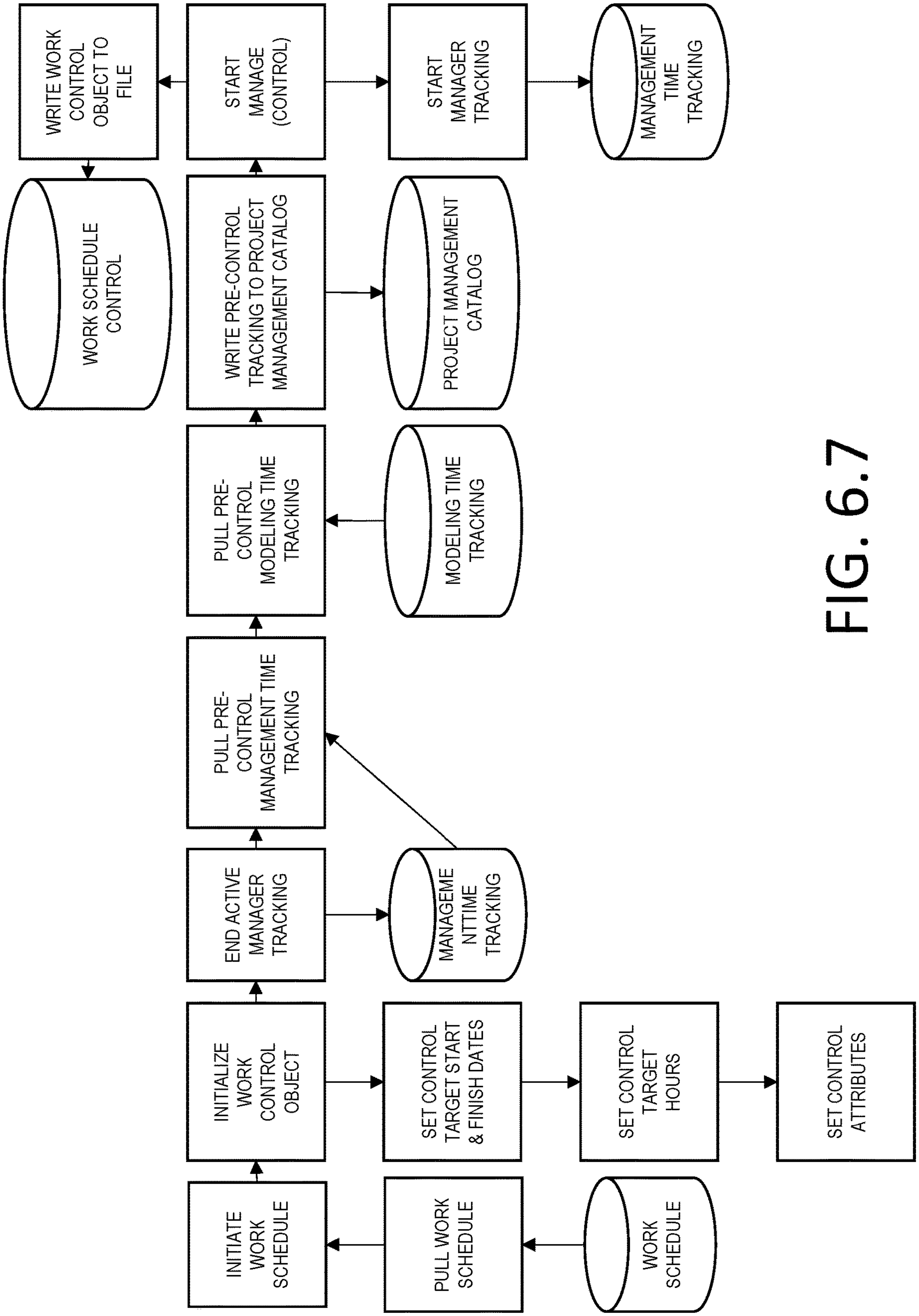
FIG. 6.7

FIG. 6.8
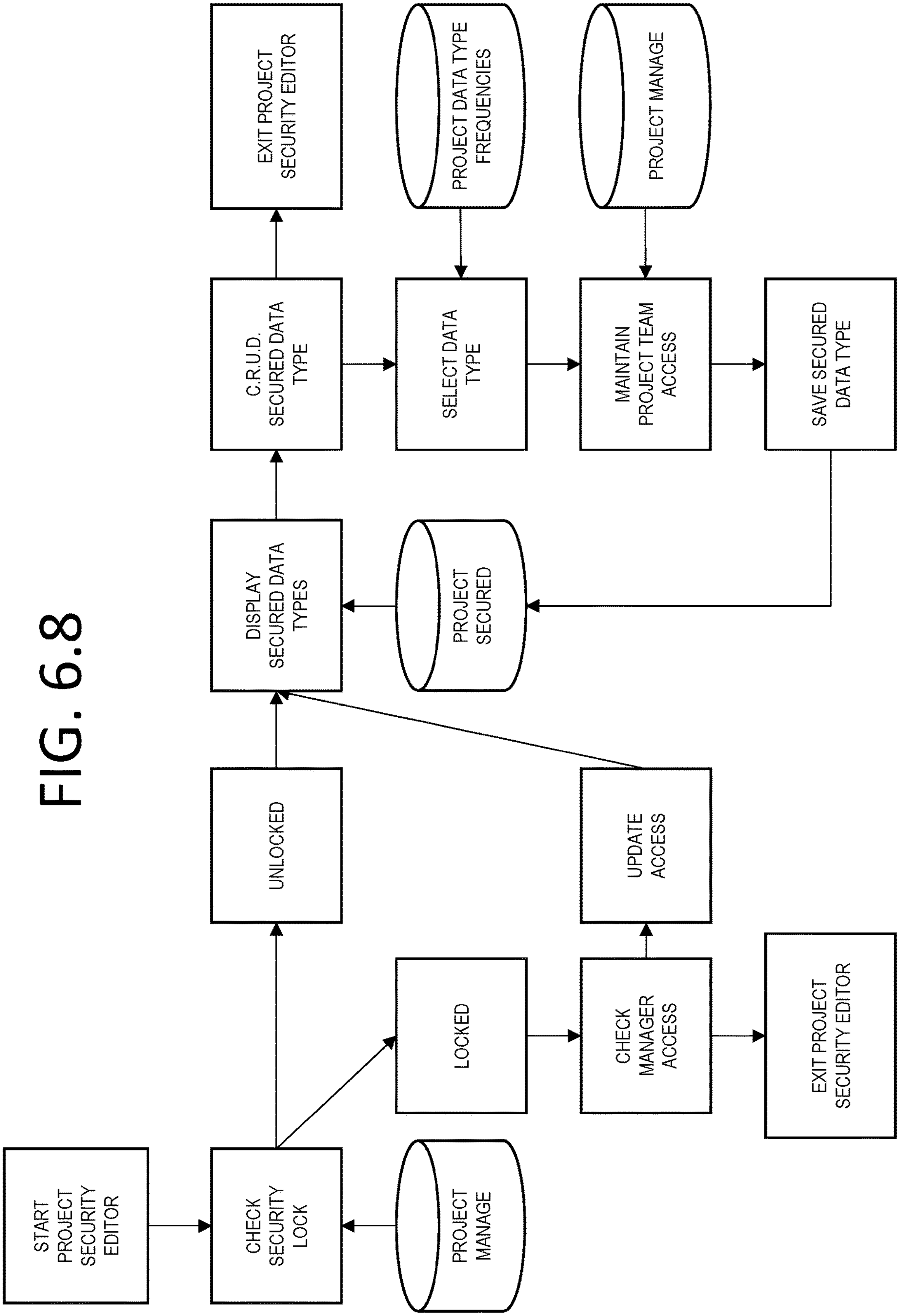

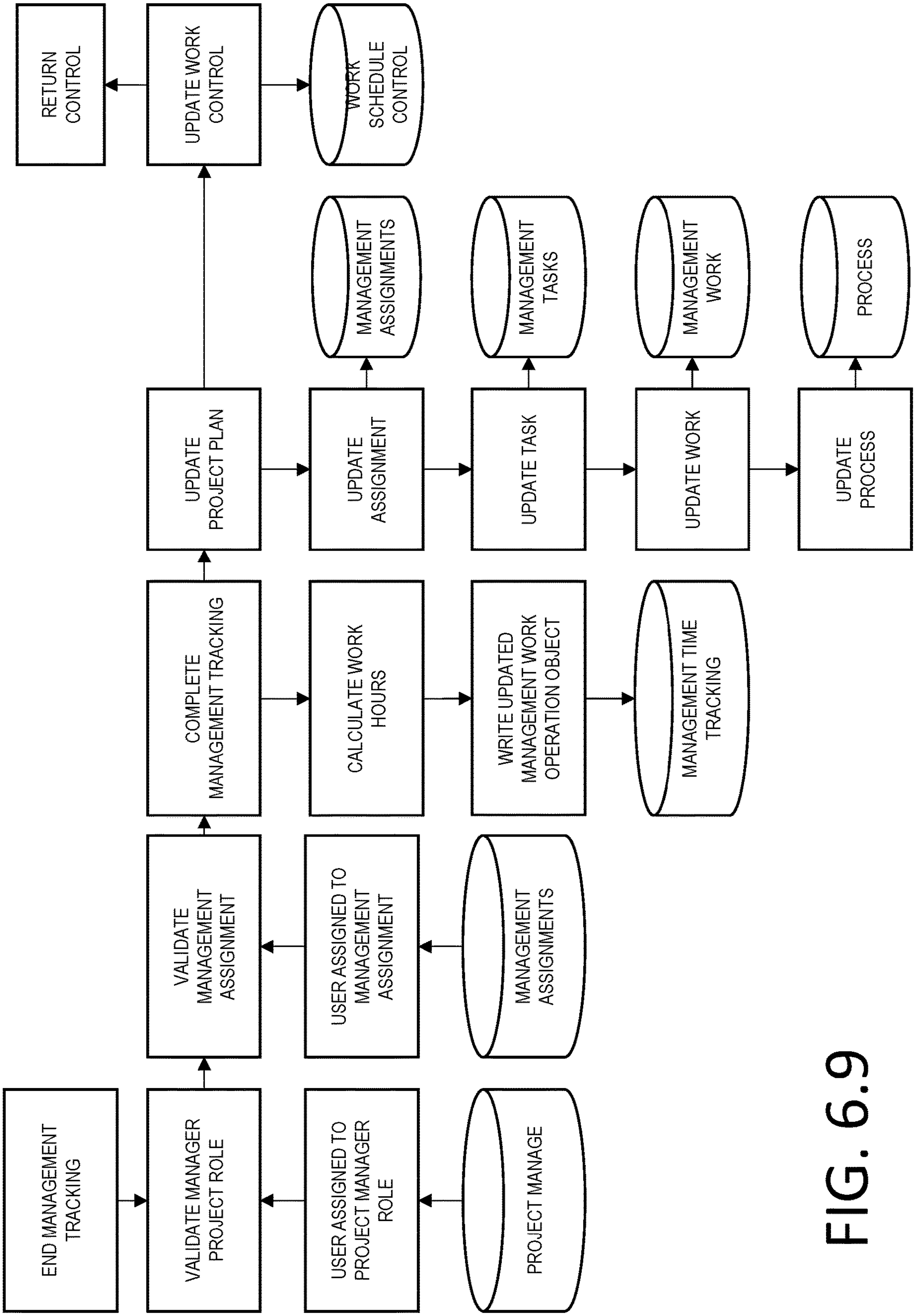
FIG. 6.9

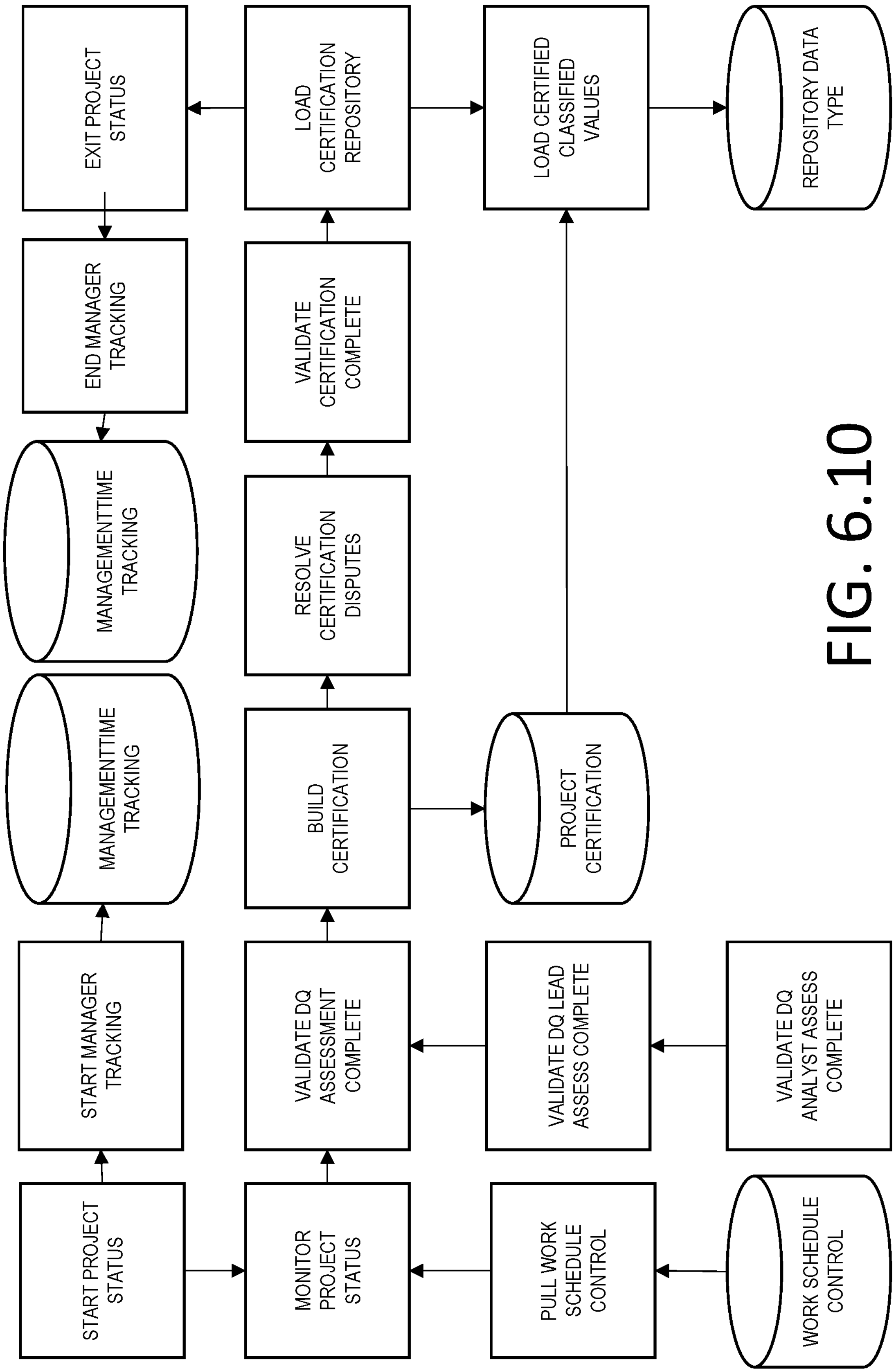
FIG. 6.10

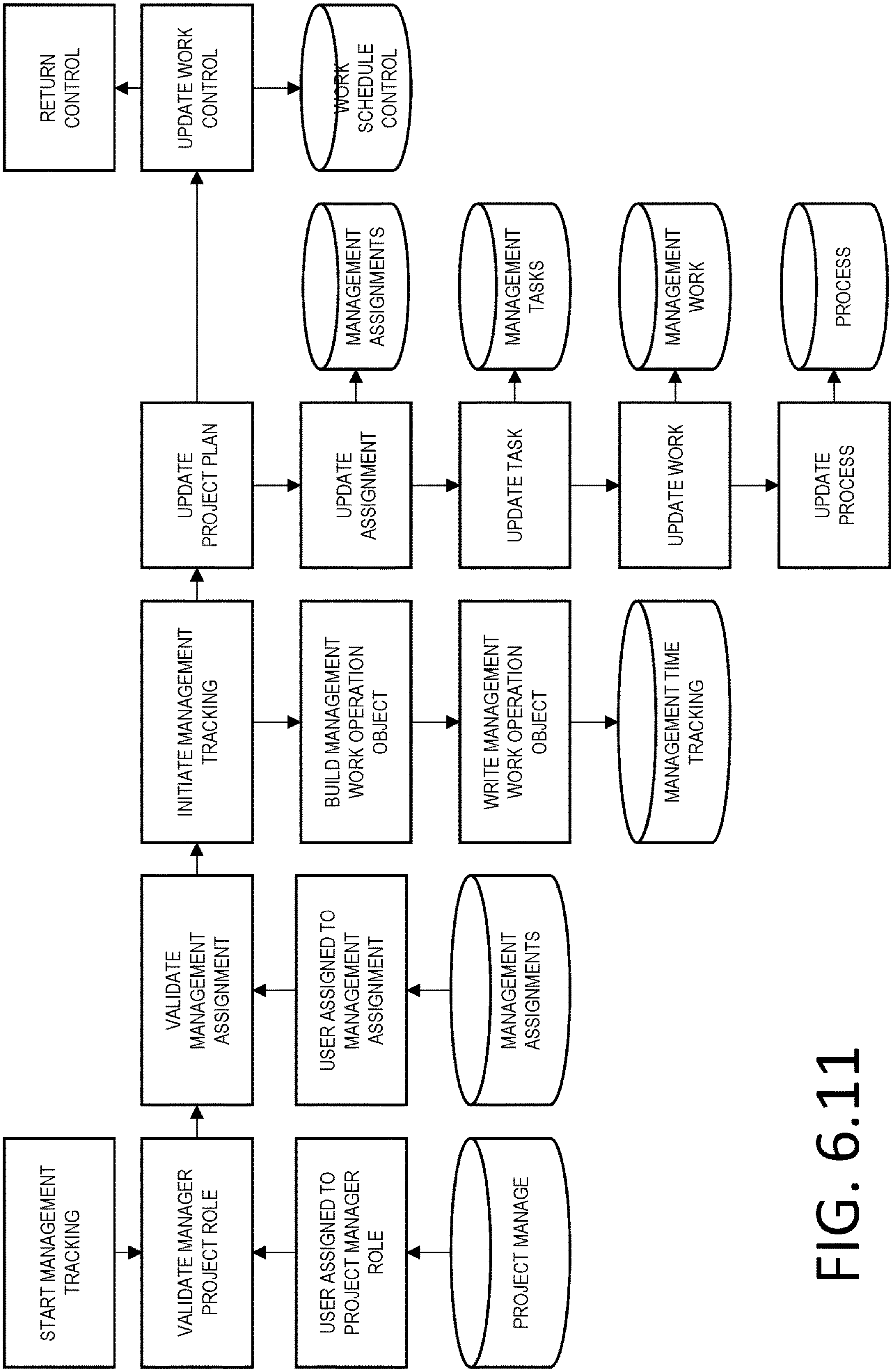
FIG. 6.11

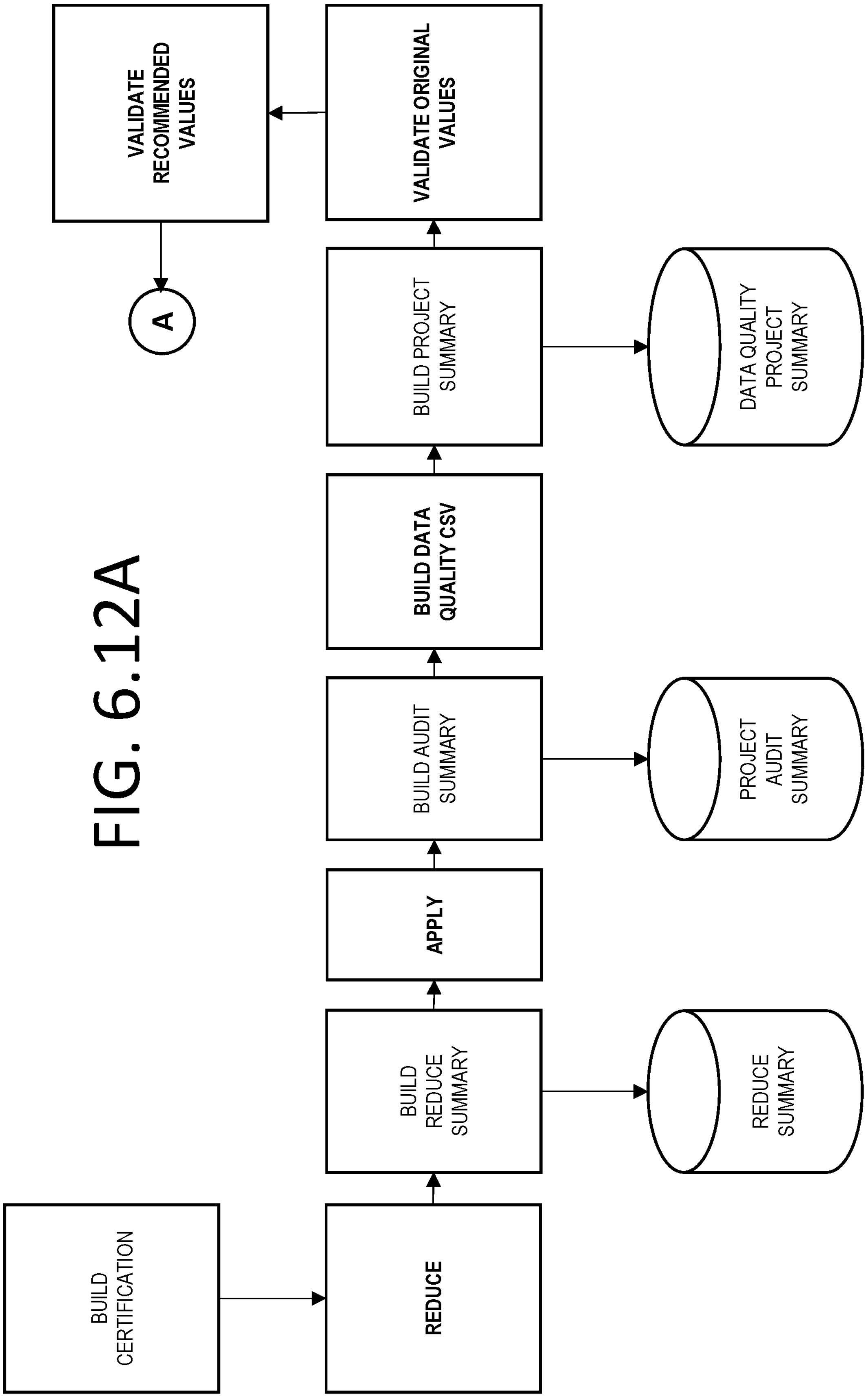
FIG. 6.12A

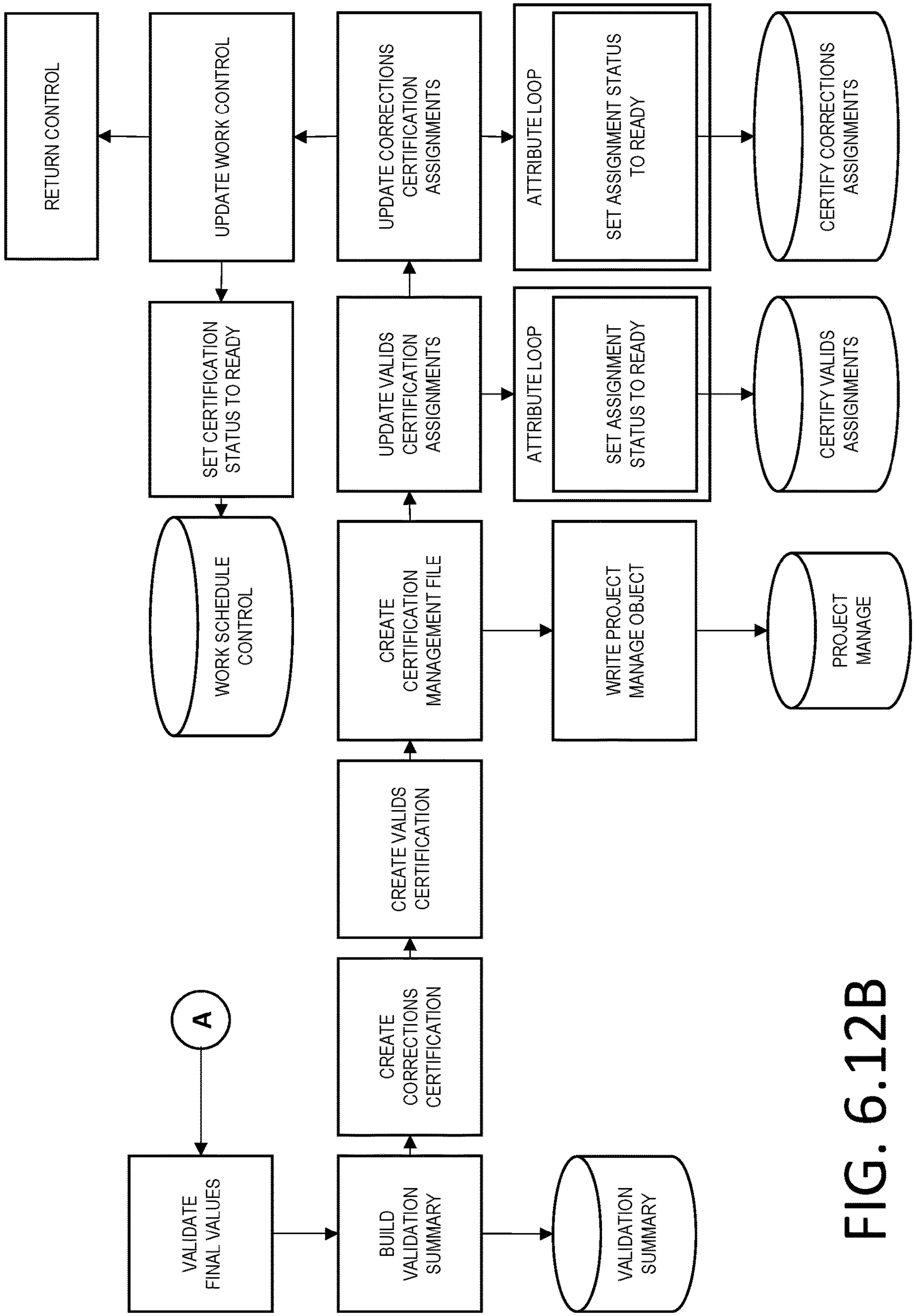
FIG. 6.12B

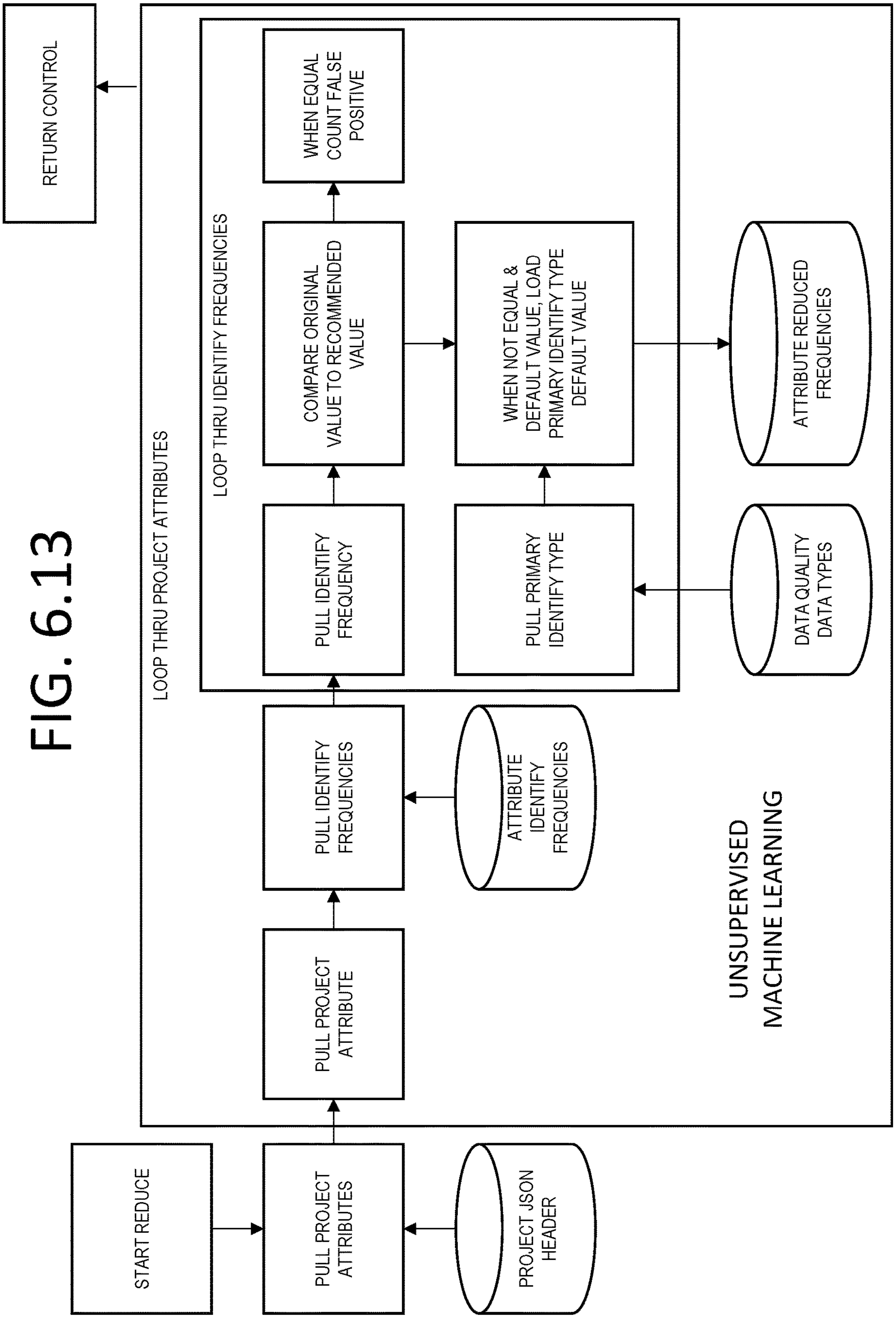
FIG. 6.13
START REDUCE
PULL PROJECT ATTRIBUTES
PROJECT JSON HEADER
LOOP THRU PROJECT ATTRIBUTES
PULL PROJECT ATTRIBUTE
PULL IDENTIFY FREQUENCIES
ATTRIBUTE IDENTIFY FREQUENCIES
LOOP THRU IDENTIFY FREQUENCIES
PULL IDENTIFY FREQUENCY
COMPARE ORIGINAL VALUE TO RECOMMENDED VALUE
WHEN EQUAL COUNT FALSE POSITIVE
PULL PRIMARY IDENTIFY TYPE
WHEN NOT EQUAL & DEFAULT VALUE, LOAD PRIMARY IDENTIFY TYPE DEFAULT VALUE
DATA QUALITY DATA TYPES
ATTRIBUTE REDUCED FREQUENCIES
UNSUPERVISED MACHINE LEARNING
RETURN CONTROL

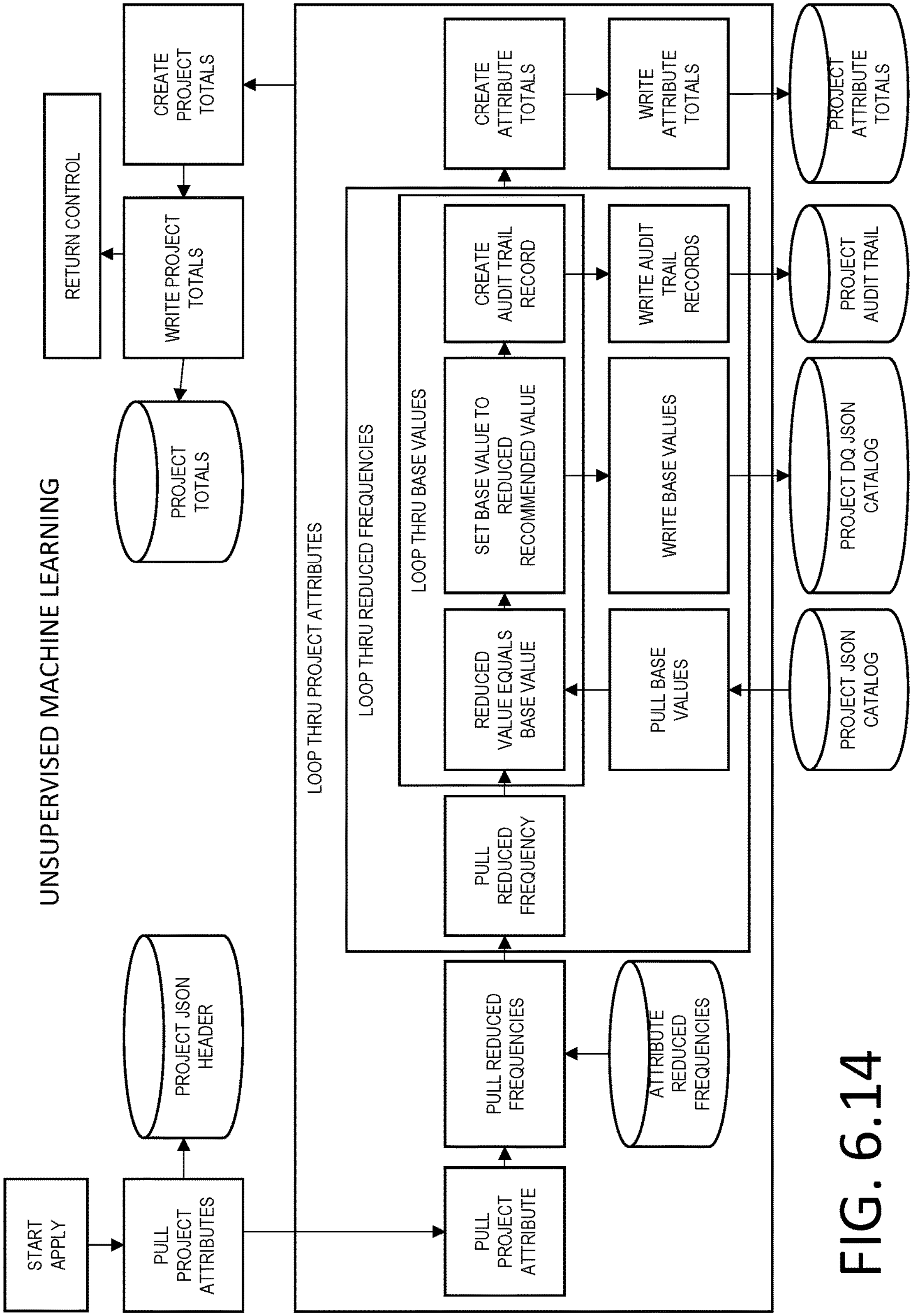
FIG. 6.14

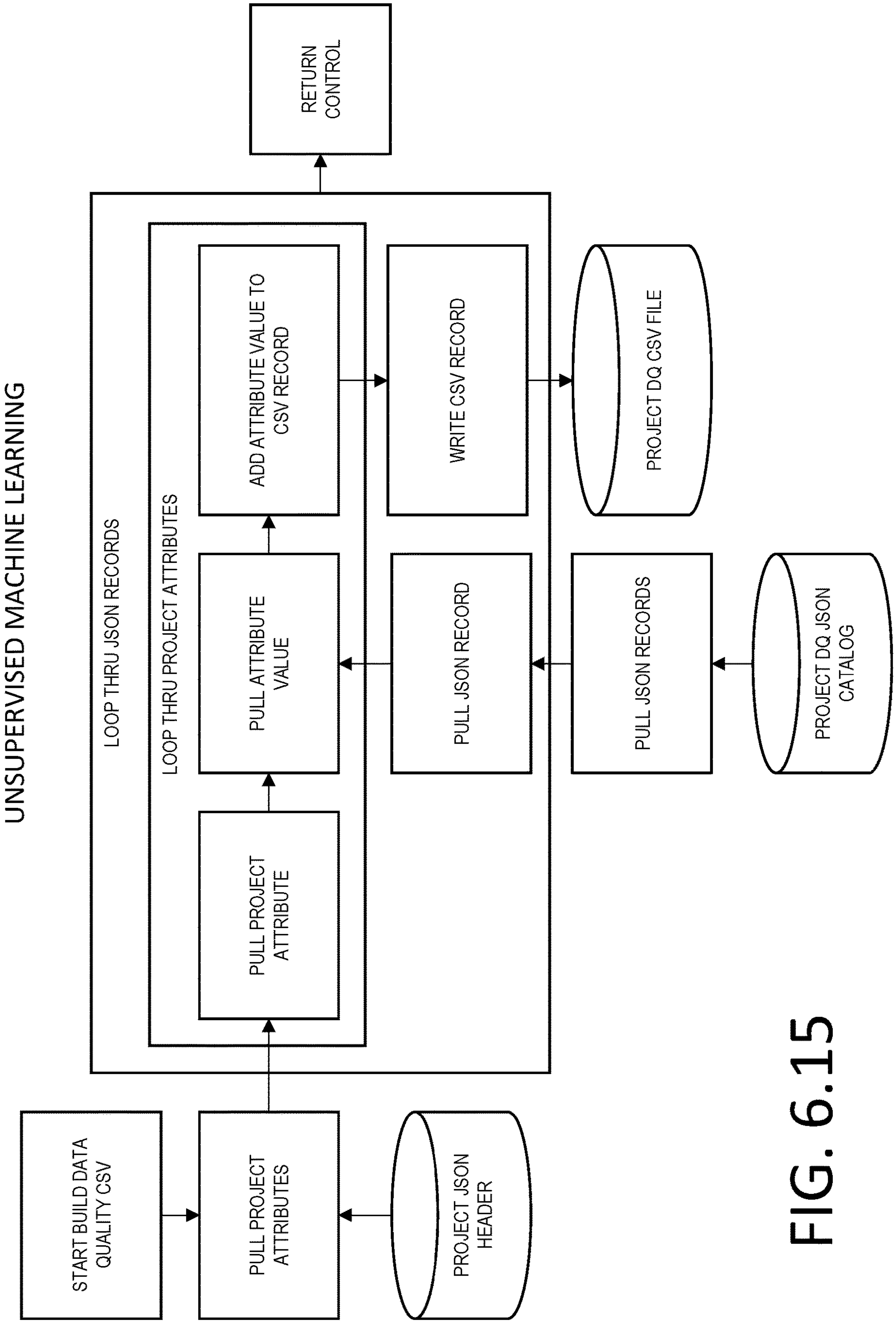
FIG. 6.15

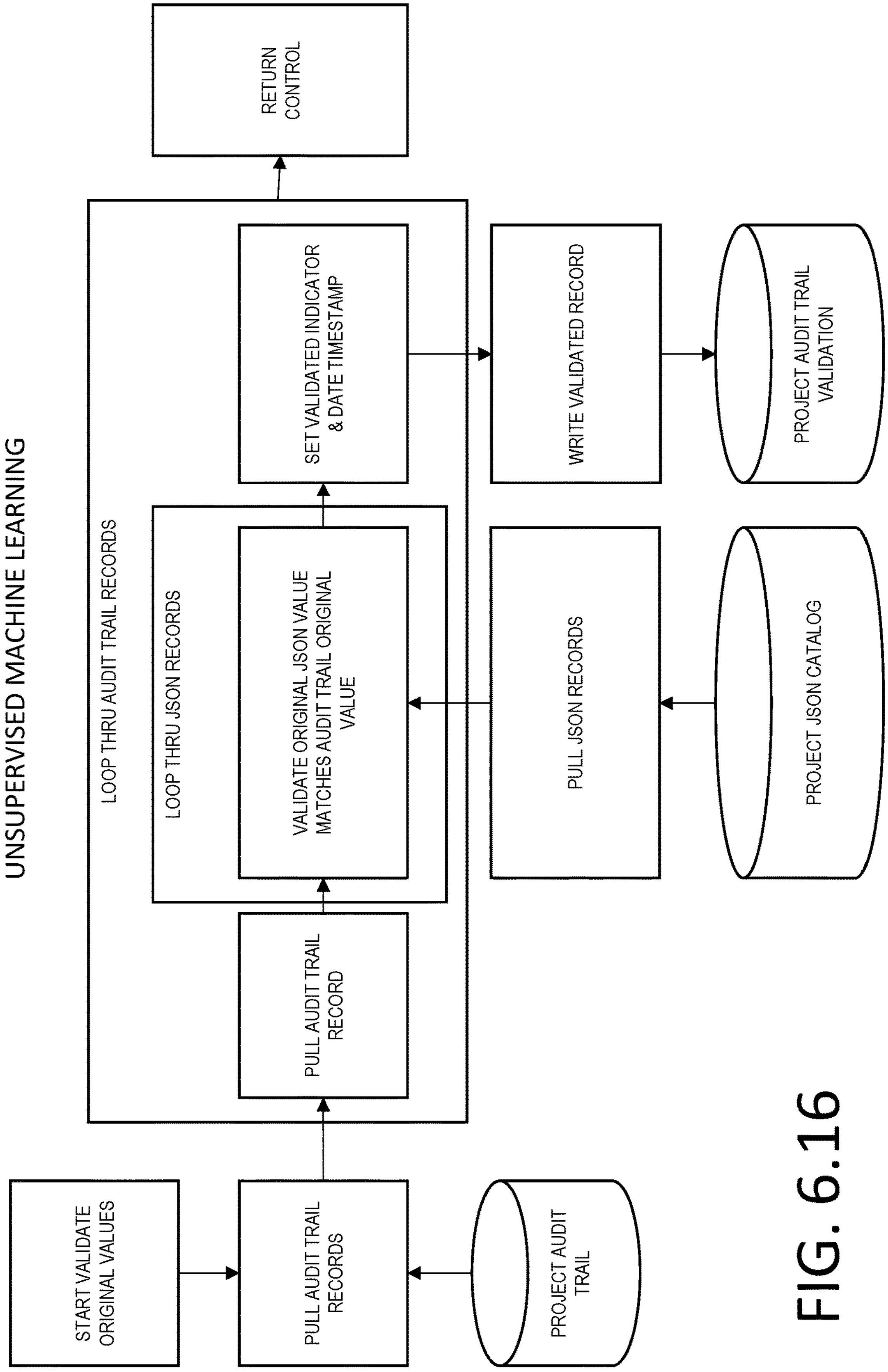
FIG. 6.16

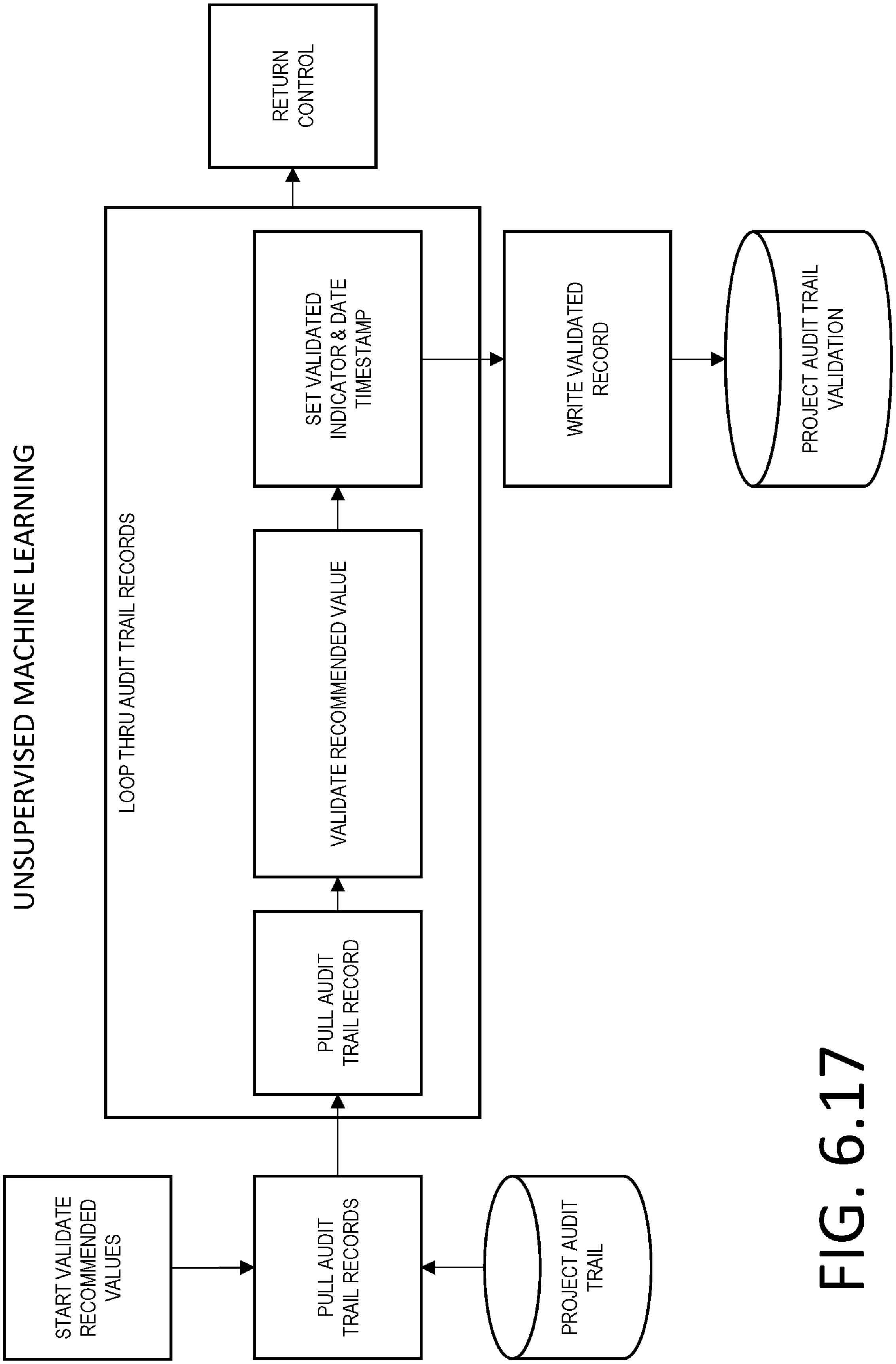
FIG. 6.17

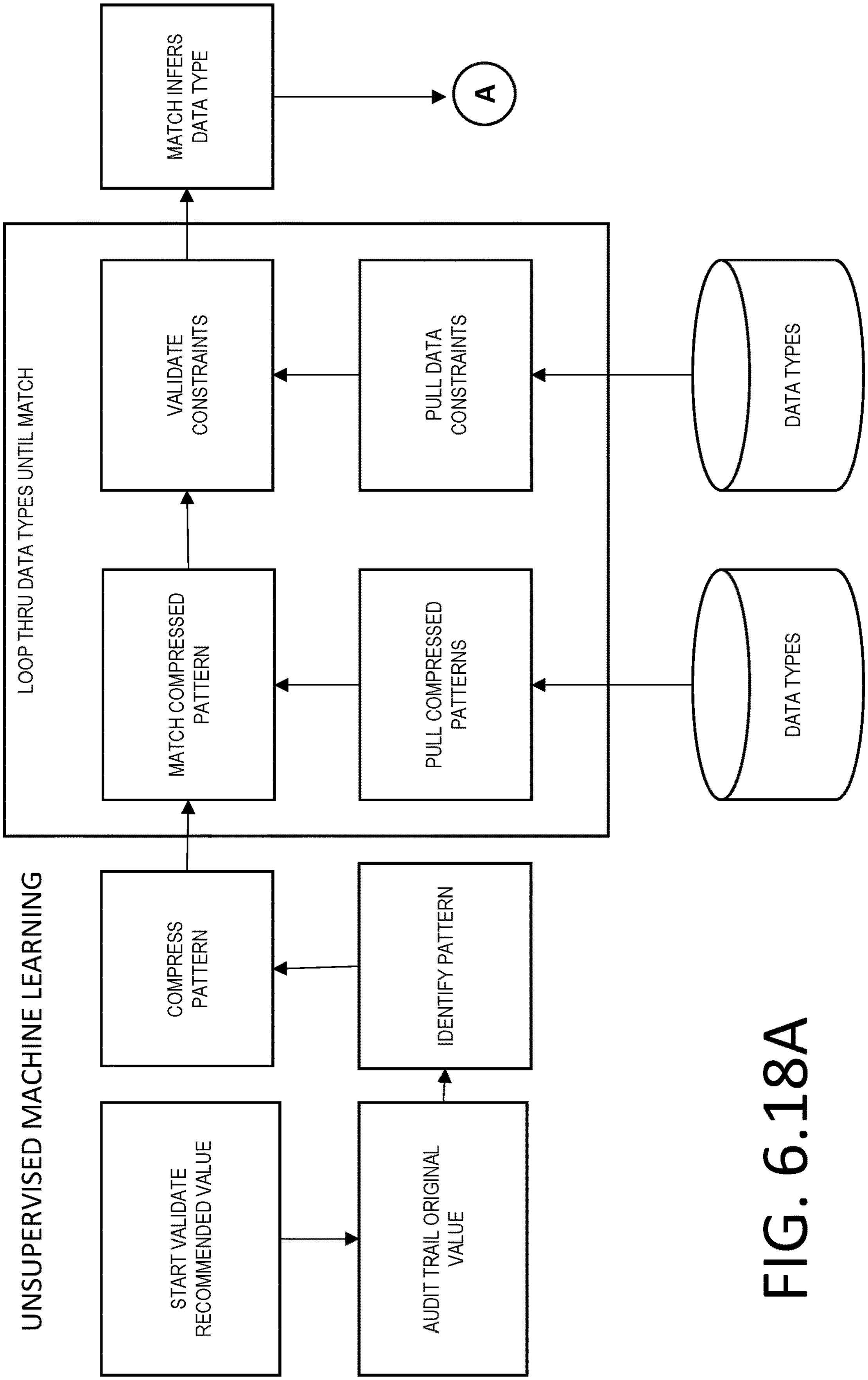
FIG. 6.18A

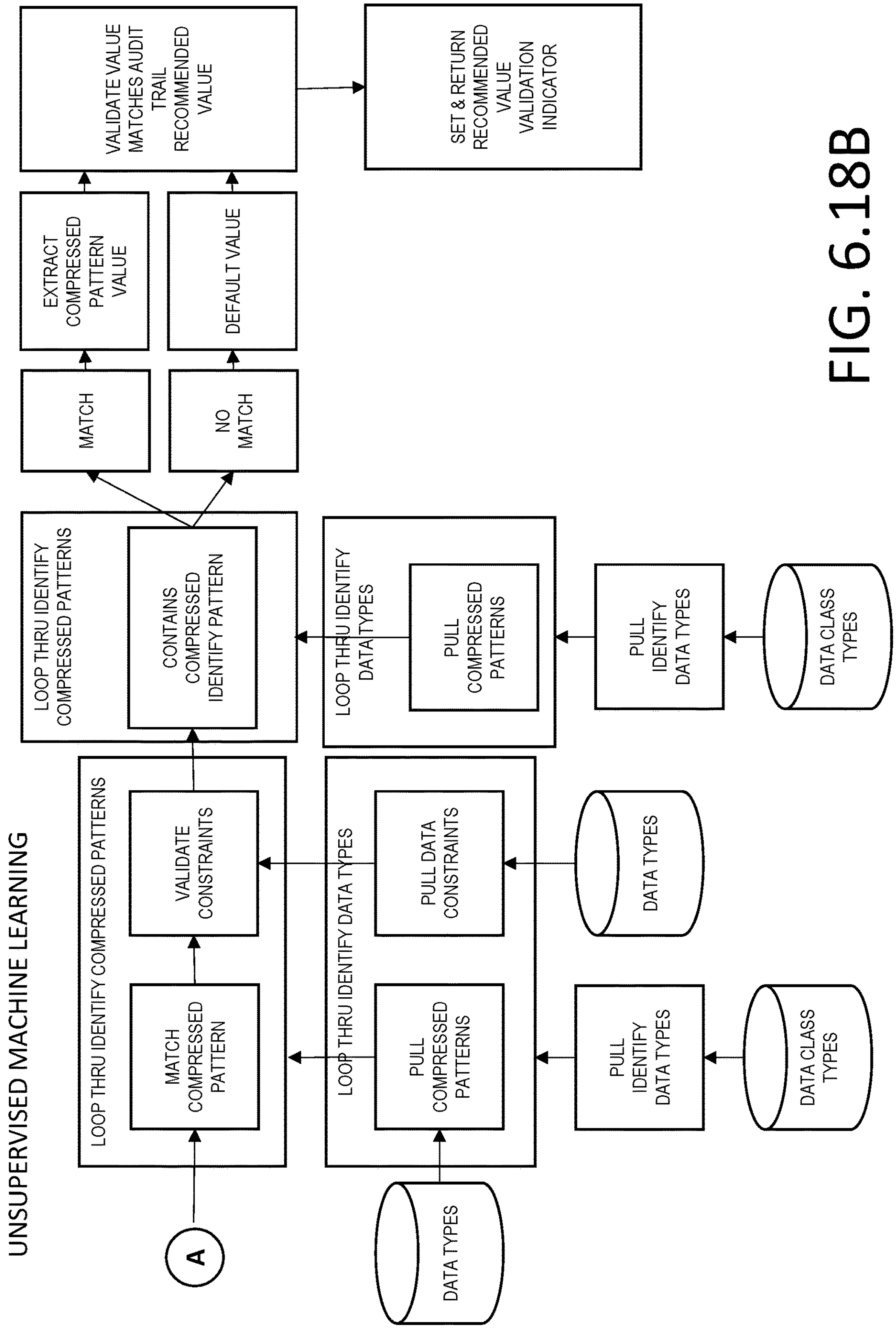
FIG. 6.18B

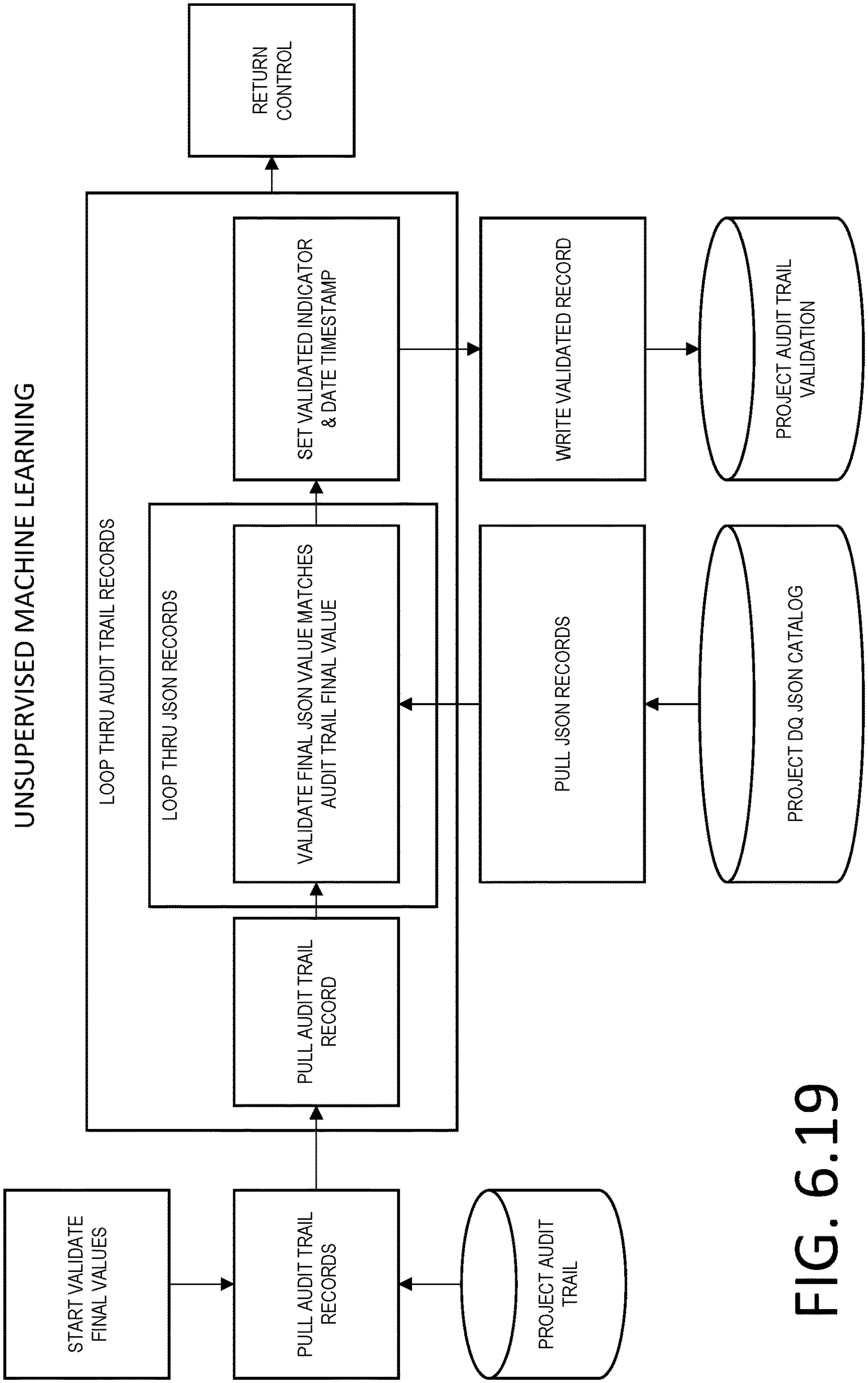
FIG. 6.19

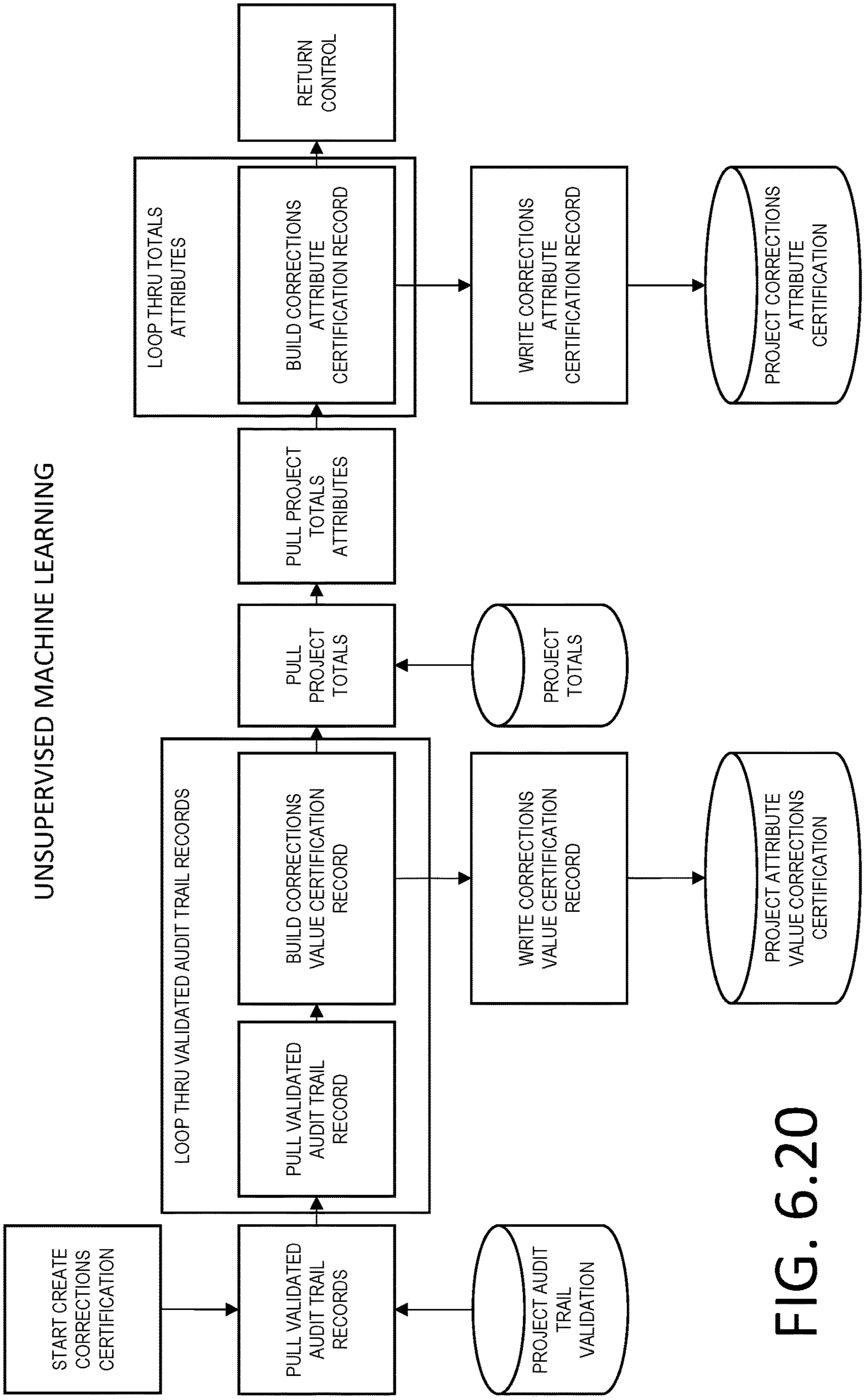
FIG. 6.20

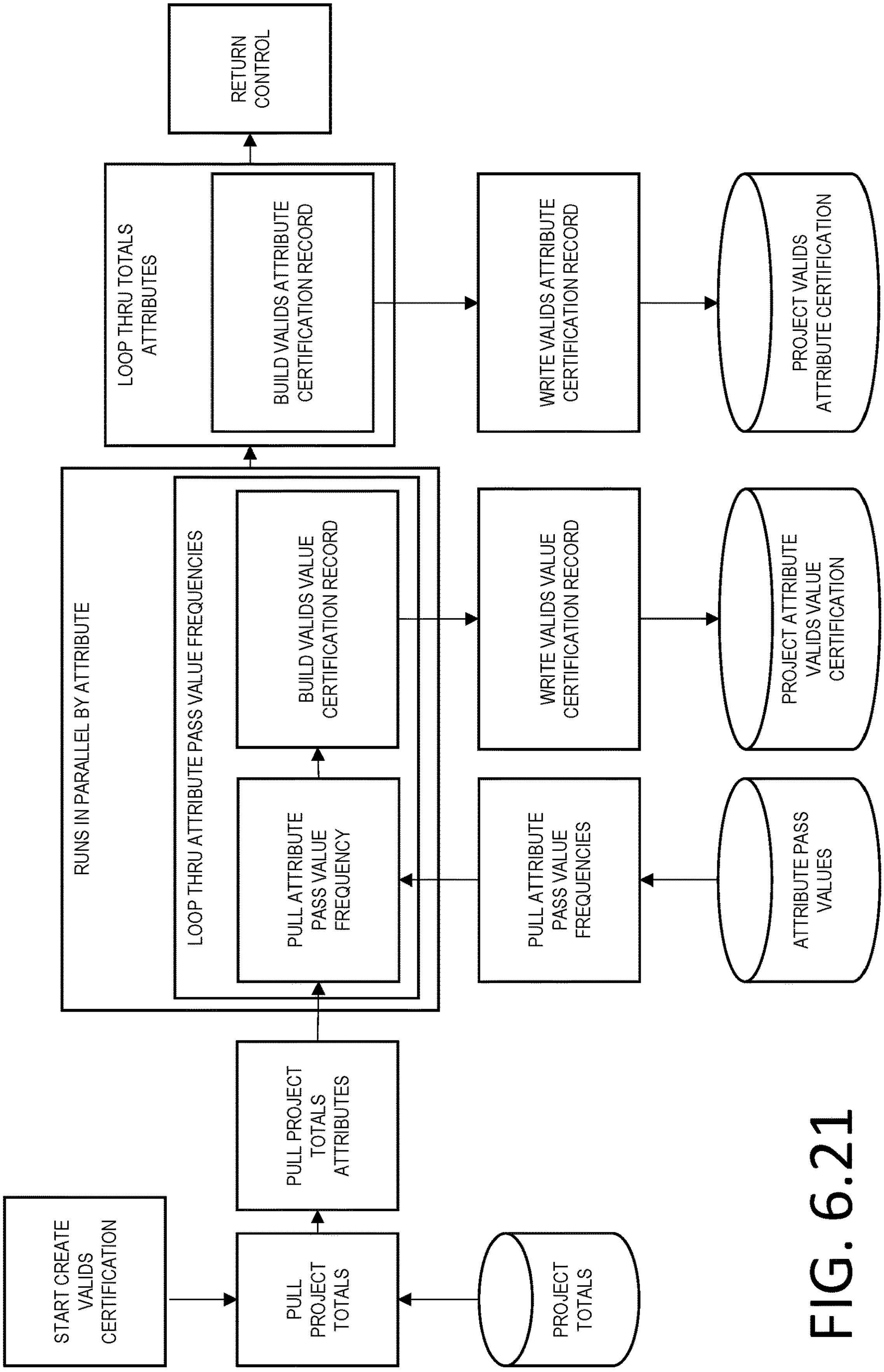
FIG. 6.21

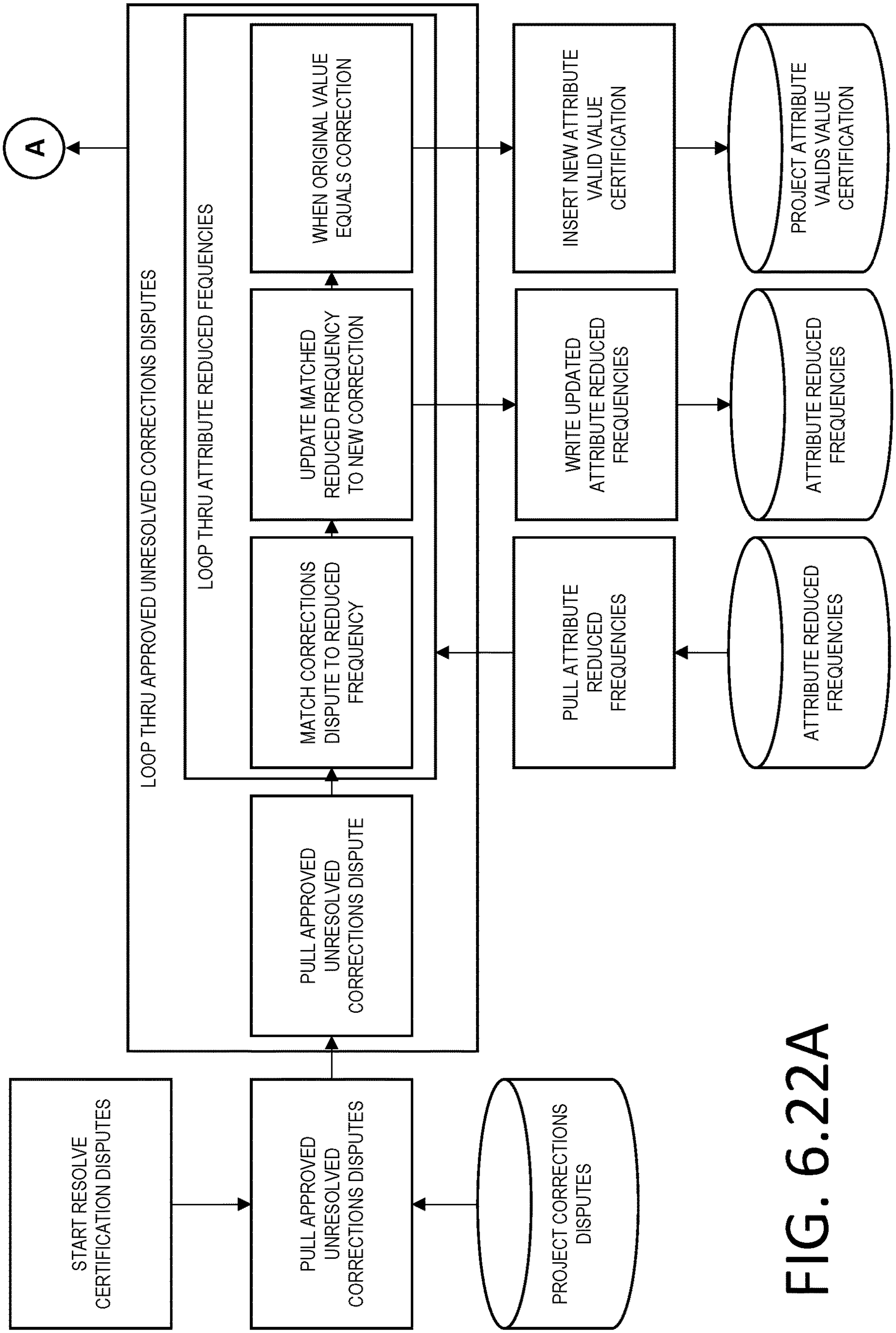
FIG. 6.22A

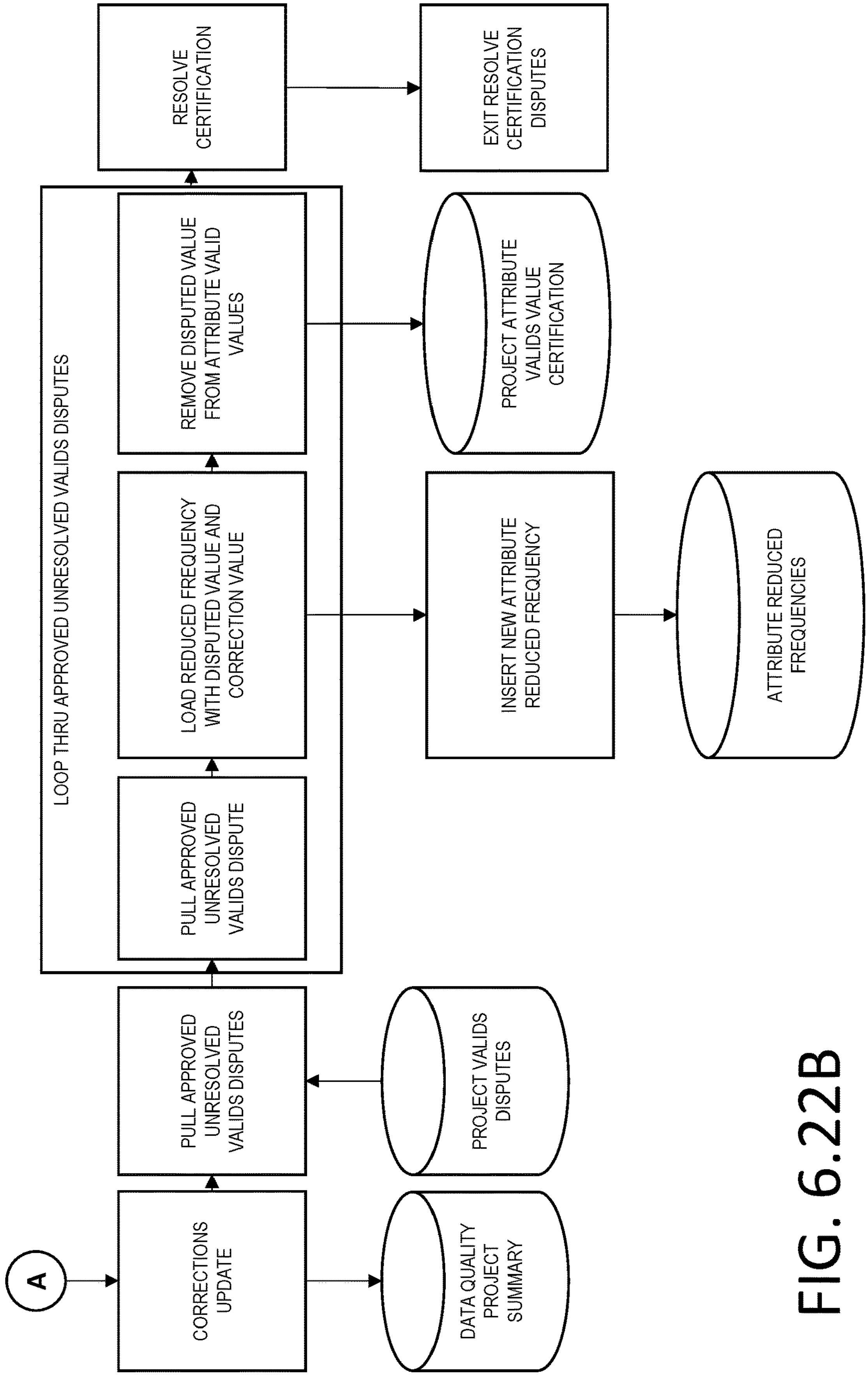
FIG. 6.22B

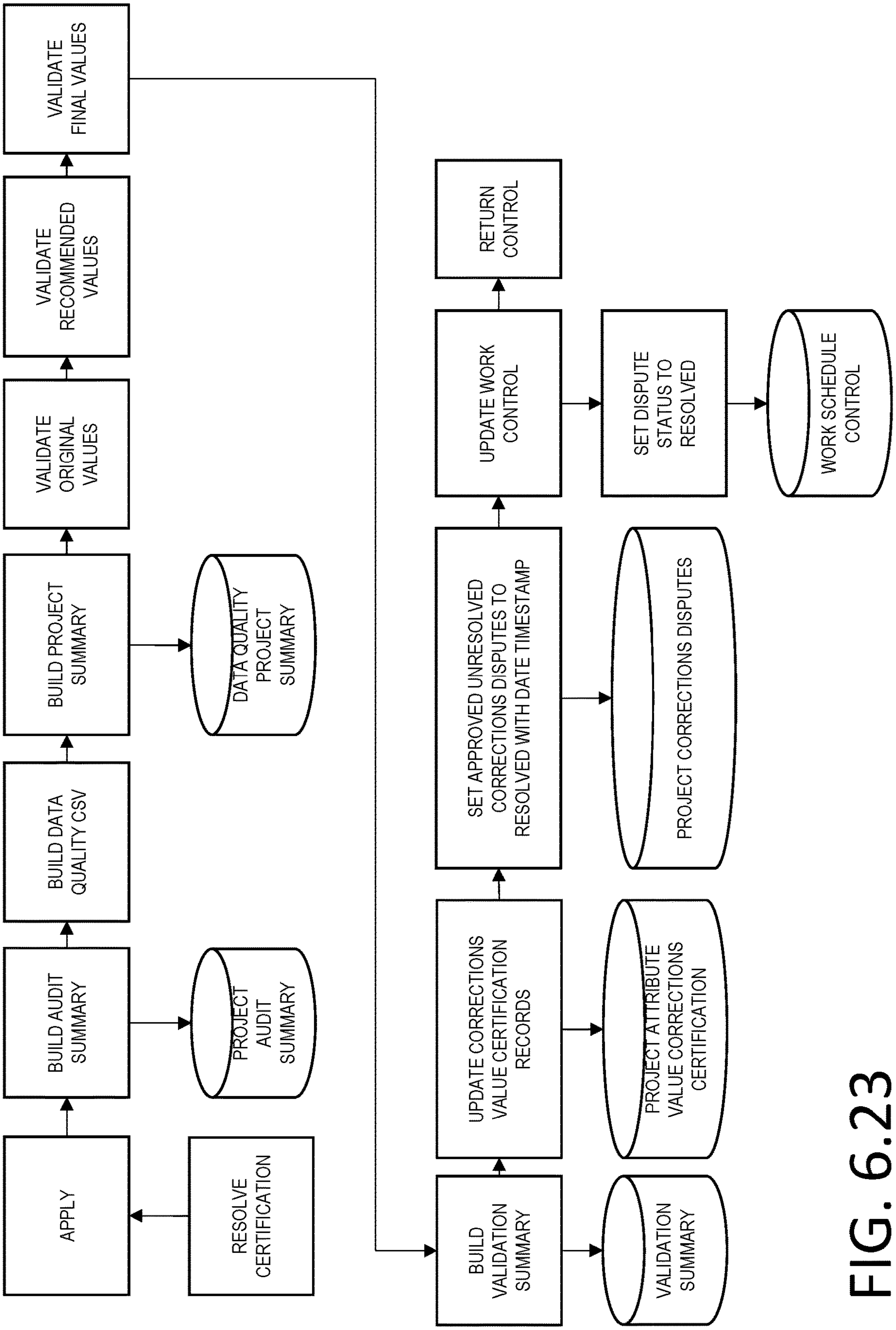
FIG. 6.23

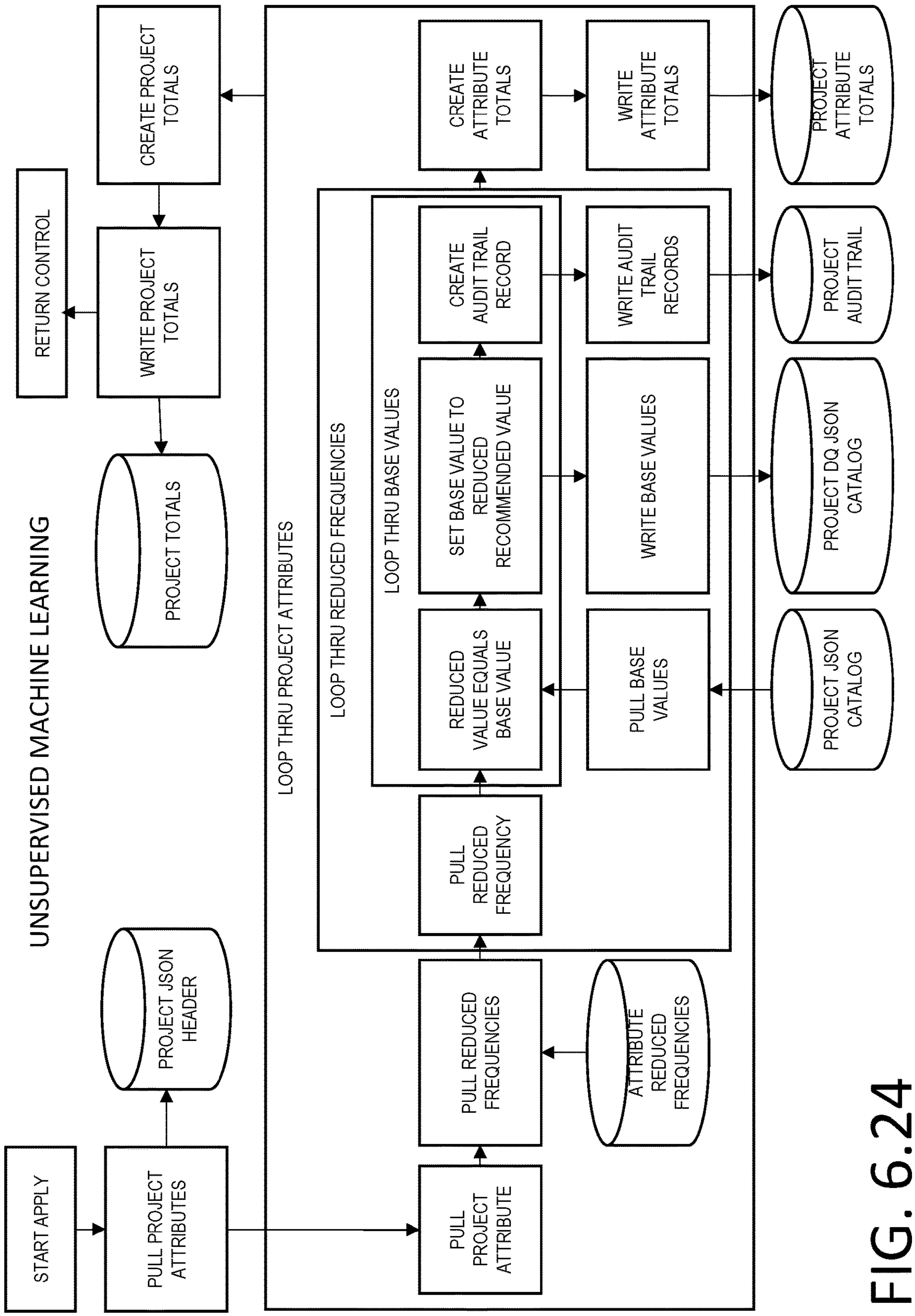
FIG. 6.24

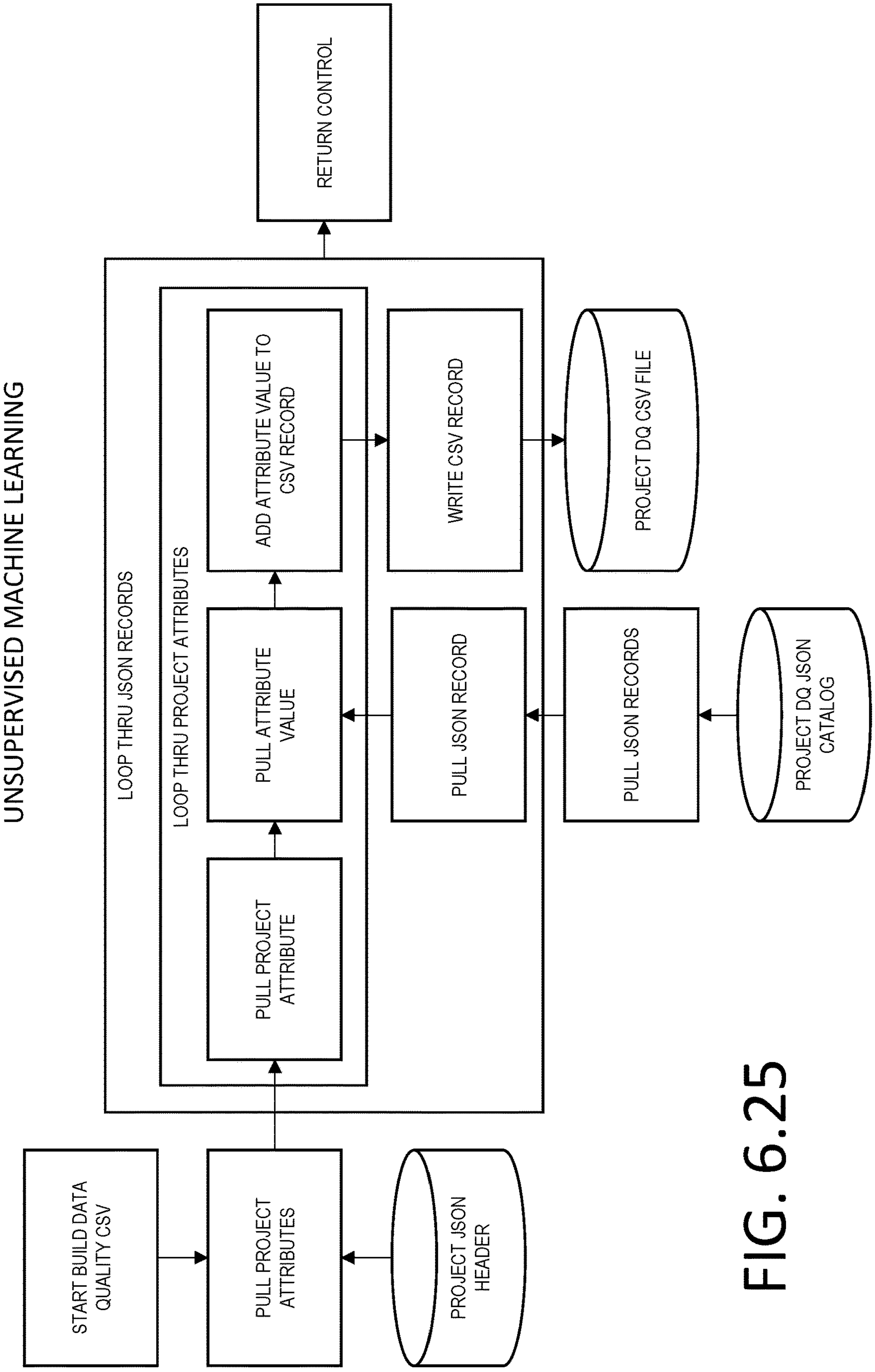
FIG. 6.25

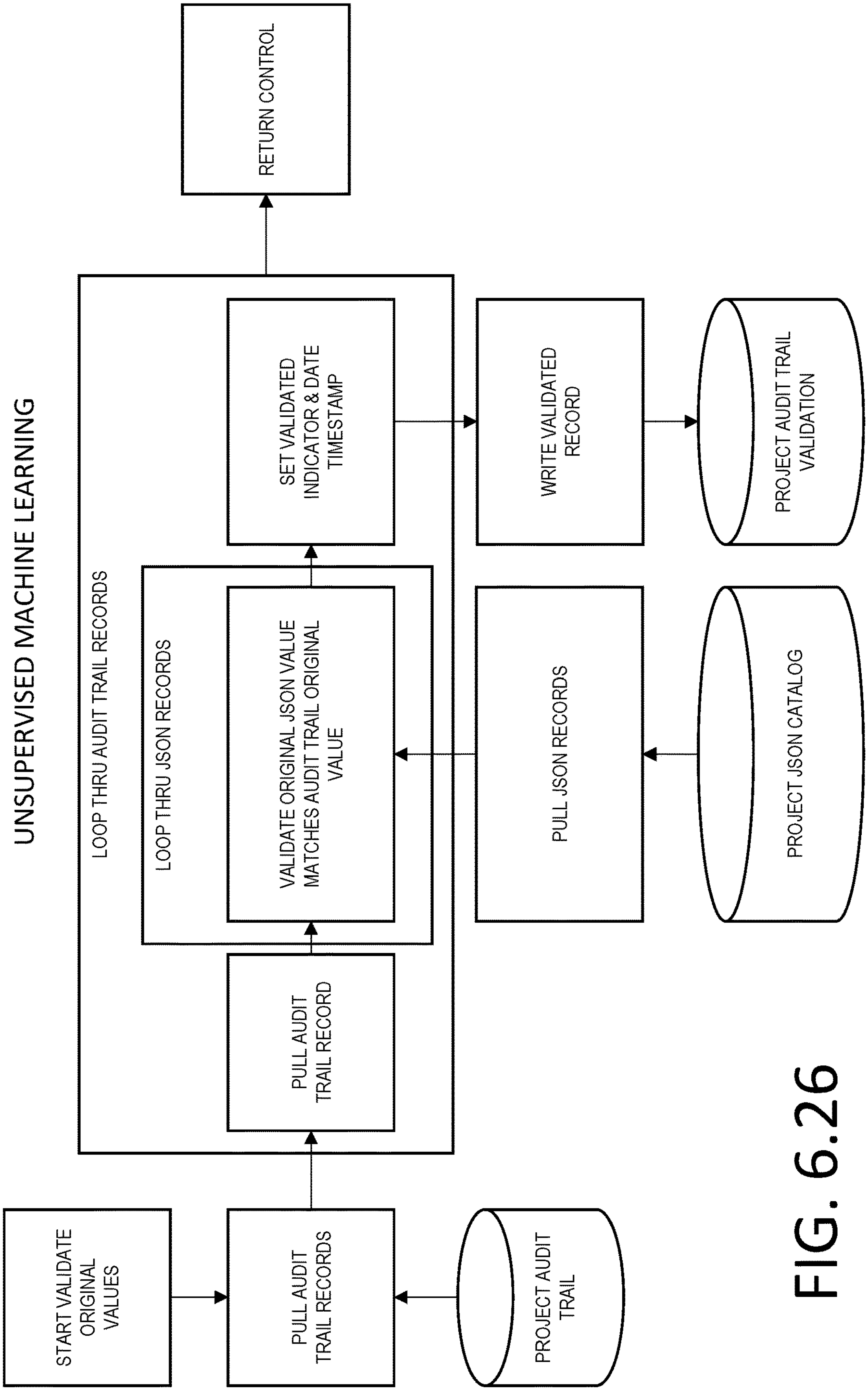
FIG. 6.26

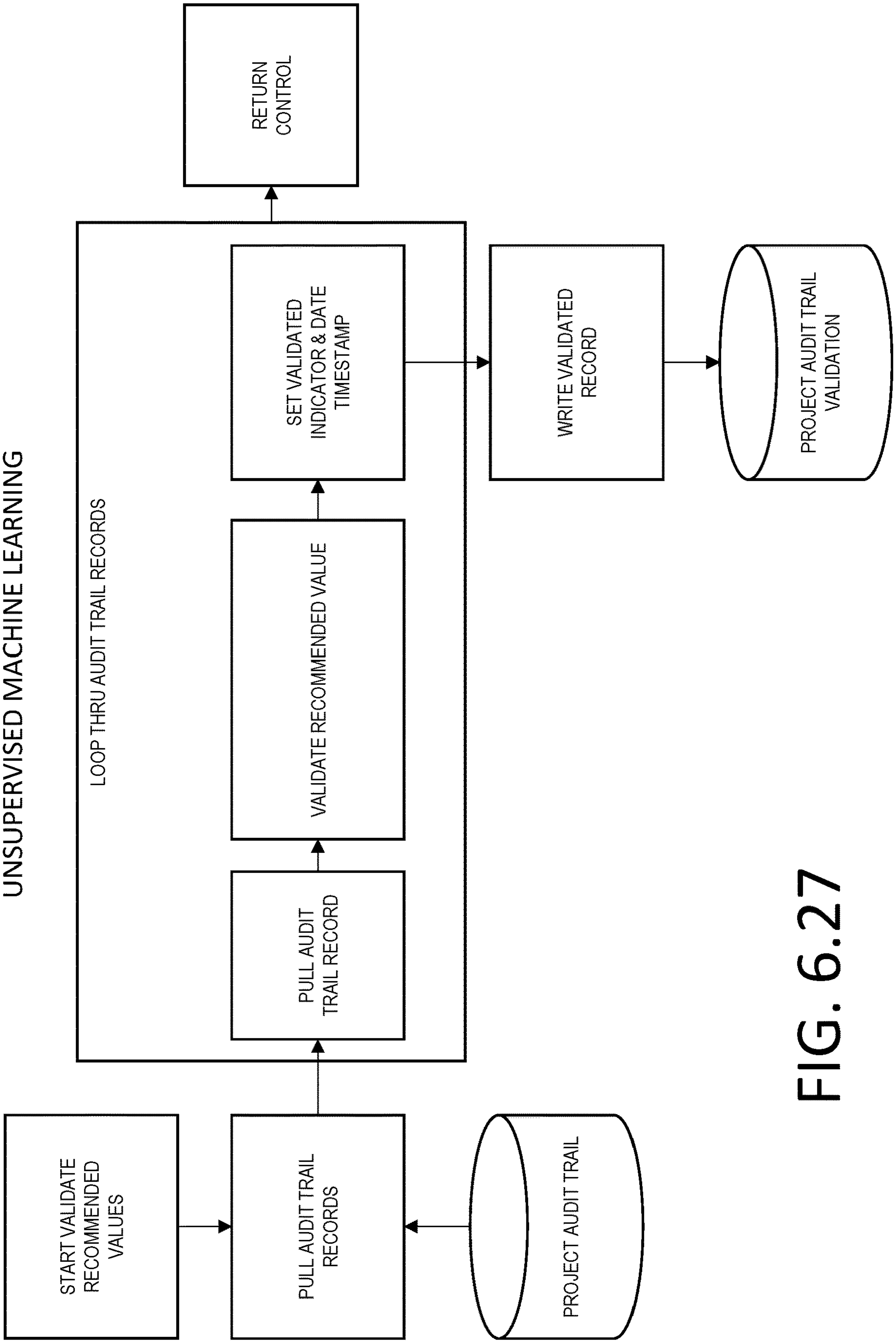
FIG. 6.27

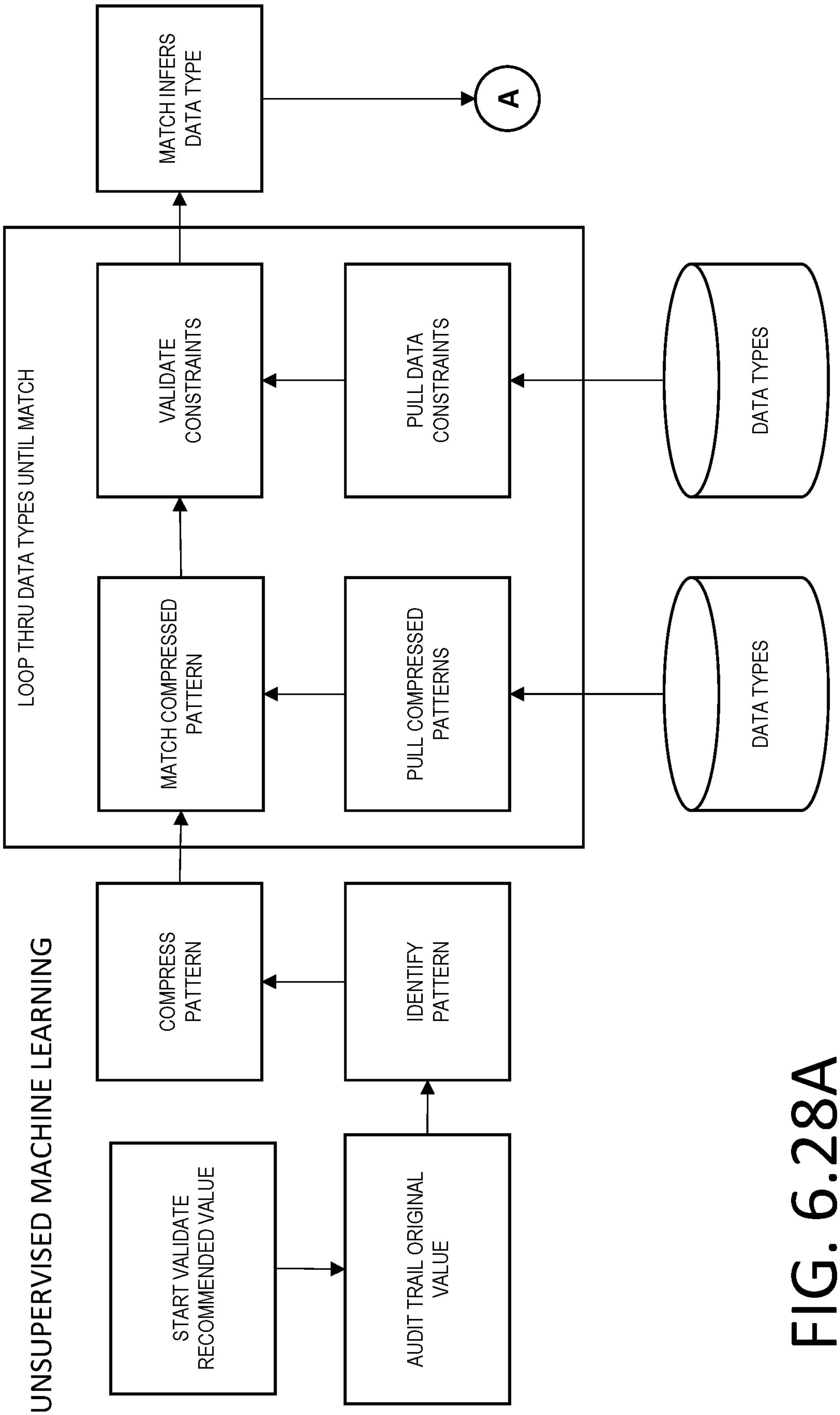
FIG. 6.28A

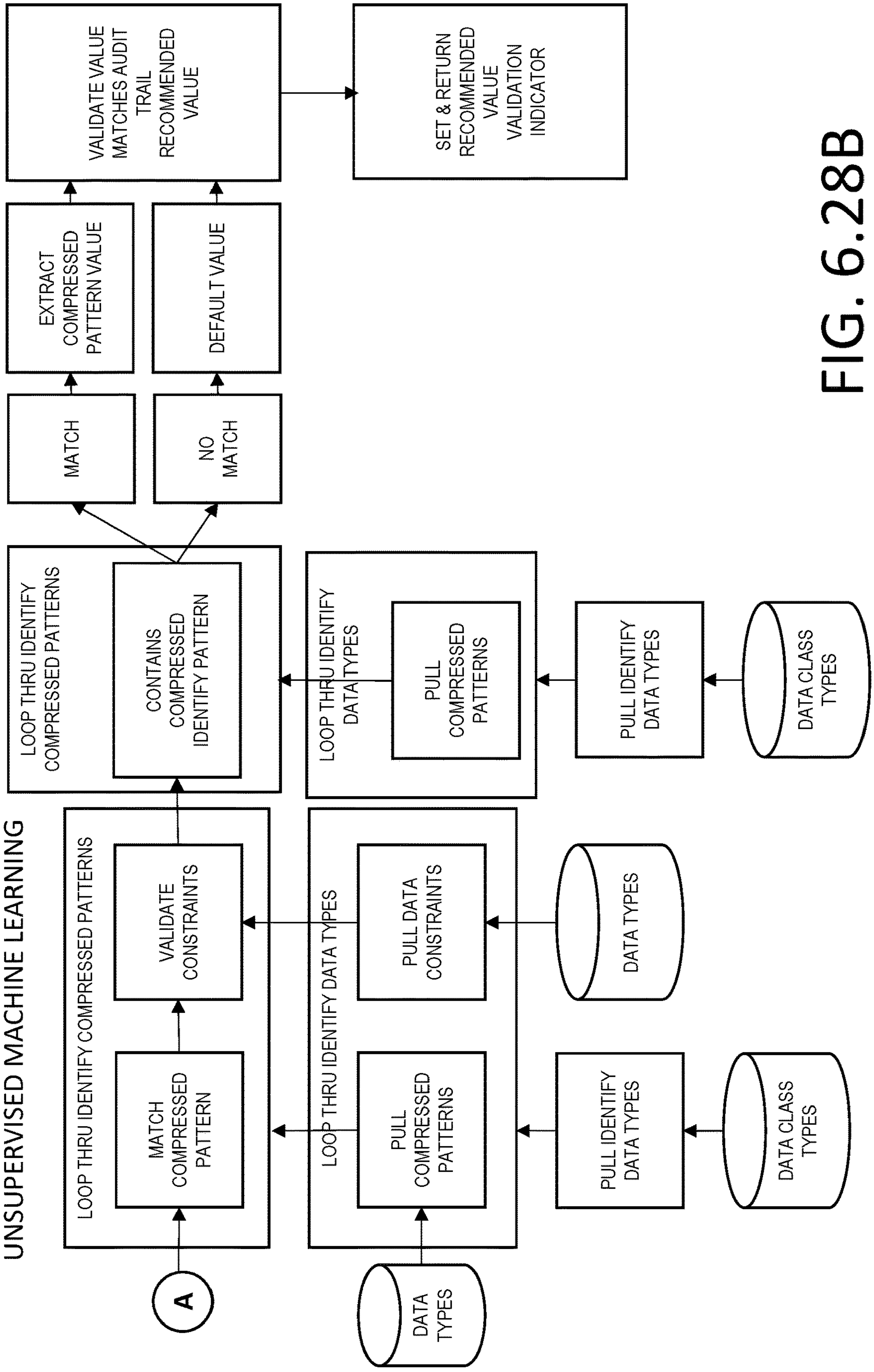
FIG. 6.28B

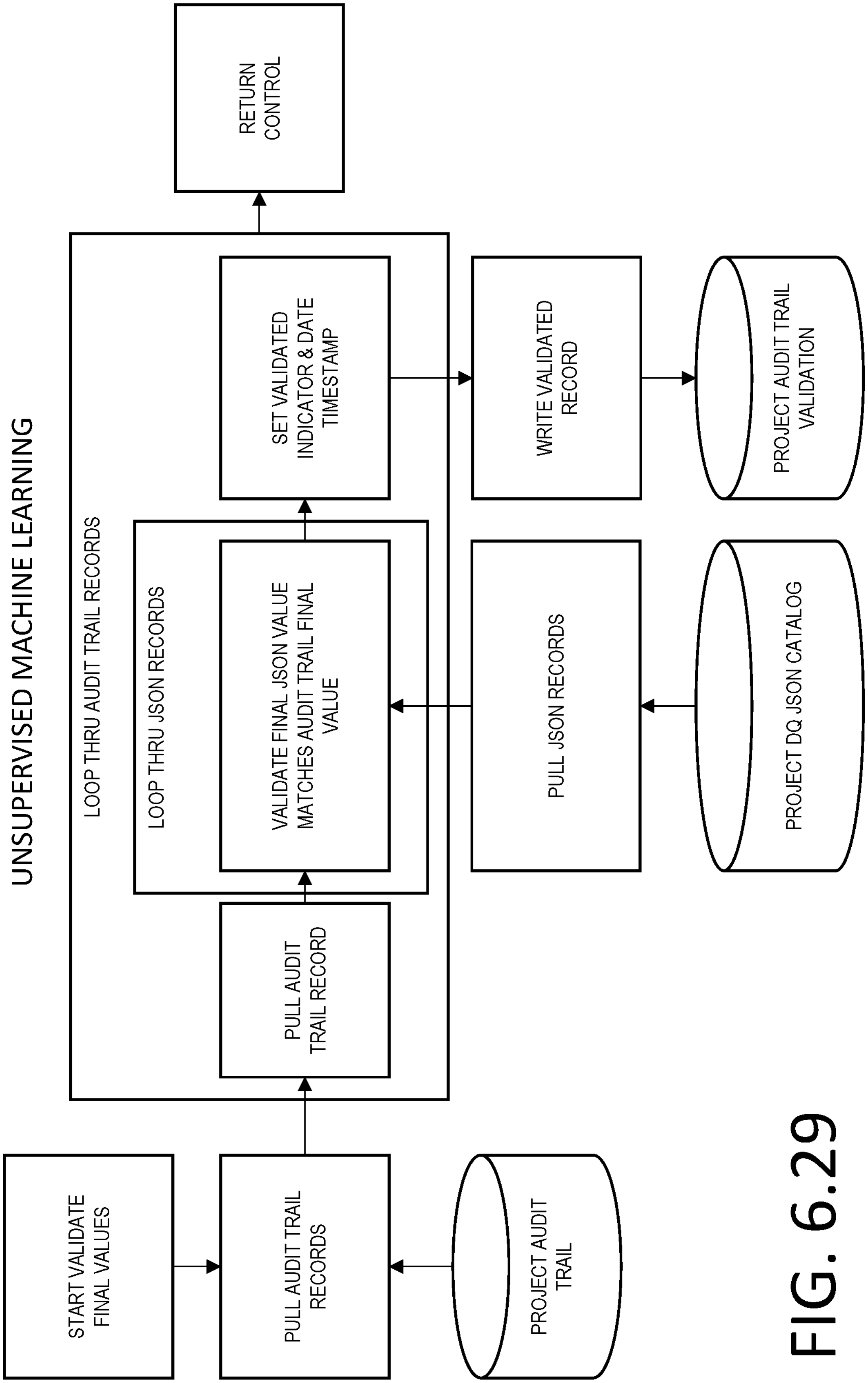
FIG. 6.29

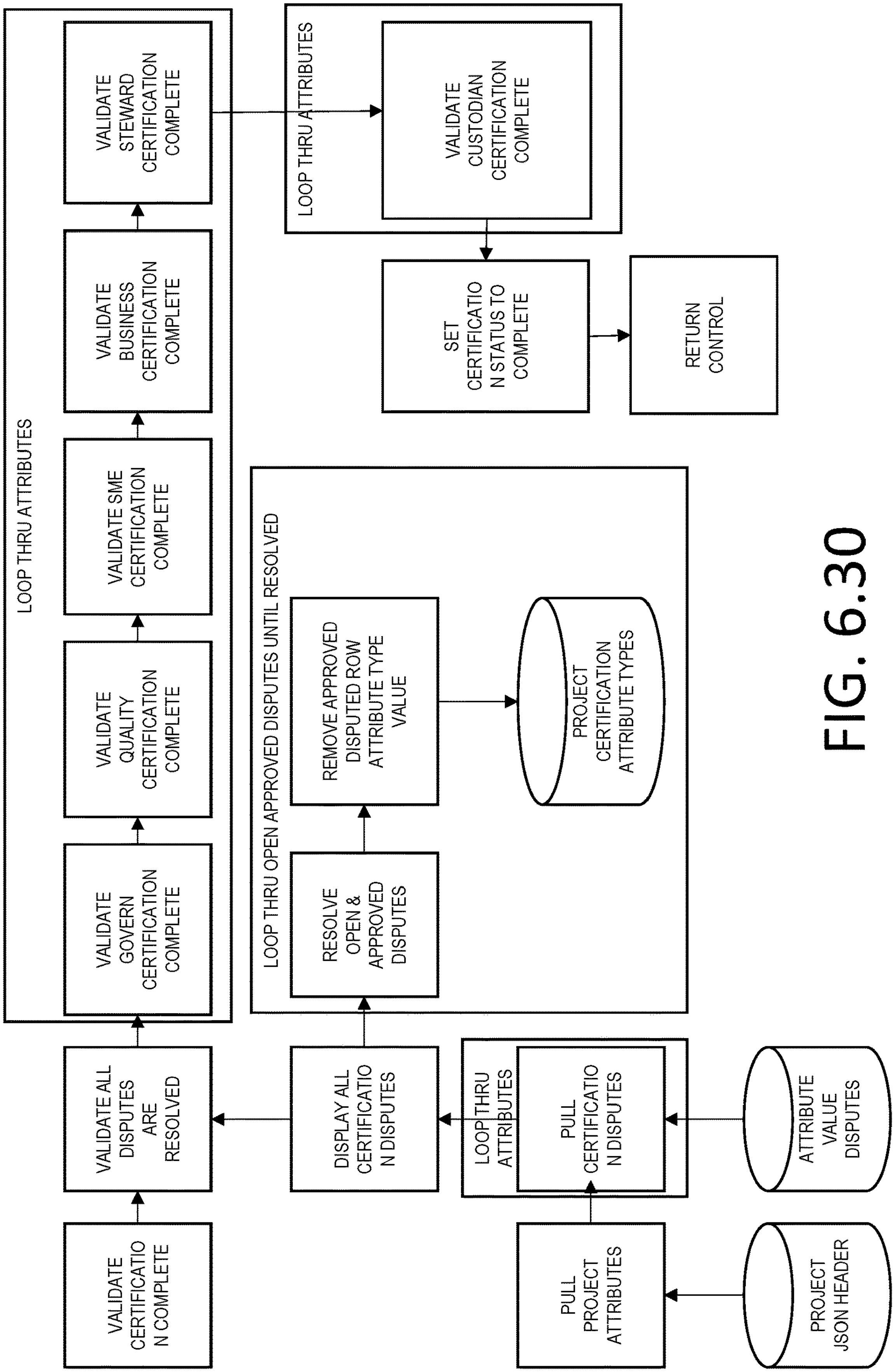
FIG. 6.30

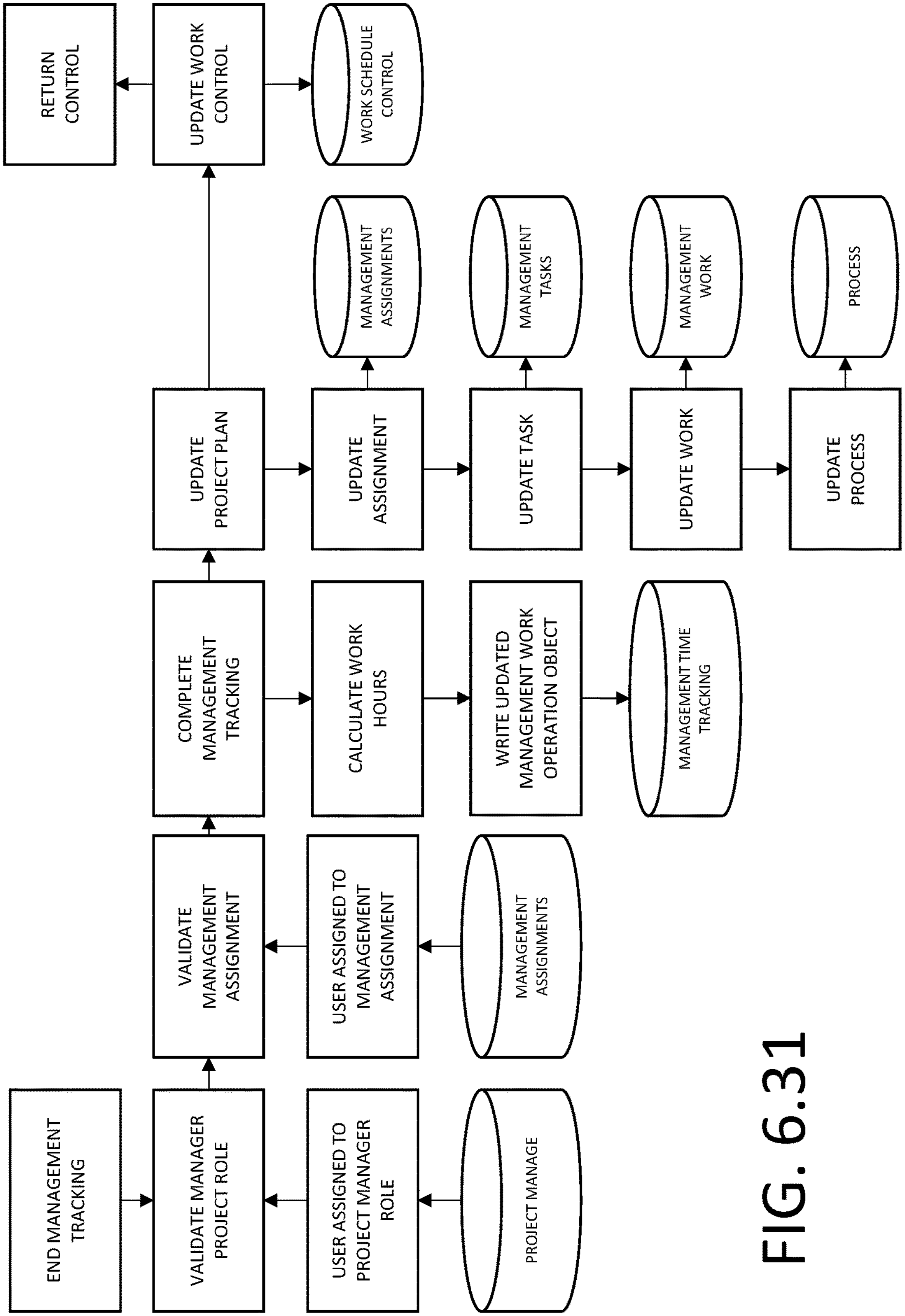
FIG. 6.31

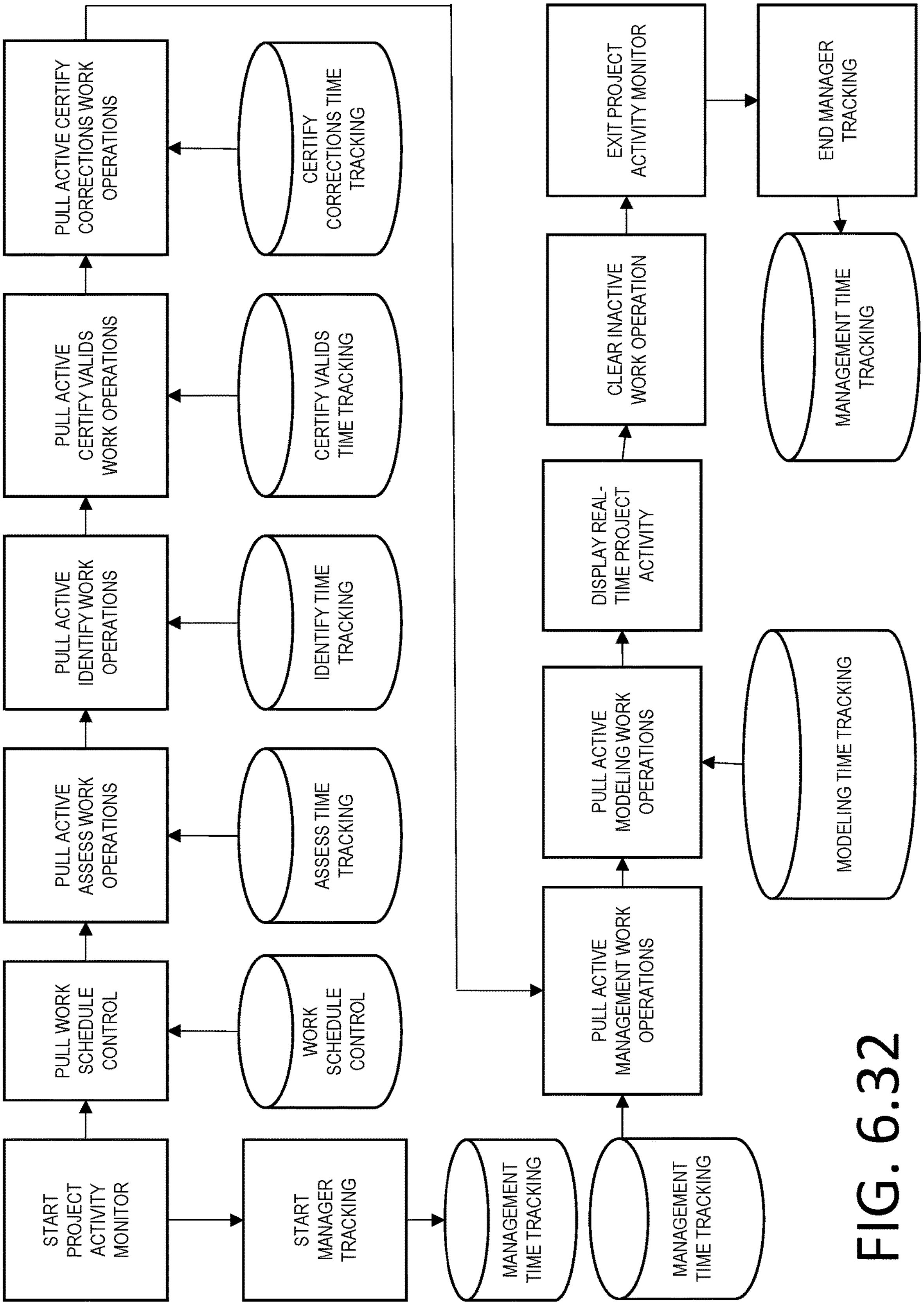
FIG. 6.32

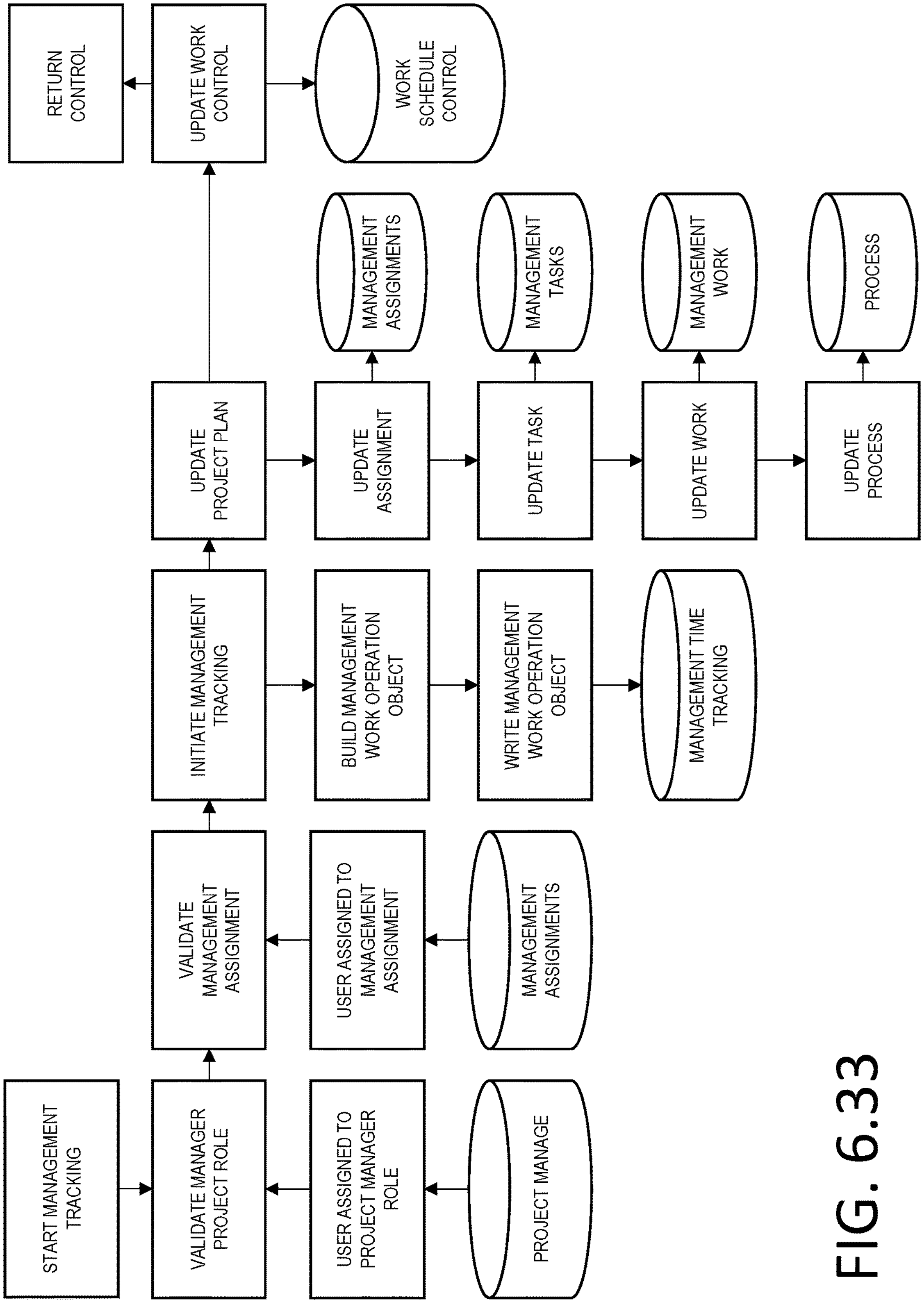
FIG. 6.33

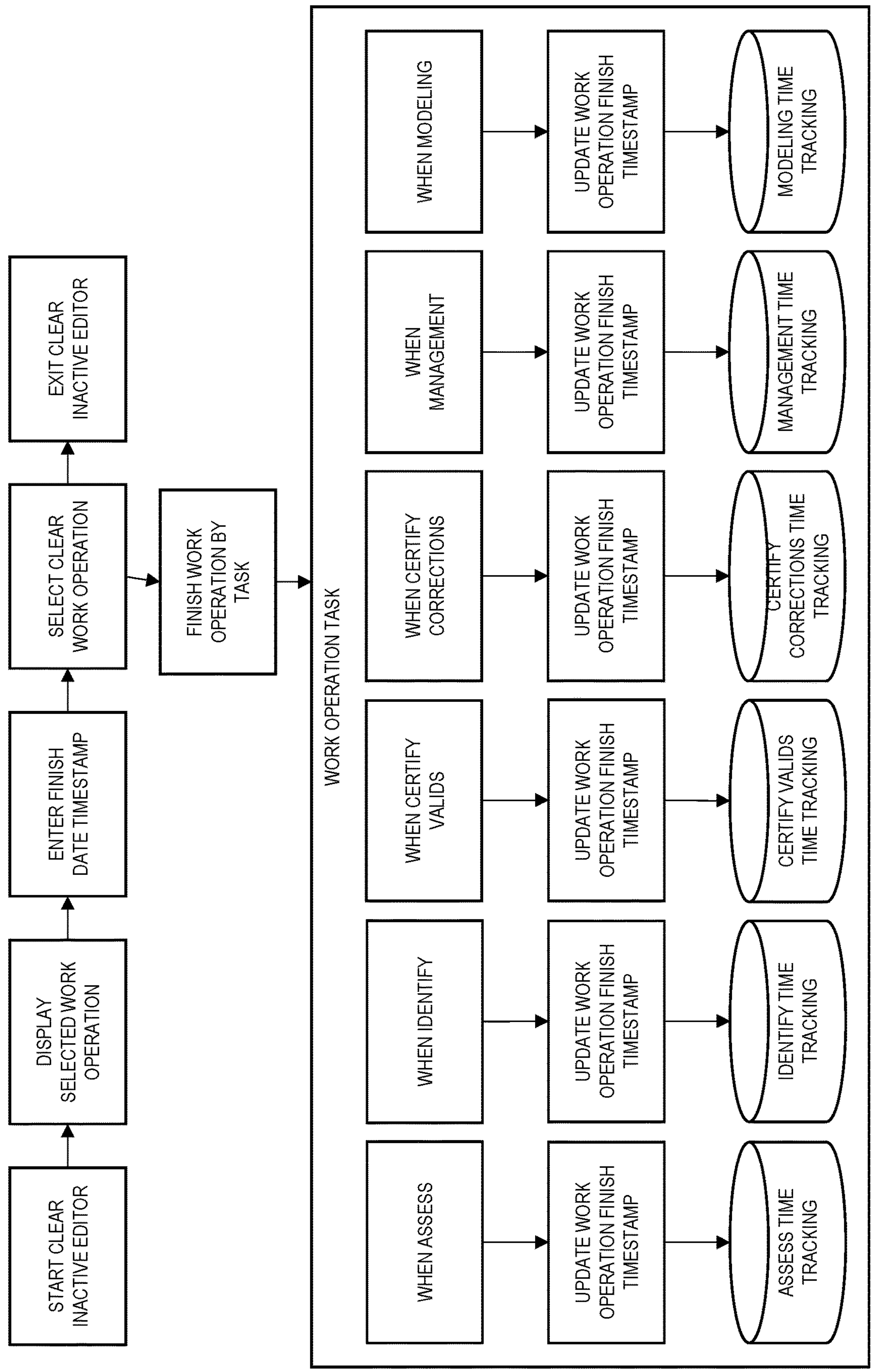
FIG. 6.34

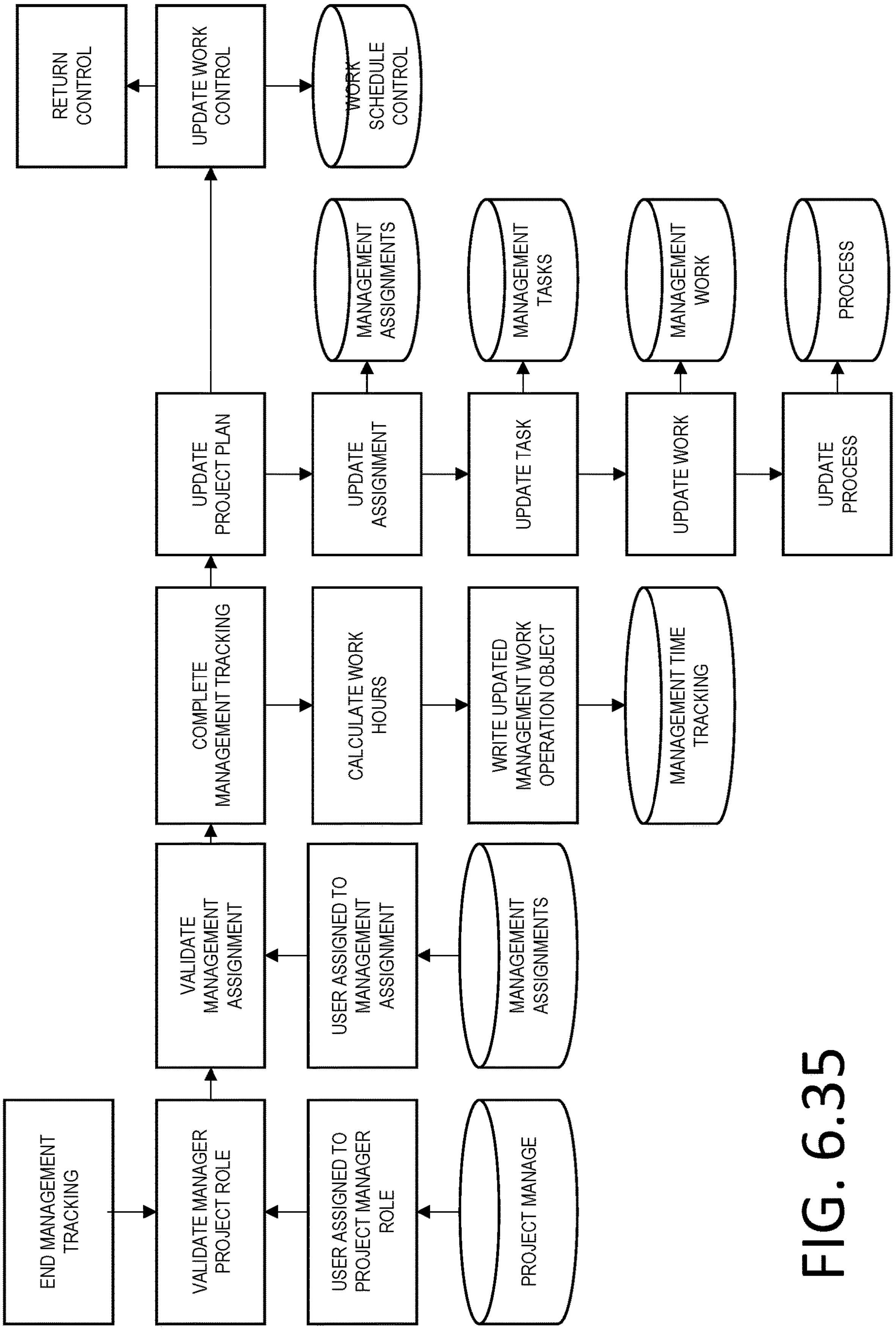
FIG. 6.35

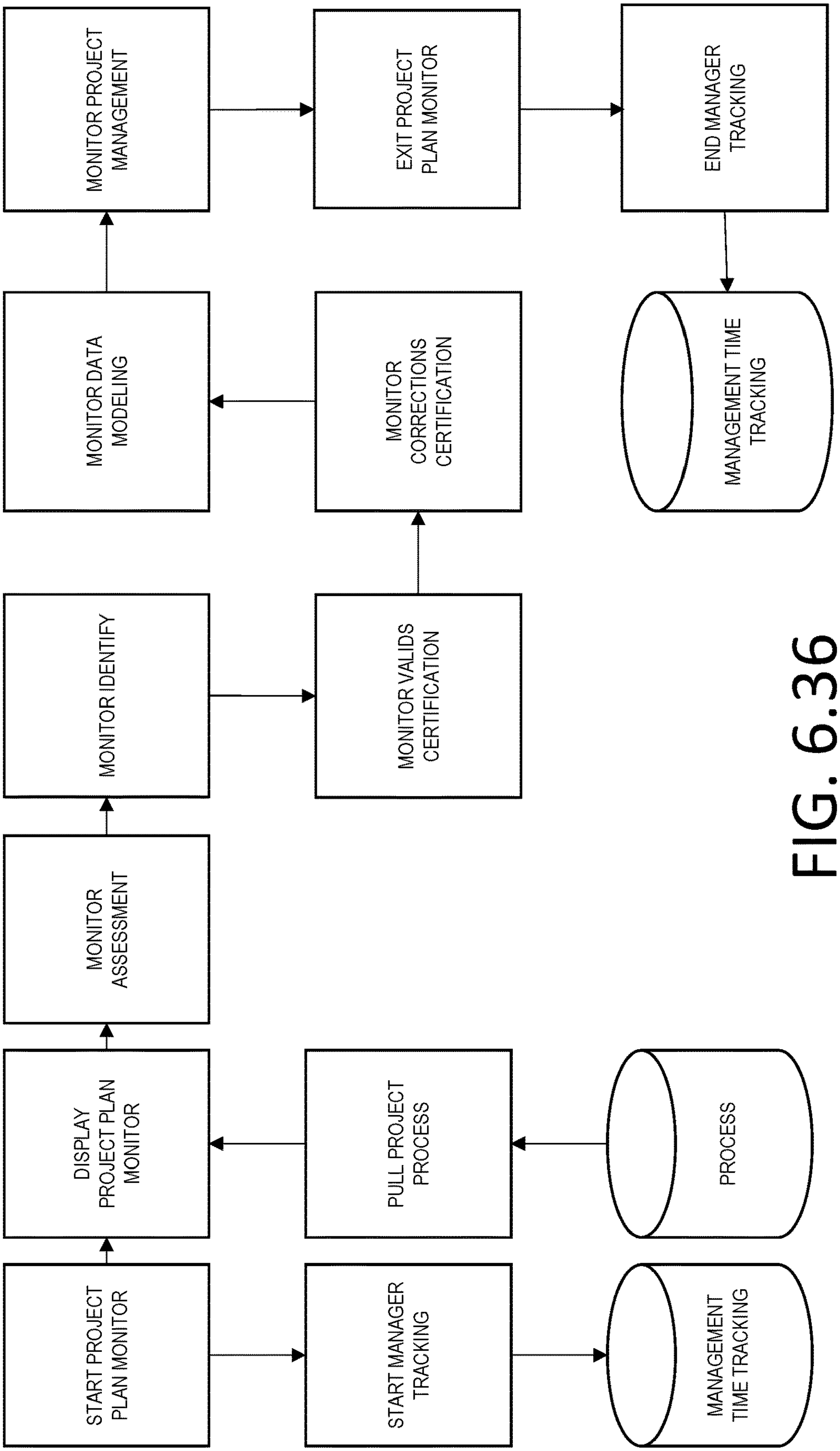
FIG. 6.36

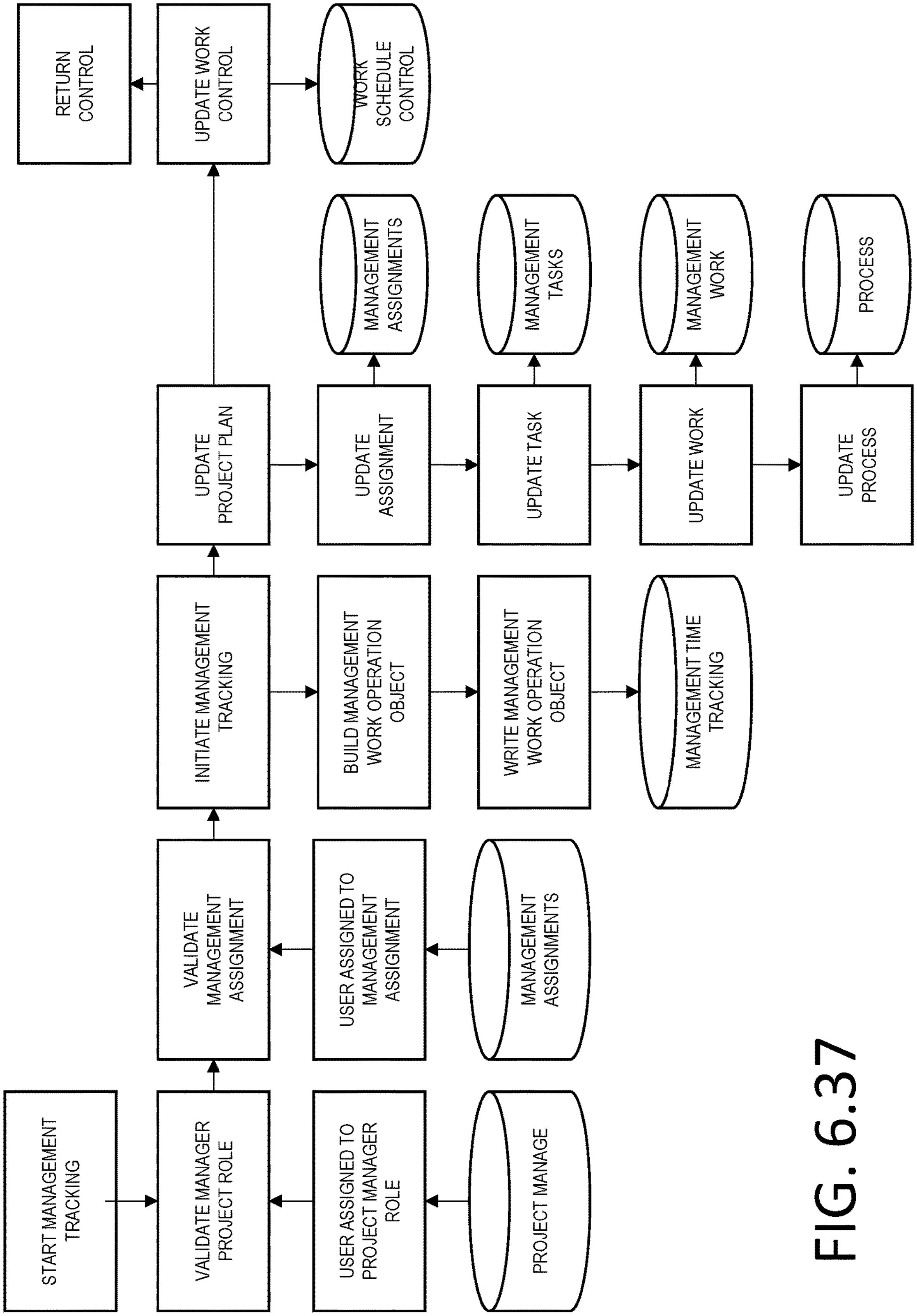
FIG. 6.37

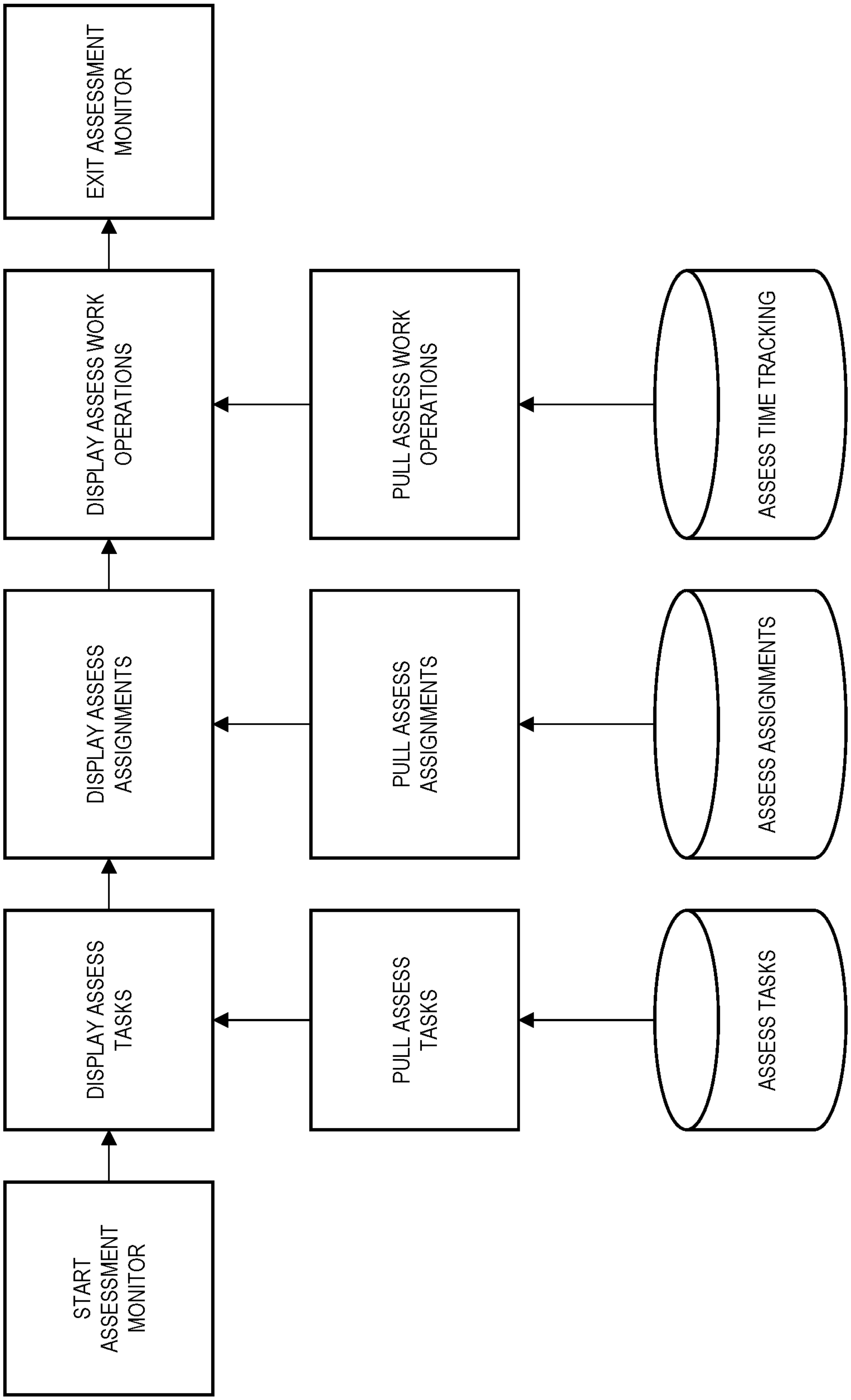
FIG. 6.38

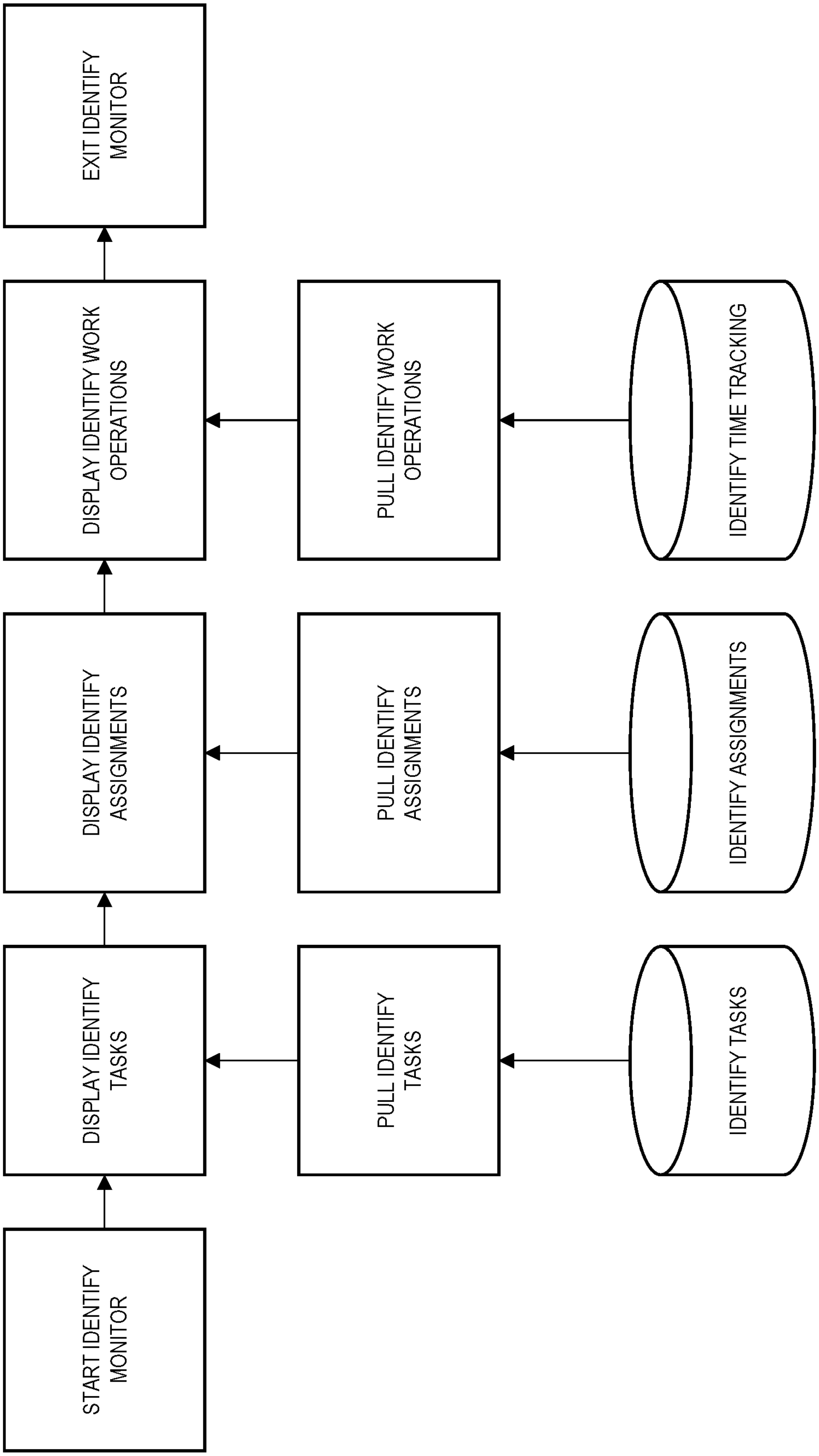
FIG. 6.39

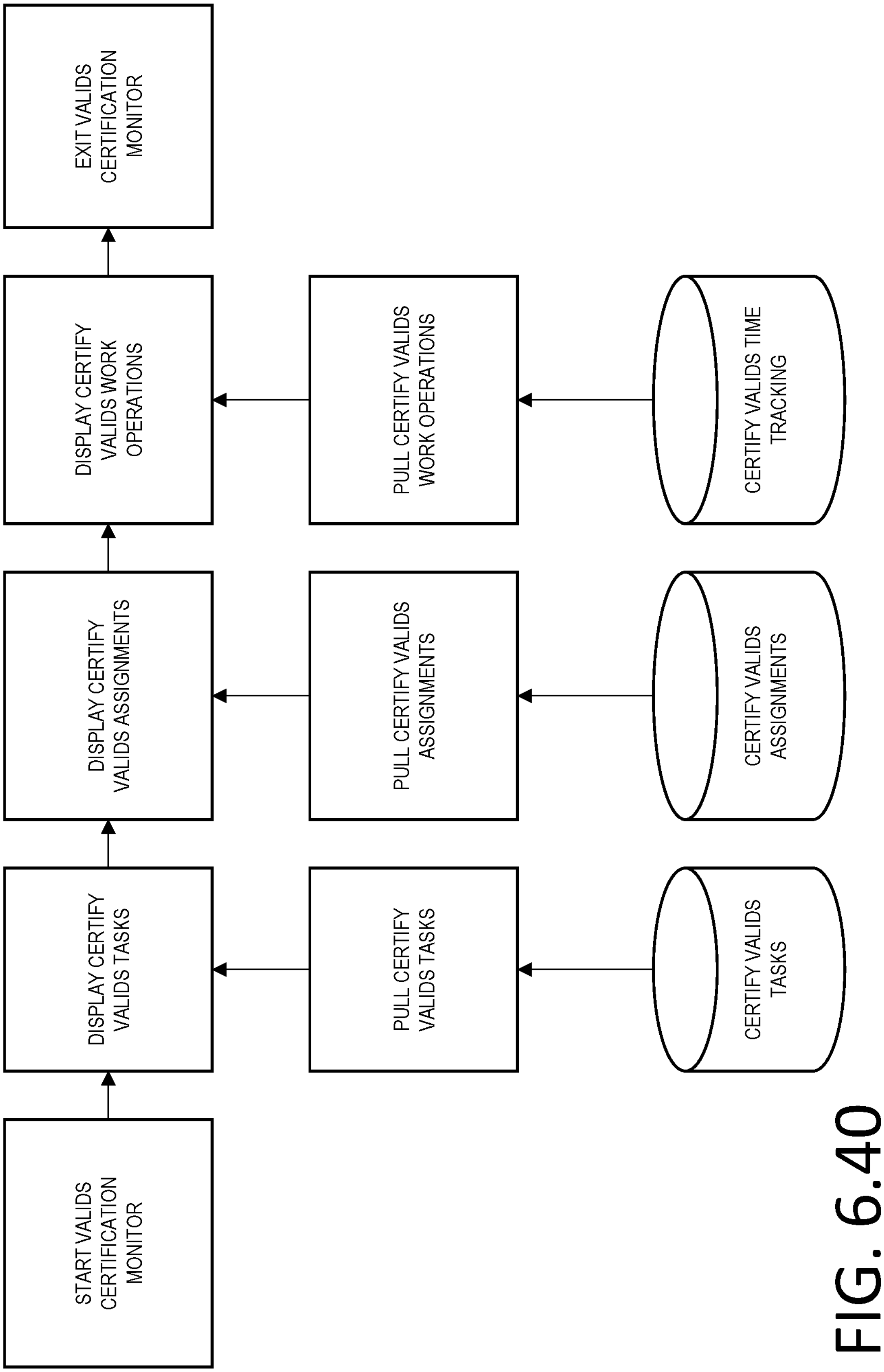
FIG. 6.40

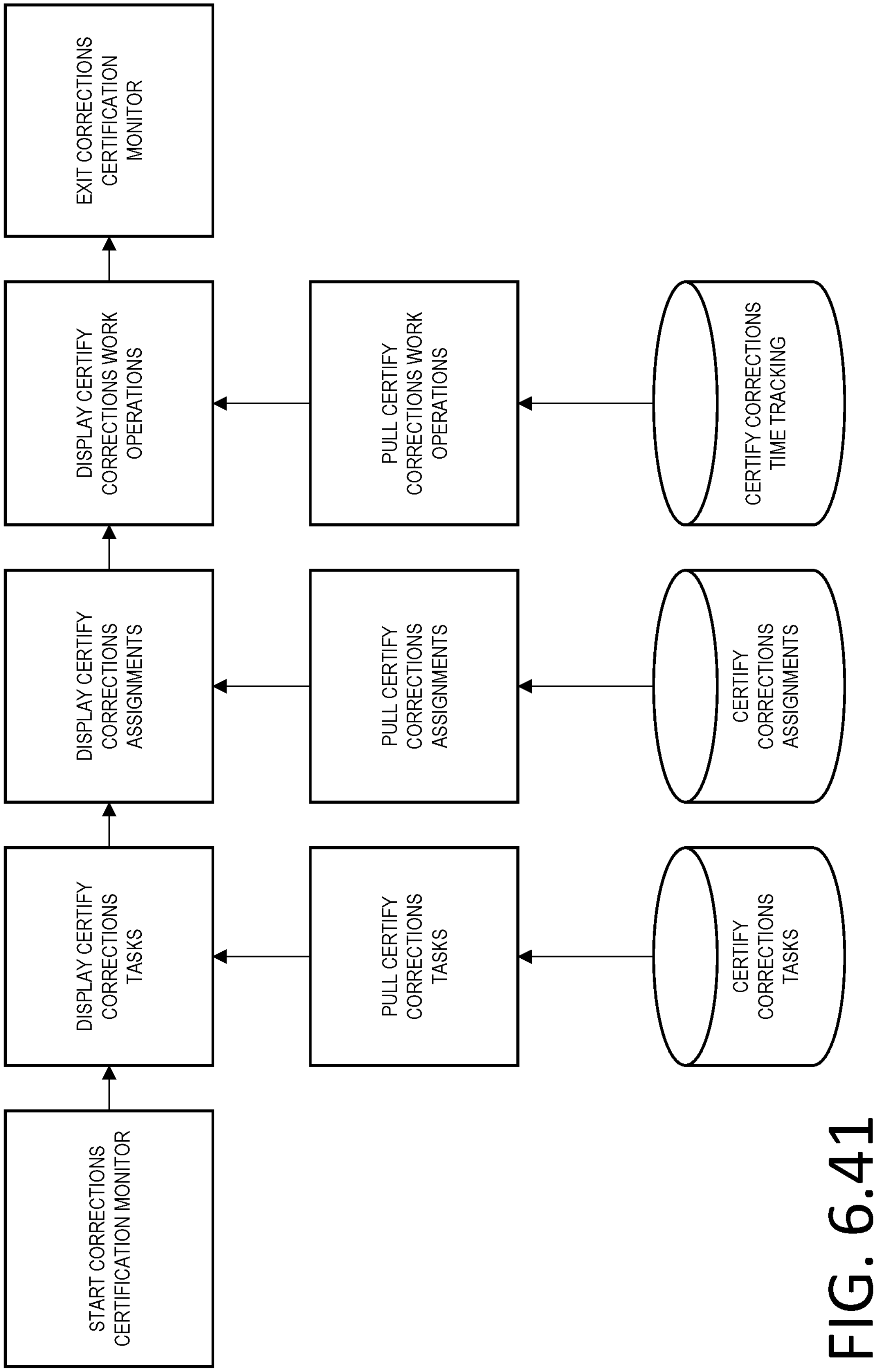
FIG. 6.41

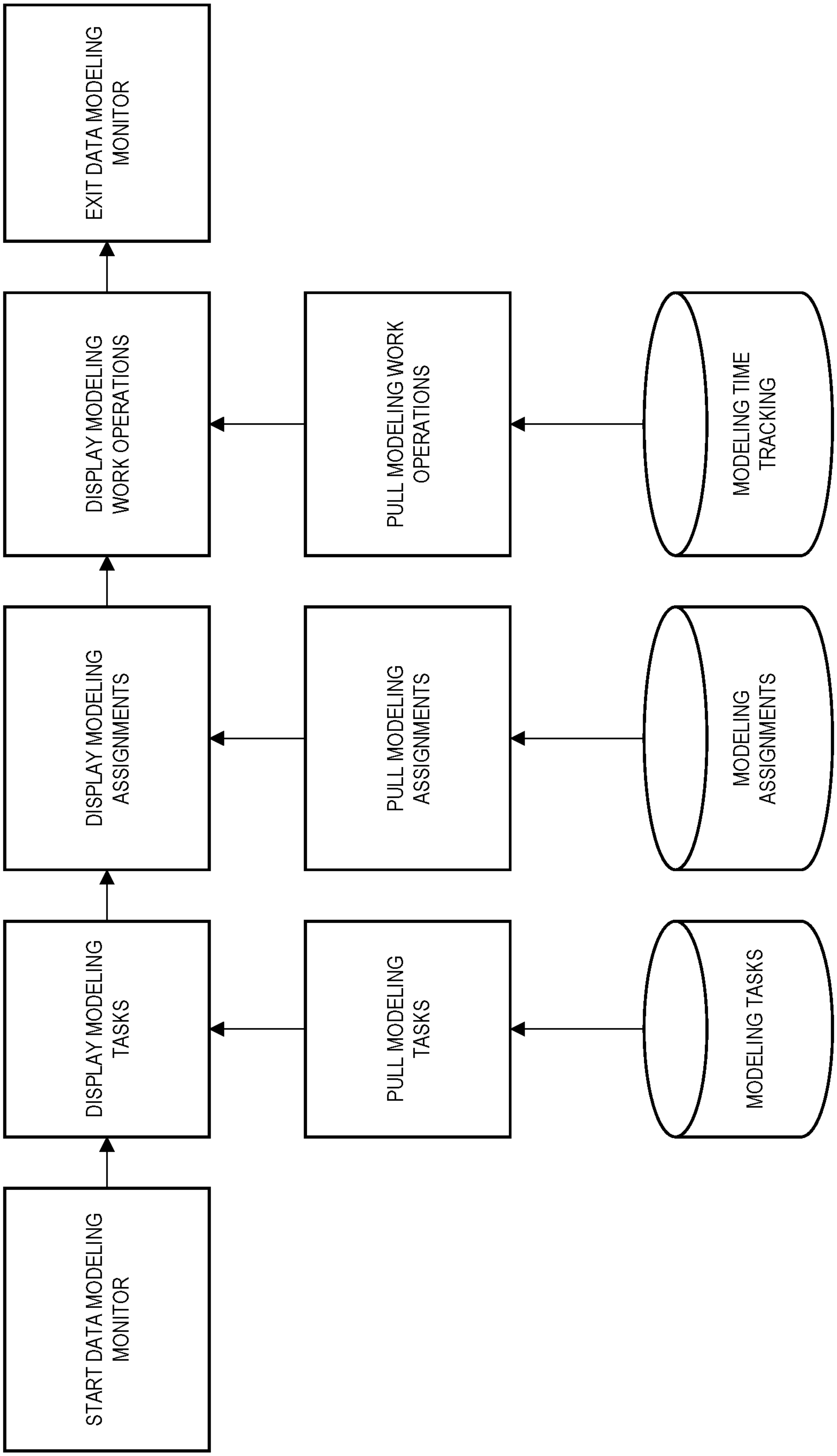
FIG. 6.42

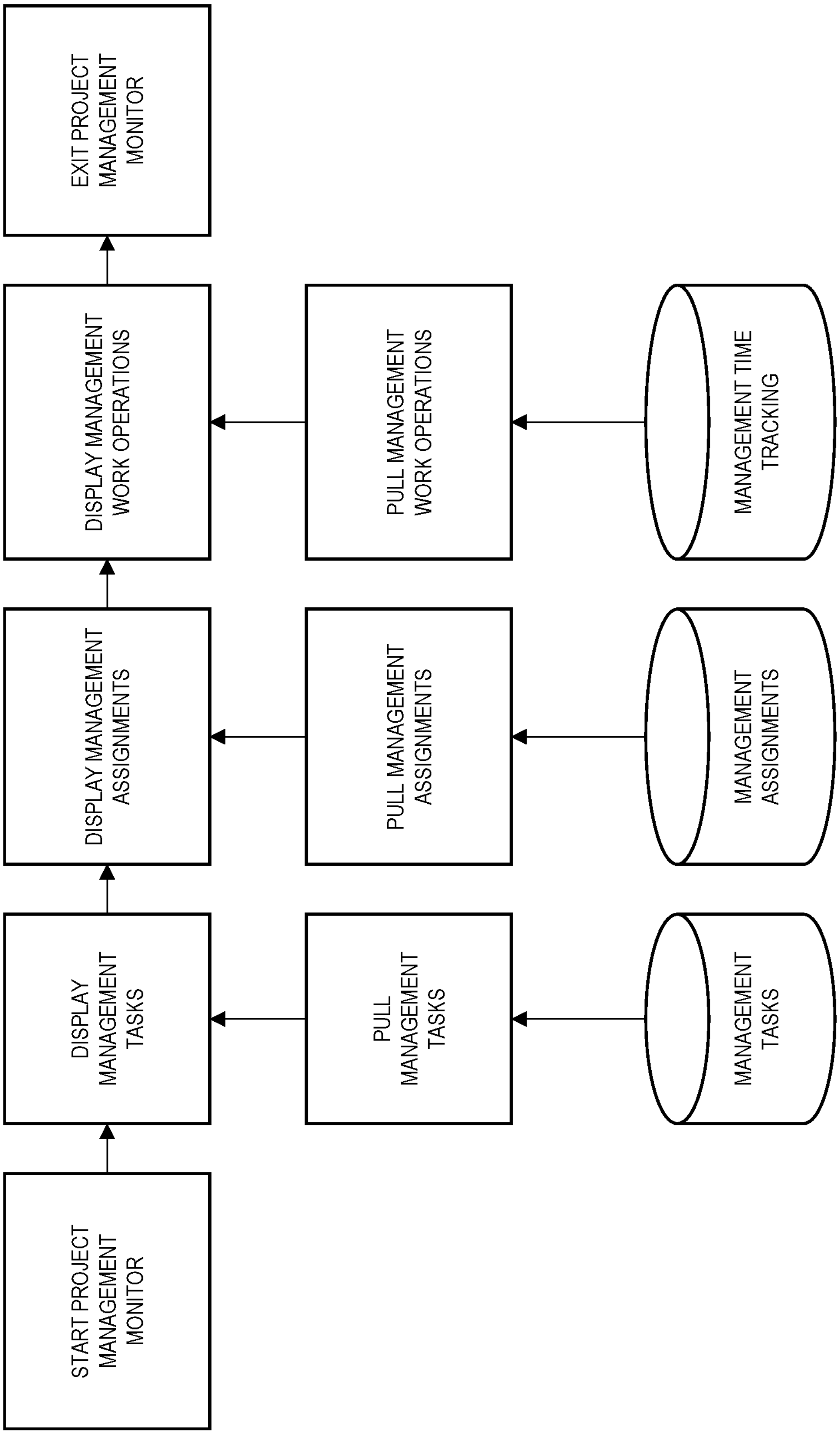
FIG. 6.43

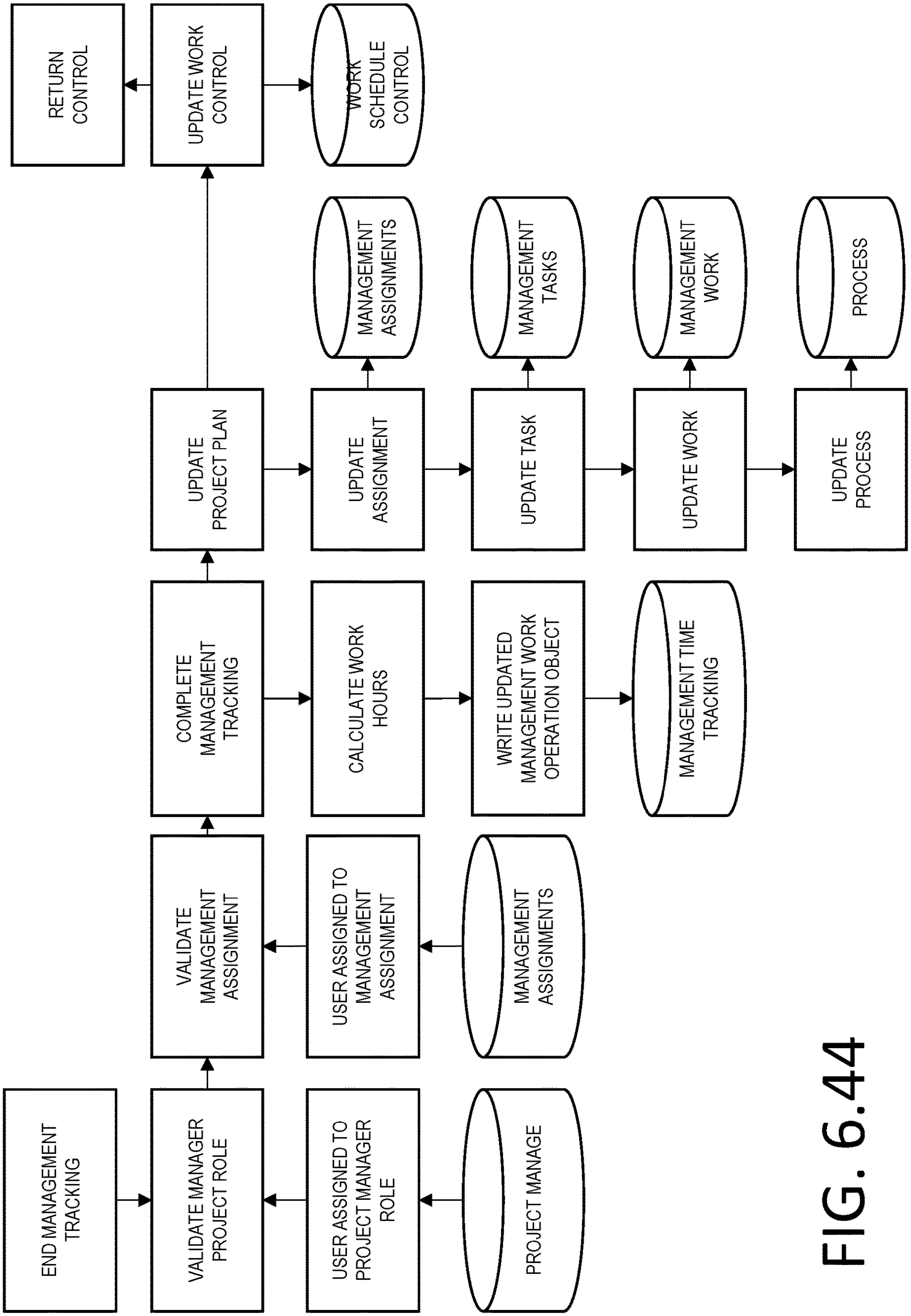
FIG. 6.44

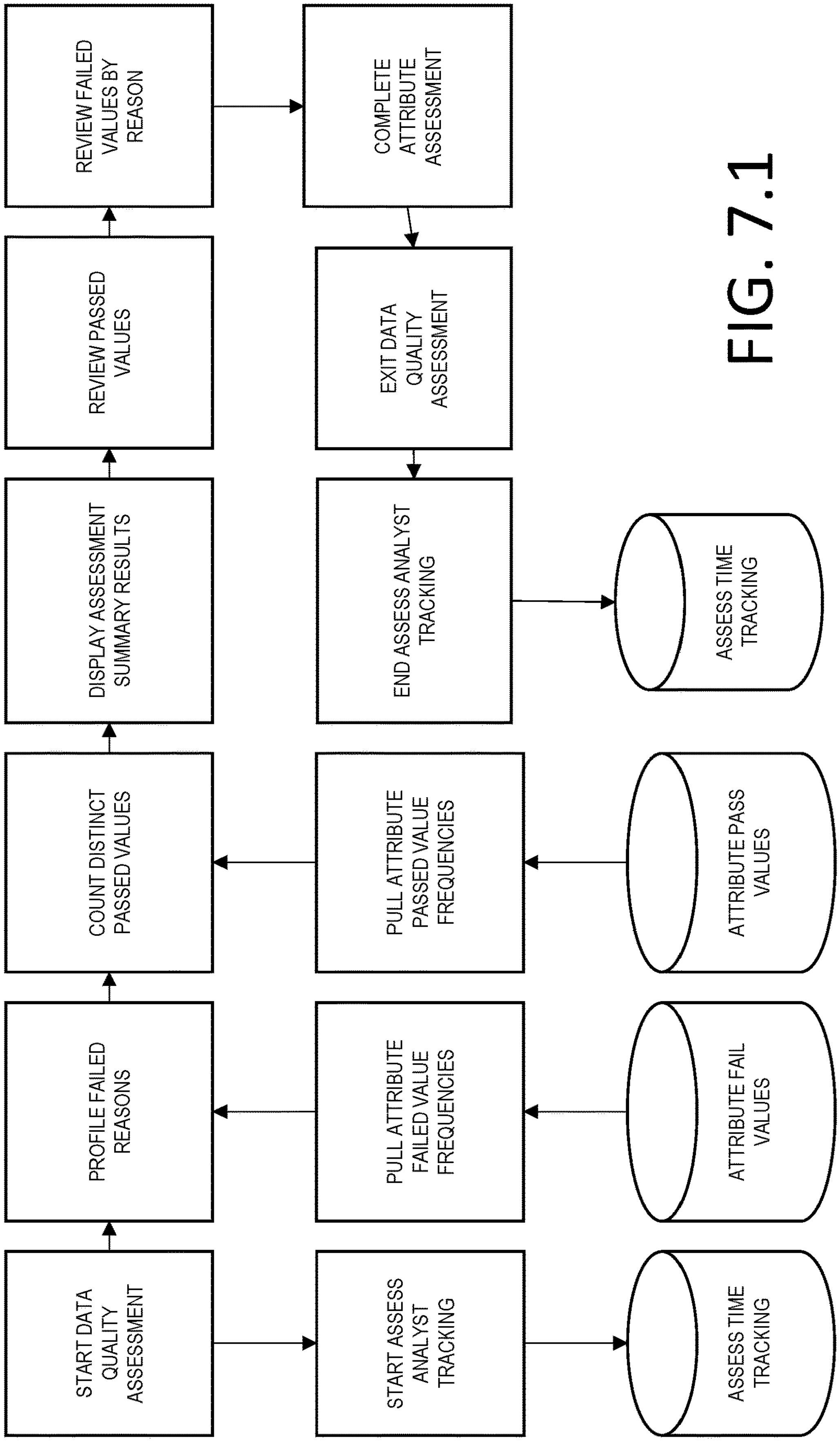
FIG. 7.1

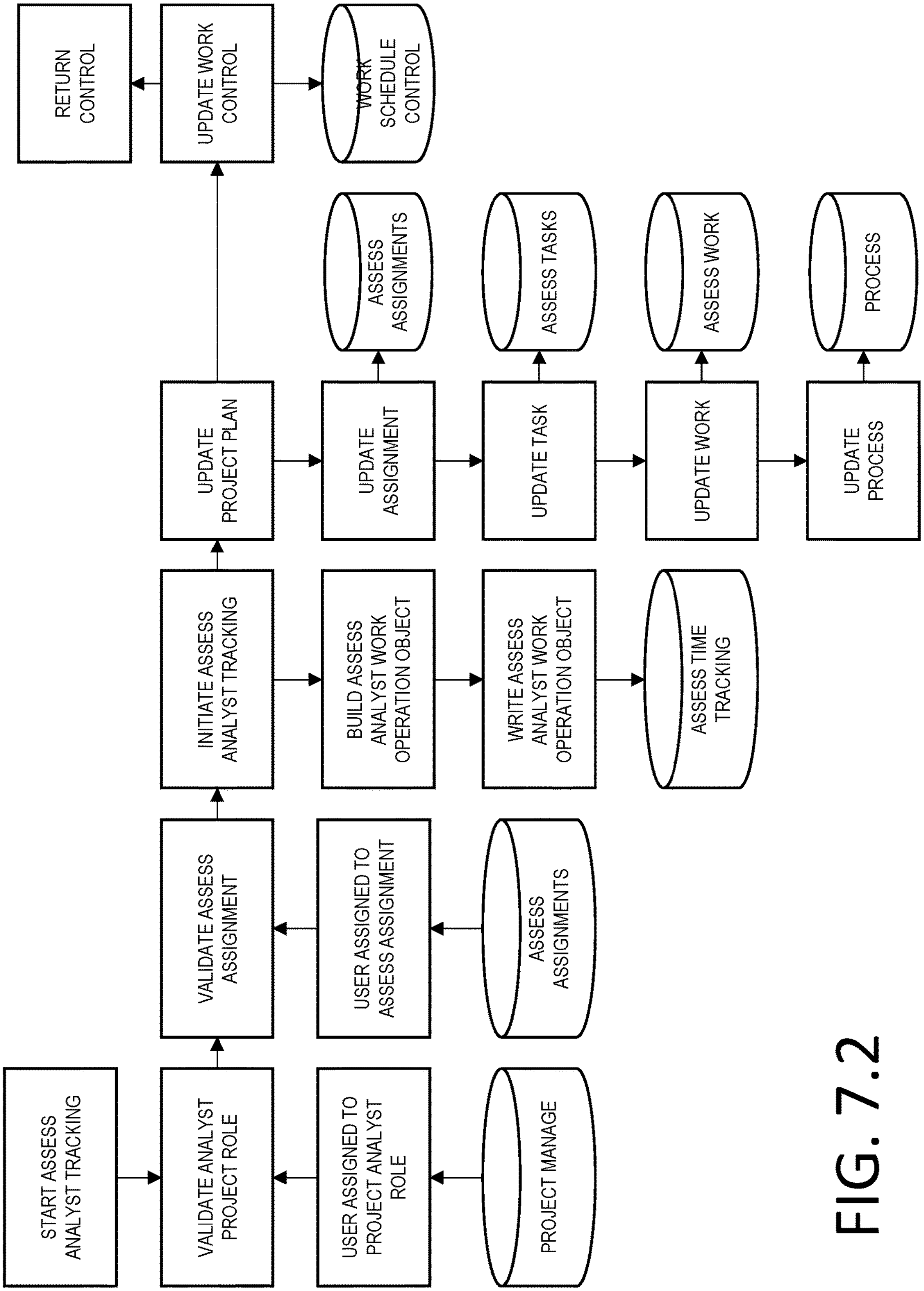
FIG. 7.2

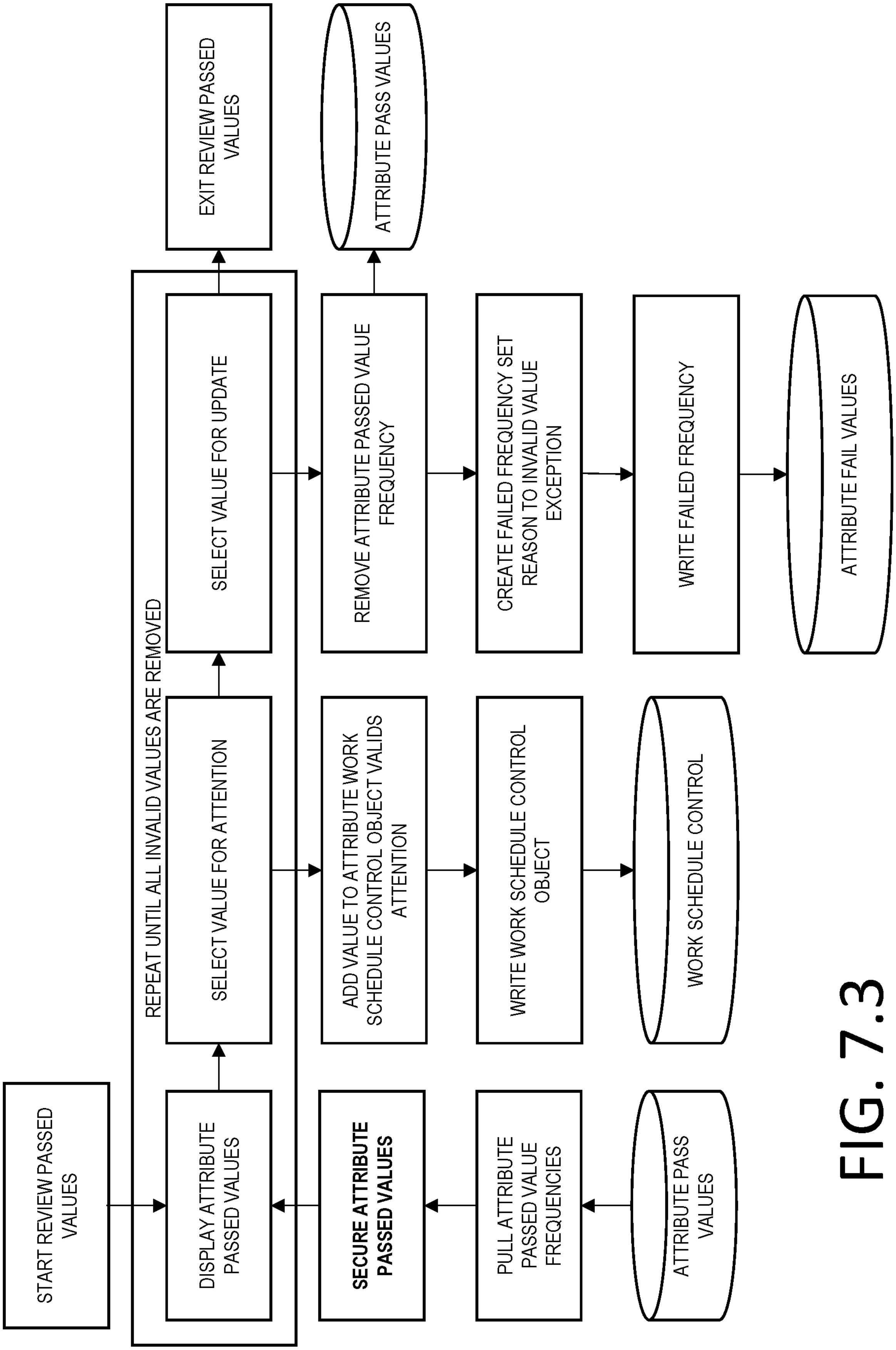
FIG. 7.3

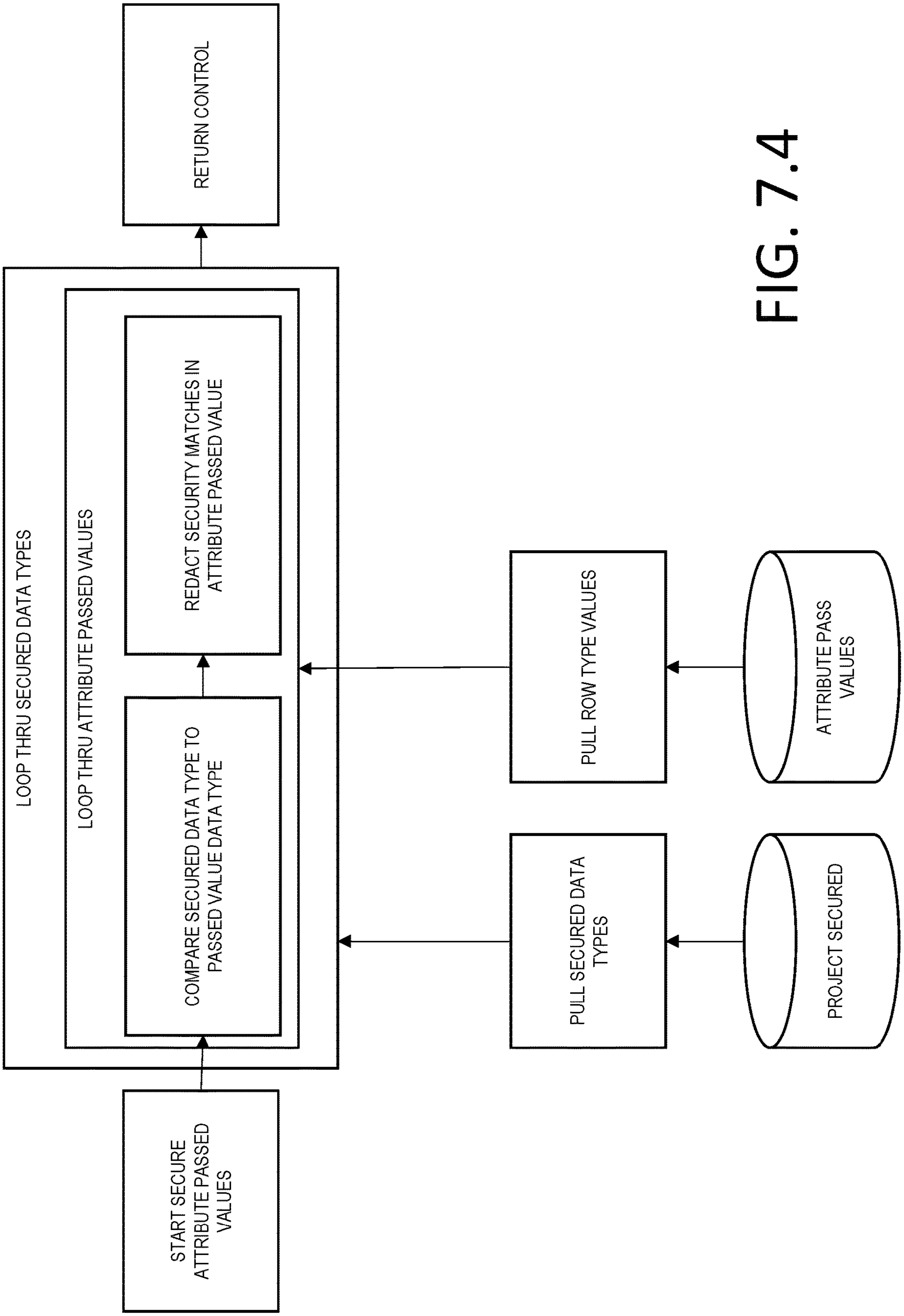
FIG. 7.4

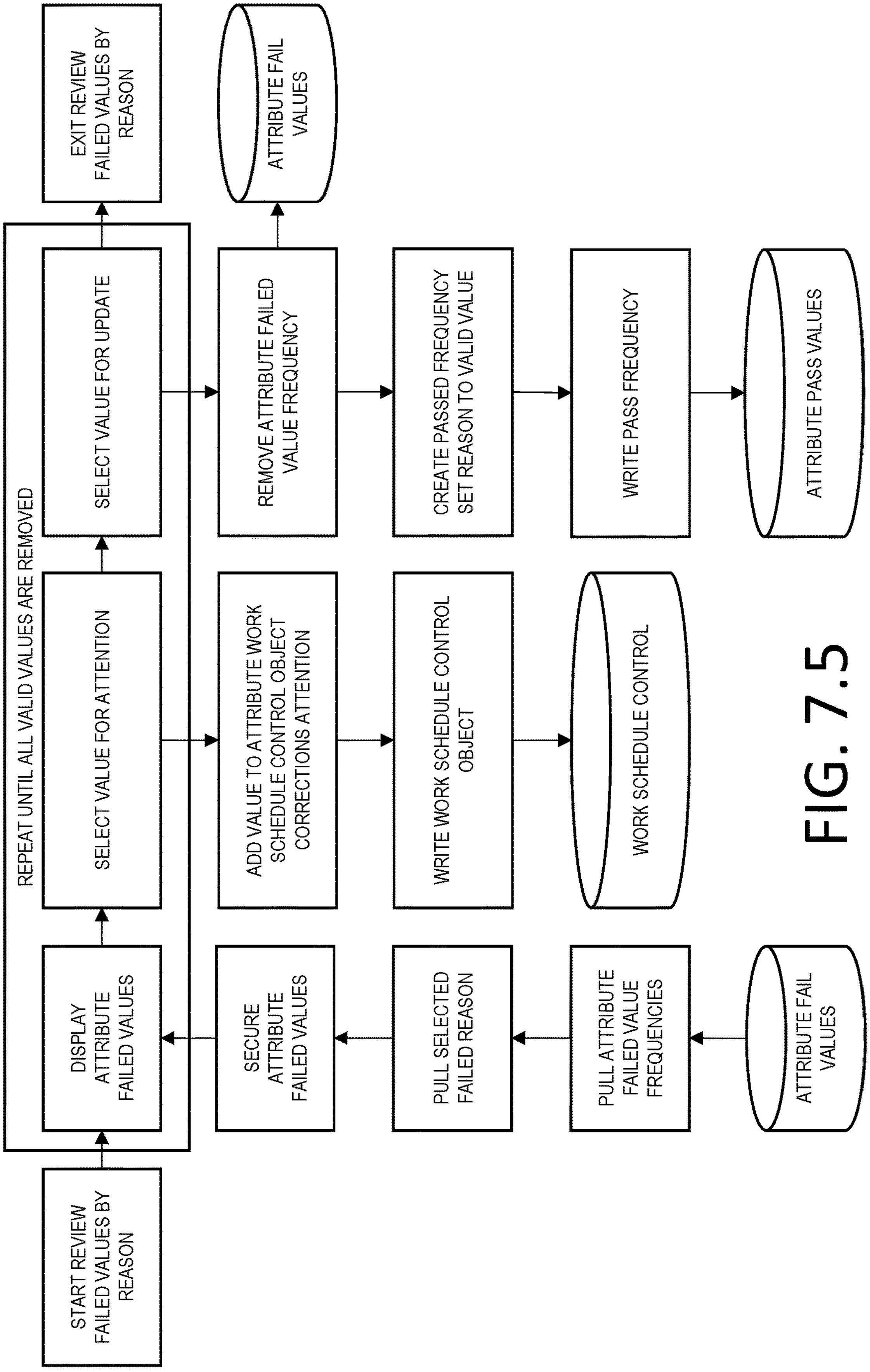
FIG. 7.5

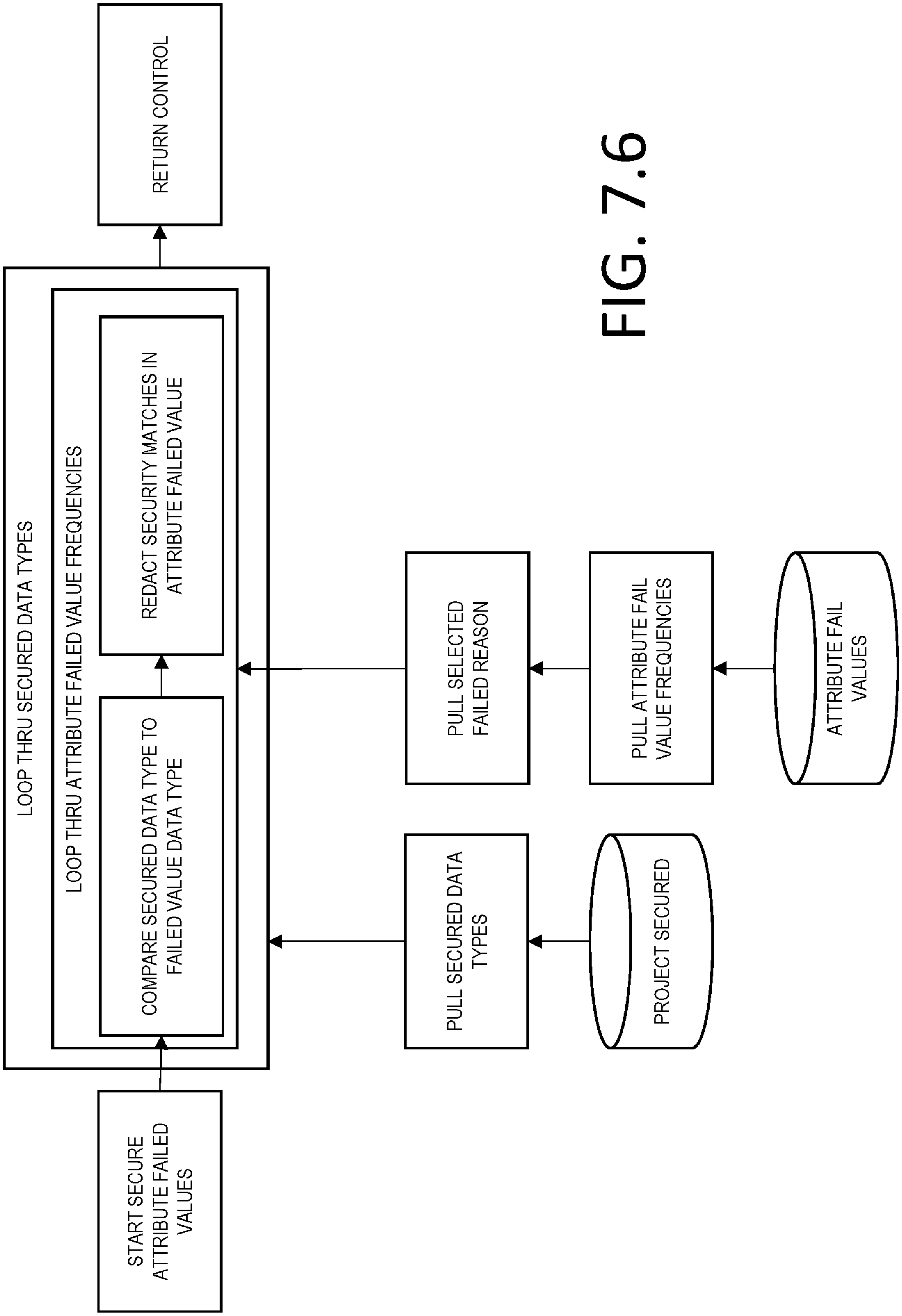
FIG. 7.6

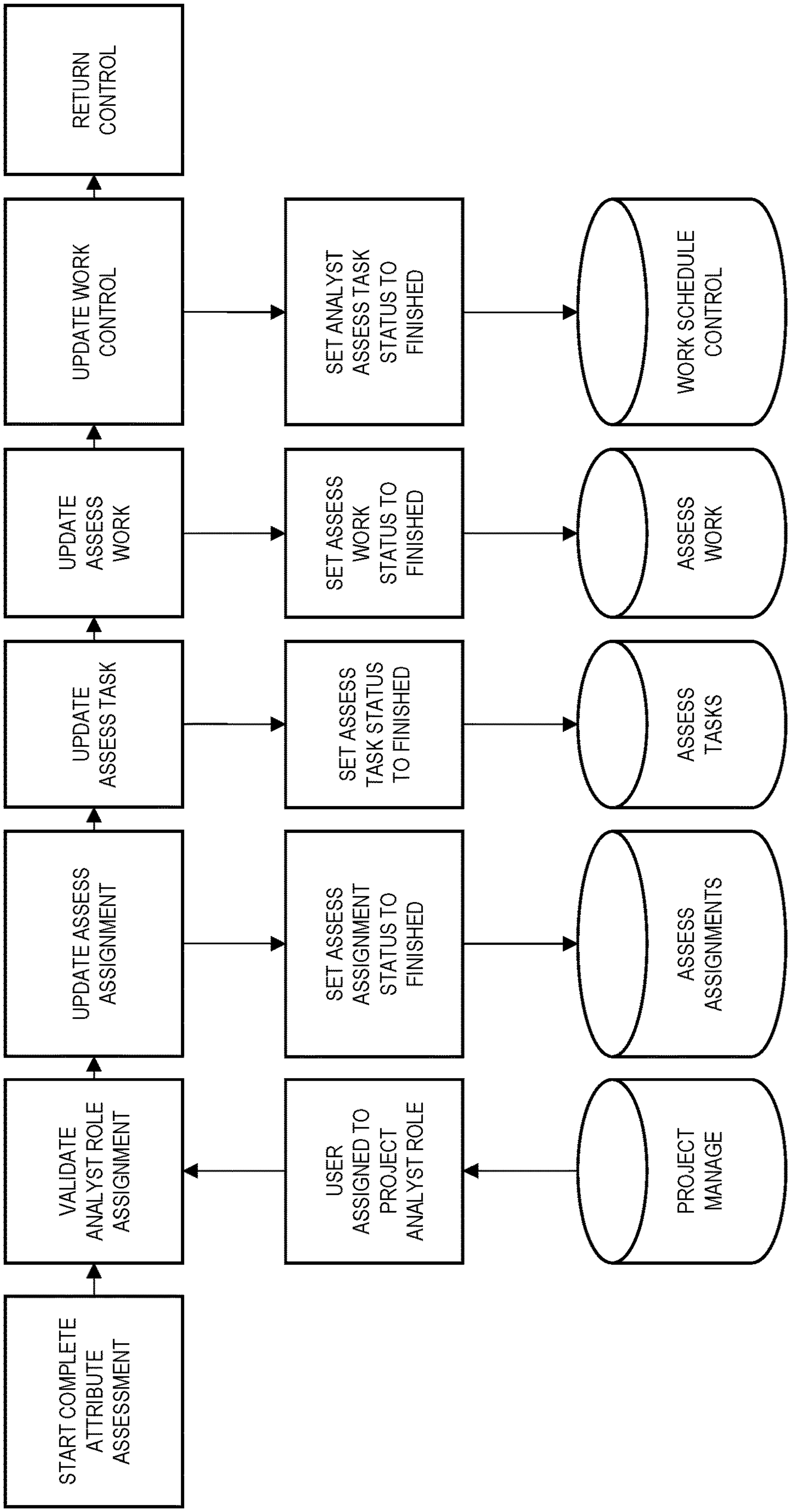
FIG. 7.7

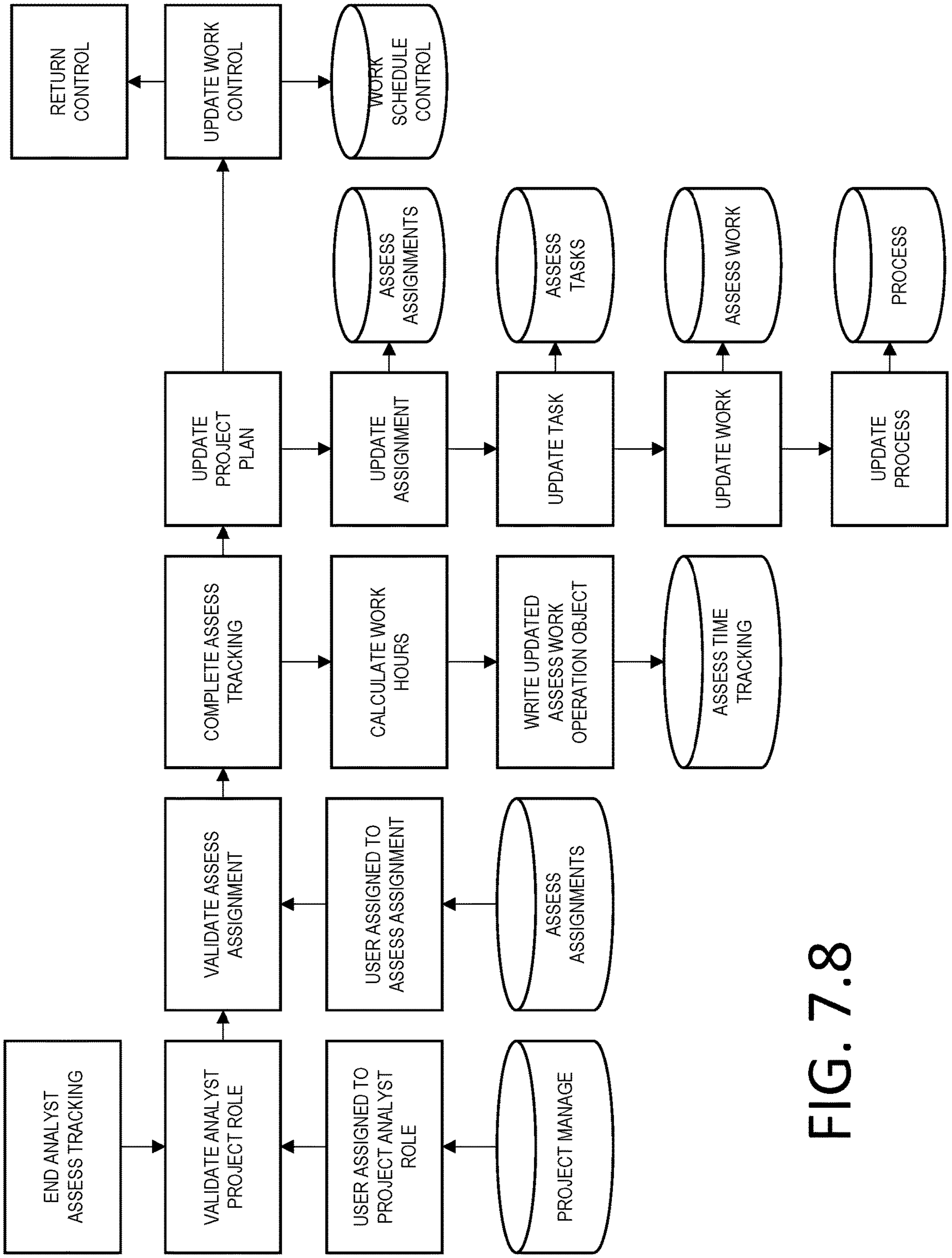
FIG. 7.8

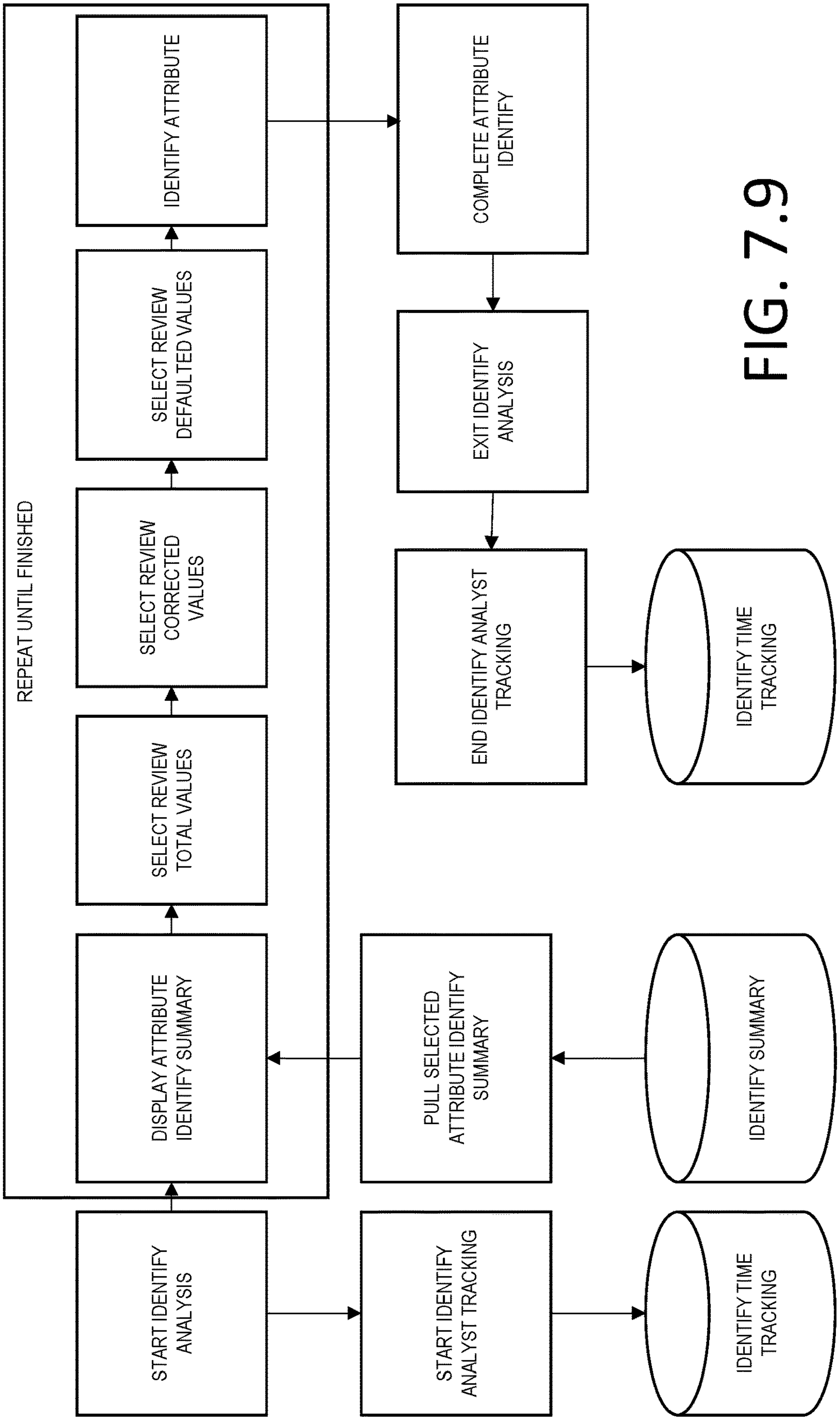
FIG. 7.9

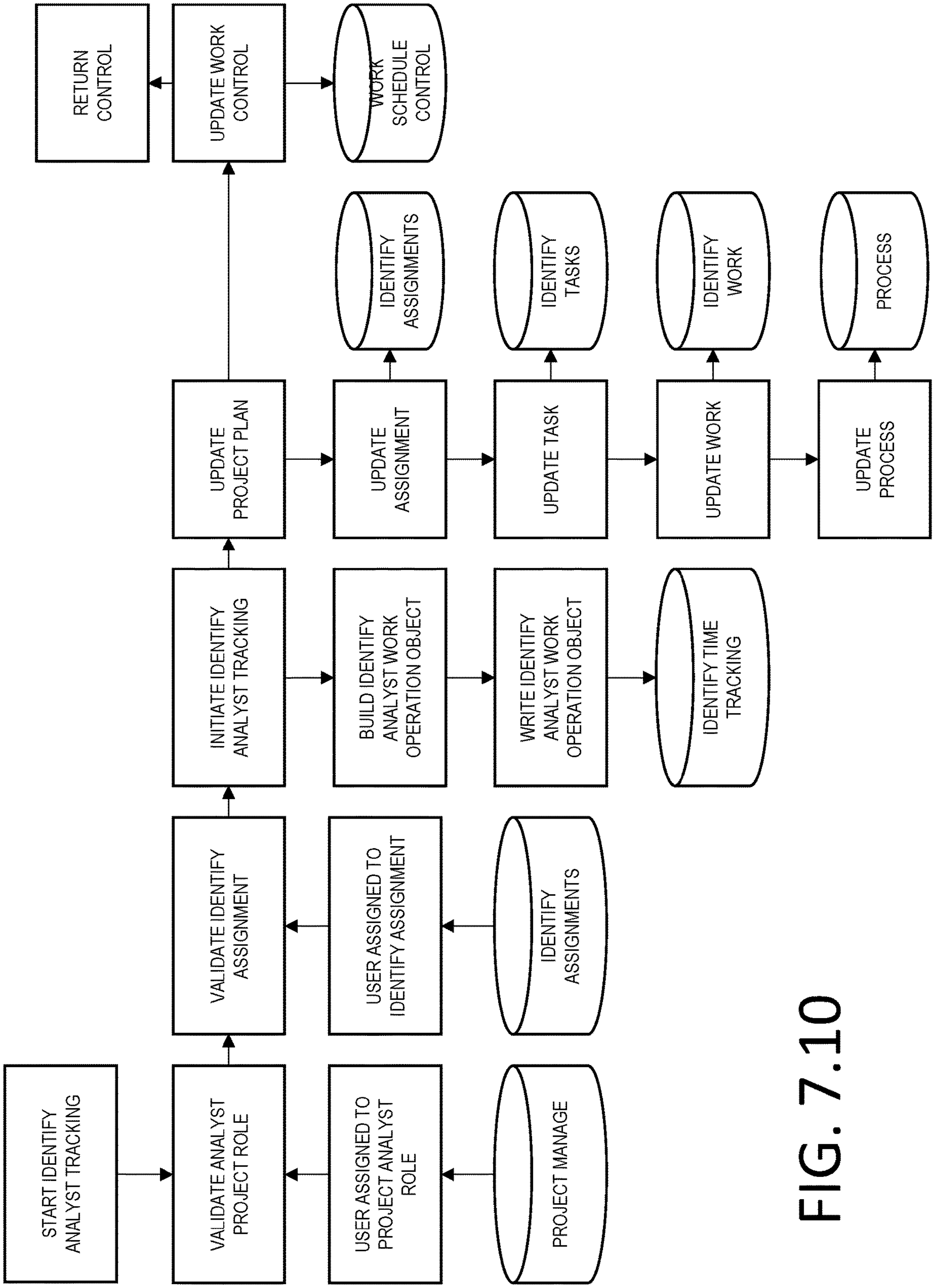
FIG. 7.10

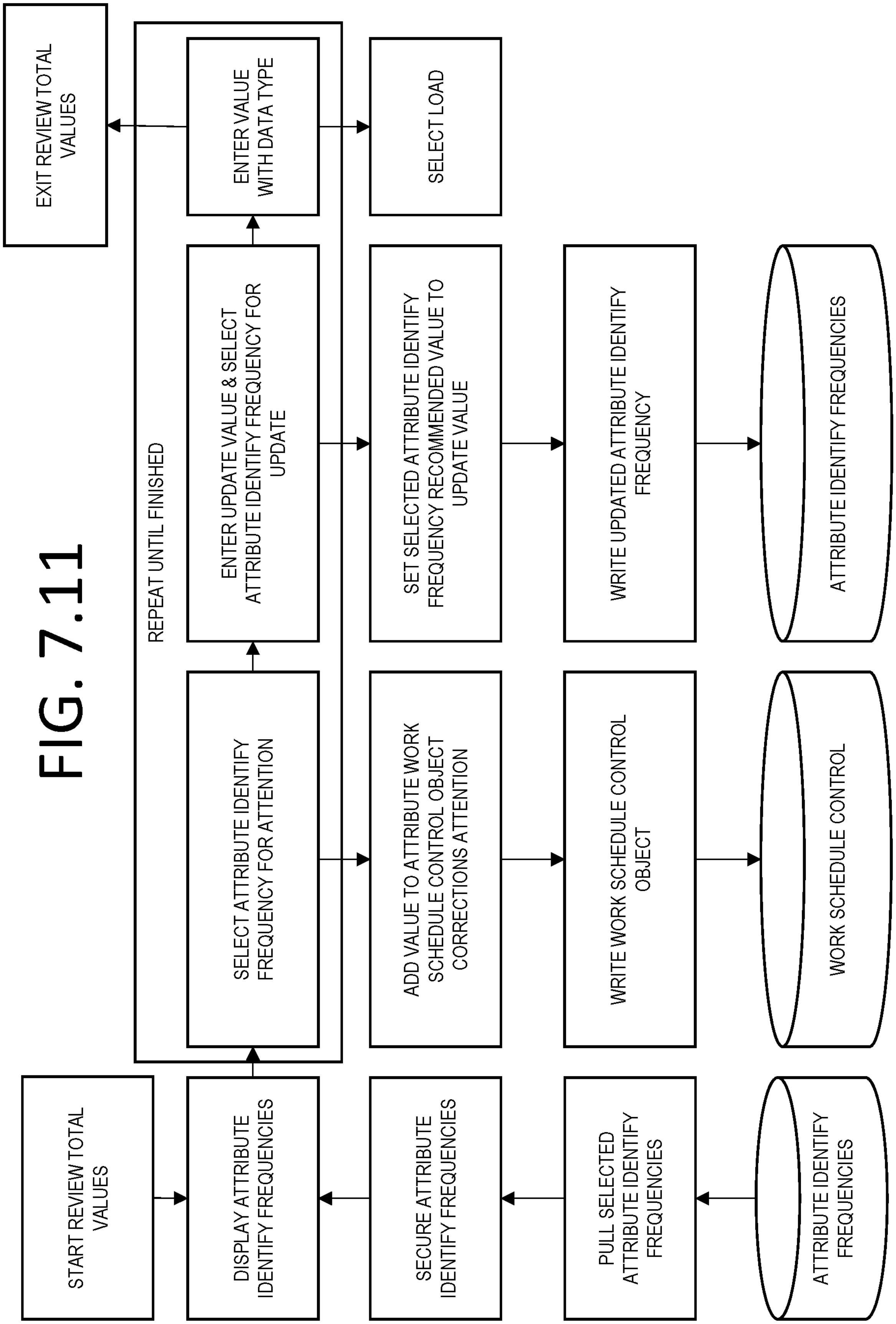
FIG. 7.11

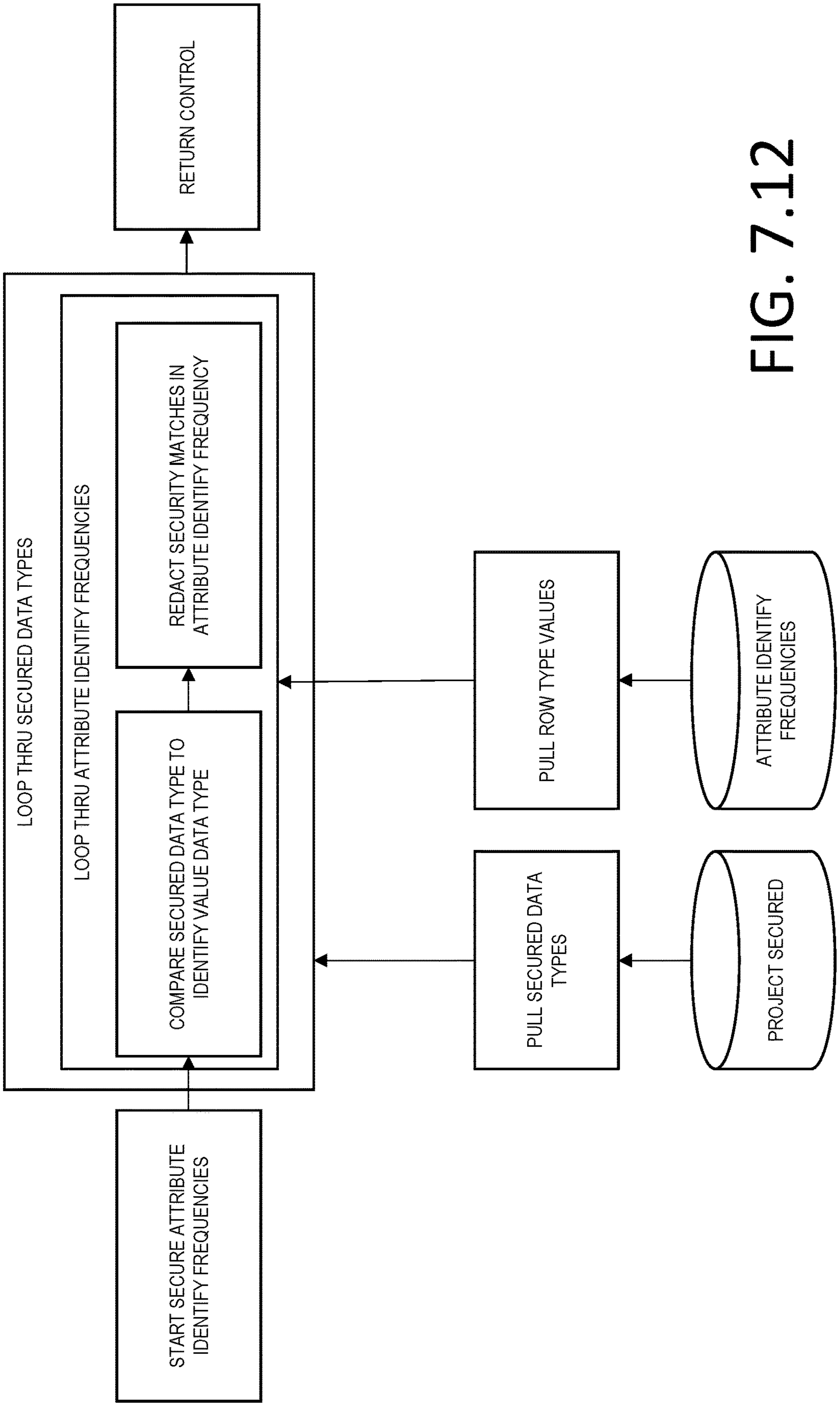
FIG. 7.12

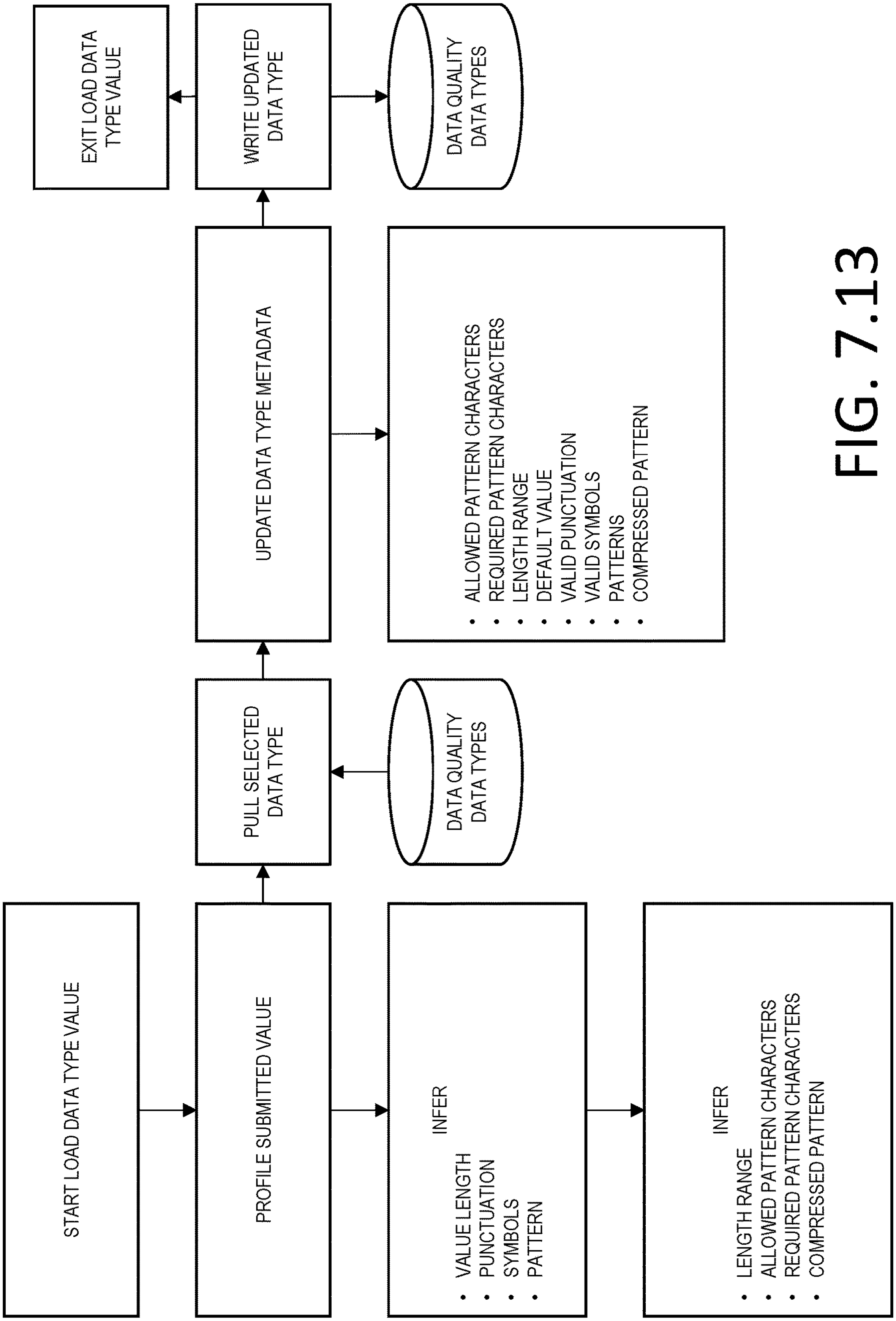
FIG. 7.13

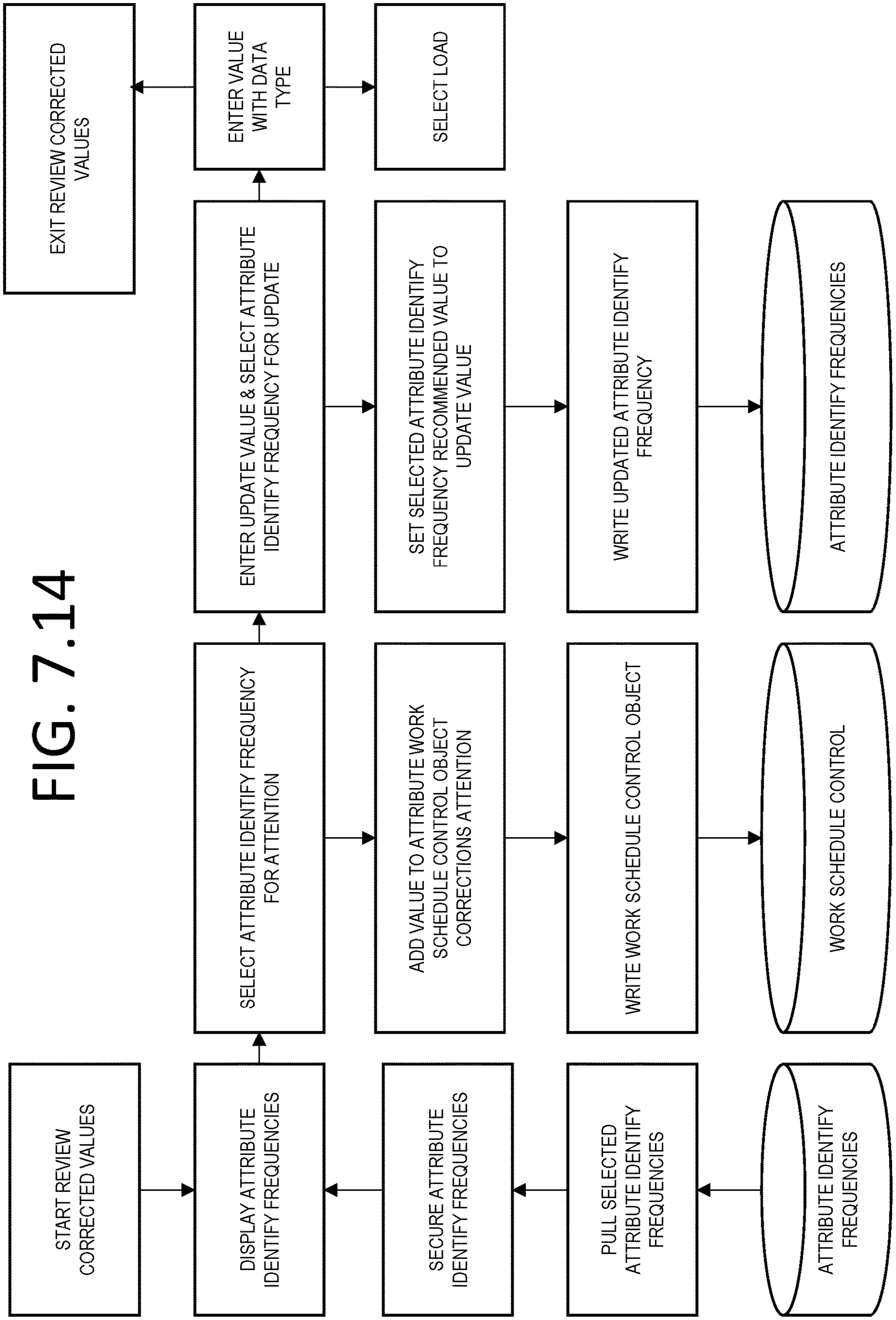

START REVIEW CORRECTED VALUES

ATTRIBUTE IDENTIFY FREQUENCIES

PULL SELECTED ATTRIBUTE IDENTIFY FREQUENCIES

SECURE ATTRIBUTE IDENTIFY FREQUENCIES

DISPLAY ATTRIBUTE IDENTIFY FREQUENCIES

SELECT ATTRIBUTE IDENTIFY FREQUENCY FOR ATTENTION

ADD VALUE TO ATTRIBUTE WORK SCHEDULE CONTROL OBJECT CORRECTIONS ATTENTION

WRITE WORK SCHEDULE CONTROL OBJECT

WORK SCHEDULE CONTROL

ENTER UPDATE VALUE & SELECT ATTRIBUTE IDENTIFY FREQUENCY FOR UPDATE

SET SELECTED ATTRIBUTE IDENTIFY FREQUENCY RECOMMENDED VALUE TO UPDATE VALUE

WRITE UPDATED ATTRIBUTE IDENTIFY FREQUENCY

ATTRIBUTE IDENTIFY FREQUENCIES

ENTER VALUE WITH DATA TYPE

EXIT REVIEW CORRECTED VALUES

SELECT LOAD

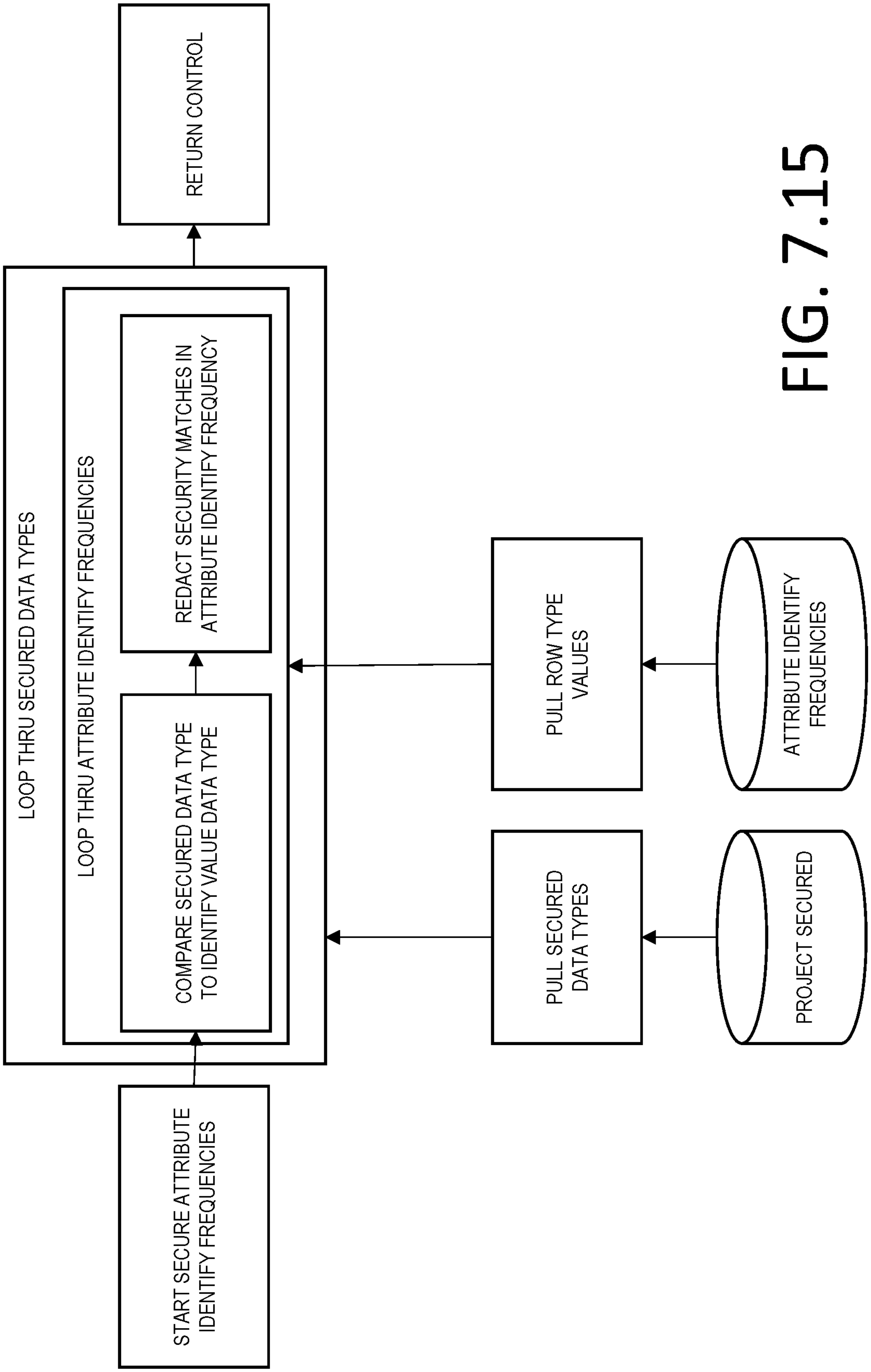
FIG. 7.15

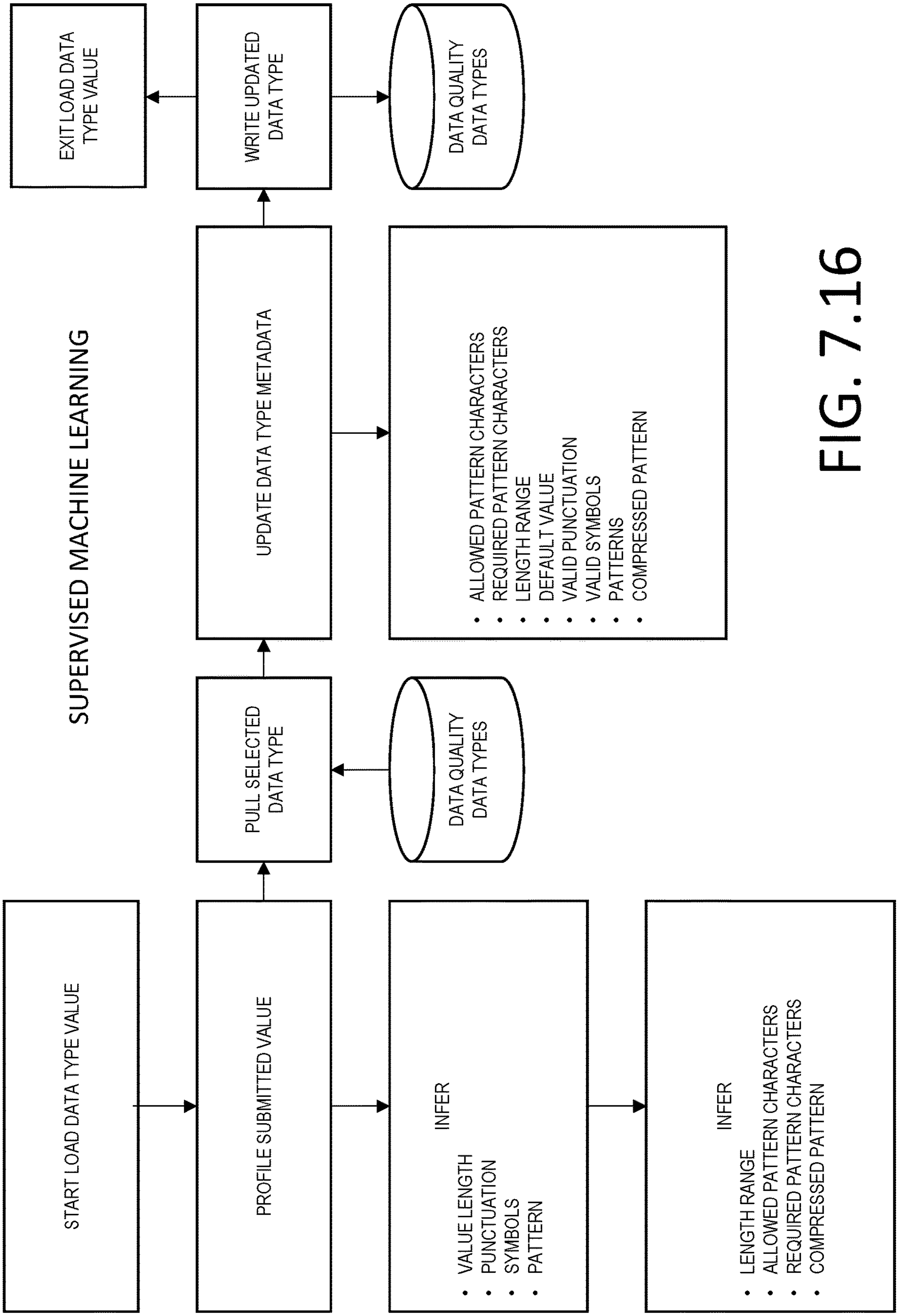
FIG. 7.16

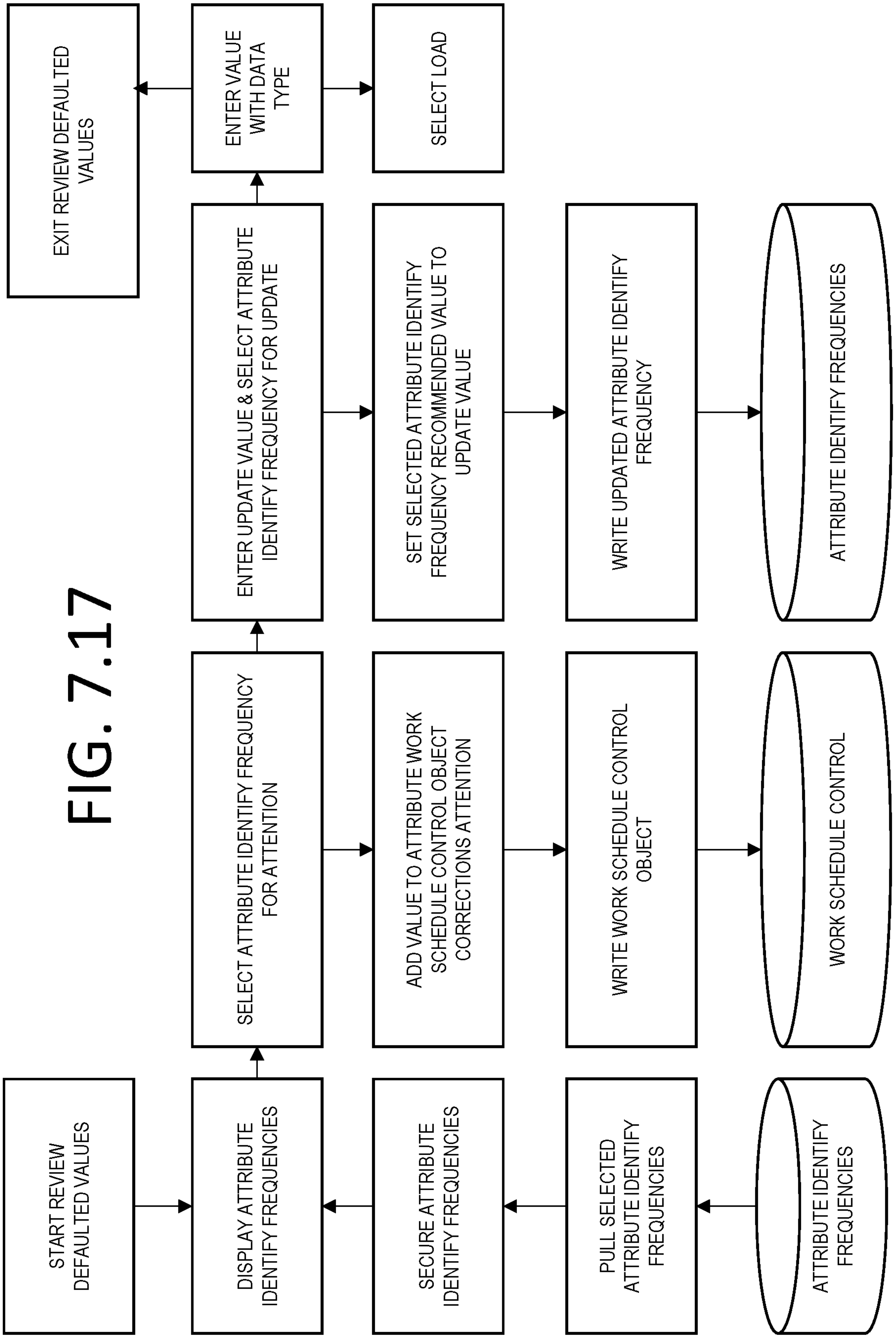
FIG. 7.17

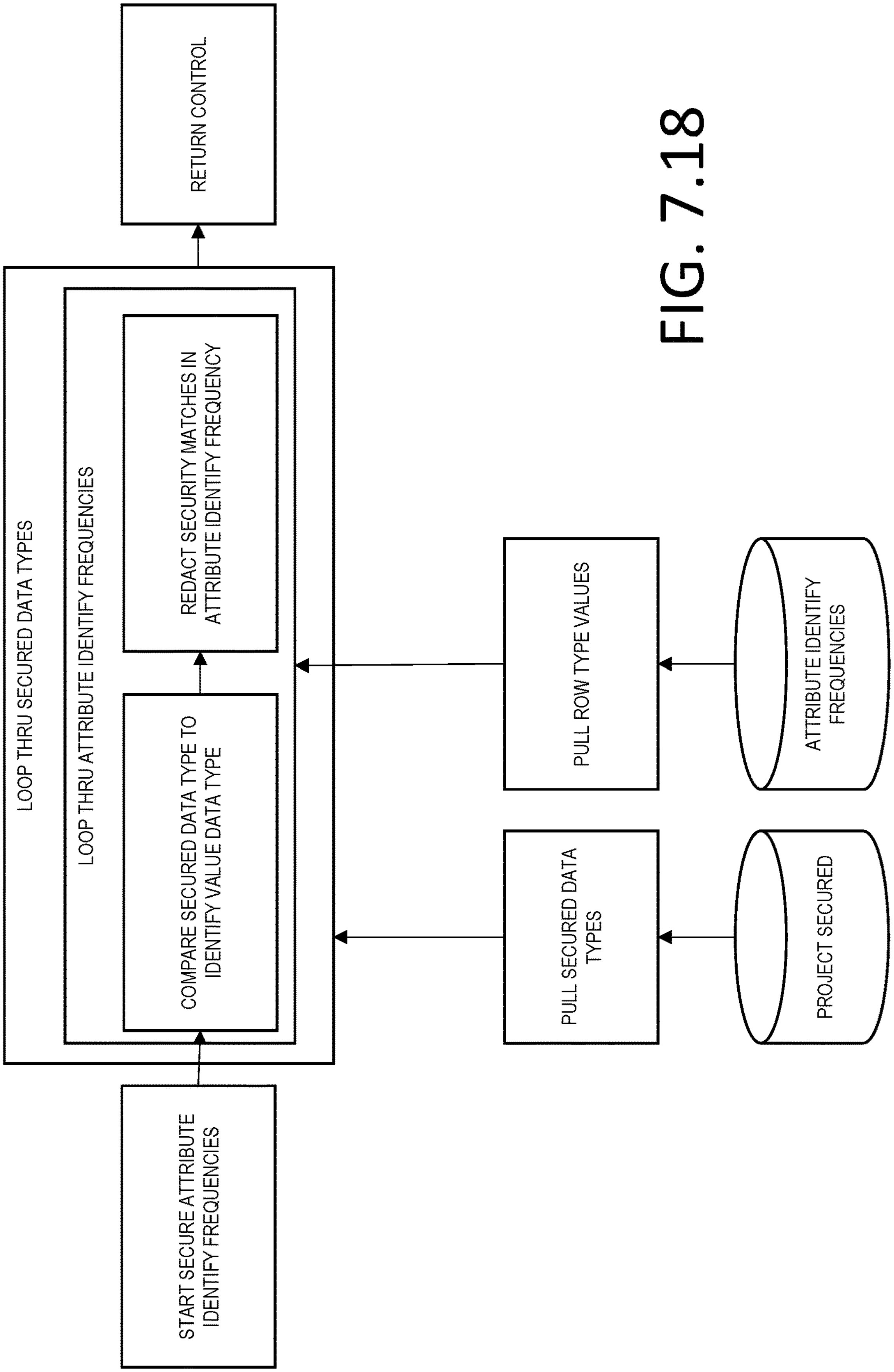
FIG. 7.18

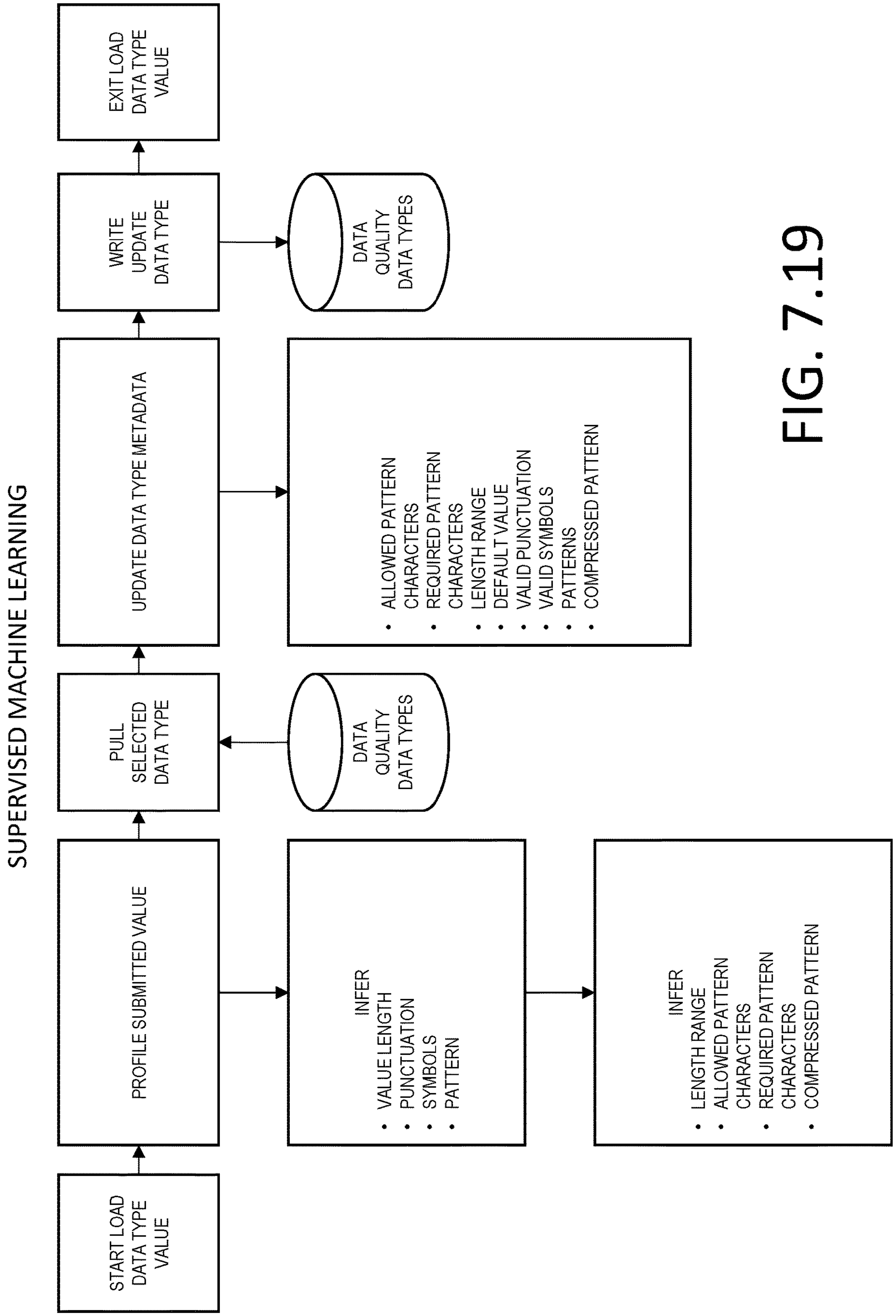
FIG. 7.19

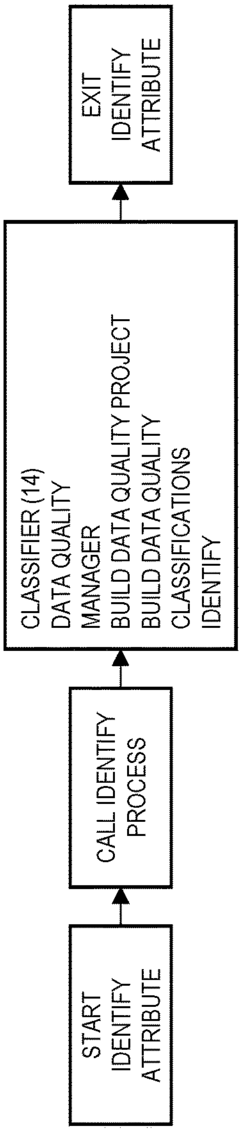
FIG. 7.20
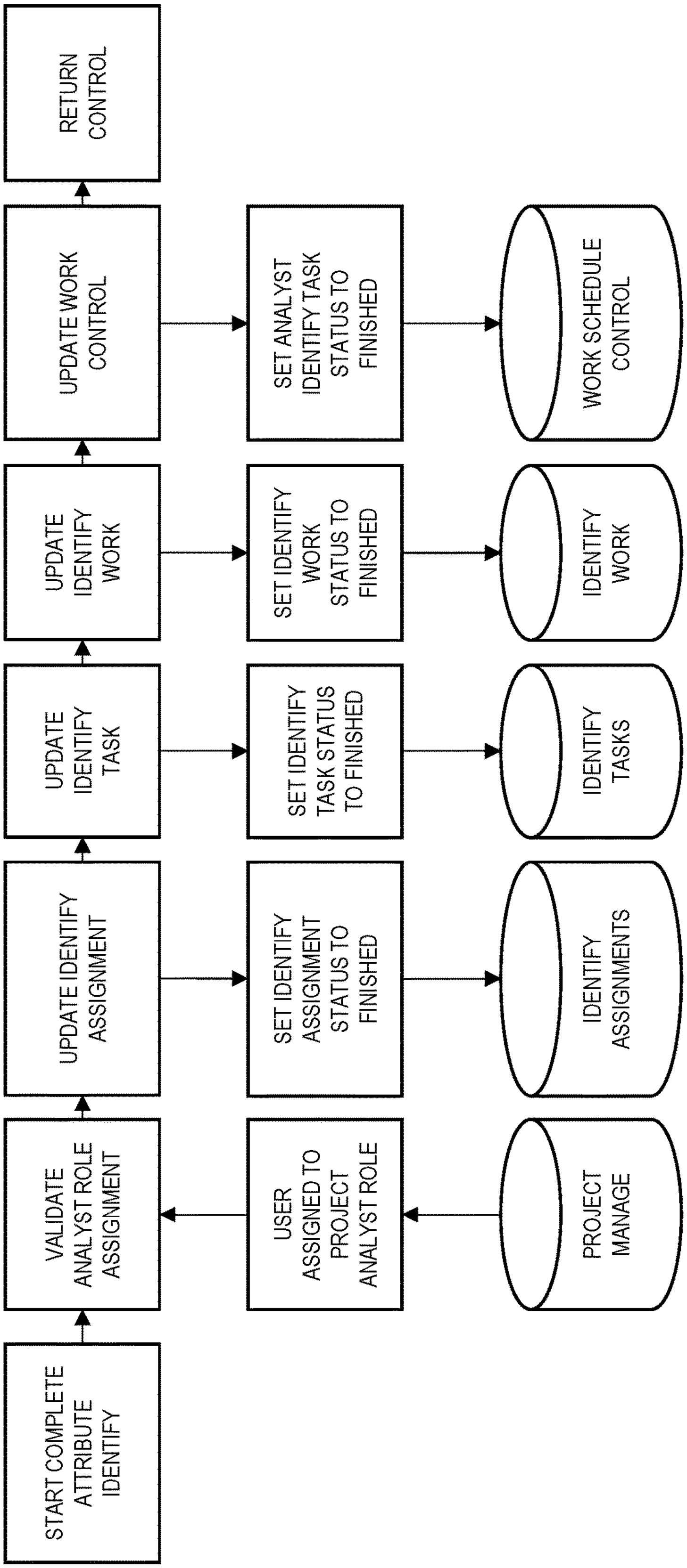
FIG. 7.21

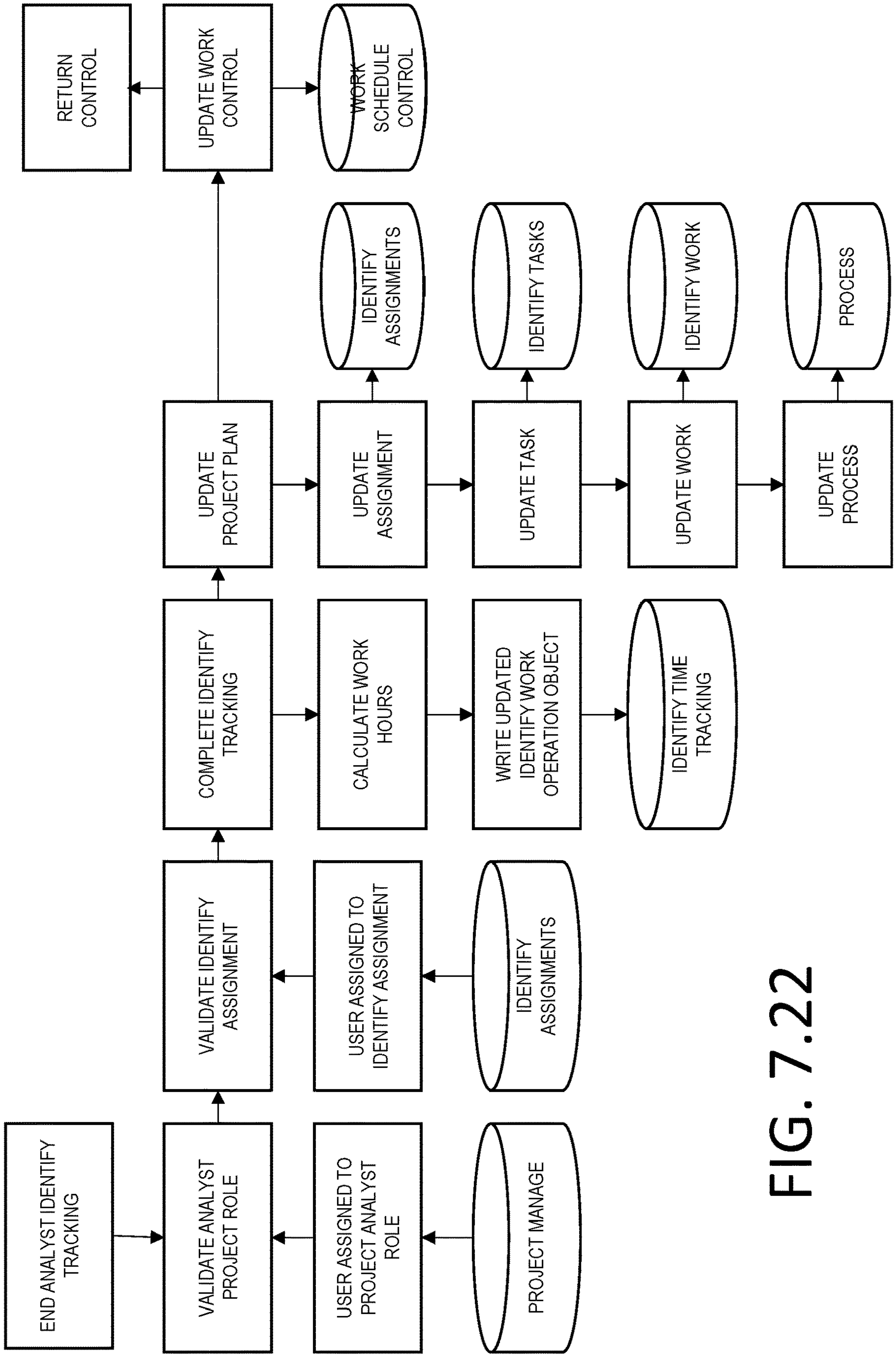
FIG. 7.22

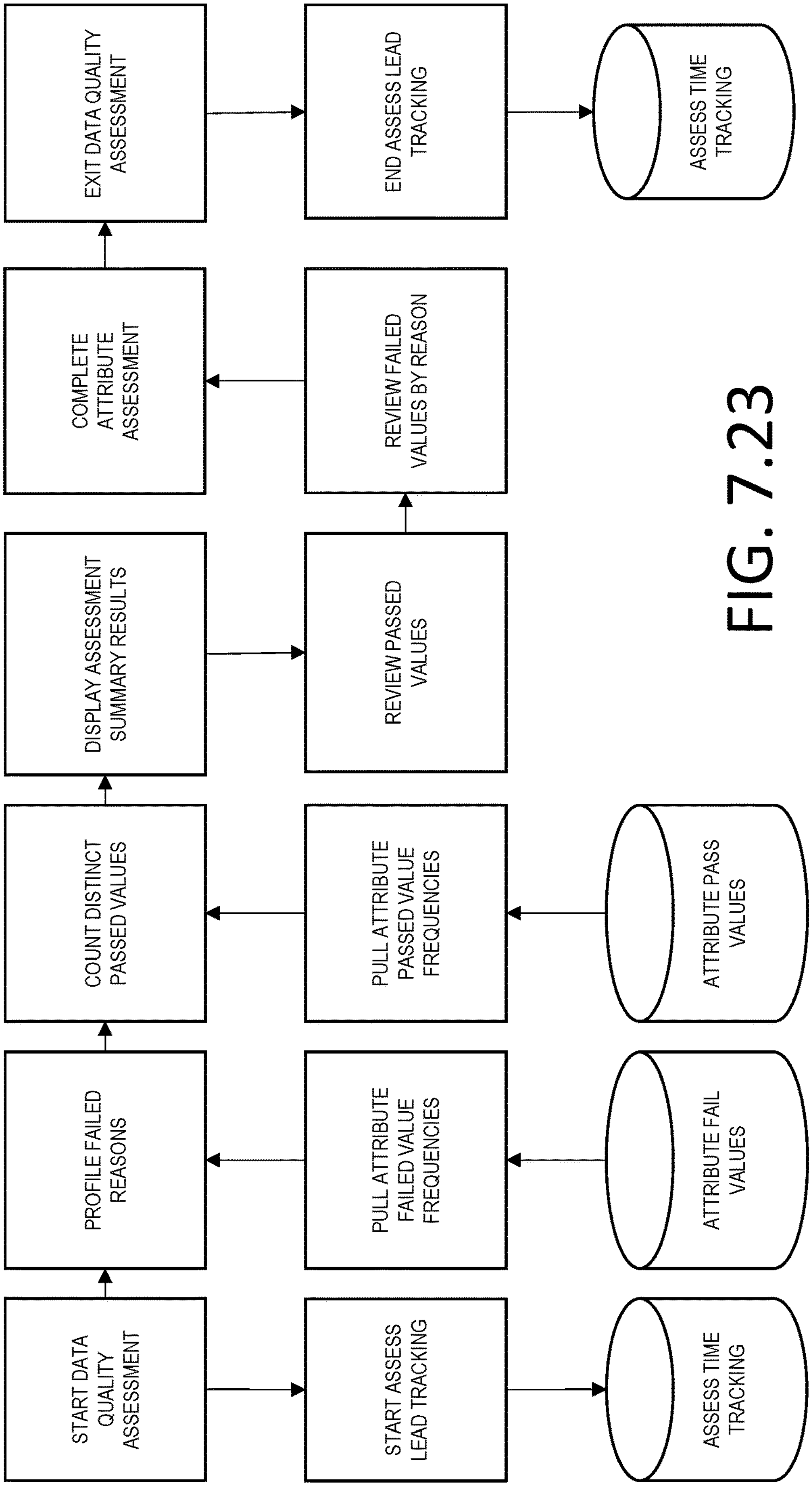
FIG. 7.23

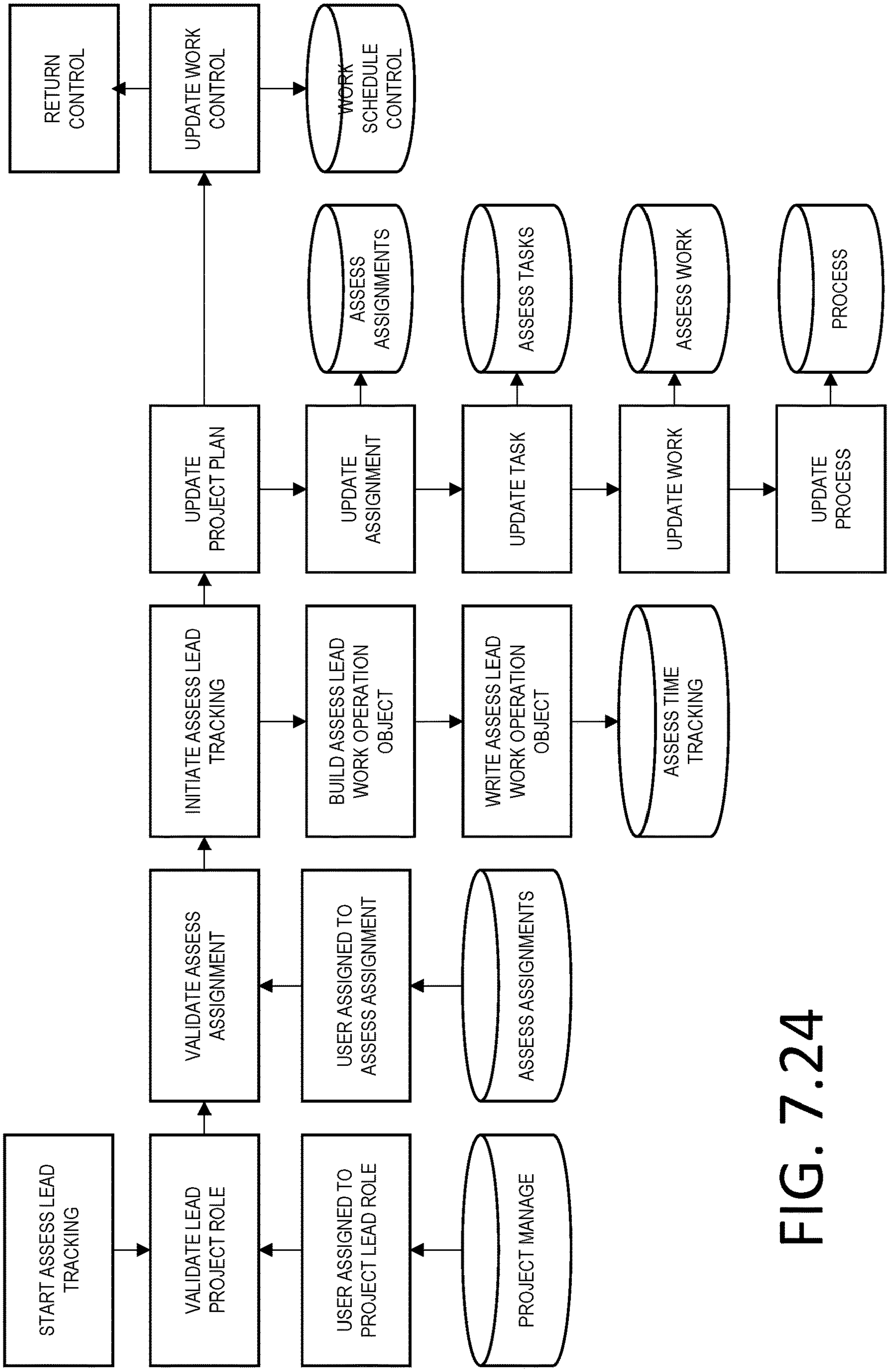
FIG. 7.24

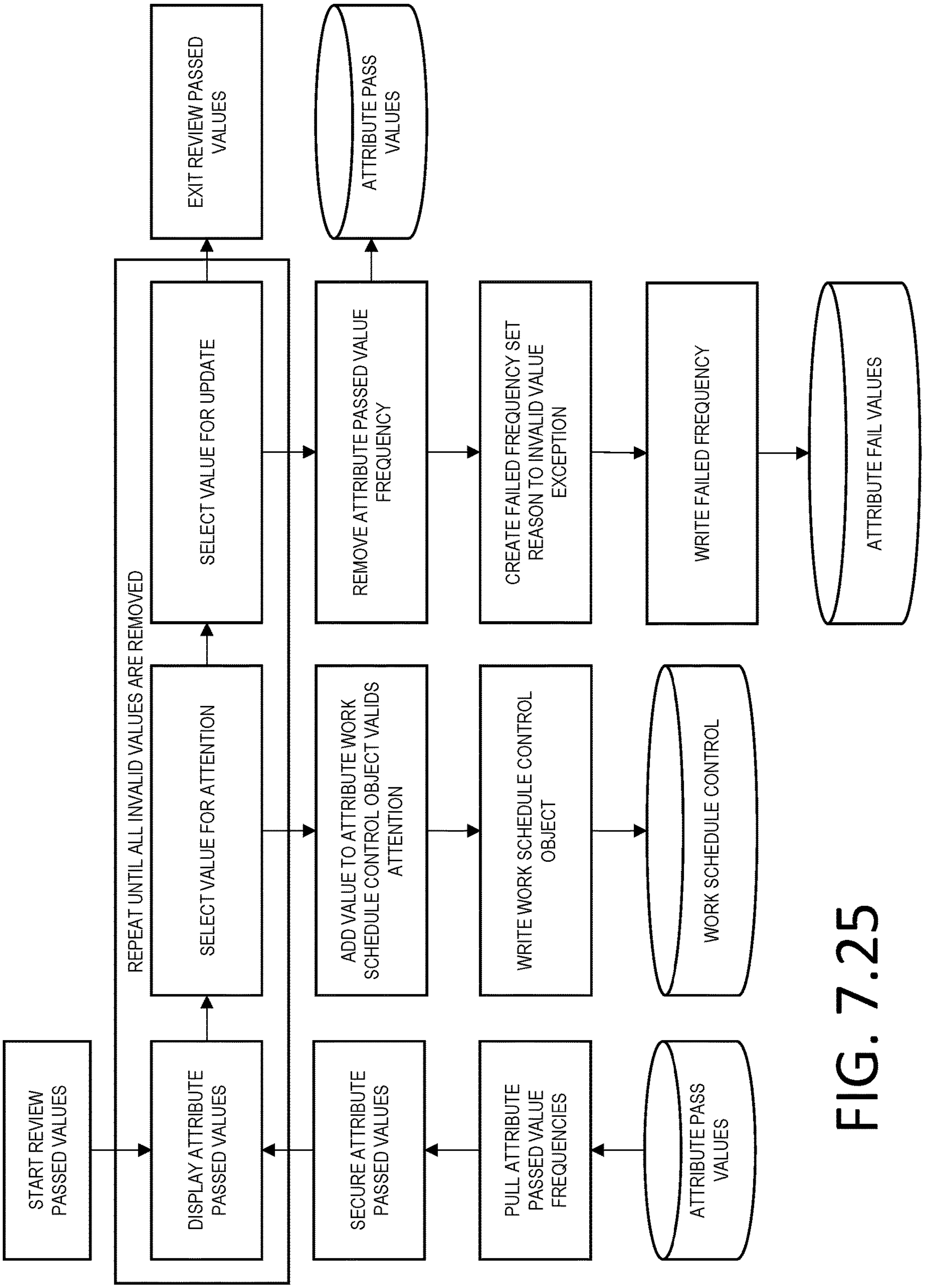
FIG. 7.25

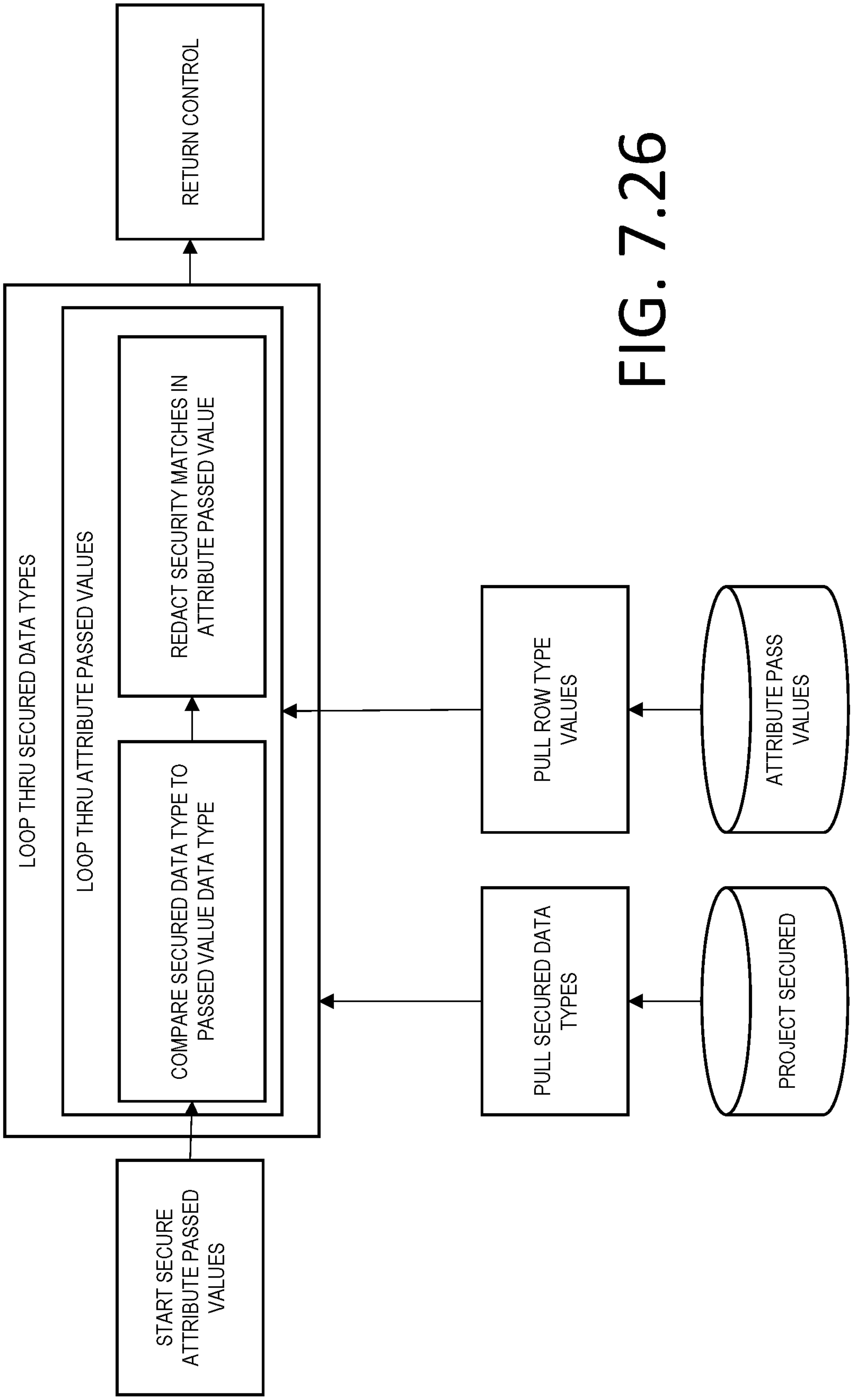
FIG. 7.26

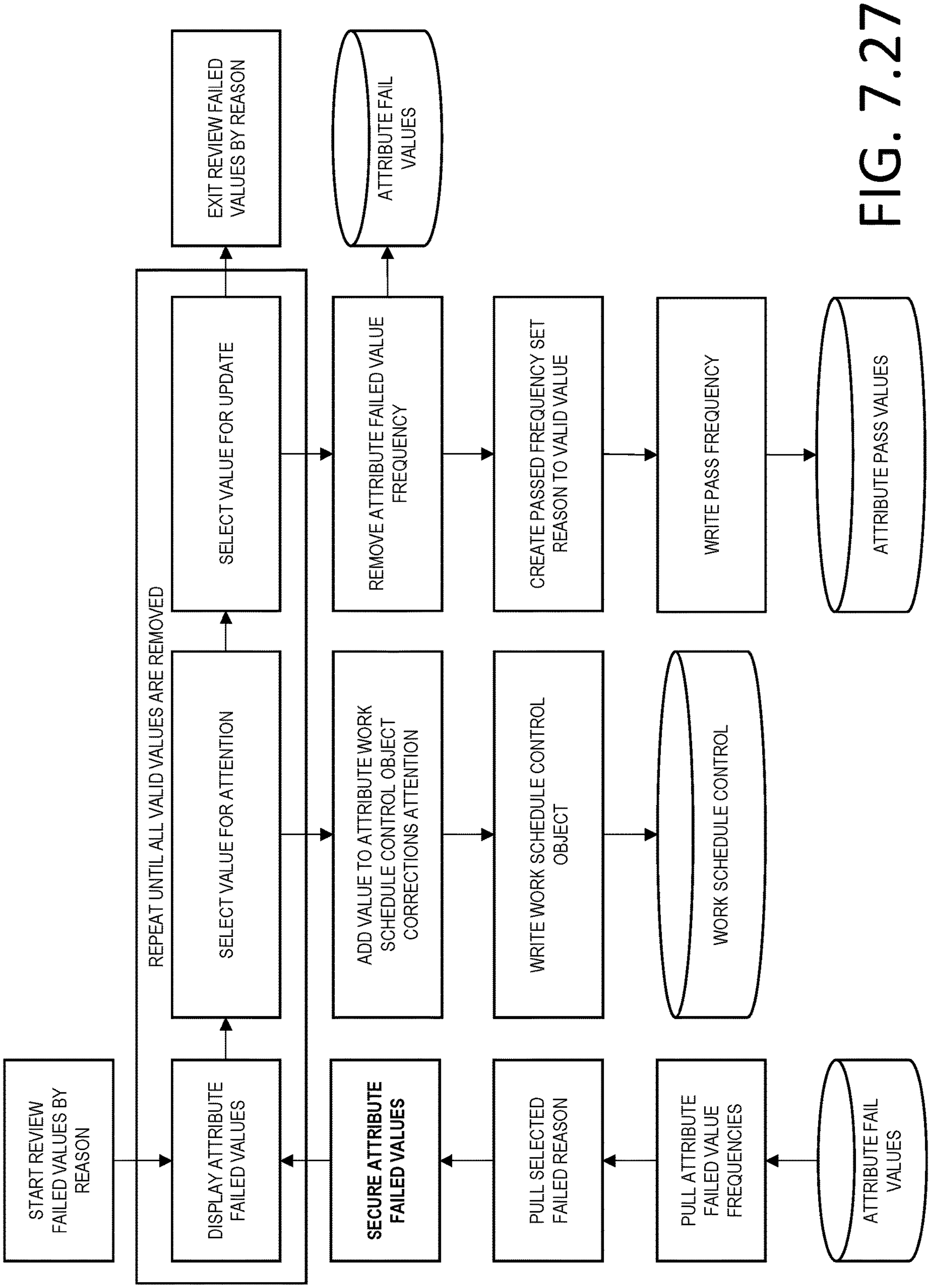
FIG. 7.27

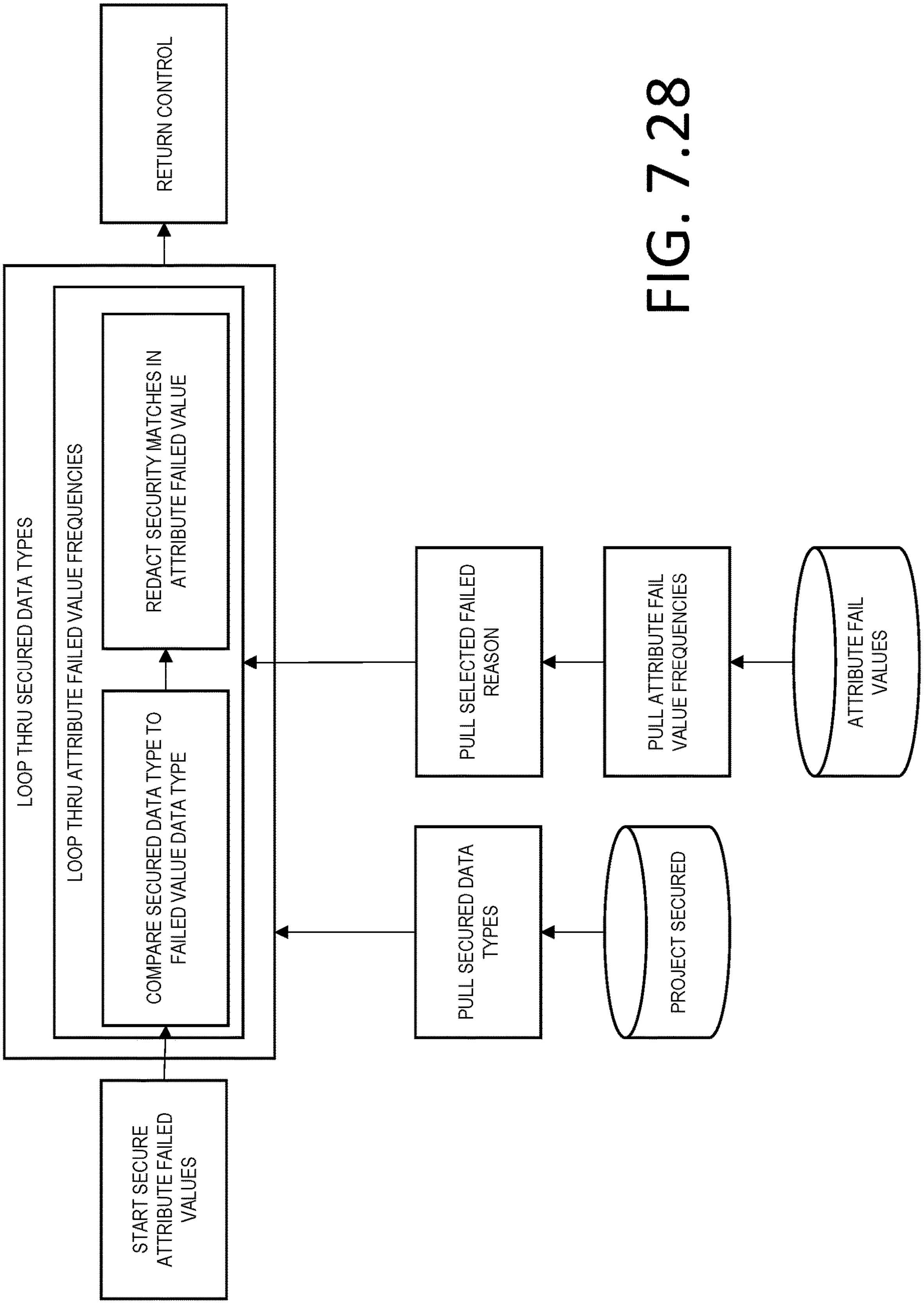
FIG. 7.28

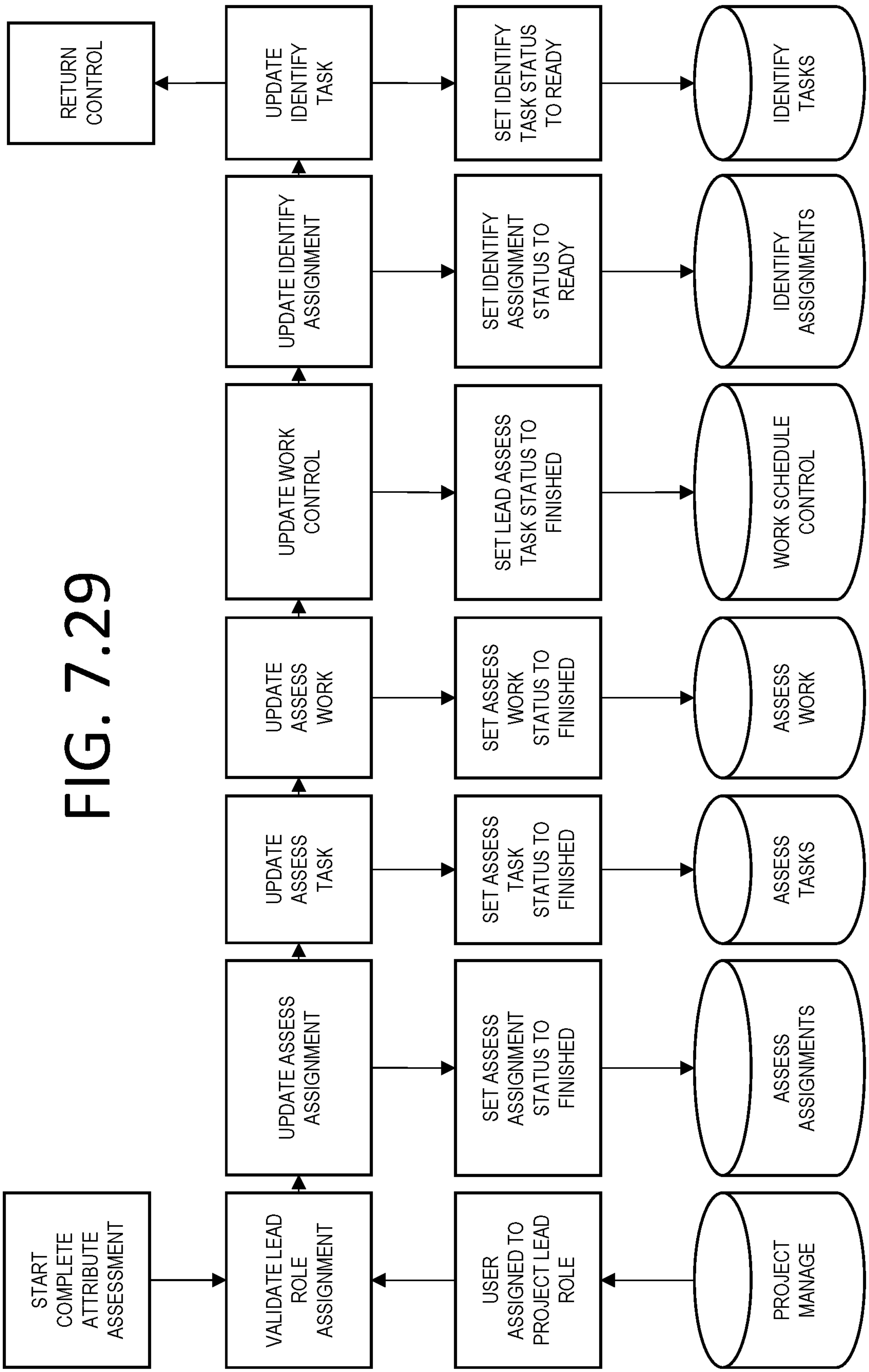
FIG. 7.29

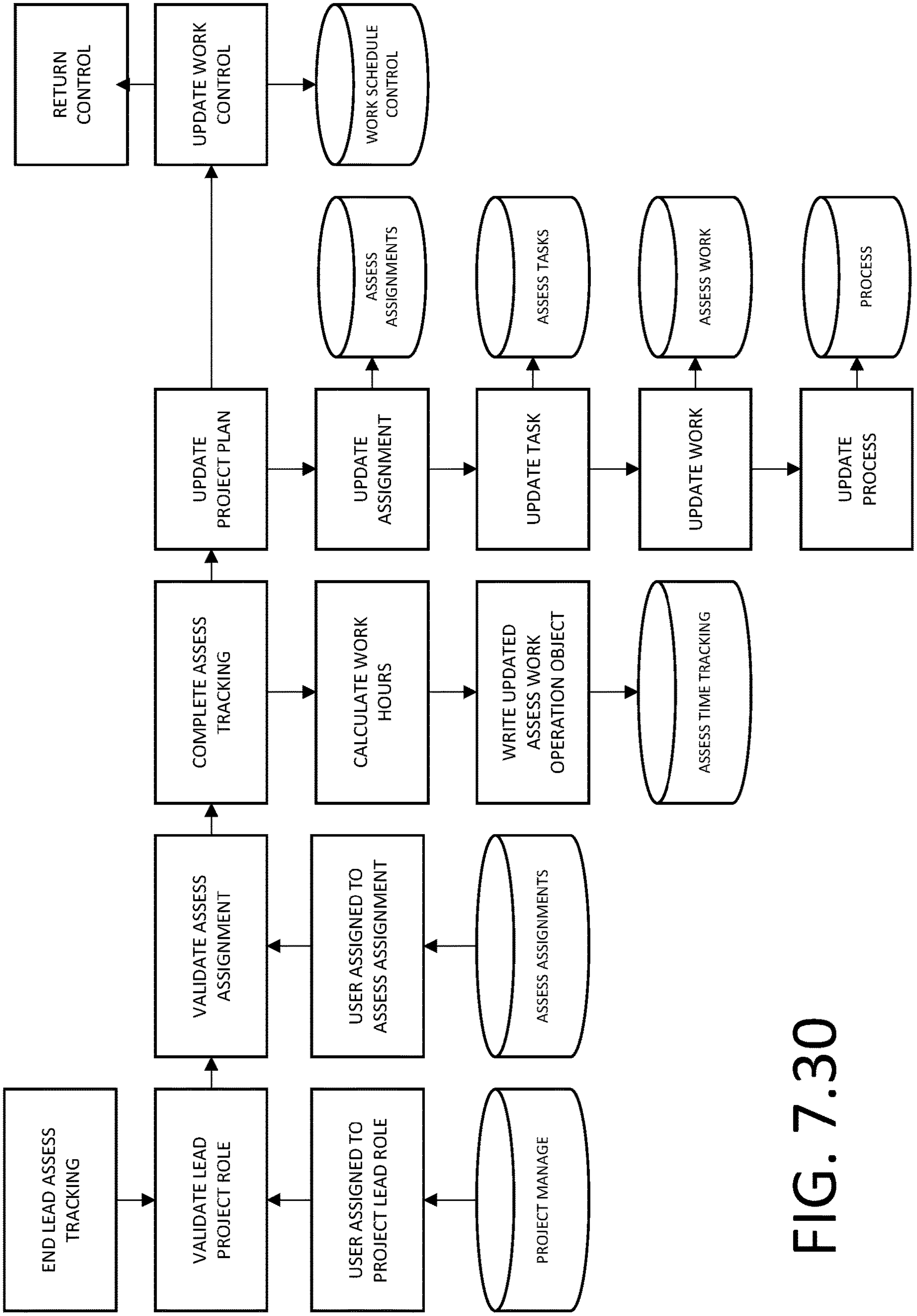
FIG. 7.30

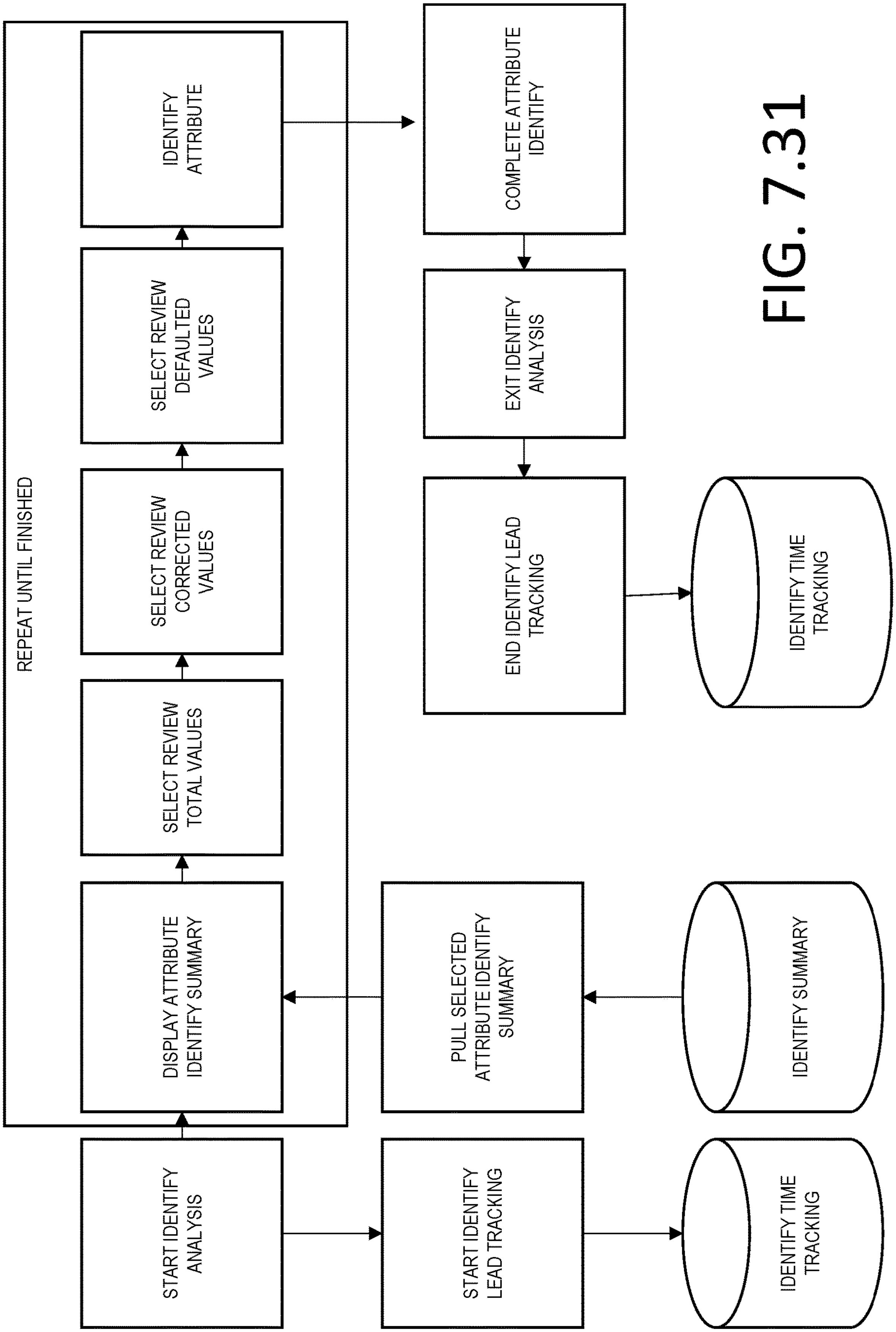
FIG. 7.31

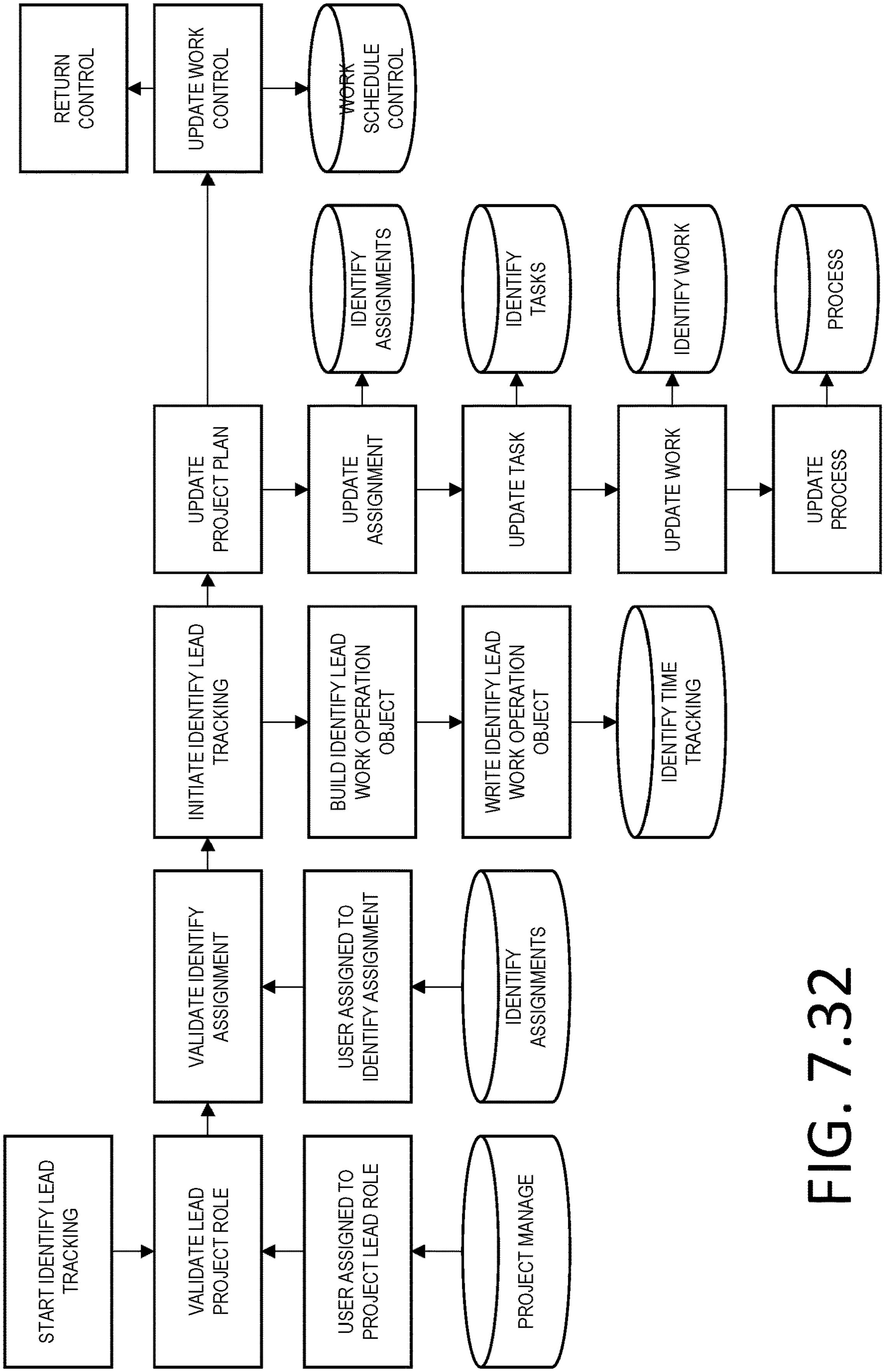
FIG. 7.32

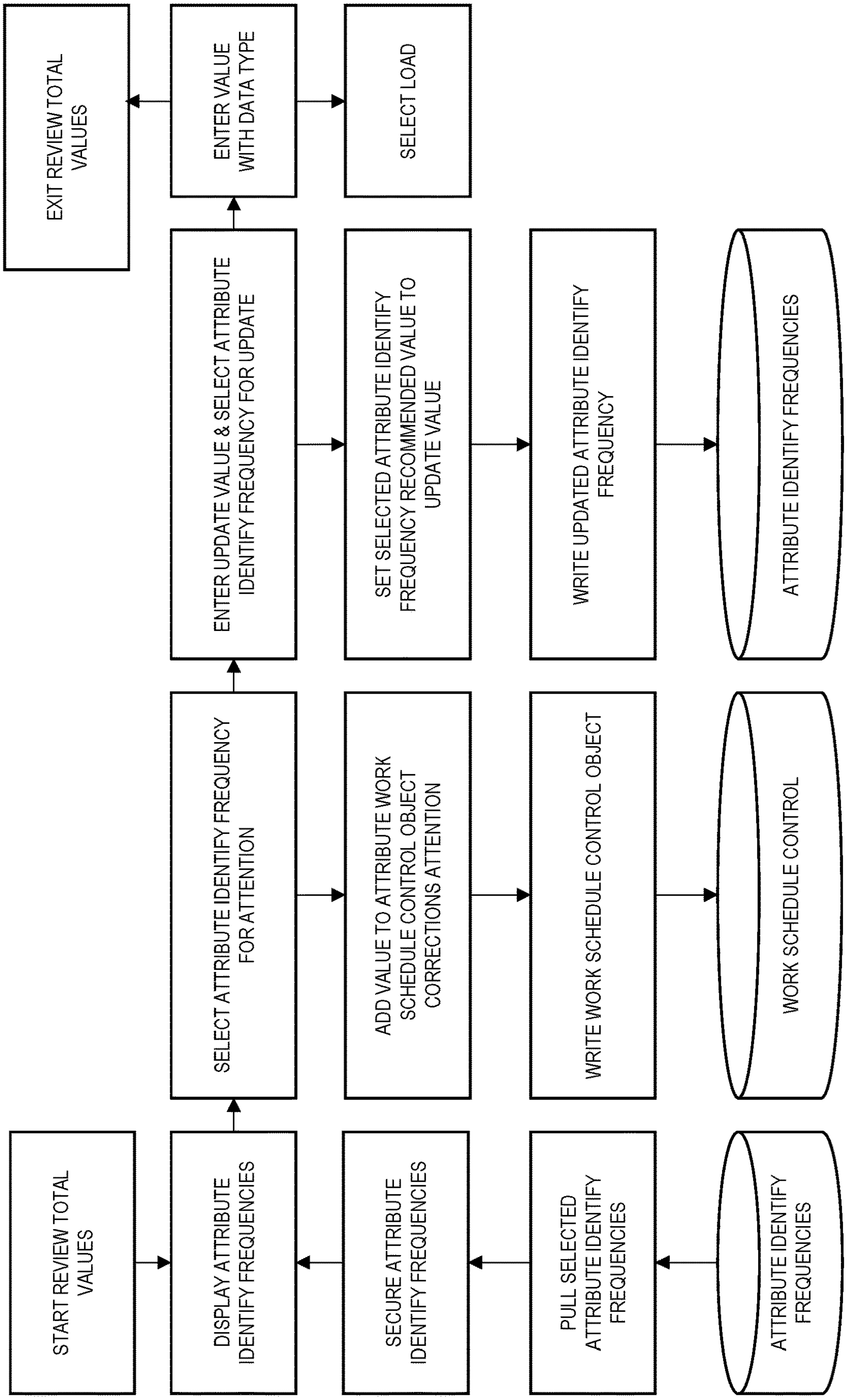

FIG. 7.33

START REVIEW TOTAL VALUES

DISPLAY ATTRIBUTE IDENTIFY FREQUENCIES

SECURE ATTRIBUTE IDENTIFY FREQUENCIES

PULL SELECTED ATTRIBUTE IDENTIFY FREQUENCIES

ATTRIBUTE IDENTIFY FREQUENCIES

SELECT ATTRIBUTE IDENTIFY FREQUENCY FOR ATTENTION

ADD VALUE TO ATTRIBUTE WORK SCHEDULE CONTROL OBJECT CORRECTIONS ATTENTION

WRITE WORK SCHEDULE CONTROL OBJECT

WORK SCHEDULE CONTROL

ENTER UPDATE VALUE & SELECT ATTRIBUTE IDENTIFY FREQUENCY FOR UPDATE

SET SELECTED ATTRIBUTE IDENTIFY FREQUENCY RECOMMENDED VALUE TO UPDATE VALUE

WRITE UPDATED ATTRIBUTE IDENTIFY FREQUENCY

ATTRIBUTE IDENTIFY FREQUENCIES

ENTER VALUE WITH DATA TYPE

EXIT REVIEW TOTAL VALUES

SELECT LOAD

FIG. 7.33

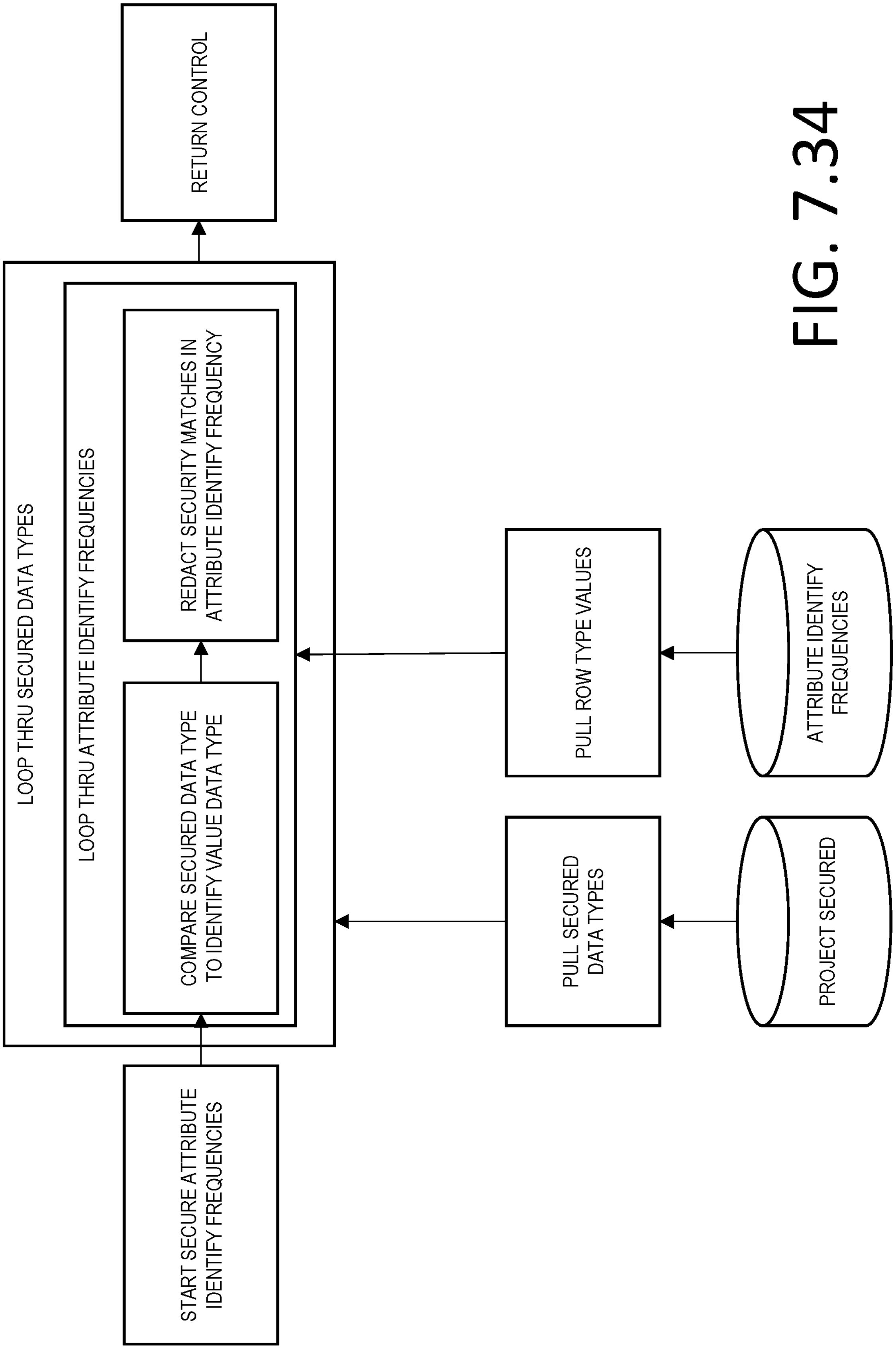
FIG. 7.34

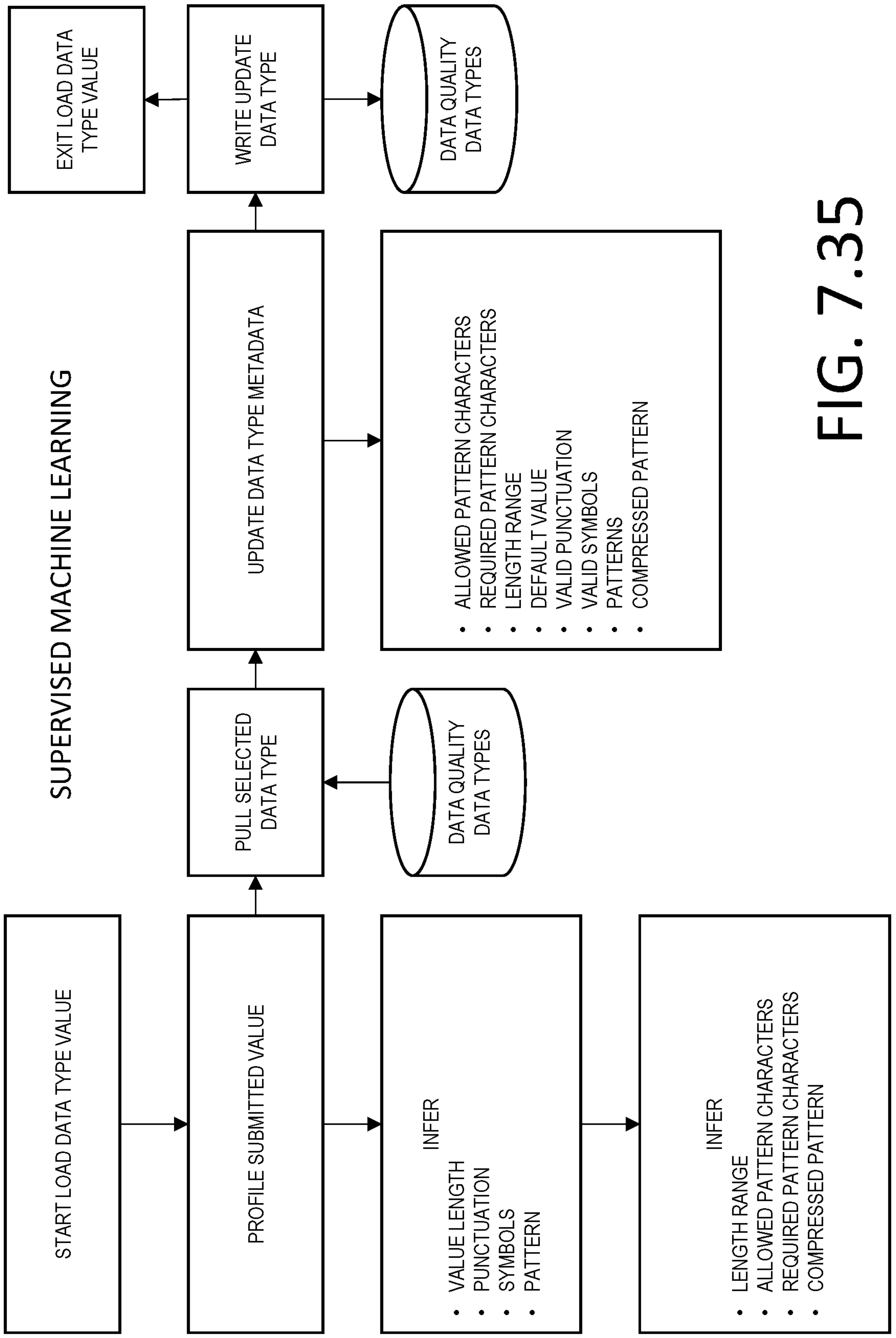
FIG. 7.35

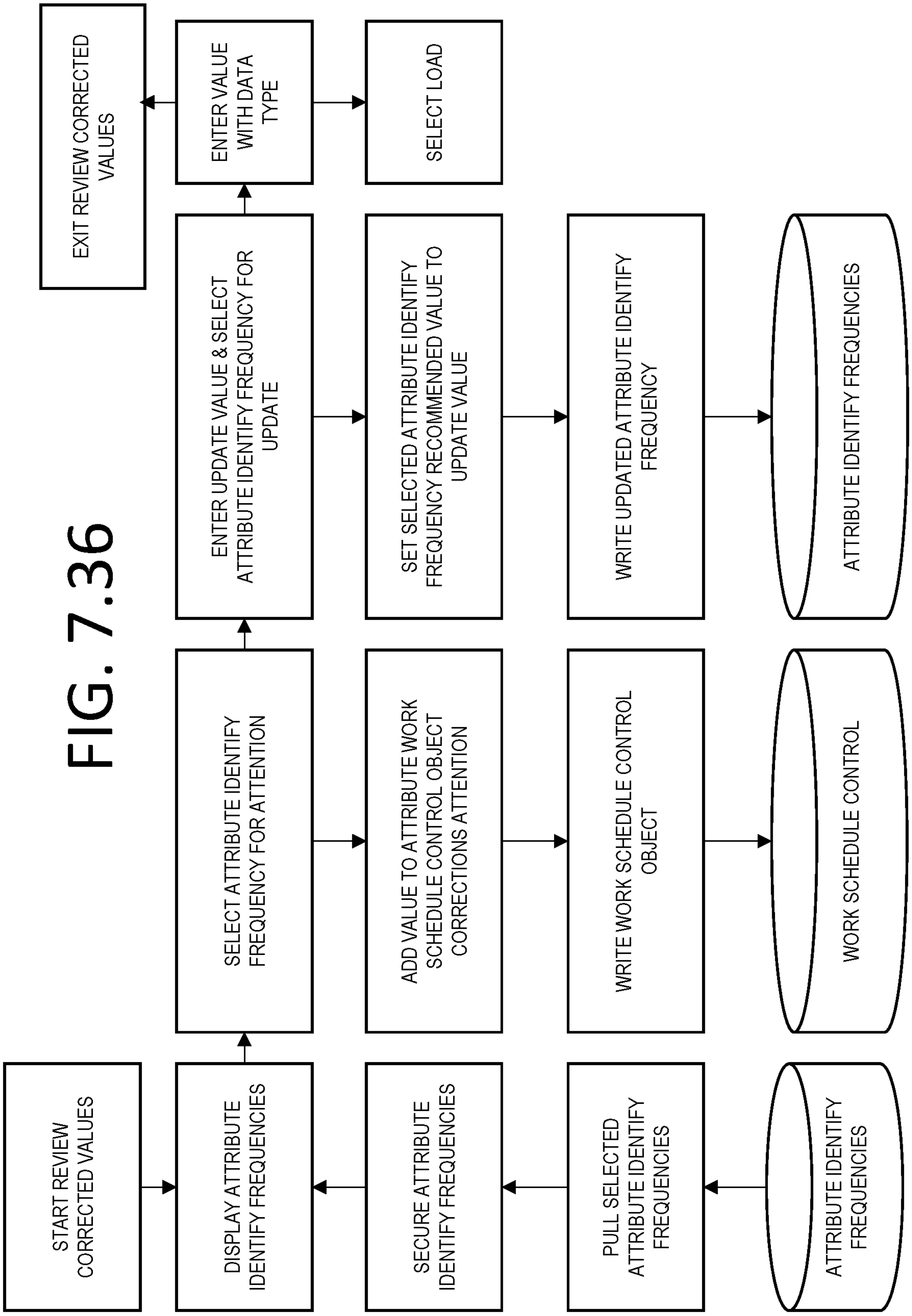
FIG. 7.36
START REVIEW CORRECTED VALUES
DISPLAY ATTRIBUTE IDENTIFY FREQUENCIES
SECURE ATTRIBUTE IDENTIFY FREQUENCIES
PULL SELECTED ATTRIBUTE IDENTIFY FREQUENCIES
ATTRIBUTE IDENTIFY FREQUENCIES
SELECT ATTRIBUTE IDENTIFY FREQUENCY FOR ATTENTION
ADD VALUE TO ATTRIBUTE WORK SCHEDULE CONTROL OBJECT CORRECTIONS ATTENTION
WRITE WORK SCHEDULE CONTROL OBJECT
WORK SCHEDULE CONTROL
ENTER UPDATE VALUE & SELECT ATTRIBUTE IDENTIFY FREQUENCY FOR UPDATE
SET SELECTED ATTRIBUTE IDENTIFY FREQUENCY RECOMMENDED VALUE TO UPDATE VALUE
WRITE UPDATED ATTRIBUTE IDENTIFY FREQUENCY
ATTRIBUTE IDENTIFY FREQUENCIES
EXIT REVIEW CORRECTED VALUES
ENTER VALUE WITH DATA TYPE
SELECT LOAD

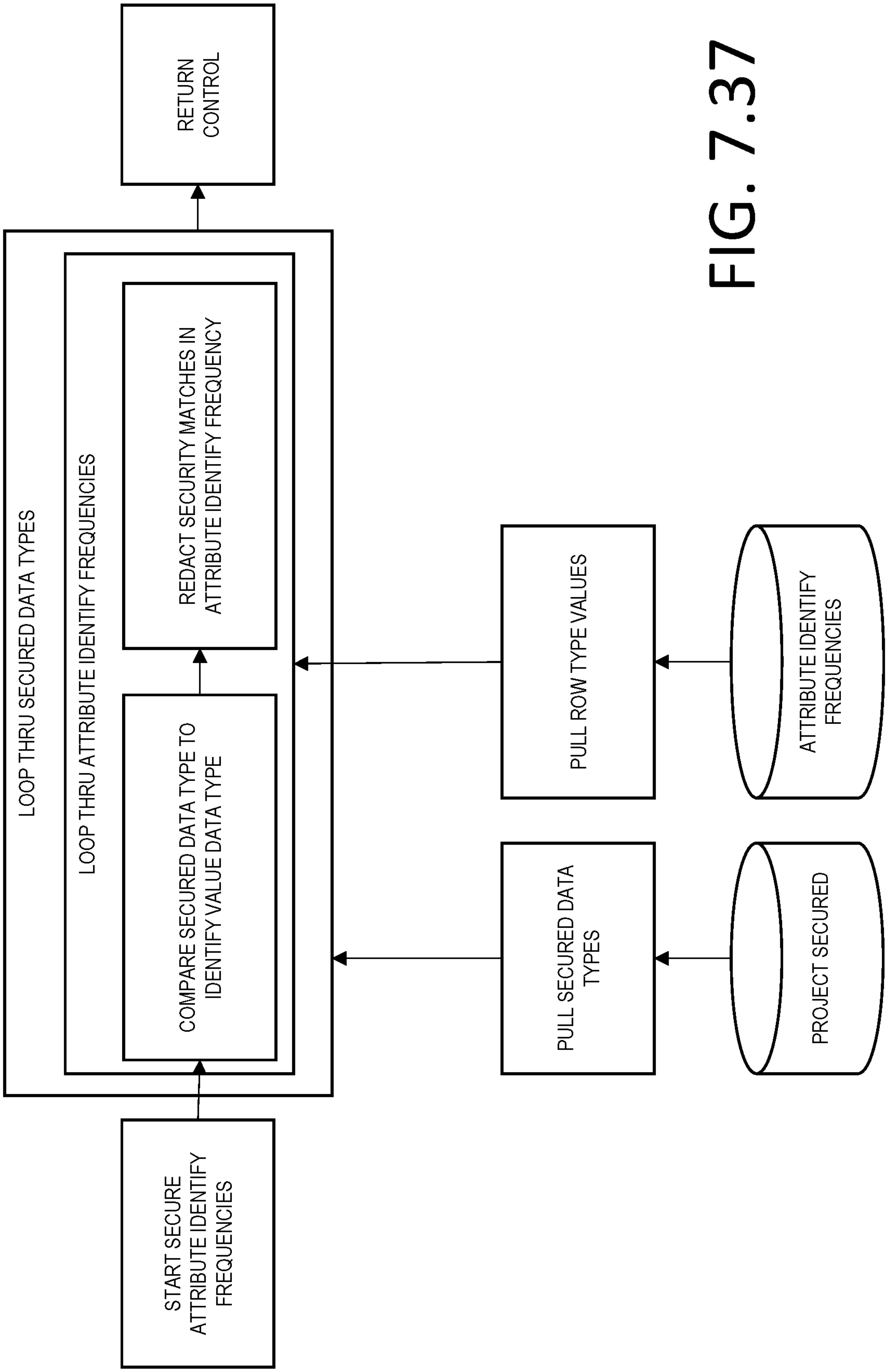
FIG. 7.37

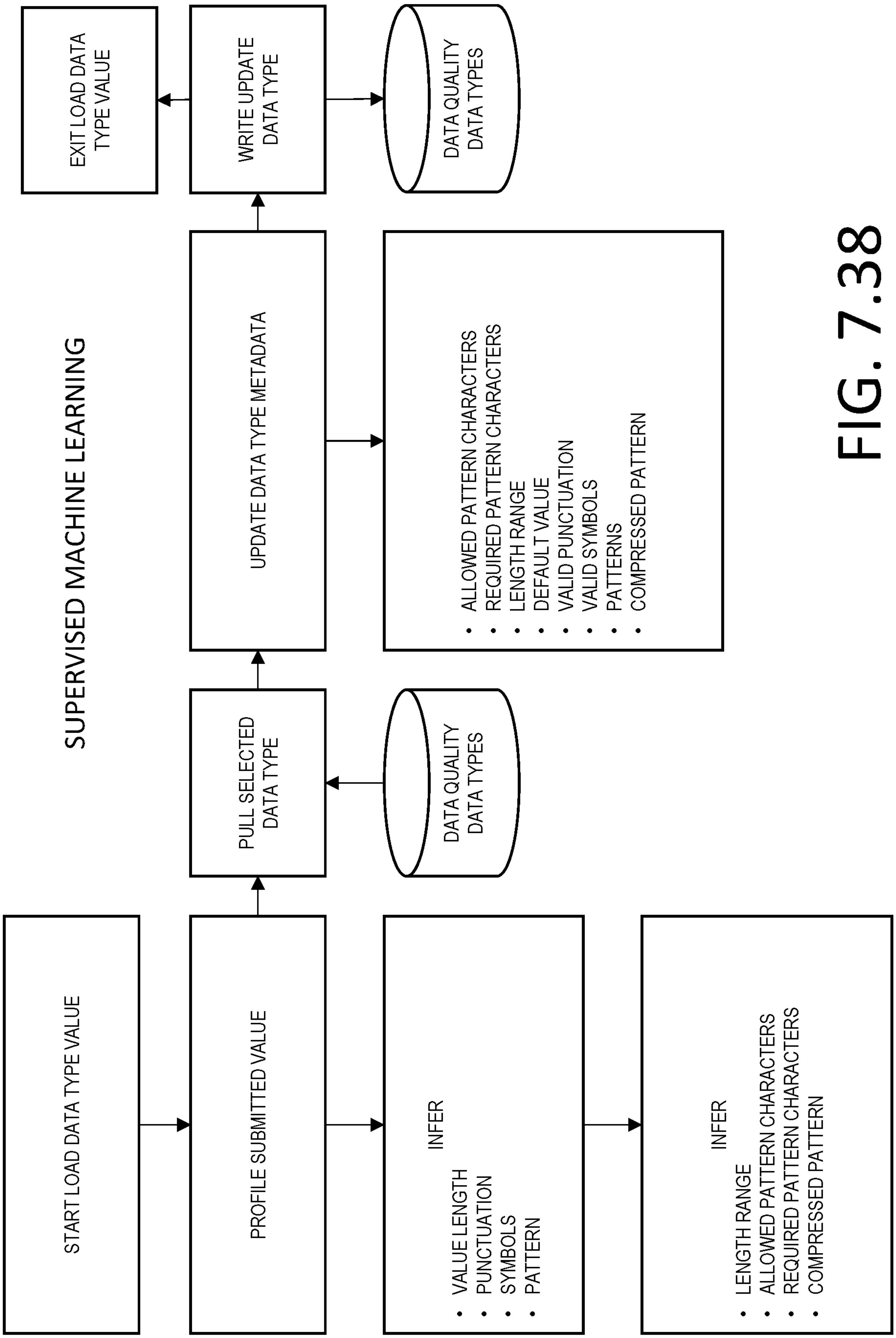

FIG. 7.38

SUPERVISED MACHINE LEARNING

START LOAD DATA TYPE VALUE

PROFILE SUBMITTED VALUE

INFER
- VALUE LENGTH
- PUNCTUATION
- SYMBOLS
- PATTERN

INFER
- LENGTH RANGE
- ALLOWED PATTERN CHARACTERS
- REQUIRED PATTERN CHARACTERS
- COMPRESSED PATTERN

PULL SELECTED DATA TYPE

DATA QUALITY DATA TYPES

UPDATE DATA TYPE METADATA

- ALLOWED PATTERN CHARACTERS
- REQUIRED PATTERN CHARACTERS
- LENGTH RANGE
- DEFAULT VALUE
- VALID PUNCTUATION
- VALID SYMBOLS
- PATTERNS
- COMPRESSED PATTERN

WRITE UPDATE DATA TYPE

DATA QUALITY DATA TYPES

EXIT LOAD DATA TYPE VALUE

FIG. 7.38

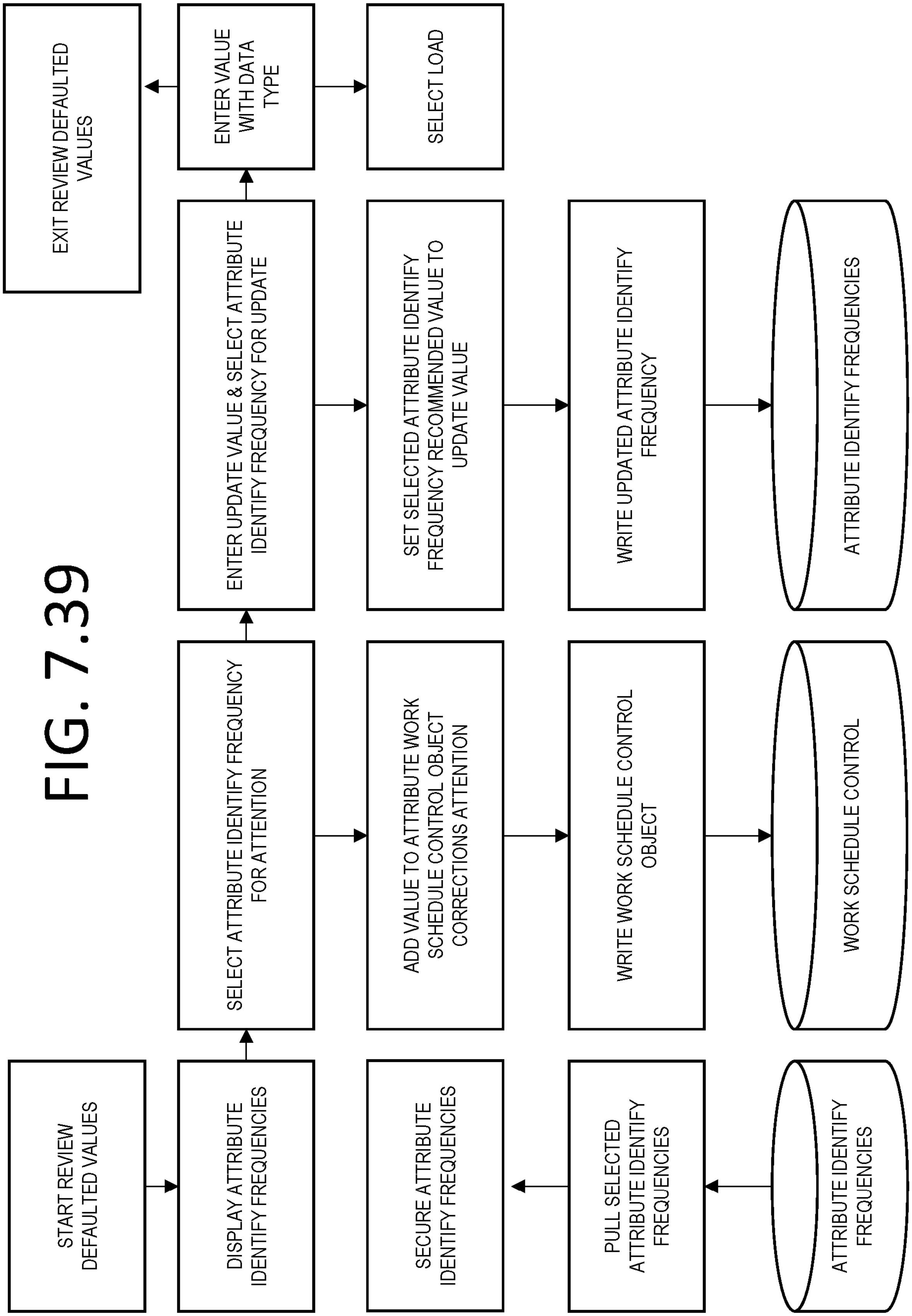
FIG. 7.39
START REVIEW DEFAULTED VALUES
EXIT REVIEW DEFAULTED VALUES
DISPLAY ATTRIBUTE IDENTIFY FREQUENCIES
SELECT ATTRIBUTE IDENTIFY FREQUENCY FOR ATTENTION
ENTER UPDATE VALUE & SELECT ATTRIBUTE IDENTIFY FREQUENCY FOR UPDATE
ENTER VALUE WITH DATA TYPE
SECURE ATTRIBUTE IDENTIFY FREQUENCIES
ADD VALUE TO ATTRIBUTE WORK SCHEDULE CONTROL OBJECT CORRECTIONS ATTENTION
SET SELECTED ATTRIBUTE IDENTIFY FREQUENCY RECOMMENDED VALUE TO UPDATE VALUE
SELECT LOAD
PULL SELECTED ATTRIBUTE IDENTIFY FREQUENCIES
WRITE WORK SCHEDULE CONTROL OBJECT
WRITE UPDATED ATTRIBUTE IDENTIFY FREQUENCY
ATTRIBUTE IDENTIFY FREQUENCIES
WORK SCHEDULE CONTROL
ATTRIBUTE IDENTIFY FREQUENCIES

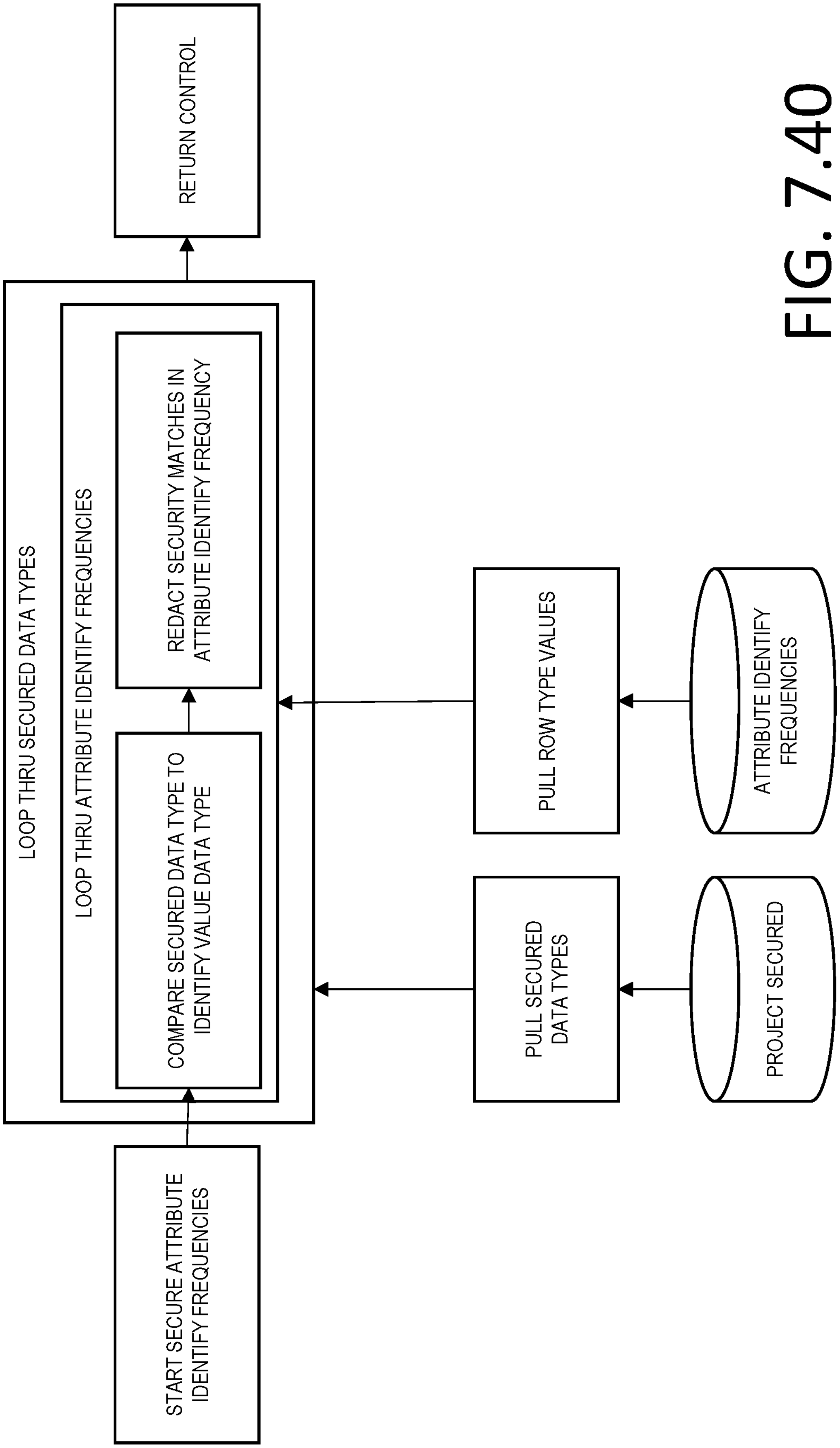
FIG. 7.40

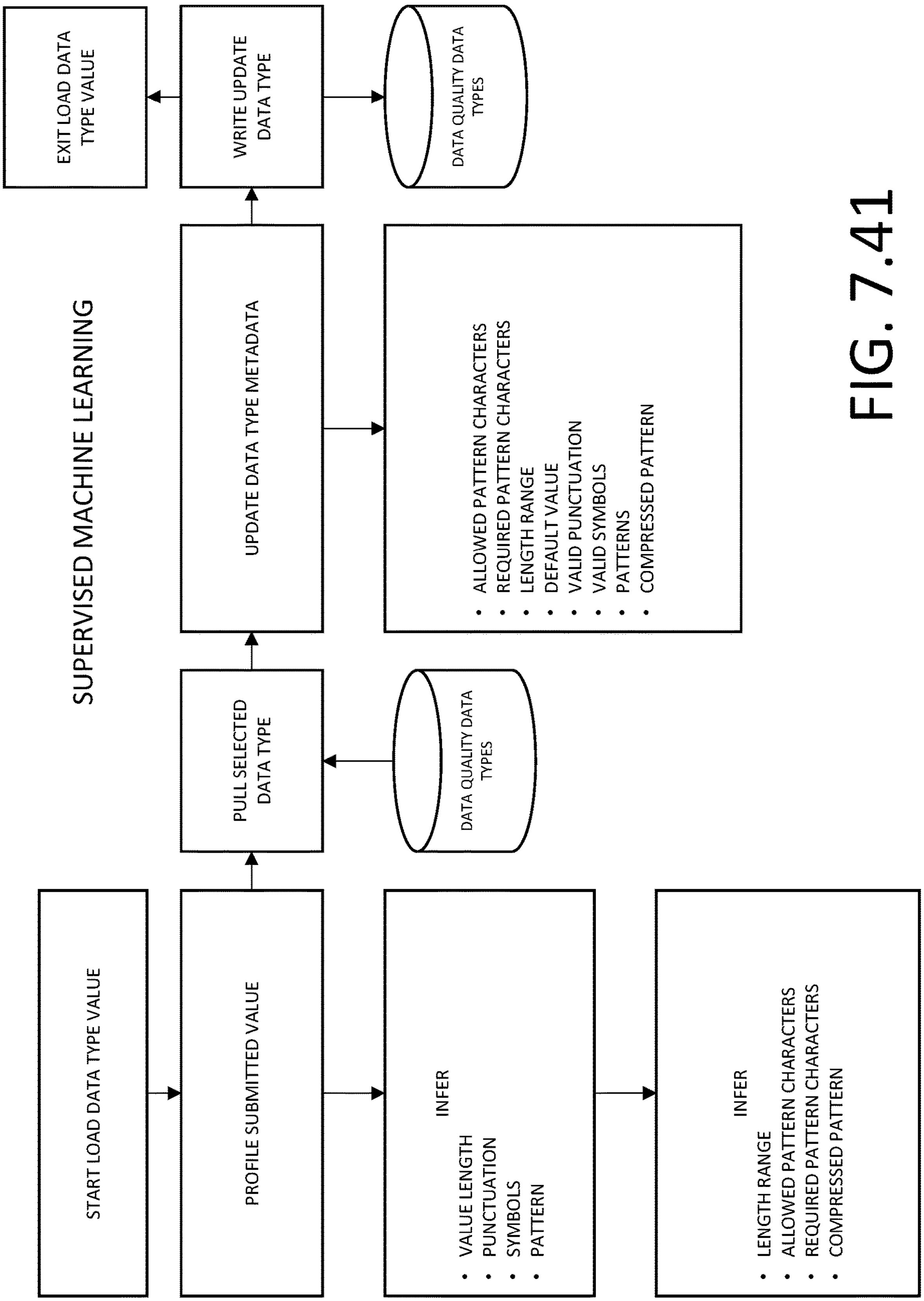
FIG. 7.41

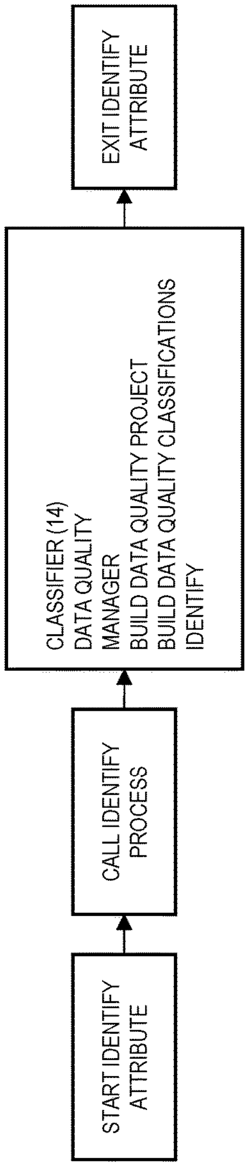
FIG. 7.42
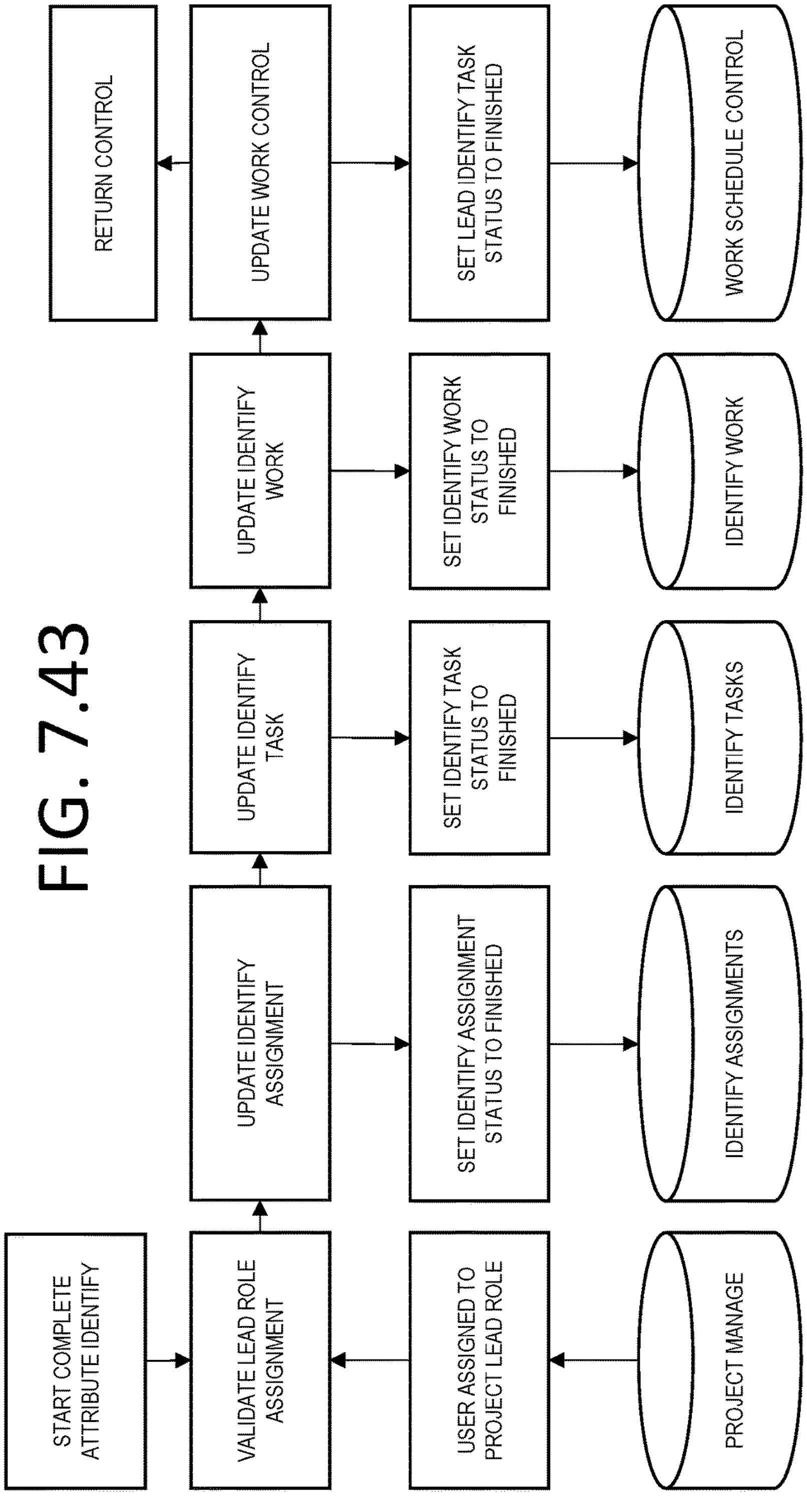
FIG. 7.43

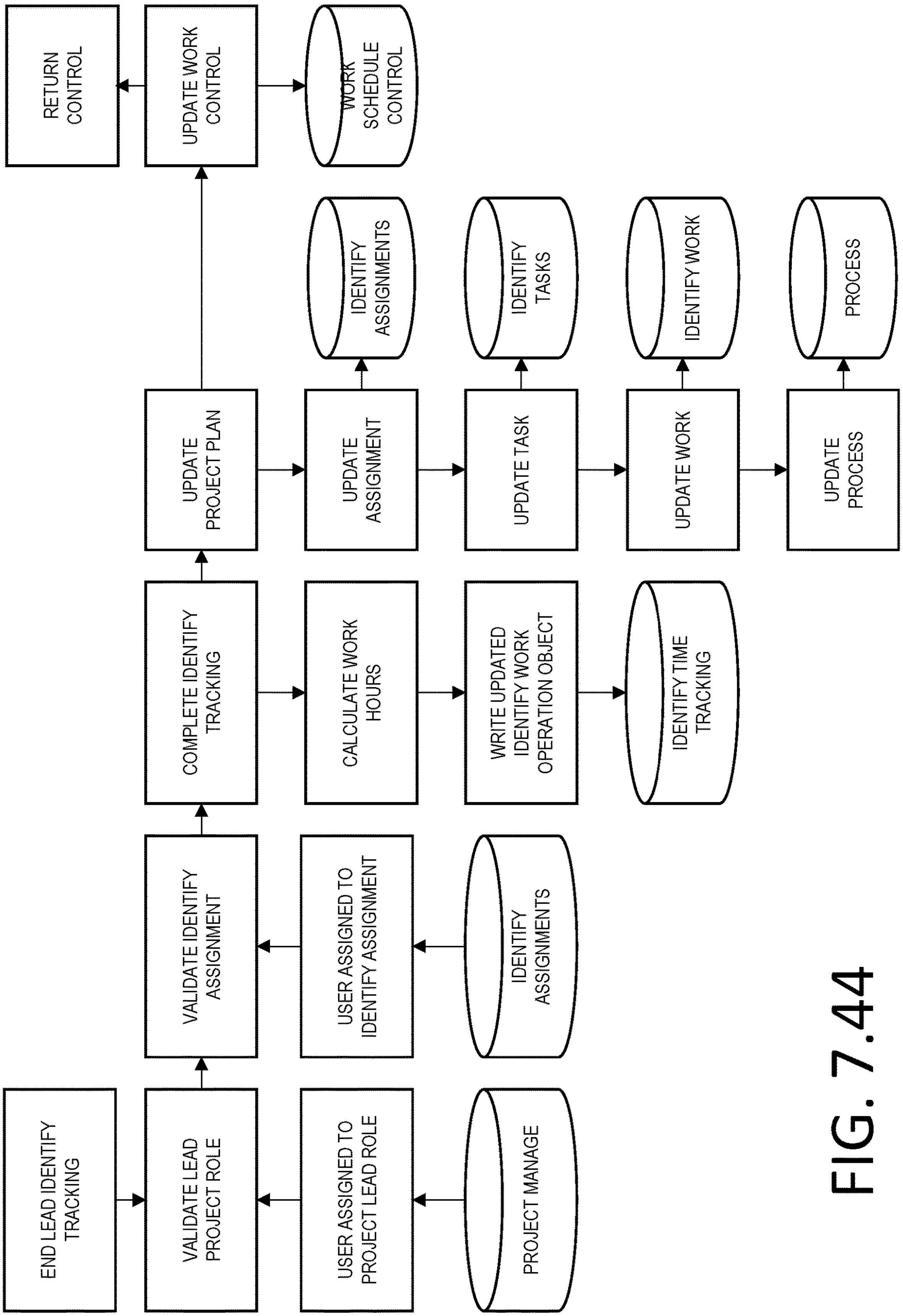
FIG. 7.44

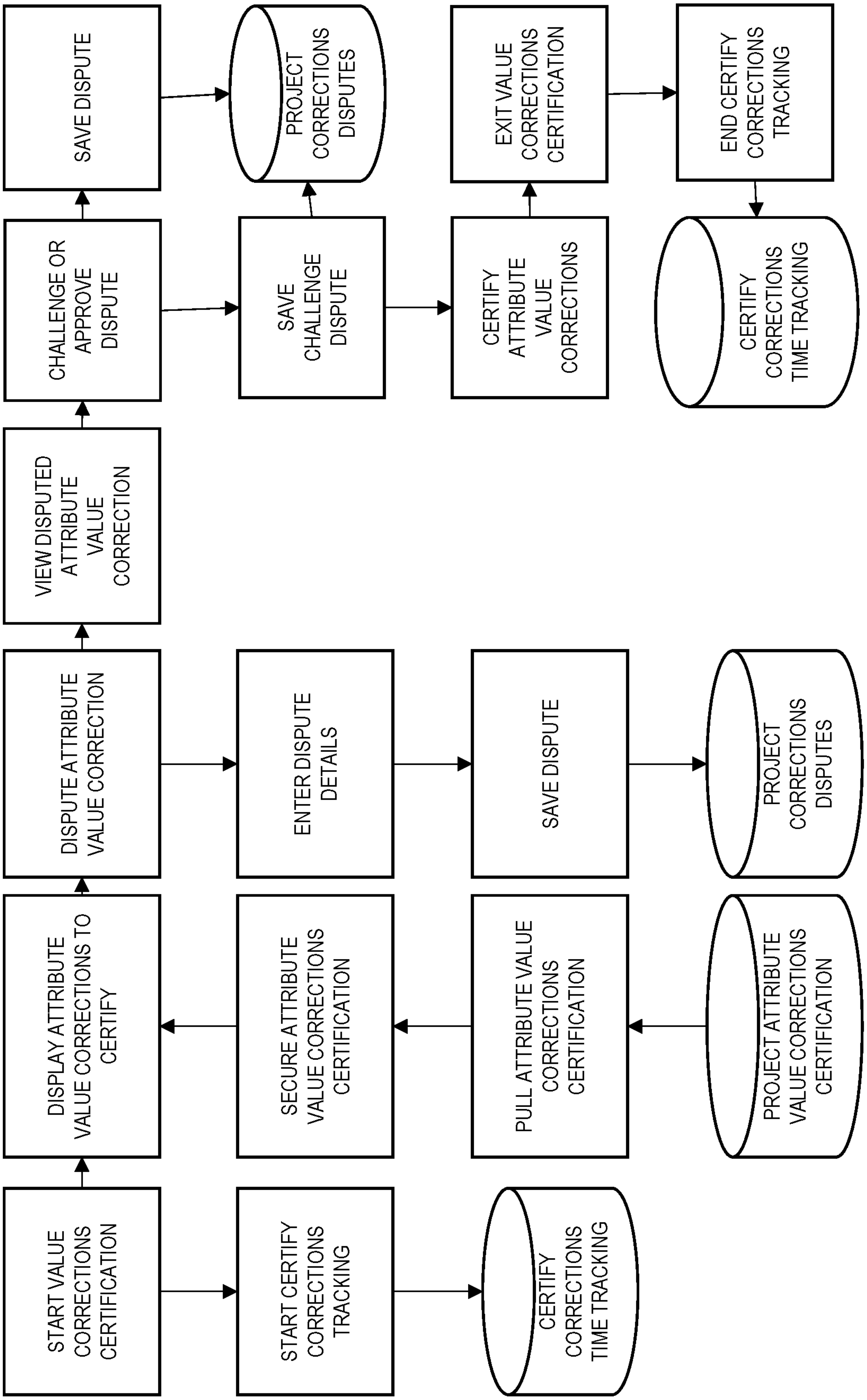
FIG. 8.1

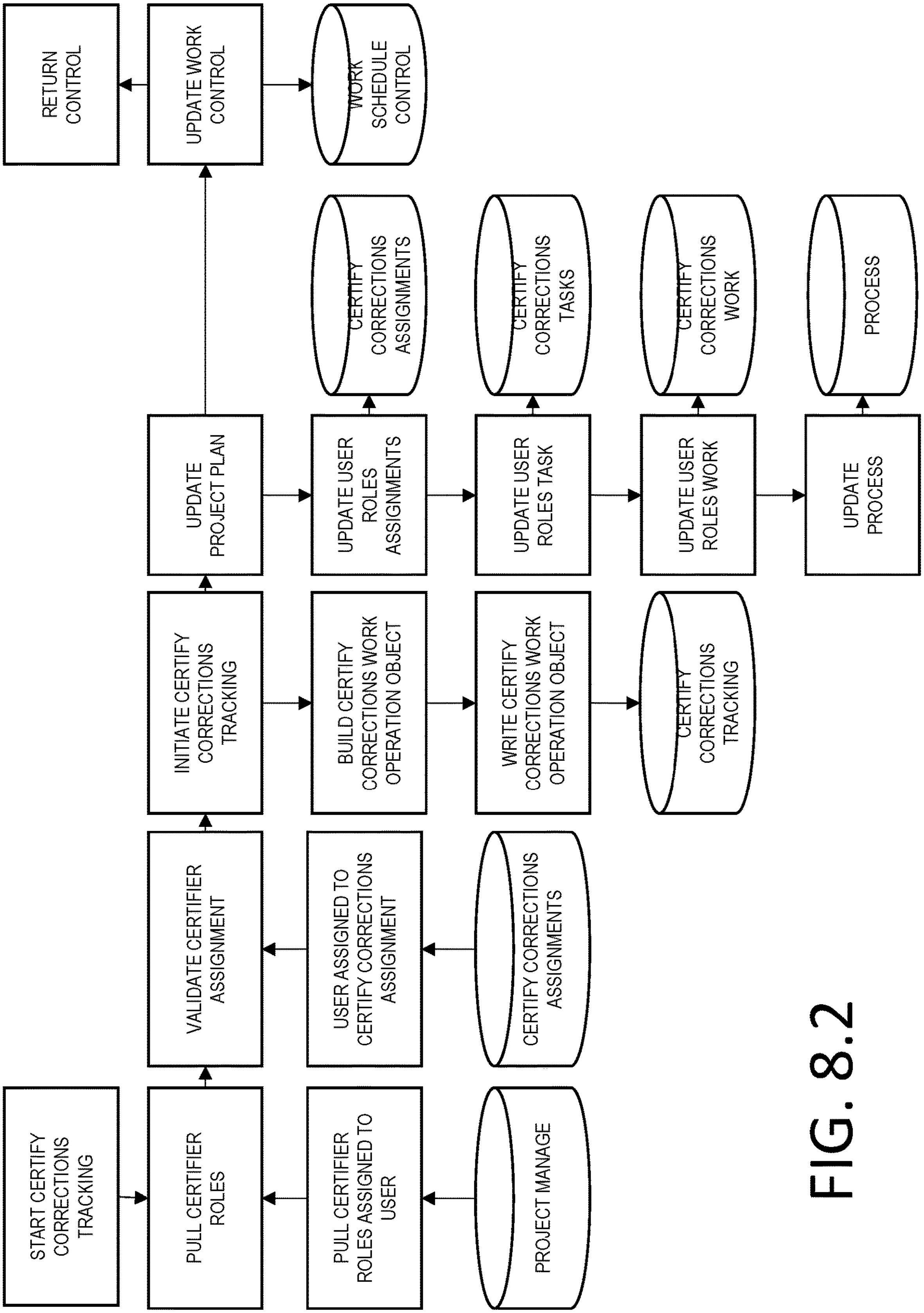
FIG. 8.2

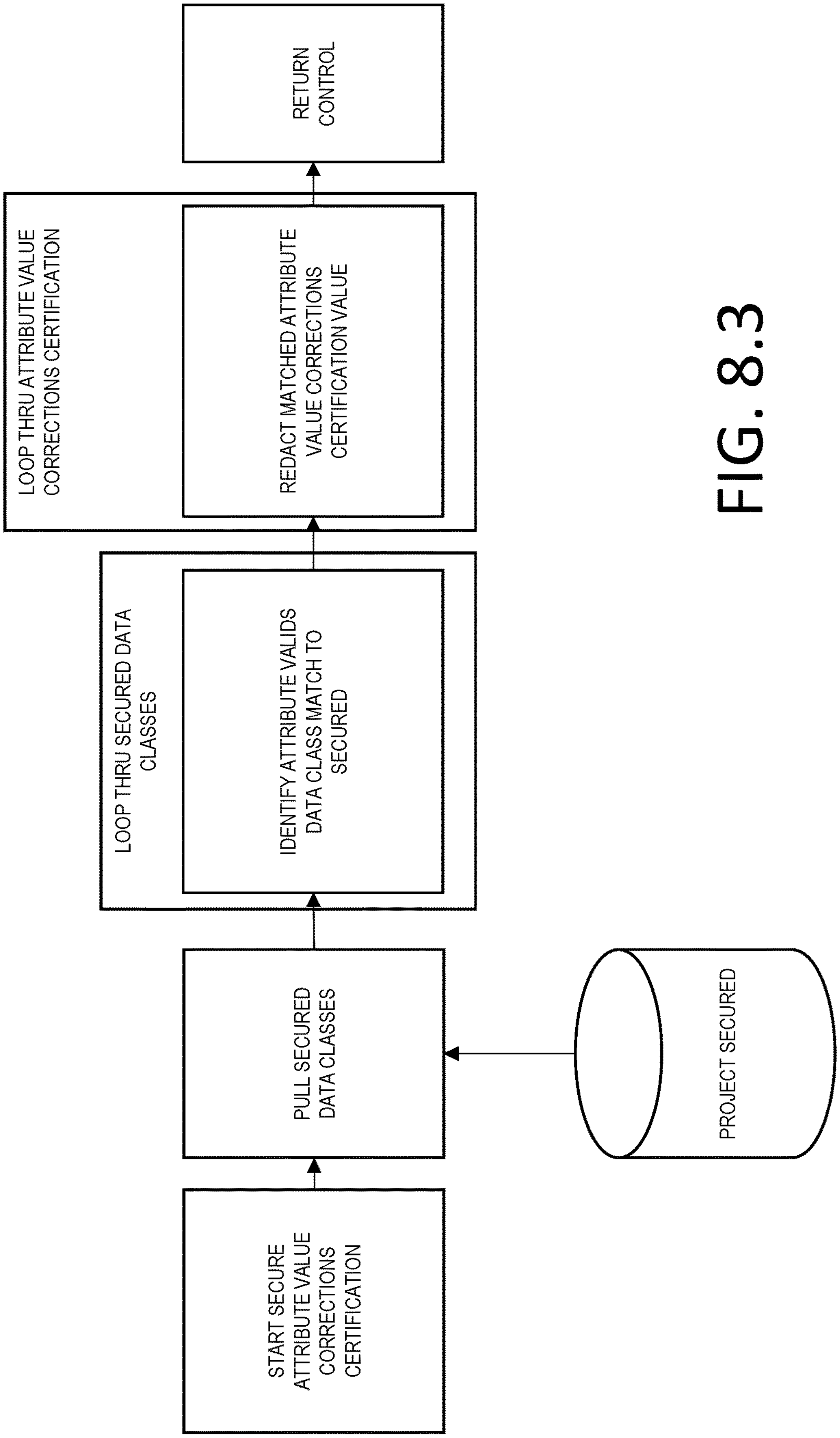
FIG. 8.3

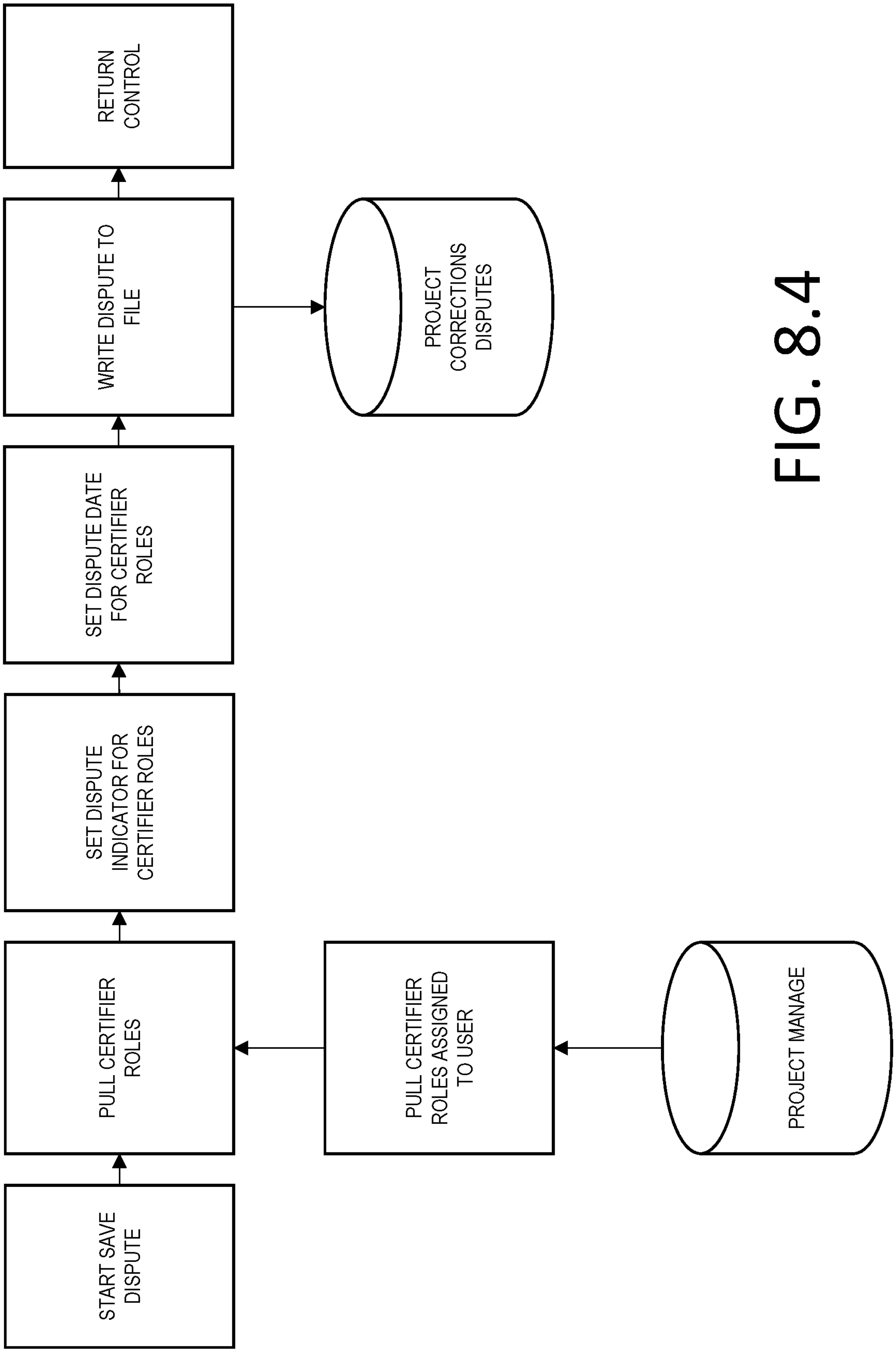
FIG. 8.4

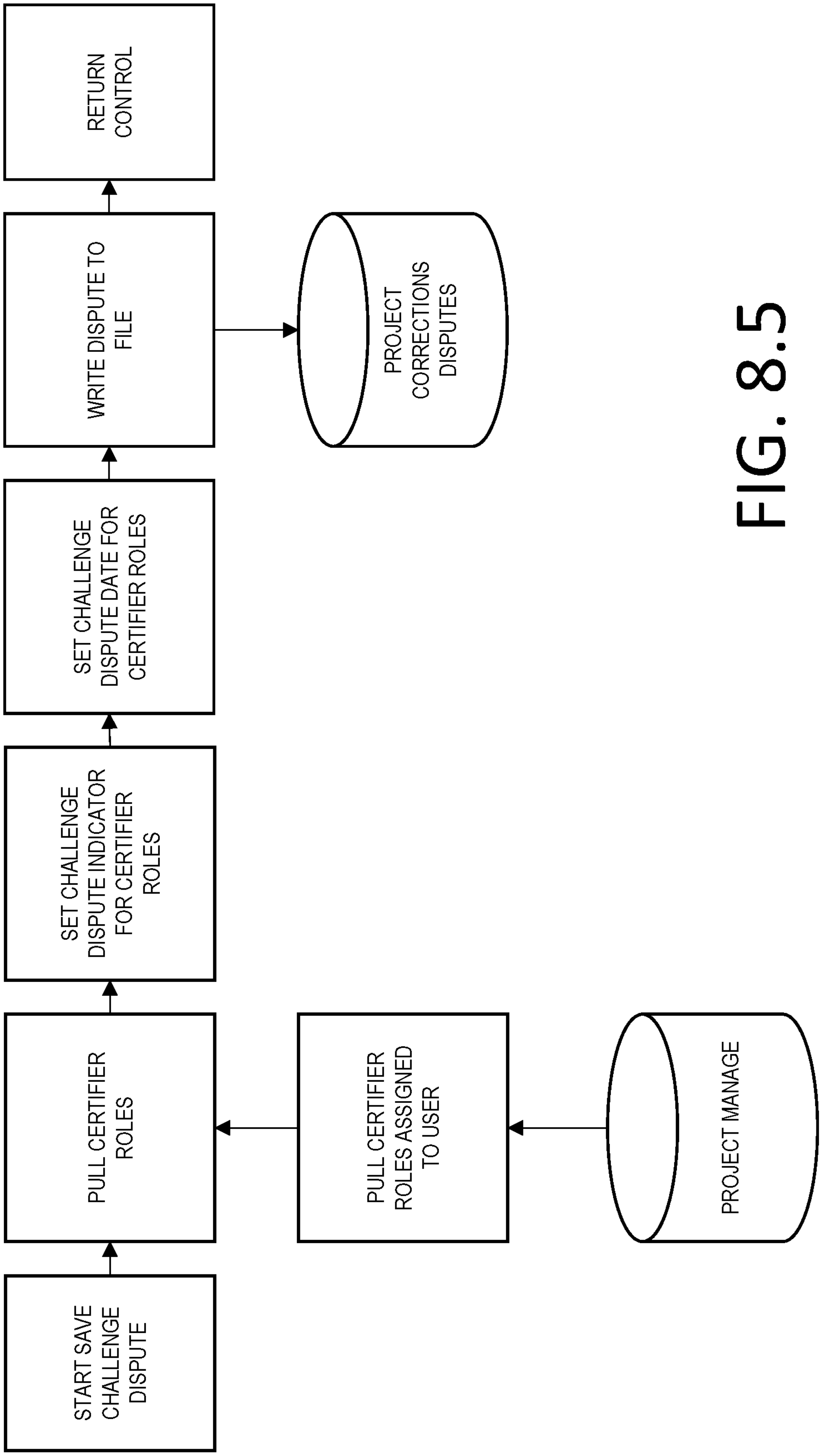
FIG. 8.5

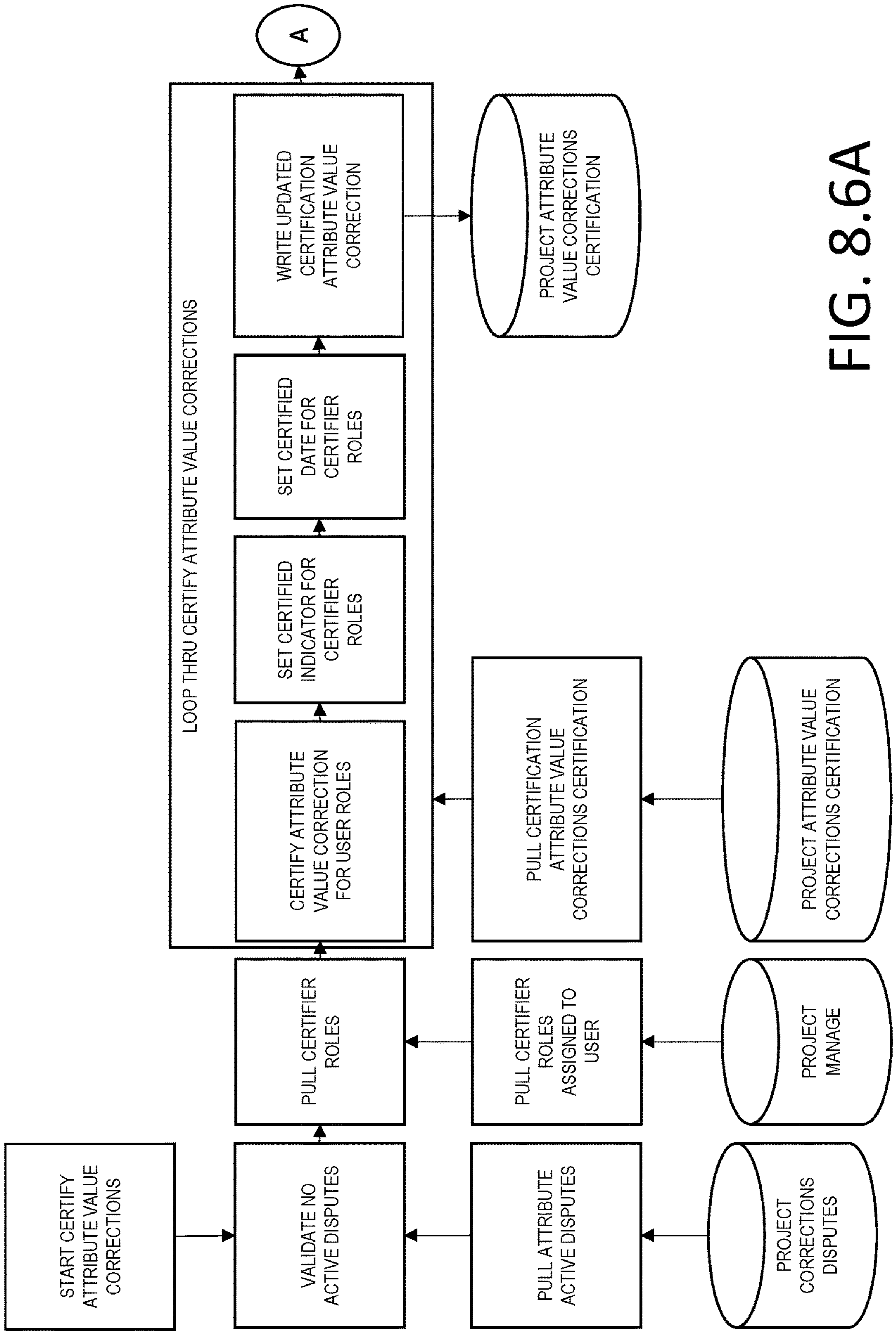
FIG. 8.6A

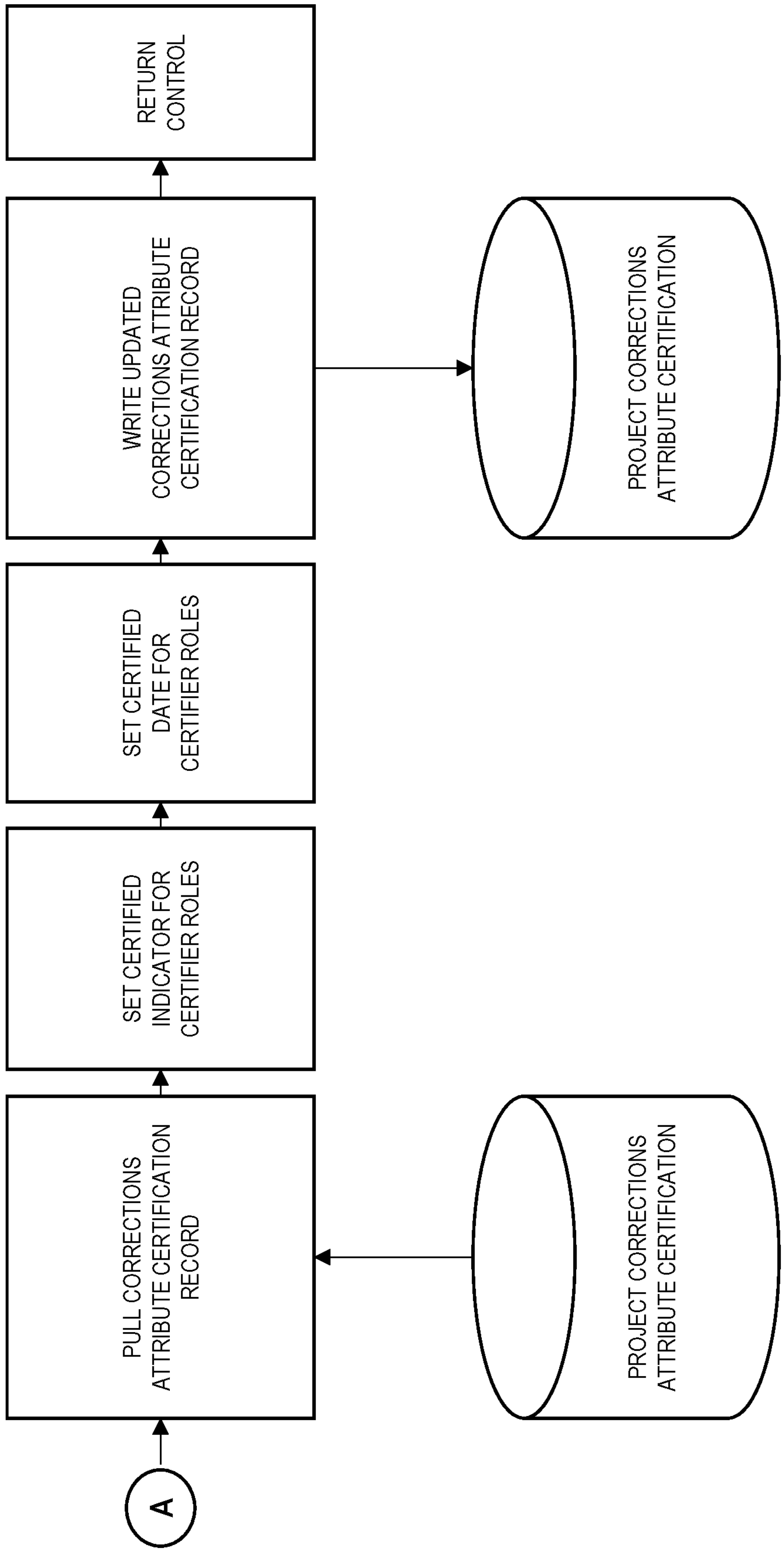
FIG. 8.6B

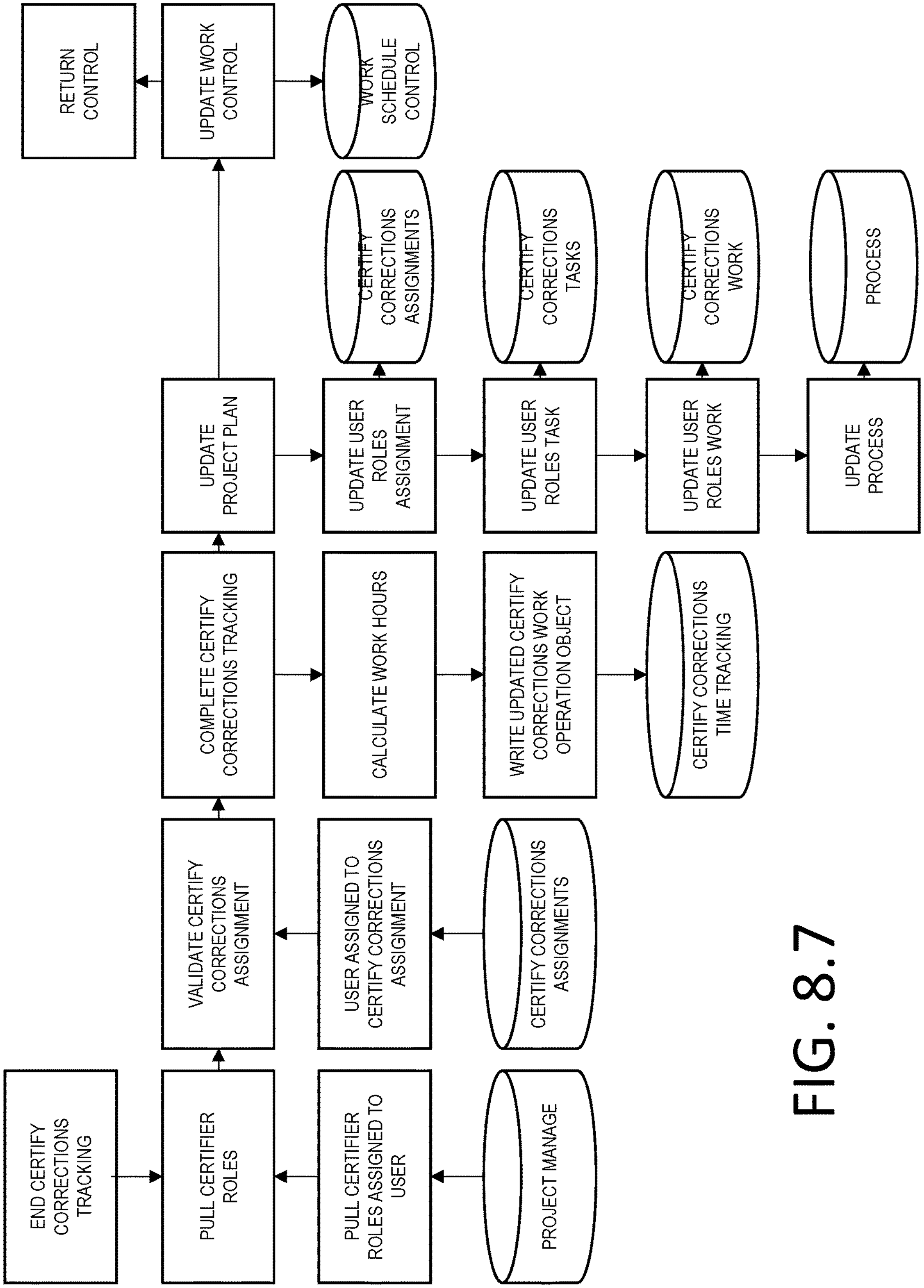
FIG. 8.7

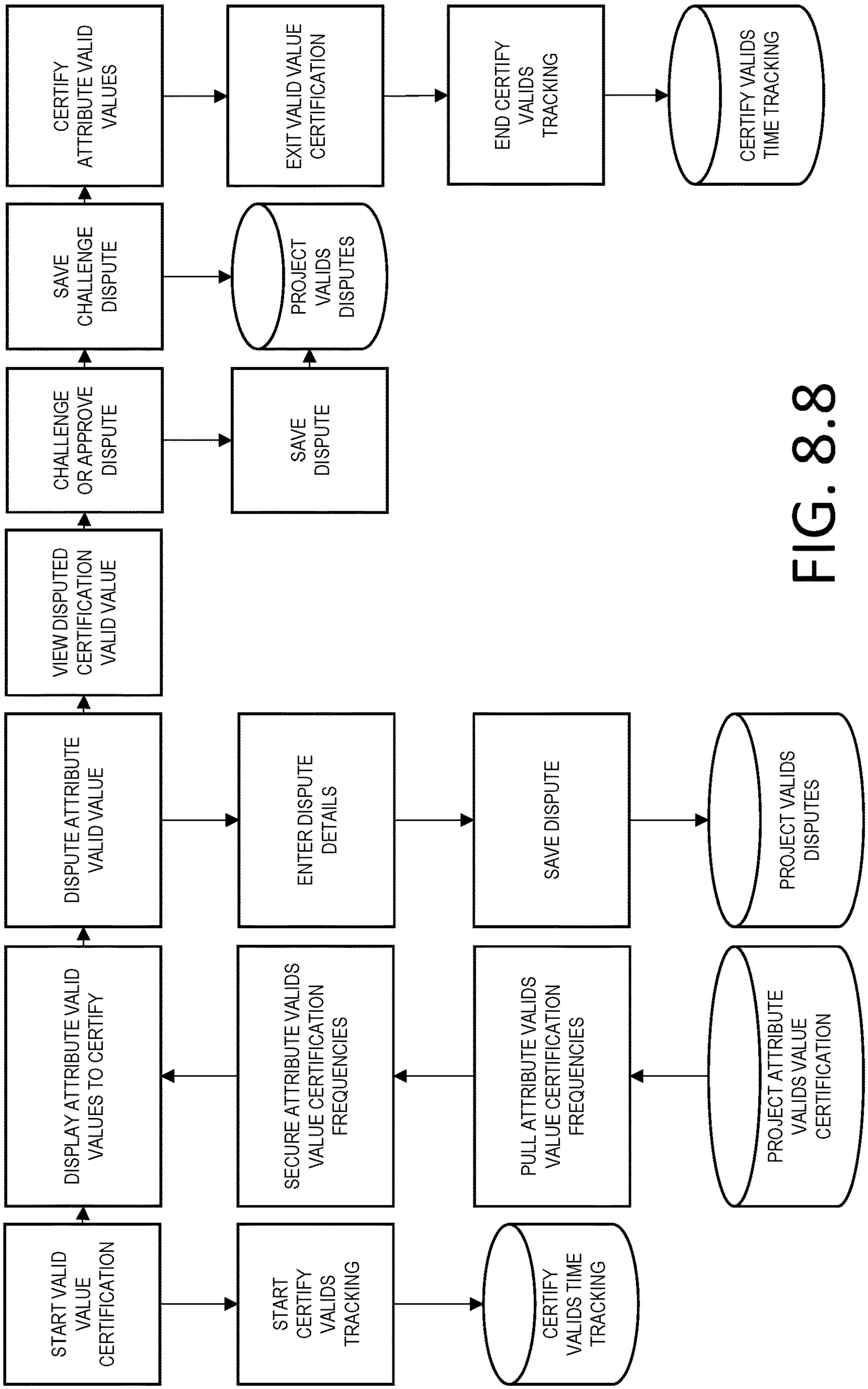

FIG. 8.8

START VALID VALUE CERTIFICATION

START CERTIFY VALIDS TRACKING

CERTIFY VALIDS TIME TRACKING

DISPLAY ATTRIBUTE VALID VALUES TO CERTIFY

SECURE ATTRIBUTE VALIDS VALUE CERTIFICATION FREQUENCIES

PULL ATTRIBUTE VALIDS VALUE CERTIFICATION FREQUENCIES

PROJECT ATTRIBUTE VALIDS VALUE CERTIFICATION

DISPUTE ATTRIBUTE VALID VALUE

ENTER DISPUTE DETAILS

SAVE DISPUTE

PROJECT VALIDS DISPUTES

VIEW DISPUTED CERTIFICATION VALID VALUE

CHALLENGE OR APPROVE DISPUTE

SAVE DISPUTE

SAVE CHALLENGE DISPUTE

PROJECT VALIDS DISPUTES

CERTIFY ATTRIBUTE VALID VALUES

EXIT VALID VALUE CERTIFICATION

END CERTIFY VALIDS TRACKING

CERTIFY VALIDS TIME TRACKING

FIG. 8.8

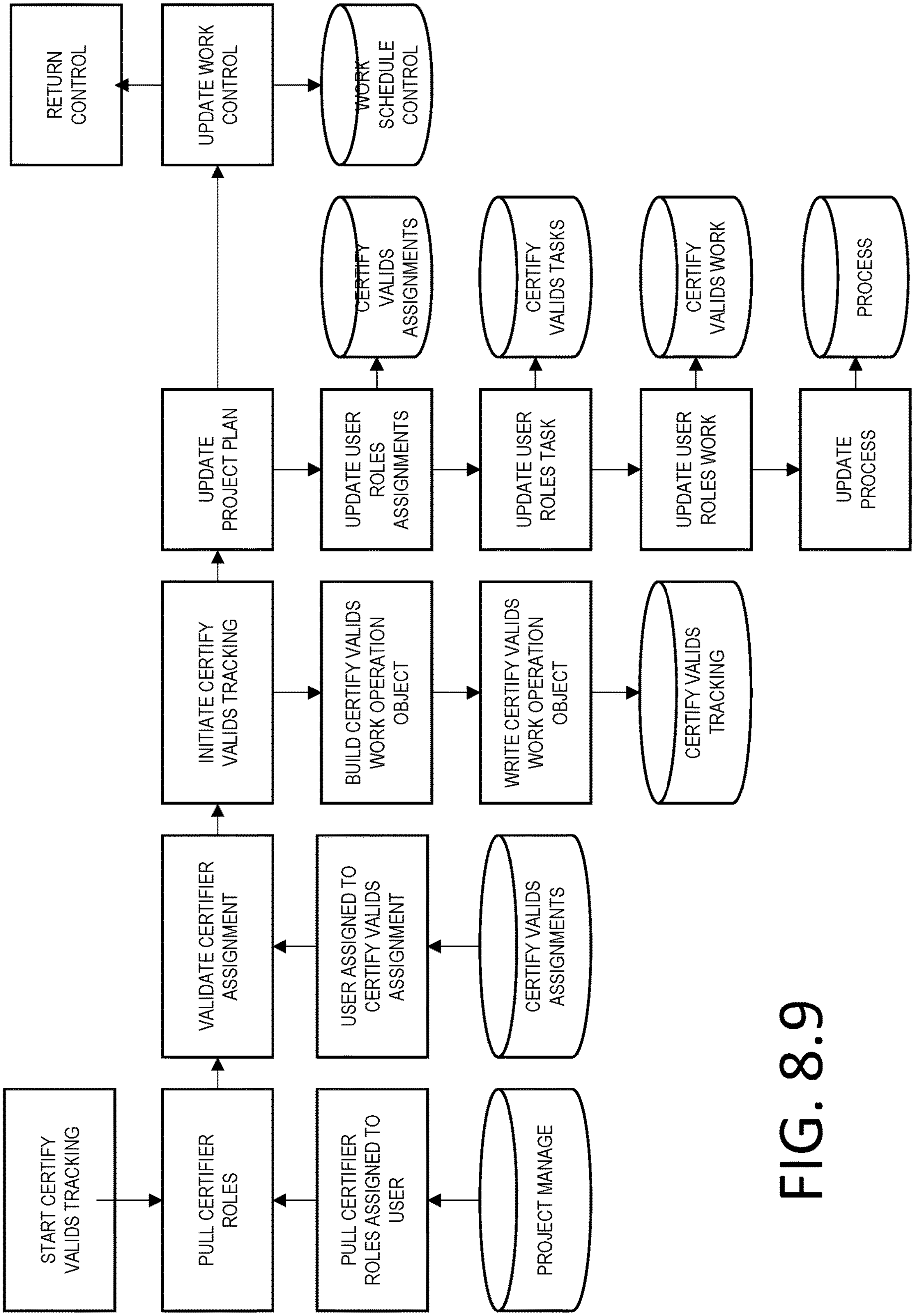
FIG. 8.9

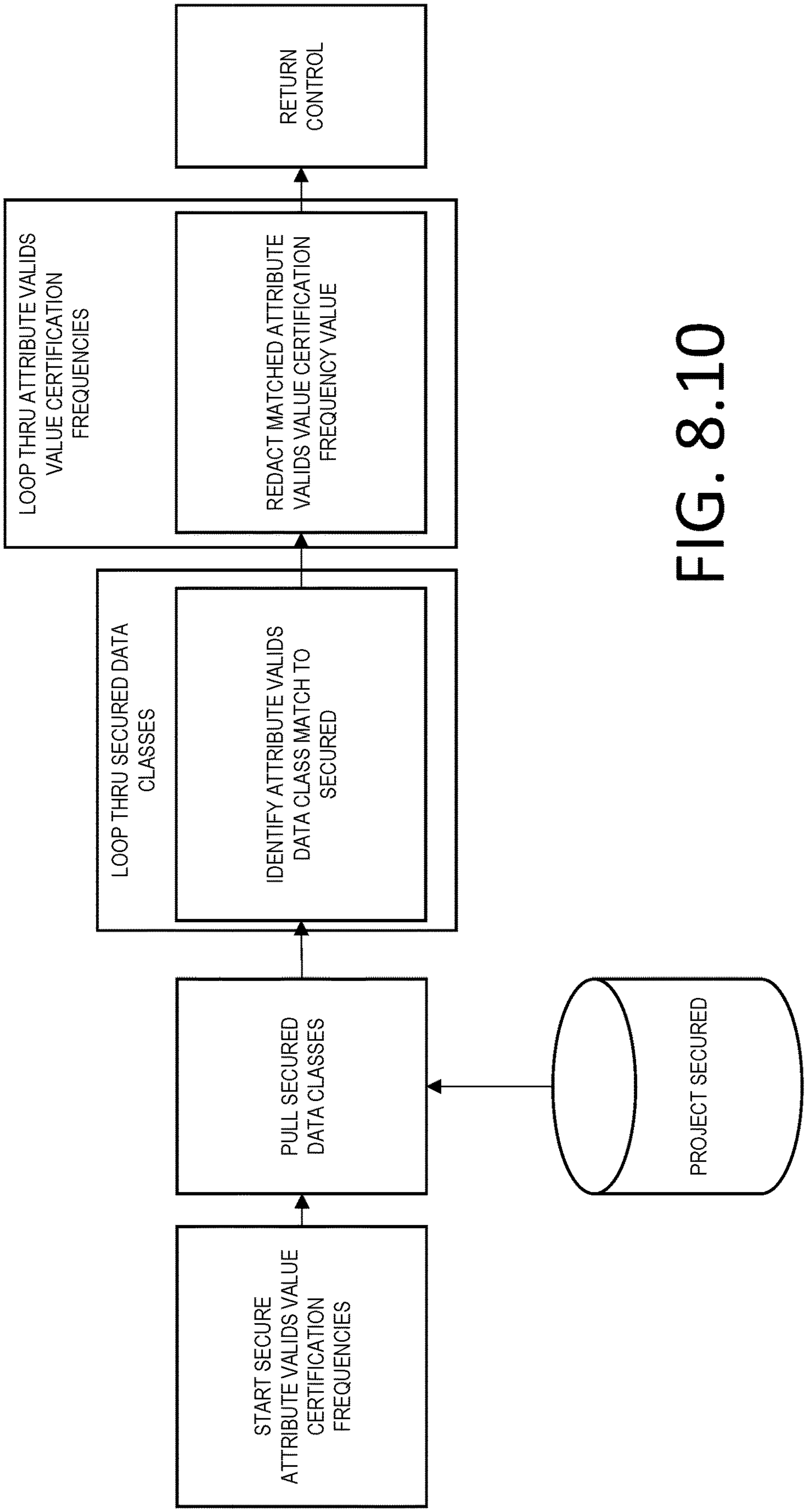
FIG. 8.10

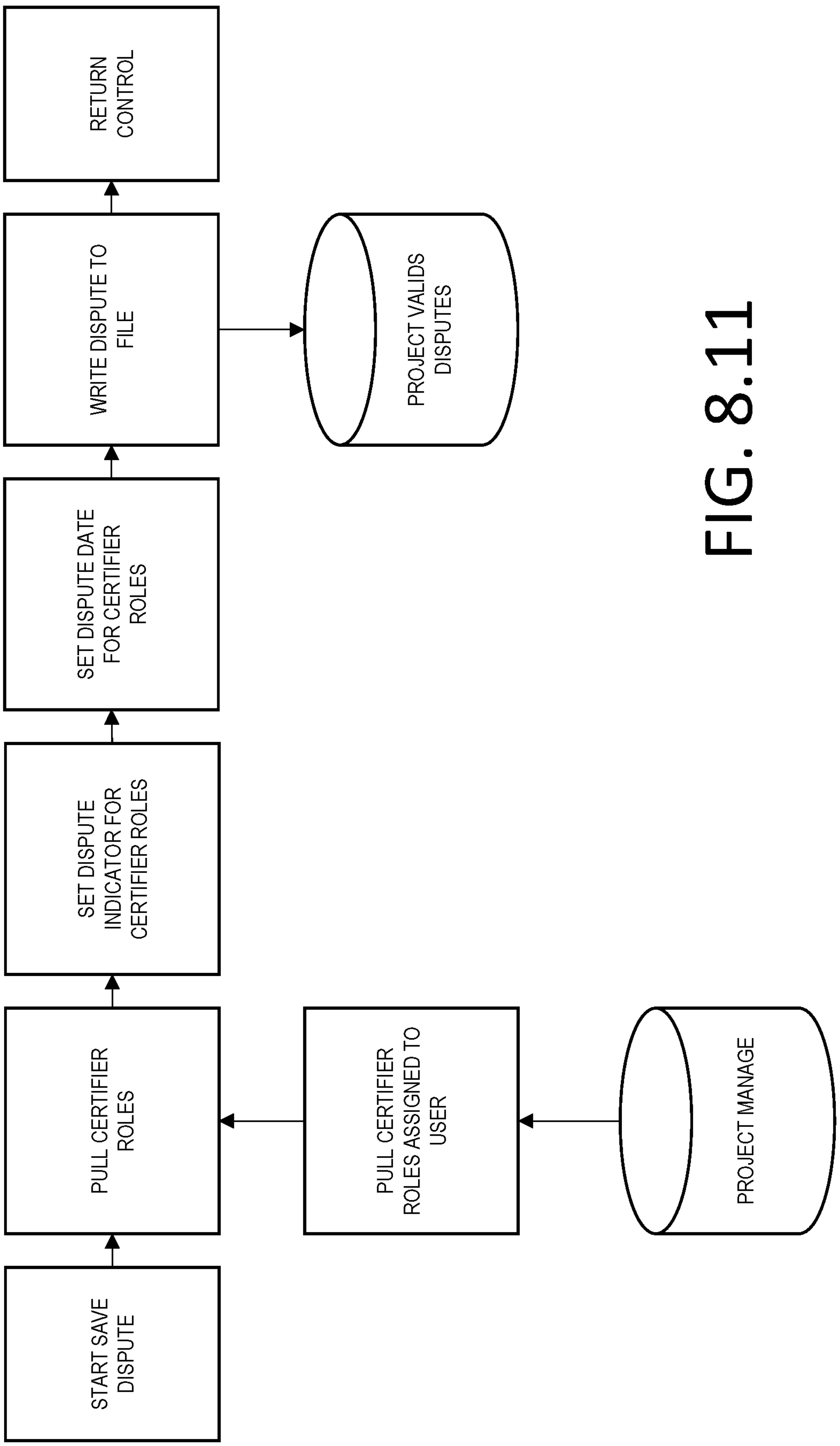
FIG. 8.11

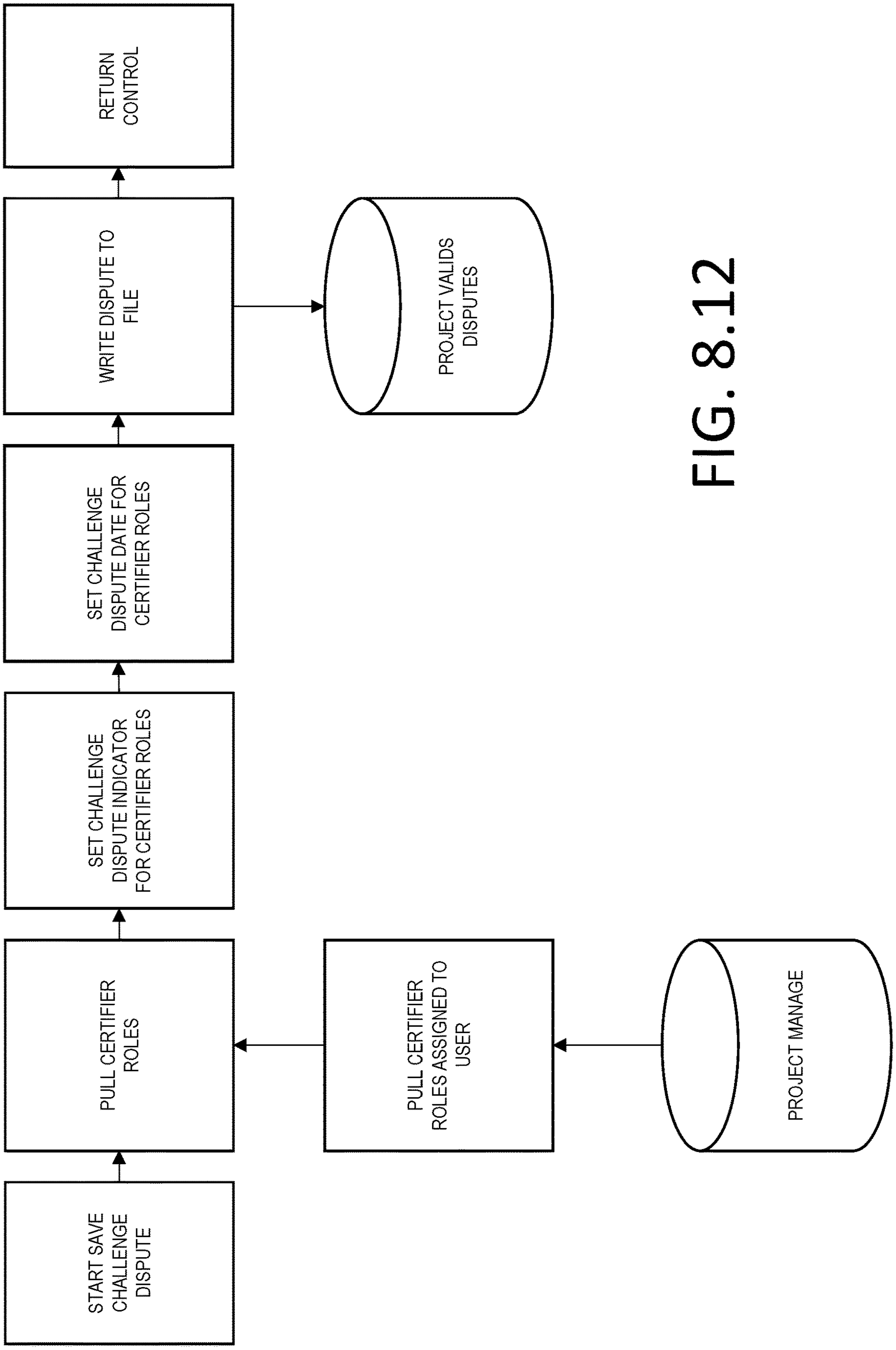
FIG. 8.12

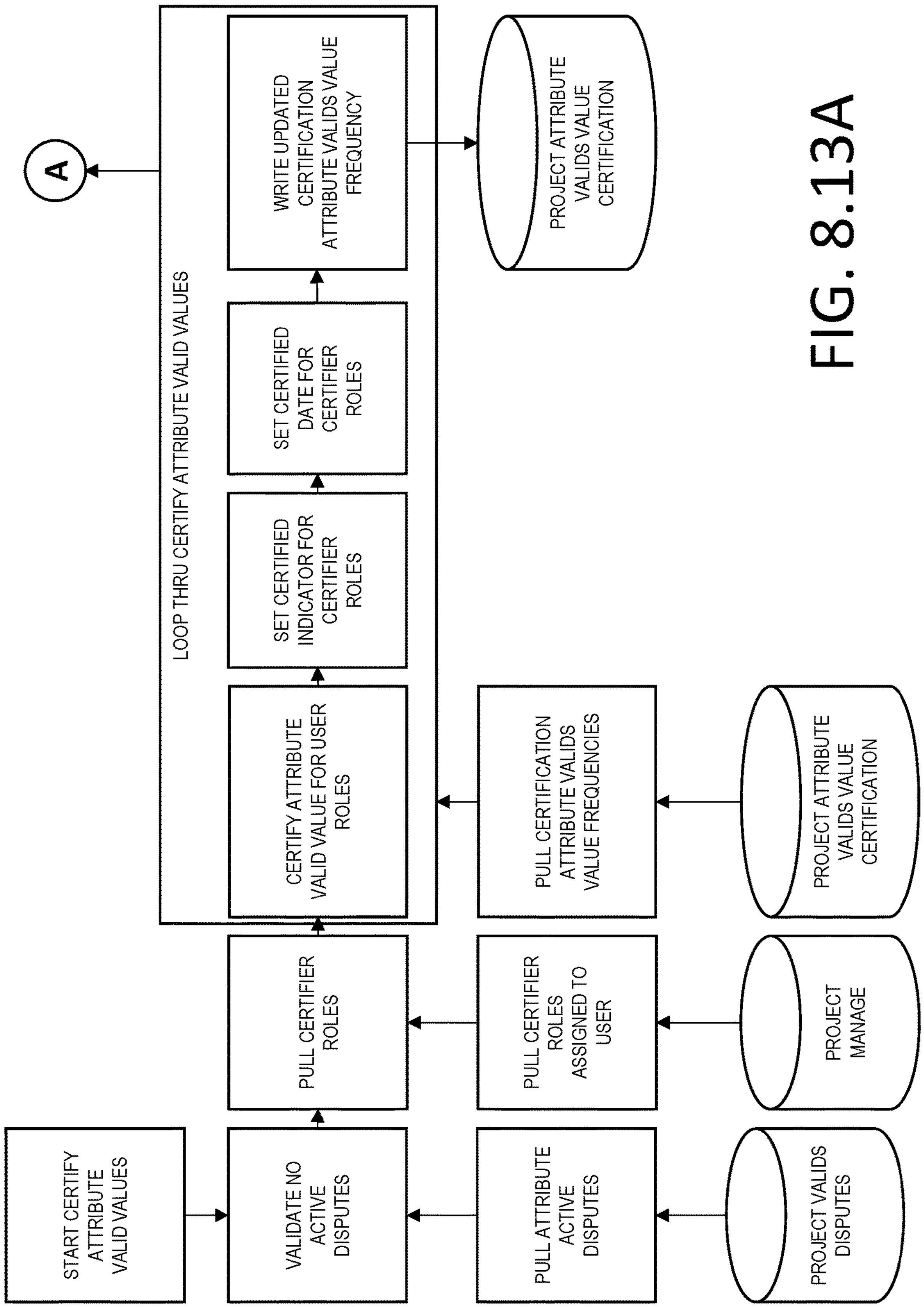
FIG. 8.13A

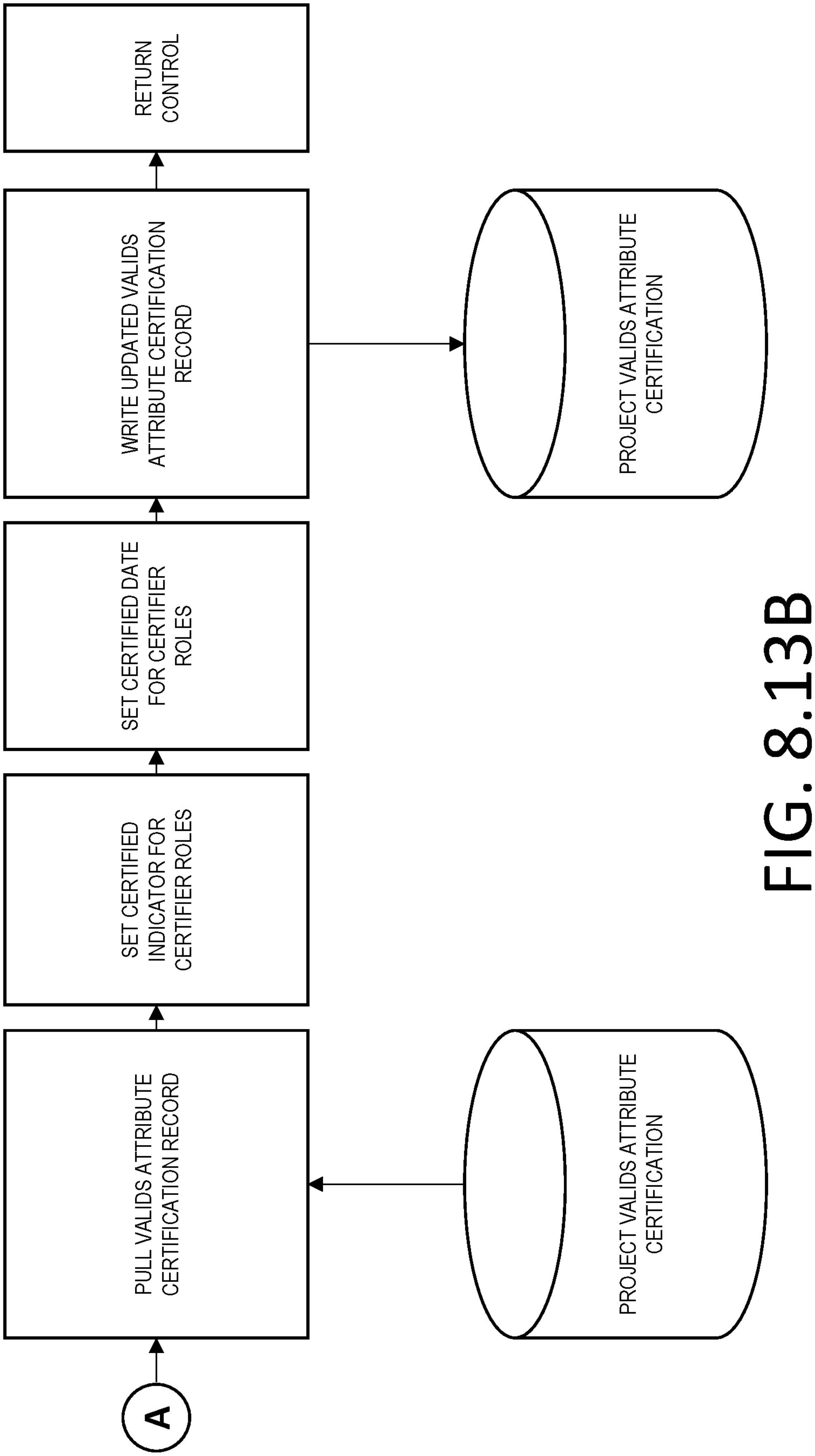
FIG. 8.13B

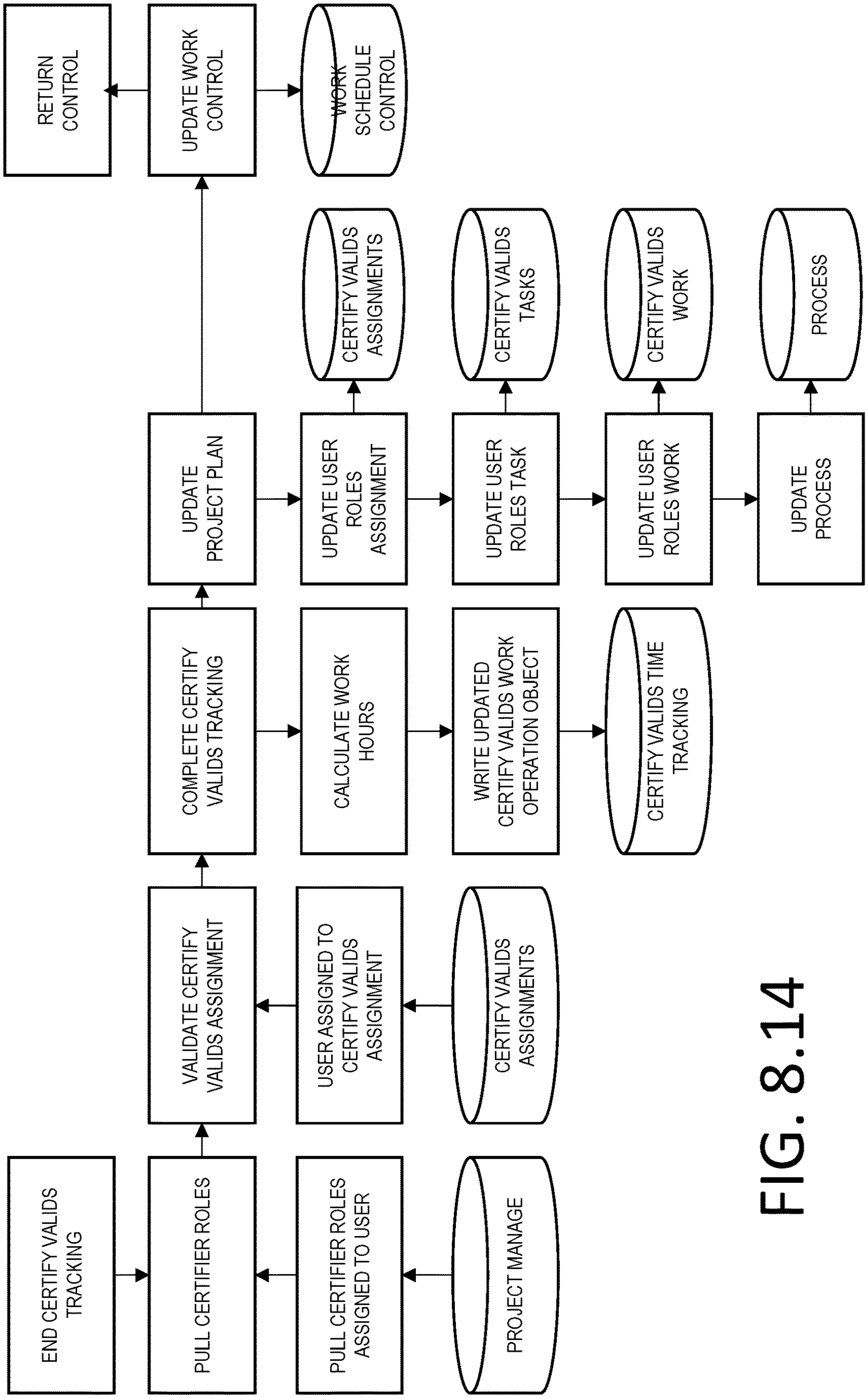
FIG. 8.14

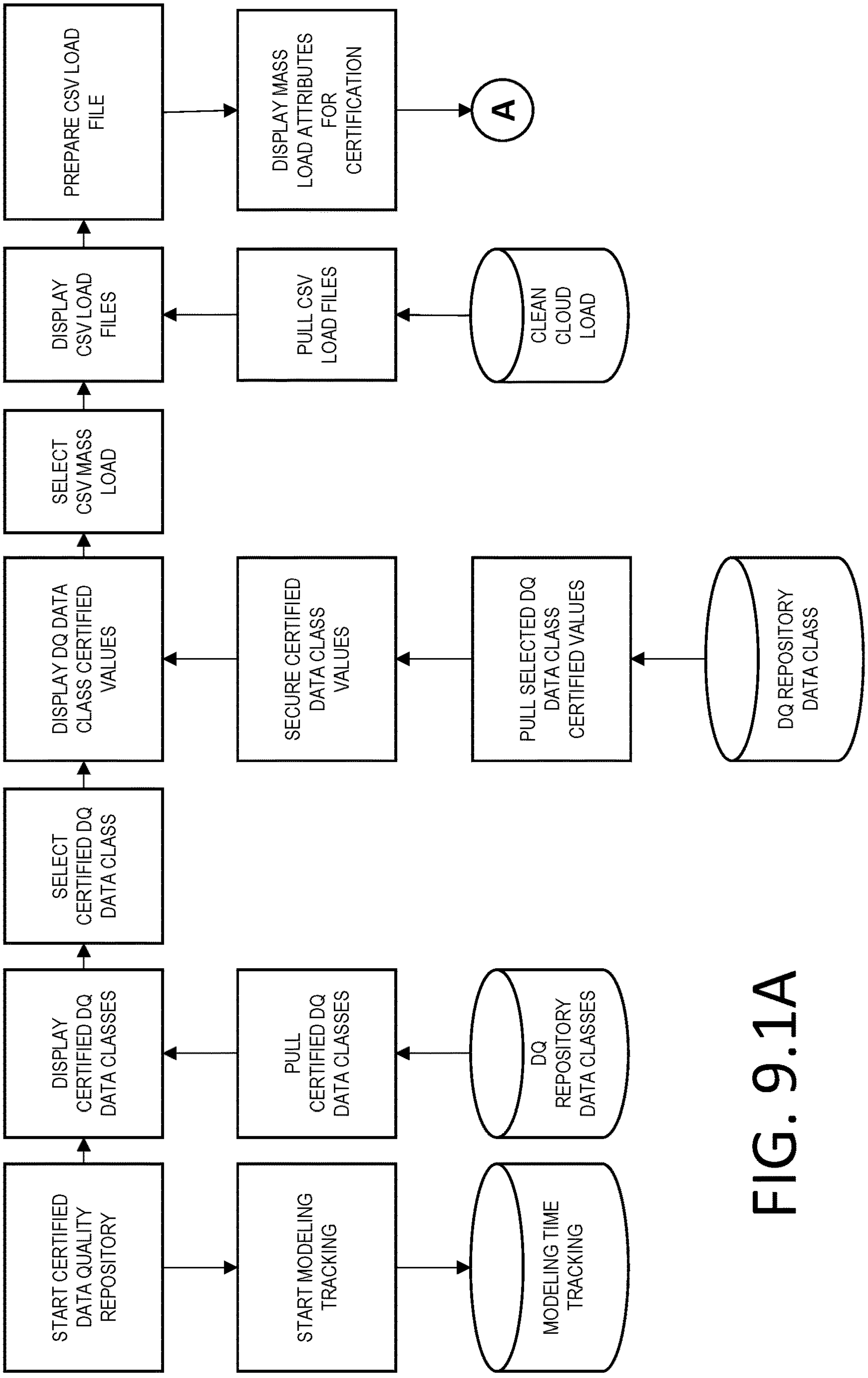
FIG. 9.1A

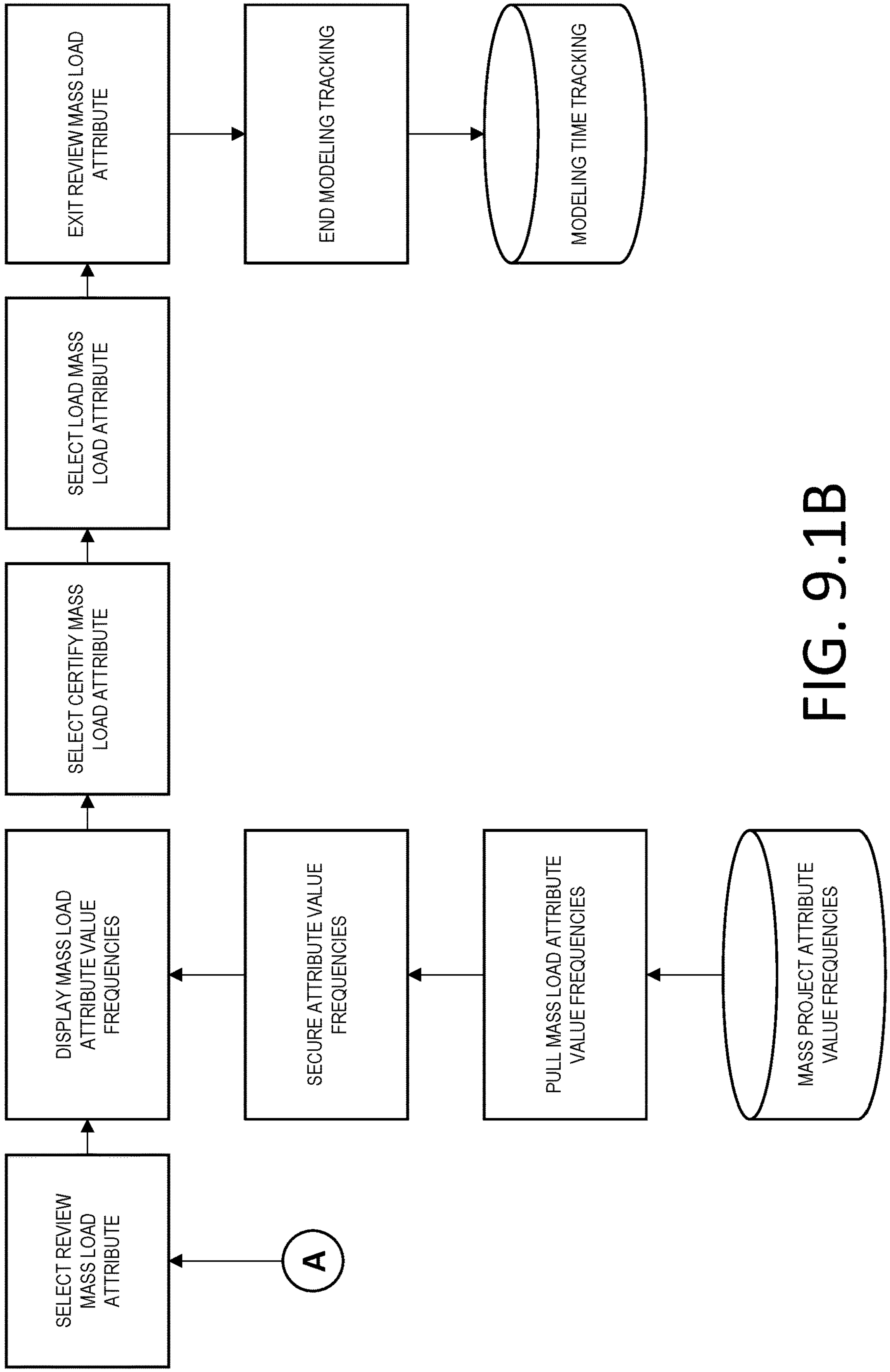
FIG. 9.1B

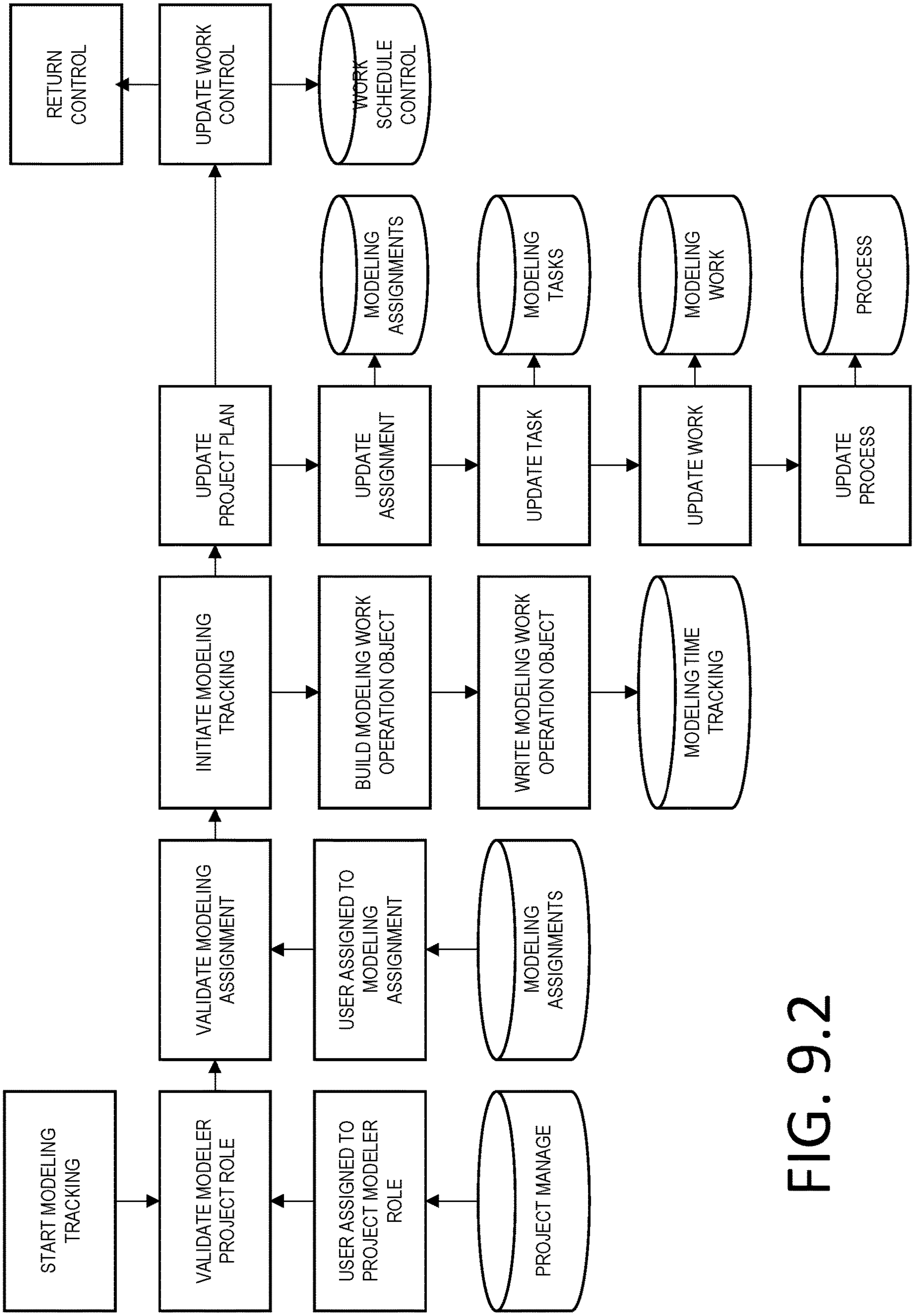
FIG. 9.2

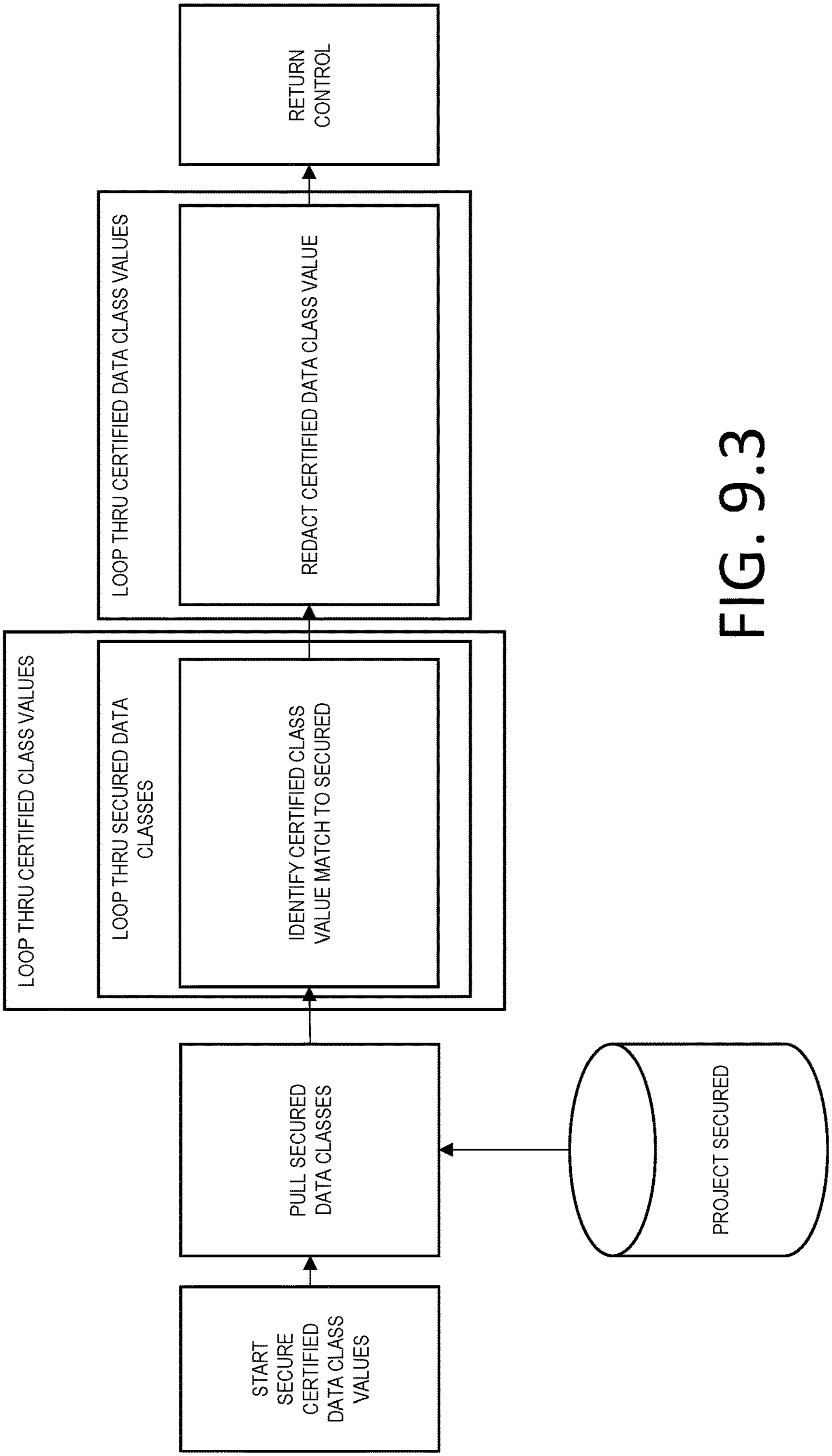
FIG. 9.3

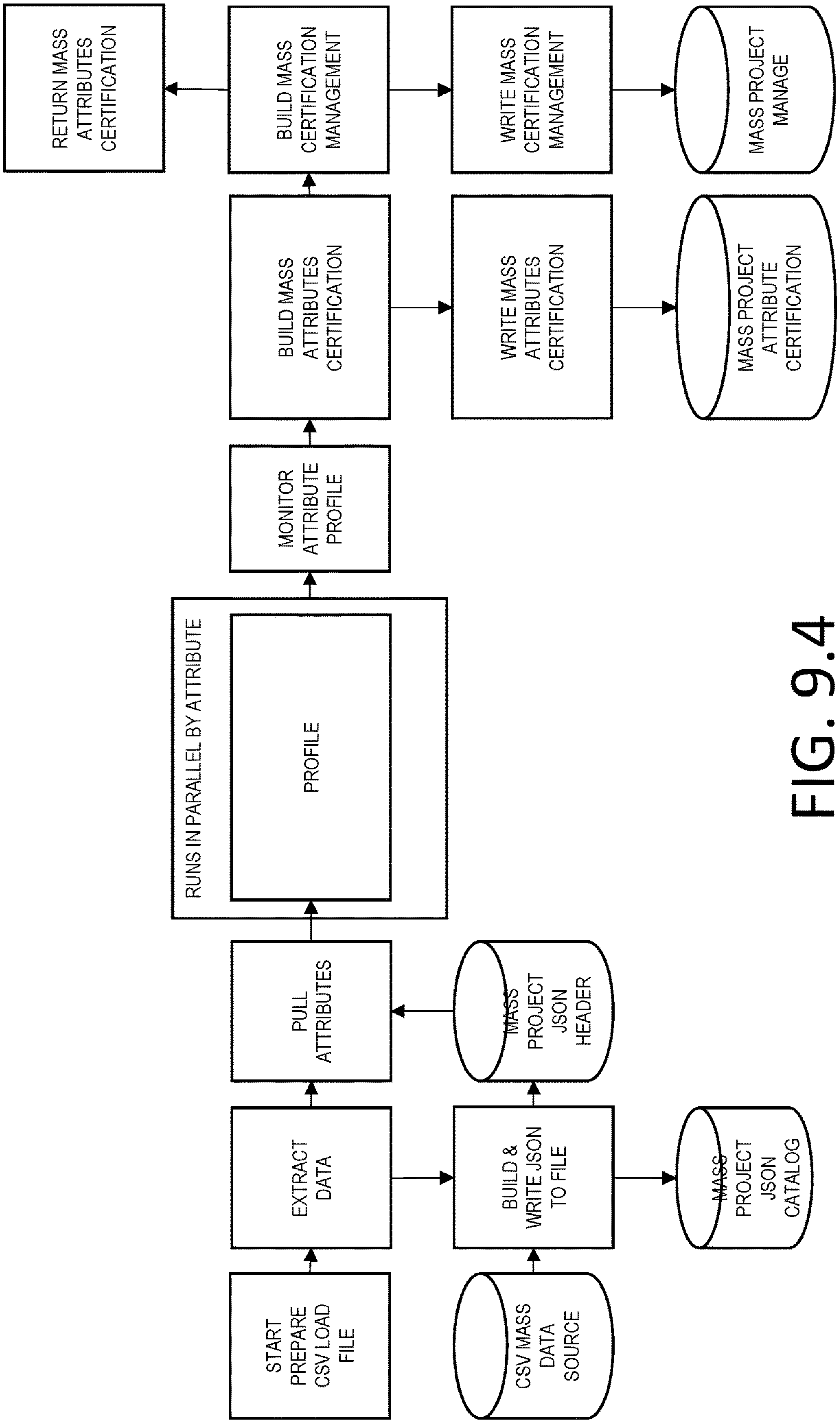
FIG. 9.4

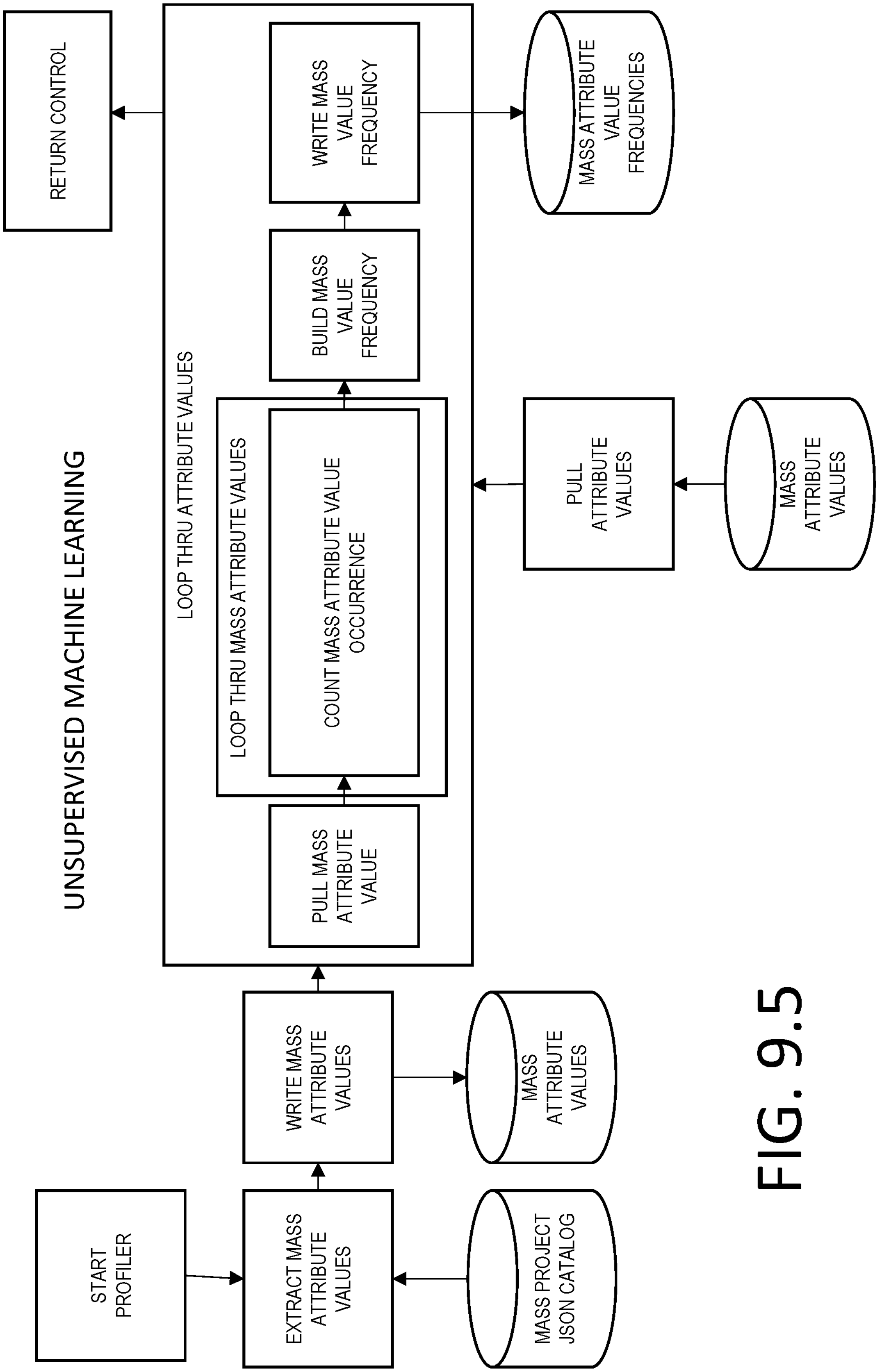
FIG. 9.5

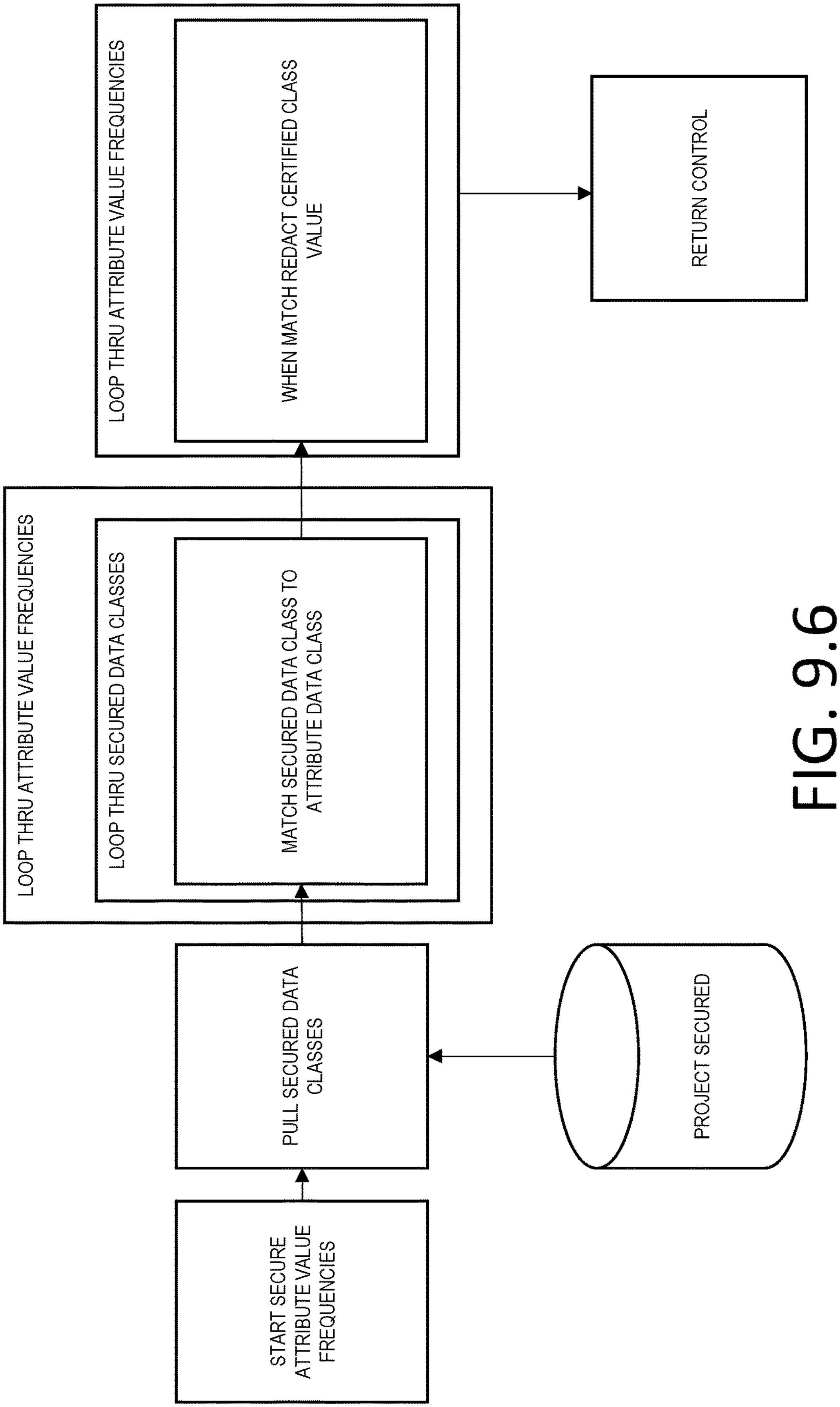
FIG. 9.6

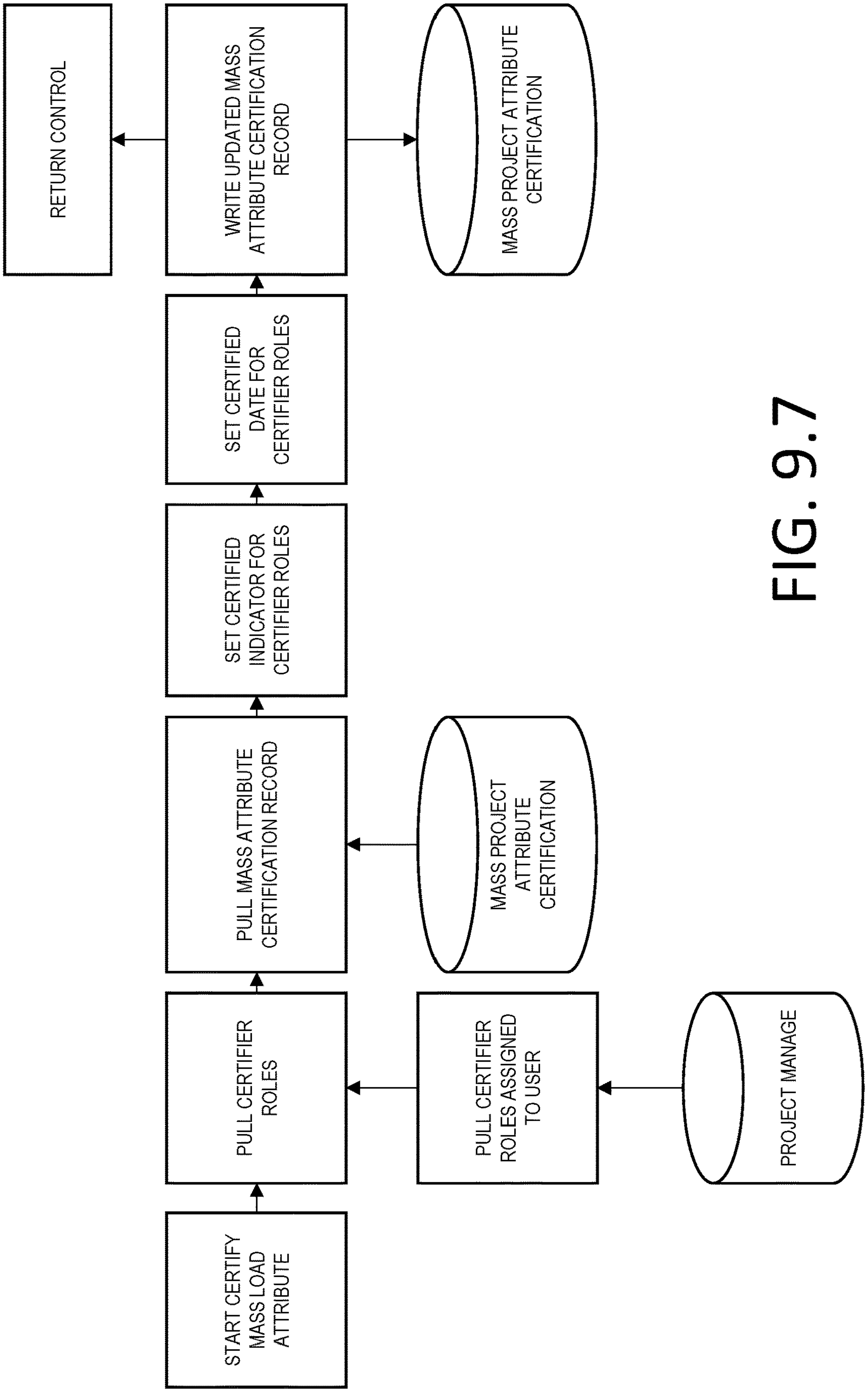

FIG. 9.7

START CERTIFY MASS LOAD ATTRIBUTE

PULL CERTIFIER ROLES

PULL CERTIFIER ROLES ASSIGNED TO USER

PROJECT MANAGE

PULL MASS ATTRIBUTE CERTIFICATION RECORD

MASS PROJECT ATTRIBUTE CERTIFICATION

SET CERTIFIED INDICATOR FOR CERTIFIER ROLES

SET CERTIFIED DATE FOR CERTIFIER ROLES

WRITE UPDATED MASS ATTRIBUTE CERTIFICATION RECORD

MASS PROJECT ATTRIBUTE CERTIFICATION

RETURN CONTROL

FIG. 9.7

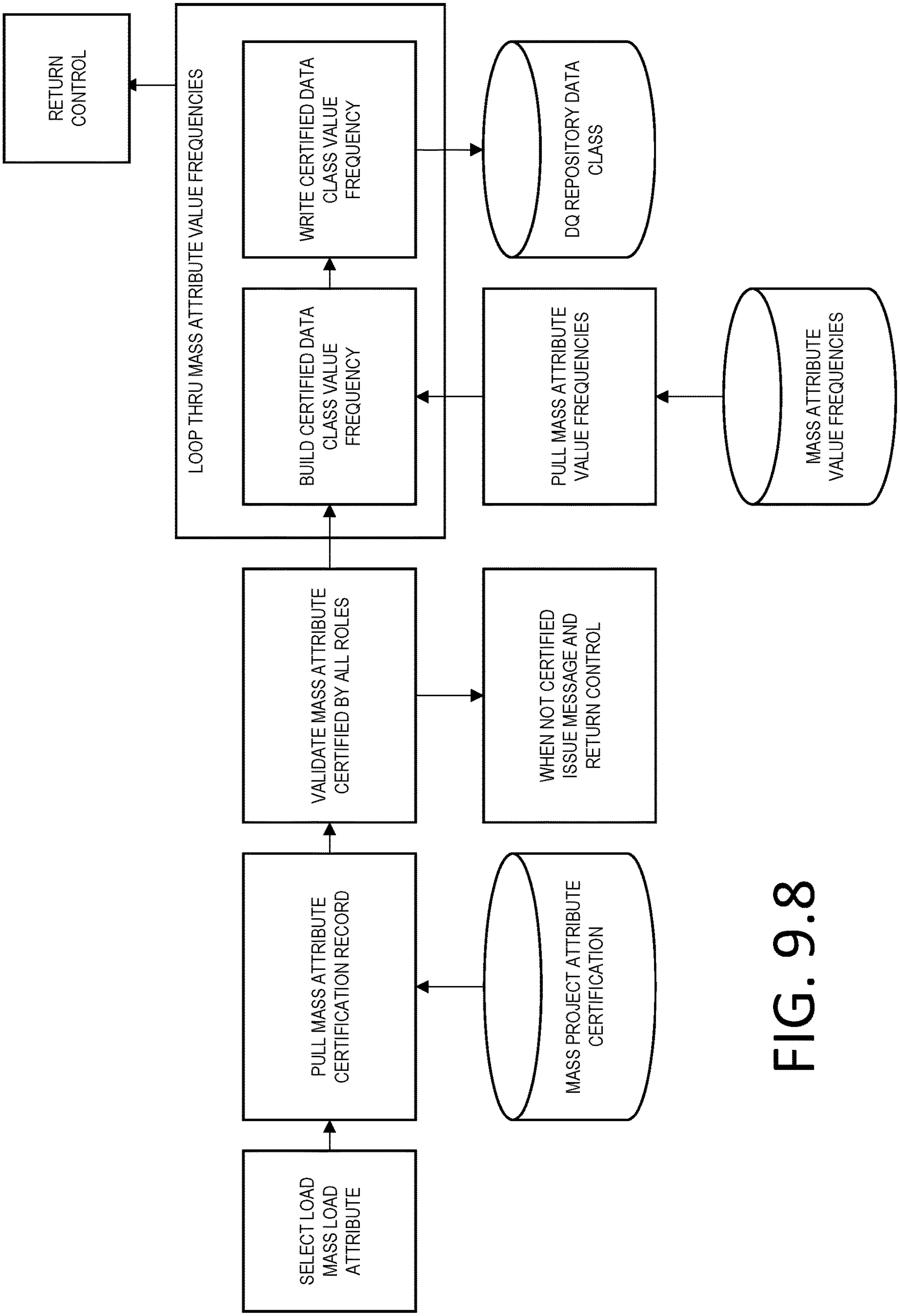
FIG. 9.8

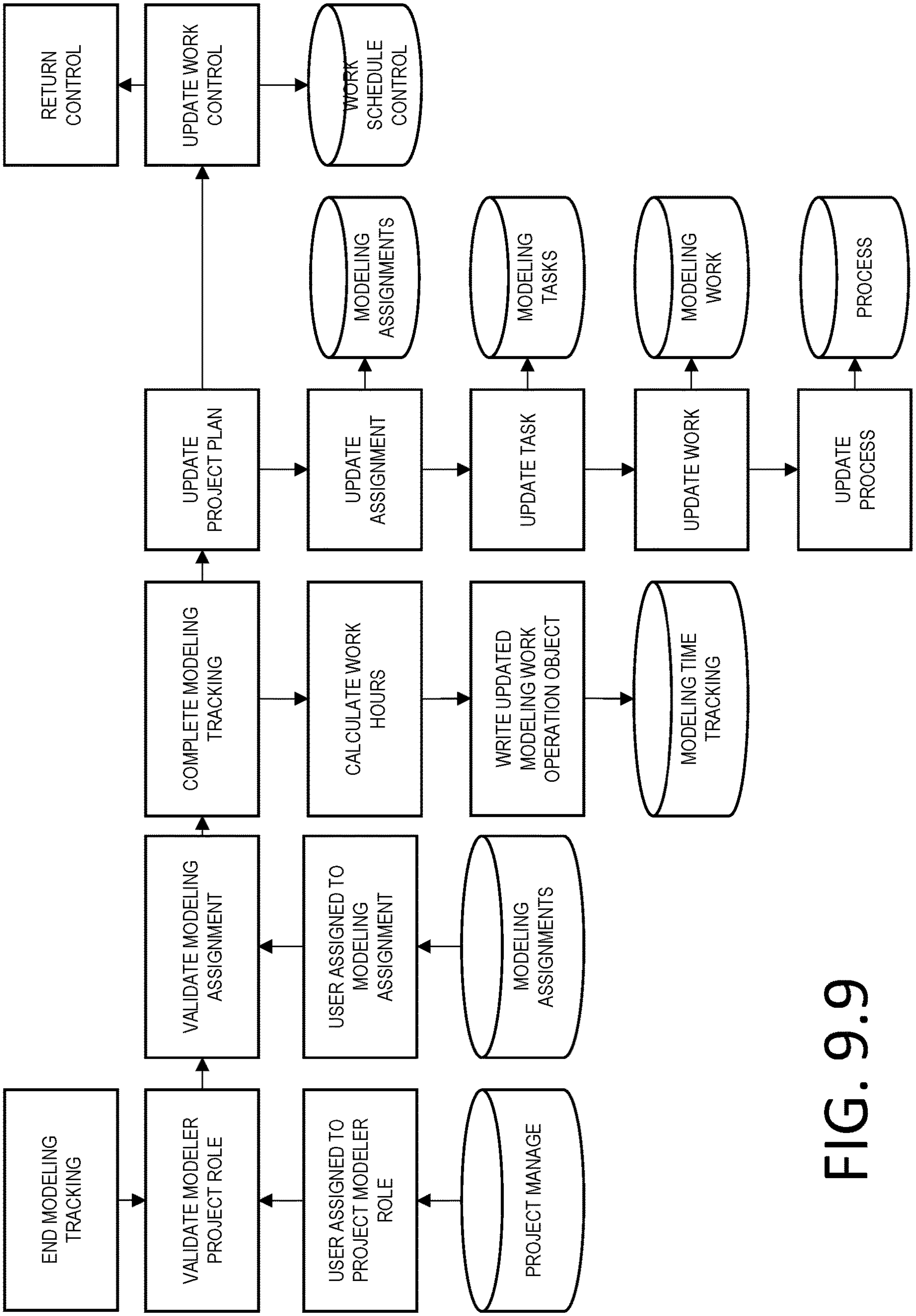
FIG. 9.9

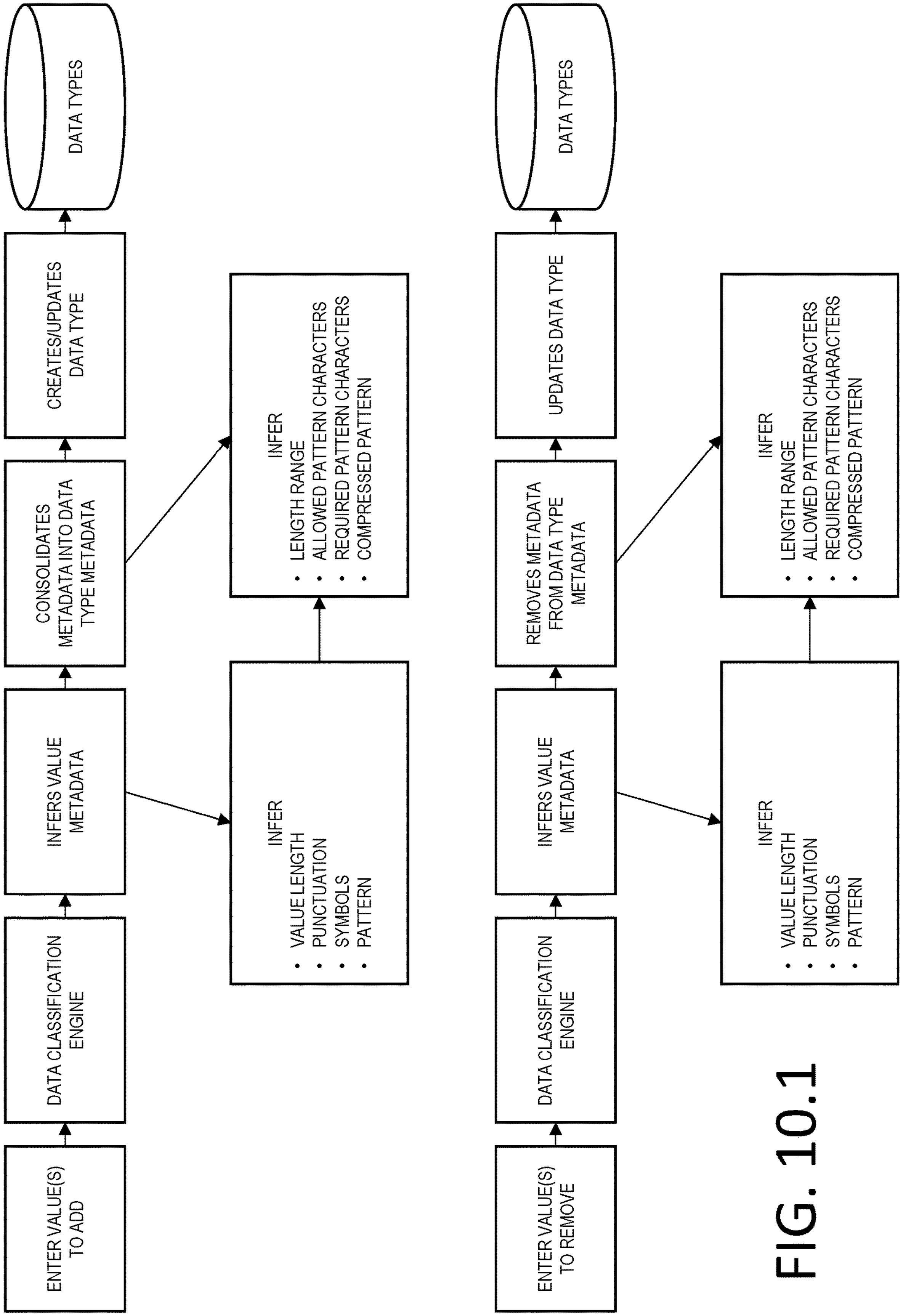
FIG. 10.1

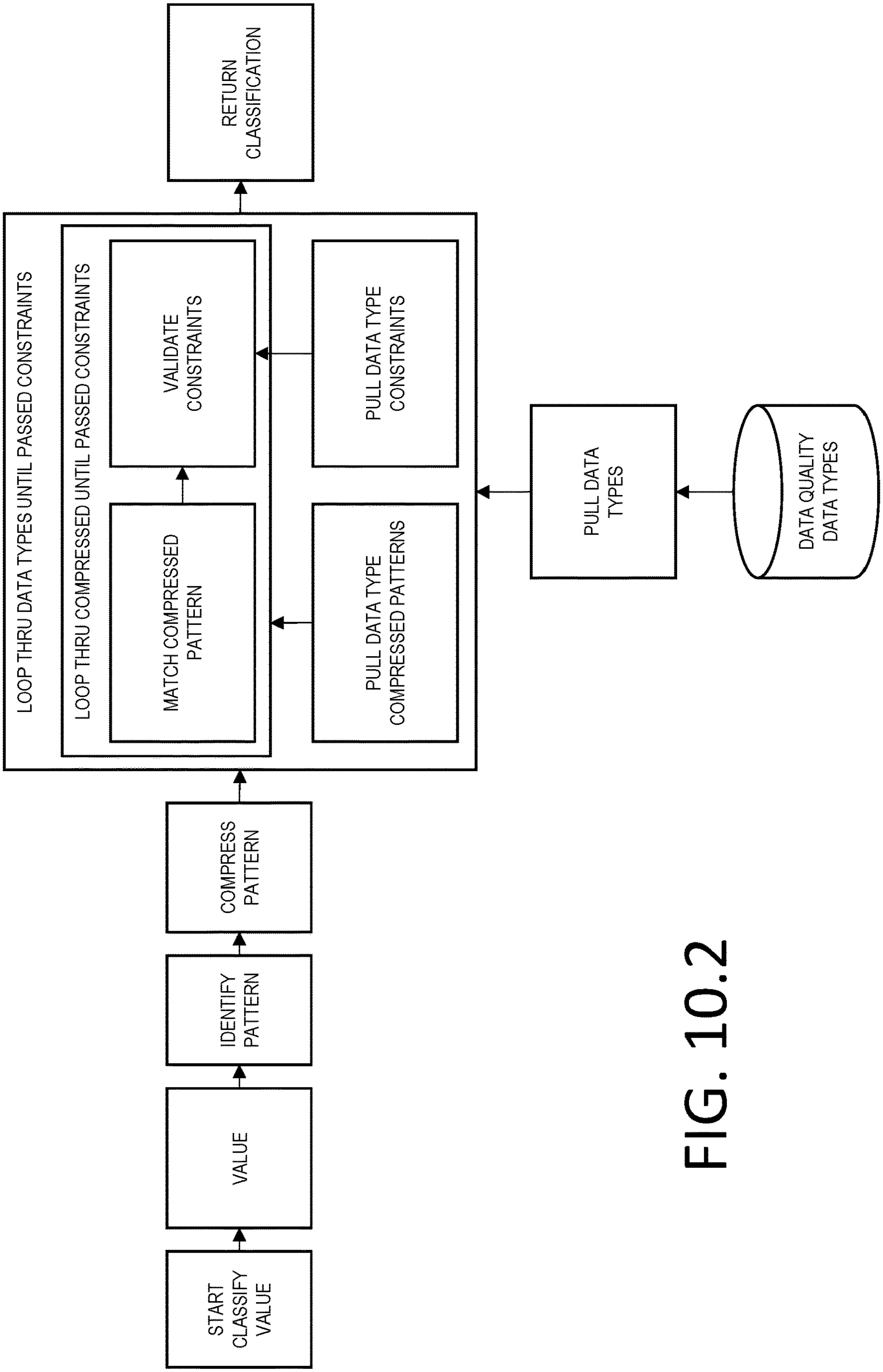
FIG. 10.2

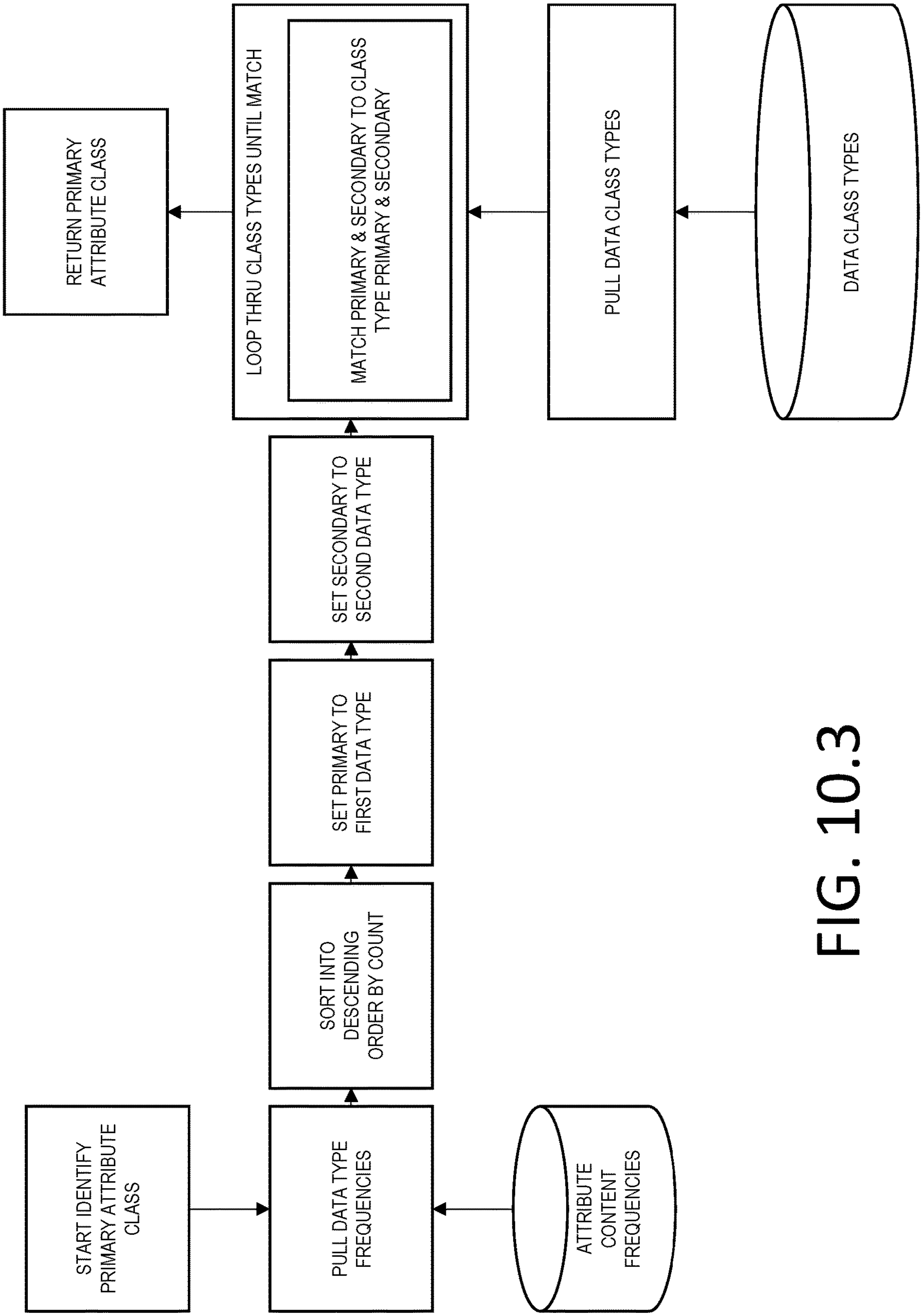
FIG. 10.3

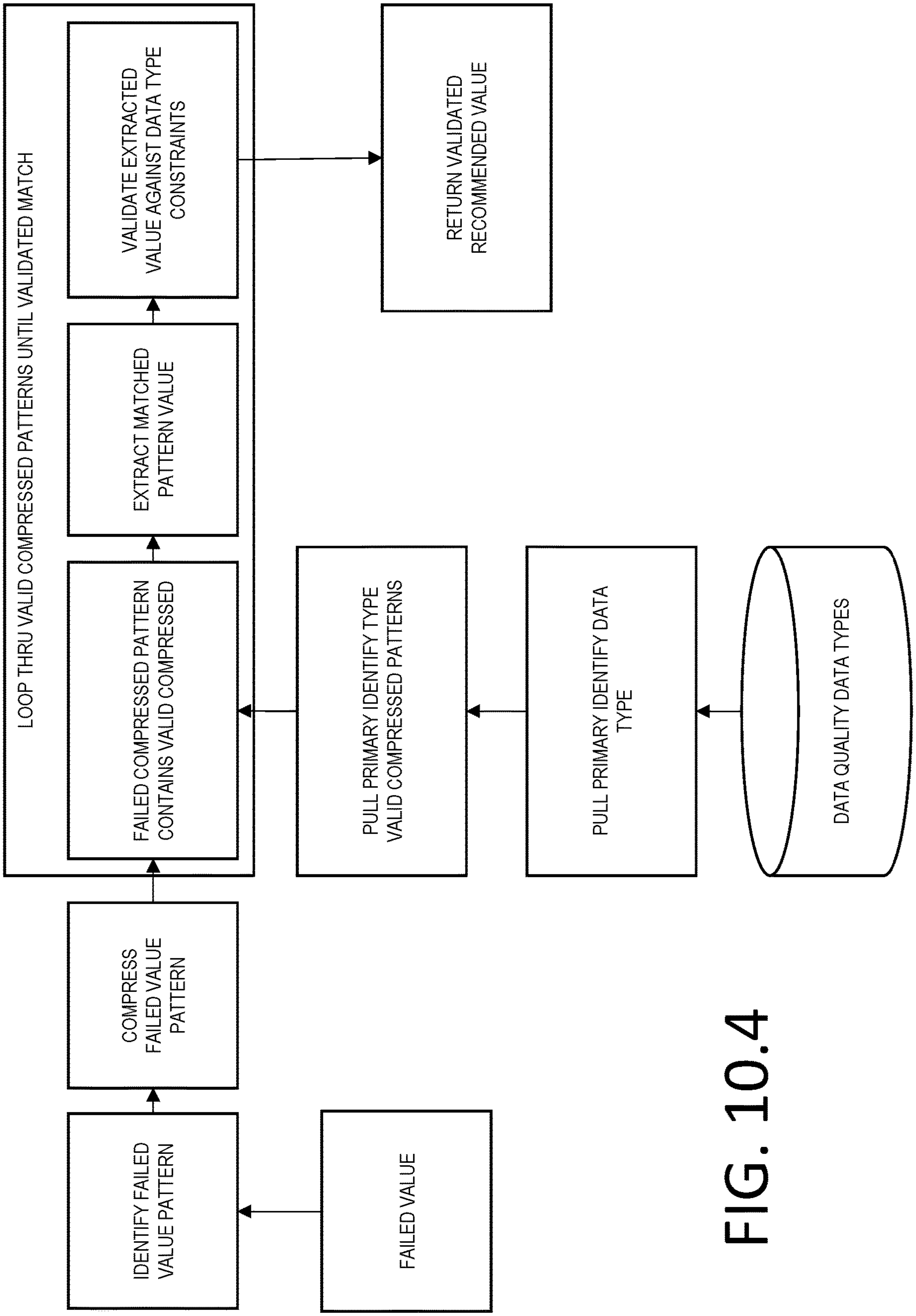
FIG. 10.4

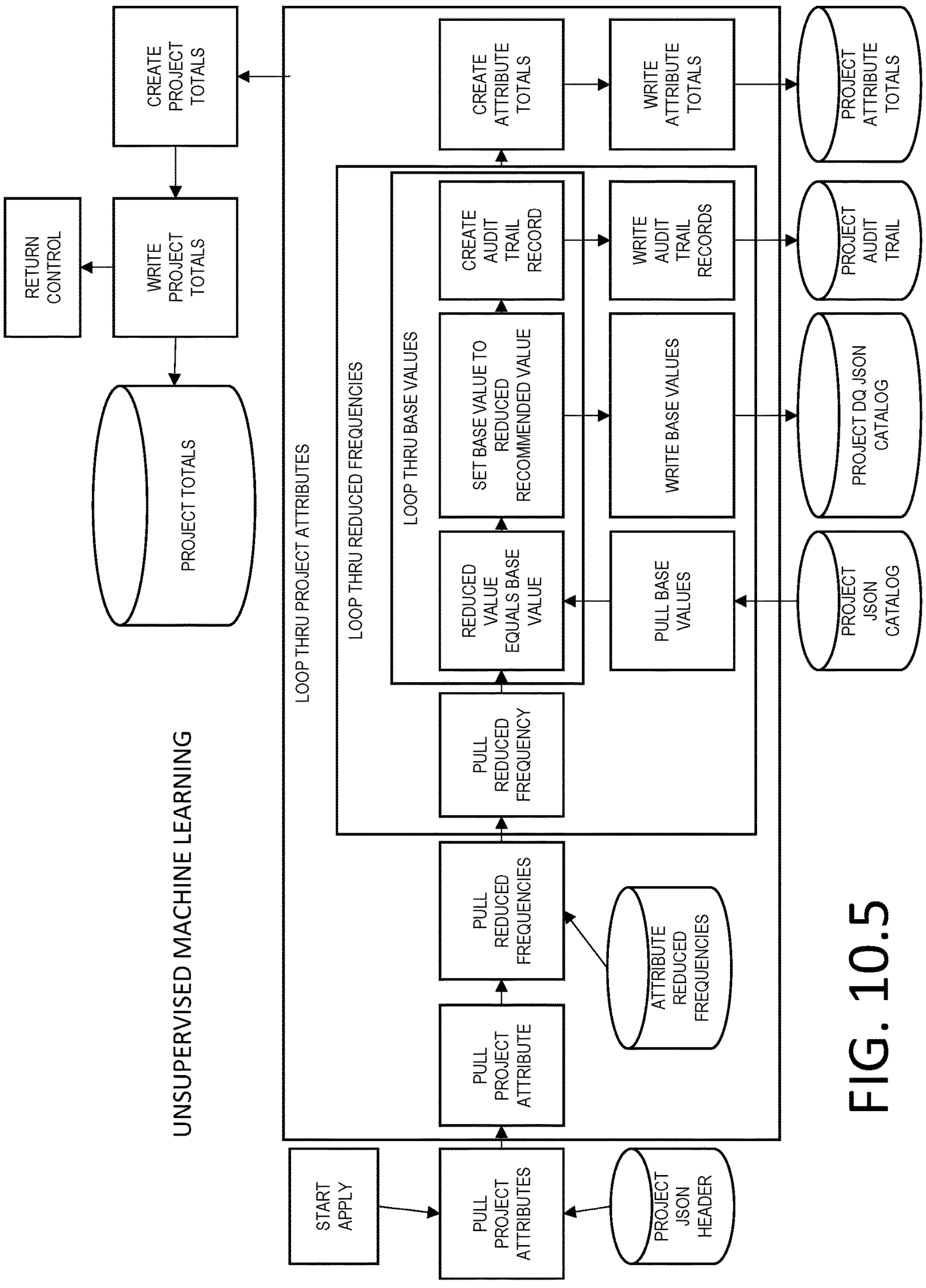
FIG. 10.5

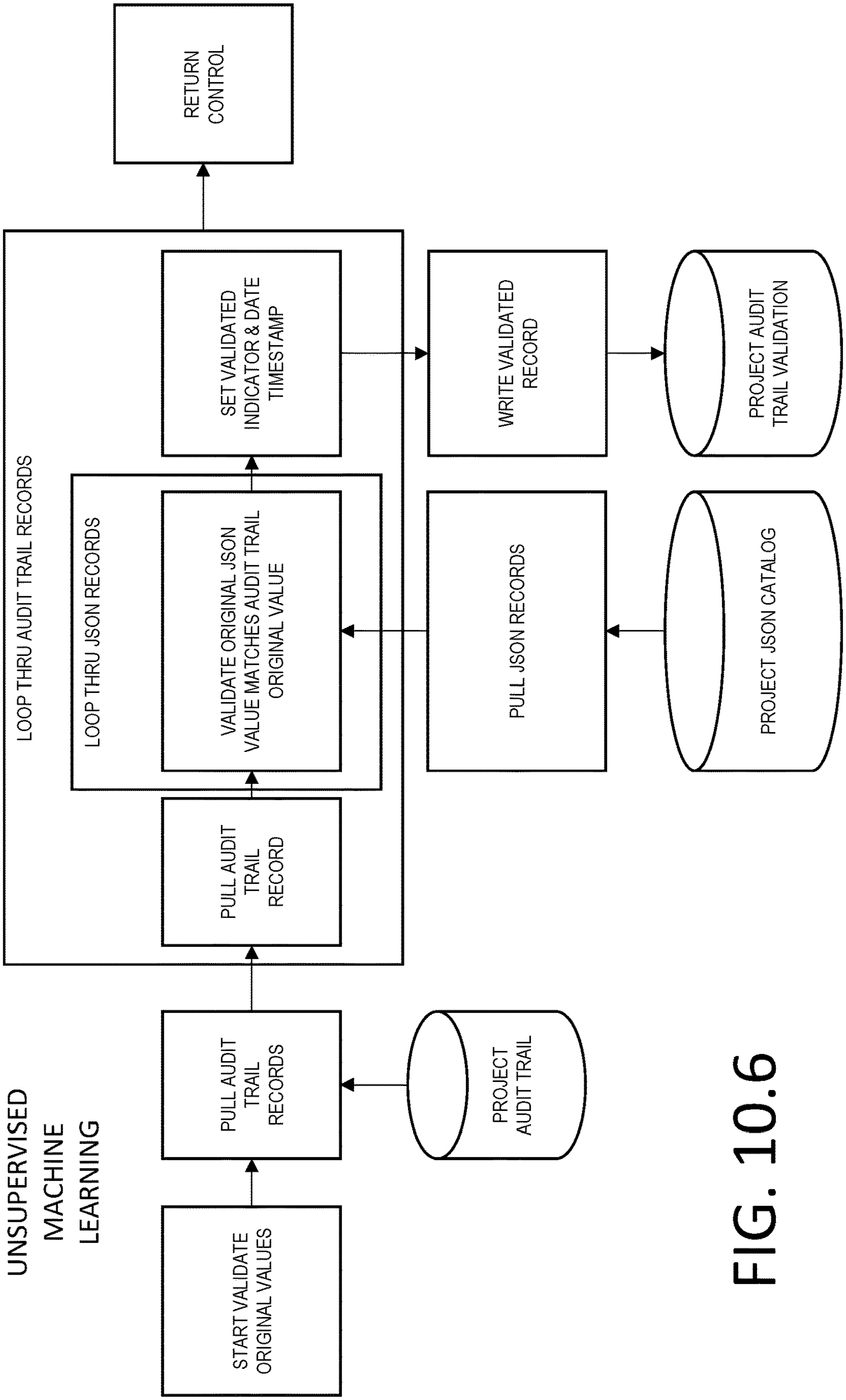
FIG. 10.6

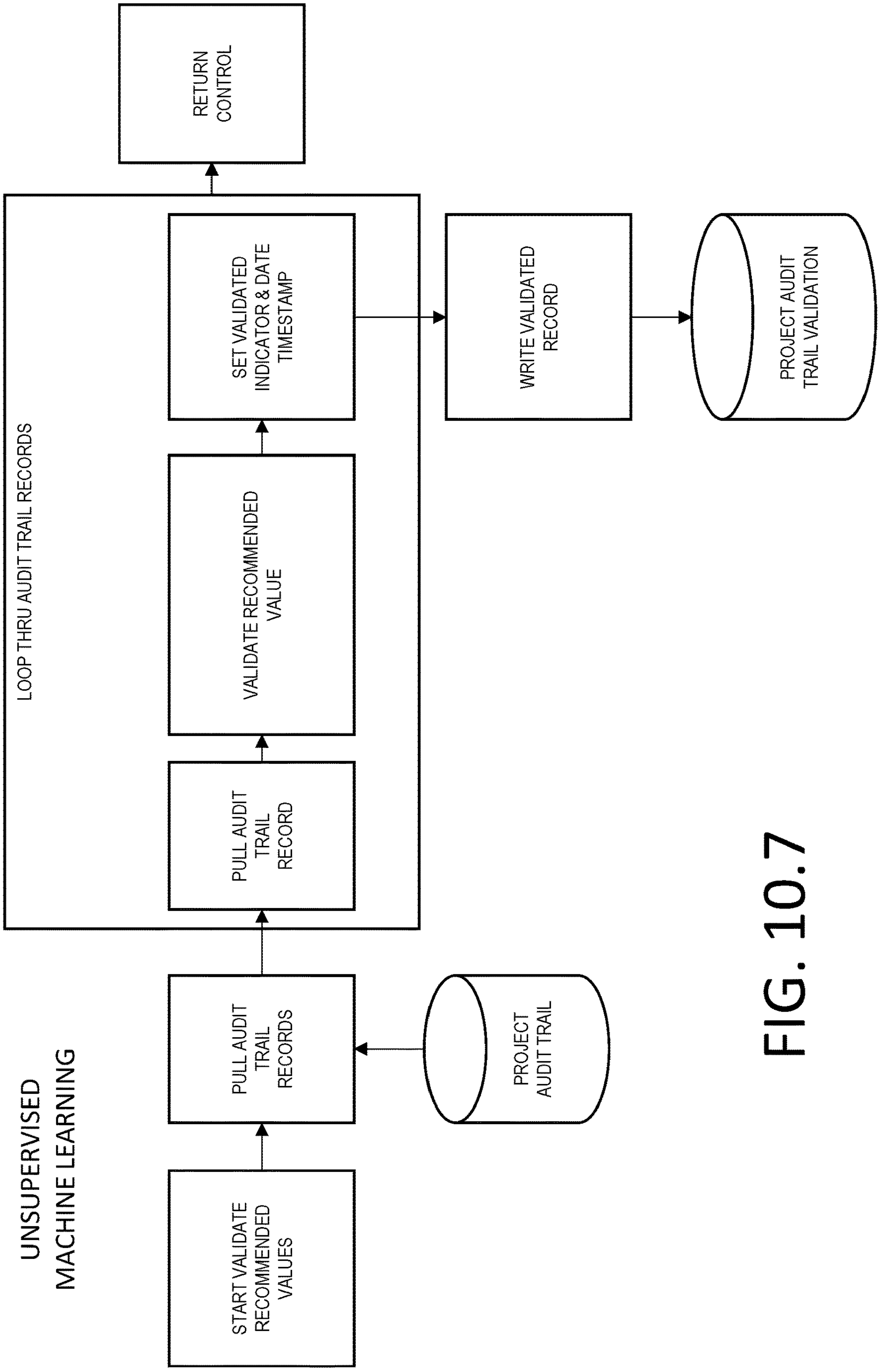
FIG. 10.7

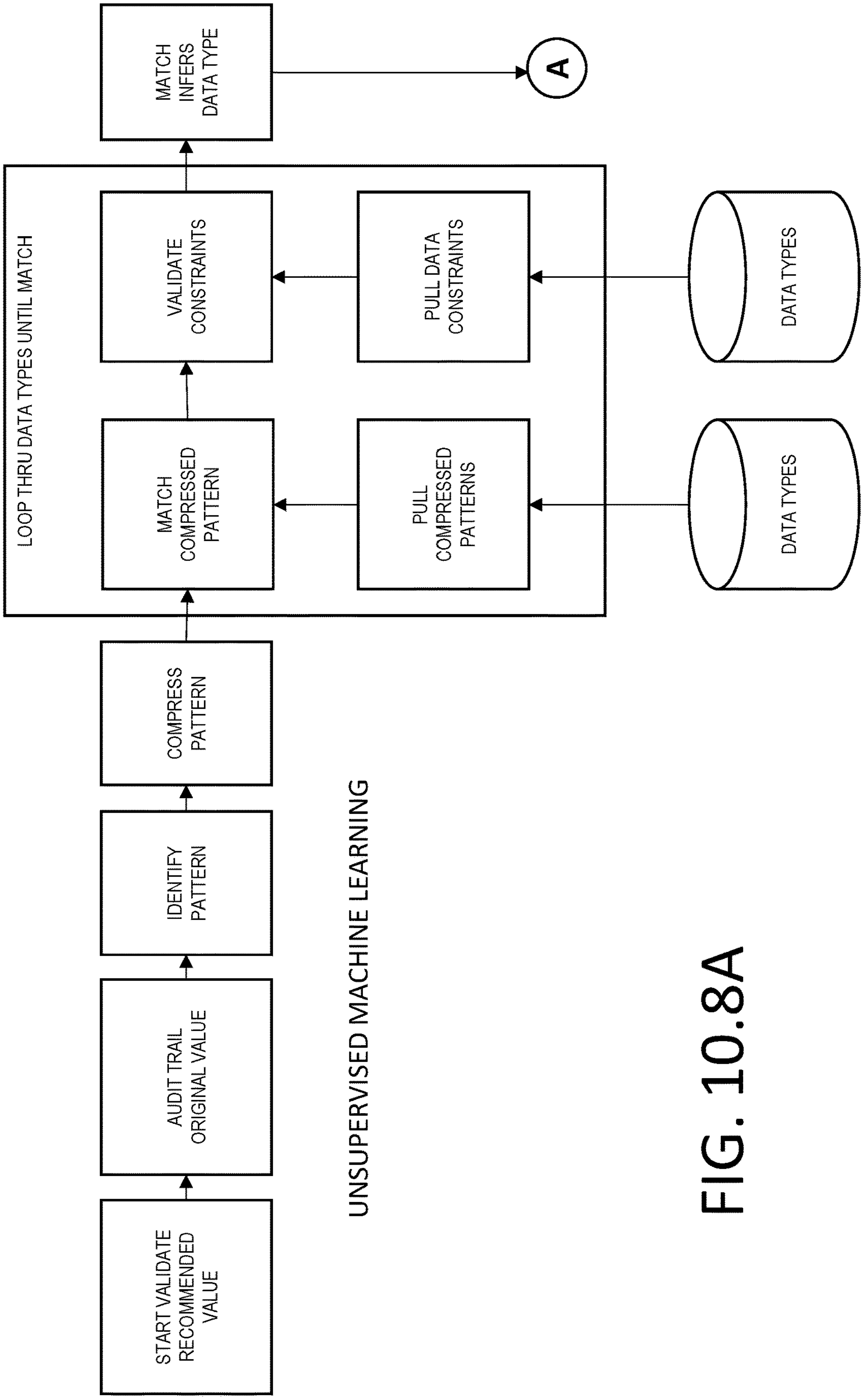
FIG. 10.8A

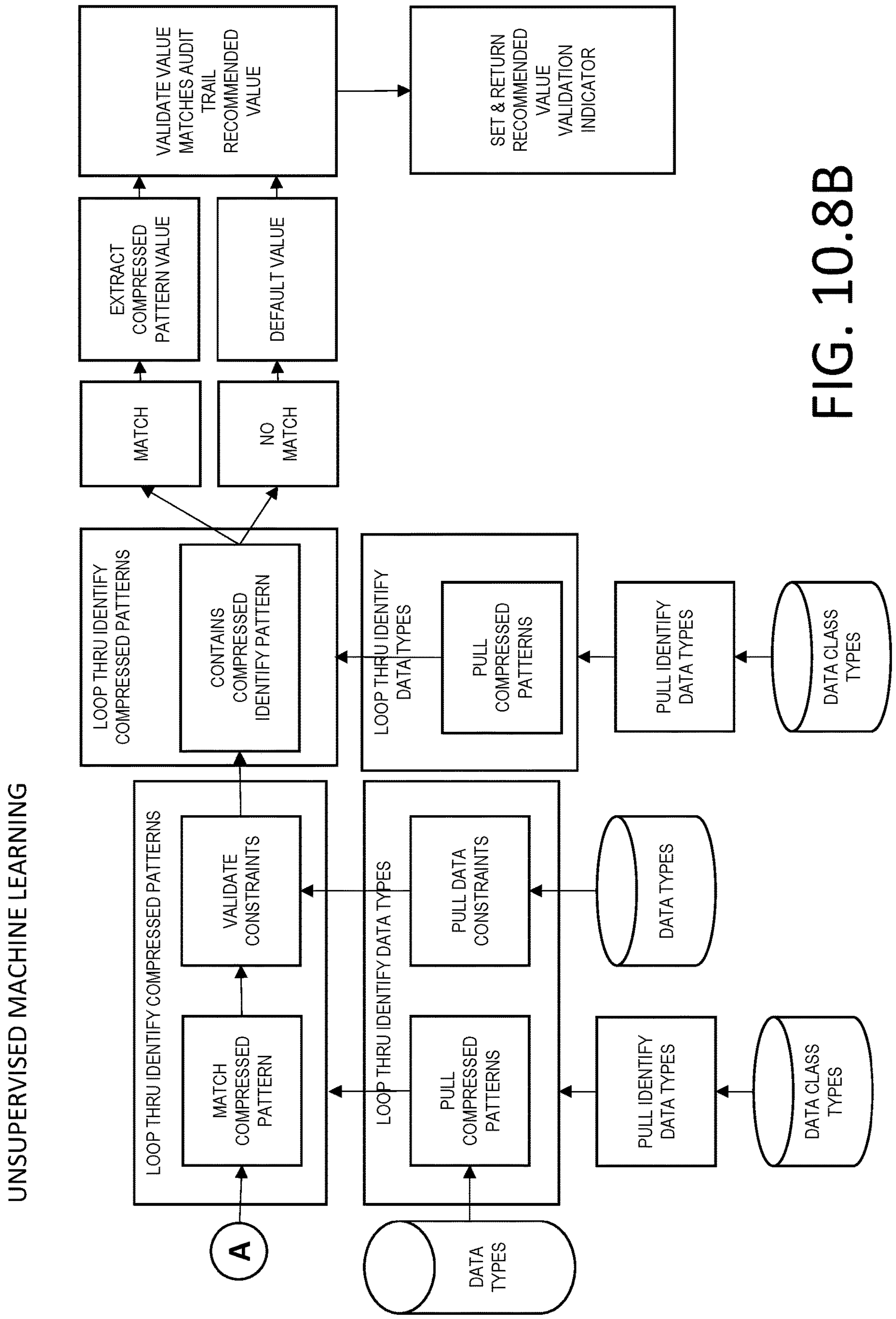
FIG. 10.8B

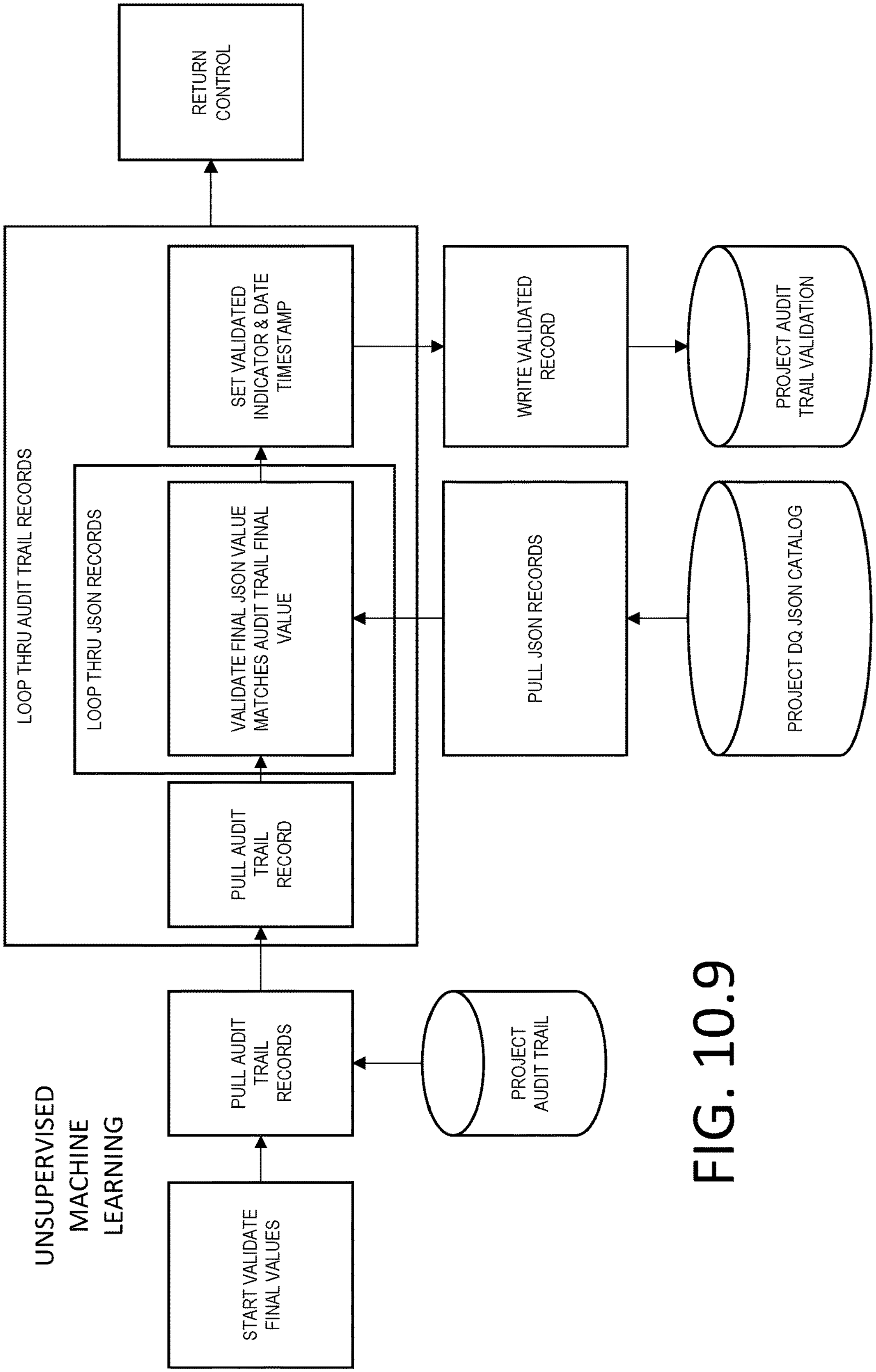
FIG. 10.9

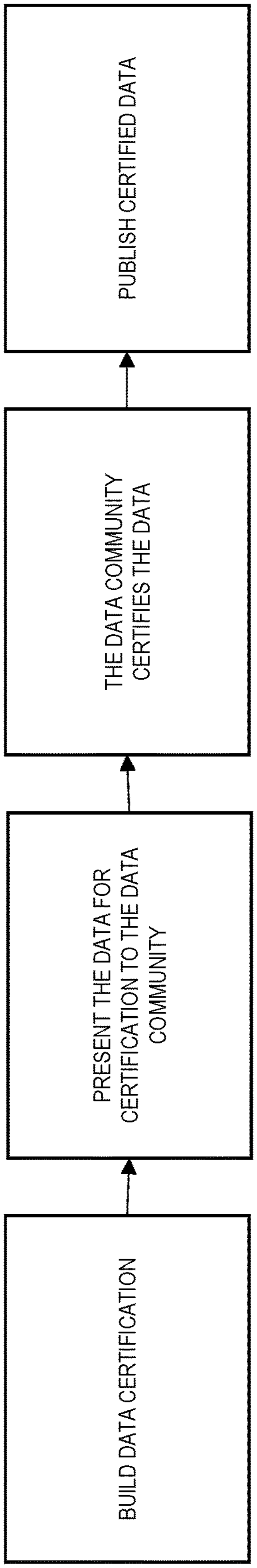
FIG. 10.10
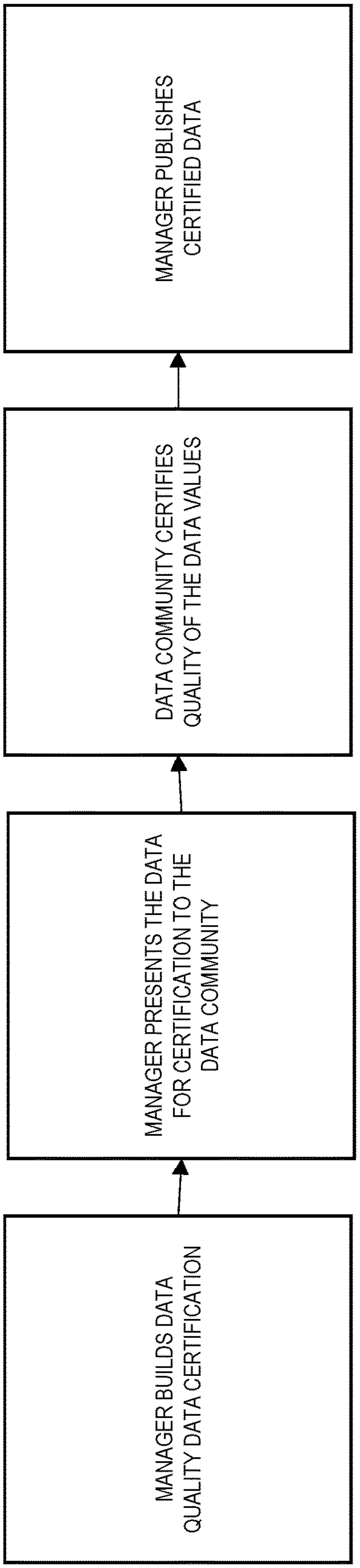
FIG. 10.11

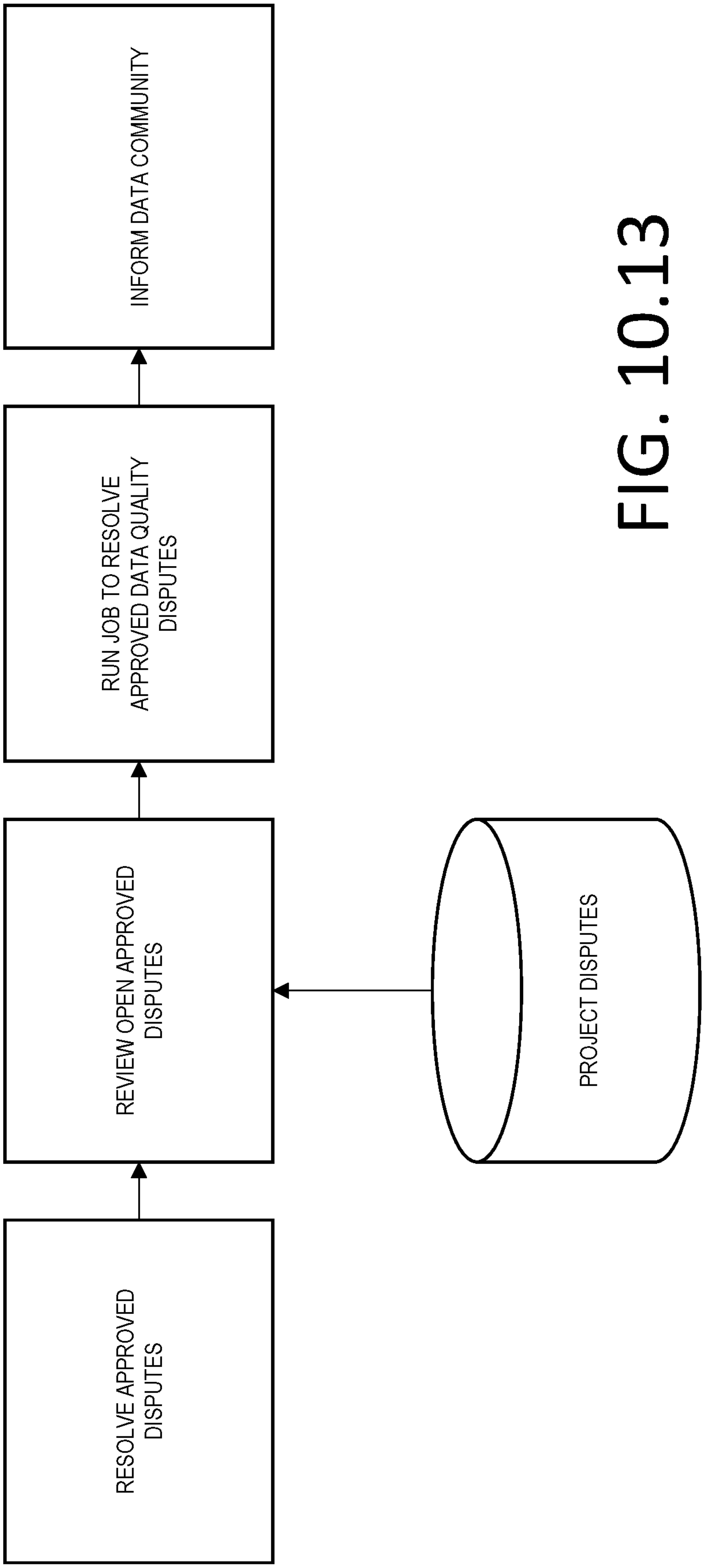
FIG. 10.13

SYSTEM AND METHOD FOR CREATING RELATIONAL AND NON-RELATIONAL DATABASES FROM STRUCTURED AND UNSTRUCTURED DATA SOURCES

CROSS REFERENCE TO RELATED APPLICATIONS

This application is entitled to and hereby claims priority under 35 U.S.C. § 119(e) to provisional U.S. patent applications, Ser. Nos. 63/182,449, filed Apr. 30, 2021, and 63/363,970, filed May 2, 2022, both of which are hereby incorporated herein in their entireties.

FIELD OF THE DISCLOSURE

The present disclosure relates to a technological solution that includes a system, a method and computer program for creating relational and non-relational databases from structured and unstructured data sources, including model building, data classification, data certification and resolution of data quality problems.

BACKGROUND OF THE DISCLOSURE

Information technology (IT) workflow management platforms have become indispensable when handling large numbers of complex processes in user environments such as enterprise network systems. The workflow management platforms are frequently customized to particular user environments and require the assistance and guidance of subject matter experts to build, operate and maintain the systems. These platforms have proven to be challenging to implement where data originates from a structured data source.

There exists a great unmet need for a system and methodology that can integrate with a user environment and operate with data from both structured and unstructured data sources.

SUMMARY OF THE DISCLOSURE

The present disclosure provides a technological solution that includes a system, a method and computer program for creating relational and non-relational databases from structured and unstructured data sources, including data classification, data certification and resolution of data quality problems. The technological solution can include big data modeling technologies. The system, method and computer program create relational and non-relational (for example, NoSQL) databases from both structured and unstructured data sources. This can be accomplished based on the data itself, allowing a user to create data targets that are perfect for capturing the data, since all of the physical characteristics can be inferred from the data itself.

In various embodiments, a computer-implemented method is provided for real-time workflow management in a computer network. The method comprises receiving, by a computing device, a request to create a project plan; creating, by the computing device, the project plan and a work schedule based on the received request; assigning, by the computing device, one or more resources in accordance with the project plan and work schedule; monitoring, by the computing device, progress of each task in the project plan and each resource associated with the task; and sending, by the computing device, a validated value to a communication device to be rendered in a graphic user interface by the communication device. The computing device can include a machine learning platform and the computing device is configured to: analyze, by the machine learning platform, digital data and classify the data into data types; assess, by the machine learning platform, data quality based on the classified data; and certify the assessment of the data quality.

The communication device can be associated with at least one of a project manager, a modeler, a lead, an analyst, or a certifier.

The computing device can be further configured to: receive, by the machine learning platform, a value; identify, by the machine learning platform, a pattern associated with the value; compress, by the machine learning platform, the pattern; compare, by the machine learning platform, the compressed pattern to one or more data type compressed patterns; validate, by the machine learning platform, a constraint based on a result of the comparison of the compressed pattern to the one or more data type compressed patterns; and output, by the machine learning platform, the validated value.

The computing device can be further configured to pull, by the machine learning platform, data type frequencies from an attribute content frequencies database.

The computing device can be configured to sort, by the machine learning platform, the pulled data type frequencies into descending order, from a highest frequency pulled data type to a lowest frequency pulled data type.

The computing device can be configured to set, by the machine learning platform, the highest frequency pulled data type as a primary data class type.

The computing can be set, by the machine learning platform, a next highest frequency pulled data type as a secondary data class type.

The computing device can be configured to compare, by the machine learning platform, the primary data class type and the secondary data class type to a pulled primary data class type and a pulled secondary data class type.

The computing device can be configured to determine, by the machine learning platform, a match for the primary data class type and the secondary data class type.

The computing device can be configured to identify, by the machine learning platform, a failed value pattern.

The computing device can be configured to compress, by the machine learning platform, the failed value pattern and compare, by the machine learning platform, the compressed failed value pattern to a pulled primary identify type valid compressed pattern.

The computing device can be configured to extract, by the machine learning platform, a matched pattern value, validate, by the machine learning platform, the matched pattern value against a data type constraint, and output, by the machine learning platform, a validated recommended value.

The computing device can be configured to send the validated recommended value to the communication device to be rendered in the graphic user interface by the communication device.

In various embodiments, a system is provided for real-time workflow management in a computer network. The system comprises a non-transitory computer program storage medium, a computing device configured to execute one or more computer program instructions contained in the non-transitory computer storage medium, a classifier equipped with a machine learning platform and configured to analyze digital data and, by the machine learning platform, classify the data into data types, an assessor configured to determine data quality based on the classified data, a certifier configured to certify the assessment of the data quality, and a transceiver configured to communicate with a communication device and send the validated value to a communication device to be rendered in a graphic user interface by the communication device. The one or more computer program instructions, when executed, cause the computing device to receive a request to create a project plan, create the project plan and a work schedule based on the received request, assign one or more resources in accordance with the project plan and work schedule, and monitor progress of each task in the project plan and each resource associated with the task.

The classifier can be configured to receive, by the machine learning platform, a value, identify, by the machine learning platform, a pattern associated with the value, compress, by the machine learning platform, the pattern, compare, by the machine learning platform, the compressed pattern to one or more data type compressed patterns, validate, by the machine learning platform, a constraint based on a result of the comparison of the compressed pattern to the one or more data type compressed patterns, and output, by the machine learning platform, the validated value.

In the system communication device can be associated with at least one of a project manager, a modeler, a lead, an analyst, or a certifier.

The classifier can be configured to: pull, by the machine learning platform, data type frequencies from an attribute content frequencies database; and/or sort, by the machine learning platform, the pulled data type frequencies into descending order, from a highest frequency pulled data type to a lowest frequency pulled data type; and/or set, by the machine learning platform, the highest frequency pulled data type as a primary data class type; and/or set, by the machine learning platform, a next highest frequency pulled data type as a secondary data class type; and/or compare, by the machine learning platform, the primary data class type and the secondary data class type to a pulled primary data class type and a pulled secondary data class type.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

FIGS. 3.1-3.27 depict block diagrams of various processes that can be performed by the RTWM system, according to the principles of the disclosure.

FIGS. 4.1 to 4.5 depict block diagrams of an embodiment of an initialization process, including a manager initialization routine, a modeler initialization routine, a lead initialization routine, an analysis initialization routine, and a certification initialization routine, respectively.

FIGS. 5.1-5.22 depict block diagrams of various processes that can be performed by a classifier during a communication session with the user communication device of a data modeler.

FIGS. 5.23-5.76 depict block diagrams of various processes that can be performed by the classifier during a communication session with the user communication device of a project manager.

FIGS. 6.1-6.44 depict block diagrams of various processes that can be performed by a project manager during a communication session with the user communication device of a project manager.

FIGS. 7.1-7.22 depict block diagrams of various processes that can be performed by an assessor during a communication session with the user communication device of an analyst.

FIGS. 7.23-7.44 depict block diagrams of various processes that can be performed by the assessor during a communication session with the communication device of a team lead.

FIGS. 8.1-8.14 depict block diagrams of various processes that can be performed by the certifier during a communication session with the user communication device of a certifier.

FIGS. 9.1A-9.9 depict block diagrams of various processes that can be performed by a certified repository during a communication session with the user communication device of a modeler.

Figure 1:
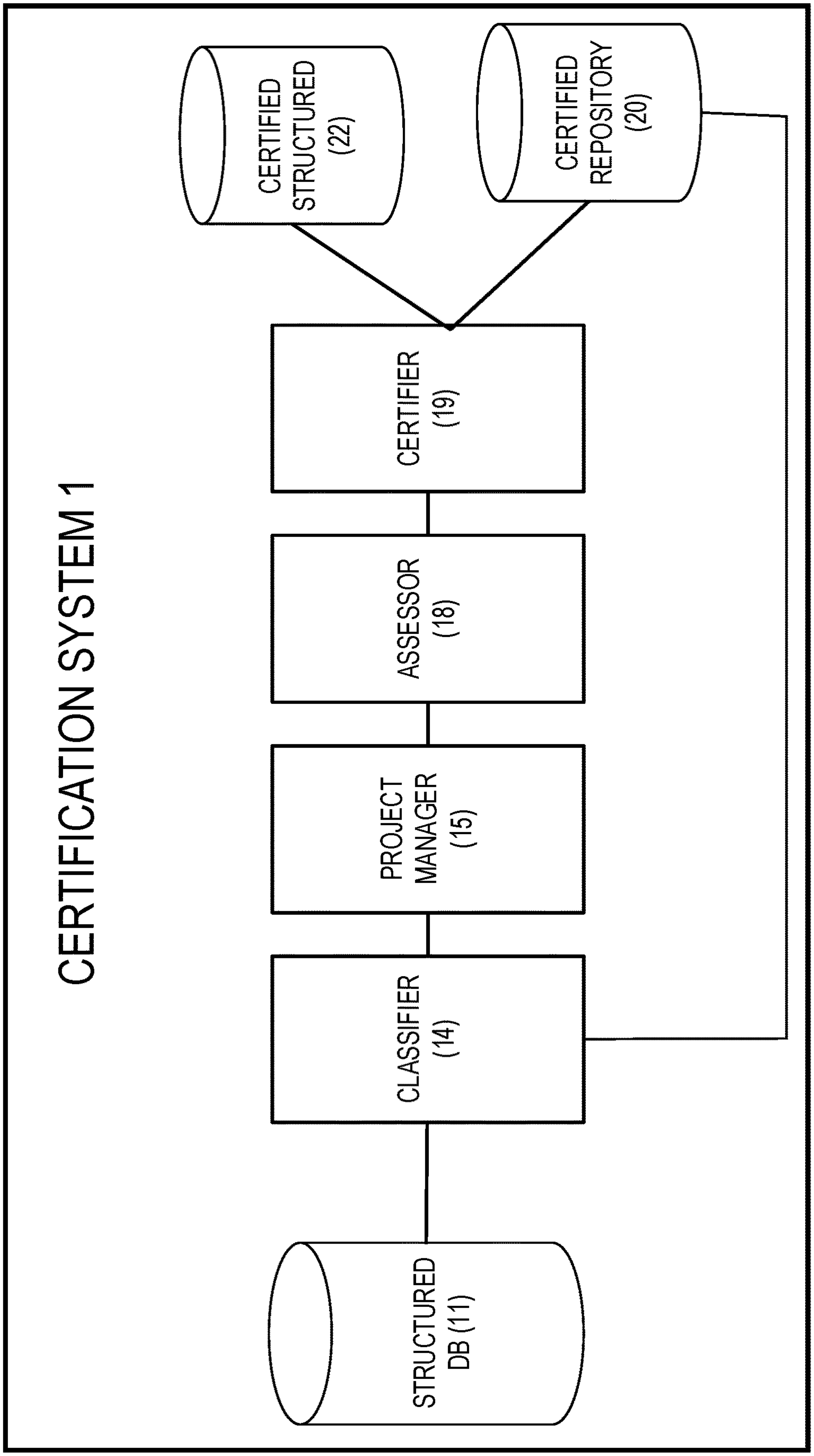
FIGS. 1 and 2 depict an embodiment of a real-time workforce management (RTWM) system, according to the principles of the disclosure.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

In a non-limiting embodiment of the disclosure, a system, a method and a computer program are provided for data quality and data governance. The technology disclosed herein can solve data quality problems for integration projects, master data management, customer data management, reference data management, data governance, or data quality initiatives. The technology includes a system and methodology for performing a data quality assessment, which can include analyzing data and identifying data quality problems.

In an embodiment where an enterprise network is multinational with thousands of computing nodes (for example, one for each employee), the technology can scale to enterprise. So instead of seeing one computing node with all the access privilege roles, the technology can assign each access privilege role to 10, 20, 30 or more unique computing nodes who might be assigned to a big project.

In an embodiment, the technology can be arranged to operate with, for example, 150 attributes, where a manager computing node may have, for example, 7 employee computing nodes to manage, including the manager's own computing node and that of six other computing nodes. The technology can be arranged to manage and to track the status of work for each of the computing nodes and, on-demand, report the status, including, for example, what the costs were, how much was done, were the employees on track timewise, etc. The technology can include workforce management technology that can allow a user to create a work schedule at a computing node.

In an embodiment, the technology can be arranged to integrate scheduling for human resources for a team, as well as for the certifiers on the client's side to be tracked. So, when work is assigned, the technology can actually track the work at each computing node, in real-time. The technology can be arranged to track each team member's computing node, as well as that of the certifiers on the client's side, down to the minute, including how long the computing node is operating and the performance for each assigned task. For example, when a certifier is completing a function, as s/he goes in and reviews all of the data and says, for example, "Yeah, we don't see anything in here that's erroneous or needs to be changed," and s/he certifies the result there, the technology can track all of that time that it takes them to do that, as well as when they actually certify it. All of that can be tracked comprehensively by the technology.

In an embodiment, the technology can be arranged to track, for every user that logs into the system, everything they do, including all actions relating to certifying data. So, when somebody logs into the system and starts certifying the data, the technology can monitor and determine all activity by the user computing node, including how much time they spent looking at a particular data record. The technology can be arranged to report, not only did a user certify, but how long that user took looking at the data that it certified. The technology can be arranged to report how long something took to get done.

The technology can include a workforce management platform, a data certification platform, and a cloud-network. The technology can include a JAVA engine and/or a JSON repository. The technology can integrate with, for example, AWS S3 buckets or CSV local files. Data classification engines are an important part of the technology, as is the methodology for creating types and classes.

Initially, the platform can restrict privileges to a single administrator computing node, which may be tasked with creating user profiles, deciding what roles users have, and, via the workforce management technology, restricting based on rules which user can have access to the schedules or details of the schedule, as well as the active work in progress.

In an embodiment, the workforce management can be integrated into the technology. So, if a user wants to be able to do a certification project, the technology can guide the user through that project to ensure it's done properly. The workforce management, for each schedule, can create a project plan. The workforce management can be arranged to be the driver for the flow of work through the technology, since tasks can be done by the correct role, and assigned in the schedule such that it can be executed and tracked. The system can be configured to require that the user be logged in with a role that can make changes. In this regard, other roles can be logged in, but only in read-only mode.

The technology can allow a user to change name and/or classes, for example, through interaction of the user interface and interaction with the classifier. The technology can be arranged to define data quality types. This can be done through supervised machine learning. In an embodiment, the classifier can be configured to allow a user to access the output from a step in a process and be able to review and make changes to one or more classes to change the result set. The technology can be arranged to change one or more classes, which in turn can automatically make changes to data.

The technology can be arranged to perform a data quality assessment, after data has been prepared, and identify any data quality problems. The technology can be arranged to determine resolutions to the problems and apply the changes that were identified to correct the data, thereby creating a comprehensive audit trail. A user can, using a graphic user interface (GUI), access and validate the audit trail. The audit trail can include, for example, the original value and where it was located and whatever that source is (whether it's a table with columns and rows or a file with fields and records). In an example, an audit trail can be validated if an original piece of data was where it was supposed to be. The technology can validate, for example, where recommended data constraints were applied properly, and then the technology can validate what was actually placed into the target. Thus, any time any kind of changes are made to the data, the technology creates an audit trail, and, when validated, the audit trail can be confirmed to actually and accurately represent things properly. This step can be executed to do certification.

In an embodiment, the technology can receive a CSV file and a user input to push the file through the process, without ever changing the source data. The technology can create a new target, which can be directed back to the CSV file, or automatically put it into a relational database. The target can be stored as a JSON or CSV file in one or more AWS S3 buckets. The technology can be arranged to ingest an entire database and convert it to local CSV files, or CSV files pushed to AWS S3 buckets. The technology can include an integration or staging methodology. The technology can be arranged to stage data, which can be clean after having been processed by the technology.

In an embodiment, the technology can be arranged to ingest AWS S3 buckets, receiving an entire bucket, analyzing the data and identifying all the data quality problems automatically resolved. The technology can be arranged to, then, put a certified results set into another AWS S3 bucket, or even the same bucket, since the technology does not change the original source, but, instead, creates a new target. So, when the technology pushes a file out, it is given a new qualifier, which informs what it is. The technology does not have any need to update the old database, but, instead, can push the files into a target database, or a staging database. The technology can be arranged to go from file to database, or from database to file.

In various embodiments, the technology is configured to generate and render a graphic user interface (GUI). The system 1 can be included locally in a computer network or in a stack in the technology. The system 1 can be arranged to run an entire certification process autonomously, without any user intervention. In an embodiment, the system 1 can initiate and run a job from beginning to completion. The technology can monitor and report on-demand what a job was run against (for example, a CSV file), the computing resource asset that ran it (for example, user ID, IP address, port number, etc.), when it was run, how long it took and how much data the system analyzed. The technology can report the number of values that were corrected. The technology can be arranged to report the number of individual problems it identified, and the number of problems it resolved in a process cycle.

In an embodiment, at a computing node in an enterprise network, a user can access the system and login by inputting a userID-password combination at which time the system will query a profile database for a profile associated with the userID and retrieve the user profile and validate the userID-password combination. Based on the user profile and access privileges in the user profile, the projects assigned to the user can be retrieved and rendered at the computing node of the user. The user profile can be for, for example, a manager role, a modeler role, a lead modeler role, an analyst role, or a certifier role. Additional user roles are contemplated.

In various embodiments, the technology can retrieve and process, for example, a CSV file. The technology can identify all the attributes, so if it was a database, it would pull in the names of all the columns right from the table, and it would identify all of those. Then, it could access and retrieve all of the underlying data and bring it in to the platform. For each attribute, the technology can identify the frequency of occurrence, including each distinct value and how many times it occurs. Once it identifies all of the frequencies, for each value in those frequencies, the type of data is identified by the classification engine. The resultant data can then be rolled up and a determination made regarding the class of the data. The technology can be arranged to infer, using a machine learning model, a class of data, such as, for example, the first name class from the data itself.

The technology can include one or more machine learning models arranged to recognize sophisticated patterns in data and identify and align classes of data such as, for example, first name to first name class, last name to last name class. In a non-limiting example, the technology can identify 10,320 values that are distinct, and of those, 10,153 of them can be passed by the technology. In this example, the number of failures is determined to be 167. Now that's a small number, at the same time though, from a data quality perspective, this value can be regarded as a high number, even though it's less than 2% of the overall data. The technology can take these 167 values and forward the data to the next step in the processing pipeline, an identification step. And the identify step, what it does is, it tries to identify a resolution to those problems. In a non-limiting embodiment, the identification step in the processing pipeline can include, for example, determining any false positives. If none are found, then some (or all) of the data that was extracted can be flushed out. In an embodiment, the technology can analyze the underlying data (with, for example, the 167 values) and determine whether any of the data can be fixed. If it is determined that the data cannot be fixed, the technology can select and apply a default for that class, or for the type of data. Accordingly, the technology can replace certain content of the data that it cannot fix with defaults and, for the data it can fix, it can identify the corrections. This is very powerful and surprisingly accurate, to the point that technology can drive data accuracy up to 100%. The technology can self-assess and self-calibrate, including each step in the processing pipeline, including data analysis and assessment, error identification, and error correction, which can include adjusting the classes and the types as necessary.

In a non-limiting embodiment, the technology can take an audit trail that it created and validate it. The technology can, for example, validate an audit trail with respect to at least three aspects, including the original values, the recommended values and the final values. And, once that audit trail has been completely validated and the technology knows that the original source has been identified properly, the target was identified properly, and the technology changed the data properly, the next step in the processing pipeline can be to use that information and generate corrections. The corrections can include things that need to be fixed, such as, for example, those values the technology identified as being problematic. In this regard, the technology can be arranged to isolate the underlying data, such as, for example, for each attribute that had changes. In the non-limiting example illustrated in the Figures, the technology analyzed data that had 15 attributes that had changes and a total of 17 attributes that contained valid data, with a total of 50,008 distinct values that passed and are unique. In this example, the technology determined that the datasets had 100% distinct integers.

When the technology completes the foregoing steps in the processing pipeline line, then all of the results can be ready to be certified by the technology. Now that the technology has created all the information where it knows all the attributes and related information, it can create a work schedule to schedule the work based on the results. In this regard, the workforce management system can come online in the processing pipeline and, for example, drive the next steps in the processing pipeline based on roles. So, if a user desires to manage a certification process, the technology can allow him/her to manage the one for which that user has management privileges, which can include, for example, creating a work schedule. The technology can be arranged to associate multiple users into single roles. So, for instance, the technology can assign a team to a particular project, and select team members to come in and work on this project, allowing one or more of the team members to take the lead on the project. Since the technology can be arranged to perform certification, it can require that the names of all team members be included.

In a non-limiting embodiment, one or more schedules can be created by the technology and the technology can be arranged to monitor each schedule. The schedule can be arranged to monitor any number of attributes. The monitoring can include, for example, when a task is to start, when it's supposed to finish, any targets for the task, and the amount of time assigned to the task. The technology can monitor the progress for each schedule, each member, each task, or any variable that might influence a task during its lifecycle. The technology can allow a user to access, via a computing device, parts of the processing pipeline and review underlying data, analysis of the data, and outcomes created by the technology based on the data and its analysis, including any corrections or adjustments made by the technology.

The technology can be configured to operate in accordance with the seven-layer OSI (Open Systems Interconnection) model. The various computing and communicating devices in the technology can operate at the application layer, presentation layer, session layer, transport layer, network layer, link layer, or physical layer. For instance, the application layer is the OSI layer in a communicating device that is closest to the user. The application layer interacts with software applications in the communicating device that implement a communicating component. The application layer can include, for example, a graphic user interface (GUI) or other computing resource with which the user can interact with to carry out a functionality.

The presentation layer establishes context between software applications, which might use different syntax and semantics. The presentation layer transforms data into a form that each software application can accept. An operating system is an example of the presentation layer.

The session layer controls the connections between communicating devices in the technology, including, for example, between a user communicating device and a back-end server that contains a part of the technology. The session layer can control the connection between the communicating devices in the technology and external communication devices, such as, for example, enterprise communicating devices. This layer is responsible for establishing, managing and terminating connections between local and remote applications. The layer can provide for full-duplex, half-duplex, or simplex operations, and is responsible for establishing checkpointing, adjournment, termination, and restart procedures.

The transport layer provides the functional and procedural mechanisms for transferring variable-length data packets (or sequences) from one communicating device to another communicating device, while maintaining quality-of-service (QoS). The transport layer controls the reliability of a given connectivity link through flow control, segmentation and desegmentation, and error control. The transport layer can include, for example, tunneling protocols, the Transmission Control Protocol (TCP) and the User Datagram Protocol (UDP).

The network layer provides the functional and procedural mechanisms for transferring data packets from a communicating device on a network to another communicating device on a different network. If the data to be transmitted is too large, the network layer can facilitate splitting the data into a plurality of segments at the communicating device and sending the fragments independently to the other communicating device, where the segments can be reassembled to recreate the transmitted data. The network layer can include one or more layer-management protocols such as, for example, routing protocols, multicast group management, network layer information and error, and network layer address assignment.

The link layer is responsible for device-to-device transfer between communicating devices in, for example, an enterprise environment. In IEEE 802 implementations, the link layer 16 is divided into two sublayers, consisting of a medium access control (MAC) layer and a logical link control (LLC) layer. The MAC layer is responsible for controlling how devices in a network gain access to a medium and permission to transmit data. The LLC layer is responsible for identifying and encapsulating network layer protocols, and for controlling error checking and frame synchronization.

The physical layer includes the hardware that connects the communicating devices in, for example, the enterprise environment. The hardware can include for example connectors, cables, or switches that provide for transmission and reception of instruction and data streams between the communicating devices.

In a non-limiting embodiment, the technology can include one or more switching and distribution layers. The switching and distribution layers can include one or more layers of switching devices or router devices that connect nodes in a user environment, including, for example, communicating devices, computing devices, servers, database servers or a network of computer assets. Router devices can be connected to a network by one or more communication links. The router devices can include a firewall. The switching devices can be connected to nodes by one or more communication links. The switching devices can include ethernet switches. Each computing node can include one or more computer resource assets.

The technology can include a server or a plurality of servers, including, for example, a mail server, a web server, a file server, a database server, a network security server. The mail server can send, receive and store electronic mail using standard email protocols, such as, for example, SMTP, IMAP, POPS, etc.

The web server can be connected to the Internet and can support physical data interchange with other devices connected to the Internet. The web server can include a static web server or a dynamic web server.

The file server can be responsible for the central storage and management of data files, allowing users to access files stored in the file server or in the database server.

The database server can include one or more databases, including a member database, a policies database, a processing pipeline database, a rules database, and a workflow route database 4. The database server can include a single database or a distributed database. The database can include large numbers of computing resources that are accessible to the computing and communicating devices in the user environment. The database can include one or more relational databases.

In an embodiment, the database can be arranged to store and manage directory service information, including, for example, information about users, systems, networks, services, and applications throughout the user environment. The database can store and provide an organized set of records, including records with a hierarchical structure, such as, for example, an enterprise email directory, an enterprise phone directory, an enterprise computer resource directory, an enterprise client device directory, an enterprise computing resource directory, IP addresses, MAC addresses, and the like. The database can be implemented with, for example, a lightweight directory access protocol (LDAP) for accessing and maintaining distributed directory information services over, for example, an Internet Protocol (IP) network.

In an embodiment, the database can be arranged to store and manage one or more policies, rules and associated data. The policies, rules and associated data can be provided and accessed by the technology. The policies and/or rules can be retrieved from the database by the technology. The policies can include rules for creating, modifying, configuring or implementing a workflow, including, for example, settings for each individual step in the workflow, settings for steps that can lead to conditional routing in the workflow, links with auto-creation of processes for the workflow, approval policies, any policies or configurations that can be implemented by the technology in accordance with the disclosure herein. The policies can include governance rules, governance business rules, and the like, that can be applied to dynamically evaluate or reevaluate approval steps or to run through one or more determination rules against a workflow route. The policies and associated data can include, for example, business process policy and configuration rules that can be employed by the technology in creating, configuring, modifying or implementing a workflow route. The policies and associated data can be accessed and implemented in, for example, rendering the various display screens.

In an embodiment, the database can be arranged to store and manage one or more scenarios and associated data that are created, configured, modified, or implemented by the technology. The database can store and manage workflow schemas associated with each one or more of the scenarios in the database. The database can store, for example, data that can be accessed and implemented in creating user interfaces by the technology.

In an embodiment, the database can be arranged to store and manage one or more workflow processes and associated data that are created, configured, modified, or implemented by the technology. The managed processes and associated data can include one or more schemas and one or more steps for handling a request in a workflow. The schemas can include business workflow schemas. The handling steps can include approval steps associated with business objects. The database can store and manage one or more processes that are created or configured by the processing pipeline in the technology. The stored processes can include one or more templates, including one or more associated schemas, that can be applied in generating graphic user interfaces for the various classes of users of the technology.

In an embodiment, the database can be arranged to store and manage one or more routes and associated data that are created, configured, modified, or implemented by the technology. The database can include a record associated with each unique workflow route. The database can be arranged to store and manage history data for each workflow and each route, from creation of the workflow through its completion. The routes and associated data in the database can be updated continuously or periodically, in real-time, thereby ensuring provisioning of a current, complete and optimal route for each workflow in the particular user environment, including handling of all requests with each workflow or route.

In an embodiment, the technology can be arranged to interact with, or integrate into, enterprise systems and access and retrieve workflow schemas, business policies, business rules, business scenarios, governance business rules, organizational structures, escalation procedures, delegation procedures, or member information.

In an embodiment, the technology can include one or more processors, a memory, a network interface, an input-output (IO) interface, and a system bus, all of which can be communicatively linked to each other through one or more communication links. The technology can include a modulator, a demodulator, a modem, a transmitter, a receiver, or a transceiver. The technology can include one or more application program interfaces (APIs), including, for example, web APIs, simple object access protocol (SOAP) APIs, remote procedure call (RPC) APIs, representation state transfer (REST) APIs, or other utilities and services APIs.

In an embodiment of the technology, the data classification engine includes a machine learning platform. The classification engine can include one or more tiers of types (or example, three tier types), including, for example, one or more tier types that are not changeable by users and one or more tier types that the technology can permit a user to change. The technology can, for example, include as a first tier a grouping of data quality types based on the underlying data. The technology can be arranged to permit a user to define a data type and the technology can create a corresponding class.

A second tier can include a tier that is unchangeable by users. This tier can belong, for example, to the technology and function as foundational tier. In a non-limiting example, this tier can include such things as dates, timestamps, and integers. The third tier can include, for example, foundational or catch-all data quality types, so that no data is left unaccounted for. The types can be cached and called throughout the processing pipeline of the technology, with the technology handling one hundred percent of all the different types of data that the technology might receive, regardless of the user environment.

As seen in the examples depicted in the drawings, the technology can be arranged to create data quality types at a user level, which can be the first tier that gets picked from. In the examples, a new data quality type can be created in, for example, three different ways. In the first way, "test client tier," a new data quality type is created called "test client tier" and the technology can use valid value sets to do that, including, for example, using a CSV file that contains actual values and whether each value is valid or not true. "True" would indicate it is valid; "false" would indicate it's not valid. The technology can make a selection and build the type from the valid value set. The technology can be arranged to create everything needed from a type perspective and create a valid value set, as well as data constraints. The technology can make an assignment and assign it to the created data quality type, which in this example is called "test client tier."

In an embodiment, the data classification engine can be arranged to identify the characters that are allowed in a given pattern. The classification engine can be arranged to determine a length, such as, for example, between four and eleven positions. Other lengths are contemplated herein, including less than four positions or more than eleven positions. The data classification engine can be arranged to set an optional default value. If fluctuation occurs, the technology can be arranged to analyze the fluctuation and assess what symbols might be valid.

In non-limiting examples, elements such as "emerging," "enterprise," "medium," "platinum," "small" and "trial" can be analyzed to determine whether any patterns exist, and to identify such pattern and whether the element is a valid value. Any of these can be valid values that the technology read in from the file. The technology can be arranged to include a testing center that allows for creation of different quality types and testing each type in real-time. So, using "enterprise" as an example for a word, the technology can select the term and test it. So, when the technology runs across the term "example enterprise," in order to extract the data from the set, the technology creates a class and a type.

In the second way, the technology can create types from an output of the assessment step in the processing pipeline. In an example, the value "gender" can be tested (for example, "test gender") against the assessed values. In this regard, a user can select a value such as "female" and the technology can determine, based on the value, constraints that qualify other values to also be valid. The technology can refine results so as to generate a results screen tailored to the user needs. The technology can allow a user to adjust or define what and how it is displayed on the user's computing device display.

In an embodiment, the technology can be arranged to select assess values and/or generate valid values based on a data set. For example, an existing project can be opened and a value such as "gender" selected. In this example, the technology can determine that all values that are selected can become valid values. Alternatively, the technology can determine that one or more values that are selected can be identified as invalid. The technology can then build a data type based on selected values.

In various embodiments, the technology can be arranged to ingest, analyze and process unstructured data. In this regard, the classification engine can provide an architecture that enables the technology to be able to deal with unstructured data. As an example of an application of the technology, it can be used to handle structured and unstructured data such as phone or voice call records, including analyzing and identifying values such as, for example, phone number, account number, contact name, first name, last name, etc.

In some embodiments, the technology can be arranged, at a high-level architecture, to analyze structured or unstructured data and identify data types and classes of data and identify whether something is valid or not; and, when it is determined not to be valid, the technology is arranged to extract good data when it is present and run it through the processing pipeline. The technology can be arranged to structure non-structured data, and to correct the most prevalent or the most common data quality problems, such as, for example, in "mixed content" or "overloaded value."

In an example, where data is supposed to include a first name, for instance, and all information contained in the record does not include this value, this can present a problem that the technology can identify and correct. For instance, the technology can analyze the data and infer values that are likely a contact name or a first name from the context. The technology can then infer a contact name or a first name from the data.

Figure 2:
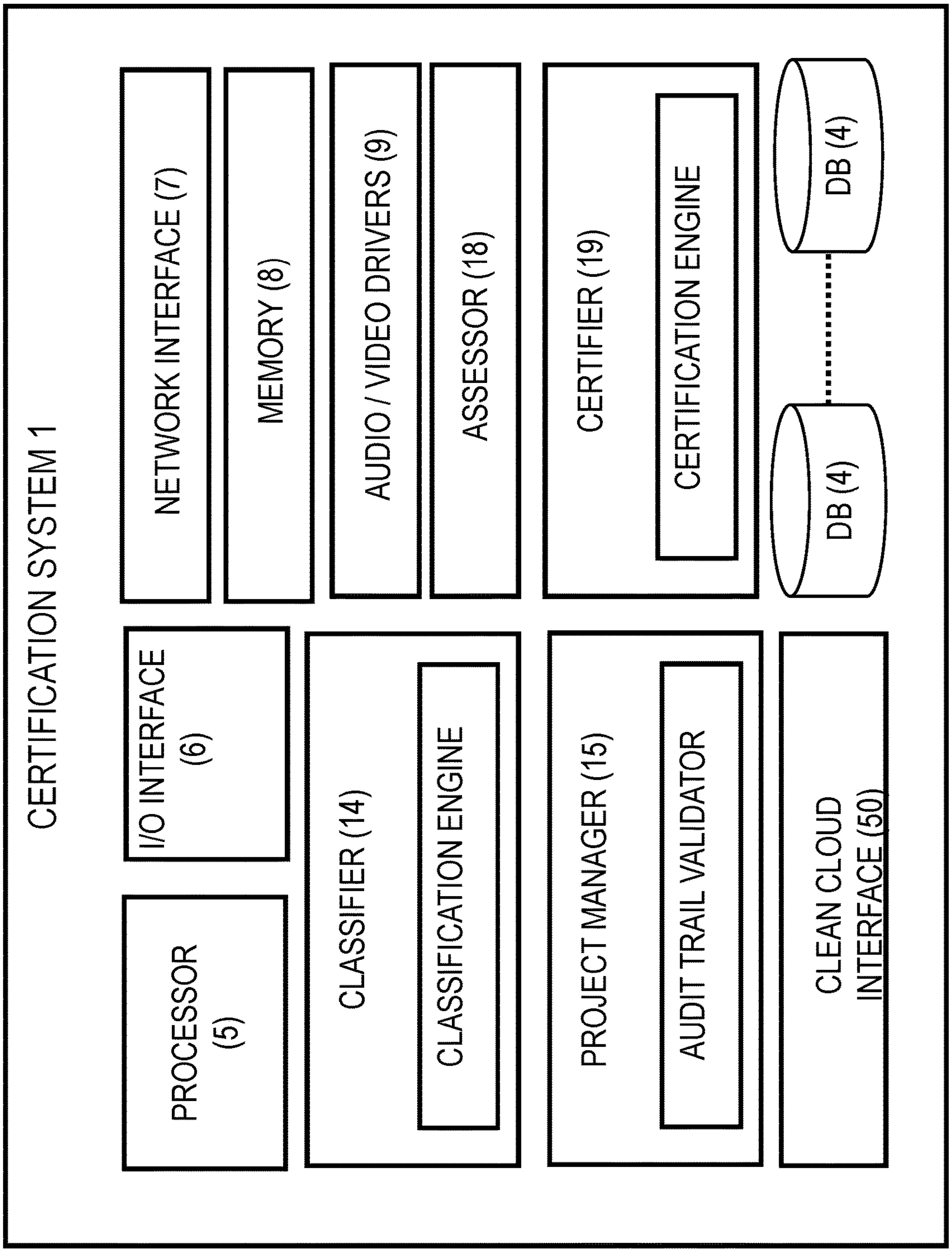

FIGS. 1 and 2 depict block diagrams of a system 1 that includes the technology, according to the principles of the disclosure. The system 1 can in include a combination of computer resources assets, including a database 4, a processor 5, an input-output (I/O) interface 6, a network interface 7, a memory 8, an audio and video driver 9, a transceiver (not shown), a classifier 14, a project manager 15, an assessor 18, and a certifier 19. The system 1 can include a clean cloud interface 50, which can be configured to communicate with a remote server. The database 4 can include a database server. The database 4 can include a structured database 11, a certified repository 20, and a certified structured database 22. Any of the computer resources assets can be interconnected using various communication links, including buses, and can be mounted on a common motherboard or provided as separate computing devices. The system 1, including any of the computer resource assets contained in the system, can be configured to perform each process depicted in FIGS. 3.1 through 10.13. Since the drawings form part of the instant disclosure and are included herein, aspects of the drawings that are clear and understandable from the illustrations will not be repeated herein to avoid redundancy where possible.

The processor 5 can be arranged to process instructions for execution, including instructions stored in the memory. The processor can be arranged to generate and send or display graphical information for a GUI on a display screen, including, for example, an external input/output computer resource asset such as a computing device that can be coupled to a communication system via a communication link such as, for example, over a network. In other implementations, multiple processors or multiple buses can be used, as appropriate, along with multiple memories and types of memory. The computer resource asset can be connected with any computer resource asset in a user environment and arranged to provide portions of the necessary operations, such as, for example, a server bank, a group of blade servers, or a multi-processor system.

The processor 5 can include any of various commercially available processors. The processor can include a computing device. Dual microprocessors and other multi-processor architectures can be employed as the processor. The processor can include a central processing unit (CPU) or a graphic processing unit (GPU). The processor can be arranged to interact with any of the computer resource assets in the communication system to carry out or facilitate with the processes described herein.

Any of the computer resources contained in the system 1 can be communicatively coupled to a bus. The bus can include any of several types of bus structures that can further interconnect to a memory bus (with or without a memory controller), a peripheral bus, and a local bus using any of a variety of commercially available bus architectures.

The memory 8 can include a read-only memory (ROM), a random-access memory (RAM), a hard disk drive (HDD), an optical disk drive (ODD), and a database (DB). The memory can provide nonvolatile storage of data, data structures, and computer-executable instructions, and can accommodate the storage of any data in a suitable digital format. The memory can include a computer-readable medium that can hold executable or interpretable computer code (or instructions) that, when executed by the processor, cause the steps, processes and methods in this disclosure to be carried out. The computer-readable medium can be contained in the memory, and can include sections of computer code contained in a non-transitory medium.

A basic input-output system (BIOS) can be stored in the ROM, which can include, for example, a non-volatile memory, an erasable programmable read-only memory (EPROM), or an electrically erasable programmable read-only memory (EEPROM). The BIOS can contain the basic routines that help to transfer information between any one or more of the computing resource assets, such as during start-up.

The RAM can include dynamic random-access memory (DRAM), a synchronous dynamic random-access memory (SDRAM), a static random-access memory (SRAM), a nonvolatile random-access memory (NVRAM), or another high-speed RAM for caching data.

The HDD can include, for example, an enhanced integrated drive electronics (EIDE) drive, a serial advanced technology attachments (SATA) drive, or any suitable hard disk drive for use with big data. The HDD can be configured for external use in a suitable chassis (not shown).

The ODD can be arranged to read or write from or to a compact disk (CD)-ROM disk (not shown), or, read from or write to other high capacity optical media such as a digital versatile disk (DVD).

The HDD or ODD can be connected to the bus by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications.

The DB 4 can include one or more databases, including, for example, one or more relational databases. The DB can store machine learning (ML) training datasets and ML testing datasets for building and/or training a machine learning (ML) model. In an embodiment, one or more of the computer resource assets can include a machine learning platform that can be configured to build a machine learning model and train the ML model to perform the operations disclosed herein. The ML model can be trained to analyze audible, visual, textual or other content. The ML model can be loaded, for example, into the RAM, and run by the processor executing computer resource processes on the ML platform. The training datasets can be updated periodically (or continuously) with updated parametric values, such as, for example, during parametric tuning of the ML model.

The memory 8 can be arranged to provide mass storage, for example, in the DB 4. The memory can include a database server storage. The memory can contain a computer-readable medium, such as a solid-state drive (SSD), a hard disk device, an optical disk device, a flash memory or other similar solid-state memory device, or an array of devices, including devices in a storage area network or other configurations.

A computer program product can be tangibly embodied in a non-transitory computer-readable medium, which can be contained in the memory. The computer program product can contain instructions that, when executed, perform one or more methods or operations, such as those included in this disclosure. The computer-readable medium can include an information carrier such as the memory or memory on processor.

Any number of computer resources can be stored in the memory, including, for example, a program module, an operating system, an application program, an application program interface (API), or program data. The computing resource can include an API such as, for example, a web API, a simple object access protocol (SOAP) API, a remote procedure call (RPC) API, a representation state transfer (REST) API, or any other utility or service API. Any (or all) of the operating system, application programs, APIs, program modules, and program data can be cached in the RAM as executable sections of computer code.

The API can include an API for a markup language such as, for example, SGML, SVG, HTML, XHTML/XML), XUL, or LaTeX.

The API can include an API for a style sheet language, such as, for example, CSS, DSSSL, or XSL. The API can include a web-based API, an operating system API, a database system API, a computer hardware API, or a library API. The API can include, for example, one or more of the APIs available at <<https://developers.google.com>>.

The API can include one or more APIs that connect webpages to scripts or programing languages, including modeling (for example, SGML, SVG, HTML, XHTML/XML, XUL) documents as objects.

The API can include a document object model (DOM) API, such as for HTML or XML (for example, DOM5 HTML), that can create object-oriented representations of AV content that can be modified with a scripting module (not shown). A DOM can include a cross-platform and language-independent convention for representing and interacting with objects in HTML, XHTML/XML, SGML, SVG, or XUL.

The network interface 7 can be connected to a network, which can include the Internet. The network interface can include a wired or a wireless communication network interface (not shown) or a modem (not shown). When used in a local area network (LAN), the computer resource asset can be connected to the LAN network through the wired or wireless communication network interface; and, when used in a wide area network (WAN), the computer resource asset can be connected to the WAN network through the modem. The modem (not shown) can be internal or external and wired or wireless. The modem can be connected to the system bus via, for example, a serial port interface (not shown). The network interface can include a receiver (not shown), a transmitter (not shown) or a transceiver (not shown).

The input-output (IO) interface 6 can receive commands or data from an operator via a user interface (not shown), such as, for example, a keyboard (not shown), a mouse (not shown), a pointer (not shown), a stylus (not shown), a microphone (not shown), a speaker (not shown), or a display device (not shown). The received commands and data can be forwarded from the IO interface as instruction to data signals, via the bus, to any of the computer resource assets in the embodiments depicted in any of the Figures.

The driver suite 9 can include an audio driver and a video driver. The audio driver can include a sound card, a sound driver, an interactive voice response (IVR) unit, or any other device necessary to render a sound signal on a sound production device, such as for example, a speaker. The video driver can include a video card, a graphics driver, a video adaptor, or any other device necessary to render an image signal on a display device.

The system 1 can be included in a user environment comprising a computer network, such as, for example, an enterprise computer network, a private computer network, or a public computer network. The system 1 can be connected to any number of computer resource assets on, or via, the computer network. The user environment can include a backbone network that interconnects various computing devices and communicating devices. The user environment can include one or more switching and distribution layers. The switching and distribution layers can include one or more layers of switching devices or router devices that connect the computer resource assets in the user environment, including, for example, one or more communicating devices, computing devices or a network computer resource assets. The router devices can be connected to the network by one or more communication links. The router devices can include a firewall. The switching devices can be connected to the computer resource assets by one or more communication links. The switching devices can include ethernet switches. In various embodiments, the computer resource assets can include a user communication (UC) device operated by any one or more of a project manager, data modeler, team leader, data analyst, or certifier, any of which can interact with the system 1 and communicated data and instruction signals, including receiving audio-video rendering instructions to render a GUI on the UC device.

The system 1 can store and manage identification and location information for, and pathways to, each computer resource asset in the user environment, including, for example, an Internet Protocol (IP) address, a MAC address, a network address, or a geolocation. The IP address can include a 32-bit number (e.g., IPv4) or a 128-bit number (IPv6). The identification and location information can identify each computer resource asset that interacts with the system 1, the location of the computer resource asset, and the operator at the computer resource asset, including, for example, the role assigned to that operator (for example, manager, modeler, analyst, lead, certifier).

Referring to FIGS. 1 and 2, the system 1 can be configured to integrate with one or more network applications, including enterprise applications, and efficiently and effectively resolve workflow requests. The technology can be arranged to integrate or interact with a customer relationship management (CRM) system. A workflow request can include a workflow approval request in an enterprise network. The technology can generate a workflow process for a workflow request and route the workflow request according to the workflow process.

The system 1 can provide many significant and important advantages and benefits to a user environment, including, for example, SAP and non-SAP automated processes. The technology solution can include a machine learning (ML) platform and model builder for a skeletal architecture of a workflow process. The technology can decouple the workflow process from an enterprise by creating workflow processes that fit any enterprise process, without any specialized tools.

The computer resource assets can be arranged in the system 1 to integrate one or more attributes from one or more source systems. In an embodiment, the system 1 can be arranged to integrate, for example, 150 attributes from, for example, 21 sources. In this embodiment, the system 1 can be arranged to analyze each of the 150 attributes in every single one of the 21 sources.

The system 1 can include a cloud-based network system, which can be configured to interact with computer resource assets via the Internet by means of the network interface 7 or the clean cloud interface 50, including, for example, one or more communicating devices (not shown).

In various embodiments, the database 4 can be configured to store certified data in the certified repository 20, and to store certified structured data in the certified structured database 22. The system 1 can be arranged to identify 100% of the value level data quality problems and (i) resolve them, (ii) determine whether they can be fixed, or (iii) implement default methods wherein there are no bad values within a specific attribute at a value level.

In various embodiments, the system 1 can include one or more machine learning (ML) platforms, including a supervised machine learning platform, an unsupervised machine learning platform or a hybrid machine learning platform that includes both supervised and unsupervised machine learning. The machine learning platform can include, for example, Generative Pre-trained Transformer 3 (GPT-3), an artificial neural network (ANN), a convolutional neural network (CNN), a temporal convolutional network (TCN), a deep CNN (DCNN), an RCNN, a Mask-RCNN, a deep convolutional encoder-decoder (DCED), a recurrent neural network (RNN), a neural Turing machine (NTM), a differential neural computer (DNC), a support vector machine (SVM), a deep learning neural network (DLNN), a long short-term memory (LSTM), Naïve Bayes, decision trees, linear regression, Q-learning, temporal difference (TD), deep adversarial networks, fuzzy logic, or any other machine intelligence platform capable of supervised or unsupervised machine learning. The system 1 can include one or more platform-neutral or platform-agnostic APIs. The technology can include, for example, Standard Regression (SR), Support Vector Regression (SVR), Ridge Regression (Ridge), Random Forest (RF), Autoregressive Integrated Moving Average (ARIMA), Vector Auto Regression (VAR), Arbitrage of Forecasting Expert (AFE), Extra-Tree Regression (ETR), Multilayer Perceptron (MLPR), or Vector Error Correction Model (VECM), or another intelligent technology.

The system 1 can be arranged to output and send data results to a data community, allowing the data community to then certify those results. The system 1 can include data governance. Data quality can be a part of it. The data community's role can be to validate that the data classification was done correctly. Accordingly, the technology can provide data of the highest quality possible.

The system 1 can include defined roles for the data community, including roles necessary to have a successful certification, all of which can be memorialized by the technology. The system 1 can include a real-time workforce management (RTWM) solution. The RTWM system can be configured to drive an entire process, including the work and the actual application itself. FIGS. 3.1 through 3.27 depict various operations of the RTWM system, according to the principles of the disclosure.

Referring to FIG. 3.1, in an embodiment of the RTWM system, a project manager can create a project and monitor project work in real-time. A project worker can be monitored in real-time as the project is worked through completion. The project worker's progress on each work assignment can be monitored in real-time.

As seen in the embodiment depicted in FIG. 3.2, the RTWM system can receive a request from a communicating device of a project manager to create a project. The RTWM system will create a management time tracking record for the project and create the work project. The system can identify the work tasks to be completed and the roles required to complete those tasks. The system can then assign resources to project roles, which can include computer resource assets or roles. The system can define the task workflow, create a work project plan, create a work schedule and initialize the project plan with schedule dates and hours. The system can make custom resource assignments, including assigning roles or computer resource assets to a portion of the assignment. The system can initiate the work schedule and end the project creation process.

FIGS. 3.3 through 3.27 depict operations that can be performed by the processor 5, including: creating a work project based on the process depicted in FIG. 3.3; identifying work tasks to be completed according to the process depicted in FIG. 3.4; identifying the project roles according to the process depicted in FIG. 3.5; assigning resources, including computer resource assets or human resources, to project roles according to the process depicted in FIG. 3.6; defining the task workflow according to the process depicted in FIG. 3.7; creating a work project plan according to the process depicted in FIG. 3.8; creating a work schedule according to the process depicted in FIG. 3.9; initializing a project plan with schedule dates and times according to the process depicted in FIGS. 3.10A, 3.10B; creating customized resource assignments, including computer resource assets or human resources, according to the process depicted in FIG. 3.11; initiating a work schedule according to the process depicted in FIG. 3.12; monitoring project work in real-time according to the process depicted in FIG. 3.13; managing a project according to the process depicted in FIG. 3.14; updating project resources according to the process depicted in FIG. 3.15; updating a work schedule according to the process depicted in FIG. 3.16; implementing an updated schedule according to the process depicted in FIGS. 3.17A, 3.17B; initiating an updated schedule according to the process depicted in FIG. 3.18; updating project security according to the process depicted in FIG. 3.19; monitoring a project status according to the process depicted in FIG. 3.20; monitoring project activity according to the process depicted in FIG. 3.21; monitoring a project plan according to the process depicted in FIG. 3.22; completing a scheduled work assignment according to the process depicted in FIG. 3.23; receiving userID and password according to the process depicted in FIG. 3.24; selecting an assignment according to the process depicted in FIG. 3.25; performing work on an assignment according to the process depicted in FIG. 3.26; and completing an assignment according to the process depicted in FIG. 3.27.

As seen in FIGS. 3.1 through 3.27, a project manager can create a project plan and work schedule with resources assigned to all of the roles. This can be required to ensure that the work can be completed without delay. The work schedule and project plan can be tied directly to one another and used to drive the work and workforce. As one work assignment is completed, the next assignment can be automatically released. In this regard, tasks can be added to the work schedule in the proper order of completion, creating a critical work path. When the project plan is initialized, the proper predecessors and successors can be automatically identified and implemented to the project plan tasks and assignments based on the critical work path.

In various embodiments, the order of the work tasks can be fixed, such as, for example, where the RTWM is to be integrated directly into the software for commercial purposes. Accordingly, end users will be prevented from altering the order of the tasks.

In other embodiments, the flexible and adaptable nature of the RTWM system can be implemented to support dynamically assigning the order of the work tasks to allow for custom implementation and to support integration into legacy applications. Supporting the ability to integrate into legacy applications is an objective of the RTWM system. As seen in the process diagrams, the RTWM can be configured to create a work schedule or equivalent, drive the workflow, and track the user automatically as the work is completed, continuously tracking the work in real-time, to the minute. The entire process is automatic, without user intervention. As seen in the processes, the work can be tracked in real-time and the project manager can actually see what work is being worked on by the workers in real-time. The RTWM system gives the project manager absolute control over the project and the work being completed. The system is unbiased to both the worker and the work.

In various embodiments the RTWM system can be configured to support multiple types of work tasks. For instance, most work tasks fall into the critical work path. However, there are tasks that are completed throughout the lifespan of the project. The project manager role itself falls into this category. The data modeler role can also fall into this category. The project manager has a set of tasks and assignments that are necessary to create and maintain the project plan and work schedule. These can be tracked, even when creating a new project. This allows for a complete understanding of the time and cost involved with completing the projects.

FIGS. 4.1 through 4.5 depict embodiments of an initialization process that can be performed by the processor 5, including a manager initialization process depicted in FIG. 4.1, a modeler initialization process depicted in FIG. 4.2, a lead initialization process depicted in FIG. 4.3, an analysis initialization process depicted in FIG. 4.4, and a certification initialization process depicted in FIG. 4.5. Initially, a communication session can be initialized and setup with a user computing (UC) device (not shown), such as, for example, a computing device operated by a manager, a modeler, a team lead, an analyst, a certifier, or individual having another role. During the initialization process, the system 1 can interact with the UC device and, after receiving and validating the UC device or user by means of, for example, a userID and password combination, the appropriate profile for the user can be referenced and the associated access rules and privileges applied for the communication session.

As seen in the processes depicted in FIGS. 4.1 to 4.5, depending on whether the communication session is initialized for a manager (FIG. 4.1), modeler (FIG. 4.2), team lead (FIG. 4.3), analyst FIG. 4.4), or certifier (FIG. 4.5), the system 1 will, in accordance with associated computer executable instructions, perform each of the steps depicted in the process, including, among others, accessing and using a clean cloud management catalog, pulling data quality (DQ) project lists, management projects, creating new project management time tracking files, creating new DQ projects, selecting from existing DQ projects, etc., and sending data and instructions to another computer resource asset in the system, including, for example, the classifier 14 or project manager 15 (shown in FIG. 4.1).

In various embodiments, the classifier 14 comprises a computer resource asset equipped with a classification engine, the project manager 15 includes a computer resource asset equipped with an audit trail validator, and the certifier 19 includes a computer resource asset that is configured to be data-agnostic and certify data regardless of the source or type of data. The classification engine utilizes one or more machine learning (ML) models to infer metadata directly from a value and then use this metadata to forward engineer the data type metadata. In various embodiments, the classifier 14 can be configured to, via the ML models, create or maintain data types.

The metadata inferred by the ML model from the value includes the length, punctuation, symbols, and the pattern. This metadata can then be applied by the system to the data type's metadata, which can include identifying the length range, allowed pattern characters, and required pattern characters. The patterns, symbols, and punctuation can also be captured as part of the data type. The compressed pattern can be inferred by the ML model from the pattern as part of this process.

In various embodiments, the compressed pattern can be employed by the ML model in the data classification engine to identify various types of data. In certain embodiments, the classification engine can classify data without implementation of a compressed pattern ML model. This can be useful for data that may not have consistent patterns or contain extensive variations of patterns. This can apply, for example, to data modeling solution of the system with the semi-structured and unstructured data.

The data type's metadata can be inferred by the ML model directly from values fed to the classification engine when creating or editing the data type. However, the data type's metadata can be edited by the data modeler.

The classification engine can be configured to support entering values to be removed from a data type. The engine, per the ML model, can infer the exact same metadata and perform the same operations, but removing and updating the metadata to no longer support the submitted value, which can include removing the pattern and the compressed pattern.

The ML model in the classification engine can be trained or tuned by feeding it values that it uses to create/update the data types. The classification engine can be configured to infer the metadata directly from the value and adding or removing the metadata to the data type.

As depicted in diagrams, the data types can include model data types (DATA TYPES) and data quality data types (DQ DATA TYPES). The physical data type metadata is exactly the same between both. They can both use the same JAVA object to define the data types, but the ML models that use the data types can contain different logic to process the data types. In various embodiments, the data quality solution of the disclosure uses the data quality data types, classes, and class types.

FIGS. 5.1 through 5.22 depict operations that can be performed by the classifier 14 during a communication session with the UC device of a data modeler, each of which can be performed as depicted, including: performing the data quality (DQ) data modeling process depicted in FIG. 5.1; the DQ data type modeling process depicted in FIG. 5.2; the DQ modeler tracking process depicted in FIG. 5.3; the DQ data type editing process depicted in FIG. 5.4; the modeling DQ data types, editing data types and entering values process depicted in FIG. 5.5; the modeling DQ data types, editing data types and removing values process depicted in FIG. 5.6; the modeling DQ data types, editing data types and loading certified values process depicted in FIG. 5.7; the modeling DQ data types and creating new data types process depicted in FIG. 5.8; the data modeling DQ data types and end modeler tracking process depicted in FIG. 5.9; the modeling DQ data classes process depicted in FIG. 5.10; the modeling DQ data classes and starting modeler tracking process depicted in FIG. 5.11; the modeling DQ data classes and editing data classes process depicted in FIG. 5.12; the modeling DQ data classes, editing data classes, and managing class types process depicted in FIG. 5.13; the modeling DQ data classes, editing data classes, managing class types, and editing data class types process depicted in FIG. 5.14; the modeling DQ data classes, editing data classes, managing class types, and creating data class types process depicted in FIG. 5.15; the modeling DQ data classes and creating data classes process depicted in FIG. 5.16; the modeling DQ data classes and ending modeler tracking process depicted in FIG. 5.17; the testing DQ classification process depicted in FIG. 5.18; the testing DQ classification and identifying DQ process depicted in FIG. 5.19; the testing DQ classification, identifying DQ, and classifying structured values process depicted in FIG. 5.20; the testing DQ classification, identifying DQ and validation process depicted in FIG. 5.21; and the testing DQ classification, identifying DQ and rendering corrections on a GUI process depicted in FIG. 5.22.

FIGS. 5.23 through 5.76 depict embodiments of operations that can be performed by the classifier 14 during a communication session with the UC device of a project manager, any of which can be performed as depicted, including: starting the data quality classifier and beginning to build a data quality project according to the process depicted in FIG. 5.23; building the data quality project according to the process depicted in FIG. 5.24; while building the data quality project, performing management tracking according to the process depicted in FIG. 5.25; while building the data quality project, also building data quality classifications according to the process depicted in FIGS. 5.26A and 5.26B; while building the data quality project, building a data classifications profile according to the process depicted in FIG. 5.27; while the building data quality project, and while also building the data quality classifications, performing assessing data quality according to the process depicted in FIG. 5.28; while building the data quality project, and building the data quality classifications, and assessing data quality, also classifying values according to the process depicted in FIG. 5.29; while building the data quality project, and building the data quality classifications, and assessing data quality, identifying one or more primary attribute classes according to the process depicted in FIG. 5.30; while building the data quality project, and building the data quality classifications, and assessing data quality, also, optionally, pre-certifying values according to the process depicted in FIG. 5.31; while building the data quality project, and building the data quality classifications, and assessing data quality, also performing assessments according to the process depicted in FIGS. 5.32A, 5.32B, 5.32C; while building the data quality project, and building the data quality classifications, and assessing data quality, and performing assessments, also checking values for patterns according to the process depicted in FIG. 5.33; while building the data quality project, and building the data quality classifications, and assessing data quality, and performing assessments, also checking for a range according to the process depicted in FIG. 5.34; while building the data quality project, and building the data quality classifications, and assessing data quality, and performing assessments, also checking symbols according to the process depicted in FIG. 5.35; while building the data quality project, and building the data quality classifications, and assessing data quality, and performing the assessments, also checking punctuation according to the process depicted in FIG. 5.36; while building the data quality project, and building the data quality classifications, and assessing data quality, and performing the assessments, also checking patterns according to the process depicted in FIG. 5.37; while building the data quality project, and building the data quality classifications, also identifying corrections according to the process depicted in FIG. 5.38; while building the data quality project, and building the data quality classifications, and identifying the corrections, also checking overrides according to the process depicted in FIG. 5.39; while building the data quality project, and building the data quality classifications, and identifying corrections, also loading identify types according to the process depicted in FIG. 5.40; while building the data quality project, and building the data quality classifications, modeling DQ data types (mapping between data types that contain valid values, for example, to allow ML platform to convert for instance from gender names to gender abbreviations) according to the process depicted in FIGS. 5.41-1; while building the data quality project, and building the data quality classifications, and modeling the DQ data types, selecting typewalks according to the process depicted in FIGS. 5.41-2; while building the data quality project, and building the data quality classifications, and modeling the DQ data types, and selecting the typewalks, rendering the typewalks on the display of the modeler UC device according to the process depicted in FIGS. 5.41-3; while building the data quality project, and building the data quality classifications, and modeling the DQ data types, and selecting the typewalks, creating typewalks according to the process depicted in FIGS. 5.41-4; while building the data quality project, and building the data quality classifications, and modeling the DQ data types, and selecting the typewalks, deleting a typewalk according to the process depicted in FIGS. 5.41-5; while building the data quality project, and building the data quality classifications, and identifying corrections, also checking typewalks according to the process depicted in FIG. 5.41; while building the data quality project, and building the data quality classifications, and identifying corrections, also checking valid values according to the process depicted in FIG. 5.42; while building the data quality project, and building the data quality classifications, and identifying corrections, also checking patterns according to the process depicted in FIGS. 5.43A, 5.43B; while building the data quality project, and building the data quality classifications, and identifying corrections, and checking patterns, also checking pattern constraints according to the process depicted in FIG. 5.44;

while building the data quality project, and building the data quality classifications, and identifying corrections, and checking patterns, also checking values according to the process depicted in FIG. 5.45; while building the data quality project, and building the data quality classifications, and identifying corrections, and checking patterns, also checking contents of patterns according to the process depicted in FIG. 5.46; while building the data quality project, and building the data quality classifications, and identifying corrections, and checking patterns, also checking the contents of the value according to the process depicted in FIG. 5.47; while building the data quality project, and building the data quality classifications, and identifying corrections, and checking patterns, also checking pattern contents according to the process depicted in FIG. 5.48; while building the data quality project, and building the data quality classifications, and identifying corrections, and checking patterns, also evaluating value contents according to the process depicted in FIG. 5.49; while building the data quality project, and building the data quality classifications, and identifying corrections, and checking patterns, also analyzing value and pattern contents according to the process depicted in FIG. 5.50; while building the data quality project, and building the data quality classifications, and identifying corrections, and checking patterns, also checking pattern contents according to the process depicted in FIG. 5.51; while building the data quality project, and building the data quality classifications, and identifying corrections, and checking patterns, also checking pattern and value contents according to the process depicted in FIG. 5.52; while building the data quality project, and building the data quality classifications, and identifying corrections, and checking patterns, also checking pattern and value contents according to the process depicted in FIG. 5.53; while building the data quality project, and building the data quality classifications, and identifying corrections, and checking patterns, also validating metadata according to the process depicted in FIG. 5.54; while building the data quality project, and building the data quality classifications, and identifying corrections, and checking patterns, also checking secondary patterns according to the process depicted in FIG. 5.55; while building the data quality project, and building the data quality classifications, and identifying corrections, and checking patterns, and checking secondary patterns, also checking pattern constraints according to the process depicted in FIG. 5.56; while building the data quality project, and building the data quality classifications, and identifying corrections, and checking patterns, and checking secondary patterns, also checking value contents according to process depicted in FIG. 5.57; while building the data quality project, and building the data quality classifications, and identifying corrections, and checking patterns, and checking secondary patterns, also checking pattern contents according to the process depicted in FIG. 5.58; while building the data quality project, and building the data quality classifications, and identifying corrections, and checking patterns, and checking secondary patterns, also checking value contents according to the process depicted in FIG. 5.59; while building the data quality project, and building the data quality classifications, and identifying corrections, and checking patterns, and checking secondary patterns, also checking pattern contents according to the process depicted in FIG. 5.60; while building the data quality project, and building the data quality classifications, and identifying corrections, and checking patterns, and checking secondary patterns, also checking value contents according to the process depicted in FIG. 5.61; while building the data quality project, and building the data quality classifications, and identifying corrections, and checking patterns, and checking secondary patterns, also checking value and pattern contents according to the process depicted in FIG. 5.62; while building the data quality project, and building the data quality classifications, and identifying corrections, and checking patterns, and checking secondary patterns, also checking pattern contents according to the process depicted in FIG. 5.63; while building the data quality project, and building the data quality classifications, and identifying corrections, and checking patterns, and checking secondary patterns, also checking pattern and value contents according to the process depicted in FIG. 5.64; while building the data quality project, and building the data quality classifications, and identifying corrections, and checking patterns, and checking secondary patterns, also checking pattern and value contents according to the process depicted in FIG. 5.65; while building the data quality project, and building the data quality classifications, and identifying corrections, and checking patterns, and checking secondary patterns, also validating metadata according to the process depicted in FIG. 5.66; while building the data quality project, and building the data quality classifications, also performing reduction according to the process depicted in FIG. 5.67; while building the data quality project, and building the data quality classifications, also applying distinct corrections according to the process depicted in FIG. 5.68; while building the data quality project, and building the data quality classifications, also building data quality CSVs (Comma Separated Value) according to the process depicted in FIG. 5.69; while building the data quality project, and building the data quality classifications, also validating original values according to the process depicted in FIG. 5.70; while building the data quality project, and building the data quality classifications, also validating recommended values according to the process depicted in FIG. 5.71; while building the data quality project, and building the data quality classifications, and validating recommended values, also validating a recommended value according to the process depicted in FIGS. 5.72A and 5.72B; while building the data quality project, and building the data quality classifications, also validating final values according to the process depicted in FIG. 5.73; while building the data quality project, and building the data quality classifications, also creating corrections certification according to the process depicted in FIG. 5.74; while building the data quality project, and building the data quality classifications, also creating valids certification according to the process depicted in FIG. 5.75; and, while building the data quality project, also ending manager tracking according to the process depicted in FIG. 5.76. It is noted that the processes described above can be carried out in a different order, and some processes can be optionally omitted.

FIGS. 6.1 through 6.44 depict embodiments of operations that can be performed by the project manager 15 during a communication session with the UC device of a project manager, each of which can be performed as depicted, including: managing a project according to the processes depicted in FIGS. 6.1, 6.2; while managing the project, commencing manager tracking according to the process depicted in FIG. 6.3; while managing the project, also building management files according to the process depicted in FIGS. 6.4A, 6.4B; while managing the project, also scheduling workflow according to the process depicted in FIG. 6.5; while managing the project, and scheduling the workflow, also implementing the workflow according to the process depicted in FIGS. 6.6A, 6.6B, 6.6C; while managing the project, and scheduling the workflow, also initiating a workflow according to the process depicted in FIG. 6.7; while managing the project, also managing project security according to the process depicted in FIG. 6.8; while managing the project, ending manager tracking according to the process depicted in FIG. 6.9; commencing project status processing according to the process depicted in FIG. 6.10; while processing the project status, also commencing manager tracking according to the process depicted in FIG. 6.11; while processing the project status also building certification according to the process depicted in FIGS. 6.12A, 6.12B; while processing the project status, and building the certification, also performing reduction according to the process depicted in FIG. 6.13; while processing the project status, and building the certification, also applying the distinct corrections according to the process depicted in FIG. 6.14; while processing the project status, and building the certification, also building data quality CSVs according to the process depicted in FIG. 6.15; while processing the project status, and building the certification, also validating original values according to the process depicted in FIG. 6.16; while processing the project status, and building the certification, also validating recommended values according to the process depicted in FIG. 6.17; while processing the project status, and building the certification, and validating recommended values, also validating a recommended value according to the process depicted in FIGS. 6.18A, 6.18B; while processing the project status, and building the certification, also validating final values according to the process depicted in FIG. 6.19; while processing the project status, and building the certification, also creating corrections certifications according to the process depicted in FIG. 6.20; while processing the project status, and building the certification, also creating valids certification according to the process depicted in FIG. 6.21; while processing the project status, resolving any certification disputes according to the process depicted in FIGS. 6.22A, 6.22B; while processing the project status, and resolving certification disputes, also resolving certification according to the process depicted in FIG. 6.23; while processing the project status, and resolving certification disputes, and resolving certification, also applying distinct corrections according to the process depicted in FIG. 6.24; while processing the project status, and resolving certification disputes, and resolving certification, also building data quality CSVs according to the process depicted in FIG. 6.25; while processing the project status, and resolving certification disputes, and resolving certification, also validating original values according to the process depicted in FIG. 6.26; while processing the project status, and resolving certification disputes, and resolving certification, also validating recommended values according to the process depicted in FIG. 6.27; while processing the project status, and resolving certification disputes, and resolving certification, and validating recommended values, also validating a recommended value according to the process depicted in FIGS. 6.28A, 6.28B; while processing the project status, and resolving certification disputes, and resolving certification, also validating final values according to the process depicted in FIG. 6.29; while processing the project status, also validating completion of certification according to the process depicted in FIG. 6.30; while processing the project status, also ending manager tracking according to the process depicted in FIG. 6.31; commencing a project activity according to the process depicted in FIG. 6.32; while processing the project activity, starting manager tracking according to the process depicted in FIG. 6.33; while processing the project activity, clearing inactive workflow operations according to the process depicted in FIG. 6.34; while processing the project activity, ending manager tracking according to the process depicted in FIG. 6.35; commencing to monitor a project plan according to the process depicted in FIG. 6.36; while monitoring the project plan, starting manager tracking according to the process depicted in FIG. 6.37; while monitoring the project plan, monitoring an assessment according to the process depicted in FIG. 6.38; while monitoring the project plan, monitoring identify operations according to the process depicted in FIG. 6.39; while monitoring the project plan, also monitoring valids certification according to the process depicted in FIG. 6.40; while monitoring the project plan, also monitoring corrections certification according to the process depicted in FIG. 6.41; while monitoring the project plan, also monitoring data modeling according to the process depicted in FIG. 6.42; while monitoring the project plan, also monitoring project management according to the process depicted in FIG. 6.43; and, while monitoring the project plan, ending manager tracking according to the process depicted in FIG. 6.44. In various embodiments, the processes discussed above are carried out in various different orders.

FIGS. 7.1 through 7.22 depict embodiments of operations that can be performed by the assessor 18 during a communication session with the UC device of an analyst, each of which can be performed as depicted, including: starting a data quality assessment according to the process depicted in FIG. 7.1; while processing the data quality assessment, starting assessor analysis tracking according to the process depicted in FIG. 7.2; while processing the data quality assessment, reviewing passed values according to the process depicted in FIG. 7.3; while processing the data quality assessment, and reviewing passed values, also securing attribute passed values according to the process depicted in FIG. 7.4; while processing the data quality assessment, reviewing failed values by reason according to the process depicted in FIG. 7.5; while processing the data quality assessment, and reviewing the failed values by reason, securing attribute failed values according to the process depicted in FIG. 7.6; while processing the data quality assessment, completing attribute assessment according to the process depicted in FIG. 7.7; while processing the data quality assessment, ending assessor analyst tracking according to the process depicted in FIG. 7.8; commencing identify analysis according to the process depicted in FIG. 7.9; while processing the analysis, starting identify analyst tracking according to the process depicted in FIG. 7.10; while processing the analysis, selecting review total values according to the process depicted in FIG. 7.11; while processing the analysis, and selecting review total values, also secure attribute identify frequencies (FIG. 7.12); while processing the analysis, and selecting review total values, loading data type values according the process depicted in FIG. 7.13; while processing the analysis, reviewing corrected values according to the process depicted in FIG. 7.14; while processing the analysis, and reviewing the corrected values, securing attribute identify frequencies according to the process depicted in FIG. 7.15; while processing the analysis, and reviewing the corrected values, loading data types according to the process depicted in FIG. 7.16; while processing the analysis, reviewing defaulted values according to the process depicted in FIG. 7.17; while processing the analysis, and reviewing the defaulted values, securing attribute identify frequencies according to the process depicted in FIG. 7.18; while processing the analysis, and reviewing the defaulted values, load data type values according to the process depicted in FIG. 7.19; while processing the analysis, starting identifying attributes according to the process depicted in FIG. 7.20; while processing the analysis, complete identifying attributes according to the process depicted in FIG. 7.21; and, while processing the analysis, ending identify analyst tracking according to the process depicted in FIG. 7.22. In various embodiments, the processes discussed above are carried out in various different orders.

FIGS. 7.23 through 7.44 depict embodiments of operations that can be performed by the assessor 18 during a communication session with the UC device of a team lead, each of which can be performed as depicted, including: starting a data quality assessment according to the process depicted in FIG. 7.23; while processing the data quality assessment, starting assess lead tracking according to the process depicted in FIG. 7.24; while processing the data quality assessment, reviewing passed values according to the process depicted in FIG. 7.25; while processing the data quality assessment, and reviewing the passed values, securing attribute passed values according to the process depicted in FIG. 7.26; while processing the data quality assessment, reviewing failed values by reason according to the process depicted in FIG. 7.27; while processing the data quality assessment, and reviewing the failed values by reason, securing attribute failed values according to the process depicted in FIG. 7.28; while processing the data quality assessment, completing attribute assessment according to the process depicted in FIG. 7.29; while processing the data quality assessment, ending assess lead tracking according to the process depicted in FIG. 7.30; start identify analysis according to the process depicted in FIG. 7.31; while processing the analysis, start identify lead tracking according to the process depicted in FIG. 7.32; while processing the analysis, selecting review total values according to the process depicted in FIG. 7.33; while processing the analysis, and reviewing total values, securing attribute identify frequencies according to the process depicted in FIG. 7.34; while processing the analysis, and reviewing total values, load data type values according to the process depicted in FIG. 7.35; while processing the analysis, reviewing corrected values according to the process depicted in FIG. 7.36; while processing the analysis, and reviewing the corrected values, securing attribute identify frequencies according to the process depicted in FIG. 7.37; while processing the analysis, and reviewing the corrected values, load data types according to the process depicted in FIG. 7.38; while processing the analysis, reviewing defaulted values according to the process depicted in FIG. 7.39; while processing the analysis, and reviewing defaulted values, securing attribute identify frequencies according to the process depicted in FIG. 7.40; while processing the analysis, and reviewing the defaulted values, load data type values according to the process depicted in FIG. 7.41; while processing the analysis, processing attributes according to the process depicted in FIG. 7.42; while processing the analysis, completing attribute identify according to the process depicted in FIG. 7.43; and, while processing the analysis, ending identify lead tracking according to the process depicted in FIG. 7.44. In various embodiments, the processes discussed above are carried out in various different orders.

FIGS. 8.1 through 8.14 depict embodiments of operations that can be performed by the certifier 19 during a communication session with the UC device of a certifier, each of which can be performed as depicted, including: starting a value corrections certification process according to the process depicted in FIG. 8.1; while processing the corrections, starting certify corrections tracking according to the process depicted in FIG. 8.2; while processing the corrections, securing attribute value corrections certification according to the process depicted in FIG. 8.3; while processing the corrections, saving disputes according to the process depicted in FIG. 8.4; while processing the corrections, saving challenge disputes according to the process depicted in FIG. 8.5; while processing the corrections, certifying attribute value corrections according to the process depicted in FIGS. 8.6A, 8.6B; while processing the corrections, ending certify corrections tracking according to the process depicted in FIG. 8.7; start valids certification according to the process depicted in FIG. 8.8; while processing certification of valids, starting certify valids tracking according to the process depicted in FIG. 8.9; while processing certification of valids, securing attribute valids value certification frequencies according to the process depicted in FIG. 8.10; while processing certification of valids, saving disputes according to the process depicted in FIG. 8.11; while processing certification of valids, saving challenge disputes according to the process depicted in FIG. 8.12; while processing certification of valids, certifying attribute valid values according to the process depicted in FIGS. 8.13A, 8.13B; and, while processing certification of valids, ending certify valids tracking according to the process depicted in FIG. 8.14. In various embodiments, the processes discussed above are carried out in various different orders.

FIGS. 9.1A through 9.9 depict embodiments of operations that can be performed by the certified repository 20 during a communication session with the UC device of a modeler, each of which can be performed as depicted, including: open a certified data quality repository according to the process depicted in FIGS. 9.1A, 9.1B; starting modeling tracking according to the process depicted in FIG. 9.2; securing certified data class values according to the process depicted in FIG. 9.3; preparing CSV load files according to the process depicted in FIG. 9.4; while preparing CSVs, starting the profiler according to the process depicted in FIG. 9.5; securing attribute value frequencies according to the process depicted in FIG. 9.6; performing certify mass load attribute according to the process depicted in FIG. 9.7; and loading mass load attributes according to the process depicted in FIG. 9.8; also ending modeling tracking according to the process depicted in FIG. 9.9. In various embodiments, the processes discussed above are carried out in various different orders.

In various embodiments, the ML platform can be configured to perform data class inference in a number of ways. In an embodiment, the ML model operating in the classifier 14 can be configured to determine the data type for a value. The classifier 14 can assign values to all data types. For instance, the classifier can be configured to handle one or more sets of system data types and classes that can provide coverage for all forms of data. The classifier 14 can be configured such that, if a value does not match any of the non-system data types, to evaluate the data types at a basic level to identify numeric, alpha, and character data, where character data allows all character formats. This is how the classifier 14 can ensure that each value will be classified, regardless of data type.

In an embodiment, the classifier 14 can be configured to, even if it runs into circumstances where the data type accuracy is for example, about 70-80%, the classifier 14 can still identify the data class with 100% accuracy. As illustrated in the various processes depicted in the drawings, one or more operations can be executed to determine the data class and the primary data quality data class type for an attribute (this can be specific to structured data), and sort the data type frequencies into descending order. The classier 14 can be configured to assign, for example, the top two data types to the primary and secondary data class types. The classifier 14 can, accordingly, differentiate data class types from one another and allow different forms of a value to be assigned to a class.

For example, if a data type is defined that supports social security numbers with the format NNNSNNSNNNN, where the sign (S) is a hyphen (-). The classifier 14 can be configured or trained to look for a second data type that supports social security numbers with only a numeric format NNNNNNNNN. The classifier 14 can take the different data types and assign them to the social security data class. In this example the classifier 14 can make two data class types, where the first one supports the social security data type with hyphens by selecting this data type as the primary data class type, the secondary data type for the data class would be left null. The second data class type would support the social security data type that is all numeric by assigning that data type as the primary and leaving the secondary data type set to null. When the data is classified, both forms of the data will be identified as social security number data classes.

The classifier 14 can be configured to reverse engineer a data class from the primary and secondary data class types and leverage the data class type for analysis. A significant benefit provided by the classifier 14 is the capability to provide 100% accuracy based on the value itself. There is no human interference in the execution of the classification engine and yet it yields results that average in the 90th or greater percentile for accuracy. Also, the system does not need any external or documented metadata, it can operate entirely autonomously based on the input tangible media to accomplish the classification of the data. The tangible media can include any multimedia, including, for example, textual content, audio content or video content input into the system in digital form. The system 1 can be configured to infer all the metadata used to classify the data from the data itself. The classifier 14 can be configured to be entirely driven by the data itself, from the creation of the data types to the classification of the values, all metadata can be inferred from the data itself.

The system 1 is configured to isolate data quality problems and automatically resolve them. As seen in the processes depicted in the drawings, the system 1 is configured with an ability to resolve any overloaded value data quality problems, which can occur, for example, where too much information is present. For instance, if the value is supposed to be a phone number, but instead it is a phone number with an extension "(800)555-1234 ext. 202". In this example, the system 1 will automatically extract the valid phone number "(800)555-1234" from the invalid value. Through compression matching, the system 1 can identify the valid compressed version of the phone number in the invalid value and extract it. The value can be then passed through the validation process, as identified in the data quality diagrams in the drawings for the identify and check pattern flow processes and their children processes.

Figure 10:
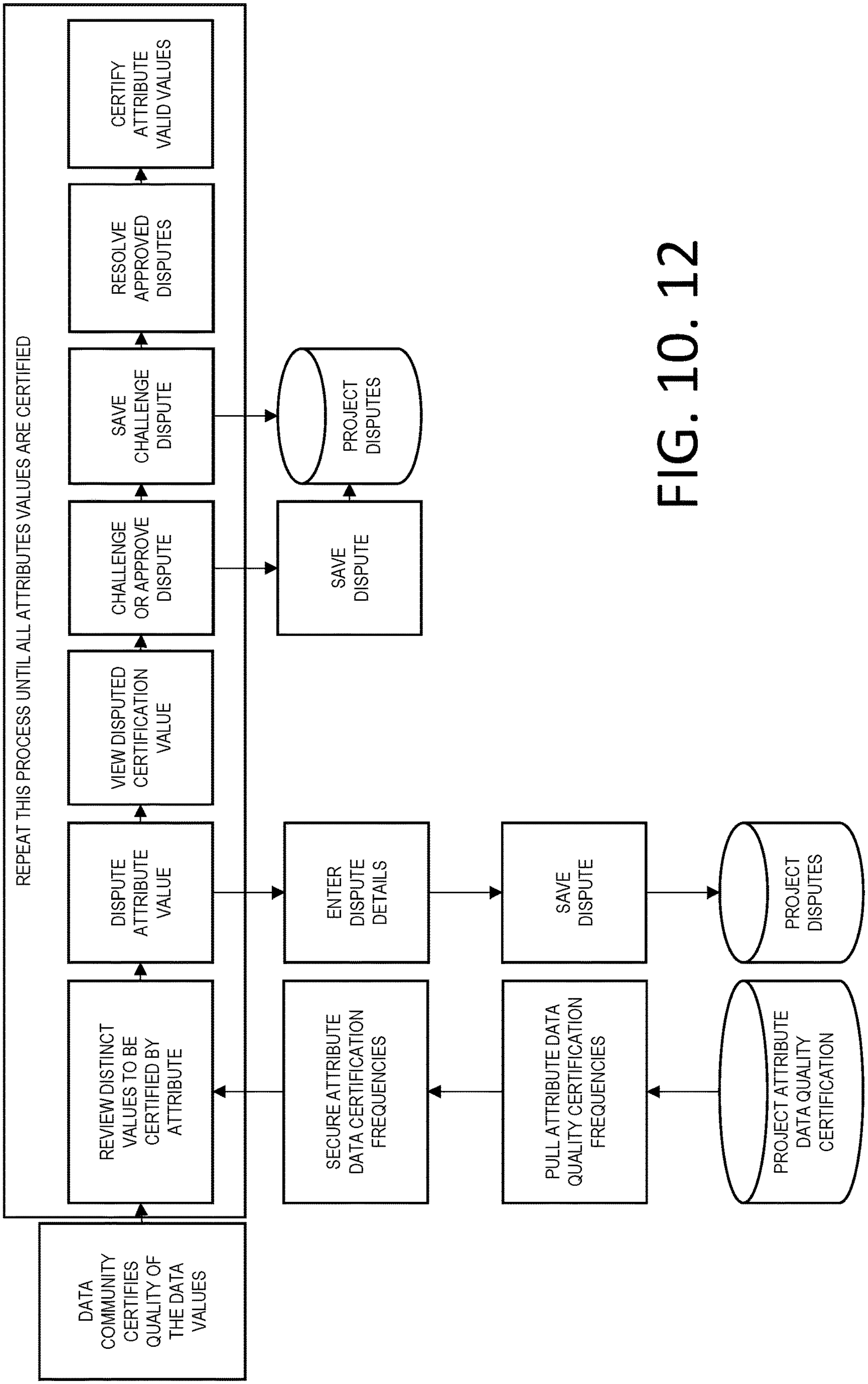
FIGS. 10.1-10.13 depict block diagrams of various processes to create/maintain data type operations by the RTWM system.

FIGS. 10.1 through 10.13 depict an embodiment of create/maintain data type operations, including processes for creating data types and for maintaining or managing data types, which can be performed by the classifier 14 according to the principles of the disclosure. In an embodiment, the operations can be performed under control of the processor 5 (shown in FIG. 2) through execution of computer program instructions contained in a non-transitory computer storage medium.

Referring to FIGS. 2 and 10.1 contemporaneously, a digital input that can include an entered value to add can be received at an input of the classification engine (shown in FIG. 2). Based on the digital input, the ML model in the classifier 14 can infer value metadata, including for example, value length, punctuation, symbols or patterns. The ML model can be included in the classification engine (shown in FIG. 2). The inferred value metadata can be consolidated into data type metadata, such as, for example, a length range, allowed pattern characters, required pattern characters, or compressed pattern. The associated data type can be created or updated and forwarded to the database 4.

The classification engine can receive one or more values to remove and, based on the input, the classification engine can infer value metadata, such as, for example, value length, punctuation, symbols, or pattern, and remove metadata from the data type metadata, such as, for example, length range, allowed pattern characters, required pattern characters, or compressed pattern. The data type can be updated and forwarded to the database 4.

FIG. 10.2 depicts an embodiment of a process for inferring a data class and classifying a value. Based on the input (in FIG. 10.1), the value can be analyzed by the ML model to identify a pattern, which can then be used to create a compressed pattern. The data quality data types stored in the database 4 (shown in FIG. 2) can be queried and retrieved by the ML platform. The pulled data types can be analyzed by the ML model and the data type compressed patterns and data type constraints can be pulled by the ML platform from the retrieved data types. The ML model, having as inputs the compressed pattern and the pulled data types, can loop through compressed patterns until all constraints are passed. The ML model can further loop through the data types until all constraints are passed. Once all constraints are passed, the ML platform can return to classification.

FIG. 10.3 depicts an embodiment of a process for inferring a data class and identifying a primary attribute class. The classification engine can be configured to begin and identify a primary attribute class, pull data type frequencies from a database comprised of attribute content frequencies, and sort the attribute class into descending order by frequency count, setting the primary attribute class to the first data type and the secondary attribute class to the second data type based on the frequency of occurrence of the attribute content in, for example, a compendium. The ML model can be trained or parametrically tuned to loop through class types until a match is predicted. The ML model can match primary and secondary to class type and predict a match and an associated score that indicates a level of certainty of the prediction (for example, 0 to 100, with 0 being uncertain and 100 being 100% certain). In matching the data types, the ML platform can query and pull data class types from a database containing data class types.

FIG. 10.4 depicts an embodiment of a process for resolving a data quality problem by the ML model. After receiving one or more failed values as input, the ML model can identify a failed value pattern and a compressed failed value pattern. The ML model can be trained, or parametrically tuned, to pull primary identify data types and pull primary identify type valid compressed patterns and loop through valid compressed patterns until a validated match is determined. The ML platform can analyze the failed compressed pattern for valid compressed patterns and extract matched pattern values. The extracted matched pattern value can be validated against data type constraints and a validated recommended value predicted.

By the process depicted in FIG. 10.4, based on an invalid value, a failed value pattern can be identified, and the failed value pattern compressed before being matched, for example, against a compendium of data quality data types, including primary identify data types pulled from the database. The compressed failed value pattern is searched using the valid compressed patterns in storage, including in the database containing identify data types. When the valid compressed pattern is located, the algorithm extracts the value identified by the valid compressed pattern from the invalid value. This extracted value is then run through the validation process using the data type's data constraints. If the value passes the constraint tests, then it is a validated recommended replacement value.

FIG. 10.5 depicts an embodiment of an audit trail and validation operation that can be performed to pull project attributes based on, for example, project JSON header data, and pull reduced frequencies based on attribute reduced frequencies, for example, in a compendium stored for one or more projects in local memory or a database. The ML model can pull base values from a project JSON catalog and, with the pulled reduced frequencies, set a base value to a recommended reduced value and create an audit trail record. The ML model can loop through the base values, pulling base values, writing base values and writing to an audit trail record continuously. Upon completion of the loop through the base values and the loop through the reduced frequencies, the ML model can create attribute totals, and the ML platform can write the attribute totals to storage. The ML platform can also create project totals and write project totals after it completes looping through the project attributes.

FIG. 10.6 depicts an embodiment of an original value validation operation, in which a stored project audit trail can be queried and audit trail records pulled based on values input to the ML model. The ML model can be trained or parametrically tuned to compare JSON records pulled from a project JSON catalog against the pulled audit trail record and match an original JSON value against an audit trail original value to validate the value. The ML model can loop through the JSON records until completion and then, based on the predicted value, set the validated indicator and date timestamp the record. The validated indicator can be set for the validated value. The ML platform can then write the validated record to storage.

FIG. 10.7 depicts an embodiment of a recommended values validation operation, which can pull audit records from a stored project audit trail and recommend (or predict) a recommended value. The validated indicator can be set for the recommended value and the record date timestamped and written to memory.

FIGS. 10.8A, 10.8B depict an embodiment of a recommended values validation operation, validate recommended value process, which can include starting with a recommended value, an audit trail original value and identifying a pattern and a compressed pattern. The ML model can be trained or parametrically tuned to match the compressed pattern against one or more pulled compressed patterns from data type storage. The ML model can validate constraints based on pulled data constraints and the pattern match results before inferring a match data type. The ML model can loop through all of the data types in a given compendium of data types before inferring (or predicting) a match data type and looping through identify compressed patterns, in which pulled compressed patterns and pulled data constraints are matched and validated before a determination is made whether a match or no match is predicted. If a match is predicted (determined), then the compressed pattern value is extracted. If, however, no match is predicted, then a default value can be generated. In either case, a recommended value is determined based on the ML model results and set for the recommended value validation indicator by the ML platform. As seen in FIGS. 10.8A and 10.8B, the system 1 can be configured to identify and extract a valid compressed pattern from within an invalid compressed pattern.

FIG. 10.9 depicts an embodiment of a validate final values process, which pulls audit trail records from a project audit trail and inputs an audit trail record to the ML model. The ML model can be trained or parametrically tuned to pull JSON records from a project DQ JSON catalog and compare the JSON records against the audit trail record to validate a final JSON record value, after which the validated indicator can be set and the record date timestamped before being written to memory. The ML model can loop through all of the JSON records and all of the audit trail records.

FIGS. 10.10 and 10.11 depict embodiments of a data certification process and a data certification data quality process. The system 1 can be configured to build data certification, which can be presented for certification to the data community and, after certification published as certified data.

FIGS. 10.12 and 10.13 depict an embodiment of a data certification operation, including a dispute resolution process, each of which follows the routine depicted in the diagrams. As input, after a data community certifies quality of the data values, distinct values can be reviewed by attribute for certification, and disputed attribute values and details identified. The disputed certification value can be challenged or approved, and the details stored in memory. Approved disputes can be resolved and the associated attribute values certified as valid.

As discussed above, the system 1 can be configured to track every single change made during each apply step, when the system updates the original data in memory and creates the new data quality version of the data in the target. The audit trail can be validated comprehensively by validating the original value is the exact original value in the correct attribute and row of the data source. The value recommended to correct the data quality problem can be validated by the system by running the original value through the identify logic and validating the recommended values match. The last validation can ensure that the final value that was placed in the new data quality target matches the audit trail row and attribute. All of this can be done by the system 1, thereby ensuring that the results can be used to, for example, meet regulatory requirements and provide regulators and auditors with a comprehensive audit trail to prove the data was handled properly during the data certification process.

The system 1 can be configured with a process for a data community to certify the quality of the data. The system can provide a clear process for performing and tracking the certification of any data. The data community role can include data governance, data quality, business owner, subject matter expert, data steward, and data custodian. The roles in the system 1 can be based on the data community roles to ensure a clear understanding of who can perform the certification.

The system data certification can be completely self-contained, including processes that support a data community's ability to govern the data. Meaning that the data community can dispute the results amongst themselves, come to a conclusion on disputes, and have the results implemented immediately. This can be delivered through the dispute processes that can be carried out by the system. As a certifier reviews the data, the system can provide the ability to dispute a value's quality, whether valid or invalid. The rest of the data community can vote to agree or challenge the dispute. Challenged disputes are closed by the challenger and the project manager can instruct the system to run the resolution process and automatically resolve data community approved disputes by implementing the required changes to the data being certified.

The terms "a," "an," and "the," as used in this disclosure, means "one or more," unless expressly specified otherwise.

The term "backbone," as used in this disclosure, means a transmission medium that interconnects one or more computing devices or communicating devices to provide a path that conveys data signals and instruction signals between the one or more computing devices or communicating devices. The backbone can include a bus or a network. The backbone can include an ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The terms "communicating device" and "communication device," as used in this disclosure, mean any hardware, firmware, or software that can transmit or receive data packets, instruction signals, data signals, optical signals, sound signals, radio frequency signals or electromagnetic signals over a communication link. The device can include a computer or a server. The device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G, or 5G cellular standards, or Bluetooth. A communication link can include, for example, an RS-232, RS-422, RS-485, or any other suitable serial interface.

The terms "computer," "computing device," or "processor," as used in this disclosure, means any machine, device, circuit, component, or module, or any system of machines, devices, circuits, components, or modules that are capable of manipulating data according to one or more instructions. The terms "computer," "computing device" or "processor" can include, for example, without limitation, a communicating device, a computer resource, a processor, a microprocessor (μC), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, μCs, CPUs, GPUs, ASICs, general purpose computers, super computers, personal computers, laptop computers, palmtop computers, notebook computers, desktop computers, workstation computers, or servers.

The terms "computing resource" or "computer resource," as used in this disclosure, means software, a software application, a web application, a web page, a computer application, a computer program, computer code, machine executable instructions, firmware, or a process that can be arranged to execute on a computing device as one or more processes.

The terms "computer asset," "computing resource asset" or "computer resource asset," as used in this disclosure, means a computing resource, a computing device or a communicating device.

The term "computer-readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0×G, 1G, 2G, 3G, 4G, or 5G cellular standards, or Bluetooth.

The term "database," as used in this disclosure, means any combination of software or hardware, including at least one computing resource or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, a computing resource such as, for example, an application program that can accept connections to service requests from communicating devices by sending back responses to the devices. The database can be configured to run the at least one computing resource, often under heavy workloads, unattended, for extended periods of time with minimal or no human direction.

The terms "including," "comprising" and their variations, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "server," as used in this disclosure, means any combination of software or hardware, including at least one computing resource or at least one computer to perform services for connected communicating devices as part of a client-server architecture. The at least one server application can include, but is not limited to, a computing resource such as, for example, an application program that can accept connections to service requests from communicating devices by sending back responses to the devices. The server can be configured to run the at least one computing resource, often under heavy workloads, unattended, for extended periods of time with minimal or no human direction. The server can include a plurality of computers configured, with the at least one computing resource being divided among the computers depending upon the workload. For example, under light loading, the at least one computing resource can run on a single computer. However, under heavy loading, multiple computers can be required to run the at least one computing resource. The server, or any if its computers, can also be used as a workstation.

The terms "send," "sent," "transmission," or "transmit," as used in this disclosure, means the conveyance of data, data packets, computer instructions, or any other digital or analog information via electricity, acoustic waves, light waves or other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer-implemented method for managing a project workflow over a computer network, the method comprising:

retrieving, by execution of a first application of a computing device and from a second computing device executing a data certification application, a plurality of schemas for handling a workflow process associated with the data certification application, wherein the first application is integrated with the data certification application;

creating, by execution of the first application and based on one of the schemas, a work schedule for a project plan for the data certification application in response to a received request, the project plan comprising a plurality of tasks to be conducted in the data certification application, wherein the data certification application comprises modules for certifying a data quality assessment of a correctness of a plurality of values of a data set;

assigning, by execution of the first application of the computing device, a plurality of resources to each of the tasks in accordance with the project plan and work schedule, the plurality of resources including one or more computing nodes;

restricting, by execution of the first application of the computing device, access privileges in each of the one or more computing nodes based on an active work in progress;

generating, by execution of the first application of the computing device, a graphic user interface based on the access privileges in the one or more computing nodes;

monitoring, by execution of the first application of the computing device, activity of each of the computing nodes progressing through a respective one of the plurality of tasks in the data certification application;

sending, by execution of the first application of the computing device, the monitored activity to a communication device to be rendered in a graphic user interface by the communication device;

receiving, by a machine learning platform executing on the computing device, a value of the data set;

identifying, by the machine learning platform, a pattern associated with the value;

compressing, by the machine learning platform, the pattern;

comparing, by the machine learning platform, the compressed pattern to one or more data type compressed patterns;

validating, by the machine learning platform, a constraint based on a result of the comparison of the compressed pattern to the one or more data type compressed patterns; and outputting, by the machine learning platform, the value in response to the constraint being validated.

2. The computer-implemented method in claim 1, further comprising:

pulling, by the machine learning platform, data type frequencies from an attribute content frequencies database.

3. The computer-implemented method in claim 2, further comprising:

sorting, by the machine learning platform, the pulled data type frequencies into descending order, from a highest frequency pulled data type to a lowest frequency pulled data type.

4. The computer-implemented method in claim 3, further comprising:

set, by the machine learning platform, the highest frequency pulled data type as a primary data class type.

5. The computer-implemented method in claim 4, further comprising:

setting, by the machine learning platform, a next highest frequency pulled data type as a secondary data class type.

6. The computer-implemented method in claim 5, further comprising:

comparing, by the machine learning platform, the primary data class type and the secondary data class type to a pulled primary data class type and a pulled secondary data class type.

7. The computer-implemented method in claim 6, wherein the computing device is further configured to:

determine, by the machine learning platform, a match for the primary data class type and the secondary data class type.

8. The computer-implemented method in claim 1, wherein the computing device is further configured to:

identify, by the machine learning platform, a failed value pattern.

9. The computer-implemented method in claim 8, wherein the computing device is further configured to:

compress, by the machine learning platform, the failed value pattern; and compare, by the machine learning platform, the compressed failed value pattern to a pulled primary identify type valid compressed pattern.

10. The computer-implemented method in claim 9, wherein the computing device is further configured to:

extract, by the machine learning platform, a matched pattern value;

validate, by the machine learning platform, the matched pattern value against a data type constraint; and output, by the machine learning platform, a validated recommended value.

11. The computer-implemented method in claim 10, wherein the computing device is further configured to:

send the validated recommended value to the communication device to be rendered in the graphic user interface by the communication device.

12. The computer-implemented method of claim 1, further comprising assigning, to each computing node, at least one of a plurality of roles.

13. The computer-implemented method of claim 12, wherein the plurality of roles comprises at least one of a project manager, a modeler, a lead, an analyst, or a certifier.

14. The computer-implemented method of claim 1, wherein monitoring the activity of each of the computing nodes comprises tracking an amount of time spent progressing through a respective one of the plurality of tasks in the data certification application.

15. The computer-implemented method of claim 1, wherein monitoring the activity of each of the computing nodes comprises tracking an amount of time spent by a user of the computing node on the respective one of the plurality of tasks.

16. The computer-implemented method of claim 1, further comprising specifying an order in which each of the plurality of tasks is to be conducted.

17. The computer-implemented method of claim 1, wherein monitoring the activity of each of the computing nodes comprises an amount of time spent by the computing node in reviewing a record for data certification of the data set.

18. The computer-implemented method of claim 17, further comprising reporting the activity of each of the computing nodes progressing through each respective task.

19. A computer-implemented method for managing a project workflow over a computer network, the method comprising:

retrieving, by execution of a first application of a computing device and from a second computing device executing a second application, a plurality of schemas for handling a workflow process associated with the second application, wherein the first application is integrated with the second application;

creating, by execution of the first application and based on one of the schemas, a work schedule for a project plan for the second application in response to a received request, the project plan comprising a plurality of tasks to be conducted in the second application;

assigning, by execution of the first application of the computing device, a plurality of resources to each of the tasks in accordance with the project plan and work schedule, the plurality of resources including one or more computing nodes;

restricting, by execution of the first application of the computing device, access privileges in each of the one or more computing nodes based on an active work in progress;

generating, by execution of the first application of the computing device, a graphic user interface based on the access privileges in the one or more computing nodes;

monitoring, by execution of the first application of the computing device, activity of each of the computing nodes progressing through a respective one of the plurality of tasks in the second application;

sending, by execution of the first application of the computing device, the monitored activity to a communication device to be rendered in a graphic user interface by the communication device;

receiving, by a machine learning platform executing on the computing device, a value of the data set;

identifying, by the machine learning platform, a pattern associated with the value;

compressing, by the machine learning platform, the pattern;

comparing, by the machine learning platform, the compressed pattern to one or more data type compressed patterns;

validating, by the machine learning platform, a constraint based on a result of the comparison of the compressed pattern to the one or more data type compressed patterns; and outputting, by the machine learning platform, the value in response to the constraint being validated.

20. A computer-implemented method for managing a project workflow over a computer network, the method comprising:

creating, by execution of a first application of a computing device, a work schedule for a project plan for a second application in response to a received request, the project plan comprising a plurality of tasks to be conducted on a data set in the second application;

assigning, by execution of the first application of the computing device, a plurality of resources to each of the tasks in accordance with the project plan and work schedule, the plurality of resources including one or more computing nodes;

monitoring, by execution of the first application of the computing device, activity of each of the computing nodes progressing through a respective one of the plurality of tasks in the second application;

sending, by execution of the first application of the computing device, the monitored activity to a communication device to be rendered in a graphic user interface by the communication device;

receiving, by a machine learning platform executing on the computing device, a value of the data set;

identifying, by the machine learning platform, a pattern associated with the value;

compressing, by the machine learning platform, the pattern;

comparing, by the machine learning platform, the compressed pattern to one or more data type compressed patterns;

validating, by the machine learning platform, a constraint based on a result of the comparison of the compressed pattern to the one or more data type compressed patterns; and outputting, by the machine learning platform, the value in response to the constraint being validated.

* * * * *